United States Patent [19]

Gupta et al.

[11] Patent Number: 4,888,692

[45] Date of Patent: Dec. 19, 1989

[54] REAL-TIME SCHEDULING SYSTEM

[75] Inventors: Subhash Gupta; Sanjiv S. Siduh, both of Dallas; Frank Vlach, Plano, all of Tex.

[73] Assignee: Texas Instruments Incorporated, Dallas, Tex.

[21] Appl. No.: 273,643

[22] Filed: Nov. 10, 1988

Related U.S. Application Data

[63] Continuation of Ser. No. 895,061, Aug. 11, 1986, abandoned.

[51] Int. Cl.[4] .............................................. G06F 15/46

[52] U.S. Cl. ..................................... 364/402; 364/468

[58] Field of Search ............... 364/478, 156, 468, 152, 364/402, 153

[56] References Cited

U.S. PATENT DOCUMENTS

| | | | |
|---|---|---|---|
| 3,703,725 | 11/1972 | Gomersall et al. | 364/468 X |
| 3,845,286 | 10/1974 | Aronstein et al. | 364/468 X |
| 3,891,836 | 6/1975 | Lee | 264/156 X |
| 4,548,023 | 3/1987 | Powell | 364/156 X |
| 4,607,325 | 8/1986 | Horn | 364/153 X |
| 4,628,434 | 12/1986 | Tashiro et al. | 364/402 X |
| 4,628,435 | 12/1986 | Tashiro et al. | 364/468 X |

OTHER PUBLICATIONS

Goldratt, Eli, et al., *The Race,* North River Press Cro-on-Hudson, N.Y., 1986, p. 125-141.

*Primary Examiner*—Clark A. Jablon
*Attorney, Agent, or Firm*—James T. Comfort; N. Rhys. Merrett; Melvin Sharp

[57] ABSTRACT

A system for scheduling the operation of interrelated machines which perform a process flow. A global definition of the system is made once, and each machine has an individual profile describing its local interaction with the system. Local scheduling decisions for each machine are made based on that machines individual profile and the state of the manufacturing facility at the time a decision is needed. Operation of the individual machines is controlled by the local scheduling decisions made therefor.

7 Claims, 7 Drawing Sheets

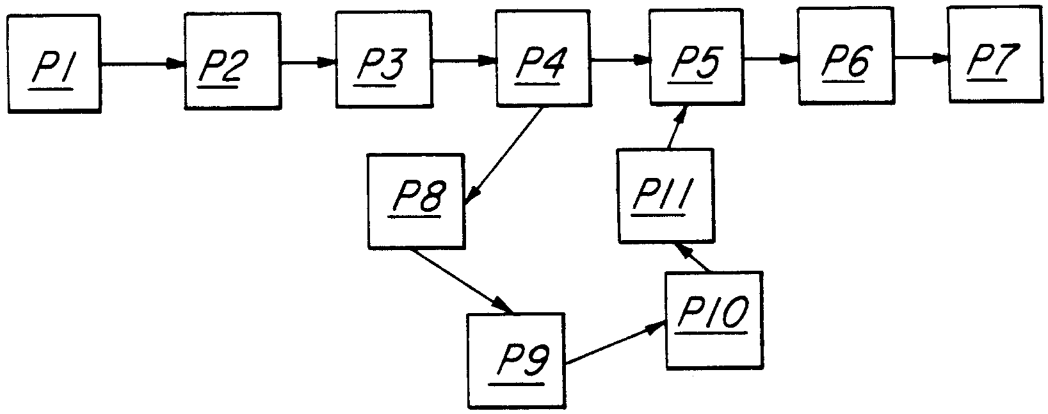

Fig. 1

PROCESS

PROCESS-NAME
PROCESS-NUMBER
PRECEDING-PROCESS
NEXT-PROCESS
WHICH-MACHINES
REWORK-POINTER
REWORK-PROCESS
PROCESS-TIME
CONSTRAINT-STARTER
CONSTRAINT-MEMBER
USAGE
QUEUE

Fig. 2

MACHINE

MACHINE-NUMBER
MACHINE-NAME
MACHINE-TYPE
PROCESSES
CAPACITY
SET-UP-TIME
SCHEDULED-DOWNTIME-FREQUECY
SCHEDULED-DOWNTIME-LENGTH
MTBF
MTTR
MTBA
MTTA
USAGE
AVAILIBILITY
SIDES
LOTS-DONE-ON-CURRENT-PROCESS
LOTS-DONE-ON-CURRENT-SIDE
LAST-LOADED-AT
NEXT-AVAILABLE-AT
NEXT-MAINTENANCE-TIME
DOING
SCHEDULING-TYPE
WAITING-TIME
OPTIMIZING?
CHECKED-UP-TO

Fig. 3

FROM

| | M | P1 | P2 | P3 |
|---|---|---|---|---|
| TO | P1 | — | 20 | 25 |
| | P2 | 10 | — | 15 |
| | P3 | 5 | 10 | — |

SET UP TIMES (IN TIME STEPS)

*Fig. 4*

SAFE-TIME-CONSTRAINT

BEGINNING-PROCESS
END-PROCESS
PROCESSES
LENGTH
GREATEST-PROCESS-TIME
CONTROLLING-PROCESS
TIME-TO-CONTROLLING-PROCESS
NEXT-AVAILABLE-TIMES
LOT-NUMBERS
OPTIMIZING?

*Fig. 5*

| TIME STEP | 0 1 | 2 3 | 4 5 | 6 7 | 8 9 | 10 11 | 12 13 | 14 15 | 16 17 | 18 19 | 20 21 | 22 23 | 24 25 | 26 27 | 28 29 | 30 |
|---|---|---|---|---|---|---|---|---|---|---|---|---|---|---|---|---|
| LOTS IN QUEUE P10 | 0 4 | 2 2 | 2 2 | 1 1 | 3 3 | 2 2 | 2 2 | 1 1 | 1 1 | 0 0 | 0 2 | 2 2 | 1 1 | 0 0 | 0 0 | 0 |
| LOTS IN QUEUE P18 | 0 0 | 0 0 | 1 1 | 0 0 | 2 2 | 1 1 | 1 1 | 0 0 | 0 0 | 0 2 | 1 1 | 0 0 | 0 0 | 0 0 | 0 0 | 0 |
| PROCESSING M1 | – – | L P10 → | U P10 | L P18 → | U P18 | L P10 → | U P10 | L P18 → | U P18 | L P10 → | U P10 | L P18 → | U P18 | L P10 → | U P10 | – |
| PROCESSING M2 | – – | L P10 → | U P10 | L P10 → | U P10 | L P18 → | U P18 | L P10 → | U P10 | – – | L P18 → | U P18 | L P10 → | U P10 | – – | – |
| ARRIVAL M QUEUE P10 | 4 | | | | 2 | | | | | | 2 | | | | | |
| ARRIVAL M QUEUE P18 | | | 1 | | 2 | | | | | 2 | | | | | | |

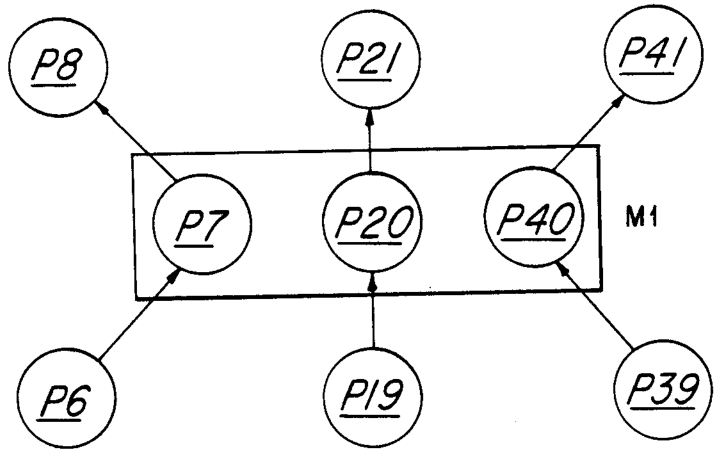
Fig. 12
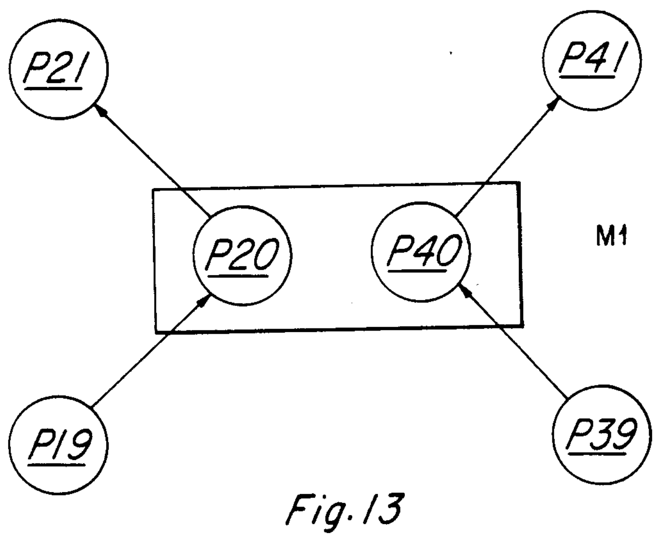
Fig. 13
| | | FROM | |
|---|---|---|---|
| | M1 | P20 | P80 |
| TO | P20 | – | 10 |
| | P40 | 20 | – |
SET UP TIMES
Fig. 14

REAL-TIME SCHEDULING SYSTEM

This application is a continuation, of application Ser. No. 895,061, filed 8/11/86.

BACKGROUND AND SUMMARY OF THE INVENTION

The present invention relates to automated scheduling and planning systems.

Resource planning is used extensively by industry. It is especially useful in the manufacturing sector, where careful scheduling of a manufacturing facility is necessary in order for such plants to be efficient. The flow of raw and partially finished goods, and scheduling of work on the various available machines, is a significant problem in large manufacturing facilities. A few examples of manufacturing facilities which are especially sensitivie to scheduling problems include semiconductor fabrication facilities (front-ends), job shops, and plants making automobiles and heavy machinery.

The number of details and computations involved in completely scheduling a large manufacturing facility are enormous. No exact mathematical solution can, in general, be generated for such a facility. This is primarily because the facility does not operate in an ideal manner. Unforeseeable events are very common, including machine breakages, bad work which must be reworked or thrown away, and delays in moving material within the facility. These minute by minute events can have an impact on the overall operation of the facility and the precise nature of such impact cannot generally be determined in advance.

Many different schemes are currently in use for scheduling factory systems. These include the simplest scheduling system, that of no preplanned scheduling at all. In some factories, a work piece simply moves from machine to machine under the experienced guidance of the operator, and no particular pre-planning is made. In slightly more sophisticated systems, various rules of thumb are used by operators and process experts to control the flow of material through the plant. Some of these rules are very simple, such as FIFO (first-in first-out). These rule of thumb decisions are made at a localized level. That is, the operator or expert will decide which workpiece should next go onto a particular machine based on the list of those workpieces currently available for the machine.

A more sophisticated system includes coordinated plant wide planning at some level. This is generally done by globally defining the manufacturing process and studying the interrelation between the various subprocesses therein. Such plant wide planning typically includes the identification of trouble spots such as bottlenecks in the overall process flow. An example of a state-of-the-art system would be OPT (Optimized Production Technology) which has been used for modeling and planning of manufacturing facilities since approximately 1979. The general theory of OPT is that plant capacity is determined by one or a small number of bottleneck processes. The overall strategy is then to ensure that the bottleneck processes are kept constantly busy by ensuring that queues are maintained in front of them. Desired work in process inventory levels at key points throughout the plant are determined at the global planning stage, and these desired values are compared to those which actually occur to determine the operating conditions within the plant.

Current sophisticated scheduling procedures generally begin with the creation of a global plan which outlines the overall characteristics of the manufacturing facility. Based on the current status of the facility, including such information as identification of work in process and machines which are down for repair, a general plan is made for some future time period. This plan will include directives such as "begin work on some number of identified items each hour for the next eight hours." Running a global plan periodically can be referred to as batch processing.

Batch processing of the global plan does not allow quick or easy response to changing conditions. If plant conditions change, such as a major piece of machinery going off-line for repair, the entire global plan must be recalculated. Such global plans do have the advantage that they take into account in the relationship between various parts of the manufacturing process, but they are relatively inflexible and can only be applied to broad concepts. Decision making at the level of a particular machine must still be done using rules of thumb.

Even is sophisticated systems, there is little interaction between the global plan and local decision making process. The global plan cannot comprehend the effect of breakage of a particular machine in advance. Local decision making, that is, which work to load on which machine and in which order is generally done by rules of thumb and cannot comprehend the effect of a particular action on overall plant operation. Planning is done only periodically at the global level, and often incorrect or inaccurate rules of thumb constitute the entire decision making process at a local level.

It would be desirable for a scheduling system to comprehend a global planning strategy combined with intelligent local decision making which considers the effect of local decisions elsewhere within the manufacturing process. It would be further desirable that such system be able to react to the numerous uncontrollable events which occur during the manufacturing process.

Therefore, a scheduling system includes a global, steady-state model of the entire manufacturing process. This global calculation is done one time and recalculated only when there is a major change in process flow definition or machine availability. This global plan generates parameters which are used to control local decision making strategies. The local strategies are applied to each machine in the manufacturing facility, and are relatively simple. Based upon the parameters extracted from the global definition, and information regarding the current state of the neighborhood of the particular machine, local decisions can be made on a real time basis. Special decision making strategies may be used by machines which are identified as critical to the manufacturing process flow.

The novel features which characterize the present invention are defined by the appended claims. The foregoing and other objects and advantages of the present invention will hereafter appear, and for purposed of illustration, but not of limitation, a preferred embodiment is shown in the accompanying drawings.

BRIEF DESCRIPTION OF THE DRAWINGS

FIG. 1 illustrates a sample process flow, including a rework loop;

FIG. 2 illustrates a Process data structure;

FIG. 3 illustrates a Machine data structure;

FIG. 4 is a setup time matrix for a machine having sides;

FIG. 5 is a safe time constraint data structure;

FIG. 12 is a portion of a process flow illustrating a bottleneck machine;

FIG. 13 illustrates a different bottleneck machine situation;

FIG. 14 is a chart of setup times for the process flow of FIG. 13;

DESCRIPTION OF THE PREFERRED EMBODIMENT

Figure 6:
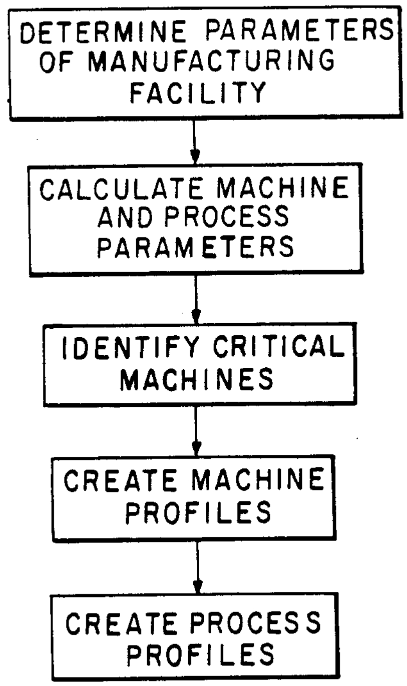
FIG. 6 is a flowchart of a portion of the global planning process.

The following description of the preferred embodiment includes detailed examples as well as the general approaches used in making a scheduling system. The description is broken into 4 major areas: a general description of a factory system, including definitions of terms found elsewhere; the global (steady-state) planning process; local planning and optimization; and a preferred calendar mechanism for use by the scheduler. It is understood that particular references and descriptions are not intended to limit the scope of the Claims to the details shown therein, but are for illustrative purposes.

DESCRIPTION OF THE FACTORY SYSTEM

The scheduling system is itself constrained by the nature of the factory to be controlled. It must be able to handle special situations which occur in the factory, such as relationships between certain machines. Many relationships which are found in factories and other systems which can be controlled by a scheduler are similar, and will be the same as those which will now be described.

The preferred scheduling system will be described with relation to a front-end manufacturing facility for integrated circuits. This type of manufacturing facility is sufficiently complex to illustrate many features of the scheduling system. Other types of manufacturing facilities will have different specific machine types and other considerations, but most will be clearly adaptable from the described system.

The scheduling system will be described with respect to a front end which is highly automated, but automation is not a necessary feature for its use. Commands which are made to machines and controllers in the automated system can just as easily be made to human operators running the machines. As will be described, most of the control functions will be handled directly by the scheduling system, but it is a straightfoward task to have some of these functions handled by the machines themselves if they are capable of doing so.

The period of time which will be used herein is called the time step. A time step is preferably 0.1 hours, or 6 minutes. All times used by the scheduler are expressed in time steps, and all absolute times, such as the predicted time for an event, are expressed as a number of time steps from some arbitrary beginning. Thus, clock time is not used, but there is a simple correlation between actual time and time indicated by the time step count.

The procedure by which a semiconductor slice is transformed into integrated circuits can be conceptualized as a series of discrete process steps. These process steps are independent of the machines actually located on the factory floor. These process steps are the functional description of what actually happens to the slices at each stage of manufacture. For example, a short series of process steps might be: apply photoresist, pattern photoresist, develop photoresist, inspect, bake photoresist. These process steps are the atomic elements of the scheduling plan; each is an indivisible action which occurs at a single place and over a fixed, unbroken period of time. A typical front end process will include several hundred such process steps. In addition, multiple process flows may operate in one facility simultaneously, such as when a front end has several product lines. Each product line will have different process steps for each stage of manufacturing. Even though there may be much similarity between two different process flows, for simplicity it is preferable that each step of each process be uniquely identified. The fact that a single machine may perform a similar step for each process flow causes no confusion, as will be explained below.

The process steps can be visualized as a long string of events which operate to transform a bare silicon slice at the first process step to finished integrated circuits at the last process step. As far as a front-end is concerned, the finished product is usually a semiconductor slice having fully formed integrated circuits thereon. The individual circuits are separated and packaged elsewhere.

The string of process steps is not always a single string of events occuring in a fixed order. It is sometimes necessary to rework some slices at various stages of the process. For example, if for some reason a photoresist patterning step did not occur properly, it is necessary to remove all of the resist, clean the slice, reapply photoresist, and redo the patterning step. This is referred to as a rework loop, and, on a schematic diagram of the manufacturing process, appears as a small loop of process steps off to one side of the main process flow. Rework loops are not available for all types of processing; for example, a metal workpiece which has been incorrectly drilled may not be salvagable.

FIG. 1 shows a very short process flow for an imaginary front end. Process steps are identified by P, so the main flow has process steps P1–P7. A single rework loop is shown containing process steps P8–P11.

A process step has several important properties. The most important of these are collected in a process data structure such as shown in FIG. 2. The process must be uniquely identified, preferably by a PROCESS-NAME and PROCESS-NUMBER. The preceding and following processes are identified in PRECEDING-PROCESS and NEXT-PROCESS. A list of machines that perform this process is included. If this process is a rework decision point, that is, a check or inspection process that might cause slices to branch into a rework loop as described above, a pointer to the start of the rework loop is kept. This pointer is nil if the process step is not a rework decision point. If this process is part of a rework sequence, that rework sequence is identified. The other data contained in the structure of FIG. 2 will be described later.

The basic unit of material will be referred to as the lot. In a semiconductor front end, a lot is a group of slices which are processed together. A lot typically consists of 24 slices. Most machines used in the front end operate on some number of lots, which in this case is a multiple of 24. Machine capacity will be referred to by lot size, so that a 4 lot machine can handle 96 slices simultaneously in the present description. Of course, lots may be of other sizes if desired. Also, in many manufacturing facilities, individual items (such as a metal ingot) would be the basic unit of material. The lot is considered to be a single atomic unit, in that operations on partial lots are not allowed.

As stated above, process steps are independent from the actual machines on the factory floor. Several machines are often used for a single process step. These machines may not be identical. Additionally, a single machine could be used for more than one process step. For example, a machine for applying photoresist can be used for any process step that requires application of resist. If a process flow requires 4 applications of resist, and there is only one machine for the job, that machine is actually used in four distinct process steps. A typical application might have 8 identical photoresist application machines, ten normal process steps for applying resist, and ten rework process steps for applying resist. Each process may have access to each machine, so that each process thinks that it has 8 machines to choose from whenever a lot passes through that process. However, there will be contention for the machines by the various processes, so that, on the average, each process has access to each machine for only its proportional share of the time. For example, in the case of 8 machines, 10 process steps, and 10 rework process steps, it may be that a rework sequence needs to be done on the average of 1 time in 10. Every normal process step will have the same utilization because every lot must go through every step, while the rework steps will, on the average, have only one-tenth the utilization of the normal steps.

Each machine also has an associated data structure, such as shown in FIG. 3. This structure includes a unique machine number and name for each machine, and the machine's type and the processes in which it is involved. The capacity of the machine is expressed in number of lots.

The structure for each machine has a pointer labelled SET-UP-TIME, which points to a series of tables, each table corresponding to one machine. When a machine changes over from one process to another, there may be some machine setup which must be done. This setup time will be added to the total job time when it is necessary. The setup time may be different for each pair of processes moved from and to, so a setup time matrix such as that shown in FIG. 4 is used by the scheduler. This matrix is for a machine which does 3 different processes, and shows the sètup time to be added to the job time whenever moving from any process to any process. Setup times are shown in time steps as described above.

Each machine also has information showing its scheduled downtime. This includes both the frequency and expected length of such downtimes. Scheduled downtimes are those required for preventive maintenance, plant shutdowns, and other predictable events. Mean time between failure (MTBF) and mean time to repair (MTTR) information is also included. This information helps provide statistical information on the machine's availability. Related to MTBF and MTTB information is mean time between assists (MTBA) and mean time to assist (MTTA). An assist is a very short and simple fix that doesn't qualify as a repair, and doesn't require a major recalculation of other machine's operation. An assist would typically be something that could be repaired in less than one time step by a single operator. MTBA and MTTA information is also used for statistical availability calculations.

USAGE for a machine is an indicator of how much of the time a machine actually processes each lots as it goes through the entire process flow, adjusted for availability. A high usage indicates that the machine spends more time processing each lot than machines having low usage. If the manufacturing facility is operating at or near maximum capacity, machines having a high usage will be nearly always busy. Machines having a high usage are referred to as bottlenecks, and are treated in more detail in the discussion of global plant optimization. Low usage machines are idle more of the time. Typical manufacturing operations are fairly sparse, that is, a large number of the machines have a moderate to low usage factor. A term related to usage is utilization, which is a percentage indicating how much of the time a machine is actually processing lots. If the facility is operating at or near maximum capacity, machines having the highest usage numbers will also have nearly 100% utilization. If the facility is operating at, for example, 50% of maximum capacity, the bottleneck machines will have a utilization of approximately 50%. The usage number is constant regardless of current plant output.

The AVAILABILITY of a machine is an indication of how much of the time the machine is operational. A machine which breaks down often, or takes a long time to repair, has a low availability factor.

The next item shown in FIG. 3 is the SIDES item. The concept of sides is an illustration of the types of complex interactions which occur between the concepts of processes and the machines which perform them. A side is a grouping of processes on which a machine can operate simultaneously. An example of such a machine is shown in Table 1. The machine in this example can handle 4 lots simultaneously, and is used for (hypothetical) processes 4, 12, 35, 48, and 62. Processes 4, 12, and 62 are short, low temperature bake steps, while steps 35 and 48 are high temperature bakes. Thus, lots from steps 4, 12 and 62 form a side, and steps 35 and 48 form a side.

TABLE 1

| MACHINE M1 | Processes | Description |
|---|---|---|
| | 4 | low temp bake |
| | 12 | low temp bake |
| | 35 | high temp bake |
| | 48 | high temp bake |
| | 62 | low temp bake |

This machine can process any mix of lots from one side at a time. Lots from the two sides cannot be mixed, and there may be a setup time associated with changing from the process of one side to that of the other. This side information allows the machine to operate much more efficiently in many instances, because it need not wait for four lots of a single process to arrive in its input queue before it can process a full load. This has the effect of increasing the percentage of the time that M1 operates full (4 lots), as well as minimizing the average amount of time that lots wait in the queue.

The remaining items in the data structure of FIG. 3 are related to the dynamic operation of the scheduler, rather than the steady-state structure of the machine as do the above described data items. The information concerning lots done on the current process and side are used in the local decision making process, or local optimization, of the machines as will be described under that section. The LAST-LOADED-AT and NEXT-AVAILABLE-AT items are used to determine when the machine will be available to accept the next incoming load. The NEXT-AVAILABLE-AT item also indicates the expected time that a machine will be returned to service if it is currently down for repair or maintenance. The NEXT-MAINTENANCE-TIME item indicates when the machine is next expected to be taken out of service. This refers to scheduled maintenance.

The DOING data item is a list of lot and process pairs, which indicates which lots are currently in the machine, and which processes those lots are involved in. As shown in the discussion on sides, it is not necessary for all lots in the machine to be in the same step of the process flow.

SCHEDULING-TYPE indicates what type of decision making process should be used on this machine whenever a load decision is to be made. Some of the preferred decision types include multi-lot machine optimization, round robin, and constraint member. These decision making processes are discussed under the local optimization topic. WAITING-TIME is a number indicating at which time step the machine should load the next group of lots. During the local optimization process, it is sometimes desirable that a particular machine not load right away, but instead wait for another lot that is expected in the near future. In such cases, WAITING-TIME contains the time at which the machine is next expected to take some action. As far as the scheduler is concerned, the machine will simply sit idle until the current time, as defined by the calendar mechanism, catches up to the value in WAITING-TIME.

The values OPTIMIZING? and CHECKED-UP-TO are used in the local prediction process as described under the subject of local optimization.

Sometimes there will exist a special relationship between groups of processes which requires that successive process steps be performed with very little wait between them. This is especially true in semiconductor processing, wherein lots must be moved quickly from step to step for some span of process steps. If a delay occurs in the middle of this sequence, the semiconductor slices may be ruined. An example of such a series of related process steps could be the several steps involved in applying, patterning and baking photoresist on a slice. Extended interruption of this set of processes could ruin the work in process, requiring that the slices in question be reworked or discarded.

The group of process steps so related is referred to as a time constraint, or simply a constraint. The timing of the steps in the constraint is critical; no large queues must be allowed to build up within the constraint. Once a lot or batch of lots has entered the constraint, they must be moved through to the end with relatively little interruption. Process steps which are contained within such a constraint are referred to as constraint members, and the first step of the constraint is the constraint starter. Membership in a constraint, or being a constraint starter, is indicated in the process data structure (FIG. 2).

The timing of the constraint is controlled by its slowest members. For example, if one constraint member is a process that is one lot wide and take 10 time steps to complete, and there is only one machine to do that process, only one lot can pass through the constraint every 10 time steps regardless of the speed and capacity of the remaining members. Thus, when load decisions are made for the process starter, it is necessary to know the characteristics of all processes in the constraint.

A separate data structure is kept for each constraint. Such a structure is shown in FIG. 5. This structure indicates the beginning and end processes, lists the actual processes by number, and gives the total processing time of the constraint. The longest process time of any process in the constraint is given in GREATEST-PROCESS-TIME, and the first process having that process time is considered to be the controlling process. TIME-TO-CONTROLLING-PROCESS is the number of time steps from the constraint starter, including the process time of the constraint starter, until a lot or group of lots is available for loading into the controlling process. If the next available time for the controlling process is known, TIME-TO-CONTROLLING-PROCESS determines when the next batch of lots can be started into the constraint. Also included in the structure are the lot numbers currently within the constraint, and a flag to indicate whether this constraint is currently included in a local optimization process.

In the embodiment of the scheduler which is described herein, delays which occur between unloading a machine and making a lot available to the next process are not considered. Such delays are usually small compared to the overall operation of the facility, and are not generally important. However, in cases where delays are significant, it may be necessary to take them into account. In such a situation, the transfer time is considered to be simply another process step, and is treated as are all other process steps. Thus, the overall scheduling system need not be modified to take such delays into account; they are handled within the parameters of the system as is currently described.

GLOBAL PLANNING

Before actual scheduling of the processing facility is undertaken, a global analysis of the facility must be made. The results of the global analysis are made available to the local decision making portion of the scheduler to improve its optimization functions. The global analysis is preferably made only one time unless process parameters change significantly or process flows are changed.

The purpose of the global planning stage is to define the steady-state features of the manufacturing facility. This includes defining process flows and statistics of the various process steps. Special features of various machines are taken into account, such as machines which have a high usage or long process times. Special processing conditions are considered in terms of their impact on the overall plant operation. The results of the global planning step indicate the macroscopic operation of the facility, giving such information as the cycle time and plant capacity. The general strategy by which the plant will be operated is also determined during this planning step. Such general strategies can be, for example; maximizing plant capacity, minimizing cycle time, minimizing labor or manufacturing costs or maximizing product yield (which may be higher for less than maximum plant capacity).

The general approach of the global planning step which will now be described will attempt to maximize plant capacity while minimizing average cycle time. These two goals are not always consistant, so that some lengthening of cycle time may need to be suffered in order to give acceptable plant capacities. In semiconductor front-ends, minimizing cycle times tends to improve overall yield, because lots that remain in partially completed states in the facility are especially susceptible to damage.

In order to maximize plant capacity, it is necessary that high usage machines be utilized nearly 100% of the time. These bottleneck machines are identified during the global planning process, and the throughput of the plant is adjusted so that the machine or machines having the highest usage number have a utilization just under 100%.

Queueing theory demonstrates that a machine which has a maximum processing rate equal to the average arrival rate of work for that machine will eventually build an infinite queue (large in practical terms) in front of it unless the incoming work arrives in precisely regular fashion and the machine never breaks down. If the machine does break down, a common occurrence in many industries, or the arrival of incoming material is not completely regular, which is the rule rather than the exception, the machine can never deplete its input queue. Since queues build up, cycle times of products increase and the amount of work in process increases.

The preferred embodiment therefore keeps the bottleneck machines occupied several percent less than their entire available time so that long queues do not build up in front of them. In some cases, 2-3% planned slack time would be sufficient, while in others 10% or even 20% may be necessary. The amount of slack time which is neceessary depends on the expected statistical fluctuations in the arrival rates of lots to the bottleneck machines. Larger fluctuations require more slack times, while a more uniform arrival rate allows less slack time to be reserved. In addition, the available time for a machine is defined to include time off for expected repairs and maintenance. This means that the planned slack time is not unexpectedly taken away.

The global planning stage is not necessarily done with a computer, although use of a programmed general purpose digital computer will greatly speed up some phases of the process. The global planning stage can be entirely automated, with human input used only to enter data on plant operation and machine parameters.

The general global planning steps are shown in FIG. 6. The order in which these steps are done is generally not important, and in fact several will often be done concurrently, and alternating in iterative steps.

Figure 7:
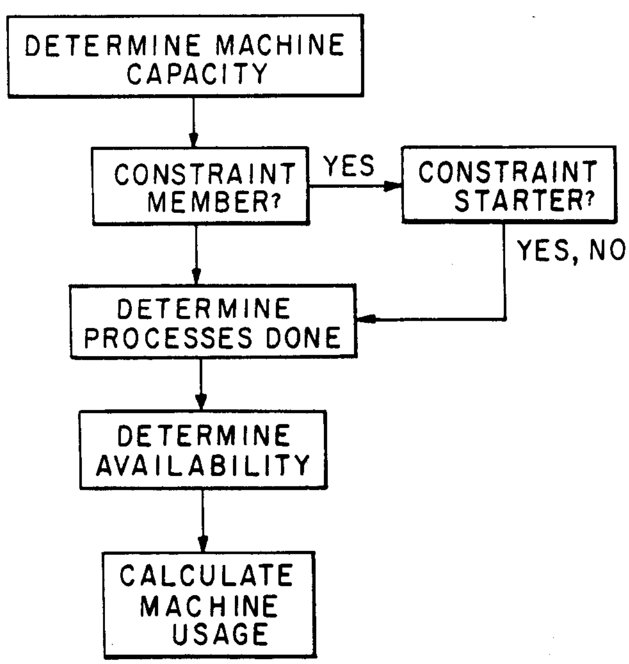
FIG. 7 is a flowchart illustrating another portion of the global planning process.

The first major step is to determine the parameters of the manufacturing facility. These include the definition of the process flows, and identification of machines and determination of their individual characteristics. Calculations are made of the relationship of the various parameters to the overall process flow. These calculations include those items shown in FIG. 7 for each machine.

One of the important process parameters to discover is the usage of each machine. As described above, this is a number representing how much time each machine spends operating on each lot which flows through the plant. For example, if a single machine is available to work on 4 different processes, every lot will pass through that machine 4 times. The process times of the 4 different processess must be totalled, and any setup times must be added, to determine how much time that machine spends on each lot which flows through the plant. This calculation will usually reveal that one or a small number of machines have a very high usage compared to the rest; these are the bottleneck machines. These machines are the ones which control the overall capacity of the plant.

The local optimization process for the bottleneck machines may need to be different from that of other machines. Bottleneck machines must be utilized to the full needed extent, or the overall plant capacity will suffer. The local optimization process takes into account the critical nature of bottleneck machines when making local planning decisions. Not all bottleneck machines will have the same usage, and the degree of criticality depends on the usage number. One result of the global planning process is to give each machine in the plant a usage number which indicates how much time each lot spends with that machine. This number is stored in the data structure for the machine, and is considered to be part of that machine's profile. The complete profile includes other data as will now be described.

Another important parameter is the machine capacity. If a machine can handle many lots at one time, if may have more impact on the overall process flow than one which handles a smaller number. The machine capacity is part of its profile. Large capacity machines which also have long processes have a large impact on the average cycle time in the plant, and are critical machines.

For steady-state statistical purposes, a machine with an actual capacity of two or more lots may have an effective capacity less than its actual capacity. This will be controlled in part by the expected distribution of arrival times of lots into the queue for that machine. For example, if lots tend to arrive in widely separated pairs, a machine which has an actual capacity of 4 lots may effectively only process 2 lots at a time. If this is the case, the global effect of the machine will not be that of one having a capacity of four lots, but rather as that of a machine having less. The effective capacity of the machine could be a fractional number, such as 3.2 lots, which indicates the average number of lots processed for each run of that machine.

Membership in a constraint is an important parameter of all machines which are constraint members. Machines in constraints must take such membership into account whenever local decisions are being made. Any machine which is the constraint starter is also flagged during the global planning stage, as this machine is the gateway into the constraint. The constraint starter determines the flow of lots through the constraint, and as such must be considered a critical machine, at least locally. Constraint membership and starting information is included in the machine profile.

Another important factor in a machine's profile is a list of the processes done by that machine. Machines which do several processes may turn out to be bottlenecks, or may be long queue wait machines if substantial process change penalties exist. An indication of the processes done by a machine is part of its profile.

A portion of this factor relates to contention between process done on a single machine. Any given machine that works on multiple processes may not spend equal time on each of those processes. For example, a machine that does processes P1, P2 and P3 may do 100% of the work on P1 (it is the only machine doing process P1), 20% of the total work done on process P2 (other machines do the rest), and 50% of the work on process P3 (splitting time equally with another machine). This machine should therefor spend different amounts of time processing lots for the different processes. The various attributes of the machine, such as availability, are considered to be distributed among the processes it works on in ratios proportionate to the amount of time spent on each of those processes. A list indicating which processes are done by each machine should also indicate the relative contention factors just described.

Another important part of a machine's profile is its overall availability. This indicates what percentage of the time a machine is actually operational and available to process material, as opposed to being down for repair or maintenance. Machines which are often down can adversely effect overall operation of the plant. Information on the mean time between failures, mean time to repair, peventive maintenance schedules, etc. is used to statistically calculate the amount of time each machine can be expected to be available for use.

Other factors can be included in the profile as appropriate. Number of operators needed to run, quality information, and the like can all be included to indicate how each machine relates to the rest and to the overall process flow.

Many of the above factors must actually be considered in calculating the usage number for each machine. Machine downtime, setup times, effective capacities, and membership in constraints all have an effect on the usage of a machine. For example, a machine having an actual capacity of 4 lots but an effective capacity of 2 lots would have a usage number which is, other factors being equal, twice that which would be calculated without modifications. In this example, the machine would have a usage of one-half the process period per lot instead of one-fourth.

The machine profile for any machine, then, gives a shorthand indication of the importance of that machine to overall plant operation. Certain machines can be considered to be critical; these include machines which have the highest usage because they are the bottleneck machines controlling plant capacity. Machines having long queue wait times, either because the machines have long processes or long setup times, are critical because they influence the average cycle time. Machines which break often can also be expected to build up queues. All machines involved in time constraints have a large local effect, and should be considered critical.

After critical machines are found by creating the machine profiles (FIG. 6), process profiles are also created. These contain the information about processes, which can, to a certain extent, be considered separately from the machines which perform those processes. Local scheduling decisions are made by considering the combination of machine and process profiles, along with other information which will be described in connection with local planning.

At this point, much steady-state information is available about the manufacturing facility. Capacity, cycle time, and expected work in process numbers can be calculated. The various machine profiles indicate the relationship of each machine to the whole. However, detailed scheduling cannot be done from the information available at this stage.

Plant capacity is easily calculated by pinpointing the one machine or process which has the highest usage. This machine is the limiting factor for the plant. The total time which each lot must spend at that machine is equal to the maximum plant capacity in terms of spacing between product units. For example, if the bottleneck machine spends 1 hour processing every lot, is always available and has a capacity of one lot, the maximum plant capacity is 1 lot per hour. If the bottleneck machine can process 4 lots at a time, the maximum capacity is 4 lots per hour.

Minimum cycle time is also very easily calculated. Simply totalling the process times for each process step gives the minimum possible cycle time. Totalling the process times for each process step including average queue wait times gives the average expected cycle time.

The long term statistical behavior of the various machines is calculated to determine the detailed steady state operation of the facility. Extra emphasis is given to those machines which are shown to be critical. One type of critical machine is the bottleneck. Bottlenecks which do not have setup times involved are fairly straightforward to calculate. However, those which have setup times to switch between processes must be handled a little differently.

The first step is to calculate the contention numbers for the machine without considering the setup times involved in switching between processes. This gives a usage value for the machine which is lower than the actual usage. For those machines which have a relatively high usage, the setup times are then factored in. Machines having a low usage need not be treated further, because an error of a few percent in their operation will not noticebly effect the operation of the plant. Then, the effect of various strategies are considered for the bottleneck machines with the setup times included. For example, requiring a different number of loads before making a change will effect the usage; changing over less often will decrease the amount of time spent doing setups. On the other and, changing over less often will increase the amount of time the machine waits idle while a large queue builds up for the other process. An example process involved in such a bottleneck calculation is shown in FIG. 13 and FIG. 14.

A cost function for the bottleneck machine is devised. This can maximize capacity, minimize cylce time, minimize cost, strike a balance, or achieve whatever global goal is desired. Then the arrival rate of lots at the bottleneck machine is modelled as a distribution, and the cost functon is calculated for different loading strategies. The minimum or maximum point of the cost function, as appropriate, determinees the optimum loading strategy for that bottleneck machine. These detailed calculations are carried out, preferably, only for the critical machines.

Much of the information needed to rigorously model the critical machines may not be known or easily available. Often, it is not known in advance which machines will be critical. The method outlined above allows the persons designing the scheduler to make a first approximation based on very rough data. Based on these approximations, a few machines and processes will be identified as potentially critical, and the major part or the data gathering effort can be concentrated on these machines. The scheduler described herein is based, in part, on the fact that only critical machines need complete information; less critical machines need not be as carefully modelled because their impact on overall plant operation will be relatively small.

Based on the usage factor for each machine, and given an approximate distribution of lot arrival times, the proportion of the time in which a machine will be required to make a loading decision can be calculated. Many machines, although decisions can be made for them, will be found to have an actual decision to make only a very small part of the time. In other words, a machine having queues for several processes may be so lightly loaded that having lots arrive in two queues at the same time, thus requiring a decision, will be a rare event. These machines need not be burdened with a complicated decision making process. One of the benefits of the present approach to scheduling is that resources are directed to the critical machines, and it is recognized that the short term happenings at most machines, other than fluctuations caused by machine breakage, simply do not matter to the overall operation of the plant.

The proper selection of desired global operating parameters depends on which goals are most important. If the overriding concern is maximizing plant capacity, bottleneck machines will be operated at nearly 100% utilization. If minimizing cycle time is more important, plant capacity will be lowered until acceptable average cycle times are obtained. If other concerns are overriding, such as minimizing operating or labor costs, plant loading will be adjusted to allow these goals to be realized. A mathematical function is generated for each machine in the plant which incorporates the relevent factors, and global plans are made to minimize or maximize that function, whichever is appropriate.

The information from the global planning stage is used to control the local decision making process. Each machine has a profile which indicates its place in the overall scheme; it will then take real time local knowledge and combine it with this information to do local planning, as will be described below.

LOCAL OPTIMIZATION

The real-time portion of the scheduling system depends on local optimization to function efficiently. Instead of recalculating the complete global state for the system each time a decision must be made, only the relevant local state is recalculated. This greatly decreases the processor load.

Once the gobal system parameters have been determined, each machine has several data structures which determine its behavior during operation of the manufacturing facility. These data structures act as a set of guideline instructions which tell each machine what to do next. Decision-making is event driven, and a determination of what comes next for each machine is made whenever certain events take place. Events which drive the decision making process include machine loads and unloads, and a machine going off-line or coming on-line. Whenever one of these events occurs, the scheduling system must calculate what that machine will do next.

The range of actions which can be taken is fairly limited. A given machine may need to load a lot immediately, and the lot may need to be taken from one of several input queues. A machine which processes multiple lots may be required to wait for a full load, or proceed with a partial load.

The computational resources required for decision making tend to grow at least geometrically, and usually exponentially, with the size of the problem. Decisions which consider many factors, such as those made for the entire facility at once, tend to require prohibitive computational resources. However, a larger number of simpler decisions requires a level of resources which is available with currently available computer systems. In the preferred embodiment, a single processing system runs the entire scheduling system. Since decisions are made on a local basis, a single moderately powerful processor can easily handle all the computational demands of a large, complex manufacturing facility.

Even if the computational resources of the processor were strained by operation of the scheduling system on a real-time basis, the system can make allowances for expected demand without severe degradation of the system performance. As shown in FIG. 3, each machine data structure has data items indicating when that machine will next unload, or when it is next expected to load after a waiting period. The scheduler makes decisions when machines are due to load, or when they unload. Since the scheduler knows in advance when its computational resources will be in demand, it is in a position to look ahead and predict when its resources will be inadequate to fully compute each required decision.

Using statistics regarding average decision making time, or rule of thumb formulas which can be built into the system, the scheduling system knows how long it will take to make decisions for each machine. If a heavy demand on computational resources will be required at some time in the future, the scheduling system will need to begin making decisions ahead of time. For example, if the decision making process for an average machine is 30 seconds, and 12 machines are due to be unloaded at the same time step, an instantaneous demand of 6 minutes of computation will be required at that time. If this delay is unacceptable, it will be necessary for the scheduling system to begin the decision making calculations 6 minutes in advance. The results are stored in any convenient temporary location, and used when the machines unload as if the calculation had been made at that time.

If scheduler resources are very tight, such as a very large facility using a small computer system for schedule planning, it is possible that the scheduler will not have time to run a complete calculation for every machine each time a decision is to be made. In such instances, more critical machines, such as bottlenecks, long wait machines, and constraint members will have first call on the computational resources. Less critical machines will receive less or no processor resources when a decision is to be made. Instead, simpler decision strategies can be employed, or even a default strategy, such as load in round-robin mode, are employed. As described above, less than optimal decision strategies are not troublesome for non-critical machines. Thus, the limited processor resources are allocated first to the decisions that have the most impact on overall plant operation.

The type of decision making process used can vary for different process steps. Some processes need very little or no decision calculations. An example of such a process would be one that had a single machine to do that process, and that machine did no other processes. The process has only a one lot capacity. In such a situation, no decisions need to be made; when a lot or batch of lots arrives in the queue to that process step, they are simply processed as available.

A machine which operates on two or more processes will sometimes have a decision to make. These decisions and those which will now be described are based on the state of the neighborhood of the machine under consideration only, not on the entire state of the processing facility. A multiprocess machine should attempt to balance the number of lots from each process which are operated on. A simple strategy for this balancing is a round-robin strategy, where the machine processes one lot (assuming a one lot capacity) from each process which has a lot in the queue before processing a second lot for a process. The weighting of the round-robin strategy varies if the machine is subject to contention from different processes. In such case, the selection of the next lot is done on a basis proportional to the percentage of each process which that machie does. Such a simple strategy is adequate for machines which have a low usage factor and relatively short setup times, and are not closely upstream in the process flow from a critical machine. The effect of critical machines on the operation of machines which must make a decision will be explained below.

Multiprocess machines which have sides and/or long setup times have additional considerations. Grouping work on processes on a side can result in better utilization of any given machine. Long setup time machines must balance the inefficiency of switching between processes and incurring the additional setup time penalty with the potential adverse effect on average cycle time caused by having lots wait longer in the queue. As described in the global planning section, cycle time is controlled by the amount of time lots spend waiting in queues, so, on the average, leaving lots in queues will increase cycle time. This consideration will be much less important if a particular machine is a low usage machine, because the short extra time spent waiting in this queue will usually result in a correspondingly shorter time spent waiting in another queue downstream. If the long setup time machine has a fairly high usage factor, however, it can have a significant effect on the average cycle time for the entire facility. Thus, the decision of whether to undergo a setup procedure at any given time becomes much more important, and additional computational resources must be reserved to make decisions for that machine.

Machines which have a large capacity and a long process time are often faced with a similar decision, even if the machine does not operate on multiple processes. For example, a machine may have a capacity of 4 lots and a process time of 20 time steps. When the machine unloads, only 2 lots are in the queue. The decision to be made is whether to load those 2 lots now, or to wait some short period of time until 1 or 2 more lots arrive so that a larger load can be processed. This decision becomes more complex for a multiprocess machine, especially one with sides.

Bottleneck machines control the maximum capacity of the facility as described in the global planning section. Often there is a single bottleneck machine or group of machines which sets the absolute limit on capacity. This machine is often a multiprocess machine. It is important that this machine be kept operating at a very high utilization, or the capacity of the plant will be reduced below its maximum. If lots are waiting in the queues, a simple round robin decision will usually suffice. However, as explained in the global planning section, it is undesirable to have queues build up in front of bottleneck machines. Instead, it is important to have lots available just as they are needed by the bottleneck machine. This means that the bottleneck machine will need to look ahead, and perhaps exercise control over processes upstream from itself. This look ahead planning for bottleneck machines is critical to overall plant operation, and should receive a large share of computational resources if these are limited.

A process which has multiple machines to execute it will require some decision making at load time, but the problems are generally far simpler than some of those just mentioned. It may be common for a multimachine process to utilize multiprocess machines, however, so the considerations just mentioned will come into account. Machines which do not work equally for all of the processes, described above as contention, will make weighted decisions which tend to prefer processes for which they have the most responsibility. Thus, a machine may spend two-thirds of its time on one process, and the remaining third on another.

Broken machines will tend to develop large queues until they are fixed, even if the average usage is low. It is somewhat inefficient for the processes preceding the broken machine to keep feeding lots into the queue if the machines used for those processes could be utilized for other processes. Thus, a broken machine, or perhaps even one which has developed a large queue through natural fluctuations in the flow of material through the facility, can send a negative demand, or lack of demand, signal to the upstream processes. This signal will tend to cause the upstream multiprocess machines to prefer processes which lead elsewhere than to the broken machine. This alleviates somewhat the build up of queues in the facility, with the corresponding increase in average cycle time.

For discussion of the preferred embodiment, four local machine scheduling decision types will be used. These are: round robin, multi-lot machine optimization, bottleneck, and constraint member. Round robin is a simple strategy, and has been discussed. It simply causes the particular machine to evenly rotate its selection of incoming process queues when there is a choice.

Bottleneck strategies are used for machines which have been identified as bottlenecks by their high usage factors. The precise nature of the bottleneck strategy depends on other features of the bottleneck machine, such as whether it has sides or long setup times.

Multi-lot machine optimization strategies are done by machines which are large wait machines. As described above, these are those which have multiple processes and relatively long setup times for process changes, and machines which have multiple lot capacity and long process times, regardless of the number of processes done by that machine. Long setup time machines must decide whether to make another run without changing processes, and whether to wait for more lots to arrive if the machine has a multiple lot capacity. Long process time machines must decide whether to wait for a larger or full load, or to go ahead and process a partial load. Since the process time is relatively long, having lots arrive in the queue soon after a partial load has been started can have an adverse impact on the average cycle time. An example of this decision process is explained in connection with FIG. 8.

The general strategy for a constraint member is to satisfy the requirements of the time constraint. This involves looking at the other processes in the constraint before making a decision. Constraint starters do much of the decision making for the constraint, but individual machines may be multiprocess machines. This means that they will have to juggle the requirements of the constraint with the requirements of other processes. It should be obvious that the requirements of a constraint will take precedence over other work for a particular machine.

The actual decisions to be made by each machine, and the type of decision process which they will use, are of course extremely dependent upon the particular configuration of the manufacturing facility. However, the general problems are quite common, and examples of decision making strategies at work on the local level will now be given with respect to FIGS. 8 through 15.

Figure 9:
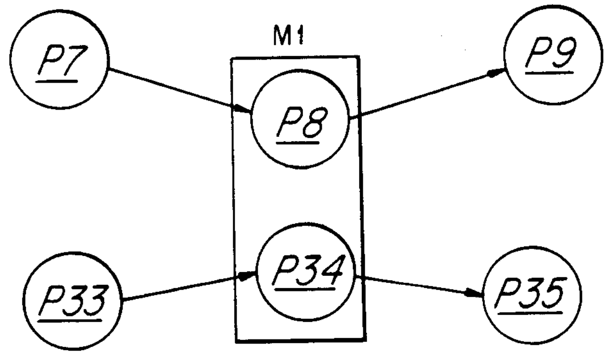
FIG. 9 illustrates a portion of a process flow for a multiple process machine.

FIG. 9 illustrates the operation and decision making of a single machine which operates on two processes. There are no other machines which operate on either process. M1 is assumed to have a capacity of 1 lot. The two processes done by machine M1 are P8 and P34. The preceding processes are P7 and P33, and the following processes are P9 and P35. The processes P8 and P34 must share M1, but their operation is not affected by this.

Whenever lots enter a queue, they are actually placed in the physical queue for a particular machine, in this case M1. However, the process data structure and the low data structure both indicate which process the lot is waiting for. The separation between the physical position and the logical position of the lot, in terms of which logical process it is undergoing, therefor remains clear. Thus, M1 sees that a lot has entered its physical queue, and it is appropriately placed into its logical queue by the information in the lot and process data structures.

Assuming M1 is a low usage machine, and its decision making is not affected by downstream bottleneck or long wait machines, its decision strategy will be a simple round robin strategy. If there are lots in only one process queue, M1 will process the lot with the longest wait time as soon as any work in progress is unloaded from the machine. If there are lots in both process queues, M1 will select the oldest lot from the opposite queue than the previous lot. Thus, selection of the process queues will alternate, with the oldest lots for each process being selected. Processes P8 and P34 will be done equally over the long run. Of course, due to factory dynamics, is is likely that batches of lots will come from P7 and P33 at different times. For a relatively low usage M1, having no setup times associated with changing processes, the simple round robin strategy is adequate.

Figures 10, 11:
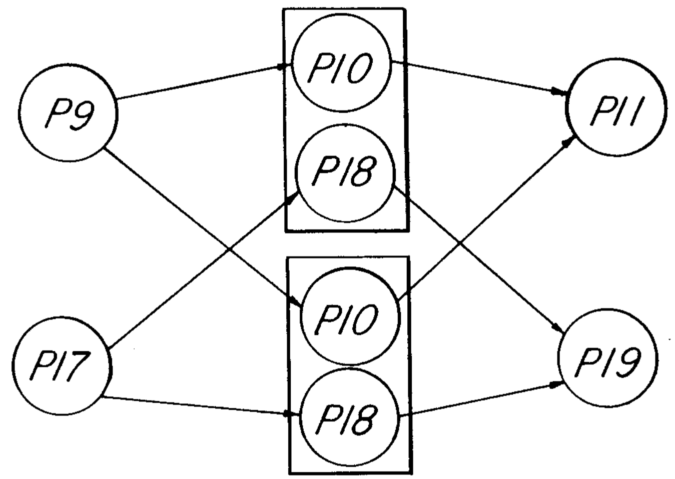
FIG. 10 illustrates a portion of a process flow for multiple process machines operating on multiple machine processes.
FIG. 11 is a timing diagram for the process flow of FIG. 10.

A decision process for two machines doing the same multiple processes is shown in FIG. 10. The machines M1 and M2 are defined as set forth in Table 2, and are identical. M1 and M2 have equal contention for both processes; that is, M1 and M2 are equally responsible for P10 and P18.

TABLE 2

| Machine | Processes | Capacity | Process Time |
|---|---|---|---|
| M1 | P10, P18 | 1 lot | 4 time steps |
| M2 | P10, P18 | 1 lot | 4 time steps |

Any lots in the queue coming from P9 and P17 are equally accessible by either machine. That is, lots in a process queue are not assigned to a machine until that machine loads a lot. M1 and M2 both use a simple round robin strategy, and are initially unloaded. FIG. 11 shows arrival times of lots from P9 and P17, and the number of lots which arrive. These are labelled as arriving in the process queue for processes P10 and P18. FIG. 11 also shows load and unload times for M1 and M2, and which logical process it is undertaking, where L indicates a load, U indicates an unload, and neither indicates processing only. Note that the capacity of P9 is 4 lots, while that of P17 is 2 lots, although either may complete a partial load.

Lots arrive in the queue for P10 at times 1, 8, and 19. Lots arrive in the queue for P18 at times 4, 8, and 18. As shown in FIG. 11, M1 and M2 alternate which process they do if there is a lot available in the alternate queue. If not, such as at time step 6 for M2, the machines will process the oldest available lot in any available queue.

FIG. 12 illustrates a bottleneck machine which does 3 processes. The machine M1 has a capacity of 1 lot and a process time of 1 time step. It is the only machine available to work on any of processes P7, P20, and P40. This machine uses the bottleneck strategy for decision making.

Every lot which is produced by the facility must go through M1 exactly 3 times, assuming no rework loops are involved. Thus, in the long run, it is essential that M1 operate on processes P7, P20, and P40 equally. Otherwise, queues will build up somewhere in the process flow. In this simple case, there are no setup times involved in changing between processes. Since the contention for M1 by each of processes P7, P20 and P40 is equal, a straight round robin approach ensures that equal time is spent working on each process. Since M1 is a bottleneck machine, it will be kept almost constantly busy. Queues will tend to build up in front of M1, and they are handled in the straightforward manner just described.

If M1 is not equally responsible for each of processes P7, P20 and P40, the round robin selection will be modified by the relative responsibility M1 has for the three process. For example, if M1 is soley responsible for P7, and responsible for 50% of P20 and P40, M1 will spend one-half of its time on P7, and one-fourth on each of P20 and P40. If queues exist for all three processes, M1 will typically do 2 lots for P7, followed by one each for P20 and P40.

A more difficult, and perhaps more common, situation for bottleneck machines occurs when there is a setup time incurred when changing from one process to another. Such an example is shown in FIGS. 13 and 14, which depict a bottleneck machine M1 having 100% responsibility for both P20 and P40. Capacity of M1 is 2 lots, and process time exclusive of setup is 10 time steps. As shown in FIG. 14, it takes 20 time steps to setup for process P40 after running P20, and 10 time steps for the reverse setup. If the process done were alternated after every lot, the actual effective process time for P20 would be 10 time steps, and the effective process time for P40 would be 40 time steps. As described for this example in the global section, an optimum strategy is calculated for the number of lots to process before switching processes. As an example, the optimum point for FIG. 13 might be to process 4 loads (8 lots) before changing processes.

With the long setup times involved in this example, there will nearly always be lots waiting in one or both queues. If the setup times were relatively short, this would not necessarily be the case. If, through machine breakages or unusual natural fluctuations, there are many lots waiting in both queues, the decision making process is very simple. M1 simply follows the already determined optimum plan of doing 4 full loads before switching processes. In many cases, however, the queues will be short enough that the queue for the current process will empty before 4 loads are processed. In this case, an example would be a queue which had only 6 lots, with no additional lots expected for 50 time steps.

If global goals dictate that the bottleneck machine must be utilized nearly 100% of the time, it is necessary that the optimum loading scheme be adhered to as closely as possible. Therefore, the bottleneck machine M1 must be able to exercise some degree of control over the processes which feed it. This is done through the use of demand signals generated by M1.

When M1 loads or comes back on line after a repair, a decision must be made about loading. Assuming that 4 loads of P40 have just been completed, M1 will prepare to process 4 loads for P20. At this time, a local prediction, described in more detail below, is made, and the arrival times of lots in the queue for P20 is determined. Assume that the queues for M1 are as shown in Table 3.

TABLE 3

| Process | Queue Length |
|---|---|
| P20 | 5 lots |
| P40 | 2 lots |

Assume further that the local prediction shows that the arrival time for the next lots into the queue for P20 is 45 time steps from now, at which time 4 lots will arrive. It is easily seen that, including set up time, two complete loads will be finished in 30 time steps, and a partial load could be finished within 40 time steps. Waiting for the additional lots to arrive will adversely impact the capacity of the plant. If possible, it is necessary to advance processing of the lots for P20 so that they will arrive by time 30 (from the current time). M1 accomplishes this by sending a demand signal to its upstream process, P19.

This demand signal takes the form of a time by which P19 should load lots, if possible. In the current example, if P19 had a capacity of 4 lots and a process time of 20, it should load at least 3 lots by 10 time steps from now. This number is placed in P19. When P19 next makes a loading decision, it will comply with the demand if it can do so.

The local prediction can then be run again with the demand signal. If P19 is able to supply the necessary lots in time, M1 will process 4 loads for P20 in the optimum manner. If local prediction shows that P19 will not be able to supply the lots in time, M1 must make a decision as to whether to continue processing lots for P40, or process a few lots for P20, and then switch back. The decision is made by calculating the function which states the global goals of the plant. If capacity must be maximized, the decision may be different than if cycle time must be minimized. In the present example, a typical result would be to process one more load for P40, then switch and process 4 loads for P20. Since more lots will be arriving soon for P20, the amount of overall delay will be minimized.

The demand signal sent by M1 will propagate upstream beyond P19 if necessary and possible. For example, whether or not P19 can supply lots to P20 in time may depend on whether P18 makes a certain decision right now. If P18 uses a multiple process machine, its current strategy may be to do other processes for the next few time steps. If P19 cannot satisfy P20 out of its current queue, it will send P18 a demand signal that it needs lots in time to begin processing them within 10 time steps. If P18 can supply the lots in time, it will override its normal strategy and do so. This propagation of demand signal is used when the local prediction is made.

Local prediction is a fairly simple, but extremely powerful, concept. Each machine looks at its short term future, and decides what will happen based on incoming lots and its one decision process. A machine actually runs a simulation based on its current state by asking the immediately preceding processes when it will deliver lots to the current process, and applying its normal decision making processes to that information. When a machine must undertake local optimization, it runs a local simulation to determine what the future will bring.

Local prediction is always done with respect to some definite future time, usually no more than a few tens of time steps away. It simply consists of asking the upstream processes what they will be doing in that time frame, and applying the decision making process to the results. Processes that have machine which are multiprocess machines must look at the future plans of all relavent upstream processes. If the current process is the recipient of a demand signal, or a request or negative-request signal (both described below), and any demands imposed by these signals are not met, they must be passed upstream, and the prediction process repeated.

The local prediction process is preferably done for all machines that need it during a single time step. For any given time step, typically several different machines in the plant will need local predictions made for the local optimization process. Intermediate predictions made for one machine are stored temporarily, as they may be used in the prediction process for other machines.

The local prediction process results in different parts of the facility being predicted to different times, so that different processes "exist" at different times. For example, consider the processes outlined in Table 4.

TABLE 4

| Process | Process Time | Predicted Until |
|---|---|---|
| P13 | 10 | 40 |
| P12 | 5 | 35 |
| P11 | 20 | 25 |
| P10 | 30 | 0 |
| P40 | 20 | 40 |
| P39 | 15 | 25 |
| P38 | 20 | 25 |
| P37 | 5 | 20 |
| P36 | 30 | 0 |

Processes P13 and P40 are to make local optimization decisions during the current time step. P13 is to predict 40 time steps into the future, and P40 is to predict 30 steps. P13 predicts that it will process the 2 lots in its queue by time 10. To determine what will come into P13's queue, it is necessary to determine what P12 will start up until time 35. Any lots started after that time will not arrive in the queue for P13 before 40 time steps from now, and need not be considered.

To determine what will happen at P12 until time 35, a local prediction is run which asks P11 what it will be doing up until time 25. Any lots started in P11 after time 25 will not arrive in the queue for P12 in time to be considered. A local prediction is then made for P11. In order for anything in P10 to effect P11 by time 25, lots must be already be in process in P10. Assuming this not to be the case, nothing that is decided by P10 can have any effect on P11 before time 25. Thus, it is not necessary to make local predictions beyond P11 in order to completely calculate what will happen at the input queue of P13 up to time 40.

However, assume that P38 uses the same machine as P11. P11 must know what will happen to P38 in order to accurately predict the operation of the machine which is common to both processes. Therefore P38 must also be predicted out to time step 25. This involves predicting P37 out to time step 20, and P36 out to time step 0. If P36 is currently empty, it will have no effect on the decisions made by other machines, and can be ignored.

Now a local prediction is made for process P40 out to time 40. P39 must be predicted out to time 25, which means that P38 must be predicted out to time 15. However, P38 has already been predicted out to time 25, so no additional prediction must be made. Rerunning the local prediction for P38 would be redundant, since the previous calculations were saved. The simulator which runs the local predictions recognizes that P38 was previously involved in an optimization process, and how far the prediction has gone, by checking the OPTIMIZING? and CHECKED-UP-TO data items in the relevant process data structures. (FIG. 2)

Processes P13 and P40 can now make their local optimization decisions based on complete knowledge of what will happen to them within the relevant time frames. This knowledge was obtained by looking at the future of the neighborhood only, with the future of the remainder of the facility being a "don't care" as far as P13 and P40 are concerned.

The local prediction process quickly reached a horizon beyond which it was not necessary to make predictions. This is typical of local predictions, which are made for one machine for a short length of time. Of course, the distance, in time, to the horizon varies with the details of the particular situation. In addition, it is not always necessary to carry out a prediction to the limit of the time horizon. Sometimes a prediction only part way out will indicate that the machine doing the local optimization will receive enough lots to complete a full load, or a series of loads as in the bottleneck example described above. Therefor, the preferred method of making local predictions involves making them out to only a time period less than the maximum, checking to see if the necessary lots will be received, then checking for another increment of time, etc. This incremental approach ensures that a great deal of extra checking is not made if it is unnecessary.

Thus, the local prediction process is a recursive procedure, simple in concept, which eventually terminates when the time horizon of the initiating procedure is reached, or another stopping point is indicated. Many types of control can be exercised over placement of the stopping horizon. In addition to time and receipt of needed lots, such stopping points as scheduler processor time, depth of the recursive search, and number of side branches predicted can be used. This allows a partial prediction to be made in those cases where the computational powers of the scheduler do not allow full local predictions to be made. Also, predictions will typically not be made beyond broken machines, bottlenecks, or machines which are members of time constraints.

Figure 8:
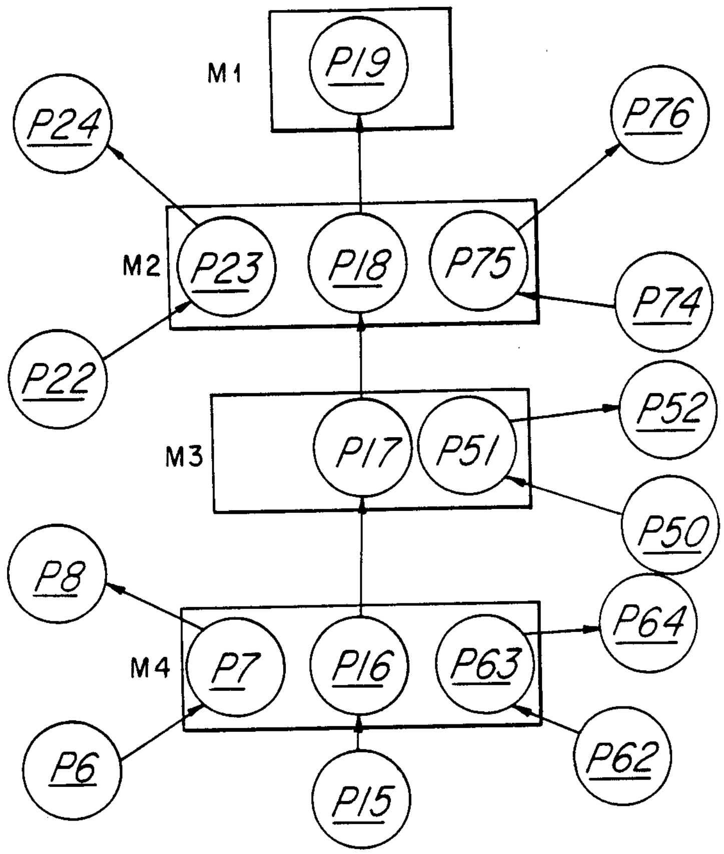
FIG. 8 is an illustration of a portion of a process flow near a large capacity machine.

FIG. 8 illustrates the local prediction process for a multi-lot machine optimization. As described above, such processes have a large impact on the overall cycle time of the facility. For simplicity of description, the long wait process, P19, has only a single machine M1, and M1 does no other processes. The machines shown in FIG. 8 are described in Table 5.

TABLE 5

| Machine | Processes | Process Time | Capacity | Lots in Queue |
|---|---|---|---|---|
| M1 | P19 | 60 time steps | 8 lots | 5 |
| M2 | P18 | 5 | 2 | 1 |
| | P23 | 5 | 2 | 4 |
| | P75 | 5 | 2 | 2 |
| M3 | P17 | 10 | 2 | 2 |
| | P51 | 10 | 2 | 4 |
| M4 | P16 | 15 | 4 | 1 |
| | P7 | 15 | 4 | 6 |
| | P63 | 15 | 4 | 4 |

All machines have just unloaded => no work in process.

As shown in the machine data structure, machines such as M1 are selected to use the multi-lot machine optimization decision strategy. This strategy causes the machine to attempt to minimize a function giving the total lot-hours of lots in the queue for M1. A local simulation is made in the same manner as described above in connection with bottleneck machines. The results of this simulation are used to calculate the total lot-time of lots in the queue for M1. The minimum point for this calculation is the time at which M1 should be loaded.

Under the circumstances shown in Table 5. 5 lots are currently waiting in the queue. Thus, for every time step that M1 delays loading, 5 lot-timesteps are added to the queue waiting function. This tends to cause M1 to load as soon as possible. On the other hand, once M1 starts, any lots that arrive within the next 6 hours must wait in the queue. If M1 starts a partial load now, and additional lots arrive within the next 5 time steps, each of those lots must wait an additional 55 time steps in the queue for M1. This tends to cause M1 to wait for a full load. The preferred loading scheme balances these two competing tendencies to minimize the overall queue wait time.

In FIG. 8, it can be supposed that the expected lot arrival times in the queue of M1 are (for current time=0): 1 lot at time step 10, and 2 lots at step 40. Assume for now that no other lots will arive until at least time step 80. If M1 begins processing 5 lots now, it will unload, and thus be available to receive new lots at time 60. The total queue waiting time is 1 lot*50+2 lots*20=90. If M1 waits until time 10 to run 6 lots, the total queue waiting period is 5 lots*10+2 lots*30=110. Waiting until a full load is ready gives a total queue wait of 5 lots*40+1 lot*30=230. The best selection under this situation is to load a partial load of 5 lots imediately. Different expected arrival times will, of course, yield different results.

A machine using the multi-lot machine optimization decision strategy has the ability to influence upstream processes in a manner similar to the demand signals sent by bottleneck machines. A request signal sent by this machine will cause upstream machines to advance the processing of lots needed for the long wait machine if doing so is convenient. This signal is represented as a loading time for the upstream machines, expressed as an absolute time step value. This value is placed in the data structure for the affected upstream processes.

In the FIG. 8 example, using the machine status shown in Table 5, M1 could place a request signal to M2 to process lots waiting for process 18 first. Assuming there was no conflicting demand from P24 or P76. M2 would load and process the single lot in the P18 queue.

Local prediction for M2 would now indicate that another lot will be made available to M1 in 5 time steps. M1 recalculates its queue wait function, and determines that waiting for 1 more lot gives a total wait time of 5 lots*5+2 lots*25=75. Since this is less than 90, the previous minimum, waiting for M2 to process one more lot is the preferred solution. If, for some reason, M2 could not do process 18 next, the best choice would be to load M1 now. Such a situation could arise if M2 received conflicting demands, such as a demand signal from a bottleneck machine propagating from P76.

It is possible that lots now waiting for P17 could be pushed so that they would arrive at M1 at time 15. However, this would result in a total queue wait time of at least 5 lots*15+1 lot*10=85. Thus, any function which waits for these lots is less desirable than that described in the previous paragraph.

A similar situation arises when a machine which has long setup times for different processes makes a local decision. Long setup times have an effect nearly identical to long process times in that once started, some lots may have to spend a long time in the queue. There is an additional complication, however, in that these machines may have a choice between processing a few lots now and then changing, or changing and letting more lots accumulate in the current queue. However, the minimization function is calculated in the same way. Each machine will decide which process to perform next by determining which choice gives the shortest total queue wait time in order to minimize cycle time. Request signals are sent upstream in the same manner as for slow, high capacity machines.

Another type of control signal sent to upstream processes is a negative request, or lack of demand, signal. This signal is used when a machine is off line for repair or maintenance, and prevents large queues from building up in front of broken machines. Negative request signals also consist of placing a time that lots are needed in the data structure of the next upstream process. In fact, the negative request signal is the same as the normal request signal, except that the time step which is placed in the data structure for the upstream process is later than that for normal requests.

Figure 15:
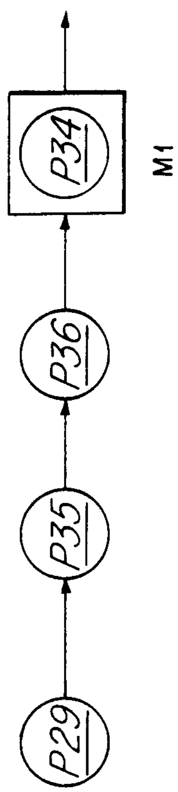
FIG. 15 illustrates a process flow utilizing a negative request signal.

If the machine for a single machine process is down for repair, or all of the machines for a multiple machine process, a negative demand signal is sent to upstream processes. This signal is simply a request that lots be supplied at some time in the future which is great enough to prevent build up of a queue at the broken machine. An example situation is shown in FIG. 15, which shows 3 processes feeding into a broken machine M1, which is the only machine doing process P37. The machines, processes, and current queues are shown in Table 6.

TABLE 6

| Machine/ Process | Process Time | Capacity | Current Queue |
|---|---|---|---|
| M1 (P37) | 5 steps | 1 lot | 4 lots |
| P36 | 6 steps | 1 lot | 2 lots |
| P35 | 4 steps | 1 lot | empty |
| P34 | 8 steps | 1 lot | 2 lot |

Process P36 also has 1 lot in process
M1 is expected to be available in 10 time steps Assuming the current time to be time 0, M1 is expected to be available beginning at time step 10. This information may be entered directly by a repairman or other person, or may be calculated from expected average or past statistical behavior for M1.

The queue for M1 will take 20 times steps to process, so that any lots which arrive in the queue for process P37 will spend time in the queue if they arrive before time step 30. Since M1 is down, process P37 will send a negative request signal to P36 in an attempt to prevent any more lots from adding to the queue. A simple routine is used to place the negative request signal in the data structures for the upstream processes. This procedure simply moves upstream using addition and subtraction to determine when processes need to be started in order to arrive at P37 just as M1 becomes available. The procedure continues until the negative request signal reaches current time (0 in this example), or until a special case arises.

Since a lot is currently in process at P36, this lot must be considered with those already in the queue for P37. Thus, if P36 makes no new starts, M1 will not actually become available to process new lots until time step 35. Since P36 has a process time of 6 steps, it should start a lot by time 29. This value is placed into the data structure for process P36. If the lots now in the queue for P36 can be processed and put into the queue for P37 before the queue for P37 becomes empty, the number of lots in the queue for P36* the process time for P37 is is added to 29, giving 39, and the process time for P36 subtracted, giving 35. This is the time until which P35 is requested to wait before starting a lot. The queue wait time for P36 is 0, so the process time for P34 is subtracted from 35, giving 27 to be placed in the data structure for process P34. This procedure continues until the value propagating upstream reaches 0. For current times other than 0, the signal propagates until it matches the current time.

There are several special situations which cause the negative request signal to cease upstream propagation even before it reaches the current time. One of these occurs when the signal propagates upstream until it reaches a process which uses the same machines as the one that is broken. It makes no sense for the negative request signal to be propagated past its origination point, as another signal will be propagated from that point for the earlier group of processes anyway. The signal is also preferably not propagated upstream behind machines which use the bottleneck decision strategy, or long wait machines, which use the multi-lot machine optimization strategy. These machines have a large impact on the overall plant capacity and cycle time, and it is preferred that a broken machine not affect their normal operations.

The effect of the negative request signal can vary depending on the particular implementation. Preferably, it is simply a request, and does not absolutely control operation of the upstream process. This means that an upstream process would cause the machines in the process to work on other processes if lots are available to do so, but the upstream processes would still continue to process available lots if their machines had nothing else to do. Thus, there is not an enforced idleness of the upstream processes. Another approach is to actually enforce idleness of the upstream processes until the current time catches up with the negative request signal.

Preferably, the negative request signal is only used for situations in which all machines available to a process are down for repair or maintenance. In some manufacturing facilities, it may be desirable to use a negative demand signal in other unusual circumstances. These could include any process which builds up a queue larger than some desired amount, or could be used when a near term plant shutdown is expected, and it is not desirable that certain machines have a queue during shutdown. In the latter case, the negative request will usually be a controlling signal.

The decision making process for a machine in a safe-time constraint is relatively simple. All machines in a constraint will be controlled by the slowest process in the constraint. In order for any process in a constraint to make local predictions witin the constraint, it is necessary only to look to the constraint starter to determine when lots will start. The constrain starter starts lots only at a rate which the slowest member can handle, as set forth in the constraint data structure. Determining the locations of lots after they are started in the constraint is straightfoward. The details of constraints are exteremely domain specific, and certain prediction rules may need to be modified depending on the nature of the problem.

Machines which process multiple lots, including bottleneck and multi-lot machines as described above, will sometimes make a decision to wait and load at a later time. This decision is based on the local prediction made for that machine, which prediction included certain assumptions about the operation and availability of upstream processes. If one of the machines for one of the upstream process should break down, or ciome back on line after a repair, those assumptions may no longer be valid, and the decision should be reconsidered. As an extreme example, if the machine immediately upstream from a machine which is waiting to load should break down, none of the lots for which the multi-lot machine is waiting will arrive as scheduled. The multi-lot machine should therefor undertake anew the local optimization process, including a new local prediction based on the new machine breakage information. If the new decision is to load now, the time which the lots would have spent waiting in the queue has been removed. This process can be referred to as truth maintenance.

Thus, whenever a machine breaks down, any machine which has made a decision to hold loading based on a local prediction which includes the newly broken machine should redo is local optimization. The same holds true for any machine which made a decision based on some machine being down for repair which has now returned to service. The easiest way to handle this case is to, whenever some machine decides to delay loading, place pointers to that machine in the data structures for every machine which was involved in the local prediction leading to that decision. Then, if any of these machines should change status, the scheduler can easily determine which machines should recalculate their local optimization. Note that machines involved in a local optimization wherein the decision is to load immediately need not keep such pointers.

CALENDAR MECHANISM

In order to implement the scheduler system efficiently, it is necessary to have an efficient calendar mechanism. The calendar must provide a place to store information on upcoming events, and to indicate events which are to take place in the current time step.

A calendar suitable for use with the scheduler described above must have several properties which are somewhat conflicting. It must be relatively small and fast for efficiency, since it will be consulted often. It must also be able to store information extending far into the future. For example, two years into the future is probably a minimum for manufacturing processes in order to take into account known preventive maintenance downtime. For time steps of six minutes, this requires a minimum of approximately 175,000 time steps. Also, the calendar must be able to have new events inserted at any time in the future. New events will be generated constantly by current events, such as the loading of a machine generating the future event of the expected unloading time.

A calendar which has separate slots for each time step out to some time in the future would be very large. A calendar mechanism is now presented which is fairly small, fast and flexible.

Figure 16:
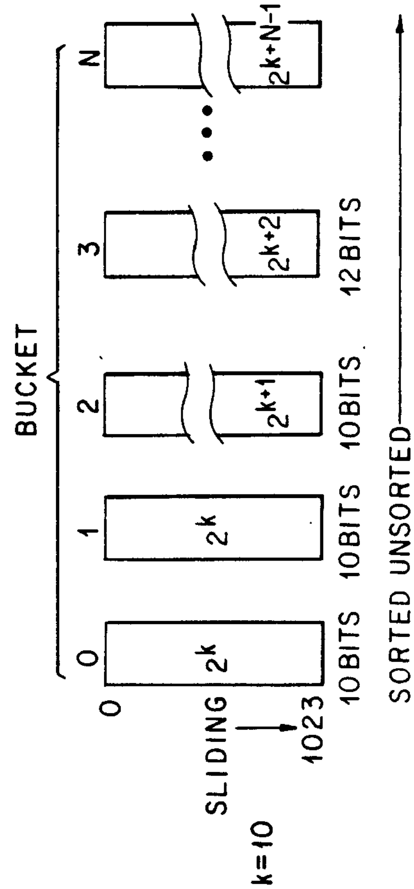
FIG. 16 illustrates a preferred calendar mechanism.

The future is divided into buckets of time steps. The first two buckets cover the same time period, and later buckets are larger. Referring to FIG. 16, buckets 0 through N are shown. The size of the buckets increases by powers of 2, except for the first two (0,1) which are the same size. The size of the buckets may be chosen as desired, and is 1K (1024) time steps in the preferred embodiment for the first two buckets. Bucket 2 is therefor 2K time slots in size, while Buckets 3 through N are each twice the size of the preceeding bucket.

The size of a bucket refers to the number of time steps which are calendared within that bucket. This indicates only the potential number of events which can be contained within the bucket. If no events are currently scheduled for the time span covered by the bucket, the bucket will be empty. When a new event is scheduled, the appropriate bucket is determined, and a notice of the scheduled event is placed into that bucket.

It is seen that one property of dividing future time steps into buckets as described above is that, starting with bucket 2, the number of time steps contained within each bucket is equal to the number of time steps contained within all preceeding buckets. This property will be used to operate the calendar efficiently.

In order to minimize the amount of sorting which takes place, only bucket 0 is sorted. The remaining buckets contain notices of scheduled events in random order. When a new event is scheduled during the time period covered by, for example, bucket 2, the new notice of the event is merely added to the end of the list of events currently held in bucket 2.

Bucket 0 is a sliding bucket, in that it moves to include the current time step plus the next 1023 time steps. Therefor, as time progresses, the time steps at the end of bucket 0 overlap with those of bucket 1. This does not cause any problems. Any newly scheduled events which are within 1023 time steps of the current one are placed into bucket 0 at the appropriate position. Thus, bucket 0 always contains events which are scheduled within the next 1023 time steps, and these events are sorted.

When the current time reaches 1024, which is the beginning of bucket 1, all of the events in Bucket 1 are sorted and merged with bucket 0. Bucket 0 continues to progress with time until step 2047, overlapping with bucket 2 in the same manner as just described. When the current time reaches time step 2048, the contents of bucket 2 are put into buckets 0 and 1. The events associated with the next 1024 time steps are sorted and merged into bucket 0, with those remaining simply put into bucket 1. At this point, the latest time step associated with bucket 1 and with bucket 2 is the same, so that bucket 2 is not used. The calendar is referenced as described above until 2048 more time steps have passed.

At time step 4095, the end of bucket 1 has again been reached. Bucket 0 contains newly calendared events for the next 1024 time steps, as before. Bucket 3 is the next bucket to use, so the contents of bucket 3 are split into 2 groups. Those events which take place during the last half of the time period covered by bucket 3 are placed into bucket 2, and those which occur during the first half are split between buckets 0 and 1, with those going into bucket 0 being sorted and merged with the events currently contained there. The calendar then continues to be referenced as described above.

In general, whenever the time period represented by the end of a particular bucket is reached, the events contained in the next bucket are distributed among the preceeding buckets according to the time span covered by such preceeding buckets. Each bucket covers a time span which is twice that of the preceeding bucket, so that the time span covered by any particular bucket will always exactly span the sum of the time periods of all preceeding buckets.

Only bucket 0 actually orders the scheduled events according to the time step in which they occur. The remaining buckets consist of only a list of those events which occur in the time period covered by that bucket. Thus, large buckets do not necessarily take up more storage space than smaller buckets; the size of a bucket, except for bucket 0, depends only on the number of events scheduled to occur in the relavent time frame. In factory scheduling systems, and most other scheduling situations, most of the currently scheduled events will occur in the near future. For example, many events will occur within the next 20–50 time steps, such as machine loads and unloads, etc. Very few events are scheduled to happen at a specific time a year in advance, and these are typically annual maintenance shutdowns, annual plant shutdowns for vacation, etc. Thus bucket 7, which covers a time span for 65.536 time steps, begins approximately 273 days after the start time of the calendar. Very few events will be scheduled that far in advance, so that bucket 7 will be relatively small.

In order to implement the above described calendar mechanism efficiently in a computer, several preferred data structures are used. All buckets except bucket 0 consist of linked lists of events. Each event has an description identifying what is to occur, a time, and a pointer to the next even in the list. The time is a binary absolute number dating from the beginning of the use of the calendar. If 24 bit numbers are used, 16 million time steps can be calendared, which is equal to approximately 190 years. Larger binary numbers can be used if longer time periods are desired.

When events are assigned to particular buckets, the decision as to which bucket should contain a particular event can be easily made by manipulating the time bits for the event. Initialy, 10 bits are used for buckets 0 and 1. For those events which have time less than 1024, the time indicates the slot within bucket 0 to which that event should be assigned. Bucket 3 will contain events having 12 bit times. When bucket 3 is distributed between buckets 0–2, those events having times with a most significant bit of 1 (the larger numbers) are assigned to the next lower bucket, in this case bucket 2. The next most significant bit is used to determine whether the remaining events are assigned to bucket 0 or 1. Those events assigned to bucket 0 are placed into a time slot according to their 10 least significant bits. Events in all other buckets are simply kept in a linked list.

Distribution of larger buckets is done in the same manner, always using the most significant bit for that bucket to determine whether an event is to be placed in the first preceeding bucket (MSB is 1), or in some earlier bucket (MSB is 0). Note that the MSB used for this decision is actually the MSB of the number representing the size of the bucket. For example, all time periods above 8M will have a MSB of 1 (assuming 24 bit times) but distribition of bits from bucket 3 is always made based on bit 12.

Assignment of newly scheduled events in bucket 0 is equally simple. If a new event is less than 1024 time steps later than the current time, that event is simply placed in bucket 0 at the position indicated by its 10 LSB. This is effectively a modulo 2**10 operation. A current time pointer into bucket 0 constantly circulates through the 1024 positions therein; when the pointer reaches 1023, it goes next to the 0 position in bucket 0.

Since bit manipulation is a very efficient operation on digital computers, the decisions outlined above are done very quickly. It should also be noted that no sorting in the traditional sense is ever done. Events are simply copied from one place to another based on the values of 1 or more bits. Actual times for two events are not actually compared.

Each time slot in bucket 0 is actually a pointer to a list of events which are to occur at that time. This pointer is nil of no events are scheduled for a particular time. The list of events which occur at a particular time is preferably a simple single linked list.

Although a calendar system using powers of 2 has been described, it is easy to use other bases. For example, a calendar can utilize powers of 10, which begins with 10 equal sized buckets, followed by 9 buckets each 10 times as large as the first, etc. Variations on this arrangement will become apparent to those skilled in the art.

MODIFICATIONS AND VARIATIONS

The scheduler described above has been detailed with reference to a scheduling system for a semiconductor front-end manufacturing facility which produces basically one product. However, slight changes allow the scheduler to be used in a wide variety of situations.

If several major product process flows exist in a facility, an additional factor must be taken into consideraton. This is that the relative product mix may vary over time. For example, if three products are normally fabricated in equal amounts, and it is then desired to drop one product completely, the global analysis for the factory will be incorrect. It then becomes necessary to recalculate the global parameters so that the factory can operate most efficiently.

If a change in product balance is relatively permanent, it is desirable to recalculate the entire global description of the facility. If the change is a relatively short fluctuation, such a total recalculation is not necessary. A relatively short fluctuation could be defined as one which is less than the average cycle time for products in the facility, although particular situations may require special consideration. A two day fluctuation, perhaps due to raw material supplies, in a facility having an average cycle time of 3 weeks will not have a large enough impact to justify a complete global recalculation.

However, some efficiency can be gained by recalculating the global parameters for the critical machines; that is, the bottleneck and long queue wait machines. By changing the machine profiles for these machines temporarily, until the fluctuation is over, overall operation of the plant can be kept reasonably effecient. Note that it is simple to effect the changes; the global recalculations can be done as the time and resources become available, and the results can simply be used to change the machine profiles of the affected machines. Those machines will immediately begin operating under the new goals without disrupting the overall flow of products through the plant.

If multiple products are manufactured in a facility, especially if some of them are promised to be available by certain dates, a few minor changes may be made in the local optimization process. Every lot can carry a due date within its data structure, and this date will be given consideration when that lot is involved in a local optimization. Thus, priority will be given to lots having a close due date. Some lots may be special rush jobs, and have a very close due date. These will generally be moved through the system very quickly. However, it is important to note that the general system is unchanged; due dates on certain lots is simply another factor to be considered by the local decision making process during local optimization.

The principles described for the scheduler can also be easily adapted to design a simulator for a factory system. The simulator simply uses the calendar to step through times steps. For each time step, the status of any machines, lots or process which changes is updated. When the simulator indicates that a local decision is to be made, the same decision as described above is made, using the status of the neighborhood as held in the simulator instead of in the actual factor floor. Since a simulacrum of the factory is inherently contained within the scheduler, it is only necessary for the simulator to ba able to access that information, and update it. The simulator primarily consists of display and operator interaction tools, and random number generators to determine occurances of machine breakages and repairs. The random numbers are modified by the MTBF and MTTR numbers for each machine.

A system for scheduling a semiconductor front end has been implemented consistent with the above description. It is written in CommonLISP, and runs on an EXPLORER symbolic computer from Texas Instruments. A detailed simulation of a complete front end has been run, and the scheduler has proven capable of scheduling the factory at a speed greater than 1000 times faster than real time. This allows an entire month of scheduling, and simulation of plant operation, to be run in less than one hour.

Attached as an Appendix, and incorporated by reference hereto, is a listing of LISP code which implements the scheduler (Appendix A), simulator (Appendix B) and user interfaces (Appendix C).

TECHNICAL ADVANTAGES

The improved scheduler allows scheduling decisions to be made in real time, or faster. The important parts of the problems are highlighted in the global analysis. The global goals of the facility are abstracted into a set of information, the machine profile, which allows local decision to be made which are consistant with and support the global strategies which are desired. Local decisions can be made accurately through the use of local prediction, which allows each machine to make loading decisions based on the short term future events in its neighborhood as well as the global goals. Since the scheduler and simulator are relatively fast, changes in strategy can be modelled to determine their probable effect on overall plant operation. The scheduling system is very flexible, and can easily be adapted to most classes of automated scheduling, including manufacturing, shipping, and other fields which require planning of future events.

The embodiment described above illustrates the invention, but it will be appreciated that modifications, variations and substitutions will become apparent to those skilled in the art. The above description does not define the limits of the invention, which has a scope defined by the claims.

APPENDIX A

```
RRRRRRRRRR   66666666666666666666666666666666666666666666666666666666666666666666666666666666666666666666666666
RRRRRRRRRR   666666666666666666666666  THIS INFORMATION IS THE PROPERTY OF TEXAS INSTRUMENTS  666666666666666666666666   RRRRRRRRRR
RRRRRRRRRR   66666666666666666666666666666666666666666666666666666666666666666666666666666666666666666666666666   RRRRRRRRRR
                                                                                                                      RRRRRRRRRR

                                   RRRR    OOO     AAA    RRRR    K   K
                                   R   R  O   O   A   A   R   R   K  K
                                   R   R  O   O   A   A   R   R   K K
                                   RRRR   O   O   A   A   RRRR    KKK
                                   R R    O   O   AAAAA   R R     K K
                                   R  R   O   O   A   A   R  R    K  K
                                   R   R   OOO    A   A   R   R   K   K

DDDDDDDD    EEEEEEEEEE  FFFFFFFFFF    SSSSSSSS  YY      YY    SSSSSSSS  TTTTTTTTTT  EEEEEEEEEE  MM      MM
DDDDDDDD    EEEEEEEEEE  FFFFFFFFFF    SSSSSSSS  YY      YY    SSSSSSSS  TTTTTTTTTT  EEEEEEEEEE  MM      MM
DD      DD  EE          FF          SS          YY      YY  SS              TT      EE          MMMM  MMMM
DD      DD  EE          FF          SS          YY      YY  SS              TT      EE          MMMM  MMMM
DD      DD  EE          FF          SS            YY  YY    SS              TT      EE          MM  MM  MM
DD      DD  EE          FF          SS            YY  YY    SS              TT      EE          MM  MM  MM
DD      DD  EEEEEEEE    FFFFFFFF      SSSSSS        YY        SSSSSS        TT      EEEEEEEE    MM      MM
DD      DD  EEEEEEEE    FFFFFFFF      SSSSSS        YY        SSSSSS        TT      EEEEEEEE    MM      MM
DD      DD  EE          FF                  SS      YY              SS      TT      EE          MM      MM
DD      DD  EE          FF                  SS      YY              SS      TT      EE          MM      MM
DD      DD  EE          FF                  SS      YY              SS      TT      EE          MM      MM
DD      DD  EE          FF                  SS      YY              SS      TT      EE          MM      MM
DDDDDDDD    EEEEEEEEEE  FF          SSSSSSSS        YY      SSSSSSSS        TT      EEEEEEEEEE  MM      MM
DDDDDDDD    EEEEEEEEEE  FF          SSSSSSSS        YY      SSSSSSSS        TT      EEEEEEEEEE  MM      MM

                        LL            IIIIII      SSSSSSSS  PPPPPPPP          ;;;;        11
                        LL            IIIIII      SSSSSSSS  PPPPPPPP          ;;;;        11
                        LL              II      SS          PP      PP        ;;;;      1111
                        LL              II      SS          PP      PP        ;;;;      1111
                        LL              II      SS          PP      PP                    11
                        LL              II      SS          PP      PP                    11
                        LL              II        SSSSSS    PPPPPPPP          ;;;;        11
                        LL              II        SSSSSS    PPPPPPPP          ;;;;        11
                        LL              II              SS  PP                ;;;;        11
                        LL              II              SS  PP                ;;;;        11
                ....    LL              II              SS  PP                  ;;        11
                ....    LL              II              SS  PP                  ;;        11
                ....    LLLLLLLLLL    IIIIII    SSSSSSSS    PP                ;;        111111
                ....    LLLLLLLLLL    IIIIII    SSSSSSSS    PP                ;;        111111
```

File $3$DUA27:[ROARK.JUL]DEFSYSTEM.LISP;1 (26723,55,0), last revised on 15-JUL-1986 13:54, is a 8 block sequential file owned by UIC [IIIS,ROARK]. The records are variable length with implied (CR) carriage control. The longest record is 130 bytes.

Job DEFSYSTEM (2017) queued to NB_TALARIS on 15-JUL-1986 14:23 by user ROARK, UIC [IIIS,ROARK], under account KBS at priority 100, started on printer LCB0 on 15-JUL-1986 14:23 from queue NB_TALARIS.

```
RRRRRRRRRR   66666666666666666666666666666666666666666666666666666666666666666666666666666666666666666666666666
RRRRRRRRRR   666666666666666666666666  Digital Equipment Corporation - VAX/VMS Version V4.4  666666666666666666666666   RRRRRRRRRR
RRRRRRRRRR   66666666666666666666666666666666666666666666666666666666666666666666666666666666666666666666666666   RRRRRRRRRR
                                                                                                                      RRRRRRRRRR
```

```
;1; -*- Package: USER; Mode: COMMON-LISP; Base: 10.; Fonts: MEDFNT,HL12B -*-*

(package-declare DMOS global 1000.)

(defsystem SIMULATOR
  (:name "factory simulator")
  (:pathname-default 1"lm:jul86-dmos;"*)
  (:module basic-declarations ("vars-static" "vars-dynamic" "vars-global"))
  (:module declarations ("process-structures" "2common-editor*-structures"
                         "2dmos-flow-*menu-stuff" "2dmos-flow-editor*-structures"
                         "2mtbf-*menu-stuff" "2mtbf*-editor-structures"))
  ;1; use "no-garbage-access-functions" for garbage-free version, otherwise "garbage-access-functions".*
  (:module access-functions "garbage-access-functions")
  (:module basics ("basic-functions" "utilities" "editor-utilities" "user-editor-functions"
                   "when-expected-utilities" "track-stuff"))
  (:module reader ("2text-file-*reader" "2mtbf-*reader"))
  (:module window ("flow-window" "2process-blips"* "2scroll-stuff"* "2option-pane*"))
  (:module calculators ("contention" "when-expected" "enter-usage-stuff"
                        "double-machines" "max-l-opt" "module-stuff"))
  (:module file-stuff "filestuff")
  (:module movers ("buffer" "post" "handlers" "load-functions"))
  (:module execute ("timed-instruction-execute" "machine-instruction-execute"))
  (:module initialize ("initialize" "init-menu" "make-machine-types" "process-init" "constraint-stuff"))
  (:module main ("scheduler" "main"))
  (:module io ("sch-io" "user-io" "read-and-write"))
  (:module interface ("lisa-choice2"* "tv-changes2"* "globals2"* "gwin-additions2"* "fv-bars-vars" "2dme-*utilities2"*
                      "data-item2"* "machine-group2"* "link2"* "pfd-panes2"* "pfd-flavor2"* "misc-commands2"*
                      "move-commands2"* "status-commands2"* "utility-commands2"* "windowing-commands2"*
                      "utility-methods2"*))
  (:module bar-charts ( "fv-bars-menu" "fv-bars-utilities" "fv-bars-addons2"*
                       "fv-bars-graph-info" "fv-bars-final" "new-break2"*))


  (:compile-load basic-declarations)
  (:compile-load declarations (:fasload basic-declarations))
  (:compile-load access-functions (:fasload basic-declarations declarations))
  (:compile-load basics (:fasload basic-declarations declarations access-functions))
  (:compile-load reader (:fasload basic-declarations declarations access-functions))
  (:compile-load window (:fasload basic-declarations declarations access-functions))
  (:compile-load calculators (:fasload basic-declarations declarations access-functions))
  (:compile-load file-stuff (:fasload basic-declarations declarations access-functions))
  (:compile-load movers (:fasload basic-declarations declarations access-functions))
  (:compile-load execute (:fasload basic-declarations declarations access-functions))
  (:compile-load initialize (:fasload basic-declarations declarations access-functions))
  (:compile-load main (:fasload basic-declarations declarations access-functions))
  (:compile-load io (:fasload basic-declarations declarations access-functions))
  (:compile-load interface (:fasload basic-declarations declarations access-functions))
  (:compile-load bar-charts (:fasload basic-declarations declarations access-functions)))
```

```
(deff si:*append #'append)

(defun LOAD-SIM ()
  (make-system 'SIMULATOR :compile :noconfirm)
  (format t "2~3%    (fe-go) to run simulator, (sim-dmos) to restart it"*))

(defun build-SIM ()
  (make-system 'SIMULATOR :RECOMPILE :BATCH)
  (format t "2~3%    (fe-go) to run simulator, (sim-dmos) to restart it"*))
```

```
0000000000   222222222222222222222222222222222222222222222222222222222222222222222222222222222222222222222222   0000000000
0000000000   22222222222222222222222  THIS INFORMATION IS THE PROPERTY OF TEXAS INSTRUMENTS  22222222222222222222222   0000000000
0000000000   222222222222222222222222222222222222222222222222222222222222222222222222222222222222222222222222   0000000000

                              RRRR     000     AAA    RRRR    K   K
                              R   R   0   0   A   A   R   R   K  K
                              R   R   0   0   A   A   R   R   K K
                              RRRR    0   0   A   A   RRRR    KKK
                              R R     0   0   AAAAA   R R     K K
                              R  R    0   0   A   A   R  R    K  K
                              R   R    000    A   A   R   R   K   K

   SSSSSSSS    CCCCCCCC  HH      HH  EEEEEEEEEE  DDDDDDDD    UU      UU  LL          EEEEEEEEEE  RRRRRRRR
   SSSSSSSS    CCCCCCCC  HH      HH  EEEEEEEEEE  DDDDDDDD    UU      UU  LL          EEEEEEEEEE  RRRRRRRR
 SS          CC          HH      HH  EE          DD      DD  UU      UU  LL          EE          RR      RR
 SS          CC          HH      HH  EE          DD      DD  UU      UU  LL          EE          RR      RR
 SS          CC          HH      HH  EE          DD      DD  UU      UU  LL          EE          RR      RR
 SS          CC          HH      HH  EE          DD      DD  UU      UU  LL          EE          RR      RR
   SSSSSS    CC          HHHHHHHHHH  EEEEEEEE    DD      DD  UU      UU  LL          EEEEEEEE    RRRRRRRR
   SSSSSS    CC          HHHHHHHHHH  EEEEEEEE    DD      DD  UU      UU  LL          EEEEEEEE    RRRRRRRR
         SS  CC          HH      HH  EE          DD      DD  UU      UU  LL          EE          RR  RR
         SS  CC          HH      HH  EE          DD      DD  UU      UU  LL          EE          RR  RR
         SS  CC          HH      HH  EE          DD      DD  UU      UU  LL          EE          RR    RR
         SS  CC          HH      HH  EE          DD      DD  UU      UU  LL          EE          RR    RR
 SSSSSSSS      CCCCCCCC  HH      HH  EEEEEEEEEE  DDDDDDDD    UUUUUUUUUU  LLLLLLLLLL  EEEEEEEEEE  RR      RR
 SSSSSSSS      CCCCCCCC  HH      HH  EEEEEEEEEE  DDDDDDDD    UUUUUUUUUU  LLLLLLLLLL  EEEEEEEEEE  RR      RR

                 LL            IIIIII      SSSSSSSS  PPPPPPPP      ;;;;      11
                 LL            IIIIII      SSSSSSSS  PPPPPPPP      ;;;;      11
                 LL              II      SS          PP      PP    ;;;;    1111
                 LL              II      SS          PP      PP    ;;;;    1111
                 LL              II      SS          PP      PP              11
                 LL              II      SS          PP      PP              11
                 LL              II        SSSSSS    PPPPPPPP      ;;;;      11
                 LL              II        SSSSSS    PPPPPPPP      ;;;;      11
                 LL              II              SS  PP            ;;;;      11
                 LL              II              SS  PP            ;;;;      11
           ....  LL              II              SS  PP              ;;      11
           ....  LL              II              SS  PP              ;;      11
           ....  LLLLLLLLLL    IIIIII    SSSSSSSS    PP            ;;      111111
           ....  LLLLLLLLLL    IIIIII    SSSSSSSS    PP            ;;      111111
```

File $3$DUA27:[ROARK.JUL]SCHEDULER.LISP;1 (28740,16,0), last revised on 16-JUL-1986 14:43, is a 32 block sequential file owned by UIC [IIIS,ROARK]. The records are variable length with implied (CR) carriage control. The longest record is 119 bytes.

Job SCHEDULER (221) queued to NB_TALARIS_1 on 16-JUL-1986 17:60 by user ROARK, UIC [IIIS,ROARK], under account KBS at priority 100, started on printer LCA0 on 16-JUL-1986 17:60 from queue NB_TALARIS_1.

```
0000000000   222222222222222222222222222222222222222222222222222222222222222222222222222222222222222222222222   0000000000
0000000000   22222222222222222222222  Digital Equipment Corporation - VAX/VMS Version V4.4  22222222222222222222222   0000000000
0000000000   222222222222222222222222222222222222222222222222222222222222222222222222222222222222222222222222   0000000000
```

```
;1; -*- Package: DMOS; Mode: COMMON-LISP; Base: 10.; Fonts: MEDFNT,HL12B,HL12BI -*-*

;1; 12/10/85*

;1; This is where all the actual top-level scheduling stuff goes -- not much in it now.*

;1; To send whatever instructions are to be done on the first process only.*
(defun SEND-INITIAL-INSTRUCTIONS ()
  (setq *lots-in-plant* 0)
  (dolist (machine *machines*)
    (selectq (m-scheduling-type machine)
      (constraint-member
       ;1; Prioritize the constraint operation that the machine does.*
       (dolist (operation (m-operations machine))
         (when (op-constraint-member operation)
           (buffer 'load-lots machine 'round-robin operation t)
           (return))))
      (otherwise (buffer 'load-lots machine 'round-robin nil t)))))


(defun SCHEDULE ()
  (if *load-debugging* (format t 2"~3% *SCHEDULE*~%"*))
  (let ((rem (remainder *current-time* *feed-rate*)))
    ;1; Zero the *feed-counter* at start of feed rate cycle*
    (if (zerop rem)
        (setq *feed-counter* 0))
    ;1; If you've done (car (nth *feed-counter* *feed-list*)) steps since beginning of feed-rate cycle,*
    ;1; load specified number of lots.*
    (when (and (< *feed-counter* (length *feed-list*))
               (eq rem (car (nth *feed-counter* *feed-list*))))
      (add-lots *feed-counter*)
      (setq *feed-counter* (1+ *feed-counter*))))
;1; [[No maintenance yet. 4/2/86*
;  ;1; Check all machines that have just become available (i.e., been fixed, been maintained, or unloaded).*
;  (dolist (machine *machines-to-check*)
;    (schedule-check-for-maintain machine))
  ;1; Check all machines that have just become available (i.e., been fixed, been*
  ;1; maintained, or unloaded),* 1or that do operationses that have just had*
  ;1; something added to their queues.*
;  (format t "2~2% *machines-to-check2 ~A"* *machines-to-check*)
  (local-optimize))


;1; Temporary*
(defun user:trace-optimization ()
  ;1 *(user:t-trace)
  (trace ((machine-when-expected
          ;1 *check-to-bound
                                        ;1 *operation-when-expected unload
                                        ; add-to-queue queue-to-expected-input
          WHEN-EXPECTED-LOAD-MACHINES  WHEN-EXPECTED-CHECK-LOCAL-OPTIMIZE-LOAD
          total-weighted-delay
          find-good-sides find-good-operations
```

```
                                        n-make-possible-lot-list
                                        ;      operation-least-real-load-time
                                        ; set-operation-bound set-machine-bound
                                        ; check-machine-state check-operation-state
                                        ;1 *PRELIMINARY-W-E-CHECK  operation-simple-load-check-time
                                        ;   take-some-lots
                                        make-load-pairs
          estimate-wait-time
          check-local-optimize-load
          make-wex-list l-opt check-side-wait) :break t))
  (trace  estimate-wait-time buffer))

(defun user:untrace-optimization ()

  (user:un-t-trace)
  (untrace machine-when-expected
          operation-when-expected unload PRELIMINARY-W-E-CHECK set-operation-bound
          WHEN-EXPECTED-LOAD-MACHINES  WHEN-EXPECTED-CHECK-LOCAL-OPTIMIZE-LOAD
           find-good-sides find-good-operations
          total-weighted-delay
          n-make-possible-lot-list
          check-to-bound
          take-some-lots estimate-wait-time
          operation-least-real-load-time
          set-operation-bound set-machine-bound
          queue-to-expected-input
          make-load-pairs
          check-machine-state check-operation-state
          operation-simple-load-check-time add-to-queue
          check-local-optimize-load make-wex-list l-opt check-side-wait buffer))


(deff user:unt-opt #'user:untrace-optimization)


(defun LOCAL-OPTIMIZE ()
  (setq *optimizing* t)
  (let  ((machines-to-optimize))
    (dolist (machine *machines-to-check*)
      (when (eq (m-status machine) 'free)
        (selectq (m-scheduling-type machine)
          ;1; Constraint members are initialized with a prioritized round-robin strategy, and*
          ;1; Round robin machines also just keep the original RPT instruction.*
          ('local-optimize (push machine machines-to-optimize))
          ;1;  [[Would have a problem here, if bottleneck machines conflict with*
          ;1;  local-optimize machines, or with other bottleneck machines --*
          ;1;  both would try to load the* 1same lots.  Need to make the loading*
          ;1;  of* 1bottleneck machines part* 1of the whole scheduling operation.*
          ;1;  4/9/86*
          ('bottleneck (load-bottleneck-machine machine t)))))
    ;1; Temporary*
;    (if machines-to-optimize (format t "2~2% optimize:  ~A"* machines-to-optimize))
    ;1; Check all machines that have an 'optimize instruction, too.*
```

```
    (let* ((time (remainder *current-time* *array-length*))
           (timed-optimize-machines (aref *optimize-array* time)))
      (unwind-protect
          (dolist (machine (ad-append timed-optimize-machines machines-to-optimize))
            ;1; [[Need to fix this (at a minimum) to look at machines in an order determined by contention.  4/9/86*
;           (format t "2~% Machine ~A, time ~D, waiting-time ~A, status ~A"*
;                   machine
;                   *current-time*
;                   (m-waiting-time machine)
;                   (m-status machine))
            (if (and machine
                     (<= (m-waiting-time machine) *current-time*)
                     (eq (m-status machine) 'free))
                (local-optimize-machine machine)))
;       (break "2local-optimize"*)
        ;1; Restore everything to original state.*
        (setq *optimizing* nil)
        (dolist (machine *machines*)
          (when (m-optimizing? machine)
            (setf (m-optimize-time machine) nil)
            (restore-machine machine)))
        (dolist (operation *operations*)
          (if (op-optimizing? operation)
              (restore-operation operation)))
        (dolist (constraint *safe-time-const   nts*)
          (if (stc-optimizing? constraint)
              (restore-constraint constrai

        (aset (g-null-out timed-optimize-machines) *optimize-array* time)))))

;1; Add members of <a> that aren't already in <b>.*
(defun AD-APPEND (a b &aux (c b))
  (dolist (item a c)
    (setq c (adjoin item c))))


(defun LOCAL-OPTIMIZE-MACHINE (machine)
;  (format t "2~3% Starting: ~A"* machine)
;  (if  (memq (m-number machine) '(86)) (user:trace-optimization))
  (setf (m-optimize-time machine) *current-time*)
  (machine-when-expected machine)
  (check-local-optimize-load machine)
;  (if (memq (m-number machine) '(186*)) (user:untrace-optimization))
  )


;1; Effect of this will be: If a 'local-optimize type machine has never been*
;1; checked, or if has not been checked since it was last loaded, it will be*
;1; checked as soon as it is unloaded or something is added to its queue.  When*
;1; it is checked, it will either be loaded immediately, or an instruction will be*
;1; posted to check it again later, and it won't be checked until the time specified*
;1; by the instruction.*
```

```
(defun CHECK-LOCAL-OPTIMIZE-LOAD (machine &optional (time *current-time*))
  (if (and *keeping-machine-history*) ; (memq (m-number machine) '(107 108 109 110 45 46 92 93)))
      (setf (m-history machine) (cons (list ' CHECK-LOCAL-OPTIMIZE-LOAD *current-time*)
                                      (m-history machine))))
  ;1; Recursive when-expected may have (will have?) already taken care of this machine.*
;  (format t "2~% *last-unloaded-at ~A, machine2 ~A,* time2 ~A"* (m-last-unloaded-at machine) machine time)
  (unless () (m-last-unloaded-at machine) time)
    (let ((load-list (l-opt machine time)))
      (setf (m-optimize-time machine) nil) ;1 No longer optimizing this machine.*
      (cond ((listp load-list)
             (buffer 'load-lots machine 'at load-list time nil)
             (incremental-load-lots load-list machine))
            ;1; L-opt has decided not to load now.*
            ((numberp load-list)
             (let ((check-time (+ time load-list)))
               (post-timed-instruction check-time 'optimize machine)
               (setf (m-waiting-time machine) check-time)))))))


(defun user:t-trace ()
  (trace
    ((local-optimize-machine machine-when-expected
                             check-local-optimize-load incremental-load-lots) :break t) )
  (trace
    save-operation-state-to save-machine-state-to
    restore-operation-state-from restore-machine-state-from
    INITIALIZE-OPERATION-FOR-OPTIMIZATION
    INITIALIZE-machine-FOR-OPTIMIZATION
    restore-operation
    restore-machine))

(defun user:un-t-trace ()
  (untrace local-optimize-machine machine-when-expected
           check-local-optimize-load incremental-load-lots
           save-operation-state-to save-machine-state-to
           restore-operation-state-from restore-machine-state-from
           INITIALIZE-OPERATION-FOR-OPTIMIZATION
           INITIALIZE-machine-FOR-OPTIMIZATION
           restore-operation
           restore-machine))

;1; Add lots to the operation, as determined by counter and *feed-list*.*
(defun ADD-LOTS (counter)
  (let ((number-of-lots (cdr (nth counter *feed-list*))))
    (buffer 'create number-of-lots)
    (setq *lots-in-plant* (+ *lots-in-plant* number-of-lots))))


;(defun LOAD-BOTTLENECK-MACHINE (machine buffer-key &optional (time *current-time*))
;  (load-from-longest-side machine buffer-key time))

(defun LOAD-BOTTLENECK-MACHINE (machine buffer-key &optional (time *current-time*))
  (load-last-side machine buffer-key time))
```

```
(defun LOAD-LAST-SIDE (machine buffer-key &optional (time *current-time*))
  (let* ((sides (m-sides machine))
         (old-operation (dolist (pair (m-doing machine))          ;1 AN OPERATION that was being done before.*
                          (if (not (g-null (cdr pair))) (return (car pair)))))
         (excluded-operation (if (and old-operation
                                      (> (m-lots-done-on-operation machine) 4))
                                 old-operation)))
    (if old-operation
        (if sides
            (let* ((old-side (dolist (side sides)  ;1 The side that was being done before.*
                               (if (memq old-operation (side-operations side)) (return side))))
                   (number-of-preferred-lots (lots-on-side old-side time excluded-operation))
                   (excluded-side (if (> (m-lots-done-on-side machine)
                                         (min 16 (* 4 (length (side-operations old-side)))))
                                      old-side)))
              (cond ((and (>= number-of-preferred-lots (operation-lot-capacity old-operation))
                          (not excluded-side))
                     (let ((load-list (operation-list-for-side old-side time excluded-operation)))
                       (if buffer-key (buffer 'load-lots machine 'at load-list time))
                       (incremental-load-lots load-list machine time)))
                    ((and excluded-side excluded-operation)
                     (or (load-from-longest-side machine buffer-key time excluded-side excluded-operation)
                         (load-from-longest-side machine buffer-key time excluded-side)
                         (load-from-longest-side machine buffer-key time)))
                    (excluded-side
                     (or (load-from-longest-side machine buffer-key time excluded-side)
                         (load-from-longest-side machine buffer-key time)))
                    (excluded-operation
                     (or (load-from-longest-side machine buffer-key time nil excluded-operation)
                         (load-from-longest-side machine buffer-key time)))
                    (t
                     (load-from-longest-side machine buffer-key time))))
          (let ((number-of-preferred-lots (number-of-lots-on-queue old-operation time)))
            (if (and (>= number-of-preferred-lots (operation-lot-capacity old-operation))
                     (not excluded-operation))
                (let ((load-list (list (cons old-operation (operation-lot-capacity old-operation)))))
                  (if buffer-key (buffer 'load-lots machine 'at load-list time))
                  (incremental-load-lots load-list machine time))
                (or (load-from-longest-side machine buffer-key time nil excluded-operation)
                    (load-from-longest-side machine buffer-key time)))))
        (load-from-longest-side machine buffer-key time))))

;1; Load machine with the side (if it's a double machine) or operation that has the greatest number of lots waiting.*
;1; Except don't load any lots for <excluded-operation>*
(defun LOAD-FROM-LONGEST-SIDE (machine buffer-key
                               &optional (time *current-time*) excluded-side excluded-operation)
  (check-machine-state machine)
  (let ((load-list (if (m-sides machine)
                       (longest-side-operation-list machine time excluded-side excluded-operation)
                       (let ((best-operatio (longest-queue-operation machine time excluded-operation)))
                         (if best-operatic
```

```
                             (list (cons best-operation (operation-lot-capacity best-operation)))))))
    (when load-list
      (if buffer-key (buffer 'load-lots machine 'at load-list time))
      (incremental-load-lots load-list machine time)
      t)))


(defun user:trace-ls ()
  (trace (( LOTS-ON-SIDE  LOAD-FROM-LONGEST-SIDE  LONGEST-SIDE-OPERATION-LIST) :break t)))


(defun user:untrace-ls ()
  (untrace LOTS-ON-SIDE  LOAD-FROM-LONGEST-SIDE  LONGEST-SIDE-OPERATION-LIST))


;1; The operation with the greatest number of lots waiting (but nil if no operation*
;1; has enough).*
(defun LONGEST-QUEUE-OPERATION (machine time &optional excluded-operation)
  (let* ((operations (m-operations machine))
         (best-operation (car operations))
         (length 0)
         (enough-lots nil))
    (dolist (operation operations (if enough-lots best-operation))
      (check-operation-state operation time)
      (unless (and excluded-operation (eq operation excluded-operation))
        (let* ((new-length (number-of-lots-on-queue operation time)))
          (when (> new-length length)
            (setq length new-length
                  best-operation operation))
          (or enough-lots
              (if (>= new-length (operation-lot-capacity operation))
                  (setq enough-lots t))))))))


;1; Returns nil, or a load-list for the longest side of <machine> at <time>.*
(defun LONGEST-SIDE-OPERATION-LIST (machine time &optional excluded-side excluded-operation)
  (let* ((sides (m-sides machine))
         (best-side (car sides))
         (length 0)
         (enough-lots nil))
    ;1; Choose the best side.*
    (dolist (side sides)
      (unless (and excluded-side (eq side excluded-side))
        (let ((operations (side-operations side)))
          ;1; Update state, if necessary.*
          (dolist (operation operations)
            (check-operation-state operation time))
          (let* ((new-length (lots-on-side side time excluded-operation)))
            (when (> new-length length)
              (setq length new-length
                    best-side side))
            (or enough-lots
```

```
            (if (>= new-length (operation-lot-capacity (car operations)))
                (setq enough-lots t)))))))
    (if enough-lots                         ;1 Are there enough lots on the best side?*
        (operation-list-for-side best-side time excluded-operation))))


(defun OPERATION-LIST-FOR-SIDE (side time &optional excluded-operation)
  (let* ((operations (side-operations side))
         (best-operation (car operations))
         (length 0))
    (dolist (operation operations)                 ;1 Choose the best operation on <operations  *
      (unless (and excluded-operation (eq operation excluded-operation))
        (let ((new-length (number-of-lots-on-queue operation time)))
          (when (> new-length length)
            (setq length new-length
                  best-operation operation)))))
    (let ((number-of-lots (operation-lot-capacity best-operation)))
      (if (>= length number-of-lots)
          ;1; If best-operation has enough lots, simple.*
          (list (cons best-operation number-of-lots))
          ;1; Else add other operations and their lots until there are enough.*
          (let ((load-list (list (cons best-operation length)))
                (lots-left (- number-of-lots length)))
            (dolist (operation operations)
              (unless (or (eq operation best-operation)
                          (and excluded-operation (eq operation excluded-operation)))
                (let ((num (min (number-of-lots-on-queue operation time) lots-left)))
                  (unless (zerop num)
                    (setq load-list (cons (cons operation num) load-list)
                          lots-left (- lots-left num))
                    (if (zerop lots-left) (return load-list))))))))))


;1; Total number of lots waiting for operations of <side> at <time>.*
(defun LOTS-ON-SIDE (side time &optional excluded-operation &aux (count 0))
  (dolist (operation (side-operations side) count)
    (unless (and excluded-operation (eq operation excluded-operation))
      (setq count (+ (number-of-lots-on-queue operation time) count)))))
```

```
EEEEEEEEEE   9999999999999999999999999999999999999999999999999999999999999999999999999999999999999999999999999999   EEEEEEEEEE
EEEEEEEEEE   99999999999999999999999  THIS INFORMATION IS THE PROPERTY OF TEXAS INSTRUMENTS  99999999999999999999999   EEEEEEEEEE
EEEEEEEEEE   9999999999999999999999999999999999999999999999999999999999999999999999999999999999999999999999999999   EEEEEEEEEE

                                    RRRR    000    AAA   RRRR   K   K
                                    R   R  O   O  A   A  R   R  K  K
                                    R   R  O   O  A   A  R   R  K K
                                    RRRR   O   O  A   A  RRRR   KKK
                                    R R    O   O  AAAAA  R R    K K
                                    R  R   O   O  A   A  R  R   K  K
                                    R   R   000   A   A  R   R  K   K

MM        MM    AAAAAA    XX        XX                     LL                                 000000    PPPPPPPP    TTTTTTTTTT
MM        MM    AAAAAA    XX        XX                     LL                                 000000    PPPPPPPP    TTTTTTTTTT
MMMM    MMMM  AA      AA  XX        XX                     LL                               00      00  PP      PP      TT
MMMM    MMMM  AA      AA  XX        XX                     LL                               00      00  PP      PP      TT
MM  MM  MM    AA      AA    XX    XX                       LL                               00      00  PP      PP      TT
MM  MM  MM    AA      AA    XX    XX                       LL                               00      00  PP      PP      TT
MM        MM  AA      AA      XX                           LL                               00      00  PPPPPPPP        TT
MM        MM  AA      AA      XX                           LL                               00      00  PPPPPPPP        TT
MM        MM  AAAAAAAAAA    XX    XX                       LL                               00      00  PP              TT
MM        MM  AAAAAAAAAA    XX    XX                       LL                               00      00  PP              TT
MM        MM  AA      AA  XX        XX                     LL                               00      00  PP              TT
MM        MM  AA      AA  XX        XX                     LL                               00      00  PP              TT
MM        MM  AA      AA  XX        XX   __________        LLLLLLLLLL    __________           000000    PP              TT
MM        MM  AA      AA  XX        XX   __________        LLLLLLLLLL    __________           000000    PP              TT

                          LL            IIIIII    SSSSSSSS  PPPPPPPP     ;;;;       11
                          LL            IIIIII    SSSSSSSS  PPPPPPPP     ;;;;       11
                          LL              II    SS          PP      PP   ;;;;     1111
                          LL              II    SS          PP      PP   ;;;;     1111
                          LL              II    SS          PP      PP              11
                          LL              II    SS          PP      PP              11
                          LL              II      SSSSSS    PPPPPPPP     ;;;;       11
                          LL              II      SSSSSS    PPPPPPPP     ;;;;       11
                          LL              II            SS  PP           ;;;;       11
                          LL              II            SS  PP           ;;;;       11
                 ....     LL              II            SS  PP             ;;       11
                 ....     LL              II            SS  PP             ;;       11
                 ....     LLLLLLLLLL    IIIIII  SSSSSSSS    PP           ;;       111111
                 ....     LLLLLLLLLL    IIIIII  SSSSSSSS    PP           ;;       111111
```

File $3$DUA27:[ROARK.JUL]MAX_L_OPT.LISP;1 (24527,61,0), last revised on 15-JUL-1986 14:42, is a 44 block sequential file owned by UIC [IIIS,ROARK]. The records are variable length with implied (CR) carriage control. The longest record is 116 bytes.

Job MAX_L_OPT (38) queued to NB_TALARIS on 15-JUL-1986 14:52 by user ROARK, UIC [IIIS,ROARK], under account KBS at priority 100, started on printer LCB0 on 15-JUL-1986 14:52 from queue NB_TALARIS.

```
EEEEEEEEEE   9999999999999999999999999999999999999999999999999999999999999999999999999999999999999999999999999999   EEEEEEEEEE
EEEEEEEEEE   99999999999999999999999  Digital Equipment Corporation - VAX/VMS Version V4.4  99999999999999999999999   EEEEEEEEEE
EEEEEEEEEE   9999999999999999999999999999999999999999999999999999999999999999999999999999999999999999999999999999   EEEEEEEEEE
```

```
;1; -*- Package: DMOS; Mode: COMMON-LISP; Base: 10.; Fonts: MEDFNT,HL12B,HL12BI -*-*

;1; This file contains the functions for local optimizatons.*
(defvar *OPTIMIZE-DEBUG* nil 2"prints intermediate results during local optimizations"*)
(defvar *WAIT-DEBUGGING* nil)

;1; Things to do:*
;1;  Proper resolution of the horizon problem.*
;1;  Need to do this: if the optimized load time allows for an operation that* 1takes*
;1; less time to be done on the machine before the load time, check to* 1see if*
;1; it would be a good idea to do that, and maybe do it.*
;1;  Need to arrange things so that there is no greater priority for the*
;1; operations that happen to be first on the list (some sort of round-robin?)*
;1;  The machine* 1could* 1be a double* 1machine and a constraint starter.*
;1; Returns either an optimized load time, or a load list, as an operation list for a.when-available instruction.*
(defun L-OPT (machine time)
  (let* ((horizon (horizon machine))
         (wex-list (make-wex-list machine time horizon)))
    (when *optimize-debug*
      (format t 2"~2% machine ~A, *current-time* ~A"* machine *current-time*))
    (if wex-list
        (let (final-load-operations
              final-load-time
              final-min-wait)
          ;1; Check sides, if a double machine, or operations, if a single machine.*
          (dolist (side-or-operation
                    (if (m-sides machine)
                        (find-good-sides (m-sides machine) wex-list machine horizon)
                        (find-good-operations (m-operations machine) wex-list machine horizon)))
            (multiple-value-bind (load-time load-operations min-wait)
                (check-side-wait side-or-operation wex-list horizon machine)
              (when (and load-operations (or (null final-min-wait) (< min-wait final-min-wait)))
                (setq final-load-time load-time
                      final-load-operations load-operations
                      final-min-wait min-wait))
              (if? (and final-min-wait (zerop final-min-wait)) (return))))
          (when *optimize-debug*
            (format t 2"~% final-load-time ~A, final-load-operations ~A"*
                    final-load-time final-load-operations))
          (if final-load-time
              (if (zerop final-load-time)
                  (make-w-avail-list final-load-operations)
                  final-load-time)
              horizon))
        ;1; If no lots coming, delay to horizon.*
        horizon)))


(defun COMPUTE-SIDE-CAPACITY (operations)
  (min (max-value operations #'operation-lot-capacity)
       (let ((sum 0))
```

```
        (dolist (operation operations sum)
          (let ((constraint (op-constraint-starter operation)))
            (setq sum (+ (if constraint (stc-lot-# constraint) (operation-lot-capacity operation))
                         sum)))))))


(defun FIND-GOOD-SIDES (sides wex-list machine horizon)
  (cond ((and (cdr sides) (> (length wex-list) 4))
         (dolist (side sides)
           (setf (side-lot-count side) Ø)
           (setf (side-time-count side) Ø))
         (dolist (pair wex-list)
           (let ((current-side (dolist (side sides)
                                 [illegible]
             (unless (= (side-lot-count current-side) (side-capacity current-side))
               (incf (side-lot-count current-side))
               (setf (side-time-count current-side) (+ (car pair) (side-time-count current-side))))))
         (dolist (side sides)
           (let ((new-time-count
                   (+ (side-time-count side) (* (- (m-max-capacity machine) (side-lot-count side)) horizon))))
             (setf (side-time-count side) new-time-count)))
         (let ((bound (+ (quotient horizon 2) (* 2 (min-value sides #'side-time-count))))
               (good-sides))
           (dolist (side sides good-sides)
             (if (<= (side-time-count side) bound)
                 (push side good-sides)))
;          (cond ((and good-sides (< (length good-sides) (length sides)))
;                 (format t "2~2% side-success ~A  ~A  ~A"* good-sides sides wex-list))
;                (t
;                 (format t "2~2% side-failure, bound ~A:  "* bound)
;                 (dolist (side sides)
;                   (format t "2 ~A"* (side-time-count side)))))
           (or good-sides sides)))
        (t sides)))

(defun FIND-GOOD-OPERATIONS (operations wex-list machine horizon)
  (cond ((and (cdr operations) (> (length wex-list) 4))
         (dolist (operation operations)
           (setf (op-tempØ operation) Ø)
           (setf (op-temp1 operation) Ø))
         (dolist (pair wex-list)
           (let ((operation (cdr pair)))
             (unless (= (op-tempØ operation) (operation-lot-capacity operation))
               (incf (op-tempØ operation))
               (setf (op-temp1 operation) (+ (car pair) (op-temp1 operation))))))
         (dolist (operation operations)
           (let ((new-time-count
                   (+ (op-temp1 operation) (* (- (m-max-capacity machine) (op-tempØ operation)) horizon))))
             (setf (op-temp1 operation) new-time-count)))
         (let ((bound (+ (quotient horizon 2) (* 2 (min-value operations #'op-temp1))))
               (good-operations))
           (dolist (operation operations good-operations)
             (if (<= (op-temp1 operation) bound)
```

```
                (push operation good-operations)))
;           (cond ((and good-operations (< (length good-operations) (length operations)))
;                  (format t "2~2% operation-success ~A ~A ~A"* good-operations operations wex-list))
;                 (t
;                  (format t "2~2% operation-failure, bound ~A:  "* bound)
;                  (dolist (operation operations)
;                    (format t "2 ~A"* (op-temp1 operation)))))
            (or good-operations operations)))
         (t operations)))

;1; Now calculate the wait for assumed loading at different times.*
;1; Selected-operations is a list of all operations that have been selected to run.*
;1; There is a one-to-one* 1correspondence between* 1entries for lots on the*
;1; wex-list* 1and selected-operations list; i.e., if two lots of an operation P1 are*
;1; selected to run* 1then P1 is to appear twice in the* 1selected-operations list.*
(defun CHECK-SIDE-WAIT (operation-or-side wex-list horizon machine
                        &aux min-wait best-load-time best-load-operations)
  ;1; Loop through possible load times and select the best one.*
  (do* (
        (lot-capacity (if (operation-p operation-or-side)
                          (let ((constraint (op-constraint-starter operation-or-side)))
                            (if constraint (stc-lot-# constraint) (operation-lot-capacity operation-or-side)))
                          (side-capacity operation-or-side)))
        ;1; How often to load operation is how many times operation is in <load-operations>.*
        (load-operations)
        (load-time)
                                    are availab
        (cannot-load-more)
        ;1; Number of lots already in the load plan.*
        (accounted-lots 0)
        (side-operations (if (operation-p operation-or-side)
                             (list operation-or-side)
                             (side-operations operation-or-side)))
        ;1; A list of (time . lot) pairs.*
        (remaining-time-operation-pairs (n-make-possible-lot-list side-operations wex-list)))
       (cannot-load-more)
    (when *optimize-debug*
      (format t 2"~% possible lot list ~A, wex list ~A"* remaining-time-operation-pairs wex-list))
    ;1; Try out a later load time, with more lots being loaded.*
    (multiple-value (cannot-load-more load-time load-operations accounted-lots remaining-time-operation-pairs)
      (take-some-lots lot-capacity load-operations accounted-lots remaining-time-operation-pairs))
;    (format t 2"~% load-operations ~A"* load-operations)
    (if load-time
        ;1; See what the wait time will be, for the current selected <load-time>.*
        (let ((present-wait (estimate-wait-time wex-list
                                                load-operations
                                                side-operations
                                                load-time
                                                horizon
                                                machine)))
;         (format t 2"~% present-wait ~A"* present-wait)
          (when (and present-wait (or (null min-wait) (< present-wait min-wait))
```

```
                    (setq min-wait present-wait
                          best-load-time load-time
                          best-load-operations load-operations)))))
;    (format t 2"~% min-wait ~A"* min-wait)
   )
  (when *optimize-debug* (format t 2"~% load-at ~A, operations ~A, min-wait ~A~%"*
                                best-load-time best-load-operations min-wait))
  (values best-load-time best-load-operations min-wait))


;1; Just moves up the (time . operation) pairs list and updates the associated variables accordingly.  *
;1; Return t if you've loaded everything or met capacity.*
;1; Return nil if you get to a later time.*
(defun TAKE-SOME-LOTS (lot-capacity load-operations accounted-lots time-operation-pairs)
  (do ((remaining-time-operation-pairs time-operation-pairs)
       (load-attempt-time (caar time-operation-pairs)))
      ;1; Succeed out when you've loaded everything or met capacity.*
      ((or (null remaining-time-operation-pairs) (>= accounted-lots lot-capacity))
       (values t load-attempt-time load-operations accounted-lots remaining-time-operation-pairs))
    (cond ((>= load-attempt-time (caar remaining-time-operation-pairs))
           (push (cdar remaining-time-operation-pairs) load-operations)
           (incf accounted-lots)
           (setq remaining-time-operation-pairs (cdr remaining-time-operation-pairs)))
          ;1; Quit when no more pairs for the current time.*
          (t (when *optimize-debug* (format t 2"~% try next load time"*))
             (return nil load-attempt-time load-operations accounted-lots remaining-time-operation-pairs)))))


(defun HORIZON (machine)
  ;1; This is also temporary till a better understanding of horizon is available.*
  (max-value (m-operations machine) #'op-run-time))


;1; Returns a list ordered by operation contention of those pairs <time . operation>*
;1; such that* 1<operation> belongs to <operations> and <time> belongs to the cdr of*
;1; the pair in* 1<wex-list> of which <operation> is the car.*
(defun PUT-IN-ORDER (operations operation-wait-lists contention-list &aux ord-list)
  (dolist (proc-info operation-wait-lists)
    (when (memq (car proc-info) operations)
      (dolist (wait (cdr proc-info))
        (setq ord-list (cons (cons wait (car proc-info)) ord-list)))))

  ;1; Sort in order of operation contention.*
  (stable-sortcar (stable-sort ord-list
                               #'(lambda (x y)
                                   (> (cdr (assq (cdr x) contention-list))
                                      (cdr (assq (cdr y) contention-list)))))
                  #'<))


;1;  Consider lots already in the queue before calling when-expected.*
;1;  Get the when-expected (wex) info for each operation. >> for how much time and for how many lots??*
;1;  Subtract each when-expected time from current-time .*
```

```
;1;  Adjust the wex info to account for constraints.*
;1;  Adjust the Wex info to account for machine Contention. >> Not yet done.*
;1;  Operation-wex will be a list of (time lot0 lot1 ...) lists.*
;1;  Temp-wex-list is a list of (operation wait0 wait1 ...) lists.*
;1;  Wex-list is an ordered list of (wait . operation) pairs.*
;1;  New version:*
(defun MAKE-WEX-LIST (machine time horizon &aux operation-wait-lists)
  (let ((operations (m-operations machine))
        (contention-list (m-contention machine)))
;    (if (= (m-number machine) 128) (terpri))
    (dolist (operation operations)
      (let* ((time-constraint (op-constraint-starter operation))
             (operation-wait (if time-constraint
                                 (let ((earliest-time (constraint-next-availability time-constraint)))
                                   (if (< earliest-time time)
                                       0
                                       (- earliest-time time)))
                                 0)))
;       (if (= (m-number machine)1 128*)
;           (format t 2"~% 1. Operation ~A, Queue ~A."* operation1 *(op-queue operation)))
        (dolist (pair (op-queue operation))   ;1 [[4/29/86*
          (unless (car pair) (return))
          (let ((lot-wait (- (car pair) time)))
;           (if (= (m-number machine) 75) (format t 2"~% 2. time ~A, lot-wait ~A."* time lot-wait))
            (if (<= lot-wait horizon)
                (push (cons operation (make-list (q-length (cdr pair))
                                                 :initial-element (max lot-wait operation-wait)))
                      operation-wait-lists)
                (return))))
;       (if (= (m-number machine) 75) (format t 2"~% 3.  operation-wait-lists ~A"* operation-wait-lists))
        ))
    ;1; Convert format and put pairs in order.*
    (put-in-order operations operation-wait-lists contention-list)))


;1; Returns a list of (time . operation) pairs, relative to side-operations.*
;1; Deletes entries relating to all operations but those of interest.*
;1; Removes any lots that would break the maximum sequence size constraint.*
(defun N-MAKE-POSSIBLE-LOT-LIST (side-operations wex-list &aux lot-list account-list)
  ;1; Reverse the list to restore original order.*
  (dolist (pair wex-list (nreverse lot-list))
    (let ((operation (cdr pair)))
      (if (memq operation side-operations)
          (let ((constraint-sequence (op-constraint-starter operation)))
            (if constraint-sequence
                ;1; <Account-list> keeps track of how many times a*
                ;1; constraint starter is already on <lot-list>.*
                (let ((operation-number-pair (assq operation account-list)))
                  (if operation-number-pair
                      ;1; If it's already on the list enough times to fill the*
                      ;1; constraint, ignore it.  If not, put it on the list*
                      ;1; again and increment what it is assigned on*
                      ;1; account-list.*
                      (when (< (cdr operation-number-pair) (stc-lot-# constraint-sequence))
```

```
            (push (copytree pair) lot-list))
          ;1; If it's a constraint-starter but not yet on <lot-list>, enter it on <lot-list> and <account-list>.*
          (setq account-list (cons (cons operation 1) account-list)
                lot-list (cons (copytree pair) lot-list))))
        ;1; If <operation> is not a constraint starter, just put <pair> on the list.*
        (push (copytree pair) lot-list)))))))


(defun ESTIMATE-WAIT-TIME (wex-list load-operations side-operations load-time horizon machine)
  (do*
    ;1; Operations on this pass.*
    ((next-load-list nil (choose-load-side (make-load-pairs wex-list
                                                            present-load-time
                                                            next-load-time
                                                            all-load-operations)
                                           side-operations
                                           machine))
     (new-load-operations load-operations next-load-list)
     ;1; Operations on this pass and all preceding passes.*
     (all-load-operations load-operations (append new-load-operations all-load-operations))
     (present-load-time load-time next-load-time)
     ;1; Stuff to load  -- a list of (operation . time) pairs.*
     (future-load-list (mapcar #'(lambda (operation) (cons operation present-load-time))
                               new-load-operations)
                       (append (mapcar #'(lambda (operation) (cons operation present-load-time))
                                       new-load-operations)
                               future-load-list))
     (next-load-time
       (+ present-load-time (op-run-time (car new-load-operations)))
       (if next-load-list
           (+ present-load-time (op-run-time (car new-load-operations)))
           (1+ present-load-time))))
    ((>= present-load-time horizon)
     (total-weighted-delay future-load-list wex-list present-load-time machine))))


;1; You do this whenever you load a constraint sequence.*
;1; Have to do more complicated things when members of the constraint break, etc.*
(defun UPDATE-CONSTRAINT-AVAILABILITY-WHEN-LOADING (constraint time)
  (check-constraint-state constraint time)
  (rplacd (least-member (stc-next-available-times constraint) #'(lambda (a b) (< (cdr a) (cdr b))))
          (+ time (stc-greatest-operation-time constraint))))


(defun CONSTRAINT-NEXT-AVAILABILITY (constraint)
  (cdr (least-member (stc-next-available-times constraint) #'(lambda (a b) (< (cdr a) (cdr b))))))

;1; *
(defun MAKE-LOAD-PAIRS (wex-list present-load-time next-load-time all-load-operations)
  ;1; We are now selecting for <next-load-time>, so remove load* 1operations that*
  ;1; are assumed to have already been loaded at* 1<present-load-time>, and those that*
  ;1; won't be available until after* 1<next-load-time>.*
```

```
    (let ((load-candidate-pairs
           ;1; Need to copy, so we don't modify pairs in wex-list; but I think*
           ;1; we only need the operations anyway -- check this.*
           (copyalist (remove-if #'(lambda (pair)
                                     (or (> (car pair) next-load-time)
                                         ;1; Don't throw out the old ones that haven't been chosen yet.*
                                         (and (memq (cdr pair) all-load-operations)
                                              (<= (car pair) present-load-time))))
                                 wex-list))))
      (when *wait-debugging* (format t 2"~% load candidate pairs1 ~A"* load-candidate-pairs))
      ;1; Maybe postpone the next availability of those load operations that are sequence-starters.*
      (dolist (pair load-candidate-pairs)
        (let ((constraint (op-constraint-starter (cdr pair))))
        (let* ((second-machine-time
                 (cdr (second-member (stc-next-available-times constraint)
                                     #'(lambda (a b) (< (cdr a) (cdr b))))))
               (delay (if second-machine-time
                          ;1; The wait for the second machine.*
                          (max (- second-machine-time *current-time*) 0)
                          ;1; The wait to get loaded onto the only machine.*
                          (stc-greatest-operation-time constraint)))
               (next-available-time (+ present-load-time delay)))
          ;1; [[When is it right to do this??*
          (setf (stc-temp-wait-for-availability constraint) delay)
          (cond ((= next-available-time present-load-time))
                ((< next-available-time next-load-time)
                 ;1; Does this make sense?*
                 (if (> next-available-time (car pair))
                     (rplaca pair delay)))
                ;1; Won't be available until next load -- delete it from current pairs.*
                (t
                 (setq load-candidate-pairs (delete pair load-candidate-pairs)))))))))


;1; Just add up the weighted delays for all the lots on future-load-list.*
(defun TOTAL-WEIGHTED-DELAY (future-load-list wex-list next-load-time machine
                             &aux (contention-list (m-contention machine)) (wait-time 0))
  (dolist (time-operation-pair wex-list wait-time)
    (let* ((operation (cdr time-operation-pair))
           ;1; The delay until you expect the pair to arrive.*
           (arrival-delay (car time-operation-pair))
           ;1; The pair of the operation and the delay until you expect to load it (this time).*
           (expected-load-pair (assq operation future-load-list)))
;       (format t "2~% wait time ~A"* wait-time)
      (cond (expected-load-pair
             (setq wait-time (+ wait-time
                                ;1; Weight the delay according to contention.*
                                (* (cdr (assq operation contention-list))
                                   (- (cdr expected-load-pair) arrival-delay))))
;            (format t "2~% expected load pair, new wait time ~A"* wait-time)
             ;1; Invalidate entry in future-load-list, so you'll go on to the next one in the next pass.*
             (rplaca expected-load-pair -1))
            (t
```

```
            ;1; Else there are no more entries for this operation on the*
            ;1; future-load-list, so remaining entries on wex-list wait for the*
            ;1; next load.*
            (setq wait-time (+ wait-time (* (cdr (assq operation contention-list))
                                             (- (max next-load-time
                                                     (or (let ((constraint (op-constraint-starter operation)))
                                                               (and constraint
                                                                    (stc-temp-wait-for-availability constraint)))
                                                         Ø))
                                                arrival-delay))))
;           (format t "2~% no expected load pair, new wait time ~A"* wait-time)
            ))
;       (format t 2"~% total-weighted-delay, wait-time ~A"* wait-time)
      )))

;1; Time-operation-pairs is a list of (time . operation) pairs.  Returns a subset of*
;1; the operations that are the cdrs.  This list possibly has*
;1; multiple* 1occurrences of the same operation, indicating the loading of more than*
;1; one lot* 1of that operation.  Idea is that time-operation-pairs would represent the*
;1; *next* load, not the one you're doing now.*  1Estimates the operations/lots that*
;1; will be selected for* 1loading assuming time-operation-pairs* 1represents the*
;1; operations/lots that are* 1currently available.  Time-operation-pairs has a format*
;1; similar to wex-list.*  1Returns a list representing these operations/lots.*
(defun CHOOSE-LOAD-SIDE (time-operation-pairs operations machine
 (dolist (pair time-operation-pairs)
   (if (memq (cdr pair) operations)
       (push (cdr pair) side1)
       (push (cdr pair) side2)))
 (nreverse (if (and side1 side2)
               (let* ((operation-time1 (op-run-time (cdar side1)))
                      (operation-time2 (op-run-time (cdar side2)))
                      (wait-if-load-side1 (load-wait side1 contention-list operation-time1))
                      (wait-if-load-side2 (load-wait side2 contention-list operation-time2)))
                 (when *wait-debugging*
                   (format t 2"~% wait-if-load-side1 ~A, wait-if-load-side2 ~A"*
                           wait-if-load-side1 wait-if-load-side2))
                 (cond
                   ;1; Choose the side with lesser wait.*
                   ((> wait-if-load-side1 wait-if-load-side2)
                    side2)
                   ((= wait-if-load-side1 wait-if-load-side2)
                    ;1; Choose the side with lesser operation time, if waits are equal.*
                    (if (> operation-time1 operation-time2)
                        side2
                        side1))
                   (t side1)))
               ;1; If only one side has lots, choose it.*
               (or side1 side2))))

;1; The weighted wait to load <operations> (a list of operations, with possibly*
```

```
;1; multiple* 1occurrences of the same operation, indicating the loading of more than*
;1; one lot* 1of that operation) at <operation-time>*
(defun LOAD-WAIT (operations contention-list operation-time &aux (wait-if-load 0))
  (dolist (operation operations wait-if-load)
    (setq wait-if-load
          (+ wait-if-load (* (cdr (assq operation contention-list)) operation-time)))))


;1;  Takes a list and makes an unordered a-list of pairs (thing . number), where*
;1; <number> is the number of times <thing> occurs on the original list.*
;1; Returns a list in the load-list format required by the when-available instruction.*
(defun MAKE-W-AVAIL-LIST (operation-list &aux w-list)
  (dolist (operation operation-list w-list)
    (let ((temp (assq operation w-list)))
      (if temp
          (rplacd temp (1+ (cdr temp)))
          (setq w-list (cons (cons operation 1) w-list))))))

;1; -*- Package: DMOS; Mode: COMMON-LISP; Base: 10.; Fonts: MEDFNT,HL12B,HL12BI -*-*

;1; 4/29/86 -- New version.*

;1; Remarks on strategy:*

;1;  Every machine has two times - a* 1last-unloaded-time, and a checked-up-to*
;1; time.  The checked-up-to time is* 1the* 1time up to which the machine has been*
;1; checked for loading, *without** 1*being* *loaded*.  If it has been checked and*
;1; loaded, the time at which it was* 1checked is of no interest because it's*
;1; possible that it could be loaded again* 1before the check time.  [[ This would*
;1; not hold if the time when a machine is* 1checked for load is alway the earliest*
;1; time at which it could possibly be* 1loaded -- but for the present we do not*
;1; make this assumption.]]*

;1;  In this version times for operations are always arrived at by computing from*
;1; the times for the machines that do them.*

;1;  General* 1load-checking strategy: Every machine has a last time at which it*
;1; was* 1unloaded and a last time at which it was checked for loading.  It needs*
;1; to* 1be* 1checked again at the maximum of its last unload time and (1+ its last*
;1; check* 1time).  All machines that run the operations that load the machine have*
;1; to* 1have been run until either their last unload exceeds the present load check*
;1; time or their last load check time exceeds (the present load check time -*
;1; their* 1operation time)*


;1; Converts from queue format to expected-input format.*

;1; [[[Does this need a time argument?*
(defun QUEUE-TO-EXPECTED-INPUT (queue &aux expected-input)
  (dolist (pair queue expected-input)
    (if (car pair)
        (push (cons (car pair) (q-length (cdr pair))) expected-input)
        (return expected-input))))
```

```lisp
;1; The earliest time at which it makes sense to check <machine> for loading <operation>.*
(defun MACHINE-OPERATION-SIMPLE-LOAD-CHECK-TIME (machine operation &optional (time *current-time*))
  ;1; [[Need to to do both of these??*
  (check-operation-state operation time)
  (check-machine-state machine)
  (let ((limit (cdr (assq operation (m-checked-up-to machine)))))
    (if limit
        (max (m-last-unloaded-at machine) (1+ limit)))))


;1; The earliest time at which it makes sense to check <machine> for loading any operation.*
(defun MACHINE-SIMPLE-LOAD-CHECK-TIME (machine &optional (time *current-time*))
  (check-machine-state machine)
  (when (eq (m-status machine) 'free)
    (dolist (operation (m-operations machine))
      (check-operation-state operation time))
    (let ((checked-time
            (min-relative-value (m-operations machine)
                                machine
                                #'(lambda (operation machine)
                                    (cdr (assq operation (m-checked-up-to machine)))))))
      ;1; Checked-time should be nil only if this machine is known to be unloadable in this when-expected.*
      (if checked-time (max (m-last-unloaded-at machine) (1+ checked-time))))))


;1; The earliest time at which it makes sense to check any of <machines> for loading any operation.*
(defun MACHINES-SIMPLE-LOAD-CHECK-TIME (machines)
  (min-value machines #'machine-simple-load-check-time))

;1; The earliest time at which any of <machines> other than <machine> can be loaded. *
(defun OTHER-MACHINES-SIMPLE-LOAD-CHECK-TIME (machine machines &aux earliest)
  (dolist (other-machine machines earliest)
    (check-machine-state machine)
    (if (and (eq (m-status other-machine) 'free) (neq other-machine machine))
        (let ((new-time (machine-simple-load-check-time other-machine)))
          (if (or (null earliest) (< new-time earliest))
              (setq earliest new-time))))))


;1; The earliest time at which it makes sense to check <operation> to be loaded onto any machine.*
(defun OPERATION-SIMPLE-LOAD-CHECK-TIME (operation &optional (time *current-time*) &aux earliest early-machines )
  (check-operation-state operation time)
  (dolist (machine (op-machines operation) (values earliest early-machines))
    (check-machine-state machine)
    (if (eq (m-status machine) 'free)
        (let ((new-time (machine-operation-simple-load-check-time machine operation)))
          (cond ((or (null earliest) (and new-time (< new-time earliest)))
                 (setq earliest new-time
                       early-machines (list machine)))
                ((and earliest new-time (= new-time earliest))
                 (push machine early-machines)))))))
```

```
;1; This function is supposed to return as high as possible a lower bound on*
;1; loading the operation, in order to cut off branching -- not in order to set a*
;1; time* 1to try to load machines.*
(defun OPERATION-LOAD-HIGH-LOWER-BOUND (operation)
  (dolist (machine (op-machines operation))
    (check-machine-state machine))
  (min-relative-value (op-machines operation)
                      operation
                      #'machine-load-high-lower-bound
                      #'(lambda (x) (eq (m-status x) 'free))))

;1; This is the function that finds the least time at which you can really load *
;1; <operation>, with the lots that are there now (i.e., there at <bound>).*
(defun OPERATION-LEAST-REAL-LOAD-TIME (operation bound)
  (let ((earliest)
        (early-machines))
    (dolist (machine (op-machines operation) (values earliest early-machines))
      (check-machine-state machine)
      (if (eq (m-status machine) 'free)
          (let ((new-time (machine-operation-least-real-load-time machine operation bound)))
            (cond ((null new-time))
                  ((or (null earliest) (< new-time earliest))
                   (setq earliest new-time
                         early-machines (list machine)))
                  ((= new-time earliest)
                   (push machine early-machines))))))))

(defun MACHINE-OPERATION-LEAST-REAL-LOAD-TIME (machine operation bound &optional (time *current-time*))
  (check-machine-state machine)
  (if (and (eq (m-status machine) 'free)
           (<= (m-last-unloaded-at machine) bound))
      (selectq (m-scheduling-type machine)
        ;1; Fix this up later.*
        (otherwise
         (check-operation-state operation time)
         (let ((time0 (operation-earliest-lot time operation))
               (time1 (machine-operation-si   'e-load-check-time machine operation)))
           (if (and time0 time1 (<= time0 l    l) (<= time1 bound))
               (max time0 time1))))))))

;1; Same for <machine> and <bound>.*
(defun MACHINE-LEAST-REAL-LOAD-TIME (machine bound &optional (time *current-time*)
                                     &aux (done-to (m-last-unloaded-at machine)))
  (check-machine-state machine)
  (if (and (eq (m-status machine) 'free)
           (<= done-to bound))
      (selectq (m-scheduling-type machine)
        ;1; Fix this up later.*
        (otherwise
         (dolist (operation (m-operations machine))
           (check-operation-state operation time))
```

```
        (let ((lots-ready-time
                (min-relative-value (m-operations machine)
                                    bound
                                    #'(lambda (operation bound)
                                        (let ((time (operation-earliest-lot-time operation)))
                                          (if (and time (<= time bound)) time))))))
          (if lots-ready-time (max lots-ready-time done-to))))))


;1; This is the earliest time that this operation could be out of the way on the*
;1; machine, by either finishing on this machine or getting loaded onto another*
;1; machine.*
(defun MINIMUM-DELAY (operation machine lower-bound &optional (time *current-time*))
  (check-operation-state operation time)
  (min
    ;1; Ignores the fact that another machine could choose not to load this operation first.*
    (other-machines-simple-load-check-time machine (op-machines operation))
    (+ lower-bound (op-run-time operation))))


;1; This function puts a lower bound on the time at which <machine> could*
;1; possibly be loaded with <operation>.  We want to make it return the highest*
;1; possible lower bound with the least possible amount of computation.*
;1;   Main thing on this function is to do it for round-robin and when-available.*
(defun MACHINE-LOAD-HIGH-LOWER-BOUND (machine load-operation &optional (time *current-time*))
  (check-machine-state machine)
  (if (eq (m-status machine) 'free)
      ;1; Need to start at the time up to which the machine has actually been run.*
      (let ((simple-lower-bound (m-last-unloaded-at machine)))
        (selectq (m-scheduling-type machine)
          ;1; If there are any operations that precede <operation> and have lots*
          ;1; available at lower bound, they would run first.*
          ((bottleneck local-optimize) simple-lower-bound)
          ((round-robin constraint-member)
           ;1; For now, just look at all the operations that come before*
           ;1; operation and have lots available in time to be loaded when*
           ;1; operation could first be loaded.  For each such operation take the*
           ;1; minimum of the time when it could be loaded onto another*
           ;1; machine and the time it could finish running on this machine,*
           ;1; then take the maximum of those.*
           (let ((max-delay simple-lower-bound))
             (dolist (operation (m-operations machine))
               (check-operation-state operation time)
               (when (eq operation load-operation)
                 ;1; Increase m-checked-up-to on the machine, *
                 (let ((pair (assq operation (m-checked-up-to machine))))
                   (if (and (cdr pair) (> max-delay (cdr pair)))
                       (rplacd pair max-delay)))
                 (return max-delay))
               (if (and (eq (m-status operation) 'free)
                        (<= (operation-earliest-lot-time operation) simple-lower-bound))
                   (let ((new-value (minimum-delay operation machine simple-lower-bound)))
                     (if (and new-value (> new-value max-delay))
```

```
                (setq max-delay new-value)))))))))))


;1; The top when-expected function, called by LOCAL-OPTIMIZE-MACHINE.*
(defun MACHINE-WHEN-EXPECTED (top-machine &optional (time *current-time*))
  (check-machine-state top-machine)
  (unwind-protect
      (machine-when-expected-1 top-machine time)))


(defun MACHINE-WHEN-EXPECTED-1 (top-machine time)
  (let ((bound (+ time (horizon top-machine))))
    (dolist (operation (m-operations top-machine))
      (let* ((constraint (op-constraint-starter operation))
             (lots-to-find (if constraint (stc-lot-# constraint)
                                (quotient (op-slices-per-run operation) 24))))
        (if constraint
            (set-operation-bound operation (constraint-next-availability constraint)))
        (operation-when-expected operation bound Ø Ø lots-to-find)))))


;1; For testing.*
(defun user:MWE (machine time)
  (user:w-e-trace)
  (machine-when-expected (real-machine machine) time)
  (format t 2"~2%  **  WHEN-EXPECTED DONE  **~2% "*))


;1; Supposed to return a fairly good upper bound on the number of lots that can*
;1; get unloaded by <unload-time-limit>.*
(defun PRELIMINARY-W-E-CHECK (top-operation unload-time-limit &optional (time *current-time*))
  (check-operation-state top-operation time)
  (let ((machines (op-machines top-operation))
        ;1; The latest time you can load this operation and be done by unload-time-limit, ignoring availability of machines.*
        (load-time-limit (- unload-time-limit (op-run-time top-operation))))
    ;1; The minimum of*
    ;1; The minimum of*
    ;1;  1) The total number of lots all the machines can run between their last*
    ;1; unload and unload-time-limit, and*
    ;1;  2) The number of lots that will* 1get to the operation by load-time-limit*
;       (format t 2"~% unload-time-limit ~A, *current-time* ~A"  *unload-time-limit *current-time*)
    (let ((lots
            (if (or (< unload-time-limit *current-time*)
                    (let ((checked-time (operation-simple-load-check-time top-operation)))
;                         (format t 2"~% checked-time ~A, load-time-limit ~A"* checked-time load-time-limit)
                      (or (null checked-time)
                          (> checked-time load-time-limit))))
                Ø
                (min
                  (+ (let ((previous-operation (op-preceding-operation top-operation)))
                       ;1; Need to do preliminary-w-e-check first so lots from preceding operations will be unloaded.*
                       ;1; Lots coming from previous-operation by load-time-limit.*
                       (if previous-operation
```

```
                (preliminary-w-e-check previous-operation load-time-limit)
                0))
          ;1; Lots coming from rework.*
          (let ((other-previous-operation (rework-feeder top-operation)))
            (if other-previous-operation
                (preliminary-w-e-check other-previous-operation load-time-limit)
                0))
          ;1; The number of lots on the queue after previous operation gets unloaded.*
          (number-of-lots-on-queue top-operation load-time-limit))
        (let ((number-of-lots-that-can-be-processed 0))
          (dolist (machine machines number-of-lots-that-can-be-processed)
            (check-machine-state machine)
            (setq number-of-lots-that-can-be-processed
            (+ (or (and (eq (m-status machine) 'free)
                        (* (floor (quotient (- unload-time-limit
                                               (or (m-last-unloaded-at machine)
                                                   ;1; [[Do something better here? 4/15/86*
                                                   *current-time*))
                                            (op-run-time top-operation)))
                           (operation-lot-capacity top-operation)))
                   0)
               number-of-lots-that-can-be-processed))))))))
  (if (zerop lots)
      ;1;  In this when-expected, this operation won't get loaded before load-time-limit.*
      (set-operation-bound top-operation load-time-limit)
      (set-operation-bound top-operation (1- *current-time*)))
  lots)))

(defun OPERATION-WHEN-EXPECTED (top-operation unload-time-limit depth side-branch-depth lots-to-find
                                &optional (time *current-time*))
  (check-operation-state top-operation time)
  (unless (and (zerop depth) (zerop (preliminary-w-e-check top-operation unload-time-limit)))
    ;1; The latest time you can load this operation and be done by unload-time-limit, ignoring availability of machines.*
    (let ((load-time-limit (- unload-time-limit (op-run-time top-operation))))
      (do ()
          ((>= (number-of-lots-on-queue top-operation) lots-to-find))
        ;1; [[Watch out for *operation-simple-load-check-time1; will it be*
        ;1; called on an unitialized machine, and if so will it bomb out??  4/15/86*
        (let ((bottom-load-bound (operation-simple-load-check-time top-operation)))
          (set-operation-bound top-operation bottom-load-bound)
          ;1; All machines are broken (or being maintained), or it's too late.*
          (when (or (null bottom-load-bound) (> bottom-load-bound load-time-limit))
;           (format t 2"~% when-expected-out, bottom-lower-bound ~A, load-time-limit ~A"*
;                   bottom-load-bound load-time-limit)
            (return))
          (let ((top-load-bound (operation-load-high-lower-bound top-operation)))
            ;1; Record how far you've checked this operation, sort of.*
            (set-operation-bound top-operation top-load-bound)
            ;1;;All machines are broken (or being maintained), or it's too late.*
            ;1; [[This seems never to happen.  Figure it out.  [[4/24/86*
            (when (or (null top-load-bound) (> top-load-bound load-time-limit))
```

```
            (format t 2"~% when-expected-out, top-lower-bound ~A, load-time-limit ~A"*
                    top-load-bound load-time-limit)
            (return))
;         (format t 2"~% top-load-bound ~A, bottom-load-bound ~A, load-time-limit ~A"*
;                 top-load-bound bottom-load-bound load-time-limit)
          ;1; There might be time to load.*
          (let ((next-bound (if (eq depth 0)
                                (max top-load-bound
                                     (+ bottom-load-bound
                                        (ceiling (* (- load-time-limit bottom-load-bound) .66))))
                                load-time-limit)))
            (check-to-bound top-operation next-bound depth side-branch-depth lots-to-find)))))))

;1; Increase the m-checked-up-to time for this operation.  A value of nil means it*
;1; cannot be loaded in the current when-expected.  [[Check this out -- how*
;1; can we know? 4/29*
(defun SET-OPERATION-BOUND (operation bound &optional (time *current-time*))
  (check-operation-state operation time)
  (dolist (machine (op-machines operation))
    (check-machine-state machine)
    (let ((pair (assq operation (m-checked-up-to machine))))
      (if (or (null bound) (and (numberp (cdr pair)) (> bound (cdr pair))))
          (rplacd pair bound)))))


;1; Same for <machine>.*
(defun SET-MACHINE-BOUND (machine bound)
  (check-machine-state machine)
  (dolist (pair (m-checked-up-to machine))
      (if (or (null bound) (and (numberp (cdr pair)) (> bound (cdr pair))))
          (rplacd pair bound))))


(defun LOTS-HERE-BY (operation time &aux (count 0))
  (dolist (pair (op-queue operation) count)
    (if (and (car pair) (< (car pair) time))
        (setq count (+ (q-length (cdr pair)) count))
        (return count))))


;1; Loop, trying  on each pass to load the earliest machines available, until the bound is reached.*
;1; This will be called repeatedly, with bound being incremented up to the load time of <top-operation>, sort of.*
(defun CHECK-TO-BOUND (top-operation bound depth side-branch-depth lots-to-find)
  (let ((previous-operation (op-preceding-operation top-operation))
        (rework-previous-operation (rework-feeder top-operation))
        (lots-here-already (lots-here-by top-operation bound)))
    (when (or previous-operation rework-previous-operation)
      (do-forever
        (if previous-operation
            (operation-when-expected previous-operation
                                     bound
```

```
                              (1+ depth)
                              side-branch-depth
                              (- lots-to-find lots-here-already)))
;1; [[Does the lot bound result in wrong load conditions when it's time for top-operation to load?*
;1; I don't think so, because it only affects what time operation-when-expected runs up to.*
(if rework-previous-operation
    (operation-when-expected rework-previous-operation
                              bound
                              (1+ depth)
                              side-branch-depth
                              (- lots-to-find lots-here-already)))
(if (plusp depth)
    (multiple-value-bind (load-time load-machines)
        (operation-least-real-load-time top-operation bound)
      ;1;  If no lots are at top-operation by bound, no need to go*
      ;1;  further on this loop.*
      (cond (load-time
             ;1;   Now we have to run all the operations done by all the*
             ;1; machines that we're trying to load, in order to have the*
             ;1; correct state when checking for load.*
             (dolist (machine load-machines)
               (unless (> (machine-simple-load-check-time machine) load-time)
                 (dolist (operation (m-operations machine))
                   (unless (eq operation top-operation)
                     (operation-when-expected operation
                                              load-time
                                              0
                                              (1+ side-branch-depth)
                                              (operation-lot-capacity operation))))))

             ;1; Now try to load the machines.*
             (unless (when-expected-load-machines load-time load-machines)
               ;1; If nothing happens, don't come this way again.*
               (set-operation-bound top-operation bound)))
            (t
             ;1;  Machines have not yet been checked up to* lbound.  We*
             ;1; only know now that they can't load* 1*this* operation.*
             (set-operation-bound top-operation bound)
             (return))))
    (return)))))

;1; New version.  Contains recursive local optimization.*
;1; Needs to return t if and only if either a new machine is put on optimization or a non-local-optimize-machine is checked.*
(defun WHEN-EXPECTED-LOAD-MACHINES (time machines)
  ;1; Have to do this in order, to match the simulator.*
  (let ((ordered-machines (sort machines
                                #'(lambda (machine0 machine1) (< (m-number machine0) (m-number machine1)))))
        (success)
        (machines-to-optimize))
    (dolist (machine ordered-machines)
      (check-machine-state machine)
      (selectq (m-scheduling-type machine)
        ;1; Constraint members are initialized with a prioritized round-robin strategy, and*
```

```
;1; Round robin machines also just keep the original RPT instruction.*
('local-optimize
 ;1; If you're already trying to optimize this machine for another time, ignore it here.*
 (unless (m-optimize-time machine)
   (setq success t)
   (setf (m-optimize-time machine) time)
   (push machine machines-to-optimize)))
;1; [[Would have a problem here, if bottleneck machines conflict with*
;1; local-optimize machines, or with other bottleneck machines --*
;1; both would try to load the* 1same lots.  Need to make the loading*
;1; of* 1bottleneck machines part* 1of the whole scheduling operation.*
;1; 4/9/86*
('bottleneck (or (load-bottleneck-machine machine nil time)
                 ;1; If you don't load it at <time>, then you don't*
                 ;1; want to try to load it at <time> again.*
                 (set-machine-bound machine time)))))
(dolist (machine machines-to-optimize)
  (machine-when-expected-1 machine time)
  (when-expected-check-local-optimize-load machine time))
(dolist (machine ordered-machines)
  (when (memq (m-scheduling-type machine) '(round-robin constraint-member))
    (setq success t)
    (or (check-for-load machine time)
        ;1; If you don't load it at <time>, then you don't*
        ;1; want to try to load it at <time> again.*
        (set-machine-bound machine time))))
success))


(defun WHEN-EXPECTED-CHECK-LOCAL-OPTIMIZE-LOAD (machine &optional (time *current-time*))
  (if (and *keeping-machine-history*) ; (memq (m-number machine) '(107 108 109 110 45 46 92 93)))
      (setf (m-history machine) (cons (list ' CHECK-LOCAL-OPTIMIZE-LOAD *current-time*)
                                      (m-history machine))))
  (let ((load-list (l-opt machine time)))
    ;1; [[Null clause is probably wrong?  L-opt should always make a decision?  4/8/86*
    (cond ((listp load-list)
           (cond ((= time *current-time*)
                  (buffer 'load-lots machine 'at load-list time nil))
                 (t
                  (set-machine-bound machine (1- time))
                  (post-timed-instruction time 'optimize machine)
                  (setf (m-waiting-time machine) time)))
           (incremental-load-lots load-list machine time))
          ;1; L-opt has decided not to load now.*
          ((numberp load-list)
           (let ((check-time (+ time load-list)))
             ;1; Because we want the bound to be the last time we know we don't want to load the machine.*
             (set-machine-bound machine (1- check-time))
             (post-timed-instruction check-time 'optimize machine)
             (setf (m-waiting-time machine) check-time))))))
```

```
;1; -*- Package: DMOS; Mode: COMMON-LISP; Base: 10.; Fonts: MEDFNT,HL12B,HL12BI -*-*

;1; 1/20/86*

;1; These are the global variables which preserve the state of the machine.*
;1; Their values are written into the dump-files at the specified interval.*

(defvar *NEXT-PERIOD*)
(defvar *PERIOD-START-TIME*)

;1; Machines that have become available on the last unload cycle,* 1or that do a*
;1; operation that has had stuff added to its queue on the last unload cycle.*
(defvar *MACHINES-TO-CHECK* nil)

;1; Counts number of feeds done since beginning of current feed cycle.*
(defvar *FEED-COUNTER* 0)

(defvar *LOTS-IN-PLANT* 0)

(defvar *LOT-PILE* nil)

;1; Arrays where timed instructions are stored.*
(defvar *UNLOAD-ARRAY*)
(defvar *MAINTAIN-ARRAY*)
(defvar *ON-LINE-ARRAY*)
(defvar *BREAK-ARRAY*)
(defvar *FIX-ARRAY*)
(defvar *LOAD-ARRAY*)
(defvar *CREATE-ARRAY*)
(defvar *OPTIMIZE-ARRAY*)
(defvar *SNAP-ARRAY*)
(defvar *DUMP-ARRAY*)

(defvar *BUCKET-LIST* nil)

(defvar *CURRENT-TIME* 0 2"The current time.  The factory commences operation at time 0; incremented by 1"*)
(defvar *LAST-LOT-ID*  0 2"The id-number of the last lot entering the factory"*)

;1; True when the flow-pane is supposed to be discarded, I think.*
(defvar *TERMINATE-FLOW-PANE* nil "2Control variable for the loop in :process-dmos-flow-blips.*")
;1; This variable is used to keep track of the last item modified, in the DMOS editor.*
(defvar *LAST-ITEM-CHANGED* nil "2Points to the last item modified by the user*")


;1; To be made true iff arrays have been initialized for the current frame.*
(defvar *ARRAYS-INITIALIZED* nil)
;1; To be made true iff operations and machines have been initialized for the current frame.*
(defvar *OPERATIONS-AND-MACHINES-INITIALIZED* nil)
;1; On initialization menu.  To be set if user wants to reinitialize values for machines, operations, and instruction arrays.*
(defvar *REBUILD* nil)
```

```
;1; Operations involved in the current when-expected.*
(defvar *WHEN-EXPECTED-OPERATIONS* nil)
(defvar *BROKEN-MACHINES* nil 2"List of machines currently broken"*)

;1; Assigns to each lot a pair (starting-time . total-cycle-time)*
(defvar *LOT-INFORMATION-ARRAY* nil)

;1; For debugging in the editor.*
(defvar UUU nil)
;1; -*- Package: DMOS; Mode: COMMON-LISP; Base: 10.; Fonts: MEDFNT,HL12B,HL12BI -*-*

;1; 3/18/86*

;1; This file contains the global variable declarations.  These are variables used for various simulator*
;1; bookkeeping tasks not related to the actual factory simulation.*

;1; For now.*

;1; True if fe-go has refilled an old operation array, instead of build a new one -- not currently used. (3/18/86)*
(defvar *OLD-DMOS-FLOW-TEXT-ARRAY* nil)

(defvar *DIRPATH* (fs:make-pathname :directory (list (send (fs:user-homedir) :directory)))
  2"The pathname for the directory containing the datafiles."*)

(defvar *DATAFILE-EXT* 2" "*    2"Extension for the names of the datafiles created during this run."*)

(defvar *FILE-CHOICE-MENU* nil 2"Pop-up menu to find out what file is to be loaded for the restart."*)

(defvar *LAST-TIME-OPERATION*  nil2 "The last time-operation in this simulation."*)

(defvar *TIME-STEPS* 0 2"The number of time-steps for which the simulation will take place."*)

(defvar *DUMP-INTERVAL* nil 2"The number of time-steps between dumps of dynamic-vars, or nil."*)

(defvar *SNAPSHOT-INTERVAL* nil 2"The number of time-steps between performance snapshots, or nil."*)

(defvar *S-EXT* nil 2"Filename extension for datafiles created during this execution."*)

(defvar *NEXT-BREAK* nil)
```

APPENDIX B

```
(defun user:W-E-OPERATION (operation-number)
  (do ((operation (real-operation operation-number) (op-preceding-operation operation)))
      ((not (op-optimizing? operation)))
    (user:wep operation)))


(defun user:WEP (proc)
  (let ((operation (real-operation proc)))
    (format t 2"~%~A, done-to ~D, w-e-queue ~A, expected-input ~A, doing "*
            operation
            (operation-simple-load-check-time operation)
            (op-queue operation)
            (op-expected-input operation))
    (dolist (machine (op-machines operation))
      (format t 2"~A ~A, "* machine (cdr (assoc operation (m-doing machine)))))))


(defun user:W-E-CHECK (operation-number time-limit)
  (do ((limit time-limit (- limit (op-run-time operation)))
       (operation (real-operation operation-number) (op-preceding-operation operation)))
      ((or (< limit *current-time*) (null operation)))
    (format t
            2"~%~A, time ~D, queue ~A, doing "*
            operation
            limit
            (lots-on-queue operation))
    (dolist (machine (op-machines operation))
      (if (eq (m-status machine) 'running)
          (format t 2" ~A"* (cdr (assoc operation (m-doing machine))))))
    (format t
            2", w-e-queue ~A, expected-input ~A, done to ~A"*
            (op-queue operation)
            (op-expected-input operation)
            (operation-simple-load-check-time operation))
    (let ((r-feeder (rework-feeder operation)))
      (when r-feeder
        (format t "2~2%  Rework steps:"*)
        (user:w-e-check r-feeder limit)
        (terpri)))))


(defun user:M-C (machine &optional (time-limit (+ *current-time* 20)))
  (untrace dmos:operation-simple-load-check-time)
  (format t "2~2%time: ~A"* *current-time*)
  (terpri)
  (dolist (operation (m-operations (real-machine machine)))
    (user:w-e-check operation time-limit)
    (terpri)
    (terpri)))
```

```
;1; The rework operation that feeds this operation, if any.*
(defun REWORK-FEEDER (operation)
  (let ((operation-before (op-preceding-operation operation)))
    (and operation-before
         (op-rework-pointer operation-before)
         (rs-end (op-rework-sequence (op-rework-pointer operation-before))))))

;1; The next two functions are to be called before doing anything that changes*
;1; the state* 1of the machine or operation, or requires correct information about the*
;1; machine* 1or operation, so far as moving lots around is concerned.  Currently*
;1; they are* 1called many times, probably often redundantly, but they won't take*
;1; up much* 1time when they're redundant.  Later on we may figure out which*
;1; calls are* 1redundant and can be eliminated.*
(defun CHECK-MACHINE-STATE (machine)
  ;1; This will be true only the first time this machine is reached in the current*
  ;1; LOCAL-OPTIMIZE call.  *
  (when (and *optimizing* (not (m-optimizing? machine)))
    (initialize-machine-for-optimization machine)))


(defun CHECK-OPERATION-STATE (operation &optional (time *current-time*))
  (when *optimizing*
    (unless (op-optimizing? operation)
      (initialize-operation-for-optimization operation))
    (let ((constraint (op-constraint-starter operation)))
      (when (and constraint (not (stc-optimizing? constraint)))
        (initialize-constraint-for-optimization constraint time)))))


(defun CHECK-CONSTRAINT-STATE (constraint &optional (time *current-time*))
  (when *optimizing*
    (unless (stc-optimizing? constraint)
      (initialize-constraint-for-optimization constraint time))))


(defun OPERATION-EARLIEST-LOT-TIME (operation)
  (caar (op-queue operation)))


;1; The first time when a lot is available for any operation that the machine runs, or nil.*
;(defun MACHINE-EARLIEST-LOT-TIME (machine &aux (time nil))
;  (check-machine-state machine)
;  (dolist (operation (m-operations machine) time)
;    (check-operation-state operation)
;    (let ((pairs (op-queue operation)))
;      (if pairs
;          (if time
;              (if (< (caar pairs) time)
;                  (setq time (caar pairs)))
;              (setq time (caar pairs)))))))
;
```

```
(defun MACHINES-LOADABLE-BY (load-time operation &optional (time *current-time*) &aux loadable-machines)
  (check-operation-state operation time)
  (if load-time
      (dolist (machine (op-machines operation) loadable-machines)
        (check-machine-state machine)
        (if (and (eq (m-status machine) 'free)
                 (<= (machine-operation-simple-load-check-time machine operation) load-time))
            (push machine loadable-machines)))))
;1; -*- Package: DMOS; Mode: COMMON-LISP; Base: 10.; Fonts: MEDFNT,HL12B,HL12BI -*-*

;1; 4/14/86*


(defun INITIALIZE-CONSTRAINT-FOR-OPTIMIZATION (constraint &optional (time *current-time*))
  (setf (stc-optimizing? constraint) t)
  (setf (stc-temp-wait-for-availability constraint)
        (max 0 (- (constraint-next-availability constraint) time)))
  ;1; Save the real state, for when we're through optimizing.*
  (save-constraint-state-to constraint (stc-real-state constraint)))


(defun INITIALIZE-OPERATION-FOR-OPTIMIZATION (operation)
;  (when (memq (op-operation-number operation) '(71 75))
;    (print (op-operation-number operation))
;    (break "initialize-operation-for-2optimization"*))
  (setf (op-optimizing? operation) t)
;  (setf (op-expected-input operation)
;        (queue-to-expected-input (op-queue operation)))
  ;1; Save the real state, for when we're through optimizing.*
  (save-operation-state-to operation (op-real-state operation)))


(defun INITIALIZE-MACHINE-FOR-OPTIMIZATION (machine)
  (if (and *keeping-machine-history*) ;1 *(memq (m-number machine) '(107 108 109 110 45 46 92 93)))
      (setf (m-history machine) (cons (list 'INITIALIZE-MACHINE-FOR-optimization *current-time*)
                                      (m-history machine))))

  (setf (m-optimizing? machine) t)
  ;1; Save the real state, for when we're through optimizing.*
  (save-machine-state-to machine (m-real-state machine))
  (dolist (pair (m-checked-up-to machine))
    ;1; We have not already checked for loading at this time.*
    (rplacd pair (1- *current-time*)))
  (if (eq (m-status machine) 'running)
      (unload machine (m-expect-available-at machine))))


;1; Restore the operation after optimization.*
(defun RESTORE-OPERATION (operation)
  (setf (op-optimizing? operation) nil)
  (restore-operation-state-from operation (op-real-state operation)))
```

```
;1; Restore the machine after optimization.*
(defun  RESTORE-MACHINE (machine)
  (setf (m-optimizing? machine) nil)
  (restore-machine-state-from machine (m-real-state machine)))


(defun RESTORE-CONSTRAINT (constraint)
  (setf (stc-optimizing? constraint) nil)
  (restore-constraint-state-from constraint (stc-real-state constraint)))


(defun SAVE-CONSTRAINT-STATE-TO (constraint state-holder)
  ;1; Have to do this -- otherwise structure will be shared, and you may want the optimize next-available-times again.*
  (copy-simple-alist (stc-next-available-times constraint)
                     (stc-state-holder-next-available-times state-holder)))


(defun RESTORE-CONSTRAINT-STATE-FROM (constraint state-holder)
  ;1; Have to do this -- otherwise structure will be shared, and you may want the optimize next-available-times again.*
  (copy-simple-alist (stc-state-holder-next-available-times state-holder)
                     (stc-next-available-times constraint)))
(defun SAVE-OPERATION-STATE-TO (operation state-holder)
;  (setf (op-state-holder-expected-input state-holder) (copytree (op-expected-input operation)))
  (let ((queue0 (op-queue operation))
        (queue1 (op-state-holder-queue state-holder)))
    (setf (op-state-holder-queue state-holder) (copy-queue-over queue0 queue1))))


(defun RESTORE-OPERATION-STATE-FROM (operation state-holder)
  ;1; Have to do this -- otherwise structure will be shared, and you may want the optimize queue again.*
  (let ((queue0 (op-queue operation))
        (queue1 (op-state-holder-queue state-holder)))
    (setf (op-queue operation) (copy-queue-over queue1 queue0))))


(defun SAVE-MACHINE-STATE-TO (machine state-holder)
  (setf (m-state-holder-status state-holder) (m-status machine))
  (setf (m-state-holder-last-loaded-at state-holder) (m-last-loaded-at machine))
  (setf (m-state-holder-last-unloaded-at state-holder) (m-last-unloaded-at machine))
  (setf (m-state-holder-lots-done-on-operation state-holder) (m-lots-done-on-operation machine))

  (setf (m-state-holder-expect-available-at state-holder) (m-expect-available-at machine))
  (do ((doing (m-doing machine) (cdr doing))
       (saved-doing (m-state-holder-doing state-holder) (cdr saved-doing)))
      ((null doing))
    (rplacd (car saved-doing) (copylist (cdar doing))))
  (let ((save-space (m-state-holder-instructions state-holder))
        (real-ones (m-instructions machine)))
    (copy-over (car real-ones) (car save-space))
    (copy-over (cdr real-ones) (cdr save-space))))
```

```
(defun RESTORE-MACHINE-STATE-FROM (machine state-holder)
  (setf (m-status machine) (m-state-holder-status state-holder))
  (setf (m-last-loaded-at machine) (m-state-holder-last-loaded-at state-holder))
  (setf (m-last-unloaded-at machine) (m-state-holder-last-unloaded-at state-holder))
  (setf (m-lots-done-on-operation machine) (m-state-holder-lots-done-on-operation state-holder))
  (unless (numberp (m-state-holder-expect-available-at state-holder))
    (break "restore-machine-state-from2"*))
  (setf (m-expect-available-at machine) (m-state-holder-expect-available-at state-holder))
  (do ((doing (m-doing machine) (cdr doing))
       (saved-doing (m-state-holder-doing state-holder) (cdr saved-doing)))
      ((null doing))
    (rplacd (car doing) (cdar saved-doing)))
  (let ((save-space (m-state-holder-instructions state-holder))
        (real-ones (m-instructions machine)))
    (copy-over (car save-space) (car real-ones))
    (copy-over (cdr save-space) (cdr real-ones))))


;1; &&&&&&&&&&&&&&&&&&&&&&&&&&&&&&&&&&&&&&&&&&&&&&&&&&&&&&&&&&&&&&&*

;1; Functions for debugging:*

(defun user:W-E-TRACE ()
  (trace (preliminary-w-e-check :break t))
  (trace (operation-load-high-lower-bound :break t))
;  (trace machine-load-high-lower-bound)
  (trace (operation-when-expected :break t))
  (trace (check-to-bound :break t))
  (trace when-expected-load-machines)
  (trace number-of-lots-on-queue operation-simple-load-check-time
         machines-loadable-by check-for-load unload))
  ;1; -*- Package: DMOS; Mode: COMMON-LISP; Base: 10.; Fonts: MEDFNT,HL12B,HL12BI -*-*

  ;1; 3/18/86*

  ;1; This file contains the declarations of variables whose values are fixed from simulation to simulation.*


  ;1; Constants:*


  ;1; Characters:*
  (defconst *ETA* (character 6))
  (defconst *EOF* (character 3))
  (defconst *SPACE* #\space)
  (defconst *SLASH* #\/)
  (defconst *CR* #\newline)
  (defconst *DMOS-FLOW-DIVIDERS* '(#\|))

  (defconst *LINE-ENDERS* (list #\newline (character 3)))
  (defconst *DMOS-FLOW-BREAKS* (list #\| #\newline (character 3)))

  ;; fconst *READING-LIST* (make-list 20))
```

```
(defconst *READING-STRING* (make-string 32 :initial-element 32))
;1; Global variables:*

(defvar tv:process nil)

;1; The character most recently read.*
(defvar *CHAR* 0)

;1; Stream to read the text from.*
(defvar *FE-STREAM* nil)

(defvar *read-debugging* nil)

(defvar *EDITOR-WINDOW* nil)

(defvar *GUIDE-ALIST* nil)
(defvar *ERROR-LINES* nil)

(defvar *TEXT-ARRAY* nil)

(defvar *DIVIDERS* nil)
(defvar *breaks*  nil)

;1; E.g., "XP INTERNAL".*
(defvar *OPERATION-NAMES* nil)
;1; E.g., "PW101".*
(defvar *MACHINE-NAMES* nil)


;1; The big array for operations.*
(defvar *DMOS-FLOW-TEXT-ARRAY* nil)
(defvar *MTBF-TEXT-ARRAY* nil)

(defvar *DMOS-FLOW-TEXT-ARRAY-SIZE* 1200)
(defvar *MTBF-TEXT-ARRAY-SIZE* 350)

(defvar *DOUBLE-MACHINES* nil)

;1; We keep track of this so we know when we have a new (i.e., different from last time) simul:      ame.*
(defvar *SIMULATION-FRAME* nil)
                              initial
;;        variable            value    documentation
;;

(defvar *GAUSS-ARRAY*        nil         2"Array containing the integrated gaussian"*)

(defvar *FIRST-OPERATION* nil)
;1; The last operation in the factory.*
(defvar *FINAL-OPERATION* nil)

;1; These map names of things onto things.*
;1; Maps name-number pairs, like ("PW" . 104), onto machines.*
```

```
(defvar *MACHINE-NAME-ARRAY* nil)
;1; Maps names, like "XP INTERNAL", onto operations.*
(defvar *OPERATION-NAME-ARRAY* nil)
;1; Maps names, like "PW", onto machine types.*
(defvar *MACHINE-TYPE-NAME-ARRAY* nil)

;1; Feed (cdr pair) lots at (car pair) steps from beginning of feed-rate cycle.*
(defvar *FEED-LIST* '((0 . 1) (10 . 1) (20 . 1) (30 . 1)))
;1; Specifies feed cycle.*
(defvar *FEED-RATE* 86)


(defvar *LOG-POINTS* nil)
;1; Not called *modules* because there is a system variable called that.*
(defvar *DMOS-MODULES* nil)
(defvar *OPERATIONS* nil)
(defvar *MACHINES* nil)
(defvar *MACHINES-IN-ORDER* nil)
(defvar *MACHINE-TYPES* nil)
(defvar *MODULE-MOVE-ARRAY* nil)
(defvar *SAFE-TIME-CONSTRAINTS* nil)
(defvar *REWORK-SEQUENCES* nil)

(defvar *DEFAULT-DOWNTIME-FREQUENCY* '(7200))
(defvar *DEFAULT-DOWNTIME-LENGTH* '(40))
;1; The setup time to be assigned to all operations for which no reasonable guess can be made at a setup time.*
(defvar *DEFAULT-SETUP-TIME* 0)

(defvar *DEFAULT-MACHINE-USAGE-MARGIN* .20)
(defvar *DEFAULT-REWORK-FACTOR* .1)
(defvar *DEFAULT-SETUP-TIME-FACTOR* 1.0)
(defvar *DEFAULT-LOT-FACTOR-LIST* '(1.0 1.0 1.0))

;1; Are we doing local optimization?*
(defvar *OPTIMIZING* nil)


;1; Things about debugging.*
(defvar *READ-DEBUGGING* nil)
(defvar *CONTENTION-DEBUGGING* nil)
(defvar *OPERATION-INIT-DEBUGGING* nil)
(defvar *LOAD-DEBUGGING* nil)

(defvar *LONG-EXPERIMENT* nil)
(defvar *CYCLE-TIME-AND-STUFF-LIST* nil)
(defvar *KEEPING-MACHINE-HISTORY* nil)
(defvar *KEEPING-MODULE-SHIFTS* nil)
(defvar *KEEPING-QUEUE-WAITS* nil)
(defvar *QUEUE-WAIT-OPERATIONS* nil)
(defvar *INITIAL-QUEUE-WAIT-BOUND* 50)

;1; Total number of operations involved in the selected part of the operation.*
(defvar *NUMBER-OF-OPERATIONS* 0
  2"Total number of operations involved in the selected part of the manufacturing operation."*)
```

```
(defvar *NUMBER-OF-MACHINES* 0)

;1; These constants are used by Sanjiv's message-list.*
(defconst *ARRAY-LENGTH* 1024 2"The number of elements in the timed instruction arrays."*)
(defconst *BINARY-ARRAY-LENGTH* (haulong (1- *array-length*)))
(defconst *BUCKET-LIST-SIZE* 20)

(defconst *INTEGRATION-ACCURACY* 5000 2"Degree of accuracy for the Gaussian integration"*)


;1; Temporary*
(defun user:POWERSET (set)
  (let ((subsets (list nil)))
    (dolist (element set subsets)
      (dolist (subset subsets)
        (push (cons element subset) subsets)))))

> (mv 'om101)
NUMBER:  224
MTBF-LINE:  MTBF-DL-OM101
OPERATIONS:  (OP-20-10 OP-115-431)
REWORK-CPERATIONS:  -
NON-REWORK-OPERATIONS:  -
NAME:  OM101
MACHINE-TYPE:  OM
MODULE:  -
MAX-CAPACITY:  2
SCHEDULED-DOWNTIME-FREQUENCY:  '(7200)
SCHEDULED-DOWNTIME-LENGTH:  (40)
MTBF:  2694
MTTR:  14
MTBA:  144
MTTA:  1
USAGE:  6.108
SIDES:  -
STATUS:  RUNNING
CONTENTION:  ((OP-115-431   1.0) (OP-20-10   0.0))
AVAILABILITY:  0.982
TOTAL-BROKEN-TIME:  0
TOTAL-MAINTENANCE-TIME:  0
TOTAL-RUNNING-TIME:  105
LAST-UNBROKEN-STATUS:  FREE
LOTS-DONE-ON-OPERATION:  5
LOTS-DONE-ON-SIDE:  2
LAST-LOADED-AT:  194
NEXT-MAINTENANCE-TIME:  -
EXPECT-AVAILABLE-AT:  206
DOING:  ((OP-115-431 (LOT10 LOT11)) (OP-20-10   NIL))
INSTRUCTIONS:  (T ROUND-ROBIN NIL T NIL)  (NIL NIL NIL NIL NIL)
BEING-TRACKED:  -
HISTORY:  -
TEMP:  -
```

```
DEBUG:  -
SCHEDULING-TYPE:  ROUND-ROBIN
WAITING-TIME:  Ø
OPTIMIZING?:  -
LAST-UNLOADED-AT:  189
CHECKED-UP-TO:  ((OP-115-431 . 194) (OP-2Ø-1Ø . 194))
REAL-STATE:  #S(MACHINE-STATE-HOLDER STATUS RUNNING OPERATIONS (OP-115-431 OP-2Ø-1Ø) LAST-LOADED-AT 194 LAST-UNLOADED-AT 189 LOTS-DO
NE-ON-OPERATION 5 EXPECT-AVAILABLE-AT 2Ø6 DOING ((OP-115-431 LOT1Ø LOT11) (OP-2Ø-1Ø)) INSTRUCTIONS ((T ROUND-ROBIN NIL T NIL) NIL NI
L NIL NIL NIL))
OPTIMIZE-TIME:  -
NIL
>
>
>
>
>
>
>
>
> (pv 2Ø 1Ø)
OPERATION-LINE:  OP-DL-2Ø-1Ø
MACHINE-LINES:  (M-DL-4 M-DL-3 M-DL-2)
MODULE:  MODULE1
DESCRIPTION:  WIS INSPECT
LOG-POINT:  LP2Ø
OPERATION-NUMBER:  1Ø
RUN-TIME:  2
SLICES-PER-RUN:  24
LOAD-TIME:  -
SETUP-TIME:  Ø
TIME-DEPENDENCY:  Ø
NEXT-OPERATION:  OP-2Ø-2Ø
PRECEDING-OPERATION:  -
MACHINES:  (OM1Ø1 OM1Ø4 OM1Ø3 OM1Ø2)
REWORK-SEQUENCE:  -
REWORK-POINTER:  -
AVAILABILITY:  Ø.981
CONSTRAINT-STARTER:  -
CONSTRAINT-MEMBER:  -
USAGE:  2.Ø38
QUEUE:  ((NIL LOT12))
DOING:  ((OM1Ø1   NIL) (OM1Ø4   NIL) (OM1Ø3   NIL) (OM1Ø2   NIL))
CUMULATIVE-WAIT:  Ø
OPTIMIZING?:  -
EXPECTED-INPUT:  -
REAL-STATE:  #S(OPERATION-STATE-HOLDER QUEUE NIL EXPECTED-INPUT NIL)
QUEUE-TIME-ARRAY:  -
BEING-TRACKED:  -
TEMPØ:  T
TEMP1:  -
NIL
>
>
```

```
>
>
>
> (lv 20)
 ** LV is not a function
> (dribble-end)


;1; -*- Package: DMOS; Mode: COMMON-LISP; Base: 10.; Fonts: MEDFNT,HL12B,HL12BI -*-*

;1; 3/18/86*

;1; Structures.*


(defstruct (MODULE (:conc-name 2"MOD-"*)
                   (:print-function (lambda (p s n) n (princ 2"MOD"* s) (princ (mod-number p) s))))
  number
  log-points
  machines)

(defstruct (LOG-POINT (:conc-name 2"LP-"*)
                      (:print-function (lambda (p s n) n (princ 2"LP"* s) (princ (lp-number p) s))))
  number
  mod
  description
  operations)


(defstruct (OPERATION (:conc-name 2"OP-"*)
                      (:print-function (lambda (p s n) n
                                          (princ (op-name p) s))))
;1; The operation line (defstruct) that belongs to this operation.*
  operation-line
;1; The machine lines (defstructs) that belong to this operation.*
  machine-lines

 1; -------------------------------------------------------------*

 1; Static variables direct from <operation-line> and <machine-lines>.*

  module
  description
  ;1; A log point? not a number.*
  log-point
  operation-number
  run-time
  slices-per-run
  load-time
  setup-time
  time-dependency
```

```
;1; -----------------------------------------------------------------*

;1; Other static variables.*

  name
  next-operation
  preceding-operation
  ;1; Machines, not numbers.*
  machines
  ;1; The rework sequence that this operation is in, or nil.*
  rework-sequence
  ;1; The start of the rework sequence branched to from this operation, if this operation is a rework decision point.*
  rework-pointer
  ;1; Factor, like .93.*
  ;1; Equals average availability of machines that do the operation*
  availability
  ;1; The time constraint that this operation starts, or nil.*
  constraint-starter
  ;1; The time constraint that this operation is a member of, or nil.*
  constraint-member
     usage

 ;1; -----------------------------------------------------------------*

 ;1; Dynamic variables.*

   ;1; The current queue for the operation (at the current queue-stack level).  A list of (time . lots) pairs.*
   queue
   ;1; This is needed only for display purposes - m-doing won't do, because*
   ;1; stuff stays on m-doing until the machine is reloaded.*
   doing
   ;1; Total time that lots have spent on the queue for this operation. *
   cumulative-wait

 ;1; -----------------------------------------------------------------*

 ;1; Variables for when-expected and local-optimization:*

   optimizing?
   ;1; Where you keep a record of what got onto the operation in when-expected.*
   ;1; This is like when-expected-queue, but all the stuff that was ever on the*
   ;1; queue is retained.  For now it is totally recreated in each call to*
   ;1; when-expected.  [[Right now this is not used for anything.  4/30*
   expected-input
   ;1;*
   real-state

 ;1; -----------------------------------------------------------------*

 ;1; Utility variables.*

   ;1; Array that assigns the number of lots that waited for time to times.*
   queue-time-array
```

```
  ;1; This will be a list of all the machines that do this operation and are being traced.*
  being-tracked
  ;1; For storing temporary numbers during computations.*
  temp0
  temp1)


(defstruct (MACHINE (:conc-name 2"M-"*)
                    (:print-function (lambda (m s n) n (princ (m-name m) s))))
,1; Static variables:*

  ;1; So we will have a standard ordering on machines.*
  number
  ;1; The line in the mtbf array for this machine.*
  mtbf-line
  ;1; The simulation operations (not numbers) that use the machine.*
  operations
  ;1; The rework simulation operations (not numbers).*
  rework-operations
  ;1; The non-rework simulation operations (not numbers).*
  non-rework-operations
  ;1; A string, e.g., 2"PW104"*.*
  name
  ;1; A defstruct.*
  machine-type
  module
  ;1; The most lots the machine can take.*
  max-capacity
  scheduled-downtime-frequency
  scheduled-downtime-length
  mtbf
  mtba
  mtta
  ;1; The value of BASIC-USAGE for the machine.*
  usage
  ;1; A grouping of the operations that the machine does into equivalence classes*
  ;1; according to setup time and operation time.  This will be nil unless the*
  ;1; machine is a double machine.*
  sides
  status
  ;1; An association-list of (operation . usage) pairs, where usage is the*
  ;1; proportion of the operation that the machine does.*
  contention
  ;1; Percentage of time that the machine is not broken or being maintained.*
  availability

;1; -----------------------------------------------------------------*

;1; Dynamic variables.*

  total-broken-time
```

```
total-maintenance-time
total-running-time
last-unbroken-status
;1; Number of lots done without changing operation.*
lots-done-on-operation
;1; Number of lots done without changing side.*
lots-done-on-side
;1; Time the machine was last loaded, *or* returned to running status after a break.*
last-loaded-at
;1; Time machine is next scheduled for maintenance, if any.*
next-maintenance-time
;1; Time machine will unload (if running) or come up (if down for maintenance).*
expect-available-at
;1; Contains pairs of the form (operation . lots), where the lots are the ones that this machine is doing the operation to.*
doing
;1; Cons of load-lots-instruction and maintain-instruction.*
instructions
;1; This will be nil, or a list of the operations that this machine does (a copy of*
;1; operations -- we don't want to use operations because it changes*
;1; order and makes the tracking hard to follow).*
being-tracked
;1; To store history, for debugging.*
history
;1; To store any convenient temporary value.*
temp
;1; To store temporary stuff for debugging.*
debug

;1; --------------------------------------------------------------*

;1; Variables for when-expected and local optimizations:*

  ;1; This will determine what sort of scheduling is to be used for the machine.*
  ;1; Options, for now, are 'local-optimize, 'bottleneck, 'constraint-member, and*
  ;1; 'round-robin.*
  scheduling-type
  ;1; If a local optimization has been done and the machine is waiting to be*
  ;1; loaded at a certain time, this will be the time; otherwise nil.*  1This will be*
  ;1; used by SCHEDULE.  Interacts with an OPTIMIZE message, which local*
  ;1; optimization sends, in order to make the scheduler check for load at a*
  ;1; certain time later on.*
  waiting-time
  ;1; Is this machine involved in the optimization now being done?*
  optimizing?
  ;1; For use in when-expected.*
  last-unloaded-at

  ;1; For use in when-expected; this is a list of (operation . time) pairs that show*
  ;1; for each operation that the machine does, the earliest lower bound on when*
  ;1; it might get loaded.  If time is nil it will never get loaded in the current*
  ;1; when-expected.  <Time> will never decrease within a single* 1when-expected.*
  checked-up-to
  ;1; To save states.*
```

```
  real-state
  ;1; The time you're doing when-expected in order to load the machine at.*
  optimize-time)


(defstruct (MACHINE-TYPE (:conc-name 2"MT-"*)
                         (:print-function (lambda (mt s n) n (princ (mt-name mt) s))))
  ;1; A string, like 2"PW"*.*
  name
  ;1; List of all simulation machines of the type.*
  ;1; [[Can we assume that either all or none of the machine are simulation machines?* -
  machines
  ;1; Basic bottleneck factor for the machine type.*
  usage
  ;1; The simulation operations (not numbers).*
  operations
  rework-operations
  non-rework-operations)


(defstruct (SAFE-TIME-CONSTRAINT
             (:conc-name 2"STC-"*)
             (:print-function (lambda (stc s n)
                                n
                                (princ 2"STC"* s)
                                (princ (op-operation-number (stc-beginning stc)) s))))
  beginning
  end
  operations
  length
  ;1; The longest operation time of any operation in the constraint.*
  greatest-operation-time
  ;1; The (first) operation with greatest-operation-time.*
  controlling-operation
  ;1; The time it takes for a lot to get from the start of the sequence to the controlling operation.*
  ;1; Currently includes setup-time and operation-time for the intermediate operations.*
  time-to-controlling-operation
  ;1;  Alist of next possible starting times for the sequence,*
  ;1;  assigned to* 1machines that do <controlling-operation>.  *
  next-available-times
  ;1; For use in ESTIMATE-WAIT-TIME.*
  temp-wait-for-availability
  ;1;  This is the number of lots that you think of as going through the* 1constraint*
  ;1; together; it* 1depends on the number of lots that the machines do,* 1their*
  ;1; operation times, and* 1the number of machines available for each operation.*
  ;1; Important thing is the ratio of operation times to the greatest operation time.*
  lot-#
  ;1; To save state while doing local optimization.*
  real-state
  ;1; Is this constraint involved in the current local optimization?*
  optimizing?)
```

```
(defstruct (LOT
             (:print-function (lambda (lot s n)
                                n
                                (print 2"LOT"* s)
                                (princ (lot-number lot) s))))
  number
  ;1; A pair (operation . machine), where <machine> is the machine that's doing*
  ;1; <operation> to <lot>, or nil if <lot> is on the queue.*
  position
  ;1; Some sort of loading  priority -- to be used later.*
  priority
  ;1; The reworks that have been done to this lot -- code for this to be implemented later.*
  reworks-done
  ;1; The most recent time this lot got put onto a queue.*
  last-queue-entry-time
  number-of-slices
  ;1; True when you're tracking <lot>.*
  being-tracked)


(defstruct (SIDE
             (:print-function (lambda (side s n)
                                n
                                (princ 2"SIDE: "* s)
                                (princ (side-operations side) s))))
  operations
  capacity
  ;1; For use in FIND-GOOD-SIDES*
  lot-count
  ;1; For use in FIND-GOOD-SIDES*
  time-count)


(defstruct (REWORK-SEQUENCE
             (:conc-name 2"RS-"*)
             (:print-function (lambda (rw s n)
                                n
                                (princ 2"RS"* s)
                                (princ (op-operation-number (rs-beginning rw)) s))))
  number
  beginning
  end
  decision-point
  operations)


(defstruct (MACHINE-STATE-HOLDER
             (:conc-name 2"M-STATE-HOLDER-"*))
```

```
 status
 operations
 last-loaded-at
 last-unloaded-at
 ;1; Number of lots done without changing operation.*
 lots-done-on-operation
 expect-available-at
 doing
 instructions)


defstruct (OPERATION-STATE-HOLDER
            (:conc-name 2"OP-STATE-HOLDER-"*))
 queue
 expected-input)


(defstruct (SAFE-TIME-CONSTRAINT-STATE-HOLDER
            (:conc-name 2"STC-STATE-HOLDER-"*))
 next-available-times)
 (defun MAKE-EMPTY-SAFE-TIME-CONSTRAINT-STATE-HOLDER (safe-time-constraint)
   (make-safe-time-constraint-state-holder
     :next-available-times (mapcar #'(lambda (x) (cons x 0))
                                    (op-machines (stc-controlling-operation safe-time-constraint)))))


 (defun MAKE-EMPTY-MACHINE-STATE-HOLDER (machine)
   (make-machine-state-holder
     :operations (copylist (m-operations machine))
     :doing (mapcar #'list (m-operations machine))
     :instructions (cons (make-list 5) (make-list 5))))


 (defflavor SIMULATION-FRAME
            (dmos-flow-text-array
             operation-name-array
             machine-name-array
             operations
             machines
             unload-array
             maintain-array
             on-line-array
             break-array
             fix-array
             load-array
             create-array
             optimize-array
             snap-array
             dump-array)
            ()
```

```
  :settable-instance-variables
  :inittable-instance-variables
  :gettable-instance-variables)

(defstruct (MACHINE-FULL-DYNAMIC-STATE
             (:conc-name 2"SAVED-FULL-M-"*))
  operations
  status                                ;1 Loading on round-robin can reorder this.*
  last-unbroken-status
  last-loaded-at
  next-maintenance-time
  expect-available-at
  doing
  instructions)


(defun MAKE-NEW-MACHINE (name operations)
  (make-machine
    :name name
    :operations operations
    :status 'free
    :total-running-time 0
    :total-broken-time 0
    :total-maintenance-time 0
    :last-unbroken-status 'free
    ;1; We don't need 5 for maintenance instructions, except it makes post-machine-instruction simpl-
    ;1; We also don't need the first (machine) position, except for symmetry with timed instructions
    :instructions (cons (make-list 5) (make-list 5))))


(defflavor SIMULATOR-STATE
   (next-period
    period-start-time
    machines-to-check
    feed-counter
    lots-in-plant
    unload-array
    maintain-array
    on-line-array
    break-array
    fix-array
    load-array
    create-array
    optimize-array
    snap-array
    dump-array
    bucket-list
    current-time
    last-lot-id
    broken-machines
    lot-cycle-time
```

```
          time
          operations
          machines)
         ()
 :settable-instance-variables
 :inittable-instance-variables
 :gettable-instance-variables)

;1; -*- Package: DMOS; Mode: COMMON-LISP; Base: 10.; Fonts: MEDFNT,HL12B,HL12BI -*-*

;1; 1/15/86*

;1; Stuff about the initialization menu.*

(defvar *READ-FILE* nil)

;1; Define the variable list for the menu.*
(defconst *INIT-MENU-PARAMETER-LIST*
          '(2""*
            (*read-file*     "2   Read the text file?"*
                             :documentation "2Change it only if it's nil and you want to reread the text file."*)
            (*feed-rate*     2"   Feed rate"*
                             :documentation 2"Length of feed cycle."*
                             :number)
            (*long-experiment*
                             "2   Long experiment?"*
                             :documentation "2Do you want to garbage collect and save stuff every 5000 steps?"*)
            (*datafile-ext* 2"   File suffix"*
                             :documentation 2"Filename extension for the datafiles created during this run."*
                             :string)
            (*time-steps* 2"   Time steps"*
                           :documentation 2"The duration of the simulation.  Each time step is 0.1 hours."*
                           :number)
            (*dump-interval*
              2"   Dump interval"*
              :documentation
2               "The number of time steps between dumps saving the complete state of the simulator, or nil."*)
            (*snapshot-interval* 2"   Snapshot interval"*
                                   :documentation
                                   2"The number of time steps between snapshots of factory performance, or nil."*)
            (*keeping-machine-history*  2"   Keep machine history?"*
                                          :documentation
                                          2"Store record of loads, etc., of each machine in m-history."*)
            (*keeping-queue-waits*  2"   Keep wait times?"*
                                      :documentation
                                      2"Store record wait time distributions for each operation."*)
            (*keeping-module-shifts* 2"   Keep module shifts?"*
                                       :documentation
                                       2"Lot count of external and internal module shifts."*)
            (*next-break* 2"   When to break?"*)
```

```
          (*rebuild* 2"   Rebuild operations, etc?"*
                     :documentation "2Reinitialize static values for operations, machines, etc."*)
          2""*))


(defun INIT-PARAMETERS ()    2"Initializes the parameters using a menu."*
  ;1; Set the parameters to their default values.*
  (setq *read-file* (if *dmos-flow-text-array* nil t)
        *feed-rate* 104
        *long-experiment* nil
        *time-steps* 100000
        *dump-interval* nil
        *snapshot-interval* nil
        *datafile-ext* 2"tmp"*
        *next-break* 20000
        *keeping-machine-history* nil
        *keeping-queue-waits* nil
        *keeping-module-shifts* nil
        *rebuild* nil)
  ;1; Invoke the menu.*
  (tv:choose-variable-values *init-menu-parameter-list*
                             :label 2"  DMOS IV Simulator   Version 1.0"*
                             :margin-choices '(2"          Continue"*))
  (do ( )
      ((not (string-search-set 2". *    2"* *datafile-ext*)))      1; No invalid filenames allowed.*
    (format t
          2"~&The file extension which you entered , ~A is illegal.  Enter another: "*
          *datafile-ext*)
    (setq *datafile-ext* (readline)))
  (if (equal2 ""* *datafile-ext*) (setq *datafile-ext* nil)))


(defun BUILD-FILE-CHOICE-MENU ()
  ;1; Get a pathname for the files and get the list of pathnames.*
  (let* ((files
          (cdr (mapcar (function car)
                       (fs:directory-list (fs:merge-pathnames 2"dump-*.*"* *dirpath*)))))
         ;1; List of filename extensions of the sets of files that can be displayed.*
         ;1; Get the extensions as strings only.*
         (somefiles
          (mapcar (function (lambda (file) (format nil 2"~A.~A"* (send file :name) (send file :type))))
                  files))
         ;1; The general-list of items for the menu.*
         (choices
          (append (list (list 2"Re-Initialize"*
                              :value nil
                              :documentation
                              2"Start the simulation at time 0 with no lots on any operation queue."*
                              :font fonts:hl12bi))
                  (mapcar (function (lambda (file) (list file
                                                         :value file
                                                         :documentation 2"Click any to choose this file."*)))

                          somefiles))))
```

```
(if *file-choice-menu*
    (funcall *file-choice-menu* :set-item-list choices)
    (setq *file-choice-menu* (tv:make-window   1; Define the main menu.*
                               'tv:pop-up-menu
                               :label 2"Choose One to Load"*
                               :default-font fonts:hl12b
                               :borders 2
                               :name 2"DMOS IV Simulator menu one"*
                               :item-list choices)))))

;1; -*- Package: DMOS; Mode: COMMON-LISP; Base: 10.; Fonts: MEDFNT,HL12B,HL12BI -*-*

;1;  5/9/86*

;1; This file contains the initialization functions*

;1; To build the simulation frame, *prior* *to* the simulation.*  1This is built in the*
;1; standard way -- i.e., non-transportation-steps only are selected.*  1This* 1doesn't*
;1; really fill in any structure except for building machines, operations,*
;1; machine-name-array, and operation-name-array.*
(defun BUILD-SIMULATION-FRAME-FROM (&optional (text-array *dmos-flow-text-array*))
  (process-operations text-array)
  (multiple-value-bind (machines machine-name-alist)
      (map-machines-and-operations *operations*)
    (make-instance 'simulation-frame
                   :dmos-flow-text-array *dmos-flow-text-array*
                   :operation-name-array (make-operation-name-array *operations*)
                   ;1; Sort this list, so you can do binary search on it.*
                   :machine-name-array (make-machine-name-array machine-name-alist)
                   :machines machines
                   ;1; We want these in the right order.*
                   :operations *operations*
                   :unload-array
                   (make-array *array-length* :leader-length 2 :named-structure-symbol 'unload-array)
                   :maintain-array
                   (make-array *array-length* :leader-length 2 :named-structure-symbol 'maintain-array)
                   :on-line-array
                   (make-array *array-length* :leader-length 2 :named-structure-symbol 'on-line-array)
                   :break-array
                   (make-array *array-length* :leader-length 2 :named-structure-symbol 'break-array)
                   :fix-array
                   (make-array *array-length* :leader-length 2 :named-structure-symbol 'fix-array)
                   :load-array
                   (make-array *array-length* :leader-length 2 :named-structure-symbol 'load-array)
                   :create-array
                   (make-array *array-length* :leader-length 2 :named-structure-symbol 'create-array)
                   :optimize-array
                   (make-array *array-length* :leader-length 2 :named-structure-symbol 'optimize-array)
                   :snap-array
                   (make-array *array-length* :leader-length 2 :named-structure-symbol 'snap-array)
                   :dump-array
                   (make-array *array-length* :leader-length 2 :named-structure-symbol 'dump-array))))
```

```
(defun MACHINE-NAMES (operation)
  (let ((operation-line (op-operation-line operation))
        (machine-lines (op-machine-lines operation))
        (names))
    (let ((primary-name (op-dl-primary-machine-number operation-line))
          (alternate-name (op-dl-alternate-machine-number operation-line)))
      (if primary-name (push (delete #\space primary-name) names))
      (if alternate-name (push (delete #\space alternate-name) names)))
    (dolist (line machine-lines names)
      (let ((alternate-name (mach-dl-alternate-machine-number line)))
        (if alternate-name (push (delete #\space alternate-name) names))))))


;1; Select operations, create machines, and map machines to operations and vice versa.*
(defun MAP-MACHINES-AND-OPERATIONS (&optional (operations *operations*))
  (dolist (operation *operations*)
    (setf (op-machines operation) nil))
  (let ((machines)                          ;1 To become a list of all machines.*
        (machine-name-alist))               ;1 Pairs machine-names with machines.*
    (dolist (operation *operations*)
      (dolist (name (machine-names operation))
        (let ((pair (assoc name machine-name-alist :test #'string-equal)))
;         (format t "2~% operation ~A, name ~A, pair ~A"* operation name pair)
          (if pair
              (let ((machine (cdr pair)))
                (setf (op-machines operation) (cons machine (op-machines operation)))
                (setf (m-operations machine) (cons operation (m-operations machine))))
              (let ((machine (make-new-machine name (list operation))))
;               (format t "2~% new-machine ~A, name ~A"* machine name)
                (setf (op-machines operation) (cons machine (op-machines operation)))
                (push (cons name machine) machine-name-alist)
                (push machine machines))))))
  (enter-rework-and-non-rework-operations)
  (enter-machine-modules)
  (values machines machine-name-alist)))


(defun ENTER-MACHINE-MODULES ()
  (dolist (machine *machines*)
    (let* ((ops (m-operations machine))
           (mod (op-module (car ops))))
      (setf (m-module machine) mod)
      (dolist (operation (cdr ops))
        (unless (eq (op-module operation) mod)
          (format t
                  "2~% module discrepancy ~A, modules ~A"*
                  machine
                  (mapcar #'m-module ops))
          (return))))))
```

```
(defun ENTER-REWORK-AND-NON-REWORK-OPERATIONS ()
  (dolist (operation *operations*)
    (if (op-rework-sequence operation)
        (dolist (machine (op-machines operation))
          (push operation (m-rework-operations machine)))
        (dolist (machine (op-machines operation))
          (push operation (m-non-rework-operations machine))))))


(defun ENTER-MTBF-INFO (&aux mtbf-file)
  (setq dmos:*datafile-pathname* (fs:merge-pathnames "mtbf.data" (fs:default-pathname)))
  (setq mtbf-file (user:get-file-name "Mtbf data file"))
  (unless *mtbf-text-array* (setq *mtbf-text-array* (make-array *mtbf-text-array-size*)))
  (read-mtbf-file mtbf-file)
  (dotimes (row (length *mtbf-text-array*))
    (let ((mtbf-line (aref *mtbf-text-array* row)))
      (if mtbf-line
          (let* ((name (string-append (mtbf-dl-type mtbf-line)
                                      (format nil "2~A"* (mtbf-dl-id mtbf-line))))
                 (machine (name-to-machine name)))
;           (break "2~% enter-mtbf-info, name ~A, machine ~A, row ~A"* name machine row)
            (cond (machine
                   (setf (m-mtbf-line machine) mtbf-line)
                   (setf (mtbf-dl-machine mtbf-line) machine)
                   (setf (m-mtbf machine) (fix (* 10 (mtbf-dl-base-reliability mtbf-line))))
                   (setf (m-mttr machine) (fix (* 10 (mtbf-dl-base-maintainability mtbf-line))))
                   (setf (m-scheduled-downtime-frequency machine) (list 7200))
                   (setf (m-scheduled-downtime-length machine) (list 40))
                   (setf (m-mtba machine) 144)
                   (setf (m-mtta machine) 1))
                  (t
;;;                (format t "2~% Machine ~A in mtbf data, not in process flow"* name)
                   ))))))
;;;  (format t "2~3%"*)
  (let ((unknown-machines))
   (dolist (machine *machines*)
     (unless (and (integerp (m-mtba  machine)) (eq (m-mtba machine) 144))
       (push machine unknown-machines)))
   (when unknown-machines
;;;      (format t "2~% The following machines are in process flow but not in mtbf data: ~%"*)
;;;      (dolist (machine unknown-machines)
;;;     (format t "2~%       ~A"* machine))
;;;      (format t "2~% They are given default mtbf values."*)
     (dolist (machine unknown-machines)
       (setf (m-mtbf machine) 3000)
       (setf (m-mttr machine) 20)
       (setf (m-scheduled-downtime-frequency machine) (list 7200))
       (setf (m-scheduled-downtime-length machine) (list 40))
       (setf (m-mtba machine) 144)
       (setf (m-mtta machine) 1)))))
```

```
;1; Makes the *operation-name-array*.*
(defun MAKE-OPERATION-NAME-ARRAY (operations &aux operation-name-alist)
  (dolist (operation operations)
    (let* ((name (op-dl-description (op-operation-line operation)))
           (name-pair (assoc name operation-name-alist :test #'string-equal)))
      (if name-pair
          (rplacd name-pair (cons operation (cdr name-pair)))
          (push (cons name (list operation)) operation-name-alist))))
  (let ((operation-name-array
          (make-array (length operation-name-alist)
                      :leader-length 2 :named-structure-symbol 'operation-name-array)))
    (do ((index 0 (1+ index))
         (pairs operation-name-alist (cdr pairs)))
        ((null pairs) (sortcar operation-name-array 'alphalessp))
      (aset (car pairs) operation-name-array index))))


(defun MAKE-MACHINE-NAME-ARRAY (machine-name-alist)
  (do* ((machine-name-array (make-array (length machine-name-alist)
                                        :leader-length 2
                                        :named-structure-symbol 'machine-name-array))

        (index 0 (1+ index))
        (pairs machine-name-alist (cdr pairs)))
       ((null pairs) (sortcar machine-name-array 'alphalessp))
    (aset (car pairs) machine-name-array index)))


;1; Need to reinitialize these every time.  [[Why??*
(defun INIT-VARS-FROM-FRAME (simulation-frame)
  (setq *operation-name-array* (funcall simulation-frame :operation-name-array)
        *machine-name-array* (funcall simulation-frame :machine-name-array)
        *operations* (funcall simulation-frame :operations)
        *machines* (funcall simulation-frame :machines)
        *number-of-machines* (length *machines*)
        *number-of-operations* (length *operations*)
        *unload-array* (funcall simulation-frame :unload-array)
        *maintain-array* (funcall simulation-frame :maintain-array)
        *on-line-array* (funcall simulation-frame :on-line-array)
        *break-array* (funcall simulation-frame :break-array)
        *fix-array* (funcall simulation-frame :fix-array)
        *load-array* (funcall simulation-frame :load-array)
        *create-array* (funcall simulation-frame :create-array)
        *optimize-array* (funcall simulation-frame :optimize-array)
        *snap-array* (funcall simulation-frame :snap-array)
        *dump-array* (funcall simulation-frame :dump-array)))


;1; Set or restore original values of dynamic variables.*
(defun INITIALIZE-ARRAYS ()

(setq *machines-in-order* (sort (copylist *machines*)
                                #'(lambda (m0 m1) (alphalessp (m-name m0) (m-name m1)))))
(setq *bucket-list* (make-list *bucket-list-size*))
```

```
(unless *gauss-array* (setq *gauss-array* (make-gauss *integration-accuracy*)))
(unless *module-move-array*
  (setq *module-move-array*
        (make-array (list (length *dmos-modules*) (length *dmos-modules*)) :type art-16b)))
(cond (*lot-information-array*
       (dotimes (i (car (array-dimensions *lot-information-array*)))
         (let ((pair (aref *lot-information-array* i 1)))
           (rplaca pair nil)
           (rplacd pair nil))))
      (t
       (setq *lot-information-array*
             (make-array '(1000 2) :leader-length 2 :named-structure-symbol 'lot-information-array))
       (dotimes (i 1000)
         (aset (cons nil nil) *lot-information-array* i 1))))
(do ((machines *machines* (cdr machines))
     (machine-counter 0 (1+ machine-counter)))
    ((null machines))
  (let ((machine (car machines)))
    (setf (m-number machine) machine-counter)
    (setf (m-doing machine) (mapcar 'list (m-operations machine)))
    (setf (m-contention machine) (mapcar #'(lambda (x) (cons x 0.0)) (m-operations machine)))
    (setf (m-checked-up-to machine) (mapcar #'(lambda (x) (cons x 0)) (m-operations machine)))
    (setf (m-last-unloaded-at machine) 0)
    (setf (m-real-state machine) (make-empty-machine-state-holder machine))))
(dolist (operation *operations*)
  (setf (op-name operation) (format nil "2OP-~D-~D"*
                                    (lp-number (op-log-point operation))
                                    (op-operation-number operation)))
  (setf (op-real-state operation) (make-operation-state-holder))
  (setf (op-doing operation) (mapcar 'list (op-machines operation))))
(dolist (constraint *safe-time-constraints*)
  (setf (stc-real-state constraint) (make-empty-safe-time-constraint-state-holder constraint)))
(dolist (operation *queue-wait-operations*)
  (let ((q-array (op-queue-time-array operation)))
    (unless q-array
      (setf (op-queue-time-array operation) (make-array *initial-queue-wait-bound* :type art-16b)))))


(defun RESTORE-INITIAL-VALUES ()
  (dolist (bucket *bucket-list*)
    (dolist (instruction bucket)
      (deactivate instruction)))
  (dotimes (i (car (array-dimensions *lot-information-array*)))
    (let ((pair (aref *lot-information-array* i 1)))
      (rplaca pair nil)
      (rplacd pair nil)))
  (dolist (machine *machines*)
    (setf (m-history machine) nil)
    (deactivate (load-lots-instruction machine))
    (deactivate (maintain-instruction machine))
    ;1; [[Changed so as not to nil out contentions 7/3/86, fv.*
    (dolist (pair (m-doing machine))
      (rplacd pair nil))
```

```
    (setf (m-status machine) 'free)
    (setf (m-last-unbroken-status machine) 'free)
    (setf (m-last-loaded-at machine) Ø)
    (setf (m-total-running-time machine) Ø)
    (setf (m-total-broken-time machine) Ø)
    (setf (m-total-maintenance-time machine) Ø)
    (setf (m-expect-available-at machine) Ø)
    (setf (m-last-unloaded-at machine) Ø)
    (setf (m-waiting-time machine) Ø)
    (setf (m-being-tracked machine) nil)
    (setf (m-optimizing? machine) nil))
  (dolist (operation *operations*)
    (setf (op-optimizing? operation) nil)
    (dolist (pair (op-doing operation))
      (rplacd pair nil))
    (setf (op-cumulative-wait operation) Ø)
    (setf (op-being-tracked operation) nil)
    (if (op-queue operation)
        (rplaca (car (op-queue operation)) nil))
    (setf (op-expected-input operation) nil)
    (let* ((state (op-real-state operation))
           (queue (op-state-holder-queue state)))
      (if queue (rplaca (car queue) nil)))
    (let ((q-array (op-queue-time-array operation)))
      (when q-array
        (print q-array)
        (dotimes (i (length q-array))
                    (aset Ø q-array i)))))
  (dolist (constraint *safe-time-constraints*)
    (setf (stc-temp-wait-for-availability constraint) Ø)
    (dolist (pair (stc-next-available-times constraint))
      (rplacd pair Ø)))
  (dotimes (i *array-length*)
    (dolist (instruction (aref *load-array* i))
      (deactivate instruction))
    (dolist (instruction (aref *maintain-array* i))
      (deactivate instruction))
    (aset (g-null-out (aref *unload-array* i)) *unload-array* i)
    (aset (g-null-out (aref *on-line-array* i)) *on-line-array* i)
    (aset (g-null-out (aref *break-array* i)) *break-array* i)
    (aset (g-null-out (aref *fix-array* i)) *fix-array* i)
    (aset (g-null-out (aref *optimize-array* i)) *optimize-array* i)
    (aset nil *create-array* i)
    (aset nil *snap-array* i)
    (aset nil *dump-array* i)))


(defun INIT-OTHER-VARS ( )
  (setq *next-period* *array-length*
        *period-start-time* Ø
        *current-time* Ø
        *last-lot-id* Ø
```

```
        *cycle-time-and-stuff-list* nil
        *machines-to-check* nil
        *optimizing* nil
        *broken-machines* nil))


;1; Post BREAK messages for all machines.*
(defun INIT-BREAKS ( )
  (dolist (machine *machines*)
    ;1; Calculate the time of the breakdown and post the BREAK instruction for it.*
    (let ((time (round (* 2.0 (m-mtbf machine) (si:random-in-range 0 1)))))
      (post-timed-instruction time 'break machine))))

;1; These are the functions to do the Gaussian integration.*

;1; Computes the value of exp(-x*2)/2 correctly normalized.*
(defun GAUSS (x)
  (quotient (exp (minus (times x x .5)))
            (sqrt (times pi 2.))))


(defun MAKE-GAUSS (accuracy)
  2"Makes an array containing the Gaussian difference to be used in calculating machine failu      "*
  ;1; Conduct the approximate integration.....*
  ;1; delta-x= delta-y / gauss (x).  and  x=x+delta-x.*
  ;1; [[[On pushpak's version of lisp, for some reason, you can't do both :type*
  ;1; :art-float and :named-structure-symbol 'gauss-array.*
  (let ((gauss-array (make-array accuracy
                                 :leader-length 2
                                 :type :art-float
                                 :named-structure-symbol 'gauss-array))
        (factor (quotient .5 (float accuracy))))
    (do ((x 0 (+ x (quotient factor (gauss x))))
         (index 0 (1+ index)))
        ((= index accuracy) gauss-array)
      (aset x gauss-array index))))

 ;1; -*- Package: DMOS; Mode: COMMON-LISP; Base: 10.; Fonts: MEDFNT,HL12B,HL12BI -*-*

 ;1; 12/10/85.*

 ;1; This selects processes, initializes variables, etc., for the simulation.*
 ;1; Now part of simulator rather than reader.*


 (defun PROCESS-OPERATIONS (text-array)
   (create-operations-and-log-points-and-modules text-array)
   (set-next-and-preceding-operations)
   (create-reworks))


 (defun hh0 () (CREATE-OPERATIONS-AND-LOG-POINTS-AND-MODULES *dmos-flow-text-array*))
 (defun ii0 () (make-operation :operation-line 33))
```

```
                    (eq (op-dl-log-point line) (lp-number current-log-point)))
                 (setf (op-log-point current-operation) current-log-point)
                 (break "2~% log point error, line ~A"* line)))
            (machine-data-line
             (let* ((mod-number (mach-dl-mod line))
                    (mod-pair (assq mod-number module-alist)))
               (unless mod-pair
                 (break "2~% module error, line ~A"* line)))
             (push line (op-machine-lines current-operation)))
            (log-point-data-line
             (print 'log-point-data-line-worked)
             (let* ((mod-number (logp-dl-mod line))
                    (mod-pair (assq mod-number module-alist))
                    (module (if mod-pair
                                (cdr mod-pair)
                                (let ((new-module (make-module :number mod-number)))
;                                 (format t "2~% new-module ~A"* new-module)
                                  (push new-module *dmos-modules*)
                                  (push (cons mod-number new-module) module-alist)
;                                 (format t "2~% module-alist ~A"* module-alist)
                                  new-module))))
               (setq current-log-point (make-log-point :mod module
                                                       :description (logp-dl-description line)))
               (push current-log-point (mod-log-points module)))
             (push current-log-point *log-points*)))))
          (t
           (return))))))
  (setq *final-operation* (car *operations*))
  (setq *operations* (nreverse *operations*))
  (setq *first-operation* (car *operations*))
  (setq *log-points* (nreverse *log-points*)))


;1;  Temporary crude fix for single-slice machines and odd-number machines.*
(defun COMPUTE-RUN-TIME-AND-SLICES-PER-RUN (line)
  (let ((line-slices-per-run (op-dl-slices-per-run line))
        (line-run-time (fix (* 10 (+ (op-dl-run-time line)
                                     ;1; Assume 0 load time if data not supplied.*
                                     (or (op-dl-load-time line) 0))))))
;    (format t "2~% line ~A, *line-slices-per-run2 ~A, *line-run-time2 ~A "*
;            line line-slices-per-run2 *line-run-time)
    (cond ((zerop (rem line-slices-per-run 24))
           (values line-run-time line-slices-per-run))
          ((> line-slices-per-run 15)
           (let* ((factor (quotient line-slices-per-run 24))
                  (rounded-factor (round factor)))
             (values (* factor line-run-time) (* rounded-factor 24))))
          (t
           (let ((factor (quotient 24 line-slices-per-run)))
             (values (round (* factor line-run-time)) 24))))))
```

```
(defun CREATE-REWORKS (&optional (operations *operations*))
  (let ((current-rework-sequence)
        (rework-numbers)
        ;1; Maps unmatched rework numbers to the operations they came from.*
        (unmatched-rework-alist))
    (dolist (operation operations)
      (let ((rework-symbol (op-dl-rework (op-operation-line operation))))
;       (print (listarray  (op-operation-line operation)))
;       (print (listarray operation))
;       (if rework-symbol (format t "2~% rework-symbol ~A"* rework-symbol))
        (if rework-symbol
            (multiple-value-bind (rework-letter rework-number)
                (split-rework-symbol rework-symbol)
              (cond ((char= rework-letter #\R)

(defun CREATE-OPERATIONS-AND-LOG-POINTS-AND-MODULES (text-array)
  (setq *operations*  nil
        *machines* nil
        *log-points* nil
        *dmos-modules* nil)
  (let ((current-operation)
        (current-log-point)
        ;1; Maps module numbers to modules.*
        (module-alist))
    (dotimes (index (length text-array))
      (let ((line (aref text-array index)))
        (cond (line
;              (print (listarray line))
               (let ((type (typep line)))
;                (format t "2~% type ~A"* type)
                 (selectq type
                   (operation-data-line
                    (setq current-operation
                          (multiple-value-bind (run-time slices-per-run)
                              (compute-run-time-and-slices-per-run line)
                            (make-operation :operation-line line
                                            :description (op-dl-description line)
                                            :operation-number (op-dl-number line)
                                            :slices-per-run slices-per-run
                                            :run-time run-time
                                            :setup-time (let ((time (op-dl-setup-time line)))
                                                          (if time
                                                              (fix (* 10 time))
                                                              ;1; Assume 0 setup-time if no data.*
                                                              0))
                                            :time-dependency  (let ((time (op-dl-time-dependency line)))
                                                                (if time
                                                                    (fix (* 10 time))
                                                                    ;1; Assume 0 setup-time if no data.*
                                                                    0)))))
                    (setf (op-dl-operation line) current-operation)
                    (push current-operation *operations*)
                    (let* ((mod-number (op-dl-mod line))
```

```
                 (mod-pair (assq mod-number module-alist)))
;            (format t "2~% *mod-number2 ~A, module-alist ~A"  *mod-number2 module-alist*)
             (if mod-pair
                 (setf (op-module current-operation) (cdr mod-pair))
                 (break "2~% module error, line ~A"* line)))
;            (print 'f1)
             (unless (lp-number current-log-point)
               (setf (lp-number current-log-point) (op-dl-log-point line)))
             (push current-operation (lp-operations current-log-point))
;            (print 'f2)
             (if (and current-log-point
             (if (memq rework-number rework-numbers)
                 (break "2~% rework-error, ~A"* operation)
                 (push (cons rework-number operation)' unmatched-rework-alist)))
            ((char= rework-letter #\B)
             (let ((pair (assq rework-number unmatched-rework-alist)))
               (if pair
                   (let ((decision-operation (cdr pair)))
                     (setq current-rework-sequence
                           (make-rework-sequence :number rework-number
                                                 :beginning operation
                                                 :decision-point decision-operation
                                                 :operations (list operation)))
                     (setf (op-rework-sequence operation) current-rework-sequence)
                     (setf (op-rework-pointer decision-operation) operation)
                     (push current-rework-sequence *rework-sequences*)
                     (setq unmatched-rework-alist (delete pair unmatched-rework-alist)))
                   (break "2~% rework-error, ~A"* operation))))
            ((char= rework-letter #\E)
             (cond ((or (null current-rework-sequence)
                        (neq (rs-number current-rework-sequence) rework-number))
                    (break "2~% rework-error, ~A"* operation))
                   (t
                    (push operation (rs-operations current-rework-sequence))
                    (setf (rs-end current-rework-sequence) operation)
                    (setq current-rework-sequence nil))))
            (t
             (break "2~% rework-error, ~A"* operation))))
      (if current-rework-sequence
          (push operation (rs-operations current-rework-sequence))))))))

;1; Note: the :start keyword does not work in READ-FROM-STRING.*


(defun SPLIT-REWORK-SYMBOL (rework-symbol)
  (values (read-from-string rework-symbol :start Ø :end 1)
          (read-from-string (substring rework-symbol 1))))


(defun SET-NEXT-AND-PRECEDING-OPERATIONS (&aux last-rework-operation
                                                last-non-rework-operation)
  (dolist (operation *operations*)
```

```
(let ((rework-sequence (op-rework-sequence operation)))
  (cond
    ;1; Just past a rework sequence.*
    ((and (null rework-sequence) last-rework-operation)
     (setf (op-preceding-operation operation) last-non-rework-operation)
     (if last-non-rework-operation
         (setf (op-next-operation last-non-rework-operation) operation))
     (setf (op-next-operation last-rework-operation) nil)
     (setq last-rework-operation  nil)
     (setq last-non-rework-operation operation))
    ;1; Just starting a rework sequence.*
    ((and rework-sequence
          (or (null last-rework-operation)
              (neq (op-rework-sequence last-rework-operation) operation)))
     (setf (op-preceding-operation operation) nil)
     (setq last-rework-operation operation))
    ;1; In a rework-sequence*
    (last-rework-operation
     (setf (op-preceding-operation operation) last-rework-operation)
     (setf (op-next-operation last-rework-operation) operation)
     (setq last-rework-operation operation))
    ;1; The usual case*
    (t
     (setf (op-preceding-operation operation) last-non-rework-operation)
```

```
;1; -*- Package: DMOS; Mode: COMMON-LISP; Base: 10.; Fonts: MEDFNT,HL12B,HL12BI -*-*

;1; 4/24/86*

;1; Builds machine types and initializes basic variables.*
(defun BUILD-MACHINE-TYPES (&aux machine-type-name-alist)
  (setq *machine-types* nil)
  ;1; Build *machine-types*.*
  (dolist (machine *machines*)
    (let* ((type-name (letters-of (m-name machine)))
           (pair (ass #'string-equal type-name machine-type-name-alist)))
      (if pair
          ;1; Machine type is already known.*
          (let ((machine-type (cdr pair)))
            (setf (m-machine-type machine) machine-type)
            (setf (mt-machines machine-type) (cons machine (mt-machines machine-type))))
          ;1; Else it's not.*
          (let ((machine-type (make-machine-type :name type-name
                                                 :machines (list machine))))
            (setf (m-machine-type machine) machine-type)
            (push (cons type-name machine-type) machine-type-name-alist)
            (push machine-type *machine-types*)))))
  ;1; Build sorted *machine-type-name-array*, for looking up machine-types by name.*
  (setq *machine-type-name-array* (make-array (length machine-type-name-alist)
                                              :leader-length 2
                                              :named-structure-symbol 'machine-type-name-array))
```

```
(do ((pairs machine-type-name-alist (cdr pairs))
     (index Ø (1+ index)))
    ((null pairs))
    (aset (car pairs) *machine-type-name-array* index))
(setq *machine-type-name-array* (sortcar *machine-type-name-array* 'alphalessp))
;1; Set operation information for machine types.*
(dolist (machine-type *machine-types*)
  (let ((operations)
        (rework-operations)
        (non-rework-operations))
    (dolist (machine (mt-machines machine-type))
      (dolist (operation (m-operations machine))
        (unless (member operation operations)
          (push operation operations)
          (if (op-rework-sequence operation)
              (push operation rework-operations)
              (push operation non-rework-operations)))))
    (setf (mt-operations machine-type) operations)
    (setf (mt-rework-operations machine-type) rework-operations)
    (setf (mt-non-rework-operations machine-type) non-rework-operations))))


;1; -*- Package: DMOS; Mode: COMMON-LISP; Base: 10.; Fonts: MEDFNT,HL12B,HL12BI -*-*

;1; 1/15/85*

;1; New system for revised simulator stuff.  Simulator is now to unload everything*
;1; onto operation queues first, then (after the scheduler has operated) load*
;1; machines from operation queues.*

;1; temporary*

(defsubst LOAD-LOTS-INSTRUCTION (machine) (car (m-instructions machine)))
(defsubst MAINTAIN-INSTRUCTION (machine) (cdr (m-instructions machine)))


;1; These functions apply only to machine instructions and instructions in *load-lots-array* and *maintain-array*.*
(defsubst MACHINE-OF (instruction) (car instruction))

(defsubst KEYWORD (instruction) (second instruction))

(defsubst OPERATION-LIST (instruction) (third instruction))
(defsubst PRIORITY (instruction) (third instruction))
(defsubst DOWNTIME (instruction) (third instruction))

(defsubst MAINT-TIME (instruction) (fourth instruction))
(defsubst MAINT-OPERATION (instruction) (fourth instruction))
(defsubst MAINT-JOBS (instruction) (fourth instruction))
(defsubst RPT? (instruction) (fourth instruction))
(defsubst LOAD-LOTS-TIME (instruction) (fourth instruction))

(defsubst SEQ? (instruction) (fifth instruction))
```

```
1;; An instruction "doesn't exist" if it's car is nil.*
(defsubst ACTIVE? (instruction) (car instruction))
(defsubst DEACTIVATE (instruction) (rplaca instruction nil))



;1; -*- Package: DMOS; Mode: COMMON-LISP; Base: 10.; Fonts: MEDFNT,HL12B,HL12BI -*-*


;1; This file contains functions that have to do with computing and entering usages of machines, machine-types, and operations. *

;1; 12/10/85*

;1; New version:*
(defun ENTER-USAGES ()
  ;1; These have to be done in this order, because each one uses stored data*
  ;1; computed by earlier ones.*
  (dolist (machine *machines*)
    (setf (m-availability machine) (machine-availability machine)))
  (dolist (operation *operations*)
    (setf (op-availability operation) (operation-availability operation)))
  (dolist (operation *operations*)
    (setf (op-usage operation) (usage-for-operation operation)))
  (dolist (machine-type *machine-types*)
    (setf (mt-usage machine-type) (lookup-machine-type-usage machine-type)))
  (dolist (machine-type *machine-types*)
    ;1; Assumes either all machines of the type are single, or all double.*
    (if (m-sides (car (mt-machines machine-type)))
        (assign-machine-type-usages machine-type 'assign-double-once)
        (assign-machine-type-usages machine-type 'assign-single-once))))


(defun USER:TST-ALL ( )
  (dolist (machine-type *machine-types*)
    (user:tst machine-type)))


(defun USER:TST (machine-type)
  (let ((m-type (if (arrayp machine-type)
                    machine-type
                    (name-to-machine-type machine-type))))
    ;1; Reset in order to compute m-usages.*
    (dolist (machine (mt-machines m-type))
      (setf (m-usage machine) 0.0)
      (setf (m-contention machine) (mapcar #'(lambda (x) (cons x 0.0))
                                           (m-operations machine))))
    ;1; Assumes either all machines of the type are single, or all double.*
    (if (m-sides (car (mt-machines m-type)))
        (assign-machine-type-usages m-type 'assign-double-once)
        (assign-machine-type-usages m-type 'assign-single-once))))
```

```
;1; We will compute usage for machine type first, then compute it for individual machines in*
;1; terms of that.*
;1; Computed from scratch -- i.e., it computes operation usages instead of looking them up.*
(defun COMPUTE-MACHINE-TYPE-USAGE (machine-type operation-limit
                                   &optional (rework-factor *default-rework-factor*)
                                   (setup-time-factor *default-setup-time-factor*)
                                   (lot-factor-list *default-lot-factor-list*))
  (let* ((setup-time-fac (float setup-time-factor))
         (rework-fac (float rework-factor))
         (machines (mt-machines machine-type))
         (operations (mt-operations machine-type))
         (relevant-operations
           (if operation-limit
               (let ((r-operations))
                 (dolist (operation operations r-operations)
                   (if (<= (op-operation-number operation) operation-limit)
                       (push operation r-operations))))
               operations))
         (operation-time

                                    rework-fac
                                    setup-time-fac
                                    lot-factor-list))
;1;  [[For now, a machine is relevant iff it is involved in any* 1operation (even a*
;1;  rework operation) that precedes the limit.  I guess* 1we really want some sort of*
;1;  relevance *factor*.*
         (relevant-machines
           (if operation-limit
               (let ((machs))
                 (dolist (machine machines machs)
                   (if (dolist (operation (m-operations machine))
                         (if (<= (op-operation-number operation) operation-limit) (return t)))
                       (push machine machs))))
               machines)))
    (if relevant-machines
        (quotient operation-time (float (length relevant-machines)))
        0.0)))


;1; [[New version??*
(defun LOOKUP-MACHINE-TYPE-USAGE (machine-type &optional (operation-limit nil))
  (let* ((operations (mt-operations machine-type))
         (relevant-operations
           (if operation-limit
               (let ((r-operations))
                 (dolist (operation operations r-operations)
                   (if (<= (op-operation-number operation) operation-limit)
                       (push operation r-operations))))
               operations)))
    (lookup-usage-for-operations relevant-operations)))
```

```
(defun BOTTLENECK-FACTOR (machine-type &optional (operation-limit nil))
  (let* ((machines (mt-machines machine-type))
         (relevant-machines
           (if operation-limit
             (let ((machs))
               (dolist (machine machines)
                 (if (dolist (operation (m-non-rework-operations machine))
                       (if ((<= (op-operation-number operation) operation-limit) (return t)))
                     (push machine machs)))
;1; Probably better to leave this out and only count non-rework operations.*
               (dolist (machine machines)
                 (if (dolist (operation (m-rework-operations machine))
                       (if ((<= (op-operation-number (rs-beginning (op-rework-sequence operation))) operation-limit)
                           (return t)))
                     (setq machs (adjoin machine machs))))
               machs)
             machines)))
    (quotient (lookup-machine-type-usage machine-type operation-limit)
              (float (length relevant-machines)))))


;1; Reword operations in rework sequences branched to from an operation with number <= bound.*
(defun RELEVANT-REWORK-OPERATIONS (bound &aux operations)
  (dolist (sequence *rework-sequences*)
    (unless (> (op-operation-number (rs-beginning sequence)) bound)
      (setq operations (append (rs-operations sequence) operations)))))


;1; Computes from operation usage values in the table.*
(defun LOOKUP-USAGE-FOR-OPERATIONS (operations &aux (total-usage 0.0))
  (dolist (operation operations total-usage)
    (setq total-usage (+ (op-usage operation) total-usage))))
;1; Computes each operation usage.*
(defun COMPUTE-USAGE-FOR-OPERATIONS (operations &optional (rework-factor *default-rework-factor*)
                                     (setup-time-factor *default-setup-time-factor*)
                                     (lot-factor-list *default-lot-factor-list*) &aux (total-usage 0.0))
  (dolist (operation operations total-usage)
    (setq total-usage (+ (usage-for-operation operation
                                              rework-factor
                                              setup-time-factor
                                              lot-factor-list)
                         total-usage))))


;1; The total amount of machine usage for operation.  (Availability for operation looked up in defstruct.)*
(defun USAGE-FOR-OPERATION (operation &optional (rework-factor *default-rework-factor*)
                            (setup-time-factor *default-setup-time-factor*)
                            (lot-factor-list *default-lot-factor-list*))
  (let* ((time (+ (op-run-time operation)
                  (* (op-setup-time  operation)
                     setup-time-factor)))
         (lnum (floor (quotient (op-slices-per-run operation) 24)))
```

```
              (1 1.0)
              (2 (* (float lnum) (float (car lot-factor-list))))
              (3 (* (float lnum) (float (second lot-factor-list))))
              (4 (* (float lnum) (float (third lot-factor-list))))
              (otherwise (* (float lnum) (float (third lot-factor-list)))))))
  (if *operation-init-debugging*
      (format t 2"~2% Time ~5F, lots ~D, availability ~5F."* time lots (op-availability operation)))
  (* (quotient time lots (op-availability operation))
     (if (op-rework-sequence operation)
         rework-factor
         1.0))))


;1; Returns portion of time the machine is available (e.g., .95).*
(defun MACHINE-AVAILABILITY (machine &aux (downtime-sum 0.0))
  (do ((freqs (m-scheduled-downtime-frequency machine) (cdr freqs))
       (lgths (m-scheduled-downtime-length machine) (cdr lgths)))
      ((null freqs))
    (setq downtime-sum (+ (quotient (float (car lgths)) (float (car freqs))) downtime-sum)))
  (let ((val0 (m-mttr machine))
        (val1 (m-mtbf machine)))
    (if (and val0 val1)
        (setq downtime-sum (+ (quotient (float val0) (float val1)) downtime-sum))))
  (let ((val0 (m-mtta machine))
        (val1 (m-mtba machine)))
    (if (and val0 val1)
        (setq downtime-sum (+ (quotient (float val0) (float val1)) downtime-sum))))
  (- 1.0 downtime-sum))


1; Defined as the average of the availabilities of the machines for the operation.*
1; It would be more accurate to weight this by contention numbers, but since*
1; this figure is used in computing contention numbers that would be circular.*
;1; Possibly this is a good enough idealization.*
;1; Looks up (rather than computes) machine availabilities.*
(defun OPERATION-AVAILABILITY (operation &aux (result-so-far 0) (machines (op-machines operation)))
  (dolist (machine machines (quotient result-so-far (length machines)))
    (setq result-so-far (+ (m-availability machine) result-so-far))))

;1; -*- Package: DMOS; Mode: COMMON-LISP; Base: 10.; Fonts: MEDFNT,HL12B,HL12BI -*-*

;1; 12/10/85*

;1; File for revised simulator stuff.  Simulator is now to unload everything* 1onto*
;1; process queues first, then (after the scheduler has operated) load* 1machines*
;1; from operation queues.*

;1; This file contains the driver functions for the simulator.*

;;;(defun user:PFD-GO (&optional (text-file-name 2"lm:jul86-dmos;flowxxx.data"*))
;;;  (setup-structure text-file-name)
;;;  (initialize t)
;;;  (user:pfd t))
```

```
;1; Flowxxx is fudged data.*
(defun user:FE-GO (&optional (text-file-name "2lm:jul86-dmos;flowxxx.data"*))
  (setup-structure text-file-name)
  (initialize t)
  (format t 2"~3% Initialized, starting simulation.~2%"*)
  (run-dmos))


(defun SETUP-STRUCTURE (text-file-name)
  (format t 2"~% Reading the file ~A of DMOS data."* text-file-name)
  (setq *dmos-flow-text-array* (make-array *dmos-flow-text-array-size*))
  (digest-file text-file-name
               *dmos-flow-text-array*
               (cdr (assoc 'operation-data-line *dmos-flow-print-template-alist*))
               *dmos-flow-dividers*
               *dmos-flow-breaks*
               #'check-dmos-flow-row
               #'(lambda (row-type) (selectq row-type
                                      (operation-data-line (make-operation-data-line))
                                      (machine-data-line (make-machine-data-line))
                                      (log-point-data-line (make-log-point-data-line))
                                      (empty-data-line (make-empty-data-line))))
               #'next)
  (format t 2"~% The file of DMOS data has been read, now building operation structure."*)
  (setq *simulation-frame* (build-simulation-frame-from *dmos-flow-text-array*))
  (format t 2"~% The process structure has been built."*))


(defun user:sim-frm ()
   (setq *simulation-frame* (build-simulation-frame-from *dmos-flow-text-array*)))


(defun user:SIM-DMOS (&optional (simulation-frame *simulation-frame*))
  (if (and (null *simulation-frame*) (null simulation-frame))
      2"No simulation frame specified."*
      (let ((new-frame? (neq simulation-frame *simulation-frame*)))
        (setq *simulation-frame* simulation-frame)
        (initialize new-frame?)
        (run-dmos))))

(defun INITIALIZE (new-frame?)
  (format t 2"~% Initializing for simulation."*)
  (if new-frame?
      (setq *arrays-initialized* nil
            *operations-and-machines-initialized* nil))
  ;1; File names and stuff.*
  (init-parameters)
  (push *feed-rate* *cycle-time-and-stuff-list*)
  (when (or new-frame? *rebuild* (not *operations-and-machines-initialized*
    (initialize-operations-and-machines)

  (init-other-vars)
  (when (or new-frame? *rebuild* (not *arrays-initialized*))
```

```lisp
        (initialize-arrays)
        (enter-usages)
        (set-scheduling-types)
        (setq *arrays-initialized* t))
  (restore-initial-values)
  (setq *rebuild* nil))


;1; Initialize static information for operations, machines, machine-types.*
(defun INITIALIZE-OPERATIONS-AND-MACHINES ()
  (init-vars-from-frame *simulation-frame*)
  (enter-mtbf-info)
  ;1; Build basic static information into slots in operations and machines.*
  (build-machine-types)
;       (build-safe-time-constraints safe-time-constraint-pairs))
  (set-double-machines))


(defun RUN-DMOS ( )
  ;1; This variable is not superfluous -- it's used by SNAP and DUMP in execute.*
  (setq *last-time-operation* (+ *current-time* *time-steps*))
  (init-breaks)
  (send-initial-instructions)
  (do ((counter Ø (1+ counter)))
      ((= *current-time* (1+ *last-time-operation*)))
    (when (eq counter 1ØØ)
      (setq counter Ø)
      (terpri)
      (princ 2"  "*)
      (princ *current-time*)
      (if (and *long-experiment* (zerop (rem *current-time* 5ØØØ)))
          (save-cycle-time-and-stuff)))
    (maybe-show-state)
    (schedule)
    (simulate)))


(defun SAVE-CYCLE-TIME-AND-STUFF ()
  (gc-immediately)
  (dolist (machine *machines-in-order*)
    (let ((wait (total-machine-wait machine)))
      (if (> wait (* *current-time* 2))
          (push (cons machine wait) *cycle-time-and-stuff-list*))))
  (setq *cycle-time-and-stuff-list*
        (nconc (list *current-time* (average-cycle-time) (lots-in-plant))
               *cycle-time-and-stuff-list*)))


(defun SIMULATE ( )
  (create-maintain-load)
  (snap-dump)
  ;1; Temporary.*
```

```
;  (user:check-lots)
  (setq *current-time* (1+ *current-time*))
  (update-wait)
  (update-buckets)
  (end-maintain-break-fix-unload))


;1; Update p-cumulative-wait for all operations.*
(defun UPDATE-WAIT ()
  (dolist (operation *operations*)
    (setf (op-cumulative-wait operation)
 (defun CREATE-MAINTAIN-LOAD ()
   (if *load-debugging*
       (format t
               "2~3% *CREATE-MAINTAIN-LOAD*,  machines to check: ~A~%"*
               *machines-to-check*))
   ;1; Create lots.*
   (let ((number-of-lots (get-instructions-for-time *create-array*)))
     (when number-of-lots
       (timed-create number-of-lots)
       (deactivate-instructions-for-time *create-array*)))
   ;1; Check all machines that have just become available (i.e., been fixed, been maintained, or unloaded).*
   (dolist (machine *machines-to-check*)
     (check-for-maintain machine))
   ;1; Maintain machines scheduled for maintenance.*
   (let ((instructions (get-instructions-for-time *maintain-array*)))
     (dolist (instruction instructions)
       (if (active? instruction) (basic-maintain instruction)))
     (deactivate-instructions instructions))
   ;1; Load machines scheduled for loading.*
   (let ((instructions (get-instructions-for-time *load-array*)))
     (dolist (instruction instructions)
       (if (active? instruction) (load-from-spec (machine-of instruction) instruction)))
     (deactivate-instructions instructions))
   ;1; Check all machines that have just become available (i.e., been fixed, been*
   ;1; maintained, or unloaded),* 1or that do operationses that have just had*
   ;1; something added to their queues.*
   (dolist (machine *machines-to-check*)
     (if (and (eq (m-status machine) 'free)
              (memq (m-scheduling-type machine) '(round-robin constraint-member)))
         (check-for-load machine)))
   (setq *machines-to-check* nil))


 (defun END-MAINTAIN-BREAK-FIX-UNLOAD ( )
   (if *load-debugging* (format t 2"~3% * END-MAINTAIN-BREAK-FIX-UNLOAD*~%"*))
   (let ((time (remainder *current-time* *array-length*)))
     (let ((machines (aref *break-array* time)))
       (dolist (machine machines)
         (if machine (timed-break machine)))
       (aset (g-null-out machines) *break-array* time))
     (let ((machines (aref *fix-array* time)))
```

```
  (dolist (machine machines)
    (if machine (end-fix machine)))
  (aset (g-null-out machines) *fix-array* time))
(let ((machines (aref *on-line-array* time)))
  (dolist (machine machines)
    (if machine (end-maintain machine)))
  (aset (g-null-out machines) *on-line-array* time))
(let ((machines (aref *unload-array* time)))
  (dolist (machine machines)
    ;1; Ignore unload instruction unless this is the machine's unload time.*
    ;1; (When machines break and get new unload instructions, the old ones*
    ;1; are just left there, but this keeps them from being executed.)*
    (if (and machine (= (m-expect-available-at machine) *current-time*))
        (unload machine)))
  (aset (g-null-out machines) *unload-array* time))))

;1; -*- Package: DMOS; Mode: COMMON-LISP; Base: 10.; Fonts: MEDFNT,HL12B,HL12BI -*-*

;1;  6/25/86*


(defun OPERATIONS-FROM-TO (lp0 op-num0 lp1 op-num1)
  (do ((op-list)
       (ops dmos:*operations* (cdr ops)))
      ((null ops) nil)
    (if (and (null op-list)
             (= (op-operation-number (car ops)) op-num0)
             (= (lp-number (op-log-point (car ops))) lp0))
        (setq op-list (list (car ops))))
    (if (and op-list
             (= (op-operation-number (car ops)) op-num1)
             (= (lp-number (op-log-point (car ops))) lp1))
        (return (nreverse op-list)))))


(defun COPY-SIMPLE-ALIST (source destination)
  (do ((pairs0 source (cdr pairs0))
       (pairs1 destination (cdr pairs1)))
      ((null pairs0))
    (unless (eq (cdar pairs1) (cdar pairs0))
      (rplacd (car pairs1) (cdar pairs0)))))


;1; Assumes n is not 0.*
(defun Q-DELETE (n list)
  (if (zerop n) (break "2q-delete"*))
  (if (eq n (q-length list))
      (rplaca list nil)
      (let* ((break (nthcdr (1- n) list))
             (tail (cdr break)))
        (rplacd break nil)
        (rplaca list nil)
        (rplacd (last tail) list)
        tail)))
```

```
(defun user:trace-utilities ()
  (trace (remove-from-queue :cond #'(lambda (q r) r (> q 1)))
         (copy-queue-over :cond #'(lambda (q r) r (> (queue-length q) 3)))
         (queue-nconc  :break t)
         (add-to-ordered-alist :cond #'(lambda (q r) r (> (length r) 1)))
         (q-delete  :cond #'(lambda (q r) r (> q 1)))))


(defun ADD-TO-ORDERED-ALIST (index stuff alist)
  (cond ((null alist)
         (list (cons index stuff)))
        ((null (caar alist))
         (rplaca (car alist) index)
         (rplacd (car alist) (copy-over-different stuff (cdar alist)))
         (if (cdr alist) (rplaca (second alist) nil))
         alist)
        ((< index (caar alist))
         (let ((tail (end-part alist)))
           (cond (tail
                  (let ((pair (second tail)))
                    (when (cddr tail)
                      (rplaca (third tail) nil))
                    (rplacd tail (cddr tail))
                    (rplaca pair index)
                    (rplacd pair (copy-over-different stuff (cdr pair)))
                    (cons pair alist)))
                 (t
                  (cons (cons index stuff) alist)))))
         ((= index (caar alist))
          (rplacd (car alist) (queue-nconc (cdar alist) stuff))
          alist)
         (t
          (do ((pairs alist (cdr pairs)))
              ((null (cdr pairs))
               (rplacd pairs (list (cons index stuff)))
               alist)
            (cond
              ((null (car (second pairs)))
               (rplaca (second pairs) index)
               (rplacd (second pairs) (copy-over-different stuff (cdr (second pairs))))
               (if (cddr pairs) (rplaca (third pairs) nil))
               (return alist))
              ((< index (car (second pairs)))
               (let ((tail (end-part pairs)))
                 (cond (tail
                        (let ((pair (second tail)))
                          (when (cddr tail)
                            (rplaca (third tail) nil))
                          (rplacd tail (cddr tail))
                          (rplaca pair index)
                          (rplacd pair (copy-over-different stuff (cdr pair)))
                          (rplacd pairs (cons pair (cdr pairs)))))
                       (t
```

```
                (rplacd pairs (cons (cons index stuff) (cdr pairs))))))
         (return alist))
        ((= index (car (second pairs)))
         (rplacd (second pairs) (queue-nconc (cdr (second pairs)) stuff))
         (return alist))))))


(defun Q-LOTS (q)
  (unless (or (null q) (null (car q)))
    (do ((count Ø (1+ count))
         (lots q (cdr lots)))
        ((or (null lots) (null (car lots))) (firstn count q)))))


(defun REAL-PART (queue)
  (unless (or (null queue) (null (caar queue)))
    (do ((count Ø (1+ count))
         (pairs queue (cdr pairs)))
        ((or (null pairs) (null (caar pairs))) (firstn count queue)))))


;1; This is the part whose car is the last real cons,  and whose cadr is the first unreal cons.*
;1; Assumes <ordered-alist> is not nil,  nor is (caar ordered-alist).*
(defun END-PART (ordered-alist)
  (do ((pairs ordered-alist (cdr pairs)))
      ((null (cdr pairs)))
    (if (null (caadr pairs)) (return pairs))))

;1; Stick <stuff> onto the end of <queue>, which is probably the cdr of a pair in*
;1; queue.*
(defun QUEUE-NCONC (queue stuff)
  (cond ((null queue) (copylist stuff))
        ((null (car queue))
         (copy-over-different stuff queue)
         queue)
        (t
         (do ((m nil l)
              (l queue (cdr l)))
             (nil)
             (cond ((null (car l))
                    (rplacd m (copy-over-different stuff (cdr l)))
                    (return))
                   ((null (cdr l))
                    (rplacd l (copylist stuff))
                    (return))))
           queue)))

;1; For copying one list onto another.  Idea is that they are both the same length.*
(defun COPY-OVER (source destination)
  (do ((l1Ø source (cdr l1Ø))
       (l11 destination (cdr l11)))
      ((null l1Ø))
    (unless (eq (car l1Ø) (car l11))
```

```
      (rplaca ll1 (car ll0)))))


(defun COPY-OVER-DIFFERENT (source destination)
  (if destination
      (do ((ll0 source (cdr ll0))
           (ll1 destination (cdr ll1)))
          ((or (null ll0) (null (car ll0))) (if ll1 (rplaca ll1 nil)) destination)
        (unless (cdr ll1)
          (when (cdr ll0)
            (rplacd ll1 (make-list (q-length (cdr ll0))))))
        (unless (eq (car ll0) (car ll1))
          (rplaca ll1 (car ll0))))
      (firstn (q-length source) source)))


;1; For copying one queue onto another.  Idea is that either may be longer.  The*
;1; "end" of a queue is marked by the first cons with a nil car.*
(defun COPY-QUEUE-OVER (source destination)
  (if destination
      (do ((qq0 source (cdr qq0))
           (qq1 destination (cdr qq1)))
          ((or (null qq0) (null (caar qq0)))
           (if qq1 (rplaca (car qq1) nil))
           destination)
        (unless (cdr qq1)
          (when (cdr qq0)
            (rplacd qq1 (make-alist (qq-length (cdr qq0))))))
        (rplaca (car qq1) (caar qq0))
        (rplacd (car qq1) (copy-over-different (cdar qq0) (cdar qq1))))
      (copytree (firstn (qq-length source) source))))

(defun MAKE-ALIST (number &aux list)
  (dotimes (i number list)
    (push (cons nil nil) list)))


(defun ADD-TO-ALIST-COUNT (item count alist)
  (let ((pair (assq item alist)))
    (if pair
        (and (rplacd pair (+ count (cdr pair))) alist)
        (cons (cons item count) alist))))


;1; Queues need to be ordered.*
(defun QUEUE-LENGTH (alist &optional time &aux (count 0))
  (dolist (pair alist count)
    (if (or (null (car pair)) (and time (< time (car pair))))
        (return count)
        (setq count (+ (q-length (cdr pair)) count)))))
```

```
;1; Destructively conses value to the numberth item of list.*
(defun ADD-TO-LIST-ITEM (list number value)
  (let ((l (nthcdr number list)))
    (rplaca l (cons value (car l)))))


;1; Object of this function is to check to see which properties* 1of an operation really*
;1; depend only on the machine, by seeing* 1if they're the same for every operation*
;1; that uses the machine.*
(defun VALUE-LISTS (machine)
  (let* ((alist (variable-alist 'operation))
         (variables '(run-time setup-symbol setup-number safe-time-symbol
                              safe-time-number lot-#
                              scheduled-downtime-frequency scheduled-downtime-length
                              mtbf mttr mtba mtta))
         (column-things (make-list (length variables))))
    (dolist (operation (m-operations machine) column-things)
      (dotimes (variable variables)
        (let* ((index (second (assq variable alist)))
               (thing (aref operation index)))
          (if (not (member thing (nth index column-things)))
              (add-to-list-item column-things index thing)))))))


(defun ADD-TO-ARRAY-VALUE (thing array index)
  (aset (cons thing (aref array index)) array index))


;1; Returns the member of list for which fcn has the maximum value.*
(defun MAX-MEMBER (list fcn &aux (max-num 0) max-mem)
  (dolist (item list max-mem)
    (let ((num (funcall fcn item)))
      (if (> num max-num)
          (setq max-num num
                max-mem item)))))


;1; Returns the member of list for which fcn has the minimum value.*
(defun MIN-MEMBER (list fcn &aux (min-num 100000) min-mem)
  (dolist (item list min-mem)
    (let ((num (funcall fcn item)))
      (if (< num min-num)
          (setq min-num num
                min-mem item)))))


(defun APPLY-TO-VALUES (list result-function value-function initial-value &aux (result-so-far initial-value))
  (dolist (item list)
    (setq result-so-far (funcall result-function (funcall value-function item) result-so-far))))


;1; &&&&&&&&&&&&&&&&&&&&&&&&&&&&&&&&&&&&&&&&&&&&&&&&&&&&&&&&&&&&&&&&&&&*
```

```
;1; Functions for generating stuff about conflicting data for machine types.*

(defun CHECK-MACHINE-TYPE-VALUES (machine-type index &aux alist)
  (dolist (operation (mt-operations machine-type) alist)
    (let* ((val (aref operation index))
           (pair (assoc val alist)))
      (if pair
          (rplacd pair (1+ (cdr pair)))
          (setq alist (cons (cons val 1) alist))))))


(deff CMTV 'check-machine-type-values)

(defun VARIABLE-ALIST (defstruct-name)
  (fourth (get defstruct-name 'si:defstruct-description)))


(defun ODD-MACHINE-TYPE-PAIRS (&aux pairs)
  (let ((alist (variable-alist 'operation)))
    (dolist (machine-type *machine-types* pairs)
      (dolist (variable '(run-time setup-symbol setup-number safe-time-symbol
                                   safe-time-number lot-#
                                   scheduled-downtime-frequency scheduled-downtime-length
                                   mtbf mttr mtba mtta))
        (let ((index (second (assq variable alist))))
          (if (neq (length (check-machine-type-values machine-type index)) 1)
              (push (cons machine-type index) pairs)))))))


(defun OPERATION-LOT-CAPACITY (operation)
  (floor (quotient (op-slices-per-run operation) 24)))



;1; This works by keeping a set of numbers which represent the*
;1; set of depths at which a match is currently alive.*
(defun SUB-STRING (u v)
  (do ((live-ones)
       (l1 (string-length u))
       ;1; Length of the rest of v.*
       (l2 (string-length v) (1- l2))
       ;1; Position in v.*
       (pos 0 (1+ pos)))
      ((and (> l1 l2) (null live-ones)) nil)
    (let ((result (new-ones live-ones u v pos l1)))
      (if (equal result 'match)
          (return t)
          (setq live-ones result)))
    (if (and ((<= l1 l2) (equal (aref u 0) (aref v pos)))
        (setq live-ones (cons pos live-ones)))))
```

```
;1; Subroutine for SUB-STRING.*
(defun NEW-ONES (live-ones u v pos l1 &aux new-depths)
  (dolist (depth live-ones)
    (cond ((= (- pos depth) l1)
           (setq new-depths 'match)
           (return))
          ((equal (aref u (- pos depth)) (aref v pos))
           (setq new-depths (cons depth new-depths)))))
  new-depths)


;1; &&&&&&&&&&&&&&&&&&&&&&&&&&&&&&&&&&&&&&&&&&&&&&&&&&&&&&&&&&&&&&&&*

;1; Stuff to get from names to things.*

;1; From an atom or string to the machine whose name it is.*
(defun NAME-TO-MACHINE (name)
  (binary-find name *machine-name-array* 'alphalessp))

;1; From an atom or string to the machine type whose name it is.*
(defun NAME-TO-MACHINE-TYPE (name)
  (binary-find name *machine-type-name-array* 'alphalessp))

 1; From an atom or string to the list of operations whose name it is.*
 defun NAME-TO-OPERATIONS (name)
 (binary-find name *operation-name-array* 'alphalessp))


;1; Finds the thing in array which is "equal to" item according to relation.*
(defun BINARY-FIND (item array relation)
  (do ((lower-bound 0 (if (= result 0) current-index lower-bound))
       (upper-bound (1- (array-length array)) (if (= result 0) upper-bound current-index))
       (span)
       (old-old-current-index nil old-current-index)
       (old-current-index nil current-index)
       (current-index)
       (result))
      (nil)
    (setq span (- upper-bound lower-bound)
          current-index (+ lower-bound
                           (if (evenp span)
                               (quotient span 2)
                               (if (eq current-index upper-bound)
                                   (quotient (1- span) 2)
                                   (quotient (1+ span) 2))))
          result (cond ((funcall relation (car (aref array current-index)) item) 0)
                       ((funcall relation item (car (aref array current-index))) 2)
                       (t 1)))
;     (format t "~%2 lower ~D, upper ~D, span ~D, old current-index ~D, current index ~D, result ~D"*
;             lower-bound
;             upper-bound
;             span
```

```
;            old-current-index
;            current-index
;            result)
    (cond ((or (eq current-index old-current-index) (eq current-index old-old-current-index))
;               (print 'binary-find-failure)
           (return nil))
          ((= result 1) (return (cdr (aref array current-index)))))))

;1; &&&&&&&&&&&&&&&&&&&&&&&&&&&&&&&&&&&&&&&&&&&&&&&&&&&&&&&&&&&&&&&&&&&&&&*

;1; To set a variable in a defstruct when you have the variable as a value of something.*
;1; This function is not fast.*
(defun SET-VARIABLE (variable value structure defstruct-name)
  (let* ((description (variable-alist defstruct-name))
         (index (second (assq variable description))))
    (aset value structure index)))


(defun GET-VARIABLE (variable structure defstruct-name)
  (let* ((description (variable-alist defstruct-name))
         (index (second (assq variable description))))
    (aref structure index)))


;1; Return the machine the lot is on.*
(defun ON-A-MACHINE (lot)
  (dolist (m *machines*)
    (if (on-machine lot m) (return m))))


;1; Is the lot on the machine?*
(defun ON-MACHINE (lot machine)
  (dolist (pair (m-doing machine))
    (if (memq lot (cdr pair)) (return t))))


;1; Returns the number of lots in the machine.*
(defun LOTS-IN-MACHINE (machine &aux (count Ø))
  (dolist (pair (m-doing machine) count)
    (setq count (+ count (q-length (cdr pair))))))


(defun LOT-IN-OPERATION (lot operation)
  (dolist (pair (op-doing operation))
    (if (memq lot (cdr pair))
        (return t))))


;1; Given a lot number, this function tells you the operation step that lot is in and*
;1; tells you whether it is* 1in queue or in operation. If that lot is not in the plant, it*
```

```
;1; will show 'lot not found'.*
(defun WHERE-LOT-NUM (lot-or-lot-num &aux lot lot-num)
  (if (numberp lot-or-lot-num)
      (setq lot (aref *lot-information-array* lot-or-lot-num 0)
            lot-num lot-or-lot-num)
      (setq lot lot-or-lot-num
            lot-num (lot-number lot)))
  (if (cdr (aref *lot-information-array* lot-num 1))
      '(lot finished)
      (let* ((position (lot-position lot))
             (operation (car position))
             (machine (cdr position)))
            (print-aux operation (not machine)))))


(defun PRINT-AUX (proc-step on-queue)
  (if on-queue
      (format t 2"~% In queue of ~A"* proc-step)
      (format t 2"~% In operation ~A"* proc-step)))


(defun TOTAL-MACHINE-WAIT (mach &aux (total 0))
  (let ((machine (real-machine mach)))
    (if machine
        (dolist (operation (m-operations machine) total)
          (setq total (+ (op-cumulative-wait operation) total)))
        "2no machine"*)))


(defun LOTS-AT-OPERATION (operation &optional bound)
  (append (lots-on-queue operation bound)
          (lots-in-process operation)))

;1; This is the number of lots that are either in some machine that is doing the*
;1; operation (even if the machine is broken), or on the operation queue.*
(defun NUMBER-OF-LOTS-AT-OPERATION (operation bound)
  (+ (number-of-lots-on-queue operation bound)
     (number-of-lots-in-process operation)))


(defun LOTS-ON-QUEUE (operation &optional time &aux lots)
  (dolist (pair (op-queue operation) lots)
    (if (and (car pair) (or (null time) ((<= (car pair) time)))
        (setq lots (append lots (q-lots (cdr pair))))
        (return lots))))

(defun NUMBER-OF-LOTS-ON-QUEUE (operation &optional bound)
  (queue-length (op-queue operation) bound))
```

```
(defun LOTS-IN-process (operation &aux lots)
  (dolist (machine (op-machines operation) lots)
    (unless (or (eq (m-status machine) 'free)
                (and (eq (m-status machine) 'broken)
                     (eq (m-last-unbroken-status machine) 'free)))
1       *;1; Need to watch for structure-sharing  here?*
      (setq lots (append (cdr (assq operation (m-doing machine))) lots)))))


(defun NUMBER-OF-LOTS-IN-PROCESS (operation &aux (count 0))
  (dolist (machine (op-machines operation) count)
    (unless (or (eq (m-status machine) 'free)
                (and (eq (m-status machine) 'broken)
                     (eq (m-last-unbroken-status machine) 'free)))
      (setq count (+ (g-length (cdr (assq operation (m-doing machine)))) count))))) .


(defun SOME-LOTS-AT-OPERATION (operation bound)
  (or (dolist (pair (op-doing operation))
        (or (g-null (cdr pair)) (return t)))
      (some-lots-on-queue operation bound)))


(defun SOME-LOTS-ON-QUEUE (operation bound)
  (dolist (pair (op-queue operation))
    (if (or (null (car pair)) (and bound (< bound (car pair))))
        (return nil)
        (or (g-null (cdr pair)) (return t)))))



;1; &&&&&&&&&&&&&&&&&&&&&&&&&&&&&&&&&&&&&&&&&&&&&&&&&&&&&&&&&&&&&&&&&&&&&&&*

;1; Assorted low-level functions.*

(defun LOT-INSERT (lot)
  (rplaca (aref *lot-information-array* (lot-number lot) 1) *current-time*))


;1; The subset relation.*
(defun INCLUDED-IN (l0 l1)
  (not (dolist (m l0)
         (or (memq m l1) (return t)))))


;1; Assumes <l> is non-null*
(defun LEAST-MEMBER (l &optional (function #'<) &aux (least (car l)))
  (dolist (d (cdr l) least)
    (if (funcall function d least)
        (setq least d))))
```

```lisp
(defun SECOND-MEMBER (l &optional (function #'<) &aux (least (car l)) second)
  (dolist (d (cdr l) second)
    (cond ((funcall function d least)
           (setq second least
                 least d))
          (second
           (if (funcall function d second)
               (setq second d)))
          (t
           (setq second d)))))
(defun GREATEST-MEMBER (l &aux (greatest (car l)))
  (dolist (d l greatest)
    (if (> d greatest) (setq greatest d))))

(defun MAX-VALUE (list key-function &optional condition-function &aux max-value)
  (dolist (item list max-value)
    (if (or (null condition-function) (funcall condition-function item))
        (let ((new-value (funcall key-function item)))
          (if (or (null max-value) (> new-value max-value))
              (setq max-value new-value))))))

(defun MIN-VALUE (list key-function &optional condition-function &aux min-value)
  (dolist (item list min-value)
    (if (or (null condition-function) (funcall condition-function item))
        (let ((new-value (funcall key-function item)))
          (if (or (null min-value) (< new-value min-value))
              (setq min-value new-value))))))

(defun MIN-RELATIVE-VALUE (list thing key-function &optional condition-function &aux min-value)
  (dolist (item list min-value)
    (if (or (null condition-function) (funcall condition-function item))
        (let ((new-value (funcall key-function item thing)))
          (if (and new-value (or (null min-value) (< new-value min-value)))
              (setq min-value new-value))))))

(defun MAX-RELATIVE-VALUE (list thing key-function &optional condition-function &aux min-value)
  (dolist (item list min-value)
    (if (or (null condition-function) (funcall condition-function item))
        (let ((new-value (funcall key-function item thing)))
          (if (or (null min-value) (> new-value min-value))
              (setq min-value new-value))))))

(defun INSERT-MACHINE-IN-ORDER (machine machine-list &aux (machine-number (m-number machine)))
  (cond ((null machine-list) (list machine))
        ((< machine-number (m-number (car machine-list)))
         (cons machine machine-list))
        ((= machine-number (m-number (car machine-list)))
         machine-list)
```

```
(t
 (do ((machines machine-list (cdr machines))
      (machines-cdr (cdr machine-list) (cdr machines-cdr)))
     ((null machines-cdr) (rplacd machines (list machine)) machine-list)
   (let ((second-number (m-number (car machines-cdr))))
     (cond ((> machine-number second-number))
           ((< machine-number second-number)
            (rplacd machines (cons machine machines-cdr))
            (return machine-list))
           (t
            (return machine-list))))))))

(defun MARK-OPERATION-FOR-LOAD (operation)
  (dolist (machine (op-machines operation))
    (setq *machines-to-check* (insert-machine-in-order machine *machines-to-check*))))

;1; Not used yet.  Does <function-to-do> to items in <list> in order determined by*
;1; <ordering-function>, without copying or modifying <list>.*
(defun DO-IN-ORDER (list function-to-do ordering-function)
  (do ((last-one nil least-one)
       (least-one nil nil))
      (nil)
    ;1; Set least-one to the smallest thing on the list that's bigger than last-one.*
    (dolist (item list)
      (if (and (or (null least-one) (funcall ordering-function item least-one))
               (or (null last-one) (funcall ordering-function last-one item)))
          (setq least-one item)))
    (unless least-one (return))
    ;1; Now do it to everything that's not bigger than least-one and bigger than last-one.*
    (dolist (item list)
      (if (and (not (funcall ordering-function least-one item))
               (or (null last-one) (funcall ordering-function last-one item)))
          (funcall function-to-do item)))))
```

```
;1; -*- Mode:COMMON-LISP; Package: DMOS; Base:10.; Fonts:MEDFNT,HL12B,HL12BI -*-*


(defun user:ep () (funcall *editor-window* :get-pane 'editor-pane))


(defun user:epst ()
  (funcall (user:ep) :print-template-string))

;1; Temporary.*
(defun user:see (n)
  (firstn n uuu))

(defun user:xxx ()
  (let ((arr (funcall (funcall *editor-window* :get-pane 'editor-pane) :text-array)))
    (dotimes (i (length arr))
      (let ((s (aref arr i)))
        (when s (terpri) (print (listarray s)))))))


(defun user:ln (i)
  (let ((arr (funcall (funcall *editor-window* :get-pane 'editor-pane) :text-array)))
    (listarray (aref arr i))))


(defun user:lns (i j)
  (do ((k i (1+ k)))
      ((> k j))
    (print (user:ln k))))

;1; -*- Package: DMOS; Mode: COMMON-LISP; Base: 10.; Fonts: MEDFNT,HL12B,HL12BI -*-*

;1; 1/15/86*

;1; File for i/o stuff for the scheduling program.*

;1; E.g., 'pw104 => "PW".*
(defun LETTERS-OF (machine-name)
  (let* ((str (string machine-name))
         (pos (string-search-set '(#\0 #\1 #\2) str)))
    (if pos
        (substring str 0 pos)
        str)))

;1;  Functions to display stuff.*

(defun DISPLAY-ORDERED-USAGES (&optional (stream standard-output) (operation-limit nil) (bound 100)
                               (rework-factor *default-rework-factor*)
                               (setup-time-factor *default-setup-time-factor*)
                               (lot-factor-list *default-lot-factor-list*)
                               &aux usage-pairs)
```

```
(dolist (machine-type *machine-types*)
  (let ((val (compute-machine-type-usage
               machine-type
               operation-limit
               rework-factor
               setup-time-factor
               lot-factor-list)))
    (if (not (equal val 0.0))
        (push (cons machine-type val) usage-pairs))))
(terpri stream)
(do ((pairs (sort usage-pairs #'(lambda (x y) (> (cdr x) (cdr y))))
            (cdr pairs))
     (b 0 (1+ b)))
    ((or (eq b bound) (null pairs)))
  (format stream 2"~%   ~A   ~5F"* (caar pairs) (cdar pairs)))
(terpri stream))


(deff DOU 'display-ordered-usages)


(defun DOUB (bound &optional (rework-factor *default-rework-factor*)
                   (setup-time-factor *default-setup-time-factor*)
                   (lot-factor-list *default-lot-factor-list*))
  (display-ordered-usages nil bound rework-factor setup-time-factor lot-factor-list))

(defun DU-LIM (operation-limit &optional (rework-factor *default-rework-factor*)
                   (setup-time-factor *default-setup-time-factor*)
                   (lot-factor-list *default-lot-factor-list*)
                   (bound 100))
  (display-ordered-usages operation-limit bound rework-factor setup-time-factor lot-factor-list))


;1; *****************


(defun SHOW-LOAD (operation machine number-of-lots)
  (terpri)
  (format nil
          2"    Loading ~D lots from operation ~A to machine ~A.  ~D Lots in operation queue.  ~D Lots in machine."*
          number-of-lots
          operation
          machine
          (number-of-lots-on-queue operation)
          (lots-in-machine machine)))
(defun SHOW-UNLOAD (operation machine number-of-lots)
  (terpri)
  (format nil
          2"    Unloading ~D lots from machine ~A to operation ~A.  ~D Lots in operation queue.  ~D Lots in machine."*
          number-of-lots
          machine
          operation
```

```
        (number-of-lots-on-queue operation)
        (lots-in-machine machine)))


(defun MAYBE-SHOW-STATE ()
  (when (and (numberp *next-break*) (> *current-time* *next-break*))
    (user:show-state)
    (break 2"maybe-show-state"*)))


(defun SHOW-QUEUES ( )
  (dolist (operation *operations*)
    (let* ((n-queued (number-of-lots-on-queue operation))
           (q (lots-on-queue operation))
           (d (number-of-lots-in-process operation)))
      (unless (and (zerop n-queued) (zerop d))
        (format t 2"~%~12D  "* operation)
        (unless (g-null q)
          (princ 2"Queue:  "*)
          (princ q))
        (unless (zerop d)
          (unless (g-null q) (princ 2"  "*))
          (princ 2"Doing:  "*)
          (dolist (machine (op-machines operation))
            (unless (or (eq (m-status machine) 'free)
                        (and (eq (m-status machine) 'broken)
                             (eq (m-last-unbroken-status machine) 'free)))
              (let ((pair (assq operation (m-doing machine))))
                (unless (g-null (cdr pair))
                  (format t 2"[~A ~A] "* machine (cdr pair)))))))))))


;1; &&&&&&&&&&&&&&&&&&&&&&&&&&&&&&&&&&&&&&&&&&&&&&&&&&&&&&&&&&&&&&&&&&*


(defun MAKE-STRING-V (thing defstruct-name)
  (with-output-to-string (st)
    (show-instance-v thing defstruct-name st)))


;1; Shows instance, one variable to the line, with the variable name displayed*
(defun SHOW-INSTANCE-V (thing defstruct-name &optional (stream standard-output))
  (do ((seqs (variable-alist defstruct-name) (cdr seqs))
       (i Ø (1+ i)))
      ((null seqs))
    (terpri stream)
    (princ (get-pname (caar seqs)) stream)
    (princ 2":  "* stream)
    (print-variable (aref thing i) (caar seqs) stream)))
```

```
;1; Shows instance across the screen, without variable names.*
(defun SHOW-INSTANCE-H (thing defstruct-name &optional (stream standard-output))
  (do ((seqs (variable-alist defstruct-name) (cdr seqs))
       (i 0 (1+ i)))
      ((null seqs))
    (princ 2" "* stream)
    (print-variable (aref thing i) (caar seqs) stream)))


(defun PRINT-SLOT (defstruct-instance defstruct-name slot-name &optional (stream standard-output))
  (do ((seqs (variable-alist defstruct-name) (cdr seqs))
       (i 0 (1+ i)))
      ((null seqs) (print 2"Not a variable name"* stream))
    (when (string-equal (string slot-name) (get-pname (caar seqs)))
      (princ 2"     "* stream)
      (print-variable (aref defstruct-instance i) (caar seqs) stream)
      (return))))


(defun PRINT-LIST (thing variable &optional (stream standard-output))
  (princ 2"("* stream)
  (do ((items thing (cdr items)))
      ((null items))
    (let ((item (car items)))
      (cond ((flonump item) (print-flonum item 3 stream))
            ((null item) (princ 2"-"* stream))
            (t (selectq variable
                 ((contention doing)
                  (format stream "2(~A ~5F)"* (car item) (cdr item)))
                 (otherwise (princ item stream)))))
      (if (cdr items) (princ 2" "* stream))))
  (princ 2")"* stream))


(defun PRINT-VARIABLE (thing variable &optional (stream standard-output))
  (cond ((flonump thing) (print-flonum thing 3 stream))
        ((null thing) (princ 2"-"* stream))
        ((eq variable 'position)
         (princ thing stream))
        ((eq variable 'instructions)
         (format stream 2"~A  ~A"*  (car thing) (cdr thing)))
        ((listp thing)
         (print-list thing variable stream))
        (t (princ thing stream))))


;1; Number of digits before the decimal in n.  (E.g., 8743.234 -> 4)*
(defun WHOLE-DIGITS (n)
  (dotimes (digits 1000)
    (if (> (^ 10 digits) n) (return digits))))
```

```
;1; Prints flonum, with up to dec digits after the decimal.*
(defun PRINT-FLONUM (n dec &optional (stream standard-output))
  (let ((d (whole-digits n)))
    (format:output stream (format:ofloat n (if (zerop d)
                                               (1+ dec)
                                               (+ dec d))))))

;1; -*- Mode:COMMON-LISP; Package: DMOS; Base:10.; Fonts:MEDFNT,HL12B,HL12BI -*-*


(defconst *NULL-ITEM* '(" "  :no-select nil))

;1; The constraint frame for the whole system*
(defflavor SCREEN-DISPLAY-WINDOW ()
           (tv:process-mixin
            tv:bordered-constraint-frame)
;;;  (:default-init-plist :expose-p  t)        1 ;ensure exposure of editor window -- roark*
  :initable-instance-variables
  :settable-instance-variables)


;1; Type of pane for displaying and changing process flow.*
(defflavor EDITOR-PANE
           ((divider-first?)
            (dividers)
            (breaks)
            (print-template-alist)
            (items-in-line-length-list)
            (standard-item-alist)
            (line-types)
            ;1; Number of screen lines the titles take up.*
            (title-strings)
            ;1; String to hold stuff that is going to be printed as a line.*
            (print-template-string)
            ;1; Distance in pixels of the top of the last possible screen line from the *inside* of the pane.*
            (top-of-last-screen-line)
            ;1; Index into the text array.*
            (number-of-first-line)
            ;1; Index into the text array.*
            (number-of-last-line)
            ;1; Number of lines that fit onto the screen below the title.*
            (number-of-lines-below-title)
            ;1; An array that directly represents a DMOS process flow or mtbf file.*
            (text-array)
            ;1; The number in the array just past the end of the process flow.*
            (number-past-last-entry)
            ;1; Buffer for lines to copy.*
            (saved-lines-for-copying)
            ;1; Buffer for lines to delete.*
            (saved-lines-for-deleting)
            ;1; For asking for user confirmation.*
            (confirmation-menu (tv:make-window 'tv:menu)))
           (tv:any-tyi-mixin
```

```
           tv:basic-mouse-sensitive-items
           tv:window-pane)
  :initable-instance-variables
  :settable-instance-variables)


;1; All the configurations for the window.*
(defconst *EDITOR-CONFIGURATIONS*
          '((only (whole-thing)
                  ((whole-thing :horizontal (:even)
                                (editor-pane right-pane)
                                ((editor-pane .70))
                                ((right-pane :vertical (:even)
                                             (control-option-pane listener-pane)
                                             ((control-option-pane :even)
                                              (listener-pane :even)))))))))


(defstruct (ENTRY-STRUCTURE (:conc-name 2"ES-"*)
                  (:print-function (lambda (p s n) n (princ 2"ES-"* s) (princ (es-type p) s))))
  type
  length
  read-function
  test-function)


(defconst *COMMON-COPY-ITEM-ALIST*
          '((num copy-after
                 "2Left: Copy stuff here.  Right: Abort copy"*
                 ("2Copy after this line"* :value copy-after
                  :documentation "2Copy the stored material after this line."*)
                 ("2Abort copy"* :value abort-copy
                  :documentation "2Forget about copying stuff."*))))


(defconst *COMMON-SET-COPY-END-ITEM-ALIST*
          '((num set-end
                 "2Left: Make this line the last line of the section being copied.  Right: Abort copy"*
                 ("2Set end of section to copy."* :value set-last-copy-line
                  :documentation "2Make this line the last line of the section being copied."*)
                 ("2Abort copy"* :value abort-copy
                  :documentation "2Forget about copying stuff."*))))


(defconst *COMMON-SET-DELETE-END-ITEM-ALIST*
          '((num set-end
                 "2Left: Delete to this line.  Right: Abort delete"*
                 ("2Delete to this line *now*. "* :value  set-last-delete-line
                  :documentation "2Delete up to and including this line immediately."*)
                 ("2Abort delete"* :value abort-delete
                  :documentation "2Forget about deleting this section."*))))
```

```
;1; -*- Mode:COMMON-LISP; Package: DMOS; Base:10.; Fonts:MEDFNT,HL12B,HL12BI -*-*

;1;; Modifications made by rosmaita (6/11/86) -- see comments in code*
;1;; (1) method :PROCESS-BLIPS*
;1;; (2) method :PROCESS-DMOS-FLOW-BLIPS*
;1;; (3) method :CHANGE-ITEM*
;1;; (4) function START-EDITOR*
;1;; (5) method :EDIT for flavor editor-pane*
;1;; (6) added method :PROCESS-ARROWS for flavor editor-pane*
;1;; (7) added method :RESET-*LAST-ITEM-CHANGED* for flavor editor-pane*
;1;; (8) added method :NEED-NEW-*LAST-ITEM-CHANGED* for flavor editor-pane*


;1;; NOTE: the methods that scroll the screen up and down should have the following line inserted*
;1;; in them someplace after the tv:item-list has been updated*
;1;;         (if (funcall-self :need-new-*last-item-changed*) (funcall-self :reset-*last-item-changed*))*

(defvar *MTBF-EDITING* nil)


(defvar *MTBF-EDITOR-WINDOW* nil)
(defvar *DMOS-FLOW-EDITOR-WINDOW* nil)


(defvar *DMOS-FLOW-EDITOR-PROCESS*
        (make-process "DMOS-FLOW" :quantum 300 :regular-pdl-size 15000. :special-pdl-size 1500.))


(defvar *MTBF-EDITOR-PROCESS*
        (make-process "MTBF" :regular-pdl-size 15000. :special-pdl-size 1500.))


(defun user:CRANK ()
  (setq *terminate-flow-pane* nil)
  (dmos:start-dmos-flow-editor))


(defun user:BRANK ()
  (setq *terminate-flow-pane* nil)
  (dmos:start-mtbf-editor))


(defun user:G ()
  (send tv:process :preset 'dmos:run-editor-window)
  (process-enable tv:process))


(defun START-MTBF-EDITOR ()
  (setq *mtbf-editing* t)
  (start-editor *mtbf-editor-window*  *mtbf-editor-process* ))
```

```
(defun START-DMOS-FLOW-EDITOR ()
  (setq *mtbf-editing* nil)
  (start-editor *dmos-flow-editor-window*  *dmos-flow-editor-process*))


(defun user:SET-MTBF ()
  (user:mtbf-test)
  (make-mtbf-editor-window))


(defun user:SET-DMOS-FLOW ()
  (user:dmos-flow-test)
(defun MAKE-MTBF-EDITOR-WINDOW ()
    (setq *mtbf-editor-window*
        (make-editor-window *mtbf-editor-panes* *editor-configurations* *mtbf-text-array*)))


(defun MAKE-DMOS-FLOW-EDITOR-WINDOW ()
  (setq *dmos-flow-editor-window*
        (make-editor-window *dmos-flow-editor-panes* *editor-configurations* *dmos-flow-text-array*))
  (make-choice-menus))


;1; Make the whole window.*
(defun MAKE-EDITOR-WINDOW (panes configurations text-array)
  (setq uuu nil)
  (let* ((editor-window (tv:make-window
                          'screen-display-window
;;;                       :deexposed-typeout-action :permit   1;to prevent output holds -- roark*
                          :save-bits t
;;;                       :io-buffer tv:io-buffer
                          :panes panes
                          :constraints configurations
                          :superior tv:selected-window        1;better than tv:main-screen -- roark*
                          :configuration 'only))
         (editor-pane (funcall editor-window :get-pane 'editor-pane))
         (line-length
           (+ (if (funcall editor-pane :divider-first?) 1 0)
              (let ((length 0))
                (dolist (number (funcall editor-pane :items-in-line-length-list) length)
                  (push number uuu)
                  (push length uuu)
                  (setq length (+ 1 number length))))))
         (control-option-pane (funcall editor-window :get-pane 'control-option-pane))
         (listener-pane (funcall editor-window :get-pane 'listener-pane))
         (main-buffer (tv:make-default-io-buffer)))
;;;    (send editor-window :select)                       1;attempt to make editor window selected--alr*
;;;    (send editor-window :refresh)
    (push 'make-1 uuu)
    (funcall editor-pane :set-print-template-string
             (make-array line-length :type 'art-string :leader-list '(0) :initial-element #\space))
```

```
  (funcall control-option-pane :set-io-buffer main-buffer)
  (funcall editor-pane :calculate-vars text-array)
  (funcall editor-pane :set-io-buffer main-buffer)
  (let ((choice-menu (symeval-in-instance editor-pane 'tv:menu)))
    (funcall choice-menu :set-item-list '("2 "*))
    (funcall choice-menu :set-font-map '(fonts:hl12b))
    (funcall choice-menu :set-current-font 'fonts:hl12b)
    (funcall choice-menu :set-default-font 'fonts:hl12b))
  (push 'make-2 uuu)
  (funcall editor-pane :set-more-p nil)
  (funcall editor-pane :set-current-font 'fonts:cptfont)
  (funcall listener-pane :set-current-font 'fonts:cptfont)
  (funcall control-option-pane :set-current-font 'fonts:medfnt)
  (push 'make-3 uuu)
  editor-window))


(defun START-EDITOR (top-window process)
  (setq *editor-window* top-window)
  ;1; this function sets up the command pane in the upper corner.  It is called*
  ;1; here because it needs to use the value of *editor-window**
  (setup-control-option-pane)              ;1rosmaita*
  (setq uuu nil)
  (if (null tv:process)
    ;1; Give the function to the process, and start it up.*
    (funcall tv:process :preset #'run-editor-window)
    (push 'process-enable uuu)
    (process-enable tv:process)
;;;   (funcall *editor-window* :edit)
    )


(defun RUN-EDITOR-WINDOW ()
  (push 'run-editor-window uuu)
  (funcall *editor-window* :edit))


;1; This is the editor blinker (formerly *flow-blinker*)* (tv:sheet-following-blinker *editor-pane*)


;1; The top level function.*
(defmethod (screen-display-window :EDIT)
           (&aux (old-window tv:selected-window))
  (push 'edit-entry uuu)
  (let ((control-option-pane (funcall-self :get-pane 'control-option-pane))
        (editor-pane (funcall-self :get-pane 'editor-pane))
        (listener-pane (funcall-self :get-pane 'listener-pane)))
    (push 'editing uuu)
    (funcall-self :expose)
    (funcall-self :select)
    (funcall control-option-pane :expose)
    ;1; For  now*
```

```
    (funcall listener-pane :deexpose)
    (push  'listener-exposed uuu)
    (funcall editor-pane :edit old-window)))  ;;tried removing old-window alr


(defmethod (editor-pane :EDIT) (old-window)  ;;tried removing old-window alr
  (unwind-protect
      (progn
        (funcall-self :expose)
        (funcall-self :select)
        (funcall-self :clear-input)
        (funcall-self :clear-screen)
        (send self :refresh)
        (funcall-self :home-cursor)
        (funcall-self :set-item-type-alist standard-item-alist)
        (push 'item-alist-set uuu)
        (funcall-self :set-number-of-first-line -1)
        (funcall-self :set-number-of-last-line -1)
        (push 'first-line-set uuu)
        (funcall-self :set-number-past-last-entry
                      (dotimes (i (length text-array))
                        (unless (aref text-array i) (return i))))
        (funcall-self :write-title)
        (funcall-self :initial-write)
        (push 'initial-lines-entered uuu)
        (funcall-self :process-blips))
    ;1; For some reason, tv:process tends to be NIL at this point. -- rosmaita*
    (send *editor-window* :deactivate)
    (if tv:process (funcall tv:process :kill))
    (funcall old-window :select)
    (send old-window :refresh)
    ))

;1;; <My-item> is the one that you moused in order to get <menu>.*
(defmethod (editor-pane :CALL-MENU-CHOOSE) (menu my-item)

(funcall menu :select)
(push 'call-menu-choose-1 uuu)
(let ((line (second my-item)))
  (let ((thing (funcall menu :choose)))
    (push (list 'call-menu-choose-2 thing) uuu)
    (selectq thing
      (store-operation
       (if (memq (typep line) '(operation-data-line machine-data-line))
           (let ((o-line (funcall-self :next-higher-line-of-type line 'operation-data-line)))
             (cond (o-line
                    (funcall-self :set-item-type-alist *common-copy-item-alist*)
                    (funcall-self :set-saved-lines-for-copying
                                  (funcall-self :lines-for-operation-line o-line)))
                   (t
                    (beep))))
           (beep)))
      (store-operation-sequence (beep))
```

```
      (store-machine-sequence (beep))
      (set-copy-beginning
       (funcall-self :set-saved-lines-for-copying (list  line))
       (funcall-self :set-item-type-alist *common-set-copy-end-item-alist*))
      (add-empty-line-after
       (funcall-self :insert-new-lines my-item (list (make-empty-data-line))))
      (add-log-point-line-after
       (funcall-self :insert-new-lines my-item (list (make-log-point-data-line))))
      (add-machine-sequence (beep))
      (delete-operation
       (if (memq (typep line) '(operation-data-line machine-data-line))
           (let ((o-line (funcall-self :next-higher-line-of-type line 'operation-data-line)))
             (if o-line
                 (funcall-self :delete-lines (funcall-self :lines-for-operation-line o-line))
                 (beep)))
           (beep)))
      (delete-operation-sequence (beep))
      (delete-machine-sequence (beep))
      (set-delete-beginning
       (funcall-self :set-saved-lines-for-deleting my-item)
       (funcall-self :set-item-type-alist *common-set-delete-end-item-alist*)))))
  (funcall-self :select))


;1;; Modified by rosmaita: 6/9 added code to clear space before user entry*
;1;                        6/10 added code to clear garbage before entered value is displayed*
;1;                        6/11 code added to take the place of a call to :DMOS-ITEM*
(defmethod (editor-pane :CHANGE-ITEM) (my-item)
  (tv:mouse-warp 0 0)                          ;1 Hide the mouse.*
  (let* ((line (second my-item))
         (variable (third my-item))
         (entry-structure (funcall-self :entry-structure-for line variable))
         (inside-x-pos (fourth my-item))
         (inside-y-pos (fifth my-item))
         (flow-blinker (tv:sheet-following-blinker self)))
    (funcall flow-blinker :set-visibility t)
    (funcall flow-blinker :set-follow-p t)
    (funcall-self :set-cursorpos inside-x-pos inside-y-pos)
    (funcall flow-blinker :set-follow-p t)
    ;1; Rosmaita*
    ;1; Clear the item space so it's empty for the user to enter a new value.*
    (funcall-self :clear-between-cursorposes
                  inside-x-pos
                  inside-y-pos
                  ;1; The other x-coordinate is the calculated by the number of characters in the item field times the*
                  ;1; character width added to the original x-coord.*
                  (+ (* (es-length entry-structure) tv:char-width) inside-x-pos)
                  inside-y-pos)
    ;1; The next call will return T if an (esc) was typed by the user, else NIL.
```

```
(unless (funcall-self :item-reader (es-length entry-structure))
  (let* ((new-value (funcall (es-read-function entry-structure) *reading-string*))
         (value-ok (and (not (eq new-value 'error))
                        (funcall (es-test-function entry-structure) new-value)))
         (setting-index (setting-index-for line variable)))
    (push (list 'change-item new-value line setting-index 'value-ok value-ok) uuu)
    ;1; Update the value of the item if the new value is valid*
    (cond (value-ok
           (aset new-value line setting-index)
           (rplaca my-item new-value))
          (t       1   *;1; Otherwise indicate an entry error.*
           (funcall-self :beep)))))
  ;1; Return cursor to beginning of item.*
  (funcall-self :set-cursorpos inside-x-pos inside-y-pos)
  (funcall flow-blinker :set-follow-p t)
  ;1; Clear the item space so there's no garbage left in the box*
  (funcall-self :clear-between-cursorposes
                inside-x-pos
                inside-y-pos
                (+ (* (es-length entry-structure) tv:char-width) inside-x-pos)
                inside-y-pos)
  ;1; Type out the value of the item, or enough spaces if item is nil.*
  (fit-print (car my-item) (es-length entry-structure) self)
  (funcall flow-blinker :set-visibility nil)
  ;1; This is now the last modified item.*
  (setq *last-item-changed* my-item)
  (tv:mouse-warp (+ inside-x-pos 3) (+ inside-y-pos tv:line-height)))
 (tv:mouse-wakeup))
;1; End Rosmaita.
```

```
DDDDDDDDDD   111111111111111111111111111111111111111111111111111111111111111111111111111111111111111111111111111111   DDDDDDDDDD
DDDDDDDDDD   11111111111111111111111  THIS INFORMATION IS THE PROPERTY OF TEXAS INSTRUMENTS  11111111111111111111111   DDDDDDDDDD
DDDDDDDDDD   111111111111111111111111111111111111111111111111111111111111111111111111111111111111111111111111111111   DDDDDDDDDD

                                RRRR    000    AAA   RRRR   K   K
                                R   R  0   0  A   A  R   R  K  K
                                R   R  0   0  A   A  R   R  K K
                                RRRR   0   0  A   A  RRRR   KKK
                                R R    0   0  AAAAA  R R    K K
                                R  R   0   0  A   A  R  R   K  K
                                R   R   000   A   A  R   R  K   K

  000000    PPPPPPPP   TTTTTTTTTT   IIIIII    000000   NN      NN            PPPPPPPP     AAAAAA    NN      NN  EEEEEEEEEE
  000000    PPPPPPPP   TTTTTTTTTT   IIIIII    000000   NN      NN            PPPPPPPP     AAAAAA    NN      NN  EEEEEEEEEE
00      00  PP      PP     TT         II    00      00 NN      NN            PP      PP AA      AA  NN      NN  EE
00      00  PP      PP     TT         II    00      00 NN      NN            PP      PP AA      AA  NN      NN  EE
00      00  PP      PP     TT         II    00      00 NNNN    NN            PP      PP AA      AA  NNNN    NN  EE
00      00  PP      PP     TT         II    00      00 NNNN    NN            PP      PP AA      AA  NNNN    NN  EE
00      00  PPPPPPPP       TT         II    00      00 NN  NN  NN            PPPPPPPP   AA      AA  NN  NN  NN  EEEEEEEE
00      00  PPPPPPPP       TT         II    00      00 NN  NN  NN            PPPPPPPP   AA      AA  NN  NN  NN  EEEEEEEE
00      00  PP             TT         II    00      00 NN    NNNN            PP         AAAAAAAAAA  NN    NNNN  EE
00      00  PP             TT         II    00      00 NN    NNNN            PP         AAAAAAAAAA  NN    NNNN  EE
00      00  PP             TT         II    00      00 NN      NN            PP         AA      AA  NN      NN  EE
00      00  PP             TT         II    00      00 NN      NN            PP         AA      AA  NN      NN  EE
  000000    PP             TT       IIIIII    000000   NN      NN ________   PP         AA      AA  NN      NN  EEEEEEEEEE
  000000    PP             TT       IIIIII    000000   NN      NN ________   PP         AA      AA  NN      NN  EEEEEEEEEE

                       LL          IIIIII     SSSSSSSS  PPPPPPPP      ;;;;      11
                       LL          IIIIII     SSSSSSSS  PPPPPPPP      ;;;;      11
                       LL            II     SS          PP      PP    ;;;;    1111
                       LL            II     SS          PP      PP    ;;;;    1111
                       LL            II     SS          PP      PP              11
                       LL            II     SS          PP      PP              11
                       LL            II       SSSSSS    PPPPPPPP      ;;;;      11
                       LL            II       SSSSSS    PPPPPPPP      ;;;;      11
                       LL            II             SS  PP            ;;;;      11
                       LL            II             SS  PP            ;;;;      11
                  .... LL            II             SS  PP              ;;      11
                  .... LL            II             SS  PP              ;;      11
                  .... LLLLLLLLLL  IIIIII     SSSSSSSS  PP            ;;      111111
                  .... LLLLLLLLLL  IIIIII     SSSSSSSS  PP            ;;      111111
```

File _$3$DUA27:[ROARK.JUL]OPTION_PANE.LISP;1 (28704,13,0), last revised on 15-JUL-1986 14:42, is a 10 block sequential file owned by UIC [IIIS,ROARK]. The records are variable length with implied (CR) carriage control. The longest record is 138 bytes.

Job OPTION_PANE (209) queued to NB_TALARIS_1 on 15-JUL-1986 17:46 by user ROARK, UIC [IIIS,ROARK], under account KBS at priority 100, started on printer LCA0 on 15-JUL-1986 17:46 from queue NB_TALARIS_1.

```
DDDDDDDDDD   111111111111111111111111111111111111111111111111111111111111111111111111111111111111111111111111111111   DDDDDDDDDD
DDDDDDDDDD   1111111111111111111111111  Digital Equipment Corporation - VAX/VMS Version V4.4  1111111111111111111111111   DDDDDDDDDD
DDDDDDDDDD   111111111111111111111111111111111111111111111111111111111111111111111111111111111111111111111111111111   DDDDDDDDDD
```

```
;;; -*- Mode:Common-Lisp; Package:DMOS; Base:10; Fonts:(MEDFNT HL12B HL12BI) -*-

;1;; 2NOTE*: SETUP-CONTROL-OPTION-PANE is currently being called by (START-EDITOR)*

;1; Variables which may need their names changed to fit with Frank's code*
(DEFVAR *datafile-pathname*
        (fs:merge-pathnames "new.data" (fs:default-pathname))
 "2This variable could be local, but is kept global so that the user is always offered the last pathname
  s/he specified when saving a file."*)


;1; Possible items for the control-option-pane.  Note: this is different from Frank's c-o-Alist: this is*
;1; one which should be used*
(defconst *CONTROL-OPTION-LIST*
          '(
            ("" :no-select
             :documentation "Welcome to the wild, wonderful world of DMOS IV scheduling.")
;           ("Enter new lines." :value enter-new-lines
;            :documentation "Enter new lines into flow array.")
            ("Save flow in file." :value save-ordinary
             :documentation "Save the process flow, to be read in again.")
;           ("Save as real flow." :value save-as-real-flow
;            :documentation "Save the current flow as the real process flow.")
            ("Quit the editor." :value quit
             :documentation "Quit the editor WITHOUT saving.")
            ("Exit the editor." :value exit
             :documentation "Exit the editor and save the current flow.")
            )
  )


(DEFUN setup-control-option-pane ()
  "2Sets the options for the *control-option-pane**"
  (LET ((*control-option-pane* (FUNCALL *editor-window* :get-pane 'control-option-pane)))
    (SEND *control-option-pane* :set-vsp 32)
    (SEND *control-option-pane* :set-item-list *control-option-list*)
    (SEND *control-option-pane* :set-font-map '(fonts:tr18
                                                 fonts:hl12b
                                                 fonts:hl12bi
                                                 fonts:hl12
                                                 fonts:hl12i
                                                 fonts:tr12b
                                                 fonts:tr12bi
                                                 fonts:tr12i
                                                 fonts:tr12
                                                 fonts:tr18
                                                 ))
    (SEND *control-option-pane* :set-current-font fonts:tr18)
```

```
   (SEND *control-option-pane* :set-label '(:top
                                              :centered
                                              :string "DMOS IV"
                                              :font fonts:cmr18
                                              ))
   (SEND *control-option-pane* :refresh))
 )


(DEFUN quit-confirmed-p ()
  "2returns T if the user confirms the quit command else NIL*"
  (tv:mouse-confirm "Quitting the program through this choice will NOT save any changes"
                    "Click to exit anyway"
                    fonts:hl12b
                    fonts:hl12i
                    150                         ;squeezes the window to look better
                    )
  )


(DEFUN get-pathname-and-save-file (menu-label-string)
  "2Queries the user and sets *datafile-pathname* to the indicated pathname;
 saves the file unless the user signals an Abort.  Returns 'abort iff the user wants to abort*"
  ;1; The CATCH is used because of the the way margin-choice options are implemented in (tv:choose-variable-values).  Any function
*  ;1; specified after the "Abort" option will be executed if that option is chosen, but the menu won't disappear.  Using a THROW as
 the*
  ;1; function activates the UNWIND-PROTECT in (choose-variable-values), which gets rid of the menu.*
  (CATCH 'abort
    (tv:choose-variable-values (LIST
                                 (LIST '*datafile-pathname*
                                       menu-label-string
                               1          *;1 the documentation is needed because the default is incorrect*
                                       :documentation
                               2          *"L: move to an item and select it, R: move to an item and edit it."
                                       :pathname))
                   2           *:label "Where should the changes be stored?"
                               :margin-choices '("Save file" ("2Abort"* (THROW 'abort 'abort)))
                               )
1     *;1;  The *datafile-pathname* must be SETQed because the choose-var-values makes it a string if the user edits it, and it'
s
      *;;1 supposed to be a pathname.  This means that after an Abort during which the user edited the pathname, the value of*
     ;1; *datafile-pathname* will be a string.  This will cause no problems as long as the following operation is always performed
*
     ;1; before *datafile-pathname* is used in file operations.*
    (SETQ *datafile-pathname* (fs:merge-pathnames *datafile-pathname* (fs:default-pathname)))
    (funcall (funcall *editor-window* :get-pane 'editor-pane) :write-to-file *datafile-pathname*)
;    (save-datafile)                          ;1end of CATCH*
    )
  )
```

```
(DEFUN process-command-pane-blips (item)
  ;1; expects to get the cadr of a blip from the control-option-pane*
  (LET ((value (THIRD item)))
   (SELECTQ value
     (enter-new-lines
      )
     (save-ordinary
      (get-pathname-and-save-file "2Datafile (ordinary save)"*))
     (save-as-real-flow
      (get-pathname-and-save-file "2Real Flow Datafile"*))
     (quit (IF (quit-confirmed-p) (SETQ *terminate-flow-pane* T)))
     (exit (UNLESS (EQ (get-pathname-and-save-file "2Datafile"*) 'abort)
             (SETQ *terminate-flow-pane* T)))
     ))
  )
```

```
VVVVVVVVVV   3333333333333333333333333333333333333333333333333333333333333333333333333333333333   VVVVVVVVVV
VVVVVVVVVV   33333333333333333333333  THIS INFORMATION IS THE PROPERTY OF TEXAS INSTRUMENTS  33333333333333333333333   VVVVVVVVVV
VVVVVVVVVV   3333333333333333333333333333333333333333333333333333333333333333333333333333333333   VVVVVVVVVV

                                  RRRR    OOO    AAA   RRRR   K   K
                                  R   R  O   O  A   A  R   R  K  K
                                  R   R  O   O  A   A  R   R  K K
                                  RRRR   O   O  A   A  RRRR   KKK
                                  R R    O   O  AAAAA  R R    K K
                                  R  R   O   O  A   A  R  R   K  K
                                  R   R   OOO   A   A  R   R  K   K

MM      MM  EEEEEEEEEE  NN      NN  UU      UU              SSSSSSSS  TTTTTTTTTT  UU      UU  FFFFFFFFFF  FFFFFFFFFF
MM      MM  EEEEEEEEEE  NN      NN  UU      UU              SSSSSSSS  TTTTTTTTTT  UU      UU  FFFFFFFFFF  FFFFFFFFFF
MMMM  MMMM  EE          NN      NN  UU      UU            SS              TT      UU      UU  FF          FF
MMMM  MMMM  EE          NN      NN  UU      UU            SS              TT      UU      UU  FF          FF
MM  MM  MM  EE          NNNN    NN  UU      UU            SS              TT      UU      UU  FF          FF
MM  MM  MM  EE          NNNN    NN  UU      UU            SS              TT      UU      UU  FF          FF
MM      MM  EEEEEEEE    NN  NN  NN  UU      UU              SSSSSS        TT      UU      UU  FFFFFFFF    FFFFFFFF
MM      MM  EEEEEEEE    NN  NN  NN  UU      UU              SSSSSS        TT      UU      UU  FFFFFFFF    FFFFFFFF
MM      MM  EE          NN    NNNN  UU      UU                    SS      TT      UU      UU  FF          FF
MM      MM  EE          NN    NNNN  UU      UU                    SS      TT      UU      UU  FF          FF
MM      MM  EE          NN      NN  UU      UU                    SS      TT      UU      UU  FF          FF
MM      MM  EE          NN      NN  UU      UU                    SS      TT      UU      UU  FF          FF
MM      MM  EEEEEEEEEE  NN      NN  UUUUUUUUUU  __________  SSSSSSSS      TT      UUUUUUUUUU  FF          FF
MM      MM  EEEEEEEEEE  NN      NN  UUUUUUUUUU  __________  SSSSSSSS      TT      UUUUUUUUUU  FF          FF

                  LL          IIIIII    SSSSSSSS  PPPPPPPP     ;;;;      11
                  LL          IIIIII    SSSSSSSS  PPPPPPPP     ;;;;      11
                  LL            II    SS          PP      PP   ;;;;    1111
                  LL            II    SS          PP      PP   ;;;;    1111
                  LL            II    SS          PP      PP             11
                  LL            II    SS          PP      PP             11
                  LL            II      SSSSSS    PPPPPPPP     ;;;;      11
                  LL            II      SSSSSS    PPPPPPPP     ;;;;      11
                  LL            II            SS  PP           ;;;;      11
                  LL            II            SS  PP           ;;;;      11
            ....  LL            II            SS  PP             ;;      11
            ....  LL            II            SS  PP             ;;      11
            ....  LLLLLLLLLL  IIIIII    SSSSSSSS  PP           ;;      111111
            ....  LLLLLLLLLL  IIIIII    SSSSSSSS  PP           ;;      111111
```

File $3$DUA27:[ROARK.JUL]MENU_STUFF.LISP;1 (24729,16,0), last revised on 16-JUL-1986 14:42, is a 11 block sequential file owned by UIC [IIIS,ROARK]. The records are variable length with implied (CR) carriage control. The longest record is 106 bytes.

Job MENU_STUFF (194) queued to NB_TALARIS_1 on 16-JUL-1986 17:36 by user ROARK, UIC [IIIS,ROARK], under account KBS at priority 100, started on printer LCA0 on 16-JUL-1986 17:36 from queue NB_TALARIS_1.

```
VVVVVVVVVV   3333333333333333333333333333333333333333333333333333333333333333333333333333333333   VVVVVVVVVV
VVVVVVVVVV   33333333333333333333333  Digital Equipment Corporation - VAX/VMS Version V4.4  33333333333333333333333   VVVVVVVVVV
VVVVVVVVVV   3333333333333333333333333333333333333333333333333333333333333333333333333333333333   VVVVVVVVVV
```

```
;1; -*- Mode:COMMON-LISP; Package: dmos; Base:10.; Fonts:MEDFNT,HL12B,HL12BI -*-*


(defvar *STORE-SOMETHING-ELSE-MENU* nil)
(defvar *ADD-SOMETHING-ELSE-MENU* nil)
(defvar *DELETE-SOMETHING-ELSE-MENU* nil)

;1; Item lists for *flow-pane* states.*

(defconst *STANDARD-ITEM-ALIST*
        '((num change-value
               "2Left: Change its value.  Right: Other stuff"*
               ("2Change value."* :value change-value
                :documentation "2Stick it on the list"*)
               ("2Store this line for copying."* :value store-line
                :documentation "2Save this line so you can copy it somewhere else."*)
               ("2Store something else for copying."* :value store-something-else-choose
                :documentation "2Store an operation, or an operation sequence, or a machine sequence, for copying."*)
               ("2Add an operation after this line"* :value add-operation-line-after
                :documentation "2Add a new operation or machine line after this one."*)
               ("2Add a machine after this line"* :value add-machine-line-after
                :documentation "2Add a new operation or machine line after this one."*)
               ("2Add  something else"* :value add-something-else-choose
                :documentation "2Add something before this line, or add a machine sequence."*)
               ("2Delete this line*.2"*  :value delete-line
                :documentation "2Delete this operation line or machine line from the process flow."*)
               ("2Delete something else."* :value delete-something-else-choose
                :documentation "2Delete this whole operation, or operation sequence, or machine sequence."*))))


(defconst *COPY-ITEM-ALIST*
        '((num copy-after
               "2Left: Copy stuff here.  Right: Abort copy"*
               ("2Copy after this line"* :value copy-after
                :documentation "2Copy the stored material after this line."*)
               ("2Abort copy"* :value abort-copy
                :documentation "2Forget about copying stuff."*))))
             *

(defconst *SET-COPY-END-ITEM-ALIST*
        '((num set-end
               "2Left: Make this line the last line of the section being copied.  Right: Abort copy"*
               ("2Make this line the last line"* :value set-last-copy-line
                :documentation "2Make this line the last line of the section being copied."*)
               ("2Abort copy"* :value abort-copy
                :documentation "2Forget about copying stuff."*))))


(defconst *SET-DELETE-END-ITEM-ALIST*
        '((num set-end
               "2Left: Delete to this line.  Right: Abort delete"*
               ("2Make this line the last line"* :value  set-last-delete-line
                :documentation "2Make this line the last line of the section being deleted."*)
```

```
        ("2Abort delete"* :value abort-delete
         :documentation "2Forget about deleting stuff."*))))


;1; Item lists for menus called up from *flow-pane*.*


(defconst *STORE-SOMETHING-ELSE-CHOOSE-ITEMS*
          '(("2 Add options: "* :no-select nil)
            ("2 "* :no-select nil)
            ("2Store this operation for copying"*
             :value store-operation
             :documentation "2Store this operation, with its machines, fo·     ying."*)
            ("2 "* :no-select nil)
            ("2Store this operation sequence for copying"*
             :value store-operation-sequence
             :documentation "2Store this operation sequence, with its machine sequences, for copying."*)
            ("2 "* :no-select nil)
            ("2Store this machine sequence for copying"*
             :value store-machine-sequence
             :documentation "2Store the machines of this sequence for copying."*)
            ("2 "* :no-select nil)
            ("2Set beginning of copy section."*
             :value set-copy-beginning
             :documentation "2Choose this line as the beginning of a section to copy."*)))


(defconst *ADD-SOMETHING-ELSE-CHOOSE-ITEMS*
          '(("2 Add options: "* :no-select nil)
            ("2 "* :no-select nil)
            ("2Add an empty new line after this line."* :value add-empty-line-after)
            ("2 "* :no-select nil)
            ("2Add a log point line after this line."* :value add-log-point-line-after)
            ("2 "* :no-select nil)
            ("2Add a machine sequence."* :value add-machine-sequence
             :documentation "2Put a template for a machine sequence after this line."*)))


(defconst *DELETE-SOMETHING-ELSE-CHOOSE-ITEMS*
          '(("2 Delete options: "* :no-select nil)
            ("2 "* :no-select nil)
            ("2Delete this operation."*
             :value delete-operation
             :documentation "2Delete this operation, with its machines."*)
            ("2 "* :no-select nil)
            ("2Delete this operation sequence."*
             :value delete-operation-sequence
             :documentation "2Delete this operation sequence, with its machine sequences."*)
            ("2 "* :no-select nil)
            ("2Delete this machine sequence."*
             :value delete-machine-sequence
             :documentation "2Delete the machines of this sequence."*)
            ("2 "* :no-select nil)
```

```
("2Set beginning of section to delete."*
 :value set-delete-beginning
 :documentation "2Choose this line as the beginning of a section to delete."*)))


(defun MAKE-CHOICE-MENUS ()
  (setq *STORE-SOMETHING-ELSE-MENU* (make-instance 'tv:momentary-menu
                                       :item-list *store-something-else-choose-items*
                                       :default-font fonts:hl12b))

  (setq *ADD-SOMETHING-ELSE-MENU* (make-instance 'tv:momentary-menu
                                       :item-list *add-something-else-choose-items*
                                       :default-font fonts:hl12b))

  (setq *DELETE-SOMETHING-ELSE-MENU* (make-instance 'tv:momentary-menu
                                       :item-list *delete-something-else-choose-items*
                                       :default-font fonts:hl12b)))
```

```
UUUUUUUUUU    999999999999999999999999999999999999999999999999999999999999999999999999999999999999999999999999999999    UUUUUUUUUU
UUUUUUUUUU    999999999999999999999999  THIS INFORMATION IS THE PROPERTY OF TEXAS INSTRUMENTS  999999999999999999999999    UUUUUUUUUU
UUUUUUUUUU    999999999999999999999999999999999999999999999999999999999999999999999999999999999999999999999999999999    UUUUUUUUUU

                                                       RRRR    000   AAA   RRRR   K   K
                                                       R   R  O   O A   A  R   R  K  K
                                                       R   R  O   O A   A  R   R  K K
                                                       RRRR   O   O A   A  RRRR   KKK
                                                       R R    O   O AAAAA  R R    K  K
                                                       R  R   O   O A   A  R  R   K   K
                                                       R   R   000  A   A  R   R  K    K

DDDD   M   M   000   SSSS         FFFFF L      000   W   W       EEEEE DDDD    III   TTTTT  000  RRRR        SSSS  TTTTT
D   D  MM MM  O   O S             F     L     O   O  W   W       E     D   D    I      T   O   O R   R      S        T
D   D  M M M  O   O S             F     L     O   O  W   W       E     D   D    I      T   O   O R   R      S        T
D   D  M   M  O   O  SSS          FFFF  L     O   O  W W W       EEEE  D   D    I      T   O   O RRRR        SSS     T
D   D  M   M  O   O     S         F     L     O   O  W W W       E     D   D    I      T   O   O R R            S    T
D   D  M   M  O   O     S         F     L     O   O  WW WW       E     D   D    I      T   O   O R  R           S    T
DDDD   M   M   000  SSSS   _____  F     LLLLL  000   W   W _____ EEEEE DDDD    III     T    000  R   R _____ SSSS     T

                                                       L      III   SSSS  PPPP    ;;    1
                                                       L       I   S      P   P   ;;   11
                                                       L       I   S      P   P          1
                                                       L       I    SSS   PPPP    ;;     1
                                                       L       I       S  P       ;;     1
                                                  ..   L       I       S  P        ;     1
                                                  ..   LLLLL  III  SSSS   P        ;    111
```

File _$3$DUA27:[ROARK.JUL]DMOS_FLOW_EDITOR_STRUCTURES.LISP;1 (26732,46,0), last revised on 15-JUL-1986 13:54, is a 18 block sequential file owned by UIC [IIIS,ROARK]. The records are variable length with implied (CR) carriage control. The longest record is 99 bytes.

Job DMOS_FLOW_EDITOR_STRUCTURES (2026) queued to NB_TALARIS on 15-JUL-1986 14:26 by user ROARK, UIC [IIIS,ROARK], under account KBS at priority 100, started on printer LCB0 on 15-JUL-1986 14:27 from queue NB_TALARIS.

```
UUUUUUUUUU    999999999999999999999999999999999999999999999999999999999999999999999999999999999999999999999999999999    UUUUUUUUUU
UUUUUUUUUU    999999999999999999999999  Digital Equipment Corporation - VAX/VMS Version V4.4  999999999999999999999999    UUUUUUUUUU
UUUUUUUUUU    999999999999999999999999999999999999999999999999999999999999999999999999999999999999999999999999999999    UUUUUUUUUU
```

```
;1; -*- Mode:COMMON-LISP; Package: DMOS; Base:10.; Fonts:MEDFNT,HL12B,HL12BI -*-*


;1; Entry structures.*


(defconst *MOD-ENTRY-STRUCTURE*
          (make-entry-structure
            :type 'mod1  *
            :length 3
            :read-function 'read-integer-from-string
            :test-function #'(lambda (n) (and (integerp n) ((< 0 n 6)))))


(defconst *LOG-POINT-ENTRY-STRUCTURE*
          (make-entry-structure
            :type 'log-point
            :length 5
            :read-function 'read-integer-from-string
            :test-function #'(lambda (n) (and (integerp n) ((< 0 n 10000)))))


(defconst *NUMBER-ENTRY-STRUCTURE*
          (make-entry-structure
            :type 'number
            :length 5
            :read-function 'read-integer-from-string
            :test-function #'(lambda (n) (and (integerp n) ((< 0 n 10000)))))


(defconst *DESCRIPTION-ENTRY-STRUCTURE*
          (make-entry-structure
            :type 'description
            :length 20
            :read-function 'read-string-from-string
            ;1; a description must have at least one non-blank, non-null character*
            :test-function #'(lambda (s) (STRING-SEARCH-NOT-CHAR #\space s))))


(defconst *PRIMARY-MACHINE-NUMBER-ENTRY-STRUCTURE*
          (make-entry-structure
            :type 'primary-machine-number
            :length 6
            :read-function 'read-string-from-string
            :test-function 'machine-name))


(defconst *ALTERNATE-MACHINE-NUMBER-ENTRY-STRUCTURE*
          (make-entry-structure
            :type 'alternate-machine-number
            :length 6
```

```
            :read-function 'read-string-from-string
            :test-function 'machine-name))


(defconst *RUN-TIME-ENTRY-STRUCTURE*
          (make-entry-structure
            :type 'run-time
            :length 4
            :read-function 'read-flonum-from-string
            :test-function 'flonump))


(defconst *SLICES-PER-RUN-ENTRY-STRUCTURE*
            :type 'slices-per-run
            :length 3
            :read-function 'read-integer-from-string
            :test-function #'(lambda (n) (and (integerp n) (< Ø n 1ØØ)))))


(defconst *LOAD-TIME-ENTRY-STRUCTURE*
          (make-entry-structure
            :type 'load-time
            :length 4
            :read-function 'read-flonum-from-string
            :test-function 'flonump))


(defconst *SETUP-TIME-ENTRY-STRUCTURE*
          (make-entry-structure
            :type 'setup-time
            :length 5
            :read-function 'read-flonum-from-string
            :test-function 'flonump))


(defconst *TIME-DEPENDENCY-ENTRY-STRUCTURE*
          (make-entry-structure
            :type 'time-dependency
            :length 5
            :read-function 'read-flonum-from-string
            :test-function 'flonump))


(defconst *TYMC-ENTRY-STRUCTURE*
          (make-entry-structure
            :type 'tymc
            :length 2
            :read-function 'read-string-from-string
            :test-function 'tymc-symbol))


(defconst *REWORK-ENTRY-STRUCTURE*
```

```
(make-entry-structure
  :type 'rework
  :length 5
  :read-function 'read-string-from-string
  :test-function 'rework-symbol))


(defconst *DMOS-FLOW-PRINT-TEMPLATE-ALIST*
          '((operation-data-line .
                                  ((mod . ,*mod-entry-structure*)
                                   (log-point . ,*log-point-entry-structure*)
                                   (number . ,*number-entry-structure*)
                                   (description . ,*description-entry-structure*)
                                   (primary-machine-number . ,*primary-machine-number-entry-structure*)
                                   (alternate-machine-number . ,*alternate-machine-number-entry-structure*)
                                   (run-time . ,*run-time-entry-structure*)
                                   (slices-per-run . ,*slices-per-run-entry-structure*)
                                   (load-time . ,*load-time-entry-structure*)
                                   (setup-time . ,*setup-time-entry-structure*)
                                   (time-dependency . ,*time-dependency-entry-structure*)
                                   (tymc . ,*tymc-entry-structure*)
                                   (rework . , *rework-entry-structure*)))
            (machine-data-line .
                                ((mod . ,*mod-entry-structure*)
                                 (alternate-machine-number . ,*alternate-machine-number-entry-structure*)
                                 4 3 4 5 5 2 5))
            (log-point-data-line .
                                  ((mod . ,*mod-entry-structure*)
                                   5 5
                                   (description . ,*description-entry-structure*)
                                   6 6 4 3 4 5 5 2 5))
            (empty-data-line .
                              ((mod . ,*mod-entry-structure*)
                               5 5 20 6 6 4 3 4 5 5 2 5))))


(defconst *DMOS-FLOW-TITLE-STRINGS*
          '("    |     |     |                    |PRIM  |ALT.  |RUN |SL/|LOAD|SETUP|TIME |TY| RE  |2"*
            "MOD|LPT  |OPN  |DESCRIPTION         |MACH #|MACH #|TIME|RUN|TIME|TIME |DEPND|MC|WORK |2"*
            "---|-----|-----|--------------------|------|------|----|---|----|-----|-----|--|-----|2"*))


;1; All the panes.*
(defconst *DMOS-FLOW-EDITOR-PANES*
          '(
;1; Option in upper right corner of screen.*
            (control-option-pane tv:command-menu-pane :item-list ("")
                                 :font-map (fonts:medfnt fonts:medfnb fonts:hl12i))
```

```
           (editor-pane editor-pane
                        :font-map (fonts:cptfont fonts:medfnt fonts:medfnb fonts:cptfontb)
                        :label nil
                        :item-type-alist nil
                        :divider-first? nil
                        :dividers ,*dmos-flow-dividers*
                        :breaks ,*dmos-flow-breaks*
                        :print-template-alist ,*dmos-flow-print-template-alist*
                        :items-in-line-length-list (3 5 5 20 6 6 4 3 4 5 5 2 5)
                        :standard-item-alist  ,*dmos-flow-standard-item-alist*
                        :line-types (operation-data-line
                                     machine-data-line
                                     log-point-data-line
                                     empty-data-line)
                        :title-strings ,*dmos-flow-title-strings*)
           (listener-pane tv:window-pane
                          :label nil
                          :font-map (fonts:cptfont fonts:hl12b fonts:medfnt fonts:medfnb) )))

(defstruct (OPERATION-DATA-LINE
             (:conc-name 2"OP-DL-"*)
             (:print-function (lambda (p s n) n
                                (format s  2"OP-DL-~D-~D"* (op-dl-log-point p) (op-dl-number p)))))
  index
  ;1; The operation constructed from this line.*
  operation
  mod
  log-point
  number
  description
  primary-machine-number
  alternate-machine-number
  run-time
  slices-per-run
  load-time
  setup-time
  time-dependency
  tymc
(defstruct (MACHINE-DATA-LINE
             (:conc-name 2"MACH-DL-"*)
             (:print-function (lambda (p s n) n
                                (format s
                                        2"M-DL-~D"*
                                        (mach-dl-index p)))))
  index
  mod
  alternate-machine-number)

(defstruct (LOG-POINT-DATA-LINE
             (:conc-name 2"LOGP-DL-"*)
```

```
            (:print-function (lambda (p s n) n
                                      (format s  2"LOGP: ~A"* (logp-dl-description p)))))
  index
  mod
  description)


(defstruct (EMPTY-DATA-LINE
            (:conc-name 2"EMPTY-DL-"*)
            (:print-function (lambda (p s n) p n (princ 2"EMPTY"* s))))
  index
  mod)


(defstruct (OPERATION-SEQUENCE-DATA
            (:conc-name 2"OPSEQ-DATA-"*)
            (:print-function (lambda (p s n)
                               (let ((data-line (car (opseq-data-list-of-operation-data-lines p))))
                                 n
                                 (format s
                                         "2OPSEQ-~D-~D"*
                                         (op-dl-log-point data-line)
                                         (op-dl-number data-line))))))
  list-of-operation-data-lines
  list-of-machine-sequence-data)


(defstruct (MACHINE-SEQUENCE-DATA (:conc-name 2"MSEQ-DATA-"*)
            (:print-function (lambda (p s n)
                               n
                               (format s "2MSEQ-~D"* (mach-dl-alternate-machine-number
                                                       (car (mseq-data-list-of-machine-data p))))))))
  number
  list-of-machine-data)


(defstruct (LOG-POINT-DATA (:conc-name 2"LOGP-DATA-"*)
                           (:print-function (lambda (p s n) n (format s "2LOGP-~D"* (logp-data-number p)))))
  number
  empty-data-line
  log-point-data-line
  list-of-operation-and-operation-sequence-data)

;1; &&&&&&&&&&&&&&&&&&&&&&&&&&&&&&&&&&&&&&&&&&&&&&&&&&&&&&&&&&&&&&&&&&&&&*


(defun REWORK-SYMBOL (string)
  (and (stringp string) (< (length string) 6)))
(defun PRINT-MACHINE-NAME (string &optional (stream standard-output)
                          &aux space-written (char-count 0) (digit-count 0) (print-count 0))
```

```
  (dotimes (i (length string))
    (let ((character (aref string i)))
      (cond ((and (alpha-char-p character)
                  (< char-count 2))
             (incf char-count)
             (incf print-count)
             (tyo character stream))
            ((and (digit-char-p character)
                  (< digit-count 3))
             (incf char-count)
             (incf print-count)
             (tyo character stream))
            ((and (char= character #\space)
                  (= digit-count 0)
                  (not space-written))
             (incf print-count)
             (setq space-written t)
             (tyo character stream)))))
  (print-spaces (- 6 print-count) stream))

(defun MACHINE-NAME (string &aux (char-count 0) (digit-count 0))
  (dotimes (i (length string) (and (= char-count 2) (< 0 digit-count 4)))
    (let ((character (aref string i)))
      (cond ((alpha-char-p character)
             (if (and (< char-count 2) (zerop digit-count))
                 (incf char-count)
                 (return nil)))
            ((digit-char-p character)
             (if (and (= char-count 2) (< digit-count 3))
                 (incf digit-count)
                 (return nil)))
            ((not (char= character #\space))
             (return nil))))))
```

```
ZZZZZZZZZZ    5555555555555555555555555555555555555555555555555555555555555555555555555555555555555555555555555555    ZZZZZZZZZZ
ZZZZZZZZZZ    555555555555555555555555  THIS INFORMATION IS THE PROPERTY OF TEXAS INSTRUMENTS  555555555555555555555555    ZZZZZZZZZZ
ZZZZZZZZZZ    5555555555555555555555555555555555555555555555555555555555555555555555555555555555555555555555555555    ZZZZZZZZZZ

                                   RRRR    000    AAA   RRRR   K   K
                                   R   R  0   0  A   A  R   R  K  K
                                   R   R  0   0  A   A  R   R  K K
                                   RRRR   0   0  A   A  RRRR   KKK
                                   R R    0   0  AAAAA  R R    K K
                                   R  R   0   0  A   A  R  R   K  K
                                   R   R   000   A   A  R   R  K   K

DDDD   M   M   000   SSSS        FFFFF  L       000   W   W        M   M  EEEEE  N   N  U   U        SSSS  TTTTT  U   U  FFFFF
D   D  MM MM  0   0  S           F      L      0   0  W   W        MM MM  E      N   N  U   U       S        T    U   U  F
D   D  M M M  0   0  S           F      L      0   0  W   W        M M M  E      NN  N  U   U       S        T    U   U  F
D   D  M   M  0   0   SSS        FFFF   L      0   0  W   W        M   M  EEEE   N N N  U   U        SSS     T    U   U  FFFF
D   D  M   M  0   0      S       F      L      0   0  W W W        M   M  E      N  NN  U   U           S    T    U   U  F
D   D  M   M  0   0      S       F      L      0   0  WW WW        M   M  E      N   N  U   U           S    T    U   U  F
DDDD   M   M   000   SSSS  _____ F      LLLLL   000   W   W  _____ M   M  EEEEE  N   N  UUUUU  _____ SSSS     T    UUUUU  F

                                   L       III   SSSS  PPPP     ;;     1
                                   L        I   S      P   P    ;;    11
                                   L        I   S      P   P           1
                                   L        I    SSS   PPPP     ;;     1
                                   L        I       S  P        ;;     1
                                ..  L        I       S  P         ;     1
                                ..  LLLLL   III  SSSS   P         ;    111
```

File $3$DUA27:[ROARK.JUL]DMOS_FLOW_MENU_STUFF.LISP;1 (26740,14,0), last revised on 15-JUL-1986 13:54, is a 10 block sequential file owned by UIC [IIIS,ROARK]. The records are variable length with implied (CR) carriage control. The longest record is 107 bytes.

Job DMOS_FLOW_MENU_STUFF (2027) queued to NB_TALARIS_1 on 15-JUL-1986 14:27 by user ROARK, UIC [IIIS,ROARK], under account KBS at priority 100, started on printer LCA0 on 15-JUL-1986 14:27 from queue NB_TALARIS_1.

```
ZZZZZZZZZZ    5555555555555555555555555555555555555555555555555555555555555555555555555555555555555555555555555555    ZZZZZZZZZZ
ZZZZZZZZZZ    555555555555555555555555  Digital Equipment Corporation - VAX/VMS Version V4.4  555555555555555555555555    ZZZZZZZZZZ
ZZZZZZZZZZ    5555555555555555555555555555555555555555555555555555555555555555555555555555555555555555555555555555    ZZZZZZZZZZ
```

```
;1; -*- Mode:COMMON-LISP; Package: dmos; Base:10.; Fonts:MEDFNT,HL12B,HL12BI -*-*


(defvar *STORE-SOMETHING-ELSE-MENU* nil)
(defvar *ADD-SOMETHING-ELSE-MENU* nil)
(defvar *DELETE-SOMETHING-ELSE-MENU* nil)

;1; Item lists for *flow-pane* states.*

(defconst *DMOS-FLOW-STANDARD-ITEM-ALIST*
          '((num change-value
                 "2Left: Change its value.  Right: Other stuff"*
                 ("2 "* :no-select nil)
                 ("2Change value."* :value change-value
                  :documentation "2Stick it on the list"*)
                 ("2 "* :no-select nil)
                 ("2Store this line for copying."* :value store-line
                  :documentation "2Save this line so you can copy it somewhere else."*)
                 ("2 "* :no-select nil)
                 ("2Store something else for copying."* :value store-something-else-choose
                  :documentation "2Store an operation, or an operation sequence, or a machine sequence, for copying."*)
                 ("2 "* :no-select nil)
                 ("2Add an operation after this line"* :value add-operation-line-after
                  :documentation "2Add a new operation or machine line after this one."*)
                 ("2 "* :no-select nil)
                 ("2Add a machine after this line"* :value add-machine-line-after
                  :documentation "2Add a new operation or machine line after this one."*)
                 ("2 "* :no-select nil)
                 ("2Add  something else"* :value add-something-else-choose
                  :documentation "2Add something before this line, or add a machine sequence."*)
                 ("2 "* :no-select nil)
                 ("2Delete this line*.2"*  :value delete-line
                  :documentation "2Delete this operation line or machine line from the process flow."*)
                 ("2 "* :no-select nil)
                 ("2Delete something else."* :value delete-something-else-choose
                  :documentation "2Delete this whole operation, or operation sequence, or machine sequence."*)
                 ("2 "* :no-select nil))))
                 @

;1; Item lists for menus called up from *flow-pane*.*


(defconst *STORE-SOMETHING-ELSE-CHOOSE-ITEMS*
          '(("2 Add options: "* :no-select nil)
            ("2 "* :no-select nil)
            ("2Store this operation for copying"*
             :value store-operation
             :documentation "2Store this operation, with its machines, for copying."*)
            ("2 "* :no-select nil)
            ("2Store this operation sequence for copying"*
             :value store-operation-sequence
             :documentation "2Not yet available. [NA]"*)
```

```
;             :documentation "2Store this operation sequence, with its machine sequences, for copying."*)
             ("2 "* :no-select nil)
             ("2Store this machine sequence for copying"*
              :value store-machine-sequence
              :documentation "2Not yet available. [NA]"*)
;             :documentation "2Store the machines of this sequence for copying."*)
             ("2 "* :no-select nil)
             ("2Set beginning of copy section."*
              :value set-copy-beginning
              :documentation "2Choose this line as the beginning of a section to copy."*)))

(defconst *ADD-SOMETHING-ELSE-CHOOSE-ITEMS*
          '(("2 Add options: "* :no-select nil)
             ("2 "* :no-select nil)
             ("2Add an empty new line after this line."* :value add-empty-line-after)
             ("2 "* :no-select nil)
             ("2Add a log point line after this line."* :value add-log-point-line-after)
             ("2 "* :no-select nil)
             ("2Add a machine sequence. [NA]"* :value add-machine-sequence
              :documentation "2Not yet available.."*)))

(defconst *DELETE-SOMETHING-ELSE-CHOOSE-ITEMS*
          '(("2 Delete options: "* :no-select nil)
             ("2 "* :no-select nil)
             ("2Delete this operation."* :value delete-operation
              :documentation "2Delete this operation, with its machines."*)
             ("2 "* :no-select nil)
             ("2Delete this operation sequence. [NA]"* :value delete-operation-sequence
              :documentation "2Not yet available."*)
;             :documentation "2Delete this operation sequence, with its machine sequences."*)
             ("2 "* :no-select nil)
             ("2Delete this machine sequence [NA]."*
              :value delete-machine-sequence
              :documentation "2Not yet available."*)
;             :documentation "2Delete the machines of this sequence."*)
             ("2 "* :no-select nil)
             ("2Set beginning of section to delete."*
              :value set-delete-beginning
              :documentation "2Choose this line as the beginning of a section to delete."*)))

(defun MAKE-CHOICE-MENUS ()
  (setq *STORE-SOMETHING-ELSE-MENU* (make-instance 'tv:momentary-menu
                                          :item-list *store-something-else-choose-items*
                                          :default-font fonts:hl12b))
  (setq *ADD-SOMETHING-ELSE-MENU* (make-instance 'tv:momentary-menu
                                          :item-list *add-something-else-choose-items*
                                          :default-font fonts:hl12b))
  (setq *DELETE-SOMETHING-ELSE-MENU* (make-instance 'tv:momentary-menu
                                          :item-list *delete-something-else-choose-items*
                                          :default-font fonts:hl12b)))
```

```
AAAAAAAAAA   6666666666666666666666666666666666666666666666666666666666666666666666666666666666666666666666666666   AAAAAAAAAA
AAAAAAAAAA   666666666666666666666666  THIS INFORMATION IS THE PROPERTY OF TEXAS INSTRUMENTS  666666666666666666666666   AAAAAAAAAA
AAAAAAAAAA   6666666666666666666666666666666666666666666666666666666666666666666666666666666666666666666666666666   AAAAAAAAAA

                                   RRRR    000    AAA   RRRR   K   K
                                   R   R  0   0  A   A  R   R  K  K
                                   R   R  0   0  A   A  R   R  K K
                                   RRRR   0   0  A   A  RRRR   KKK
                                   R R    0   0  AAAAA  R R    K  K
                                   R  R   0   0  A   A  R  R   K   K
                                   R   R   000   A   A  R   R  K    K

DDDDDDDD   MM      MM   000000    SSSSSSSS            RRRRRRRR   EEEEEEEEEE    AAAAAA    DDDDDDDD   EEEEEEEEEE   RRRRRRRR
DDDDDDDD   MM      MM   000000    SSSSSSSS            RRRRRRRR   EEEEEEEEEE    AAAAAA    DDDDDDDD   EEEEEEEEEE   RRRRRRRR
DD      DD MMMM  MMMM 00      00 SS                   RR      RR EE          AA      AA  DD      DD EE           RR      RR
DD      DD MMMM  MMMM 00      00 SS                   RR      RR EE          AA      AA  DD      DD EE           RR      RR
DD      DD MM  MM  MM 00      00 SS                   RR      RR EE          AA      AA  DD      DD EE           RR      RR
DD      DD MM  MM  MM 00      00 SS                   RR      RR EE          AA      AA  DD      DD EE           RR      RR
DD      DD MM      MM 00      00   SSSSSS             RRRRRRRR   EEEEEEEE    AA      AA  DD      DD EEEEEEEE     RRRRRRRR
DD      DD MM      MM 00      00   SSSSSS             RRRRRRRR   EEEEEEEE    AA      AA  DD      DD EEEEEEEE     RRRRRRRR
DD      DD MM      MM 00      00         SS           RR  RR     EE          AAAAAAAAAA  DD      DD EE           RR  RR
DD      DD MM      MM 00      00         SS           RR  RR     EE          AAAAAAAAAA  DD      DD EE           RR  RR
DD      DD MM      MM 00      00         SS           RR    RR   EE          AA      AA  DD      DD EE           RR    RR
DD      DD MM      MM 00      00         SS           RR    RR   EE          AA      AA  DD      DD EE           RR    RR
DDDDDDDD   MM      MM   000000   SSSSSSSS   ________  RR      RR EEEEEEEEEE  AA      AA  DDDDDDDD   EEEEEEEEEE   RR      RR
DDDDDDDD   MM      MM   000000   SSSSSSSS   ________  RR      RR EEEEEEEEEE  AA      AA  DDDDDDDD   EEEEEEEEEE   RR      RR

                          LL          IIIIII    SSSSSSSS   PPPPPPPP     ;;;;      11
                          LL          IIIIII    SSSSSSSS   PPPPPPPP     ;;;;      11
                          LL            II     SS          PP      PP   ;;;;    1111
                          LL            II     SS          PP      PP   ;;;;    1111
                          LL            II     SS          PP      PP             11
                          LL            II     SS          PP      PP             11
                          LL            II       SSSSSS    PPPPPPPP     ;;;;      11
                          LL            II       SSSSSS    PPPPPPPP     ;;;;      11
                          LL            II             SS  PP           ;;;;      11
                          LL            II             SS  PP           ;;;;      11
                  ....    LL            II             SS  PP             ;;      11
                  ....    LL            II             SS  PP             ;;      11
                  ....    LLLLLLLLLL  IIIIII    SSSSSSSS   PP            ;;     111111
                  ....    LLLLLLLLLL  IIIIII    SSSSSSSS   PP            ;;     111111

File _$3$DUA27:[ROARK.JUL]DMOS_READER.LISP;1 (26742,49,0), last revised on 16-JUL-1986 13:54, is a 12 block sequential file owned
by UIC [IIIS,ROARK].  The records are variable length with implied (CR) carriage control.  The longest record is 119 bytes.

Job DMOS_READER (2028) queued to NB_TALARIS_1 on 16-JUL-1986 14:27 by user ROARK, UIC [IIIS,ROARK], under account KBS at priority
100, started on printer LCA0 on 16-JUL-1986 14:27 from queue NB_TALARIS_1.

AAAAAAAAAA   6666666666666666666666666666666666666666666666666666666666666666666666666666666666666666666666666666   AAAAAAAAAA
AAAAAAAAAA   666666666666666666666666  Digital Equipment Corporation - VAX/VMS Version V4.4  666666666666666666666666   AAAAAAAAAA
AAAAAAAAAA   6666666666666666666666666666666666666666666666666666666666666666666666666666666666666666666666666666   AAAAAAAAAA
```

```
;1; -*- Package: USER; Mode: COMMON-LISP; Base: 10.; Fonts: MEDFNT,HL12B,HL12BI -*-*

;1; 6/1/86*

;1; Modifying the reader to  handle the  new format.*
;1; This file contains the code for reading DMOS data from the text file and entering it into *text-array*.*


;1; High level functions.*

(defun TEST ()
  (digest-file "2carnap:new-dmos-data;flowasc.data"*
               1200
               (cdr (assoc 'operation-data-line *print-template-alist*))))



;1; The top level function for processing the file.  *
(defun DIGEST-FILE (file-name max-row-number guide-alist)
  (setq *guide-alist* guide-alist
        *char* #\space
        *error-lines* nil
        *text-array* (or *text-array*
                         (make-array max-row-number :leader-length 2 :named-structure-symbol 'text-array))
        ;1; Enter stuff into the array from text.*
        *fe-stream* (open file-name))
  (unwind-protect (fill-fe-array max-row-number)
    (close *fe-stream*)))


(defun tymc-symbol (st)
  (stringp st))

(defun READ-TO-STRING (entry-structure)
  (skip-spaces)
  (do ((read-pointer 0 (1+ read-pointer)))
      ((or (> read-pointer (es-length entry-structure)) (not (standard-char-p *char*))) 'error)
    (aset *char* *reading-string* read-pointer)
    (if (memq *char* *breaks*) (return t))
    (next)))


(defun ENTRY-STRING (string)
  (string-trim '(#\space)
               (substring string 0 (string-search-set *breaks* string))))
```

```
(defun GET-ENTRY (entry-structure)
  (prog1 (let ((check (read-to-string entry-structure)))
           (unless (eq check 'error)
             (let ((value-string (entry-string *reading-string*)))
               (unless (zerop (length value-string))
                 (let ((new-value (funcall (es-read-function entry-structure) value-string)))
                   (if new-value
                       (if (funcall (es-test-function entry-structure) new-value)
                           new-value
                           'error)))))))
         (skip-to *breaks*)
         (if (memq *char* *dividers*) (next))))

(defun READ-INTO-LIST (row)
  (skip-spaces)
  (do ((places *reading-list* (cdr places))
       (guide-pairs *guide-alist* (cdr guide-pairs))
       (non-null-count 0)
       (error-count 0)
       (place-count 0 (1+ place-count)))
      ((or (null guide-pairs) (memq *char* *line-enders*))
       (skip-to *line-enders*)
       (check-row error-count non-null-count place-count))
    (let ((value (get-entry (cdar guide-pairs))))
      (cond ((eq value 'error) (incf error-count) (adjoin row *error-lines*))
            (value (incf non-null-count)))
      (rplaca places (if (eq value 'error) nil value)))))


(defun CHECK-ROW (error-count non-null-count place-count)
  (let* ((log-point-pos (alist-pos 'log-point *guide-alist*))
         (log-point (and (<= log-point-pos place-count) (nth log-point-pos *reading-list*)))
         (description-pos (alist-pos 'description *guide-alist*))
         (description (and (<= description-pos place-count) (nth description-pos *reading-list*)))
         (primary-machine-number-pos (alist-pos 'primary-machine-number *guide-alist*))
         (primary-machine-number (and (<= primary-machine-number-pos place-count)
                                      (nth primary-machine-number-pos *reading-list*)))
         (alternate-machine-number-pos (alist-pos 'alternate-machine-number *guide-alist*))
         (alternate-machine-number (and (<= alternate-machine-number-pos place-count)
                                        (nth alternate-machine-number-pos *reading-list*))))
    (format t "2~%  log-point ~A, description ~A, *primary-machine-number2 ~A alternate*-machine-number2 ~A ~2%"*
            log-point description primary-machine-number alternate-machine-number)
    (cond ((> error-count 2) 'bad-line)
          ((and log-point description primary-machine-number) 'operation-data-line)
          ((and (null description) alternate-machine-number) 'machine-data-line)
          ((and (null log-point) description (null primary-machine-number)) 'log-point-data-line)
          ((and (> place-count 3) (< non-null-count 2)) 'empty-data-line)
          (t 'bad-line))))


(defun ALIST-POS (thing alist)
  (do ((pairs alist (cdr pairs))
```

```
      (pos Ø (1+ pos)))
     ((null pairs))
   (if (equal (caar pairs) thing) (return pos))))


;1; Reads all the data, storing it into an array as it goes.*
(defun FILL-FE-ARRAY (max-row-number)
  (do ((row Ø))
      ((or (= row max-row-number) (eq *char* *eof*)))
    ;1; To just before start of next line.*
    (if *read-debugging* (format t 2"~%Row: ~D.  "* row))
    (let ((row-type (read-into-list row)))
      (if (eq row-type 'bad-line) (break "2bad-line"*))
      (unless (eq row-type 'bad-line)
        (let ((line (selectq row-type
                      (operation-data-line (make-operation-data-line))
                      (machine-data-line (make-machine-data-line))
                      (log-point-data-line (make-log-point-data-line))
                      (empty-data-line (make-empty-data-line)))))
          (aset line *text-array* row)
          (dolist (pair (variable-alist row-type))
            (let ((position (alist-pos (car pair) *guide-alist*)))
;             (format t "2~% variable ~A, position ~A, line ~A ~%"* (car pair) position line)
              (when position
                (let ((index (setting-index-for line (car pair)))
                      (value (nth position *reading-list*)))
                  (set-index line row)
                  (aset value line index))))))
        (incf row)))
    (unless (eq *char* *eof*) (next))))


(defun SKIP-TO (char-list)
  (do ()
      ((memq *char* char-list))
    (next)))

;1; Skip to next non-space.  Does not necessarily move.*
(defun SKIP-SPACES ()
  (do ()
      ((not (eq *char* *space*)))
    (next)))

;1; Get the next character from file and set appropriate variables.*
(defun NEXT ()
  (setq *char* (char-upcase (read-char *fe-stream* nil *eof*)))
  ;1; For wierd bug that inserts two-character things starting with '' into text file.*
  (when (eq *char* *eta*)
    (next)
    (next)
    (format t 2"~2% Text corrupted with etas.~2%"*))
  (if *read-debugging* (princ (if (eq *char* *space*) #\# *char*))))
```

```
GGGGGGGGGG   00000000000000000000000000000000000000000000000000000000000000000000000000000000000000000000   GGGGGGGGGG
GGGGGGGGGG   0000000000000000000000000  THIS INFORMATION IS THE PROPERTY OF TEXAS INSTRUMENTS  0000000000000000000000000   GGGGGGGGGG
GGGGGGGGGG   00000000000000000000000000000000000000000000000000000000000000000000000000000000000000000000   GGGGGGGGGG

                                   RRRR    OOO    AAA   RRRR   K   K
                                   R   R  O   O  A   A  R   R  K  K
                                   R   R  O   O  A   A  R   R  K K
                                   RRRR   O   O  A   A  RRRR   KKK
                                   R R    O   O  AAAAA  R R    K K
                                   R  R   O   O  A   A  R  R   K  K
                                   R   R   OOO   A   A  R   R  K   K

  TTTTT  EEEEE  X   X  TTTTT         FFFFF  III  L      EEEEE         RRRR   EEEEE   AAA   DDDD   EEEEE  RRRR
    T    E       X X     T           F       I   L      E             R   R  E      A   A  D   D  E      R   R
    T    E        X      T           F       I   L      E             R   R  E      A   A  D   D  E      R   R
    T    EEEE     X      T           FFFF    I   L      EEEE          RRRR   EEEE   A   A  D   D  EEEE   RRRR
    T    E       X X     T           F       I   L      E             R R    E      AAAAA  D   D  E      R R
    T    E      X   X    T           F       I   L      E             R  R   E      A   A  D   D  E      R  R
    T    EEEEE  X   X    T   _____   F      III  LLLLL  EEEEE  _____  R   R  EEEEE  A   A  DDDD   EEEEE  R   R

                                   L      III   SSSS  PPPP    ;;     1
                                   L       I   S      P   P   ;;    11
                                   L       I   S      P   P          1
                                   L       I    SSS   PPPP    ;;     1
                                   L       I       S  P       ;;     1
                                .. L       I       S  P        ;     1
                                .. LLLLL  III  SSSS   P        ;   111
```

File $3$DUA27:[ROARK.JUL]TEXT_FILE_READER.LISP;1 (26757,8,0), last revised on 16-JUL-1986 14:43, is a 12 block sequential file owned by UIC [IIIS,ROARK]. The records are variable length with implied (CR) carriage control. The longest record is 120 bytes.

Job TEXT_FILE_READER (249) queued to NB_TALARIS_1 on 16-JUL-1986 18:13 by user ROARK, UIC [IIIS,ROARK], under account KBS at priority 100, started on printer LCA0 on 16-JUL-1986 18:14 from queue NB_TALARIS_1.

```
GGGGGGGGGG   00000000000000000000000000000000000000000000000000000000000000000000000000000000000000000000   GGGGGGGGGG
GGGGGGGGGG   0000000000000000000000000  Digital Equipment Corporation - VAX/VMS Version V4.4  0000000000000000000000000   GGGGGGGGGG
GGGGGGGGGG   00000000000000000000000000000000000000000000000000000000000000000000000000000000000000000000   GGGGGGGGGG
```

```
;1; -*- Package: DMOS; Mode: COMMON-LISP; Base: 10.; Fonts: MEDFNT,HL12B,HL12BI -*-*

;1; 6/1/86*

;1; Modifying the reader to  handle the  new format.*
;1; This file contains the code for reading DMOS data from the text file and entering it into *text-array*.*


;1; High level functions.*

(defun TYMC-SYMBOL (st)
  (stringp st))
```

```
(defun READ-TO-STRING (entry-structure)
  (skip-spaces)
  (do ((read-pointer Ø (1+ read-pointer)))
      ((or (> read-pointer (es-length entry-structure)) (not (standard-char-p *char*))) 'error)
    (aset *char* *reading-string* read-pointer)
    (when (memq *char* *breaks*) (return t))
    (next)))


(defun ENTRY-STRING (string)
  (string-trim '(#\space)
               (substring string Ø (string-search-set *breaks* string))))


(defun GET-ENTRY (entry-structure)
  (progl (let ((check (read-to-string entry-structure)))
           (unless (eq check 'error)
             (let ((value-string (entry-string *reading-string*)))
               (unless (zerop (length value-string))
                 (let ((new-value (funcall (es-read-function entry-structure) value-string)))
                   (if new-value
                       (if (funcall (es-test-function entry-structure) new-value)
                           new-value
                           'error)))))))
         (skip-to *breaks*)
         (if (memq *char* *dividers*) (next))))


(defun READ-INTO-LIST (row)
  (skip-spaces)
  (do ((places *reading-list* (cdr places))
       (guide-pairs *guide-alist* (cdr guide-pairs))
       (non-null-count Ø)
       (error-count Ø)
       (place-count Ø (1+ place-count)))
      ((or (null guide-pairs) (memq *char* *line-enders*))
       (skip-to *line-enders*)
       (values error-count non-null-count place-count))
    (let ((value (get-entry (cdar guide-pairs))))
;      (format t "2~% get-entry-value ~A"* value)
      (cond ((eq value 'error) (incf error-count) (adjoin row *error-lines*))
            (value (incf non-null-count)))
      (rplaca places (if (eq value 'error) nil value)))))


(defun CHECK-MTBF-ROW (error-count non-null-count place-count)
(let* ((type-pos (alist-pos 'type  *guide-alist*))
       (type (and (<= type-pos place-count) (nth type-pos *reading-list*)))
       (id-pos (alist-pos 'id *guide-alist*))
```

```
      (id (and (<= id-pos place-count) (nth id-pos *reading-list*)))
      (description-pos (alist-pos 'description *guide-alist*))
      (description (and (<= description-pos place-count) (nth description-pos *reading-list*)))
      (base-reliability-pos (alist-pos 'base-reliability *guide-alist*))
      (base-reliability (and (<= base-reliability-pos place-count)
                             (nth base-reliability-pos *reading-list*)))
      (week-reliability-pos (alist-pos 'week-reliability *guide-alist*))
      (week-reliability (and (<= week-reliability-pos place-count)
                             (nth week-reliability-pos *reading-list*)))
      (base-maintainability-pos (alist-pos 'base-maintainability *guide-alist*))
      (base-maintainability (and (<= base-maintainability-pos place-count)
                                 (nth base-maintainability-pos *reading-list*)))
      (week-maintainability-pos (alist-pos 'week-maintainability *guide-alist*))
      (week-maintainability (and (<= week-maintainability-pos place-count)
                                 (nth week-maintainability-pos *reading-list*)))
      (qtime-pos (alist-pos 'qtime *guide-alist*))
      (qtime (and (<= qtime-pos place-count) (nth qtime-pos *reading-list*))))
  (cond ((or (> error-count 2) (< non-null-count 6)) 'bad-line)
        ((and (stringp type)
              (integerp id)
              (stringp description)
              (numberp base-reliability)
              (numberp week-reliability)
              (numberp base-maintainability)
              (numberp week-maintainability)
              (numberp qtime))
         'mtbf-data-line)
        (t 'bad-line))))


(defun CHECK-DMOS-FLOW-ROW (error-count non-null-count place-count)
  (let* ((log-point-pos (alist-pos 'log-point *guide-alist*))
         (log-point (and (<= log-point-pos place-count) (nth log-point-pos *reading-list*)))
         (description-pos (alist-pos 'description *guide-alist*))
         (description (and (<= description-pos place-count) (nth description-pos *reading-list*)))
         (primary-machine-number-pos (alist-pos 'primary-machine-number *guide-alist*))
         (primary-machine-number (and (<= primary-machine-number-pos place-count)
                                      (nth primary-machine-number-pos *reading-list*)))
         (alternate-machine-number-pos (alist-pos 'alternate-machine-number *guide-alist*))
         (alternate-machine-number (and (<= alternate-machine-number-pos place-count)
                                        (nth alternate-machine-number-pos *reading-list*))))
;    (format t "2~%  log-point ~A, description ~A, *primary-machine-number2 ~A alternate*-machine-number2 ~A ~2%"*
;           log-point description primary-machine-number alternate-machine-number)
    (cond ((> error-count 2) 'bad-line)
          ((and log-point description primary-machine-number) 'operation-data-line)
          ((and (null description) alternate-machine-number) 'machine-data-line)
          ((and (null log-point) description (null primary-machine-number)) 'log-point-data-line)
          ((and (> place-count 3) (< non-null-count 2)) 'empty-data-line)
          (t 'bad-line))))


(defun ALIST-POS (thing alist)
```

```
  (do ((pairs alist (cdr pairs))
       (pos Ø (1+ pos)))
      ((null pairs))
    (if (equal (caar pairs) thing) (return pos))))


(defun SKIP-TO (char-list)
  (do ()
      ((memq *char* char-list))
    (next)))

;1; Skip to next non-space.  Does not necessarily move.*
(defun SKIP-SPACES ()
  (do ()
      ((not (eq *char* *space*)))
    (next)))

;1; Get the next character from file and set appropriate variables.*
(defun NEXT ()
  (setq *char* (char-upcase (read-char *fe-stream* nil *eof*)))
  ;1; For wierd bug that inserts two-character things starting with '' into text file.*
  (when (eq *char* *eta*)
    (next)
    (next)
    (format t 2"~2% Text corrupted with etas.~2%"*))
  (if *read-debugging* (princ (if (eq *char* *space*) #\# *char*))))
```

```
ZZZZZZZZZZ    7777777777777777777777777777777777777777777777777777777777777777777777777777777777777777777777777    ZZZZZZZZZZ
ZZZZZZZZZZ    777777777777777777777777  THIS INFORMATION IS THE PROPERTY OF TEXAS INSTRUMENTS  777777777777777777777777    ZZZZZZZZZZ
ZZZZZZZZZZ    7777777777777777777777777777777777777777777777777777777777777777777777777777777777777777777777777    ZZZZZZZZZZ
```

```
ROARK

MTBF_EDITOR_STRUCTURES

LISP;1
```

File _$3$DUA27:[ROARK.JUL]MTBF_EDITOR_STRUCTURES.LISP;1 (26688,18,0), last revised on 15-JUL-1986 14:42, is a 7 block sequential file owned by UIC [IIIS,ROARK]. The records are variable length with implied (CR) carriage control. The longest record is 115 bytes.

Job MTBF_EDITOR_STRUCTURES (199) queued to NB_TALARIS_1 on 15-JUL-1986 17:37 by user ROARK, UIC [IIIS,ROARK], under account KBS at priority 100, started on printer LCA0 on 15-JUL-1986 17:44 from queue NB_TALARIS_1.

```
ZZZZZZZZZZ    7777777777777777777777777777777777777777777777777777777777777777777777777777777777777777777777777    ZZZZZZZZZZ
ZZZZZZZZZZ    777777777777777777777777  Digital Equipment Corporation - VAX/VMS Version V4.4  777777777777777777777777    ZZZZZZZZZZ
ZZZZZZZZZZ    7777777777777777777777777777777777777777777777777777777777777777777777777777777777777777777777777    ZZZZZZZZZZ
```

```
;1; -*- Mode:COMMON-LISP; Package: dmos; Base:10.; Fonts:MEDFNT,HL12B,HL12BI -*-*


(defconst *MTBF-DIVIDERS* '(#\!))
(defconst *MTBF-BREAKS* (list #\! #\newline (character 3)))


;1; &&&&&&&&&&&&&&&&&&&&&&&&&&&&&&&&&&&&&&&&&&&&&&&&&&&&&&&&&&&&&&&&&&&&&&&&&&&&*

;1; Entry structures.*
```

```
(defconst *MTBF-TYPE-ENTRY-STRUCTURE*
          (make-entry-structure
            :type 'type
            :length 4
            :read-function 'read-string-from-string
            :test-function #'stringp))

(defconst *MTBF-ID-ENTRY-STRUCTURE*
          (make-entry-structure
            :type 'id
            :length 3
            :read-function 'read-integer-from-string
            :test-function #'integerp))

(defconst *MTBF-DESCRIPTION-ENTRY-STRUCTURE*
          (make-entry-structure
            :type 'description
            :length 18
            :read-function 'read-string-from-string
            :test-function 'stringp))

(defconst *MTBF-FLONUM-ENTRY-STRUCTURE*
          (make-entry-structure
            :type 'flonum
            :length 9
            :read-function 'read-flonum-from-string
            :test-function 'flonump))

(defconst *MTBF-PRINT-TEMPLATE-ALIST*
          '((mtbf-data-line .
                         ((type . ,*mtbf-type-entry-structure*)
                          (id . ,*mtbf-id-entry-structure*)
                          (description . ,*mtbf-description-entry-structure*)
                          (base-reliability . ,*mtbf-flonum-entry-structure*)
                          (week-reliability . ,*mtbf-flonum-entry-structure*)
                          (base-maintainability . ,*mtbf-flonum-entry-structure*)
                          (week-maintainability . ,*mtbf-flonum-entry-structure*)
                          (qtime . ,*mtbf-flonum-entry-structure*)))))

;1; This file contains the code for reading mtbf data from the text file and entering it into *mtbf-text-array*.*

(defconst *MTBF-TITLE-STRINGS*
          '("                                                                                  2"*
            "!EQP !EQP!     EQUIPMENT      !    RELIABILITY      !  MAINTAINABILITY    !  QTIME  ! 2"*
            "!TYPE!ID !    DESCRIPTION     !   BASE   !   WEEK   !   BASE   !   WEEK   !         ! 2"*
            "!    !   !                    !  (HRS)   !  (HRS)   !  (HRS)   !  (HRS)   !  (HRS)  ! 2"*
            "!____!___!____________________!__________!__________!__________!__________!_________! 2"*))
```

```
;1; All the panes.*
(defconst *MTBF-EDITOR-PANES*
          '(
;1; Option in upper right corner of screen.*
            (control-option-pane tv:command-menu-pane :item-list ("")
                                 :font-map (fonts:medfnt fonts:medfnb fonts:hl12i))

            (editor-pane editor-pane
                         :font-map (fonts:cptfont fonts:medfnt fonts:medfnb fonts:cptfontb)
                         :label nil
                         :item-type-alist nil
                         :divider-first? t
                         :dividers ,*mtbf-dividers*
                         :breaks ,*mtbf-breaks*
                         :print-template-alist ,*mtbf-print-template-alist*
                         :items-in-line-length-list (4 3 18 9 9 9 9 9)
                         :standard-item-alist ,*mtbf-standard-item-alist*
                         :line-types (mtbf-data-line)
                         :title-strings ,*mtbf-title-strings*)
            (listener-pane tv:window-pane
                           :label nil
                           :font-map (fonts:cptfont fonts:hl12b fonts:medfnt fonts:medfnb) )))


(defstruct (MTBF-DATA-LINE
             (:conc-name 2"MTBF-DL-"*)
             (:print-function (lambda (p s n) n
                                (format s  2"MTBF-DL-~A~D"* (mtbf-dl-type p) (mtbf-dl-id p)))))
  index
  ;1; The machine corresponding to this line.*
  machine
  type
  id
  description
  base-reliability
  week-reliability
  base-maintainability
  week-maintainability
  qtime)
```

```
AAAAAAAAAA   888888888888888888888888888888888888888888888888888888888888888888888888888888888888888888888888888888   AAAAAAAAAA
AAAAAAAAAA   888888888888888888888888  THIS INFORMATION IS THE PROPERTY OF TEXAS INSTRUMENTS  888888888888888888888888   AAAAAAAAAA
AAAAAAAAAA   888888888888888888888888888888888888888888888888888888888888888888888888888888888888888888888888888888   AAAAAAAAAA

                                     RRRR    000    AAA   RRRR   K   K
                                     R   R  0   0  A   A  R   R  K  K
                                     R   R  0   0  A   A  R   R  K K
                                     RRRR   0   0  A   A  RRRR   KKK
                                     R R    0   0  AAAAA  R R    K  K
                                     R  R   0   0  A   A  R  R   K   K
                                     R   R   000   A   A  R   R  K   K

M   M  TTTTT  BBBB   FFFFF           M   M  EEEEE  N   N  U   U          SSSS  TTTTT  U   U  FFFFF  FFFFF
MM MM    T    B   B  F               MM MM  E      N   N  U   U         S        T    U   U  F      F
M M M    T    B   B  F               M M M  E      NN  N  U   U         S        T    U   U  F      F
M   M    T    BBBB   FFFF            M   M  EEEE   N N N  U   U          SSS     T    U   U  FFFF   FFFF
M   M    T    B   B  F               M   M  E      N  NN  U   U             S    T    U   U  F      F
M   M    T    B   B  F               M   M  E      N   N  U   U             S    T    U   U  F      F
M   M    T    BBBB   F       _____   M   M  EEEEE  N   N  UUUUU  _____  SSSS     T    UUUUU  F      F

                                     L       III    SSSS  PPPP    ;;    1
                                     L        I    S      P   P   ;;   11
                                     L        I    S      P   P         1
                                     L        I     SSS   PPPP    ;;    1
                                     L        I        S  P       ;;    1
                                 ..  L        I        S  P        ;    1
                                 ..  LLLLL   III   SSSS   P        ;   111
```

File _$3$DUA27:[ROARK.JUL]MTBF_MENU_STUFF.LISP;1 (26692,21,0), last revised on 16-JUL-1986 14:42, is a 3 block sequential file owned by UIC [IIIS,ROARK]. The records are variable length with implied (CR) carriage control. The longest record is 91 bytes.

Job MTBF_MENU_STUFF (200) queued to NB_TALARIS_1 on 16-JUL-1986 17:38 by user ROARK, UIC [IIIS,ROARK], under account KBS at priority 100, started on printer LCA0 on 16-JUL-1986 17:45 from queue NB_TALARIS_1.

```
AAAAAAAAAA   888888888888888888888888888888888888888888888888888888888888888888888888888888888888888888888888888888   AAAAAAAAAA
AAAAAAAAAA   888888888888888888888888  Digital Equipment Corporation - VAX/VMS Version V4.4  888888888888888888888888   AAAAAAAAAA
AAAAAAAAAA   888888888888888888888888888888888888888888888888888888888888888888888888888888888888888888888888888888   AAAAAAAAAA
```

```
;1; -*- Mode:COMMON-LISP; Package: dmos; Base:10.; Fonts:MEDFNT,HL12B,HL12BI -*-*

;1; Item lists for *flow-pane* states.*

(defconst *MTBF-STANDARD-ITEM-ALIST*
          '((num change-value
                 "2Left: Change this entry.  Right: Other stuff"*
                 ("2 "* :no-select nil)
                 ("2Change this entry."* :value change-value
                  :documentation "2Give this entry a new value."*)
                 ("2 "* :no-select nil)
                 ("2Store this line for copying."* :value store-line
                  :documentation "2Save this line so you can copy it somewhere else."*)
                 ("2 "* :no-select nil)
                 ("2Set beginning of copy section."*
                  :value set-copy-beginning
                  :documentation "2Choose this line as the beginning of a section to copy."*)
                 ("2 "* :no-select nil)
                 ("2Add a line after this line"* :value add-line-after
                  :documentation "2Add a new data line after this one."*)
                 ("2 "* :no-select nil)
                 ("2Delete this line*.2"*  :value delete-line
                  :documentation "2Delete this operation line or machine line from the process flow."*)
                 ("2 "* :no-select nil)
                 ("2Set beginning of section to delete."*
                  :value set-delete-beginning
                  :documentation "2Choose this line as the beginning of a section to delete."*)
                 ("2 "* :no-select nil))))
```

```
BBBBBBBBBB   9999999999999999999999999999999999999999999999999999999999999999999999999999999999999999999999999999   BBBBBBBBBB
BBBBBBBBBB   99999999999999999999999  THIS INFORMATION IS THE PROPERTY OF TEXAS INSTRUMENTS  99999999999999999999999   BBBBBBBBBB
BBBBBBBBBB   9999999999999999999999999999999999999999999999999999999999999999999999999999999999999999999999999999   BBBBBBBBBB

                              RRRR    000    AAA   RRRR   K   K
                              R   R  0   0  A   A  R   R  K  K
                              R   R  0   0  A   A  R   R  K K
                              RRRR   0   0  A   A  RRRR   KKK
                              R R    0   0  AAAAA  R R    K  K
                              R  R   0   0  A   A  R  R   K   K
                              R   R   000   A   A  R   R  K    K

MM      MM  TTTTTTTTTT  BBBBBBBB    FFFFFFFFFF              RRRRRRRR    EEEEEEEEEE    AAAAAA    DDDDDDDD    EEEEEEEEEE  RRRRRRRR
MM      MM  TTTTTTTTTT  BBBBBBBB    FFFFFFFFFF              RRRRRRRR    EEEEEEEEEE    AAAAAA    DDDDDDDD    EEEEEEEEEE  RRRRRRRR
MMMM  MMMM      TT      BB      BB  FF                      RR      RR  EE          AA      AA  DD      DD  EE          RR      RR
MMMM  MMMM      TT      BB      BB  FF                      RR      RR  EE          AA      AA  DD      DD  EE          RR      RR
MM  MM  MM      TT      BB      BB  FF                      RR      RR  EE          AA      AA  DD      DD  EE          RR      RR
MM  MM  MM      TT      BB      BB  FF                      RR      RR  EE          AA      AA  DD      DD  EE          RR      RR
MM      MM      TT      BBBBBBBB    FFFFFFFF                RRRRRRRR    EEEEEEEE    AA      AA  DD      DD  EEEEEEEE    RRRRRRRR
MM      MM      TT      BBBBBBBB    FFFFFFFF                RRRRRRRR    EEEEEEEE    AA      AA  DD      DD  EEEEEEEE    RRRRRRRR
MM      MM      TT      BB      BB  FF                      RR  RR      EE          AAAAAAAAAA  DD      DD  EE          RR  RR
MM      MM      TT      BB      BB  FF                      RR  RR      EE          AAAAAAAAAA  DD      DD  EE          RR  RR
MM      MM      TT      BB      BB  FF                      RR    RR    EE          AA      AA  DD      DD  EE          RR    RR
MM      MM      TT      BB      BB  FF                      RR    RR    EE          AA      AA  DD      DD  EE          RR    RR
MM      MM      TT      BBBBBBBB    FF                      RR      RR  EEEEEEEEEE  AA      AA  DDDDDDDD    EEEEEEEEEE  RR      RR
MM      MM      TT      BBBBBBBB    FF        __________    RR      RR  EEEEEEEEEE  AA      AA  DDDDDDDD    EEEEEEEEEE  RR      RR

                                    LL          IIIIII    SSSSSSSS  PPPPPPPP      ;;;;      11
                                    LL          IIIIII    SSSSSSSS  PPPPPPPP      ;;;;      11
                                    LL            II    SS          PP      PP    ;;;;    1111
                                    LL            II    SS          PP      PP    ;;;;    1111
                                    LL            II    SS          PP      PP                11
                                    LL            II    SS          PP      PP                11
                                    LL            II      SSSSSS    PPPPPPPP      ;;;;        11
                                    LL            II      SSSSSS    PPPPPPPP      ;;;;        11
                                    LL            II            SS  PP            ;;;;        11
                                    LL            II            SS  PP            ;;;;        11
                              ....  LL            II            SS  PP              ;;        11
                              ....  LL            II            SS  PP              ;;        11
                              ....  LLLLLLLLLL  IIIIII  SSSSSSSS    PP            ;;        111111
                              ....  LLLLLLLLLL  IIIIII  SSSSSSSS    PP            ;;        111111
```

File $3$DUA27:[ROARK.JUL]MTBF_READER.LISP;1 (26699,48,0), last revised on 15-JUL-1986 14:42, is a 8 block sequential file owned by UIC [IIIS,ROARK]. The records are variable length with implied (CR) carriage control. The longest record is 101 bytes.

Job MTBF_READER (206) queued to NB_TALARIS_1 on 15-JUL-1986 17:45 by user ROARK, UIC [IIIS,ROARK], under account KBS at priority 100, started on printer LCA0 on 15-JUL-1986 17:45 from queue NB_TALARIS_1.

```
BBBBBBBBBB   9999999999999999999999999999999999999999999999999999999999999999999999999999999999999999999999999999   BBBBBBBBBB
BBBBBBBBBB   99999999999999999999999  Digital Equipment Corporation - VAX/VMS Version V4.4  99999999999999999999999   BBBBBBBBBB
BBBBBBBBBB   9999999999999999999999999999999999999999999999999999999999999999999999999999999999999999999999999999   BBBBBBBBBB
```

```
;1; -*- Package: DMOS; Mode: COMMON-LISP; Base: 10.; Fonts: MEDFNT,HL12B,HL12BI -*-*

;1; 6/1/86*

;1; Modifying the reader to  handle the  new format.*


(defun READ-MTBF-FILE (&optional (mtbf-file 2"lm:jul86-dmos;mtbf.data"*))
  (digest-file mtbf-file
               *mtbf-text-array*
               (cdr (assoc 'mtbf-data-line *mtbf-print-template-alist*))
               *mtbf-dividers*
               *mtbf-breaks*
               #'check-mtbf-row
               #'(lambda (dummy) dummy (make-mtbf-data-line))
               #'mtbf-start-line-function))


(defun user:MTBF-TEST (&optional (mtbf-file "2lm:jul86-dmos;temp-data.data"*))
  (setq *mtbf-text-array* (make-array *mtbf-text-array-size*))
  (read-mtbf-file mtbf-file))


(defun user:DMOS-FLOW-TEST (&optional (dmos-flow-file "2lm:jul86-dmos;flowasc.data"*))
  (setq *dmos-flow-text-array* (make-array *dmos-flow-text-array-size*))
  (digest-file dmos-flow-file
               *dmos-flow-text-array*
               (cdr (assoc 'operation-data-line *dmos-flow-print-template-alist*))
               *dmos-flow-dividers*
               *dmos-flow-breaks*
               #'check-dmos-flow-row
               #'(lambda (row-type) (selectq row-type
                                       (operation-data-line (make-operation-data-line))
                                       (machine-data-line (make-machine-data-line))
                                       (log-point-data-line (make-log-point-data-line))
                                       (empty-data-line (make-empty-data-line))))
               #'next))


(defun MTBF-START-LINE-FUNCTION ()
  (next)
  (skip-to *breaks*)
  (if (memq *char* *dividers*)
      (next)))


;1;  The top level function for processing the file.*
;1;  * 1<Check-function> takes a* 1row, as read into *read-alist*, and returns what*
```

```
;1; kind of a line it is.*
;1;   <Structure-choice-function> takes the output of check-function and makes*
;1; a* 1structure to store the row into, or nil.*
(defun DIGEST-FILE (file-name array guide-alist dividers breaks
                    check-function structure-choice-function start-next-line-function)
;;;  (print "2digest-file"*)
  (setq *guide-alist* guide-alist
        *dividers* dividers
        *breaks* breaks
        *char* #\space
        *error-lines* nil
        ;1; Enter stuff into the array from text.*
        *fe-stream* (open file-name))
  (unwind-protect (fill-text-array
                    array
                    check-function
                    structure-choice-function
                    start-next-line-function)
    (close *fe-stream*)))


;1; Reads all the data, storing it into an array as it goes.*
(defun FILL-TEXT-ARRAY (text-array check-function structure-choice-function start-next-line-function)
  (do ((row 0)
       (max-row-number (1- (length text-array))))
      ((or (= row max-row-number) (eq *char* *eof*)))
    ;1; To just before start of next line.*
    (if *read-debugging* (format t 2"~%Row: ~D.  "* row))
;    (print row)
    (multiple-value-bind (error-count non-null-count place-count)
        (read-into-list row)
;      (format t "2~% reading-list ~A"* *reading-list*)
      (let ((row-type (funcall check-function error-count non-null-count place-count)))
;        (format t "2~% row-type ~A"* row-type)
        (if (eq row-type 'bad-line)
            (if *read-debugging* (break "2bad-line"*))
            (let ((line (funcall structure-choice-function row-type)))
;              (format t "2~% line ~A"* line)
              (aset line text-array row)
              (dolist (pair (variable-alist row-type))
                (let ((position (alist-pos (car pair) *guide-alist*)))
;                  (format t "2~% variable ~A, position ~A, line ~A ~%"* (car pair) position line)
                  (when position
                    (let ((index (setting-index-for line (car pair)))
                          (value (nth position *reading-list*)))
                      (set-index line row)
                      (aset value line index))))))
            (incf row))))
    ;1; Go to start of next line unless you're at the end.*
    (unless (eq *char* *eof*) (funcall start-next-line-function))))
```

```
JJJJJJJJJ     7777777777777777777777777777777777777777777777777777777777777777777777777777777777777777777777777777777     JJJJJJJJJ
JJJJJJJJJ     77777777777777777777777  THIS INFORMATION IS THE PROPERTY OF TEXAS INSTRUMENTS  77777777777777777777777     JJJJJJJJJ
JJJJJJJJJ     7777777777777777777777777777777777777777777777777777777777777777777777777777777777777777777777777777777     JJJJJJJJJ

                                        RRRR    000    AAA   RRRR   K   K
                                        R   R  0   0  A   A  R   R  K  K
                                        R   R  0   0  A   A  R   R  K K
                                        RRRR   0   0  A   A  RRRR   KKK
                                        R R    0   0  AAAAA  R R    K K
                                        R  R   0   0  A   A  R  R   K  K
                                        R   R   000   A   A  R   R  K   K

                    PPPP   RRRR    000    CCCC  EEEEE   SSSS   SSSS        BBBB   L       III   PPPP    SSSS
                    P   P  R   R  0   0  C      E      S      S            B   B  L        I    P   P  S
                    P   P  R   R  0   0  C      E      S      S            B   B  L        I    P   P  S
                    PPPP   RRRR   0   0  C      EEEE    SSS    SSS         BBBB   L        I    PPPP    SSS
                    P      R R    0   0  C      E          S      S        B   B  L        I    P          S
                    P      R  R   0   0  C      E          S      S        B   B  L        I    P          S
                    P      R   R   000    CCCC  EEEEE  SSSS   SSSS   _____ BBBB   LLLLL   III   P      SSSS

                                        L       III    SSSS  PPPP    ;;    1
                                        L        I    S      P   P   ;;   11
                                        L        I    S      P   P         1
                                        L        I     SSS   PPPP    ;;    1
                                        L        I        S  P       ;;    1
                                    ..  L        I        S  P        ;    1
                                    ..  LLLLL   III   SSSS   P        ;  111
```

File $3$DUA27:[ROARK.JUL]PROCESS_BLIPS.LISP;1 (26723,56,0), last revised on 15-JUL-1986 14:43, is a 18 block sequential file owned by UIC [IIIS,ROARK]. The records are variable length with implied (CR) carriage control. The longest record is 122 bytes.

Job PROCESS_BLIPS (215) queued to NB_TALARIS_1 on 15-JUL-1986 17:48 by user ROARK, UIC [IIIS,ROARK], under account KBS at priority 100, started on printer LCA0 on 15-JUL-1986 17:48 from queue NB_TALARIS_1.

```
JJJJJJJJJ     7777777777777777777777777777777777777777777777777777777777777777777777777777777777777777777777777777777     JJJJJJJJJ
JJJJJJJJJ     777777777777777777777777  Digital Equipment Corporation - VAX/VMS Version V4.4  777777777777777777777777     JJJJJJJJJ
JJJJJJJJJ     7777777777777777777777777777777777777777777777777777777777777777777777777777777777777777777777777777777     JJJJJJJJJ
```

```
;1; -*- Mode:COMMON-LISP; Package: DMOS; Base:10.; Fonts:MEDFNT,HL12B,HL12BI -*-*


(defmethod (editor-pane :PROCESS-BLIPS) ()
  (push 'process-blips uuu)
  ;1; Set the last item changed to be the item in the upper right-hand corner of the screen*
  (funcall-self :reset-*last-item-changed*)          ;1rosmaita*
  (push 'last-item-changed-reset uuu)
  ;1; *terminate-flow-pane* is only set T by the function (process-command-pane-blips)*
  (setq *terminate-flow-pane* nil)          ;1rosmaita*
  (do ()
      (*terminate-flow-pane* (return))  1;;exit form added by roark to return to calling window* 17/8/86*
    (let ((blip (funcall-self :any-tyi)))
```

```
    (push (list 'new-blip blip) uuu)
    ;1; Changed to a COND by rosmaita 6/10/86.*
    (cond ((and (listp blip) (eq (car blip) :typeout-execute))
           (let* ((my-item (third blip))
                  (line (second my-item))
                  (alternative (second blip)))
             (unless (funcall-self :check-common-editor-list-blip my-item line alternative)
               (if *mtbf-editing*
                   (funcall-self :check-mtbf-editor-list-blip my-item line alternative)
                   (funcall-self :check-dmos-flow-editor-list-blip my-item line alternative)))))
          ((and                          ;1Added by rosmaita 6/10/86.*
             (listp blip)
             (eq (car blip) :menu)
             ;1; If the control-option-pane is going to be the only menu tossing :menu blips into the i-o-buffer,*
             ;1; it would probably be a good idea to get rid of this last test.*
             (eq (fourth blip) (funcall  *editor-window* :get-pane 'control-option-pane)))
           (process-command-pane-blips (second blip)))    ;1 This function is defined in "option-pane".*
          ((listp blip) (push 'beep uuu) (funcall-self :beep))
          (t (funcall-self :process-atomic-blip blip))))))


(defmethod (editor-pane :CHECK-MTBF-EDITOR-LIST-BLIP) (my-item line alternative)
  (selectq alternative
    (set-copy-beginning
     (funcall-self :set-saved-lines-for-copying (list line))
     (funcall-self :set-item-type-alist *common-set-copy-end-item-alist*))
    (add-line-after
     (funcall-self :insert-new-lines my-item (list (make-mtbf-data-line))))
    (set-delete-beginning
     (funcall-self :set-saved-lines-for-deleting my-item)
     (funcall-self :set-item-type-alist *common-set-delete-end-item-alist*))))


(defmethod (editor-pane :CHECK-DMOS-FLOW-EDITOR-LIST-BLIP) (my-item line alternative)
  line
  (selectq alternative
    (store-something-else-choose
     (funcall-self :call-menu-choose *store-something-else-menu* my-item))
    (add-operation-line-after
     (funcall-self :insert-new-lines my-item (list (make-operation-data-line))))
    (add-machine-line-after
     (funcall-self :insert-new-lines my-item (list (make-machine-data-line))))
    (add-something-else-choose
     (funcall-self :call-menu-choose *add-something-else-menu* my-item))
    (delete-something-else-choose
     (funcall-self :call-menu-choose *delete-something-else-menu* my-item))))


(defmethod (editor-pane :PROCESS-ATOMIC-BLIP) (blip)
  (push (list 'process-atomic-blip blip) uuu)
  (cond ((member blip '(#\ #\ #\ #\) :test #'char=)
```

```
        (funcall-self :process-arrow blip))
       ((char= blip #\control-)
        (funcall-self :scroll-down 1))
       ((char= blip #\control-)
        (funcall-self :scroll-up 1))
       ((char= blip #\control-meta-l)
        (push 'rewrite uuu)
        (funcall-self :rewrite))
       ((char= blip #\control-meta-b)
        (push 'bottom uuu)
        (funcall-self :bottom))
       ((char= blip #\control-meta-t)
        (push 'top uuu)
        (funcall-self :top))
       ((char= blip #\control-meta-m)
        (push 'top uuu)
        (funcall-self :middle))
       ((char= blip #\control-meta-)
        (funcall-self :scroll-down-big))
       ((char= blip #\control-meta-)
        (funcall-self :scroll-up-big))
       (t (push 'atomic-beep uuu) (beep))))


(defmethod (editor-pane :CHECK-COMMON-EDITOR-LIST-BLIP) (my-item line alternative)
  (selectq alternative
    (change-value
     (funcall-self :change-item my-item)
     t)
    (store-line
     (funcall-self :set-item-type-alist *common-copy-item-alist*)
     (funcall-self :set-saved-lines-for-copying (list line))
     t)
    (delete-line
     (funcall-self :delete-lines my-item 1)
     t)
    (copy-after
     (push 'copy-after uuu)
     (funcall-self :set-item-type-alist standard-item-alist)
     (funcall-self :insert-new-lines
                   my-item
                   (mapcar #'copy-seq saved-lines-for-copying))
     (funcall-self :set-saved-lines-for-copying nil)
     t)
    (set-last-copy-line
     (funcall-self :set-item-type-alist *common-copy-item-alist*)
     (let ((top-line (car saved-lines-for-copying)))
       (push (list 'set-last-copy-line top-line line) uuu)
       (funcall-self :set-saved-lines-for-copying
                     (funcall-self :lines-from top-line line)))
     t)
    (set-last-delete-line
```

```
    (funcall-self :set-item-type-alist standard-item-alist)
    (let ((old-item saved-lines-for-deleting))
      (push (list 'set-last-delete-line old-item line) uuu)
      (funcall-self :delete-lines old-item
                    (funcall-self :line-difference old-item line)))
    t)
   (abort-copy
    (funcall-self :set-item-type-alist standard-item-alist)
    (funcall-self :set-saved-lines-for-copying nil)
    t)
   (abort-delete
    (funcall-self :set-item-type-alist standard-item-alist)
    (funcall-self :set-saved-lines-for-deleting nil)
    t)
   (otherwise nil)))


(defmethod (editor-pane :PROCESS-ARROW) (arrow)    ;1rosmaita*
  (push (list 'arrow arrow) uuu)
  ;1; Figures out which item is the next one (from the last one modified) in the direction pointed to,*
  ;1; gets the item, and passes it to :CHANGE-ITEM.  It uses the global var *last-item-changed*.*
  (let ((delta-y tv:line-height)
        (target-x (fourth *last-item-changed*))
        (target-y (fifth *last-item-changed*))
        (best-item nil)
        )
    (cond ((char= arrow #\)
           (do* ((ms-items tv:item-list (cdr ms-items))
                 (item (cadar ms-items) (cadar ms-items)))
                ((null ms-items))
1               *;1; Want to find an item in this column with the greatest y value less than the last item's y value.*
             (when (and (eq target-x (fourth item)) (< (fifth item) target-y))
               (if best-item
                   (if (> (fifth item) (fifth best-item))
                       (setq best-item item))
                   (setq best-item item)))))
          ((char= arrow #\)
           (do* ((ms-items tv:item-list (cdr ms-items))
                 (item (cadar ms-items) (cadar ms-items)))
                ((null ms-items))
1               *;1; Want to find an item in this column with the least y value greater than the last item's y value.*
             (when (and (eq target-x (fourth item)) (> (fifth item) target-y))
               (if best-item
                   (if (< (fifth item) (fifth best-item))
                       (setq best-item item))
                   (setq best-item item)))))
          ((char= arrow #\)
           (do* ((ms-items tv:item-list (cdr ms-items))
                 (item (cadar ms-items)(cadar ms-items)))
                ((null ms-items))
             ;1; Item should be on the same line and to the left.*
             (when (and (eq target-y (fifth item))(< (fourth item)target-x))
```

```
          (if best-item
              ;1; Next item to the left should have the greatest x value of all items to the left.*
              (if (> (fourth item)(fourth best-item))
                  (setq best-item item))
              (setq best-item item))))
        (unless best-item
          ;1; If a best-item hasn't been found yet, we need to search for the farthest item to the right on the line above.*
          (setq target-y (- target-y delta-y))
          (do* ((ms-items tv:item-list (cdr ms-items))
                (item (cadar ms-items)(cadar ms-items)))
               ((null ms-items))
            (when (eq target-y (fifth item))
              (if best-item
           1        *;1; Want the item on this line with the greatest x value.*
                  (if (> (fourth item)(fourth best-item))
                      (setq best-item item))
                  (setq best-item item))))))
       ((char= arrow #\)
        (do* ((ms-items tv:item-list (cdr ms-items))
              (item (cadar ms-items)(cadar ms-items)))
             ((null ms-items))
          ;1; Next item should be on the same line and to the right.*
          (when (and (eq target-y (fifth item))(> (fourth item) target-x))
            (if best-item
                ;1; Next item to the right should have the smallest x value of all items to the right.*
                (if (< (fourth item)(fourth best-item))
                    (setq best-item item))
                (setq best-item item))))
     ;1; If a <best-item> hasn't been found yet, we need to find the first item in the next row down.*
     (unless best-item
       (setq target-y (+ target-y delta-y))
       (do* ((ms-items tv:item-list (cdr ms-items))
             (item (cadar ms-items)(cadar ms-items)))
            ((null ms-items))
         (when (eq target-y (fifth item))
         (if best-item
             ;1; Want the item on this line with the least x value.*
             (if (< (fourth item)(fourth best-item))
                 (setq best-item item))
             (setq best-item item)))))))
(if best-item
    (funcall-self :change-item best-item)
    ;1; Otherwise signal an error.*
    (funcall-self :beep))))
```

```
ZZZZZZZZZZ    33333333333333333333333333333333333333333333333333333333333333333333333333333333333333333333333333    ZZZZZZZZZZ
ZZZZZZZZZZ    3333333333333333333333  THIS INFORMATION IS THE PROPERTY OF TEXAS INSTRUMENTS  3333333333333333333333    ZZZZZZZZZZ
ZZZZZZZZZZ    33333333333333333333333333333333333333333333333333333333333333333333333333333333333333333333333333    ZZZZZZZZZZ

                                             RRRR    000    AAA   RRRR   K   K
                                             R   R  0   0  A   A  R   R  K  K
                                             R   R  0   0  A   A  R   R  K K
                                             RRRR   0   0  A   A  RRRR   KKK
                                             R R    0   0  AAAAA  R R    K  K
                                             R  R   0   0  A   A  R  R   K   K
                                             R   R   000   A   A  R   R  K   K

U   U   SSSS  EEEEE  RRRR         EEEEE  DDDD    III   TTTTT   000   RRRR         FFFFF  U   U  N   N   CCCC  TTTTT   III    000
U   U  S      E      R   R        E      D   D    I      T    O   O  R   R        F      U   U  N   N  C        T      I    O   O
U   U  S      E      R   R        E      D   D    I      T    O   O  R   R        F      U   U  NN  N  C        T      I    O   O
U   U   SSS   EEEE   RRRR         EEEE   D   D    I      T    O   O  RRRR         FFFF   U   U  N N N  C        T      I    O   O
U   U      S  E      R R          E      D   D    I      T    O   O  R R          F      U   U  N  NN  C        T      I    O   O
U   U      S  E      R  R         E      D   D    I      T    O   O  R  R         F      U   U  N   N  C        T      I    O   O
UUUUU  SSSS   EEEEE  R   R  _____ EEEEE  DDDD    III     T     000   R   R  _____ F      UUUUU  N   N   CCCC    T     III    000

                                          L       III   SSSS  PPPP    ;;   1
                                          L        I   S      P   P   ;;  11
                                          L        I   S      P   P        1
                                          L        I    SSS   PPPP    ;;   1
                                          L        I       S  P       ;;   1
                                      ..  L        I       S  P        ;   1
                                      ..  LLLLL   III  SSSS   P        ;  111
```

File _$3$DUA27:[ROARK.JUL]USER_EDITOR_FUNCTIONS.LISP;1 (35062,11,0), last revised on 15-JUL-1986 14:44, is a 10 block sequential fil
e owned by UIC [IIIS,ROARK]. The records are variable length with implied (CR) carriage control. The longest record is 125 bytes.

Job USER_EDITOR_FUNCTIONS (237) queued to NB_TALARIS_1 on 15-JUL-1986 17:53 by user ROARK, UIC [IIIS,ROARK], under account KBS at
priority 100, started on printer LCA0 on 15-JUL-1986 17:54 from queue NB_TALARIS_1.

```
ZZZZZZZZZZ    33333333333333333333333333333333333333333333333333333333333333333333333333333333333333333333333333    ZZZZZZZZZZ
ZZZZZZZZZZ    3333333333333333333333  Digital Equipment Corporation - VAX/VMS Version V4.4  3333333333333333333333    ZZZZZZZZZZ
ZZZZZZZZZZ    33333333333333333333333333333333333333333333333333333333333333333333333333333333333333333333333333    ZZZZZZZZZZ
```

```
;1; -*- Mode:COMMON-LISP; Package: DMOS; Base:10.; Fonts:MEDFNT,HL12B,HL12BI -*-*

;;variable to test whether or not abort entered on request for file name
(defvar user:*continue-editing* nil)

;1; Use this function to read in a text file as current mtbf data, i.e., into an array called *mtbf-text-array*.*
;1; If no file name is specified, it will use * "2lm:jul86-dmos;mtbf.data"1.**
;1; This will not, by itself, change the current mtbf editor.*
(defun user:ENTER-MTBF-DATA (&optional (mtbf-file1 2"lm:jul86-dmos;mtbf.data"**))
  (setq *mtbf-text-array* (make-array *mtbf-text-array-size*))
  (read-mtbf-file mtbf-file))

1;;;modification to above function to allow entry of  a file name by user -- roark*
(defun user:pfd-enter-mtbf-data (menu-label-string)
  (setq *mtbf-text-array* (make-array *mtbf-text-array-size*))
```

```
(CATCH 'abort
  (loop doing
        (tv:choose-variable-values (LIST
                                    (LIST '*datafile-pathname*
                                          menu-label-string
                                          ;1 the documentation is needed because the default is incorrect*
                                          :documentation
                                          "L: move to an item and select it, R: move to an item and edit it."
                                          :pathname))
                                   :label "Which mtbf data file do you wish to edit?"
                                   :margin-choices '("Load file" ("2Abort"*(THROW 'abort 'abort)))
                                   )
        until (probe-file *datafile-pathname*))
   (SETQ *datafile-pathname* (fs:merge-pathnames *datafile-pathname* (fs:default-pathname)))
   (read-mtbf-file *datafile-pathname*)
   (setq user:*continue-editing* t))                                  ;1end of CATCH*
 )

;1; Use this function to read in a text file as current dmos-flow data, i.e., into an array called *dmos-flow-text-array*.*
;1; If no file name is specified, it will use2 "lm:jul86-dmos*;2flowasc.data"1.**
;1; This will not, by itself, change the current dmos flow editor.*
(defun user:ENTER-DMOS-FLOW-DATA (&optional (dmos-flow-file "2lm:jul86-dmos;flowasc.data"*))
  (setq *dmos-flow-text-array* (make-array *dmos-flow-text-array-size*))
  (user:dmos-flow-test dmos-flow-file))

1;;;modification to above function to allow entry of  a file name by user -- roark*
(defun user:pfd-enter-dmos-flow-data (menu-label-string)
  (setq *dmos-flow-text-array* (make-array *dmos-flow-text-array-size*))
  (CATCH 'abort
    (loop doing
          (tv:choose-variable-values (LIST
                                      (LIST '*datafile-pathname*
                                            menu-label-string
                                            ;1 the documentation is needed because the default is incorrect*
                                            :documentation
                                            "L: move to an item and select it, R: move to an item and edit it."
                                            :pathname))
                                     :label "Which dmos flow data file do you wish to edit?"
                                     :margin-choices '("Load file" ("2Abort"* (THROW 'abort 'abort)))
                                     )
          until (probe-file *datafile-pathname*))
     (SETQ *datafile-pathname* (fs:merge-pathnames *datafile-pathname* (fs:default-pathname)))
     (if (probe-file *datafile-pathname*) (user:dmos-flow-test *datafile-pathname*))
     (setq user:*continue-editing* t))                                ;1end of CATCH*
  )

;1; This will create a new mtbf editor, called *mtbf-editor-window*, containing current mtbf data.*
;1; There has to *be* data already entered.*
(defun user:MAKE-MTBF-EDITOR ()
  (make-mtbf-editor-window))
```

```
;1; This will create a new dmos-flow editor, called *dmos-flow-editor-window*,*
;1; There has to *be* data already entered.*
(defun user:MAKE-DMOS-FLOW-EDITOR ()
  (make-dmos-flow-editor-window))


;1; This will start up the mtbf editor*
(defun user:mtbf-go ()
  (setq *terminate-flow-pane* nil)
  (dmos:start-mtbf-editor))


;1; This will start up the dmos flow editor*
(defun user:dmos-flow-go ()
  (setq *terminate-flow-pane* nil)
  (dmos:start-dmos-flow-editor))


;;;one function to do all the things to get the mtbf editor going
(defun user:m-editor ()
  (setq user:*continue-editing* nil)
  (when (user:check-password)
    (user:pfd-enter-mtbf-data "Mtbf data")
    (when user:*continue-editing*
      (user:make-mtbf-editor)
      (user:mtbf-go))
    nil))

;;;one function to do all the things to get the dmos editor going
(defun user:d-editor ()
  (setq user:*continue-editing* nil)
  (when (user:check-password)
    (user:pfd-enter-dmos-flow-data "Dmos flow data")
    (when user:*continue-editing*
      (user:make-dmos-flow-editor)
      (user:dmos-flow-go))
  nil))

(defconst user:*password*                      'user:liz)

;;;function to ask for password before entering editors
(defun user:check-password ()
  (let ((pword (dme:get-line 2"Enter your password*        2 *     2  "*)))
    (and pword
         (equal user:*password* (setq pword (read-from-string pword)))
         t)))
```

```
WWWWWWWWWW   1111111111111111111111111111111111111111111111111111111111111111111111111111111111111111111111111   WWWWWWWWWW
WWWWWWWWWW   1111111111111111111111  THIS INFORMATION IS THE PROPERTY OF TEXAS INSTRUMENTS  111111111111111111111111   WWWWWWWWWW
WWWWWWWWWW   1111111111111111111111111111111111111111111111111111111111111111111111111111111111111111111111111   WWWWWWWWWW

                           RRRR    000    AAA   RRRR   K   K
                           R   R  O   O  A   A  R   R  K  K
                           R   R  O   O  A   A  R   R  K K
                           RRRR   O   O  A   A  RRRR   KKK
                           R R    O   O  AAAAA  R R    K K
                           R  R   O   O  A   A  R  R   K  K
                           R   R   000   A   A  R   R  K   K

     EEEEE  DDDD    III   TTTTT   000   RRRR         U   U  TTTTT  III  L       III  TTTTT  III  EEEEE  SSSS
     E      D   D    I      T    O   O  R   R        U   U    T     I   L        I     T     I   E     S
     E      D   D    I      T    O   O  R   R        U   U    T     I   L        I     T     I   E     S
     EEEE   D   D    I      T    O   O  RRRR         U   U    T     I   L        I     T     I   EEEE   SSS
     E      D   D    I      T    O   O  R R          U   U    T     I   L        I     T     I   E         S
     E      D   D    I      T    O   O  R  R         U   U    T     I   L        I     T     I   E         S
     EEEEE  DDDD    III     T     OOO   R   R  _____  UUUUU   T    III  LLLLL   III    T    III  EEEEE  SSSS

                           L       III   SSSS  PPPP    ;;    1
                           L        I   S      P   P   ;;   11
                           L        I   S      P   P         1
                           L        I    SSS   PPPP    ;;    1
                           L        I       S  P       ;;    1
                        .. L        I       S  P        ;    1
                        .. LLLLL   III  SSSS   P        ;   111
```

File _$3$DUA27:[ROARK.JUL]EDITOR_UTILITIES.LISP;1 (26760,21,0), last revised on 16-JUL-1986 13:54, is a 11 block sequential file owned by UIC [IIIS,ROARK]. The records are variable length with implied (CR) carriage control. The longest record is 98 bytes.

Job EDITOR_UTILITIES (2033) queued to NB_TALARIS on 16-JUL-1986 14:28 by user ROARK, UIC [IIIS,ROARK], under account KBS at priority 100, started on printer LCB0 on 16-JUL-1986 14:28 from queue NB_TALARIS.

```
WWWWWWWWWW   1111111111111111111111111111111111111111111111111111111111111111111111111111111111111111111111111   WWWWWWWWWW
WWWWWWWWWW   11111111111111111111111111  Digital Equipment Corporation - VAX/VMS Version V4.4  1111111111111111111111111   WWWWWWWWWW
WWWWWWWWWW   1111111111111111111111111111111111111111111111111111111111111111111111111111111111111111111111111   WWWWWWWWWW
```

```
;1; -*- Mode:COMMON-LISP; Package: dmos; Base:10.; Fonts:MEDFNT,HL12B,HL12BI -*-*


;1; Number of possible lines below the one whose top is at <inside-y>.*
(defmethod (editor-pane :LINES-TO-BOTTOM) (inside-y)
  (quotient (- top-of-last-screen-line inside-y) tv:line-height))


(defmethod (editor-pane :TOP-OF-FIRST-REAL-LINE) ()
  (* (length title-strings) tv:line-height))
```

```
(defmethod (editor-pane :CLEAR-BELOW-TITLE) ()
  (funcall-self :set-cursorpos 0 (length title-strings) ':character)
  (funcall-self :clear-eof))


;1; The number of lines in the array that are past the last one on the screen.*
(defmethod (editor-pane :UNSEEN-LINES-AT-END) ()
  (- number-past-last-entry number-of-last-line 1))


(defmethod (editor-pane :RESET-*LAST-ITEM-CHANGED*) ()     ;1 Rosmaita.*
  (push 'reset uuu)
  (push tv:item-list uuu)
  ;1; Sets *last-item-changed* to the item in the upper left-hand corner of the editor-window.*
  (do* ((ms-items (cdr tv:item-list) (cdr ms-items))
        (item)
        (first-item))
       ((null ms-items) (setq *last-item-changed* first-item))
    (push item uuu)
    ;1; Item should have the least of all x values and the least of all y values.*
    (if (and (listp item)
             *(or (null first-item)
                 (< (fourth item) (fourth first-item))
                 (< (fifth item) (fifth first-item))))
        (setq first-item item))))


(defmethod (editor-pane :NEED-NEW-*LAST-ITEM-CHANGED*) ()          ;1 Rosmaita.*
  ;1; Returns T if the current *last-item-changed* is no longer on the screen, else NIL.*
  (do* ((ms-items tv:item-list (cdr ms-items))
        (item (cadar ms-items) (cadar ms-items))
        (x (fourth *last-item-changed*))
        (y (fifth *last-item-changed*))
        (found-it nil))
       ((null ms-items) found-it)
    (setq found-it (and (eq x (fourth item)) (eq y (fifth item))))))


(defmethod (editor-pane :CALCULATE-VARS) (array)
  (funcall-self :calculate-number-of-lines-below-title)
  (funcall-self :set-text-array (or array (make-array 800)))
  (funcall-self :set-top-of-last-screen-line
                (* (+ number-of-lines-below-title (length title-strings) -1)
                   tv:line-height)))


(defmethod (editor-pane :CALCULATE-NUMBER-OF-LINES-BELOW-TITLE) ()
  (funcall-self :set-number-of-lines-below-title
                (- (floor (quotient (funcall-self :inside-height) tv:line-height))
                   (length title-strings)
```

```
(defun SET-INDEX (line index)
  (selectq (typep line)
    (mtbf-data-line (setf (mtbf-dl-index line) index))
    (operation-data-line (setf (op-dl-index line) index))
    (machine-data-line (setf (mach-dl-index line) index))
    (log-point-data-line (setf (logp-dl-index line) index))
    (empty-data-line (setf (empty-dl-index line) index))))


(defun GET-INDEX (line)
  (selectq (typep line)
    (mtbf-data-line (mtbf-dl-index line))
    (operation-data-line (op-dl-index line))
    (machine-data-line (mach-dl-index line))
    (log-point-data-line (logp-dl-index line))
    (empty-data-line (empty-dl-index line))))


;1; Returns a list of all lines from line0 to line1 inclusive, with line0 first.*
;1; [[Need to decide what to do  here when line1 precedes  line0.*
(defmethod (editor-pane :LINES-FROM) (line0 line1)
  (do* ((array (funcall-self :text-array))
        (first-index (get-index line0))
        (index (get-index line1) (1- index))
        (lines))
       ((< index first-index) lines)
    (push (aref array index) lines)))


(defmethod (editor-pane :LINE-DIFFERENCE) (old-item line1)
  (let ((first-index (get-index (second old-item)))
         (index (get-index line1)))
    (push (list 'line-diff old-item line1 first-index index) uuu)
    (max 0 (1+ (- index first-index)))))


(defmethod (editor-pane :NEXT-HIGHER-LINE-OF-TYPE) (line type)
  (do ((array (funcall-self :text-array))
        (index (get-index line) (1- index)))
       ((minusp index) nil)
    (let ((line (aref array index)))
      (if (eq (typep line) type) (return line)))))


(defmethod (editor-pane :LINES-FOR-OPERATION-LINE) (operation-line)
  (do ((array (funcall-self :text-array))
        (lines (list operation-line))
        (index (1+ (get-index operation-line)) (1+ index)))
       ((>= index (funcall-self :number-past-last-entry)) (nreverse lines))
    (let ((line (aref array index)))
      (if (eq (typep line) 'machine-data-line)
```

```
          (push line lines)
          (return (nreverse lines))))))

;1; The AREF index for <var> in <structure>.*
(defun SETTING-INDEX-FOR (structure var)
  (do ((seqs (variable-alist (typep structure)) (cdr seqs))
       (index Ø (1+ index)))
      ((null seqs) index)
    (if (eq (caar seqs) var) (return index))))
;1; Like ASSOC, except it ignores non-conses in the alist.*
(defun ASSOC-ODD (item list)
  (dolist (thing list)
    (if (and (consp thing) (equal (car thing) item))
        (return thing))))

;1; The entry structure for <variable> in <structure>.*
(defmethod (editor-pane :ENTRY-STRUCTURE-FOR) (structure variable)
  (cdr (assoc-odd variable (cdr (assoc (typep structure) (funcall-self :print-template-alist))))))
```

```
PPPPPPPPPP    3333333333333333333333333333333333333333333333333333333333333333333333333333333333333333333333333333    PPPPPPPPPP
PPPPPPPPPP    33333333333333333333333  THIS INFORMATION IS THE PROPERTY OF TEXAS INSTRUMENTS  33333333333333333333333    PPPPPPPPPP
PPPPPPPPPP    3333333333333333333333333333333333333333333333333333333333333333333333333333333333333333333333333333    PPPPPPPPPP

                              RRRR    000    AAA   RRRR   K   K
                              R   R  0   0  A   A  R   R  K  K
                              R   R  0   0  A   A  R   R  K K
                              RRRR   0   0  A   A  RRRR   KKK
                              R R    0   0  AAAAA  R R    K K
                              R  R   0   0  A   A  R  R   K  K
                              R   R   000   A   A  R   R  K   K

              SSSS   CCCC  RRRR    000   L     L             SSSS  TTTTT  U   U  FFFFF  FFFFF
             S      C      R   R  0   0  L     L            S        T    U   U  F      F
             S      C      R   R  0   0  L     L            S        T    U   U  F      F
              SSS   C      RRRR   0   0  L     L             SSS     T    U   U  FFFF   FFFF
                 S  C      R R    0   0  L     L                S    T    U   U  F      F
                 S  C      R  R   0   0  L     L                S    T    U   U  F      F
             SSSS    CCCC  R   R   000   LLLLL LLLLL  _____  SSSS    T     UUUUU  F      F

                              L      III   SSSS  PPPP    ;;     1
                              L       I   S      P   P   ;;    11
                              L       I   S      P   P          1
                              L       I    SSS   PPPP    ;;     1
                              L       I       S  P       ;;     1
                          ..  L       I       S  P        ;     1
                          ..  LLLLL  III  SSSS   P        ;   111
```

File $3$DUA27:[ROARK.JUL]SCROLL_STUFF.LISP;1 (26745,21,0), last revised on 15-JUL-1986 14:43, is a 26 block sequential file owned by UIC [IIIS,ROARK]. The records are variable length with implied (CR) carriage control. The longest record is 111 bytes.

Job SCROLL_STUFF (223) queued to NB_TALARIS_1 on 15-JUL-1986 17:50 by user ROARK, UIC [IIIS,ROARK], under account KBS at priority 100, started on printer LCA0 on 15-JUL-1986 17:50 from queue NB_TALARIS_1.

```
PPPPPPPPPP    3333333333333333333333333333333333333333333333333333333333333333333333333333333333333333333333333333    PPPPPPPPPP
PPPPPPPPPP    33333333333333333333333  Digital Equipment Corporation - VAX/VMS Version V4.4  33333333333333333333333    PPPPPPPPPP
PPPPPPPPPP    3333333333333333333333333333333333333333333333333333333333333333333333333333333333333333333333333333    PPPPPPPPPP
```

```
;1; -*- Mode:COMMON-LISP; Package: DMOS; Base:10.; Fonts:MEDFNT,HL12B,HL12BI -*-*


(defmethod (editor-pane :WRITE-TITLE) ()
  (push 'write-title uuu)
  (dolist (string (funcall-self :title-strings))
    (funcall-self :line-out string)))


;1; Inserts <lines> *at* <index>, in order.*
(defmethod (editor-pane :INSERT-IN-ARRAY) (lines index)
  (let ((shift (length lines)))
    (if (> (+ shift number-past-last-entry (length text-array)))
```

```
        (setq text-array (adjust-array-size text-array
                                            (+ (length text-array) (max 100 (* 2 shift))))))
    ;1; Shift stuff up to make room.*
    (do ((i (1- number-past-last-entry) (1- i)))
        ((< i index))
      (let ((line (aref text-array i)))
        (set-index line (+ i shift))
        (aset line text-array (+ i shift))))
    ;1; Now put the lines into the gap.*
    (do ((i index (1+ i))
         (remaining-lines lines (cdr remaining-lines)))
        ((null remaining-lines))
      (set-index (car remaining-lines) i)
      (aset (car remaining-lines) text-array i))
    (setq number-past-last-entry (+ shift number-past-last-entry))))


;1; Deletes starting *at* <index>.*
(defmethod (editor-pane :DELETE-FROM-ARRAY) (number-of-lines-to-delete index)
  ;1; Shift stuff down.*
  (do ((i index (1+ i)))
      ((= i number-past-last-entry))
    (let ((line (aref text-array (+ i number-of-lines-to-delete))))
      (set-index line i)
      (aset line text-array i)))
  (setq number-past-last-entry (- number-past-last-entry number-of-lines-to-delete)))


(defmethod (editor-pane :SHIFT-ITEMS-BELOW-UP)
           (inside-top-of-line &optional (number-of-lines-to-shift 1))
  (let* ((m-s-items (symeval-in-instance self 'tv:item-list))
         (move-height (* number-of-lines-to-shift tv:line-height)))
    ;1; Delete the items in the space that is being erased.*
    (setq m-s-items
          (delete-if #'(lambda (m-s-item)
                         (let ((item-inside-top (- (fourth m-s-item) tv:top-margin-size)))
                           (and (<= inside-top-of-line item-inside-top)
                                (< item-inside-top (+ inside-top-of-line move-height)))))
                     m-s-items))
    ;1; Now shift up the ones below that.*
    (dolist (m-s-item m-s-items)
      (if (>= (- (fourth m-s-item) tv:top-margin-size)
              (+ inside-top-of-line move-height))
          ;1; "Move" m-s-items by changing <top> and <bottom>. *
          ;1; Changing the fourth and sixth members of <m-s-item>, and the*
          ;1; fifth of my item.*
          (let* ((thirdcdr (nthcdr 3 m-s-item))
                 (fifthcdr (cddr thirdcdr))
                 (end-of-my-item (nthcdr 4 (second m-s-item))))
            (rplaca thirdcdr (- (car thirdcdr) move-height))
            (rplaca fifthcdr (- (car fifthcdr) move-height))
            (rplaca end-of-my-item (- (car end-of-my-item) move-height))))))
```

```
;1; Top of line to (- tv:line-height) if you want to shift everything down.*
;1; Starts with *this* line.*
(defmethod (editor-pane :SHIFT-ITEMS-BELOW-DOWN)
           (inside-top-of-line &optional (number-of-lines-to-shift 1))
  (let ((m-s-items (symeval-in-instance self 'tv:item-list))
        (move-height (* number-of-lines-to-shift tv:line-height)))
    (push (list 'sibd-Ø inside-top-of-line) uuu)
;    (push (copytree m-s-items) uuu)
    ;1; Throw out items that would get shifted off the screen.*
    (setq m-s-items
          (delete-if #'(lambda (m-s-item)
                         (let ((item-inside-top (- (fourth m-s-item) tv:top-margin-size)))
                           (and (> item-inside-top inside-top-of-line)
                                (> (+ item-inside-top move-height) top-of-last-screen-line))))
                     m-s-items))
    (push 'sibd-1 uuu)
    ;1; Now shift down the ones that don't go off the bottom, but are *at* or past this line.*
    (dolist (m-s-item m-s-items)
;      (push (copytree m-s-items) uuu)
      (let ((item-inside-top (- (fourth m-s-item) tv:top-margin-size)))
      (push (list 'shift-down item-inside-top inside-top-of-line) uuu)
        (if (>= item-inside-top inside-top-of-line)
            ;1; Changing the fourth and sixth members of <m-s-item>, and the*
            ;1; fifth of my-item.*
            (let* ((thirdcdr (nthcdr 3 m-s-item))
                   (fifthcdr (cddr thirdcdr))
                   (end-of-my-item (nthcdr 4 (second m-s-item))))
              (rplaca thirdcdr (+ (car thirdcdr) move-height))
              (rplaca fifthcdr (+ (car fifthcdr) move-height))
              (rplaca end-of-my-item (+ (car end-of-my-item) move-height))))))))


(defmethod (editor-pane :WRITE-NEW-LINES) (inside-top-of-line index lines)
  (push (list 'write-new-lines inside-top-of-line index lines) uuu)
  (funcall-self :insert-in-array lines index)
  (funcall-self :write-lines-from-array inside-top-of-line index (length lines) t))


(defmethod (editor-pane :WRITE-LINES-FROM-ARRAY) (inside-top-of-line first-index lines-number
                                                  &optional lines-below)
  (push (list 'write-lines-from-array inside-top-of-line first-index lines-number) uuu)
  (funcall-self :set-cursorpos Ø inside-top-of-line)
  (do ((index first-index (1+ index))
       (y-pos (+ inside-top-of-line tv:line-height) (+ y-pos tv:line-height))
       (count Ø (1+ count)))
      ((= count lines-number))
    (push (list 'writing-line-from-array inside-top-of-line index) uuu)
    (if lines-below (funcall-self :insert-line))
    (funcall-self :print-data-line (aref text-array index) 'num)
    (if lines-below
        (funcall-self :set-cursorpos Ø y-pos)
        (funcall-self :tyo #\return))))
```

```
;1; Insert <lines> *after* the line with <my-item> in it.*
;1; <My-item> is the kind that looks like* 1(value line variable x-pos y-pos).*
(defmethod (editor-pane :INSERT-NEW-LINES) (my-item lines)
  (if lines
      (let* ((shift (length lines))
             (line (if my-item (second my-item)))
             (index (if line (get-index line) -1))
             (inside-top-of-this-line (if my-item
                                          (fifth my-item)
                                          (funcall-self :top-of-first-real-line)))
             (inside-top-of-next-line (+ inside-top-of-this-line tv:line-height)))
        (push (list 'insert-lines 'old-line line 'new-line (car lines) 'index index) uuu)
        (funcall-self :set-number-of-last-line
                      (+ number-of-last-line
                         (min shift (1+ (funcall-self :lines-to-bottom inside-top-of-next-line)))))
        (funcall-self :shift-items-below-down inside-top-of-this-line (length lines))
        (funcall-self :write-new-lines inside-top-of-next-line (1+ index) lines))
      (funcall-self :beep)))


(defmethod (editor-pane :DELETE-LINES) (my-item number-of-lines-to-delete)
  (let* ((line (if my-item (second my-item)))
         (index (if line (get-index line) -1))
         (inside-top-of-line (if my-item (fifth my-item)  (* (1- (length title-strings)) tv:line-height)))
         (extra-lines (funcall-self :unseen-lines-at-end)))
    (push (list 'delete-lines-Ø line index inside-top-of-line) uuu)
    ;1; Adjust the coordinates of the items themselves.*
    (funcall-self :shift-items-below-up inside-top-of-line number-of-lines-to-delete)
    (funcall-self :set-cursorpos Ø inside-top-of-line)
    ;1; Delete the lines from the screen.*
    (funcall-self :delete-line number-of-lines-to-delete)
    ;1; And from the array.*
    (funcall-self :delete-from-array number-of-lines-to-delete index)
    (if (plusp extra-lines)
        (let ((top-of-place-to-write-from
                (- top-of-last-screen-line (* (1- number-of-lines-to-delete) tv:line-height))))
          (funcall-self :write-lines-from-array
                        top-of-place-to-write-from
                        (1+ number-of-last-line)
                        (min extra-lines number-of-lines-to-delete))))
    ;1; The last line is different now, only if the end of the array was already*
    ;1; on the screen, or there weren't enough extra lines to fill the gap.*
    (if (< extra-lines number-of-lines-to-delete)
        (funcall-self :set-number-of-last-line
                      (- number-of-last-line
                         (- extra-lines number-of-lines-to-delete))))))


(defmethod (editor-pane :SCROLL-DOWN-BIG) ()
  (push 'scroll-down-big uuu)
  (funcall-self :scroll-down number-of-lines-below-title))
```

```
(defmethod (editor-pane :SCROLL-UP-BIG) ()
  (push 'scroll-up-big uuu)
  (funcall-self :scroll-up number-of-lines-below-title))


(defmethod (editor-pane :SCROLL-UP) (number-of-lines-to-scroll)
  (push 'scroll-up uuu)
  (let* ((lines-to-really-scroll (min number-of-lines-to-scroll
                                      number-of-first-line
                                      number-of-lines-below-title))
         (top-of-first-line (funcall-self :top-of-first-real-line)))
    (if (zerop lines-to-really-scroll)
        (beep)
        (let ((writing-whole-screen? (= lines-to-really-scroll number-of-lines-below-title)))
          ;1; Alter the item positions (where the rectangles pop up).*
          (cond (writing-whole-screen?
                 (funcall-self :clear-below-title)
                 (set-in-instance self 'tv:item-list nil))
                (t
                 (funcall-self :shift-items-below-down top-of-first-line lines-to-really-scroll)))
          (push (list 'scroll-up top-of-first-line number-of-first-line lines-to-really-scroll)
          (funcall-self :write-lines-from-array
                        top-of-first-line
                        (- number-of-first-line lines-to-really-scroll)
                        lines-to-really-scroll
                        (not writing-whole-screen?))
         (funcall-self :set-number-of-first-line (- number-of-first-line lines-to-really-scroll))
         (funcall-self :set-number-of-last-line (- number-of-last-line lines-to-really-scroll))))))


(defmethod (editor-pane :SCROLL-DOWN) (number-of-lines-to-scroll)
  (push 'scroll-up uuu)
  (let* ((lines-past-screen (funcall-self :unseen-lines-at-end))
         (lines-to-really-scroll (min number-of-lines-to-scroll
                                      lines-past-screen
                                      number-of-lines-below-title)))
    (if (plusp lines-to-really-scroll)
        (let* ((top-of-first-line (funcall-self :top-of-first-real-line))
               (writing-whole-screen?
                 (= lines-to-really-scroll number-of-lines-below-title))
               (top-of-line-to-write-from
                 (if writing-whole-screen?
                     top-of-first-line
                     (- top-of-last-screen-line (* (1- lines-to-really-scroll) tv:line-height)))))
          ;1; Adjust the coordinates of the items themselves, deleting some or all, and clear some space on screen.*
          (cond (writing-whole-screen?
                 (set-in-instance self 'tv:item-list nil)
                 (funcall-self :clear-below-title))
                (t
                 (funcall-self :shift-items-below-up top-of-first-line lines-to-really-scroll)
                 ;1; Delete the lines from top of the screen.*
```

```
          (funcall-self :set-cursorpos Ø top-of-first-line)
          (funcall-self :delete-line lines-to-really-scroll)))
      ;1; Write some lines at the bottom.*
      (funcall-self :write-lines-from-array
                    top-of-line-to-write-from
                    (1+ number-of-last-line)
                    lines-to-really-scroll)
      ;1; The last line is different now, unless the end of the array was already on the screen.*
      (funcall-self :set-number-of-first-line
                    (+ number-of-first-line lines-to-really-scroll))
      (funcall-self :set-number-of-last-line
                    (if (> lines-past-screen lines-to-really-scroll)
                        (+ number-of-last-line lines-to-really-scroll)
                        (1- number-past-last-entry))))
    (funcall-self :beep))))


(defmethod (editor-pane :REWRITE-SCREEN-FROM-INDEX) (index)
  (push (list 'rewrite-from-index number-of-lines-below-title number-past-last-entry index)  uuu)
  (let ((lines-to-write (min number-of-lines-below-title (- number-past-last-entry index))))
    (if (plusp lines-to-write)
        (let ((top-of-first-line (funcall-self :top-of-first-real-line)))
          (funcall-self :clear-below-title)
          (set-in-instance self 'tv:item-list nil)
          (funcall-self :set-cursorpos Ø top-of-first-line)
          (funcall-self :write-lines-from-array
                        top-of-first-line
                        index
                        lines-to-write)
          ;1; The last line is different now, unless the end of the array was already on the screen.*
          (funcall-self :set-number-of-first-line index)
          (funcall-self :set-number-of-last-line (+ index lines-to-write -1)))
        (funcall-self :beep))))


(defmethod (editor-pane :TOP) ()
  (funcall-self :rewrite-screen-from-index Ø))


(defmethod (editor-pane :BOTTOM) ()
  (funcall-self :rewrite-screen-from-index
                (max Ø (- number-past-last-entry number-of-lines-below-title))))


(defmethod (editor-pane :MIDDLE) ()
  (funcall-self :rewrite-screen-from-index
                (min (floor (quotient number-past-last-entry 2))
                     (- number-past-last-entry number-of-lines-below-title))))


(defmethod (editor-pane :REWRITE) ()
  (funcall-self :rewrite-screen-from-index number-of-first-line))
```

```
(defmethod (editor-pane :INITIAL-WRITE) ()
  (push 'initial-write uuu)
  (let* ((possible-lines number-past-last-entry)
         (lines-to-really-write (min possible-lines
                                     number-of-lines-below-title)))
    (if (plusp lines-to-really-write)
        (let* ((top-of-first-line (funcall-self :top-of-first-real-line)))
          (funcall-self :set-cursorpos Ø top-of-first-line)
          (funcall-self :write-lines-from-array
                        top-of-first-line
                        Ø
                        lines-to-really-write)
          ;1; The last line is different now, unless the end of the array was already on the screen.*
          (funcall-self :set-number-of-first-line Ø)
          (funcall-self :set-number-of-last-line (1- lines-to-really-write)))
        (funcall-self :beep))))
```

```
MMMMMMMMMM   000000000000000000000000000000000000000000000000000000000000000000000000000000000000000000   MMMMMMMMMM
MMMMMMMMMM   0000000000000000000000  THIS INFORMATION IS THE PROPERTY OF TEXAS INSTRUMENTS  0000000000000000000000   MMMMMMMMMM
MMMMMMMMMM   000000000000000000000000000000000000000000000000000000000000000000000000000000000000000000   MMMMMMMMMM

                         RRRR    OOO    AAA   RRRR   K   K
                         R   R  O   O  A   A  R   R  K  K
                         R   R  O   O  A   A  R   R  K K
                         RRRR   O   O  A   A  RRRR   KKK
                         R R    O   O  AAAAA  R R    K K
                         R  R   O   O  A   A  R  R   K  K
                         R   R   OOO   A   A  R   R  K   K

RRRR   EEEEE   AAA   DDDD          AAA   N   N  DDDD         W   W  RRRR   III  TTTTT  EEEEE
R   R  E      A   A  D   D        A   A  N   N  D   D        W   W  R   R   I     T    E
R   R  E      A   A  D   D        A   A  NN  N  D   D        W   W  R   R   I     T    E
RRRR   EEEE   A   A  D   D        A   A  N N N  D   D        W   W  RRRR    I     T    EEEE
R R    E      AAAAA  D   D        AAAAA  N  NN  D   D        W W W  R R     I     T    E
R  R   E      A   A  D   D        A   A  N   N  D   D        WW WW  R  R    I     T    E
R   R  EEEEE  A   A  DDDD   _____ A   A  N   N  DDDD  _____  W   W  R   R  III    T    EEEEE

                         L       III   SSSS  PPPP    ;;     1
                         L        I   S      P   P   ;;    11
                         L        I   S      P   P          1
                         L        I    SSS   PPPP    ;;     1
                         L        I       S  P       ;;     1
                      .. L        I       S  P        ;     1
                      .. LLLLL   III  SSSS   P       ;    111
```

File _$3$DUA27:[ROARK.JUL]READ_AND_WRITE.LISP;1 (26732,47,0), last revised on 15-JUL-1986 14:43, is a 16 block sequential file owned by UIC [IIIS,ROARK]. The records are variable length with implied (CR) carriage control. The longest record is 115 bytes.

Job READ_AND_WRITE (218) queued to NB_TALARIS_1 on 15-JUL-1986 17:49 by user ROARK, UIC [IIIS,ROARK], under account KBS at priority 100, started on printer LCA0 on 15-JUL-1986 17:49 from queue NB_TALARIS_1.

```
MMMMMMMMMM   000000000000000000000000000000000000000000000000000000000000000000000000000000000000000000   MMMMMMMMMM
MMMMMMMMMM   0000000000000000000000  Digital Equipment Corporation - VAX/VMS Version V4.4  0000000000000000000000   MMMMMMMMMM
MMMMMMMMMM   000000000000000000000000000000000000000000000000000000000000000000000000000000000000000000   MMMMMMMMMM
```

```
;1; -*- Mode:COMMON-LISP; Package: DMOS; Base:10.; Fonts:MEDFNT,HL12B,HL12BI -*-*

;1;; Modifications made by rosmaita -- 6/11/86 -- see comments in code*
;1;; (1) Method :DMOS-FLOW-ITEM-READER*
;1;; (2) method :DMOS-ITEM for flavor EDITOR-PANE is now taken care of in :CHANGE-ITEM in the file "flow-window"*


;1; Use CLEAR-STRING to clear the space before entering or changing an item.*
;1; Enter lines by having*


;1;; The clearing is done in (:CHANGE-ITEM) in "vlach.dmos-io;flow-window" immediately before this*
;1;; function is called because all the relevant information is available there      (rosmaita 6/9/86)*
;1;; Code added to handle <esc> to restore value -- rosmaita 6/10/86*
;1;; Method must return the value of RESTØRE-P if <esc>-handling is to work correctly -- rosmaita 6/12/86*
(defmethod (editor-pane :ITEM-READER) (max-length)
  (let ((read-pointer Ø)
        (flow-blinker (tv:sheet-following-blinker self))
        (restore-p nil))
    (unwind-protect
        (progn (funcall flow-blinker ':set-visibility t)
               (do ((thing))
                   (nil)
                 (setq thing (funcall-self ':any-tyi))
                 (push (list 'in thing) uuu)
                 (cond ((listp thing) (beep))
                       ((and (equal (code-char thing) #\rubout) (plusp read-pointer))
                        (decf read-pointer)
                        (push 'bs uuu)
                        (funcall-self :bspace))
                       ;1; rosmaita*
                       ((and (equal (code-char thing) #\escape))
                        (aset #\newline *reading-string* Ø)
                        (setq restore-p t)
                        (return))
                       ;1; end rosmaita*
                       ((and (standard-char-p thing)
                             (or (< read-pointer max-length) (char= thing #\newline)))
                        (setq thing (char-upcase thing))
                        (aset thing *reading-string* read-pointer)
                        (if (char= thing #\newline) (return))
                        (push (list 'out thing) uuu)
                        (funcall-self ':tyo thing)
                        (incf read-pointer)))))
      (funcall flow-blinker ':set-visibility nil))
    restore-p))


(defmethod (editor-pane :WRITE-TO-FILE) (pathname)
  (with-open-file (s pathname :direction :output)
    (dotimes (index number-past-last-entry)
      (just-print-data-line (aref text-array index) s)
      (terpri s))))
```

```
;1; This prints the stuff to the string and creates the items, then outputs the string as a line.*
(defun JUST-PRINT-DATA-LINE (structure stream &aux (divider (car (funcall-self :dividers))))
  (if (funcall-self :divider-first?)
      (funcall stream ':tyo divider))
  (do* ((defstruct-name (typep structure))
        (structure-alist (variable-alist defstruct-name))
        (pairs (cdr (assoc defstruct-name (funcall-self :print-template-alist))) (cdr pairs)))
       ((null pairs))
    (if (numberp  (car pairs))
        (print-spaces (car pairs) stream)
        (let* ((variable (caar pairs))
               (entry-structure (cdar pairs))
               (sequence (ass 'string-equal variable structure-alist))
               (value (funcall (nth 6 sequence) structure)))
          (fit-print value (es-length entry-structure) stream)))
    (funcall stream ':tyo divider)))


;1; This prints the stuff to the string and creates the items, then outputs the string as a line.*
(defmethod (editor-pane :PRINT-DATA-LINE) (structure type)
  (setf (fill-pointer print-template-string) 0)
  (let ((divider (car (funcall-self :dividers))))
    (with-output-to-string (string-stream print-template-string)
      (multiple-value-bind (initial-inside-x initial-inside-y)
          (funcall-self ':read-cursorpos)
        (when (funcall-self :divider-first?)
          (princ divider string-stream)
          (setq initial-inside-x (+ tv:char-width initial-inside-x)))
        (do* ((defstruct-name (typep structure))
              (structure-alist (variable-alist defstruct-name))
              (pairs (cdr (assoc defstruct-name (funcall-self :print-template-alist))) (cdr pairs))
              (inside-x initial-inside-x (+ inside-x x-increment tv:char-width))
              (inside-y initial-inside-y)
              (outside-x tv:cursor-x (+ outside-x x-increment tv:char-width))
              (outside-y tv:cursor-y)
              (x-increment))
             ((null pairs))
          (cond ((numberp  (car pairs))
                 (print-spaces (car pairs) string-stream)
                 (setq x-increment (* (car pairs) tv:char-width)))
                (t
                 (let* ((variable (caar pairs))
                        (entry-structure (cdar pairs))
                        (character-length (es-length entry-structure))
                        (sequence (ass 'string-equal variable structure-alist))
                        (value (funcall (nth 6 sequence) structure)))
                   (setq x-increment (* character-length tv:char-width))
                   (fit-print value character-length string-stream)
                   (let ((default-cons-area system:background-cons-area))
                     ;1; Putting stuff on the internal item-list; uses *outside* dimensions.*
                     (push (list type
```

```
                                       (list value structure variable inside-x inside-y)
                                       (if (funcall-self :divider-first?)
                                           (+ outside-x tv:char-width)
                                           outside-x)
                                       outside-y
                                       (if (funcall-self :divider-first?)
                                           (+ outside-x x-increment tv:char-width)
                                           (+ outside-x x-increment))
                                       (+ outside-y tv:line-height))
                                 tv:item-list)))))
            (princ divider string-stream))))
      (funcall-self :string-out print-template-string)))


(defun FIT-PRINT (thing spaces stream)
  (cond ((flonump thing)
         ;1; Because "0.2" is 3 longer than 0, but "1.2" is only 2 longer than 1.*
         (let ((length (+ (whole-digits thing) (if (< thing 1.0) 3 2))))
           (cond ((<= (+ 2 length) spaces)
                  (funcall stream :tyo #\space)
                  (print-flonum thing 1 stream)
                  (print-spaces (- spaces length 1) stream))
                 (t
                  (print-flonum thing 1 stream)
                  (print-spaces (- spaces length) stream)))))
        ((stringp thing)
         (princ thing stream)
         (print-spaces (- spaces (length thing)) stream))
        (thing
         (let ((length (flatc thing)))
           (cond ((<= (+ 2 length) spaces)
                  (funcall stream :tyo #\space)
                  (princ thing stream)
                  (print-spaces (- spaces length 1) stream))
                 (t
                  (princ thing stream)
                  (print-spaces (- spaces length) stream)))))
        (t
         (print-spaces spaces stream))))

;1;; METHOD :DMOS-ITEM FOR FLAVOR EDITOR PANE IS NOW TAKEN CARE OF IN :CHANGE-ITEM in the file "flow-window"*


(defun PRINT-SPACES (number stream)
  (dotimes (i number)
    (princ "2 "* stream)))


(defun REAL-STRING (string)
  (string-trim '(#\space)
               (substring string 0  (string-search-char #\newline string))))
```

```
;1; To get rid of *'s in mtbf data.*
(defun NUMBER-STRING (string)
  (string-trim '(#\space #\*)
               (substring string Ø  (string-search-char #\newline string))))


(deff read-string-from-string #'real-string)


(defun READ-INTEGER-FROM-STRING (string)
  (let ((new-string (number-string string))
        (number Ø))
    (dotimes (i (length new-string) number)
      (let ((char (aref string i)))
      (if (digit-char-p char)
          (setq number (+ (* number 1Ø) (- (char-code char) 48)))
          (return 'error))))))


(defun READ-FLONUM-FROM-STRING (string)
  (let ((new-string (number-string string)))
    (if (zerop (length new-string))
        'error
        (let ((number Ø)
              (character)
              (reading-decimal)
              (multiplier .1))
          (dotimes (i (length new-string) (FLOAT number))
            (setq character (aref string i))
            (cond ((digit-char-p character)
                   (let ((digit (- (char-code character) 48)))
                     (cond (reading-decimal
                            (setq number (+ (* multiplier digit) number))
                            (setq multiplier (quotient multiplier 1Ø)))
                           (t
                            (setq number (+ (* number 1Ø) digit))))))
                  ((char= character #\.)
                   (setq reading-decimal t))
                  (t (return 'error))))))))


(defmethod (editor-pane :BSPACE) ()
  (funcall-self :backward-char)
  (funcall-self :clear-char))
```

```
BBBBBBBBBB   7777777777777777777777777777777777777777777777777777777777777777777777777777777777777777777777777777   BBBBBBBBBB
BBBBBBBBBB   777777777777777777777777  THIS INFORMATION IS THE PROPERTY OF TEXAS INSTRUMENTS  777777777777777777777777   BBBBBBBBBB
BBBBBBBBBB   7777777777777777777777777777777777777777777777777777777777777777777777777777777777777777777777777777   BBBBBBBBBB

                                   RRRR    OOO    AAA   RRRR   K   K
                                   R   R  O   O  A   A  R   R  K  K
                                   R   R  O   O  A   A  R   R  K K
                                   RRRR   O   O  A   A  RRRR   KKK
                                   R R    O   O  AAAAA  R R    K K
                                   R  R   O   O  A   A  R  R   K  K
                                   R   R   OOO   A   A  R   R  K   K

         EEEEE  DDDD    III  TTTTT   OOO   RRRR         DDDD   EEEEE  FFFFF   SSSS  Y   Y   SSSS  TTTTT  EEEEE  M   M
         E      D   D    I     T    O   O  R   R        D   D  E      F      S       Y Y   S        T    E      MM MM
         E      D   D    I     T    O   O  R   R        D   D  E      F      S        Y    S        T    E      M M M
         EEEE   D   D    I     T    O   O  RRRR         D   D  EEEE   FFFF    SSS     Y     SSS     T    EEEE   M   M
         E      D   D    I     T    O   O  R R          D   D  E      F          S    Y        S    T    E      M   M
         E      D   D    I     T    O   O  R  R         D   D  E      F          S    Y        S    T    E      M   M
         EEEEE  DDDD    III    T     OOO   R   R _____  DDDD   EEEEE  F      SSSS     Y    SSSS     T    EEEEE  M   M

                                   L       III   SSSS   PPPP    ;;     1
                                   L        I   S       P   P   ;;    11
                                   L        I   S       P   P          1
                                   L        I    SSS    PPPP    ;;     1
                                   L        I       S   P       ;;     1
                                ..  L        I       S   P        ;     1
                                ..  LLLLL   III  SSSS    P        ;    111
```

File _$3$DUA27:[ROARK.JUL]EDITOR_DEFSYSTEM.LISP;1 (26748,49,0), last revised on 15-JUL-1986 13:54, is a 6 block sequential file owned by UIC [IIIS,ROARK]. The records are variable length with implied (CR) carriage control. The longest record is 110 bytes.

Job EDITOR_DEFSYSTEM (2032) queued to NB_TALARIS_1 on 15-JUL-1986 14:28 by user ROARK, UIC [IIIS,ROARK], under account KBS at priority 100, started on printer LCA0 on 15-JUL-1986 14:28 from queue NB_TALARIS_1.

```
BBBBBBBBBB   7777777777777777777777777777777777777777777777777777777777777777777777777777777777777777777777777777   BBBBBBBBBB
BBBBBBBBBB   777777777777777777777777  Digital Equipment Corporation - VAX/VMS Version V4.4  777777777777777777777777   BBBBBBBBBB
BBBBBBBBBB   7777777777777777777777777777777777777777777777777777777777777777777777777777777777777777777777777777   BBBBBBBBBB
```

```
;1; -*- Package: USER; Mode: COMMON-LISP; Base: 10.; Fonts: MEDFNT,HL12B -*-*

(package-declare DMOS global 1000.)

(defsystem SIMULATOR
  (:name "factory simulator")
  (:pathname-default "carnap:vlach.2new-*dmos-io;")
  (:module basic-declarations ("vars-static" "vars-dynamic" "vars-global"))
  (:module declarations ("process-structures" "2common-editor*-structures"
                         "2dmos-flow-editor*-structures"
                         "2mtbf*-editor-structures" "2mtbf-*menu-stuff" "2dmos-flow-*menu-stuff" ))
 ;1; use "no-garbage-access-functions" for garbage-free version, otherwise "garbage-access-functions".*
 (:module access-functions "garbage-access-functions")
 (:module basics ("basic-functions" "utilities"  "editor-utilities" "when-expected-utilities" "track-stuff"))
 (:module reader ("2text-file-*reader" "2mtbf-*reader"))
 (:module window ("flow-window" "2process-blips"* "2scroll-stuff"* "2option-pane*"))
 (:module calculators ("contention" "when-expected" "enter-usage-stuff"
                       "double-machines" "max-l-opt" "module-stuff"))
 (:module file-stuff "filestuff")
 (:module movers ("buffer" "post" "handlers" "load-functions"))
 (:module execute ("timed-instruction-execute" "machine-instruction-execute"))
 (:module initialize ("initialize" "init-menu" "make-machine-types" "process-init" "constraint-stuff"))
 (:module main ("scheduler" "main"))
 ( module io ("sch-io" "user-io" "read-and-write"))

 (:compile-load basic-declarations)
 (:compile-load declarations (:fasload basic-declarations))
 (:compile-load access-functions (:fasload basic-declarations declarations))
 (:compile-load basics (:fasload basic-declarations declarations access-functions))
 (:compile-load reader (:fasload basic-declarations declarations access-functions))
 (:compile-load window (:fasload basic-declarations declarations access-functions))
 (:compile-load calculators (:fasload basic-declarations declarations access-functions))
 (:compile-load file-stuff (:fasload basic-declarations declarations access-functions))
 (:compile-load movers (:fasload basic-declarations declarations access-functions))
 (:compile-load execute (:fasload basic-declarations declarations access-functions))
 (:compile-load initialize (:fasload basic-declarations declarations access-functions))
 (:compile-load main (:fasload basic-declarations declarations access-functions))
 (:compile-load io (:fasload basic-declarations declarations access-functions)))


(deff si:*append #'append)

(defun LOAD-SIM ()
  (make-system 'SIMULATOR :compile :noconfirm)
  (format t "2~3%     (fe-go) to run simulator, (sim-dmos) to restart it"*))
```

```
JJJJJJJJJJ   5555555555555555555555555555555555555555555555555555555555555555555555555555555555555555555555555555   JJJJJJJJJJ
JJJJJJJJJJ   5555555555555555555555555  THIS INFORMATION IS THE PROPERTY OF TEXAS INSTRUMENTS  5555555555555555555555555   JJJJJJJJJJ
JJJJJJJJJJ   5555555555555555555555555555555555555555555555555555555555555555555555555555555555555555555555555555   JJJJJJJJJJ

                              RRRR    000    AAA   RRRR   K   K
                              R   R  0   0  A   A  R   R  K  K
                              R   R  0   0  A   A  R   R  K K
                              RRRR   0   0  A   A  RRRR   KKK
                              R R    0   0  AAAAA  R R    K  K
                              R  R   0   0  A   A  R  R   K   K
                              R   R   000   A   A  R   R  K    K

        GGGGGGGG  LL          000000   BBBBBBBB    AAAAAA   LL          SSSSSSSS
        GGGGGGGG  LL          000000   BBBBBBBB    AAAAAA   LL          SSSSSSSS
      GG          LL        00      00 BB      BB AA      AA LL        SS
      GG          LL        00      00 BB      BB AA      AA LL        SS
      GG          LL        00      00 BB      BB AA      AA LL        SS
      GG          LL        00      00 BB      BB AA      AA LL        SS
      GG          LL        00      00 BBBBBBBB   AA      AA LL          SSSSSS
      GG          LL        00      00 BBBBBBBB   AA      AA LL          SSSSSS
      GG   GGGGGG LL        00      00 BB      BB AAAAAAAAAA LL                SS
      GG   GGGGGG LL        00      00 BB      BB AAAAAAAAAA LL                SS
      GG       GG LL        00      00 BB      BB AA      AA LL                SS
      GG       GG LL        00      00 BB      BB AA      AA LL                SS
        GGGGGG    LLLLLLLLLL  000000   BBBBBBBB   AA      AA LLLLLLLLLL SSSSSSSS
        GGGGGG    LLLLLLLLLL  000000   BBBBBBBB   AA      AA LLLLLLLLLL SSSSSSSS

                  LL          IIIIII     SSSSSSSS  PPPPPPPP        ;;;;       11
                  LL          IIIIII     SSSSSSSS  PPPPPPPP        ;;;;       11
                  LL            II     SS          PP      PP      ;;;;     1111
                  LL            II     SS          PP      PP      ;;;;     1111
                  LL            II     SS          PP      PP                 11
                  LL            II     SS          PP      PP                 11
                  LL            II       SSSSSS    PPPPPPPP        ;;;;       11
                  LL            II       SSSSSS    PPPPPPPP        ;;;;       11
                  LL            II             SS  PP              ;;;;       11
                  LL            II             SS  PP              ;;;;       11
           ....   LL            II             SS  PP                ;;       11
           ....   LL            II             SS  PP                ;;       11
           ....   LLLLLLLLLL  IIIIII   SSSSSSSS    PP              ;;       111111
           ....   LLLLLLLLLL  IIIIII   SSSSSSSS    PP              ;;       111111
```

File _$3$DUA27:[ROARK.JUL]GLOBALS.LISP;1 (309,172,0), last revised on 15-JUL-1986 14:41, is a 21 block sequential file owned by UIC [IIIS,ROARK]. The records are variable length with implied (CR) carriage control. The longest record is 105 bytes.

Job GLOBALS (18) queued to NB_TALARIS_1 on 15-JUL-1986 14:46 by user ROARK, UIC [IIIS,ROARK], under account KBS at priority 100, started on printer LCA0 on 15-JUL-1986 14:46 from queue NB_TALARIS_1.

```
JJJJJJJJJJ   5555555555555555555555555555555555555555555555555555555555555555555555555555555555555555555555555555   JJJJJJJJJJ
JJJJJJJJJJ   5555555555555555555555555  Digital Equipment Corporation - VAX/VMS Version V4.4  5555555555555555555555555   JJJJJJJJJJ
JJJJJJJJJJ   5555555555555555555555555555555555555555555555555555555555555555555555555555555555555555555555555555   JJJJJJJJJJ
```

```
;;-*- Mode:LISP; Package:DME; Base:10.; Fonts:MEDFNT,HL12B,HL12BI -*-

(DEFCONST *bad-array-error*          "Illegal process array for generating a Process Flow diagram.")

(DEFCONST *barf-window*              (tv:make-window
                                       'tv:truncating-pop-up-text-window-with-reset
                                       ':blinker-p            nil
                                       ':borders              6.
                                       ':border-margin-width  10.
                                       ':font-map             '(,fonts:tr12b
                                                                 ,fonts:tr12bi)
                                       ':label '(:string
                                                 "(type any character to flush)"
                                                 :font ,fonts:medfnt)
                                       ':more-p               nil))

(DEFCONST *character-commands*
        '((#\clear-screen              :redraw                "redraw the Process Flow diagram")
          (#\hand-down                 :page-down             "scroll downward a full page")
          (#\hand-left                 :page-left             "scroll left a full page")
          (#\hand-right                :page-right            "scroll right a full page")
          (#\hand-up                   :page-up               "scroll upward a full page")
          (#\help                      :help                  "print this help text")
          (#\resume                    :sim-resume            "restart the simulator after a breakpoint")
          (#\space                     :no-op                 "do nothing")
          (#\control-hand-down         :page-down-half        "scroll downward a half of a page")
          (#\control-hand-left         :page-left-half        "scroll left a half of a page")
          (#\control-hand-right        :page-right-half       "scroll right a half of a page")
          (#\control-hand-up           :page-up-half          "scroll upward a half of a page")
          (#\control-+                 :zoom-in-half          "zoom in a half of a step")
          (#\control--                 :zoom-out-half         "zoom out a half of a step")
          (#\control-<                 :default-window        "reset the window to the default window")
          (#\control->                 :extents-window        "set the window to the extents of the diagram")
          (#\control-b                 :build-diagram         "rebuild the Process Flow diagram")
          (#\control-c                 :clear-status          "clear the dynamic status display")
          (#\control-r                 :redraw                "redraw the Process Flow diagram")
          (#\control-z                 :exit                  "exit the Process Flow Display system")
          (#\meta-d                    :dynamic-status-mode   "enter a mode for setting dynamic status display")
          (#\meta-m                    :move-mode             "enter a mode for moving Machines")
          (#\meta-s                    :static-status-mode    "enter a mode for displaying static status")
          (#\meta-w                    :window-area-mode      "enter a mode for selecting the window area")
          (#\control-meta-hand-down    :page-down-quarter     "scroll downward a quarter of a page")
          (#\control-meta-hand-left    :page-left-quarter     "scroll left a quarter of a page")
          (#\control-meta-hand-right   :page-right-quarter    "scroll right a quarter of a page")
          (#\control-meta-hand-up      :page-up-quarter       "scroll upward a quarter of a page")
          (#\control-meta-+            :zoom-in-quarter       "zoom in a quarter of a step")
          (#\control-meta--            :zoom-out-quarter      "zoom out a quarter of a step")
          (#\control-meta-r            :read-diagram          "read in a Process Flow diagram")
          (#\control-meta-w            :write-diagram         "write out a Process Flow diagram")))

(DEFCONST *bar-command-menu-choices*
        '((1info*'1   *"Show status"
                  ((:get-machines                   "a particular machine")
```

```
                (:get-operations                "a particular operation")
                (:get-lots                      "a particular lot (in the plant)")))
         (1plant*   "Show plant information"
               ((:get-average-cycle-time        "average cycle time")
                (:get-all-lot-cycle-times       "list of cycle times for all lots")
                (:get-track-all-machines1       "status of all machines")
                (:get-lots-in-factory           "number of lots in the plant")
                (:get-broken-machines           "list of all broken machines")))
         (1misc  * 1 *"Commands"
               ((:sleep-factor                  "slow the simulation speed")
                (:sim-run-to                    "set the time step of next simulator breakpoint")
                (:sim-resume                    "restart the simulator after a breakpoint")
                (:bar-pause                     "pause the simulator")
                (:bar-clear-screen              "refresh the bar chart display")
                (:bar-continue                  "continue the simulation")))
         (1screens* "Change screens"
               ((:bar-chart                     "display another dynamic bar chart")
;;;             (:edit-mtbf                     "edit the mtbf data file")
;;;             (:edit-dmos-flow                "edit the dmos process flow file")
                (:bar-exit                      "return to the process flow display")))))

(DEFCONST *bar-command-menu*          (tv:make-window
                                        'tv:temporary-lisa-choice-window
                                        ':choices      *bar-command-menu-choices*
                                        ':height       470.
                                        ':save-bits    t
                                        ':width        460))


(defconst *COMMAND-MENU-CHOICES*
        '((scroll "Scrolling Commands"
               ((:page-down-half             "scroll downward")
                (:page-left-half             "scroll left")
                (:page-right-half            "scroll right")
                (:page-up-half               "scroll upward")))
          (window "Windowing Commands"
               ((:zoom-in-half               "zoom in")
                (:zoom-out-half              "zoom out")
                (:default-window             "reset to the default window")
                (:extents-window             "window to the extents")
                (:window-area-mode           "set the window area")
                (:redraw                     "redraw the Process Flow diagram")))
          (misc   "Other Commands"
               ((:help                       "display help information")
                (:move-mode                  "move Machines")
                (:build-diagram              "rebuild the Process Flow diagram")
                (:dynamic-status-mode        "display dynamic status of operations")
                (:static-status-mode         "display static status of objects")
                (:sim-run-to                 "set the time step of next simulator breakpoint")
                (:sim-resume                 "restart the simulator after a breakpoint")))
          (screens "Change screens"
                (
;;;              (:edit-mtbf                 "edit the mtbf data file")
;;;              (:edit-dmos-flow            "edit the dmos process flow file")
```

```
            (:bar-chart              "display dynamic bar chart")
            (:exit                   "exit the Process Flow Display system")))))

(defconst *COMMAND-MENU*          (tv:make-window
                                    'tv:temporary-lisa-choice-window
                                    ':choices      *command-menu-choices*
                                    ':height       480.
                                    ':save-bits    t
                                    ':width        480.))

(DEFCONST *machine-picture-alu*        tv:alu-seta)

(DEFCONST *machine-picture-border-color*       gwin:black)

(DEFCONST *machine-picture-min-margin*  16.)

(DEFCONST *machine-picture-normal-height*        ' )

(DEFCONST *machine-picture-normal-width*          '

(DEFCONST *machine-picture-tab-width*          8.)

(DEFCONST *machine-picture-text-color*  gwin:black)

(DEFCONST *default-mouse-commands*
          '((#\mouse-2-1 :menu-command
             "menu of Process Flow Display system commands")
            (#\mouse-3-1 :system-menu-command
             "menu of system commands")))

(DEFCONST *general-documentation*       "
                                        Process Flow Display System

This is a system for displaying Process Flow diagrams.  You interact with the system by single
keystroke commands or by selecting the commands from menus which are displayed when either the middle
mouse button is pressed while the mouse is over the Process Flow display window.
")

(DEFCONST *heavy-mark-font*            gwin:tr10-font)

(DEFCONST *help-window*                (tv:make-window
                                         'tv:truncating-pop-up-text-window-with-reset
                                         ':blinker-p             nil
                                         ':borders               5.
                                         ':border-margin-width 10.
                                         ':font-map              '(,fonts:medfnt
                                                                   ,fonts:medfnb)
```

```
                                        ':label '(:string
                                                  "(type any character to flush)"
                                                  :font ,fonts:medfnt)))

(DEFCONST *link-default-font*          gwin:tr10-font)

(DEFCONST *link-default-weight*        1)

(DEFCONST *link-jog-size*              50.)

(DEFCONST *link-line-alu*              tv:alu-ior)

(DEFCONST *link-line-color*            gwin:black)

(DEFCONST *link-min-offset*            30.)

(DEFCONST *link-spacing*               10)

(DEFCONST *link-tab-width*             8.)

(DEFCONST *link-text-alu*              tv:alu-seta)

(DEFCONST *link-text-color*            gwin:black)

(DEFCONST *link-text-offset*           3.)

(DEFCONST *machine-group-color*        3)

(DEFCONST *machine-group-margin*       10)

(DEFCONST *machine-group-weight*       2)

(DEFCONST *max-status-items*           3)

(defconst *MODE-ALIST*
          '((dynamic-status-mode
              (20. fonts:gwin-mouse 7. 7.)
              ((#\mouse-1-1 :dynamic-status
                "Select operation to continuously display dynamic status of"))
              (machine-picture process-as-link machine-group))
            (move-mode
              (41. fonts:gwin-mouse 7. 7.)
              ((#\mouse-1-1 :move-selected-entities
                "select Machine to move, hold to begin moving")
               (#\mouse-1-2 :unselect-item
                "unselect Machine, hold to unselect an area"))
              (machine-picture machine-group))
            (null-mode
              (7.  fonts:gwin-mouse 4. 4.)
              nil
              nil)
            (static-status-mode
              (26. fonts:gwin-mouse 7. 7.)
              ((#\mouse-1-1 :static-status
```

```
          "select object to temporarily display full status of"))
        (machine-picture process-as-link machine-group))
      (window-area-mode
        (48. fonts:gwin-mouse 0. 0.)
        ((#\mouse-1-1 :window-area-from
          "hold to select the screen area to fill the window"))
        nil)))

(DEFCONST *no-entity-pick-error*
          "No Machine is within picking distance of the indicated point")

(DEFCONST *no-operation-pick-error*
          "No Operation is within picking distance of the indicated point")

(DEFCONST *no-object-pick-error*
          "No object is within picking distance of the indicated point")

(DEFCONST *normal-mark-font*            gwin:medfnt-font)

(defvar   *old-window*                  :unbound)

(DEFCONST *page-overlap*                50.)

(DEFCONST *side-list*                   '(:bottom :left :right :top))

(DEFCONST *slot-x-spacing*              (+ (* *machine-picture-normal-width* 3) 40.))

(DEFCONST *slot-y-spacing*              40)

(DEFCONST *starting-slot-x*             150.)

(DEFCONST *starting-slot-y*             300.)

(DEFCONST *status-items-x-offset*       10.)

(DEFCONST *status-items-x-spacing*      330.)

(DEFCONST *status-items-y-offset*       120.)

(DEFCONST *status-update-time*          100.)

(DEFCONST *typein-window*               (tv:make-window
                                          'tv:pop-up-text-window
                                          ':borders             5.
                                          ':border-margin-width 10.
                                          ':font-map            '(,fonts:tr12b
                                                                  ,fonts:tr12bi)
                                          ':more-p              nil))
(DEFVAR *display-list*                  nil)

(DEFVAR *reset-on-errors?*              nil)    ;set to t for demos -- nil for debug

(defvar pfd-window)
```

```
EEEEEEEEEE    2222222222222222222222222222222222222222222222222222222222222222222222222222222222222222222222222222    EEEEEEEEEE
EEEEEEEEEE    2222222222222222222222  THIS INFORMATION IS THE PROPERTY OF TEXAS INSTRUMENTS  2222222222222222222222    EEEEEEEEEE
EEEEEEEEEE    2222222222222222222222222222222222222222222222222222222222222222222222222222222222222222222222222222    EEEEEEEEEE

                              RRRR    000    AAA   RRRR   K   K
                              R   R  0   0  A   A  R   R  K  K
                              R   R  0   0  A   A  R   R  K K
                              RRRR   0   0  A   A  RRRR   KKK
                              R R    0   0  AAAAA  R R    K  K
                              R  R   0   0  A   A  R  R   K   K
                              R   R   000   A   A  R   R  K   K

PPPPPPPP    FFFFFFFFFF  DDDDDDDD                FFFFFFFFFF  LL            AAAAAA    VV        VV    000000    RRRRRRRR
PPPPPPPP    FFFFFFFFFF  DDDDDDDD                FFFFFFFFFF  LL            AAAAAA    VV        VV    000000    RRRRRRRR
PP      PP  FF          DD      DD              FF          LL          AA      AA  VV        VV  00      00  RR      RR
PP      PP  FF          DD      DD              FF          LL          AA      AA  VV        VV  00      00  RR      RR
PP      PP  FF          DD      DD              FF          LL          AA      AA  VV        VV  00      00  RR      RR
PP      PP  FF          DD      DD              FF          LL          AA      AA  VV        VV  00      00  RR      RR
PPPPPPPP    FFFFFFFF    DD      DD              FFFFFFFF    LL          AA      AA  VV        VV  00      00  RRRRRRRR
PPPPPPPP    FFFFFFFF    DD      DD              FFFFFFFF    LL          AA      AA  VV        VV  00      00  RRRRRRRR
PP          FF          DD      DD              FF          LL          AAAAAAAAAA  VV        VV  00      00  RR  RR
PP          FF          DD      DD              FF          LL          AAAAAAAAAA  VV        VV  00      00  RR  RR
PP          FF          DD      DD              FF          LL          AA      AA    VV    VV    00      00  RR    RR
PP          FF          DD      DD              FF          LL          AA      AA    VV    VV    00      00  RR    RR
PP          FF          DDDDDDDD    __________  FF          LLLLLLLLLL  AA      AA      VV        000000    RR      RR
PP          FF          DDDDDDDD    __________  FF          LLLLLLLLLL  AA      AA      VV        000000    RR      RR

                      LL            IIIIII      SSSSSSSS  PPPPPPPP          ;;;;        11
                      LL            IIIIII      SSSSSSSS  PPPPPPPP          ;;;;        11
                      LL              II      SS          PP      PP        ;;;;      1111
                      LL              II      SS          PP      PP        ;;;;      1111
                      LL              II      SS          PP      PP                    11
                      LL              II      SS          PP      PP                    11
                      LL              II        SSSSSS    PPPPPPPP          ;;;;        11
                      LL              II        SSSSSS    PPPPPPPP          ;;;;        11
                      LL              II              SS  PP                ;;;;        11
                      LL              II              SS  PP                ;;;;        11
              ....    LL              II              SS  PP                  ;;        11
              ....    LL              II              SS  PP                  ;;        11
              ....    LLLLLLLLLL    IIIIII      SSSSSSSS  PP                ;;        111111
              ....    LLLLLLLLLL    IIIIII      SSSSSSSS  PP                ;;        111111
```

File $3$DUA27:[ROARK.JUL]PFD_FLAVOR.LISP;1 (26707,23,0), last revised on 15-JUL-1986 14:42, is a 3 block sequential file owned by UIC [IIIS,ROARK]. The records are variable length with implied (CR) carriage control. The longest record is 78 bytes.

Job PFD_FLAVOR (210) queued to NB_TALARIS_1 on 15-JUL-1986 17:46 by user ROARK, UIC [IIIS,ROARK], under account KBS at priority 100, started on printer LCA0 on 15-JUL-1986 17:46 from queue NB_TALARIS_1.

```
EEEEEEEEEE    2222222222222222222222222222222222222222222222222222222222222222222222222222222222222222222222222222    EEEEEEEEEE
EEEEEEEEEE    2222222222222222222222  Digital Equipment Corporation - VAX/VMS Version V4.4  2222222222222222222222    EEEEEEEEEE
EEEEEEEEEE    2222222222222222222222222222222222222222222222222222222222222222222222222222222222222222222222222222    EEEEEEEEEE
```

```lisp
;1; -*- Mode: LISP; Package: DME; Base: 10.; Fonts: MEDFNT,HL12B,HL12BI -*-*

(defflavor DATA-MODEL-EDITOR
           ((allowed-pick-types        nil)
            (current-mode              'window-area-mode)
            (cursor                    nil)
            (g-pane                    nil)
            (mouse-commands            nil)
            (process-array             nil)
            (selected-entities         nil)
            (selected-points           nil)
            ;1; A process.*
            (simulator
              (process-run-function '(:name "DMOS Simulator" :priority -1)
                                    ;1; Function that it runs.*
                                    #'dme-run-dmos
                                    ;1; First argument of function.*
                                    self))
            (status-items              nil)
            (tracker                   nil)
            (world                     nil))
           (tv:inferiors-not-in-select-menu-mixin
            tv:process-mixin
            tv:select-mixin
            tv:bordered-constraint-frame-with-shared-io-buffer
            tv:label-mixin
            tv:stream-mixin)
 (:default-init-plist :borders          3.
   :constraints        '((graphics-only
                           (g-pane)
                           ((g-pane :even))))
   :expose-p   t
   :minimum-height     300.
   :minimum-width      300.
   :name               "Process Display"
   :panes              '((g-pane graphics-pane))
   :process            '(command-loop :regular-pdl-size 5000. :special-pdl-size 5000.)
   :save-bits  t)
 :gettable-instance-variables
 :initable-instance-variables
 :settable-instance-variables
)
```

```
FFFFFFFFFF    33333333333333333333333333333333333333333333333333333333333333333333333333333333333333333333333333333    FFFFFFFFFF
FFFFFFFFFF    3333333333333333333333333  THIS INFORMATION IS THE PROPERTY OF TEXAS INSTRUMENTS  3333333333333333333333333    FFFFFFFFFF
FFFFFFFFFF    33333333333333333333333333333333333333333333333333333333333333333333333333333333333333333333333333333    FFFFFFFFFF

                              RRRR    000    AAA   RRRR   K   K
                              R   R  0   0  A   A  R   R  K  K
                              R   R  0   0  A   A  R   R  K K
                              RRRR   0   0  A   A  RRRR   KKK
                              R R    0   0  AAAAA  R R    K  K
                              R  R   0   0  A   A  R  R   K   K
                              R   R   000   A   A  R   R  K   K

PPPPPPPP   FFFFFFFFFF  DDDDDDDD               PPPPPPPP    AAAAAA   NN      NN  EEEEEEEEEE   SSSSSSSS
PPPPPPPP   FFFFFFFFFF  DDDDDDDD               PPPPPPPP    AAAAAA   NN      NN  EEEEEEEEEE   SSSSSSSS
PP      PP FF          DD      DD             PP      PP AA      AA NN      NN  EE          SS
PP      PP FF          DD      DD             PP      PP AA      AA NN      NN  EE          SS
PP      PP FF          DD      DD             PP      PP AA      AA NNNN    NN  EE          SS
PP      PP FF          DD      DD             PP      PP AA      AA NNNN    NN  EE          SS
PPPPPPPP   FFFFFFFF    DD      DD             PPPPPPPP   AA      AA NN  NN  NN  EEEEEEEE     SSSSSS
PPPPPPPP   FFFFFFFF    DD      DD             PPPPPPPP   AA      AA NN  NN  NN  EEEEEEEE     SSSSSS
PP         FF          DD      DD             PP         AAAAAAAAAA NN    NNNN  EE                 SS
PP         FF          DD      DD             PP         AAAAAAAAAA NN    NNNN  EE                 SS
PP         FF          DD      DD             PP         AA      AA NN      NN  EE                 SS
PP         FF          DD      DD             PP         AA      AA NN      NN  EE                 SS
PP         FF          DDDDDDDD   __________  PP         AA      AA NN      NN  EEEEEEEEEE SSSSSSSS
PP         FF          DDDDDDDD   __________  PP         AA      AA NN      NN  EEEEEEEEEE SSSSSSSS

                  LL          IIIIII     SSSSSSSS  PPPPPPPP      ;;;;       11
                  LL          IIIIII     SSSSSSSS  PPPPPPPP      ;;;;       11
                  LL            II     SS          PP      PP    ;;;;     1111
                  LL            II     SS          PP      PP    ;;;;     1111
                  LL            II     SS          PP      PP                11
                  LL            II     SS          PP      PP                11
                  LL            II       SSSSSS    PPPPPPPP      ;;;;        11
                  LL            II       SSSSSS    PPPPPPPP      ;;;;        11
                  LL            II             SS  PP            ;;;;        11
                  LL            II             SS  PP            ;;;;        11
             .... LL            II             SS  PP              ;;        11
             .... LL            II             SS  PP              ;;        11
             .... LLLLLLLLLL  IIIIII   SSSSSSSS    PP            ;;       111111
             .... LLLLLLLLLL  IIIIII   SSSSSSSS    PP            ;;       111111
```

File $3$DUA27:[ROARK.JUL]PFD_PANES.LISP;1 (26708,22,0), last revised on 15-JUL-1986 14:42, is a 2 block sequential file owned by UIC [IIIS,ROARK]. The records are variable length with implied (CR) carriage control. The longest record is 81 bytes.

Job PFD_PANES (211) queued to NB_TALARIS_1 on 15-JUL-1986 17:46 by user ROARK, UIC [IIIS,ROARK], under account KBS at priority 100, started on printer LCA0 on 15-JUL-1986 17:46 from queue NB_TALARIS_1.

```
FFFFFFFFFF    33333333333333333333333333333333333333333333333333333333333333333333333333333333333333333333333333333    FFFFFFFFFF
FFFFFFFFFF    3333333333333333333333333  Digital Equipment Corporation - VAX/VMS Version V4.4  3333333333333333333333333    FFFFFFFFFF
FFFFFFFFFF    33333333333333333333333333333333333333333333333333333333333333333333333333333333333333333333333333333    FFFFFFFFFF
```

```
;1; -*- Mode: LISP; Package: DME; Base: 10.; Fonts: MEDFNT,HL12B,HL12BI -*-*

(defflavor GRAPHICS-pane ()
           (gwin:graphics-window-pane)
  :gettable-instance-variables
  :initable-instance-variables
  :settable-instance-variables
  (:default-init-plist :grid-x    20.
                       :grid-y    15.
                       :save-bits t)
  (:documentation :combination
   "2The graphics pane for the data model editor.  It has a save bit array.*"))


(DEFMETHOD (graphics-pane :after :refresh) (&optional (type :complete-redisplay))
  type
  (WHEN gwin:grid-on
    (SEND SELF :draw-grid gwin:grid-x gwin:grid-y))
  (LET ((previous-x nil)
        (previous-y nil)
        x y)
    (DOLIST (xy (SEND tv:superior :selected-points))
      (SETQ x (FIRST xy)
            y (SECOND xy))
      (WHEN (AND previous-x previous-y)
        (SEND SELF :draw-line previous-x previous-y x y 0. gwin:black tv:alu-xor))
      (SETQ previous-x x
            previous-y y))))


(COMPILE-FLAVOR-METHODS graphics-pane)
```

```
WWWWWWWWWW   2222222222222222222222222222222222222222222222222222222222222222222222222222222222222222222222222   WWWWWWWWWW
WWWWWWWWWW   22222222222222222222222  THIS INFORMATION IS THE PROPERTY OF TEXAS INSTRUMENTS  22222222222222222222222   WWWWWWWWWW
WWWWWWWWWW   2222222222222222222222222222222222222222222222222222222222222222222222222222222222222222222222222   WWWWWWWWWW

                                   RRRR    000    AAA   RRRR   K   K
                                   R   R  0   0  A   A  R   R  K  K
                                   R   R  0   0  A   A  R   R  K K
                                   RRRR   0   0  A   A  RRRR   KKK
                                   R R    0   0  AAAAA  R R    K  K
                                   R  R   0   0  A   A  R  R   K   K
                                   R   R   000   A   A  R   R  K    K

DDDDDDDD      AAAAAA   TTTTTTTTTT    AAAAAA               IIIIII   TTTTTTTTTT  EEEEEEEEEE  MM       MM
DDDDDDDD      AAAAAA   TTTTTTTTTT    AAAAAA               IIIIII   TTTTTTTTTT  EEEEEEEEEE  MM       MM
DD      DD  AA      AA     TT      AA      AA               II         TT      EE          MMMM   MMMM
DD      DD  AA      AA     TT      AA      AA               II         TT      EE          MMMM   MMMM
DD      DD  AA      AA     TT      AA      AA               II         TT      EE          MM  MM   MM
DD      DD  AA      AA     TT      AA      AA               II         TT      EE          MM  MM   MM
DD      DD  AA      AA     TT      AA      AA               II         TT      EEEEEEEE    MM       MM
DD      DD  AA      AA     TT      AA      AA               II         TT      EEEEEEEE    MM       MM
DD      DD  AAAAAAAAAA     TT      AAAAAAAAAA               II         TT      EE          MM       MM
DD      DD  AAAAAAAAAA     TT      AAAAAAAAAA               II         TT      EE          MM       MM
DD      DD  AA      AA     TT      AA      AA               II         TT      EE          MM       MM
DD      DD  AA      AA     TT      AA      AA               II         TT      EE          MM       MM
DDDDDDDD    AA      AA     TT      AA      AA  __________ IIIIII       TT      EEEEEEEEEE  MM       MM
DDDDDDDD    AA      AA     TT      AA      AA  __________ IIIIII       TT      EEEEEEEEEE  MM       MM

                        LL          IIIIII    SSSSSSSS  PPPPPPPP      ;;;;      11
                        LL          IIIIII    SSSSSSSS  PPPPPPPP      ;;;;      11
                        LL            II    SS          PP      PP    ;;;;    1111
                        LL            II    SS          PP      PP    ;;;;    1111
                        LL            II    SS          PP      PP              11
                        LL            II    SS          PP      PP              11
                        LL            II      SSSSSS    PPPPPPPP      ;;;;      11
                        LL            II      SSSSSS    PPPPPPPP      ;;;;      11
                        LL            II            SS  PP            ;;;;      11
                        LL            II            SS  PP            ;;;;      11
                  ....  LL            II            SS  PP              ;;      11
                  ....  LL            II            SS  PP              ;;      11
                  ....  LLLLLLLLLL  IIIIII    SSSSSSSS  PP            ;;      111111
                  ....  LLLLLLLLLL  IIIIII    SSSSSSSS  PP            ;;      111111
```

File $3$DUA27:[ROARK.JUL]DATA_ITEM.LISP;1 (26716,9,0), last revised on 15-JUL-1986 13:54, is a 21 block sequential file owned by UIC [IIIS,ROARK]. The records are variable length with implied (CR) carriage control. The longest record is 121 bytes.

Job DATA_ITEM (2005) queued to NB_TALARIS_1 on 16-JUL-1986 14:07 by user ROARK, UIC [IIIS,ROARK], under account KBS at priority 100, started on printer LCA0 on 16-JUL-1986 14:07 from queue NB_TALARIS_1.

```
WWWWWWWWWW   2222222222222222222222222222222222222222222222222222222222222222222222222222222222222222222222222   WWWWWWWWWW
WWWWWWWWWW   22222222222222222222222  Digital Equipment Corporation - VAX/VMS Version V4.4  22222222222222222222222   WWWWWWWWWW
WWWWWWWWWW   2222222222222222222222222222222222222222222222222222222222222222222222222222222222222222222222222   WWWWWWWWWW
```

```
;;;-*- Mode:LISP; Package:DME; Base:10.; Fonts:MEDFNT,HL12B,HL12BI -*-

;1;*
;1; This is the flavor definiton of the machine-picture object.  This is built from the GWIN:TEXT object and is thus a*
;1; standard graphics object as defined by the GWIN system.*
;1;*
(DEFFLAVOR machine-picture ((height          0.)
                            (links-in       nil)
                            (links-out      nil)
                            (machine        0.)
                            (scale          1.)
                            (text-string    "")
                            (width          0.)
                            (x-start        0.)
                            (y-start        0.)
                            set-to x-end y-end)
           (gwin:basic-graphics-mixin)
  :gettable-instance-variables
  :initable-instance-variables
  :settable-instance-variables)


(DEFMETHOD (machine-picture :color) ()
  *machine-picture-border-color*)


(DEFMETHOD (machine-picture :distance) (from-x from-y)
  "2This calculates the minimum distance from a point to the machine-picture entity.
If the specified point is in the interior of the machine-picture area, then the returned distance is
negative and the absolute value of the returned value is the distance to the edge of the
machine-picture area.*"
  (DECLARE (RETURN-LIST signed-distance))
  (SETQ gwin:nearest-x from-x
        gwin:nearest-y from-y)
  (gwin:dist-from-rectangle from-x from-y x-start y-start (+ x-start width) (+ y-start height) t))


(DEFMETHOD (machine-picture :draw) (window)
  "2This draws the entire machine-picture entity.  It draws both the background and the text.*"
  (DECLARE (RETURN-LIST text-x-end text-y-end))
  (SEND window :draw-filled-rectangle
        gwin:x-min gwin:y-min (- gwin:x-max gwin:x-min) (- gwin:y-max gwin:y-min)
        (SEND SELF :fill-color) *machine-picture-alu*)
  (LET* ((weight          (SEND SELF :weight))
         (half-thickness (// (FLOAT weight) 2.)))
    (SEND window :draw-rect
          (+ gwin:x-min half-thickness) (+ gwin:y-min half-thickness)
          (- gwin:x-max gwin:x-min weight) (- gwin:y-max gwin:y-min weight)
          weight *machine-picture-border-color* *machine-picture-alu*))
  (MULTIPLE-VALUE (x-end y-end)
    (SEND window :draw-string-centered
          (SEND SELF :font) text-string
          (// (FLOAT (+ gwin:x-min gwin:x-max)) 2.) (// (FLOAT (+ gwin:y-min gwin:y-max)) 2.)
          *machine-picture-text-color* *machine-picture-tab-width* scale *machine-picture-alu*)))
```

```
(DEFMETHOD (machine-picture :edge-point) (window &optional transform)
  "2This returns a convenient point on the edge of the machine-picture for highlighting.
The point that is used is the midpoint of the outside edge of the right side of the machine-picture
rectangle*. 2If that is outside the window, the closest point on the machine-picture to the* 2mouse is
used instead.*"
  (DECLARE (RETURN-LIST edge-point-x edge-point-y))
  (LET ((x-point (+ x-start width))
        (y-point (+  y-start (// (FLOAT height) 2.)))
        (lft     x-start)
        (tp      y-start))
    (WHEN transform
      (MULTIPLE-VALUE (x-point y-point) (gwin:transform-point x-point y-point transform)))
    (WHEN (gwin:off-window x-point y-point window)
      (WHEN transform
        (MULTIPLE-VALUE (lft tp) (gwin:transform-point lft tp transform)))
      (WHEN (AND gwin:nearest-x gwin:nearest-y)
        (MULTIPLE-VALUE (x-point y-point) (gwin:nearest-rectangle-pt gwin:nearest-x gwin:nearest-y
                                                                     (- y-point tp) lft tp (- x-point lft)))))
    (VALUES x-point y-point)))


(DEFMETHOD (machine-picture :edit-parameters) ()
  "2This displays a menu of the machine-picture parameters and allows editing of them.*"
  (DECLARE (RETURN-LIST parameters-edited?))
  (*CATCH 'abort
    (LET ((v1 x-start)
          (v2 y-start)
          (v6 text-string))
      (DECLARE (SPECIAL v1 v2 v3 v4 v5 v6))
      (tv:choose-variable-values
        '((v1 "Starting X Coordinate" :number)
          (v2 "Starting Y Coordinate" :number)
          (v6 "Item Text"             :string))
        :label          "Parameters for the MACHINE-PICTURE entity:"
        :margin-choices '("UPDATE" ("ABORT" (*THROW 'abort nil))))
      (SETQ x-start        v1
            y-start        v2
            text-string    v6))
    (SEND SELF :init nil)
    t))


(DEFMETHOD (machine-picture :edit-text) (wind cursor)
  (LET ((alu    *machine-picture-alu*)
        (color  *machine-picture-text-color*)
        (fill   (SEND SELF :fill-color))
        (font   (SEND SELF :font))
        (len    (ARRAY-LENGTH text-string))
        (margin (* *machine-picture-min-margin* 2.))
        (old    text-string)
        (tab    *machine-picture-tab-width*)
        (x      (+ x-start (// (FLOAT width)  2.)))
        (y      (+ y-start (// (FLOAT height) 2.)))
        dx dy)
```

```
    (MULTIPLE-VALUE (nil nil nil nil dx dy)
      (gwin:calculate-string-motion font text-string Ø. Ø. Ø. tab scale))
    (UNLESS (AND (ARRAY-HAS-LEADER-P text-string) (FILL-POINTER text-string))
      (SETQ text-string (MAKE-ARRAY 200. :type art-string :fill-pointer len))
      (COPY-ARRAY-PORTION old Ø. len text-string Ø. len))
    (SEND cursor :set-size       (* (SEND font :blinker-width) scale) (* (SEND font :blinker-height) scale))
    (SEND cursor :set-position   x-end y-end)
    (SEND cursor :set-visibility :blink)
    (UNWIND-PROTECT
        (DO ((char (SEND wind :tyi) (SEND wind :tyi)))
            ((OR (NULL char) (= char #\end))
             (ADJUST-ARRAY-SIZE text-string (FILL-POINTER text-string)))
          (WHEN (COND ((= char #\rubout)
                       (WHEN (PLUSP (FILL-POINTER text-string))
                         (DECF (FILL-POINTER text-string))
                         t))
                      ((NOT (ZEROP (LDB %%kbd-control-meta char)))
                       (SEND wind :beep)
                       nil)
                      (t (ARRAY-PUSH-EXTEND text-string char 100.)
                         t))
            (SEND wind :draw-filled-rectangle (- x (// (FLOAT dx) 2.)) (- y (// (FLOAT dy) 2.)) dx dy fill alu)
            (MULTIPLE-VALUE (x-end y-end)
              (SEND wind :draw-string-centered font text-string x y color tab scale alu))
            (SEND cursor :set-position x-end y-end)
            (MULTIPLE-VALUE (nil nil nil nil dx dy)
              (gwin:calculate-string-motion font text-string Ø. Ø. Ø. tab scale))
            (WHEN (< (- width margin) dx)
              (INCF x (// (FLOAT (- width  dx margin)) 2.))
              (SETQ width  (+ dx margin)))
            (WHEN (< (- height margin) dy)
              (INCF y (// (FLOAT (- height dy margin)) 2.))
              (SETQ height (+ dy margin)))))
      (SEND cursor :set-visibility nil)))
  (SEND SELF :init nil))


(DEFMETHOD (machine-picture :fasd-form) ()
  "2This returns a form which will recreate this machine-picture object when evaluated.
This is the generic message that is sent to an object when it is being written
in compiled form to a file.*"
  (DECLARE (RETURN-LIST create-form))
  (SETQ set-to (GENTEMP))
  '(PROG1
     ;1;*
     ;1; Links get set by the process-as-link fasd-form.*
     ;1;*
     (SETQ ,set-to (MAKE-INSTANCE ',(TYPEP self)
                                  :height       ',height
                                  :scale        ',scale
                                  :text-string  ',text-string
                                  :width        ',width
                                  :x-start      ',x-start
                                  :y-start      ',y-start))
     (SEND ,set-to :set-property-list ',(SEND SELF :property-list))))
```

```
(DEFMETHOD (machine-picture :fill-color) ()
  1)     .*

(DEFMETHOD (machine-picture :font) ()
  (declare (special gwin:hl12b-font))
  gwin:hl12b-font)

(DEFMETHOD (machine-picture :after :init) (ignore)
  "2This initializes all of the internal data for this machine-picture instance.*"
  (SETQ set-to nil)
  (MULTIPLE-VALUE (x-end y-end gwin:x-min gwin:y-min gwin:x-max gwin:y-max)
    (gwin:calculate-string-motion (SEND SELF :font) text-string Ø. Ø. Ø. *machine-picture-tab-width* scale))
  (LET ((dx (+ (- gwin:x-max gwin:x-min) (* *machine-picture-min-margin* 2.)))
        (dy (+ (- gwin:y-max gwin:y-min) (* *machine-picture-min-margin* 2.))))
    (SETQ height      (MAX dy height *machine-picture-normal-height*)
          width       (MAX dx width  *machine-picture-normal-width*)
          x-end       (+ x-start (// (FLOAT width)  2.))
          y-end       (+ y-start (// (FLOAT height) 2.))
          gwin:x-min x-start
          gwin:y-min y-start
          gwin:x-max (+ x-start width)
          gwin:y-max (+ y-start height))))

(DEFMETHOD (machine-picture :move) (dx dy)
  "2This moves this machine-picture object the specified distances in the x and y directions.*"
  (INCF x-end   dx)
  (INCF x-start dx)
  (INCF y-end   dy)
  (INCF y-start dy))

(DEFMETHOD (machine-picture :nearest-side) (x y)
  (LET* ((bottom (+ y-start height))
         (right  (+ x-start width))
         (db     (ABS (- bottom  y)))
         (dl     (ABS (- x-start x)))
         (dr     (ABS (- right   x)))
         (dt     (ABS (- y-start y))))
    (SELECTQ (gwin:sector-code x y x-start y-start right bottom)
      (Ø.   (SELECTOR (MIN db dl dr dt) =
              (db (VALUES :bottom (- x x-start)))
              (dl (VALUES :left   (- y y-start)))
              (dr (VALUES :right  (- y y-start)))
              (dt (VALUES :top    (- x x-start)))))
      (1.   (VALUES :left   (- y y-start)))
      (2.   (VALUES :right  (- y y-start)))
      (4.   (VALUES :bottom (- x x-start)))
      (8.   (VALUES :top    (- x x-start)))
      (5.   (SELECTOR (MIN db dl) =
              (db (VALUES :left   height))
              (dl (VALUES :bottom Ø.))))
```

```
      (8.  (SELECTOR (MIN db dr) =
             (db (VALUES :right  height))
             (dr (VALUES :bottom width))))
      (9.  (SELECTOR (MIN dl dt) =
             (dl (VALUES :top  0.))
             (dt (VALUES :left 0.))))
      (10. (SELECTOR (MIN dr dt) =
             (dr (VALUES :top   width))
             (dt (VALUES :right 0.)))))))


(DEFMETHOD (machine-picture :scale) (sx &optional (sy sx) (scale-thickness? t))
  "2This scales this machine-picture object by the specified x and y factors.*"
  scale-thickness?
  (SETQ scale (// (FLOAT scale) sx))
  (gwin:scalef height  sy)
  (gwin:scalef width   sx)
  (gwin:scalef x-end   sx)
  (gwin:scalef x-start sx)
  (gwin:scalef y-end   sy)
  (gwin:scalef y-start sy))


(DEFMETHOD (machine-picture :undraw) (window)
  "2This erases the entire machine-picture entity.  It erases both the interior and the edge.
This does not really do the correct thing all of the time, since we do not know
what lies underneath of this object.  All we do is draw the machine-picture in white to make
it look like the rest of the background area.*"
  (SEND window :draw-filled-rectangle
        gwin:x-min gwin:y-min (- gwin:x-max gwin:x-min) (- gwin:y-max gwin:y-min) gwin:black tv:alu-andca))


(DEFMETHOD (machine-picture :weight) ()
  (* scale 2))


(COMPILE-FLAVOR-METHODS machine-picture)
```

```
QQQQQQQQQQ     5555555555555555555555555555555555555555555555555555555555555555555555555555555555555555555555555555555
QQQQQQQQQQ     55555555555555555555555  THIS INFORMATION IS THE PROPERTY OF TEXAS INSTRUMENTS  555555555555555555555555     QQQQQQQQQQ
QQQQQQQQQQ     5555555555555555555555555555555555555555555555555555555555555555555555555555555555555555555555555555555     QQQQQQQQQQ
                                                                                                                            QQQQQQQQQQ
```

ROARK

DATA_ITEM_COMMANDS

..LISP;1

File _$3$DUA27:[ROARK.JUL]DATA_ITEM_COMMANDS.LISP;1 (26722,27,0), last revised on 16-JUL-1986 13:54, is a 3 block sequential file owned by UIC [IIIS,ROARK]. The records are variable length with implied (CR) carriage control. The longest record is 79 bytes.

Job DATA_ITEM_COMMANDS (2009) queued to NB_TALARIS on 16-JUL-1986 14:14 by user ROARK, UIC [IIIS,ROARK], under account KBS at priority 100, started on printer LCB0 on 16-JUL-1986 14:14 from queue NB_TALARIS.

```
QQQQQQQQQQ     5555555555555555555555555555555555555555555555555555555555555555555555555555555555555555555555555555555
QQQQQQQQQQ     55555555555555555555555  Digital Equipment Corporation - VAX/VMS Version V4.4  555555555555555555555555     QQQQQQQQQQ
QQQQQQQQQQ     5555555555555555555555555555555555555555555555555555555555555555555555555555555555555555555555555555555     QQQQQQQQQQ
                                                                                                                            QQQQQQQQQQ
```

```
;;;-*- Mode: LISP; Package: DME; Base: 10.; Fonts: MEDFNT,HL12B,HL12BI  -*-

(DEFMETHOD (data-model-editor :data-item-mode) ()
  (SEND SELF ':change-modes 'data-item-mode))


(DEFMETHOD (data-model-editor :data-item-insert) (x y)
  (SEND SELF ':unselect-all)
  (SEND SELF ':add-to-undo-ring "CREATE ENTITY TYPE")
  (LET ((display-list      (SEND world ':display-list))
        (new-data-item     (MAKE-INSTANCE 'data-item
                                          ':level-of-detail level-of-detail
                                          ':x-start         x
                                          ':y-start         y))
        (objects-in-window (SEND world ':objects-in-window)))
    (SEND world ':set-display-list      (CONS new-data-item display-list))
    (SEND world ':set-objects-in-window (CONS new-data-item objects-in-window))
    (SEND new-data-item ':draw g-pane)
    (SEND new-data-item ':edit-text g-pane cursor)
    (SEND new-data-item ':draw g-pane)))


(DEFMETHOD (data-model-editor :edit-data-item) (x y)
  (LET ((data-item (SEND world ':pick-typed x y allowed-pick-types))
        new-data-item)
    (COND (data-item
            (SEND SELF ':unselect-all)
            (SEND SELF ':add-to-undo-ring "EDIT ENTITY TYPE")
            (SETQ new-data-item (SEND data-item ':copy))
            (SEND new-data-item ':edit-text g-pane cursor)
            (SEND SELF ':replace-items
                       (LIST data-item) (LIST new-data-item) ':items-only))
          (t (SEND SELF ':barf *no-entity-pick-error*)))))
```

```
0000000000   000000000000000000000000000000000000000000000000000000000000000000000000000000000000000000000000   0000000000
0000000000   0000000000000000000000000  THIS INFORMATION IS THE PROPERTY OF TEXAS INSTRUMENTS  0000000000000000000000000   0000000000
0000000000   000000000000000000000000000000000000000000000000000000000000000000000000000000000000000000000000   0000000000

                         RRRR    000    AAA   RRRR   K   K
                         R   R  0   0  A   A  R   R  K  K
                         R   R  0   0  A   A  R   R  K K
                         RRRR   0   0  A   A  RRRR   KKK
                         R R    0   0  AAAAA  R R    K K
                         R  R   0   0  A   A  R  R   K  K
                         R   R   000   A   A  R   R  K   K

                   LL            IIIIII    NN      NN  KK      KK
                   LL            IIIIII    NN      NN  KK      KK
                   LL              II      NN      NN  KK      KK
                   LL              II      NN      NN  KK      KK
                   LL              II      NNNN    NN  KK    KK
                   LL              II      NNNN    NN  KK    KK
                   LL              II      NN  NN  NN  KKKKKK
                   LL              II      NN  NN  NN  KKKKKK
                   LL              II      NN    NNNN  KK    KK
                   LL              II      NN    NNNN  KK    KK
                   LL              II      NN      NN  KK      KK
                   LL              II      NN      NN  KK      KK
                   LLLLLLLLLL    IIIIII    NN      NN  KK      KK
                   LLLLLLLLLL    IIIIII    NN      NN  KK      KK

             LL            IIIIII      SSSSSSSS  PPPPPPPP      ;;;;      11
             LL            IIIIII      SSSSSSSS  PPPPPPPP      ;;;;      11
             LL              II      SS          PP      PP    ;;;;    1111
             LL              II      SS          PP      PP    ;;;;    1111
             LL              II      SS          PP      PP              11
             LL              II      SS          PP      PP              11
             LL              II        SSSSSS    PPPPPPPP      ;;;;      11
             LL              II        SSSSSS    PPPPPPPP      ;;;;      11
             LL              II              SS  PP            ;;;;      11
             LL              II              SS  PP            ;;;;      11
   ....      LL              II              SS  PP              ;;      11
   ....      LL              II              SS  PP              ;;      11
   ....      LLLLLLLLLL    IIIIII    SSSSSSSS    PP            ;;      111111
   ....      LLLLLLLLLL    IIIIII    SSSSSSSS    PP            ;;      111111
```

File _$3$DUA27:[ROARK.JUL]LINK.LISP;1 (4307,75,0), last revised on 15-JUL-1986 14:41, is a 20 block sequential file owned by UIC [IIIS,ROARK]. The records are variable length with implied (CR) carriage control. The longest record is 114 bytes.

Job LINK (24) queued to NB_TALARIS_1 on 15-JUL-1986 14:48 by user ROARK, UIC [IIIS,ROARK], under account KBS at priority 100, started on printer LCA0 on 15-JUL-1986 14:48 from queue NB_TALARIS_1.

```
0000000000   000000000000000000000000000000000000000000000000000000000000000000000000000000000000000000000000   0000000000
0000000000   0000000000000000000000000  Digital Equipment Corporation - VAX/VMS Version V4.4  0000000000000000000000000   0000000000
0000000000   000000000000000000000000000000000000000000000000000000000000000000000000000000000000000000000000   0000000000
```

```
;;;-*- Mode:LISP; Package:DME; Base:10.; Fonts:MEDFNT,HL12B,HL12BI -*-

;1;*
;1; This is the flavor definiton of the link object.  This is built to be a standard graphics object as defined*
;1; by the GWIN system.*
;1;*
(defflavor PROCESS-AS-LINK ((from-delta         0)
                  (from-object          nil)
                  (from-side            (THIRD *side-list*))
                  (from-text            "")
                  (n                    0)
                  (operation            nil)
                  (scale                1)
                  (thickness            *link-default-weight*)
                  (to-delta             0)
                  (to-object            nil)
                  (to-side              (SECOND *side-list*))
                  (to-text              "")
                  (turns-x              nil)
                  (turns-y              nil)
                  from-text-max-x from-text-max-y
                  from-text-min-x from-text-min-y
                  from-text-x     from-text-y
                  from-text-x-end from-text-y-end
                  lengths-squared
                  num-points
                  set-to
                  to-text-max-x   to-text-max-y
                  to-text-min-x   to-text-min-y
                  to-text-x       to-text-y
                  to-text-x-end   to-text-y-end
                  x-deltas        y-deltas
                  x-points        y-points)
           (gwin:basic-graphics-mixin)
  :gettable-instance-variables
  :initable-instance-variables
  :settable-instance-variables)


(defmethod (process-as-link :CALCULATE-TEXT-LOCATION)
           (from-x from-y to-x to-y text &optional (horiz-delta 0) (vert-delta 0))
  (declare (return-list text-x text-y))
  (let ((direction (direction from-x from-y to-x to-y))
        width height)
    (multiple-value (nil nil nil nil width height)
      (gwin:calculate-string-motion *link-default-font* text 0. 0. 0. *link-tab-width* scale))
    (selectq direction
      (:bottom (values (- from-x width  *link-text-offset* vert-delta)
                       (+ from-y        *link-text-offset*)))
      (:left   (values (- from-x width  *link-text-offset* horiz-delta)
                       (+ from-y        *link-text-offset*)))
      (:right  (values (+ from-x        *link-text-offset* horiz-delta)
                       (- from-y height *link-text-offset*)))
      (:top    (values (+ from-x        *link-text-offset* vert-delta)
                       (- from-y height *link-text-offset*))))))
```

```
(defmethod (process-as-link :DISTANCE) (x y)
  "2This calculates the minimum distance from a specified point to the link edge.
If the specified point is in the interior of the link, then the returned distance
is negative and the absolute value of the returned values is the distance to the
edge of the link.*"
  (declare (return-list signed-distance))
  (min (gwin:dist-from-rectangle x y from-text-min-x from-text-min-y from-text-max-x from-text-max-y t)
       (gwin:dist-from-rectangle x y to-text-min-x to-text-min-y to-text-max-x to-text-max-y t)
       (- (gwin:dist-from-polyline x y x-points y-points x-deltas y-deltas lengths-squared num-points)
          (// (float (send self :weight)) 2.))))


(defmethod (process-as-link :DRAW) (window)
  "2This draws the entire link entity.  It draws both the lines and the text.*"
  (let ((color  *link-line-color*)
        (font   *link-default-font*)
        (weight (send self :weight))
        (x-to   (aref x-points (1- num-points)))
        (y-to   (aref y-points (1- num-points))))
    (send window :draw-polyline x-points y-points weight color num-points *link-line-alu*)
    (send window :draw-arrow-head x-to y-to to-side weight color scale *link-line-alu*)
    (when (and from-text (plusp (string-length from-text)))
      (multiple-value (from-text-x-end from-text-y-end)
        (send window :draw-string
              font from-text from-text-x from-text-y color from-text-x *link-tab-width* scale
              *link-text-alu*)))
    (when (and to-text (plusp (string-length to-text)))
      (multiple-value (to-text-x-end to-text-y-end)
        (send window :draw-string
              font to-text to-text-x to-text-y color to-text-x *link-tab-width* scale
              *link-text-alu*)))))


(defmethod (process-as-link :EDGE-POINT) (window &optional transform)
  "2This returns a convenient point on the edge of the link for highlighting.
The point that is used is the midpoint of the outside first side of the link.*"
  (declare (return-list edge-point-x edge-point-y))
  (do ((i 1. (1+ i))
       (x (aref x-points 0.))
       (y (aref y-points 0.)))
      ((>= i num-points)
       (values x y))
    (setq x (// (float (+ (aref x-points (1- i)) (aref x-points i))) 2.)
          y (// (float (+ (aref y-points (1- i)) (aref y-points i))) 2.))
    (when transform
      (multiple-value (x y) (gwin:transform-point x y transform)))
    (when (not (gwin:off-window x y window))
      (return x y))))


(defmethod (process-as-link :FASD-FORM) ()
  "2This returns a form which will recreate this link object when evaluated.
This is the generic message that is sent to an object when it is being written
in compiled form to a file.*"
```

```
  (declare (return-list create-form))
  (setq set-to (gentemp))
  (let ((from (and from-object (send from-object :set-to)))
        (to   (and to-object   (send to-object   :set-to))))
    '(progl
       (setq ,set-to (make-instance ',(typep self)
                                    :from-delta  ',from-delta
                         ,          :from-object ,from
                                    :from-side   ',from-side
                                    :from-text   ',from-text
                                    :n           ',n
                                    :operation   ',operation
                                    :scale       ',scale
                                    :thickness   ',thickness
                                    :to-delta    ',to-delta
                                    :to-object   ,to
                                    :to-side     ',to-side
                                    :to-text     ',to-text
                                    :turns-x     ',turns-x
                                    :turns-y     ',turns-y))
       (send ,set-to :set-property-list ',(send self :property-list))
      ,@(and from '((send ,from :set-links-out (cons ,set-to (send ,from :links-out)))))
      ,@(and to   '((send ,to   :set-links-in  (cons ,set-to (send ,to   :links-in))))))))


(defmethod (process-as-link :AFTER :INIT) (ignore)
  "2This initializes all of the internal data for this link instance.*"
  (setq set-to nil)
  (unless from-side (setq from-side (third  *side-list*)))
  (unless to-side   (setq to-side   (second *side-list*)))
  (let ((x-list turns-x)
        (y-list turns-y))
    (when from-object
      (multiple-value-bind (x y) (calculate-connect-point from-object from-side from-delta
                                                          (car (last x-list)) (car (last y-list)) n)
        (multiple-value (x-list y-list) (calculate-path-points x y x-list y-list))))
    (when to-object
      (multiple-value-bind (x y) (calculate-connect-point to-object to-side to-delta
                                                          (car (last x-list)) (car (last y-list)))
        (multiple-value (x-list y-list) (calculate-path-points x-list y-list (reverse x) (reverse y)))))
    (setq num-points (min (length x-list) (length y-list)))
    (unless (> num-points 1.)
      (setq num-points 3.
            x-list     '(100. 100. 300.)
            y-list     '(100. 300. 300.)))
    (setq x-points        (fillarray (make-array num-points :type art-float) x-list)
          y-points        (fillarray (make-array num-points :type art-float) y-list)
          x-deltas        (make-array (1- num-points) :type art-float)
          y-deltas        (make-array (1- num-points) :type art-float)
          lengths-squared (make-array (1- num-points) :type art-float)))
 (do ((i   0. (1+ i))
      (i+1 1. (1+ i+1))
      dx dy)
     ((>= i+1 num-points))
```

```
(setq dx (- (aref x-points i+1) (aref x-points i))
      dy (- (aref y-points i+1) (aref y-points i)))
(aset dx x-deltas i)
(aset dy y-deltas i)
(aset (float (max (+ (* dx dx) (* dy dy)) 1.)) lengths-squared i))
(multiple-value (gwin:x-min gwin:y-min gwin:x-max gwin:y-max)
  (gwin:polyline-min-max x-points y-points (send self :weight) num-points))
(cond ((and from-text (plusp (string-length from-text)))
       (multiple-value (from-text-x from-text-y)
         (send self :calculate-text-location
                    (aref x-points 0.) (aref y-points 0.) (aref x-points 1.) (aref y-points 1.) from-text))
       (multiple-value (from-text-x-end from-text-y-end
                        from-text-min-x from-text-min-y
                        from-text-max-x from-text-max-y)
         (gwin:calculate-string-motion *link-default-font* from-text
                                       from-text-x from-text-y from-text-x *link-tab-width* scale)))
      (t (setq from-text-min-x gwin:x-min
               from-text-min-y gwin:y-min
               from-text-max-x gwin:x-min
               from-text-max-y gwin:y-min)))
(cond ((and to-text (plusp (string-length to-text)))
       (let* ((n-1 (1- num-points))
              (n-2 (1- n-1)))
         (multiple-value (to-text-x to-text-y)
           (send self :calculate-text-location
                      (aref x-points n-1) (aref y-points n-1)
                      (aref x-points n-2) (aref y-points n-2) to-text
                      gwin:*arrow-height* gwin:*arrow-width*)))
       (multiple-value (to-text-x-end to-text-y-end
                        to-text-min-x to-text-min-y
                        to-text-max-x to-text-max-y)
         (gwin:calculate-string-motion *link-defau   font* to-text
                                       to-text-x '   ext-y to-text-x *link-tab-width*   ale)))
      (t (setq to-text-min-x gwin:x-min
               to-text-min-y gwin:y-min
               to-text-max-x gwin:x-min
               to-text-max-y gwin:y-min)))
(setq gwin:x-min (min gwin:x-min from-text-min-x to-text-min-x)
      gwin:y-min (min gwin:y-min from-text-min-y to-text-min-y)
      gwin:x-max (max gwin:x-max from-text-max-x to-text-max-x)
      gwin:y-max (max gwin:y-max from-text-max-y to-text-max-y))
(let ((from-x (aref x-points 0.))
      (from-y (aref y-points 0.))
      (to-x   (aref x-points (1- num-points)))
      (to-y   (aref y-points (1- num-points))))
  (selectq from-side
    ((:bottom :top)
     (setq gwin:x-min (min gwin:x-min from-x)
           gwin:x-max (max gwin:x-max from-x)))
    ((:left :right)
     (setq gwin:y-min (min gwin:y-min from-y)
           gwin:y-max (max gwin:y-max from-y))))
  (selectq to-side
    ((:bottom :top)
```

```
        (setq gwin:x-min (min gwin:x-min to-x)
              gwin:x-max (max gwin:x-max to-x)))
       ((:left :right)
        (setq gwin:y-min (min gwin:y-min to-y)
              gwin:y-max (max gwin:y-max to-y))))))


(defmethod (process-as-link :AFTER :MOVE) (dx dy)
  (declare (special dx dy))
  (incf from-text-x dx)
  (incf from-text-y dy)
  (setq turns-x (mapcar #'(lambda (x) (+ x dx)) turns-x)
        turns-y (mapcar #'(lambda (y) (+ y dy)) turns-y))
  (send self :init nil))

          *
(defmethod (process-as-link :WEIGHT) ()
  (* (or thickness *link-default-weight*) scale)).


(compile-flavor-methods process-as-link)
```

```
AAAAAAAAAA    5555555555555555555555555555555555555555555555555555555555555555555555555555555555555555555555555555    AAAAAAAAAA
AAAAAAAAAA    5555555555555555555555  THIS INFORMATION IS THE PROPERTY OF TEXAS INSTRUMENTS  5555555555555555555555    AAAAAAAAAA
AAAAAAAAAA    5555555555555555555555555555555555555555555555555555555555555555555555555555555555555555555555555555    AAAAAAAAAA

                                  RRRR    000    AAA   RRRR   K   K
                                  R   R  0   0  A   A  R   R  K  K
                                  R   R  0   0  A   A  R   R  K K
                                  RRRR   0   0  A   A  RRRR   KKK
                                  R R    0   0  AAAAA  R R    K K
                                  R  R   0   0  A   A  R  R   K  K
                                  R   R   000   A   A  R   R  K   K

             L      III  N   N  K   K          CCCC   000   M   M  M - M   AAA   N   N  DDDD   SSSS
             L       I   N   N  K  K          C      0   0  MM MM  MM MM  A   A  N   N  D   D  S
             L       I   NN  N  K K           C      0   0  M M M  M M M  A   A  NN  N  D   D  S
             L       I   N N N  KKK           C      0   0  M   M  M   M  A   A  N N N  D   D   SSS
             L       I   N  NN  K K           C      0   0  M   M  M   M  AAAAA  N  NN  D   D      S
             L       I   N   N  K  K          C      0   0  M   M  M   M  A   A  N   N  D   D      S
             LLLLL  III  N   N  K   K  _____   CCCC   000   M   M  M   M  A   A  N   N  DDDD   SSSS

                                  L      III   SSSS  PPPP    ;;    1
                                  L       I   S      P   P   ;;   11
                                  L       I   S      P   P         1
                                  L       I    SSS   PPPP    ;;    1
                                  L       I       S  P       ;;    1
                               .. L       I       S  P        ;    1
                               .. LLLLL  III  SSSS   P        ;   111
```

File $3$DUA27:[ROARK.JUL]LINK_COMMANDS.LISP;1 (8333,90,0), last revised on 15-JUL-1986 14:41, is a 8 block sequential file owned by UIC [IIIS,ROARK]. The records are variable length with implied (CR) carriage control. The longest record is 79 bytes.

Job LINK_COMMANDS (25) queued to NB_TALARIS on 15-JUL-1986 14:48 by user ROARK, UIC [IIIS,ROARK], under account KBS at priority 100, started on printer LCB0 on 15-JUL-1986 14:48 from queue NB_TALARIS.

```
AAAAAAAAAA    5555555555555555555555555555555555555555555555555555555555555555555555555555555555555555555555555555    AAAAAAAAAA
AAAAAAAAAA    5555555555555555555555555  Digital Equipment Corporation - VAX/VMS Version V4.4  555555555555555555555555    AAAAAAAAAA
AAAAAAAAAA    5555555555555555555555555555555555555555555555555555555555555555555555555555555555555555555555555555    AAAAAAAAAA
```

```
;;;-*- Mode: LISP; Package: DME; Base: 10.; Fonts: MEDFNT,HL12B,HL12BI  -*-

(DEFMETHOD (data-model-editor :link-mode) ()
  (SEND SELF ':change-modes 'from-link-mode))


(DEFMETHOD (data-model-editor :link-from) (x y)
  (LET ((from-item (SEND world ':pick-typed x y allowed-pick-types)))
    (COND (from-item
           (SEND SELF ':change-modes 'to-link-mode)
           (MULTIPLE-VALUE-BIND (side delta) (SEND from-item ':nearest-side x y)
             (MULTIPLE-VALUE-BIND (x y) (calculate-connect-point from-item side delta)
               (SEND SELF ':select-orthogonal-point (FIRST  x) (FIRST  y))
               (SEND SELF ':select-orthogonal-point (SECOND x) (SECOND y)))
             (SETQ selected-entities (LIST (LIST from-item side delta)))))
          (t (SEND SELF ':barf *no-entity-pick-error*)))))


(DEFMETHOD (data-model-editor :link-to) (x y)
  (LET ((to-item (SEND world ':pick-typed x y allowed-pick-types)))
    (COND (to-item
           (MULTIPLE-VALUE-BIND (side delta) (SEND to-item ':nearest-side x y)
             (SEND SELF ':link-insert to-item side delta)))
          (t (SEND SELF ':select-orthogonal-point x y)))))


(DEFMETHOD (data-model-editor :link-insert) (to-item to-side to-delta)
  (LET* ((link-status (tv:lisa-multiple-choose
                       '((from "Starting of the Association"
                               (((with-one t)  "one with one"
                                 nil (with-many with-unknown) nil nil)
                                (with-many     "many with one"
                                               nil (with-one with-unknown)  nil nil)
                                (with-unknown  "unknown with one"
                                               nil (with-one with-many)     nil nil)
                                (optional      "optional?"
                                               nil nil nil nil)
                                (labeled       "labeled?"
                                               nil nil nil nil)))
                         (to   "Ending of the Association"
                               ((with-one      "one with one"
                                               nil (with-many with-unknown) nil nil)
                                ((with-many t) "one with many"
                                               nil (with-one with-unknown)  nil nil)
                                (with-unknown  "one with unknown"
                                               nil (with-one with-many)     nil nil)
                                (optional      "optional?"
                                               nil nil nil nil)
                                (labeled       "labeled?"
                                               nil nil nil nil))))
                       '(:string "Set the attributes for the ends of the Association",
                                 :font   fonts:medfnt)
                       '(:mouse) 590. 10. self))
```

```
     (from-cardinality (SECOND (FIRST  link-status)))
     (from-label       (AND (MEMQ 'labeled  (FIRST  link-status))))
     (from-optionality (AND (MEMQ 'optional (FIRST  link-status))))
     (to-cardinality   (SECOND (SECOND link-status)))
     (to-label         (AND (MEMQ 'labeled  (SECOND link-status))))
     (to-optionality   (AND (MEMQ 'optional (SECOND link-status))))
     entities points)
(WHEN link-status
  (WHEN (EQ from-cardinality 'optional)
    (SETQ from-cardinality nil))
  (WHEN (EQ to-cardinality 'optional)
    (SETQ to-cardinality nil))
  (WHEN from-label
  (SETQ from-label
        (get-line "Type in the label for the starting end of the Association"
                  self)))
(WHEN to-label
  (SETQ to-label
        (get-line "Type in the label for the ending end of the Association"
                  self)))
(SETQ entities selected-entities
      points   (REST2 selected-points))
(SEND SELF ':unselect-all)
(SEND SELF ':add-to-undo-ring "CREATE ASSOCIATION")
(LET ((new-link (SEND world ':create-and-add-entity 'link
                      ':from-cardinality  from-cardinality
                      ':from-delta        (THIRD  (FIRST entities))
                      ':from-object       (FIRST  (FIRST entities))
                      ':from-optionality  from-optionality
                      ':from-side         (SECOND (FIRST entities))
                      ':from-text         from-label
                      ':to-cardinality    to-cardinality
                      ':to-delta          to-delta
                      ':to-object         to-item
                      ':to-optionality    to-optionality
                      ':to-side           to-side
                      ':to-text           to-label
                      ':turns-x           (MAPCAR #'FIRST  points)
                      ':turns-y           (MAPCAR #'SECOND points))))
  (MULTIPLE-VALUE-BIND (x-min y-min x-max y-max) (SEND new-link ':extents)
    (SEND g-pane ':refresh-area x-min y-min x-max y-max)))
 (SEND SELF ':link-mode))))
```

```
CCCCCCCCCC   7777777777777777777777777777777777777777777777777777777777777777777777777777777777777777777777777777777777777   CCCCCCCCCC
CCCCCCCCCC   777777777777777777777777  THIS INFORMATION IS THE PROPERTY OF TEXAS INSTRUMENTS  777777777777777777777777   CCCCCCCCCC
CCCCCCCCCC   7777777777777777777777777777777777777777777777777777777777777777777777777777777777777777777777777777777777777   CCCCCCCCCC
```

ROARK

MACHINE_GROUP

LISP;1

File $3$DUA27:[ROARK.JUL]MACHINE_GROUP.LISP;1 (10633,30,0), last revised on 15-JUL-1986 14:41, is a 9 block sequential file owned by UIC [IIIS,ROARK]. The records are variable length with implied (CR) carriage control. The longest record is 119 bytes.

Job MACHINE_GROUP (29) queued to NB_TALARIS on 15-JUL-1986 14:49 by user ROARK, UIC [IIIS,ROARK], under account KBS at priority 100, started on printer LCB0 on 15-JUL-1986 14:49 from queue NB_TALARIS.

```
CCCCCCCCCC   7777777777777777777777777777777777777777777777777777777777777777777777777777777777777777777777777777777777777   CCCCCCCCCC
CCCCCCCCCC   777777777777777777777777  Digital Equipment Corporation - VAX/VMS Version V4.4  777777777777777777777777   CCCCCCCCCC
CCCCCCCCCC   7777777777777777777777777777777777777777777777777777777777777777777777777777777777777777777777777777777777777   CCCCCCCCCC
```

```
;;;-*- Mode:LISP; Package:DME; Base:10.; Fonts:MEDFNT,HL12B,HL12BI -*-

;1;*
;1; This is the flavor definiton of the machine-group object.  This is built from the GWIN:TEXT object and is thus a*
;1; standard graphics object as defined by the GWIN system.*
;1;*
(defflavor MACHINE-group ((height       0)
                          (items        nil)
                          (links-in     nil)
                          (links-out    nil)
                          (width        0)
                          set-to x-start y-start)
           (gwin:basic-graphics-mixin)
  :gettable-instance-variables
  :initable-instance-variables
  :settable-instance-variables)


(defmethod (machine-group :DISTANCE) (from-x from-y)
  "2This calculates the minimum distance from a point to the machine-group entity.
If the specified point is in the interior of the machine-group area, then the returned distance is
negative and the absolute value of the returned value is the distance to the edge of the
machine-group area.*"
  (declare (return-list signed-distance))
  (setq gwin:nearest-x from-x
        gwin:nearest-y from-y)
  (gwin:dist-from-rectangle from-x from-y x-start y-start (+ x-start width) (+ y-start height) t))


(defmethod (machine-group :DRAW) (window)
  (send window :draw-filled-rectangle x-start y-start width height gwin:black gwin:erase)
  (dolist (item items)
    (send item :draw window))
  (let ((weight (// (float *machine-group-weight*) 2)))
    (send window :draw-rect
          (+ x-start weight) (+ y-start weight)
          (- width *machine-group-weight*) (- height *machine-group-weight*)
          *machine-group-weight* *machine-group-color*)))


(DEFMETHOD (machine-group :edge-point) (window &optional transform)
  "2This returns a convenient point on the edge of the machine-group for highlighting.
The point that is used is the midpoint of the outside edge of the right side of the machine-group
rectangle*. 2If that is outside the window, the closest point on the machine-group to the* 2mouse is
used instead.*"
  (declare (return-list edge-point-x edge-point-y))
  (let ((x-point (+ x-start width))
        (y-point (+  y-start (// (float height) 2.)))
        (lft     x-start)
        (tp      y-start))
    (when transform
      (multiple-value (x-point y-point) (gwin:transform-point x-point y-point transform)))
    (when (gwin:off-window x-point y-point window)
      (when transform
```

```
      (multiple-value (lft tp) (gwin:transform-point lft tp transform)))
    (when (and gwin:nearest-x gwin:nearest-y)
      (multiple-value (x-point y-point) (gwin:nearest-rectangle-pt gwin:nearest-x gwin:nearest-y
                                                                   (- y-point tp) lft tp (- x-point lft)))))
   (values x-point y-point)))


(defmethod (machine-group :FASD-FORM) ()
  "2This returns a form which will recreate this machine-group instance when evaluated
This is the generic message that is sent to an object when it is being written
in compiled form to a file.*"
  (SETQ set-to (GENTEMP))
  '(PROG1
     ;1;*
     ;1; Links get set by the link fasd-form.*
     ;1;*
     (SETQ ,set-to (MAKE-INSTANCE 'machine-group
                                  :height       ',height
                                  :items        ',items
                                  :width        ',width))
     (SEND ,set-to :set-property-list ',(SEND self :property-list))))


(defmethod (machine-group :AFTER :INIT) (ignore)
  "2This initializes all of the internal data for this machine-group instance.*"
  (setq set-to nil)
  (when items
    (multiple-value-bind (left top right bottom) (send (first items) :extents)
      (dolist (entity (rest1 items))
        (gwin:maxf bottom (send entity :y-max))
        (gwin:minf left   (send entity :x-min))
        (gwin:maxf right  (send entity :x-max))
        (gwin:minf top    (send entity :y-min)))
      (setq x-start     (- left *machine-group-margin*)
            y-start     (- top  *machine-group-margin*)
            height      (max height (- (+ bottom *machine-group-margin*) y-start))
            width       (max width  (- (+ right  *machine-group-margin*) x-start))
            gwin:x-min  x-start
            gwin:y-min  y-start
            gwin:x-max  (+ x-start width)
            gwin:y-max  (+ y-start height)))))


(defmethod (machine-group :MOVE) (dx dy)
  "2This moves this machine-group object the specified distances in the x and y directions.*"
  (dolist (x items)
    (send x :move dx dy))
  (incf x-start dx)
  (incf y-start dy))


(COMPILE-FLAVOR-METHODS machine-group)
```

```
TTTTTTTTTT   8888888888888888888888888888888888888888888888888888888888888888888888888888888888888888888888888888888   TTTTTTTTTT
TTTTTTTTTT   88888888888888888888888  THIS INFORMATION IS THE PROPERTY OF TEXAS INSTRUMENTS  888888888888888888888888   TTTTTTTTTT
TTTTTTTTTT   8888888888888888888888888888888888888888888888888888888888888888888888888888888888888888888888888888888   TTTTTTTTTT

                                   RRRR    000    AAA   RRRR   K   K
                                   R   R  0   0  A   A  R   R  K  K
                                   R   R  0   0  A   A  R   R  K K
                                   RRRR   0   0  A   A  RRRR   KKK
                                   R R    0   0  AAAAA  R R    K K
                                   R  R   0   0  A   A  R  R   K  K
                                   R   R   000   A   A  R   R  K   K

DDDD   M   M  EEEEE         U   U  TTTTT   III  L       III  TTTTT  III  EEEEE   SSSS
D   D  MM MM  E             U   U    T      I   L        I     T     I   E      S
D   D  M M M  E             U   U    T      I   L        I     T     I   E      S
D   D  M   M  EEEE          U   U    T      I   L        I     T     I   EEEE    SSS
D   D  M   M  E             U   U    T      I   L        I     T     I   E          S
D   D  M   M  E             U   U    T      I   L        I     T     I   E          S
DDDD   M   M  EEEEE  _____  UUUUU    T     III  LLLLL   III    T    III  EEEEE  SSSS

                            L        III   SSSS  PPPP    ;;     1
                            L         I   S      P   P   ;;    11
                            L         I   S      P   P          1
                            L         I    SSS   PPPP    ;;     1
                            L         I       S  P       ;;     1
                        ..  L         I       S  P        ;     1
                        ..  LLLLL    III  SSSS   P        ;    111
```

File  $3$DUA27:[ROARK.JUL]DME_UTILITIES.LISP;1 (26720,36,0), last revised on 15-JUL-1986 13:54, is a 39 block sequential file owned by UIC [IIIS,ROARK]. The records are variable length with implied (CR) carriage control. The longest record is 114 bytes.

Job DME_UTILITIES (2025) queued to NB_TALARIS on 15-JUL-1986 14:26 by user ROARK, UIC [IIIS,ROARK], under account KBS at priority 100, started on printer LCB0 on 15-JUL-1986 14:26 from queue NB_TALARIS.

```
TTTTTTTTTT   8888888888888888888888888888888888888888888888888888888888888888888888888888888888888888888888888888888   TTTTTTTTTT
TTTTTTTTTT   8888888888888888888888888  Digital Equipment Corporation - VAX/VMS Version V4.4  8888888888888888888888888   TTTTTTTTTT
TTTTTTTTTT   8888888888888888888888888888888888888888888888888888888888888888888888888888888888888888888888888888888   TTTTTTTTTT
```

```lisp
;;-*- Mode:LISP; Package:DME; Base:10.; Fonts:MEDFNT,HL12B,HL12BI -*-

(defun BARF (&optional (message nil) (window tv:main-screen))
  (send window :beep)
  (when message
    (setq message (format nil "ERROR:  ~A" message))
    (inform message window)))


(defun CALCULATE-CONNECT-POINT (data-item side delta &optional (from-x nil) (from-y nil) (n 0))
  (declare (return-list x-connect-list y-connect-list))
  (let* ((height (send data-item :height))
         (width  (send data-item :width))
         (min-x  (send data-item :x-start))
         (max-x  (+ min-x width))
         (min-y  (send data-item :y-start))
         (max-y  (+ min-y height))
         (x      (if delta
                     (+ min-x delta)
                     (if (and from-x (< min-x from-x max-x))
                         from-x
                         (+ min-x (// (float width)  2.)))))
         (y      (if delta
                     (+ min-y delta)
                     (if (and from-y (< min-y from-y max-y))
                         from-y
                         (+ min-y (// (float height)  2.))))))
    (selectq side
      (:bottom (values (list x x)
                       (list max-y (+ max-y *link-min-offset* (* n *link-spacing*)))))
      (:left   (values (list min-x (- min-x *link-min-offset* (* n *link-spacing*)))
                       (list y y)))
      (:right  (values (list max-x (+ max-x *link-min-offset* (* n *link-spacing*)))
                       (list y y)))
      (:top    (values (list x x)
                       (list min-y (- min-y *link-min-offset* (* n *link-spacing*)))))))))


(defun CALCULATE-PATH-POINTS (from-x-list from-y-list to-x-list to-y-list)
  (multiple-value (to-x-list to-y-list)
    (cond ((and from-x-list from-y-list to-x-list to-y-list)
           (let* ((from-x1  (first (nleft 2. from-x-list)))
                  (from-x2  (first (nleft 1. from-x-list)))
                  (from-y1  (first (nleft 2. from-y-list)))
                  (from-y2  (first (nleft 1. from-y-list)))
                  (from-dir (direction from-x1 from-y1 from-x2 from-y2))
                  (to-x1    (first  to-x-list))
                  (to-x2    (second to-x-list))
                  (to-y1    (first  to-y-list))
                  (to-y2    (second to-y-list))
                  (to-dir   (direction to-x2 to-y2 to-x1 to-y1)))
             (unless (> (length from-x-list) 1.)
               (setq from-dir    (opposite-side to-dir)
```

```
      from-x-list (cons (first from-x-list) from-x-list)
      from-y-list (cons (first from-y-list) from-y-list)))
(unless (> (length to-x-list)   1.)
  (setq to-dir    (opposite-side from-dir)
      to-x-list (cons (first to-x-list) to-x-list)
      to-y-list (cons (first to-y-list) to-y-list)))
(cond ((or (and (or (null from-dir) (eq from-dir :bottom))
                (or (null to-dir)   (eq to-dir   :left))
                ((= from-x2 to-x1)  ((= from-y2 to-y1))
           (and (or (null from-dir) (eq from-dir :bottom))
                (or (null to-dir)   (eq to-dir   :right))
                (>= from-x2 to-x1)  ((= from-y2 to-y1))
           (and (or (null from-dir) (eq from-dir :top))
                (or (null to-dir)   (eq to-dir   :left))
                ((= from-x2 to-x1)  (>= from-y2 to-y1))
           (and (or (null from-dir) (eq from-dir :top))
                (or (null to-dir)   (eq to-dir   :right))
                (>= from-x2 to-x1)  (>= from-y2 to-y1)))
       (values (append from-x-list (rest1 to-x-list))
               (append (butlast from-y-list) to-y-list)))
      ((or (and (or (null from-dir) (eq from-dir :left))
                (or (null to-dir)   (eq to-dir   :bottom))
                (>= from-x2 to-x1)  (>= from-y2 to-y1))
           (and (or (null from-dir) (eq from-dir :left))
                (or (null to-dir)   (eq to-dir   :top))
                (>= from-x2 to-x1)  ((= from-y2 to-y1))
           (and (or (null from-dir) (eq from-dir :right))
                (or (null to-dir)   (eq to-dir   :bottom))
                ((= from-x2 to-x1)  (>= from-y2 to-y1))
           (and (or (null from-dir) (eq from-dir :right))
                (or (null to-dir)   (eq to-dir   :top))
                ((= from-x2 to-x1)  ((= from-y2 to-y1)))
       (values (append (butlast from-x-list) to-x-list)
               (append from-y-list (rest1 to-y-list))))
      ((or (and (or (null from-dir) (eq from-dir :bottom))
                (or (null to-dir)   (eq to-dir   :top))
                ((= from-y2 to-y1))
           (and (or (null from-dir) (eq from-dir :top))
                (or (null to-dir)   (eq to-dir   :bottom))
                (>= from-y2 to-y1)))
       (let* ((new    from-y2)
              (space  (truncate *link-spacing* 2))
              (bottom (+ new space))
              (left   (min from-x2 to-x1))
              (right  (max from-x2 to-x1))
              (top    (- new space)))
         (dolist (item *display-list*)
           (or (send item :outside-p left top right bottom)
               (setq new     (if (eq from-dir :top)
                                 (- (send item :y-min) *link-spacing*)
                                 (+ (send item :y-max) *link-spacing*))
                     bottom (+ new space)
                     top    (- new space))))
```

```
   (values (append from-x-list to-x-list)
           (append (butlast from-y-list) (list new new) (rest1 to-y-list)))))
((or (and (or (null from-dir) (eq from-dir :right))
          (or (null to-dir)   (eq to-dir   :left))
          (<= from-x2 to-x1))
     (and (or (null from-dir) (eq from-dir :left))
          (or (null to-dir)   (eq to-dir   :right))
          (>= from-x2 to-x1)))
 (let* ((new    from-x2)
        (space  (truncate *link-spacing* 2))
        (bottom (max from-y2 to-y1))
        (left   (- new space))
        (right  (+ new space))
        (top    (min from-y2 to-y1)))
   (dolist (item *display-list*)
     (or (send item :outside-p left top right bottom)
         (setq new   (if (eq from-dir :left)
                         (- (send item :x-min) *link-spacing*)
                         (+ (send item :x-max) *link-spacing*))
               left  (- new space)
               right (+ new space))))
   (values (append (butlast from-x-list) (list new new) (rest1 to-x-list))
           (append from-y-list to-y-list))))
((and (or (eq from-dir :bottom) (eq from-dir :top))
      (or (eq to-dir   :left)   (eq to-dir   :right)))
      (new-y  from-y2)
      (space  (truncate *link-spacing* 2))
      (bottom (max from-y2 to-y1))
      (left   (- new-x space))
      (right  (+ new-x space))
      (top    (min from-y2 to-y1)))
 (dolist (item *display-list*)
   (or (send item :outside-p left top right bottom)
       (setq new-x (if (eq to-dir :left)
                       (- (send item :x-min) *link-spacing*)
                       (+ (send item :x-max) *link-spacing*))
             left  (- new-x space)
             right (+ new-x space))))
 (setq bottom (+ new-y space)
       left   (min from-x2 new-x)
       right  (max from-x2 new-x)
       top    (- new-y space))
 (dolist (item *display-list*)
   (or (send item :outside-p left top right bottom)
       (setq new-y  (if (eq from-dir :top)
                        (- (send item :y-min) *link-spacing*)
                        (+ (send item :y-max) *link-spacing*))
             bottom (+ new-y space)
             top    (- new-y space))))
 (values (append from-x-list            (list new-x new-x) (rest1 to-x-list))
         (append (butlast from-y-list) (list new-y new-y) to-y-list))))
((and (or (eq from-dir :left)   (eq from-dir :right))
      (or (eq to-dir   :bottom) (eq to-dir   :top)))
```

```
(let* ((new-x  from-x2)
       (new-y  to-y1)
       (space  (truncate *link-spacing* 2))
       (bottom (max from-y2 to-y1))
       (left   (- new-x space))
       (right  (+ new-x space))
       (top    (min from-y2 to-y1)))
  (dolist (item *display-list*)
    (or (send item :outside-p left top right bottom)
        (setq new-x (if (eq from-dir :left)
                        (- (send item :x-min) *link-spacing*)
                        (+ (send item :x-max) *link-spacing*))
              left  (- new-x space)
              right (+ new-x space))))
  (setq bottom (+ new-y space)
        left   (min to-x1 new-x)
        right  (max to-x1 new-x)
        top    (- new-y space))
  (dolist (item *display-list*)
    (or (send item :outside-p left top right bottom)
        (setq new-y  (if (eq to-dir :top)
                         (- (send item :y-min) *link-spacing*)
                         (+ (send item :y-max) *link-spacing*))
              bottom (+ new-y space)
              top    (- new-y space))))
  (values (append (butlast from-x-list) (list new-x new-x) to-x-list)
          (append from-y-list           (list new-y new-y) (rest1 to-y-list)))))
((or (and (eq from-dir :bottom) (eq to-dir :top))
     (and (eq from-dir :top)    (eq to-dir :bottom)))
 (values (append from-x-list
                 (list (// (float (+ from-x2 to-x1)) 2.)
                       (// (float (+ from-x2 to-x1)) 2.))
                 to-x-list)
         (append from-y-list (list from-y2 to-y1) to-y-list)))
((or (and (eq from-dir :right) (eq to-dir :left))
     (and (eq from-dir :left)  (eq to-dir :right)))
 (values (append from-x-list (list from-x2 to-x1) to-x-list)
         (append from-y-list
                 (list (// (float (+ from-y2 to-y1)) 2.)
                       (// (float (+ from-y2 to-y1)) 2.))
                 to-y-list)))
((or (and (eq from-dir :bottom) (eq to-dir :bottom)
          (= from-x2 to-x1))
     (and (eq from-dir :top)    (eq to-dir :top)
          (= from-x2 to-x1)))
 (let* ((new    (- from-x2 *link-jog-size*))
        (space  (truncate *link-spacing* 2))
        (bottom (max from-y2 to-y1))
        (left   (- new space))
        (right  (+ new space))
        (top    (min from-y2 to-y1)))
   (dolist (item *display-list*)
     (or (send item :outside-p left top right bottom)
```

```
                (setq new   (- (send item :x-min) *link-spacing*)
                      left  (- new space)
                      right (+ new space))))
          (values (append from-x-list (list new      new)   to-x-list)
                  (append from-y-list (list from-y2 to-y1) to-y-list))))
       ((or (and (eq from-dir :right) (eq to-dir :right)
                 (= from-y2 to-y1))
            (and (eq from-dir :left)  (eq to-dir :left)
                 (= from-y2 to-y1)))
        (let* ((new    (- from-y2 *link-jog-size*))
               (space  (truncate *link-spacing* 2))
               (bottom (+ new space))
               (left   (min from-x2 to-x1))
               (right  (max from-x2 to-x1))
               (top    (- new space)))
          (dolist (item *display-list*)
            (or (send item :outside-p left top right bottom)
                (setq new    (- (send item :y-min) *link-spacing*)
                      bottom (- new space)
                      top    (+ new space))))
          (values (append from-x-list (list from-x2 to-x1) to-x-list)
                  (append from-y-list (list new      new)   to-y-list))))
       ((and (eq from-dir :bottom) (eq to-dir :bottom))
        (values (append from-x-list to-x-list)
                (append (butlast from-y-list)
                        (list (max from-y2 to-y1) (max from-y2 to-y1))
                        (rest1 to-y-list))))
       ((and (eq from-dir :right) (eq to-dir :right))
        (values (append (butlast from-x-list)
                        (list (max from-x2 to-x1) (max from-x2 to-x1))
                        (rest1 to-x-list))
                (append from-y-list to-y-list)))
       ((and (eq from-dir :top) (eq to-dir :top))
        (values (append from-x-list to-x-list)
                (append (butlast from-y-list)
                        (list (min from-y2 to-y1) (min from-y2 to-y1))
                        (rest1 to-y-list))))
       ((and (eq from-dir :left) (eq to-dir :left))
        (values (append (butlast from-x-list)
                        (list (min from-x2 to-x1) (min from-x2 to-x1))
                        (rest1 to-x-list))
                (append from-y-list to-y-list)))
       (t (values (append from-x-list to-x-list)
                  (append from-y-list to-y-list))))))
    (t (values (append from-x-list to-x-list)
               (append from-y-list to-y-list)))))
(remove-redundant-points to-x-list to-y-list))
;; input command to the approriate handler.
;;
(defun COMMAND-LOOP (window)
  (setq terminal-io window)
  (do-forever
    (send window :error-reset)
```

```
  (*catch 'reset-on-error
    (do ((command-char nil nil)) (nil)
      (condition-bind-if *reset-on-errors?* ((error 'si:ignore-errors-handler 'reset-on-error))
        (tv:await-window-exposure)
        (send window :wait-for-input-with-timeout *status-update-time*)
        (when (setq command-char (send window :any-tyi-no-hang))
          (send window :send-if-handles :before-command)
          (cond ((listp command-char)
                 (cond ((eq (first command-char) :mouse-button)
                        (send window :mouse-blip command-char))
                       ((eq (first command-char) :menu)
                        (send window :menu-blip command-char))
                       (t (send window :beep))))
                ((fixp command-char)
                 (send window :character-command command-char))
                (t (send window :beep)))
          (send window :send-if-handles :after-command))
        (send window :send-if-handles :update-status))))
  (barf "internal software error -- resetting" window)
  (send (send window :process) :reset)))


defun DIRECTION (from-x from-y to-x to-y)
 (when (and from-x from-y to-x to-y)
   (cond ((= from-x to-x) (cond ((> from-y to-y) :top)
                                (( < from-y to-y) :bottom)))
         ((= from-y to-y) (cond ((> from-x to-x) :left)
                                ((< from-x to-x) :right))))))


;; This is the function that a DATA-MODEL-EDITOR runs.
(defun DME-RUN-DMOS (window)
  (let ((terminal-io window))
    ;; This variable is not superfluous -- it's used by SNAP and DUMP in execute.
    (setq dmos:*last-time-operation* (+ dmos:*current-time* dmos:*time-steps*))
    (dmos:init-breaks)
    (dmos:send-initial-instructions)
    (do ()
        ((= dmos:*current-time* (1+ dmos:*last-time-operation*)))
      (if user:*sleepy* (process-sleep user:*sleep-delay*))
;;;      (if user:graphit (send self :update-bar-chart))
      (user:maybe-update-bar-chart)
      (user:maybe-save-bar-chart-window)
      (dmos:maybe-show-state)
      (dmos:schedule)
      (dmos:simulate))))


(defun GET-PATHNAME (&optional (prompt "enter pathname")
                               (default (fs:merge-pathname-defaults "foo.diagram"))
                               (default-type "diagram")
                               (window tv:main-screen))
```

```
  (setq prompt (format nil "~a~%  (default = ~a)~%~%" prompt default))
  (send *typein-window* :set-label
       '(:string "(press abort to cancel this)" :font ,fonts:medfnt))
  (send *typein-window* :clear-input)
  (send *typein-window* :set-current-font 1.)

  (unwind-protect
      (progn (tv:expose-window-near *typein-window* '(:mouse) nil)
             (send *typein-window* :select)
             (send *typein-window* :set-current-font 1.)
             (send *typein-window* :string-out prompt)
             (send *typein-window* :set-current-font 0.)
             (setq prompt (readline *typein-window*)))
    (send *typein-window* :deactivate))
  (send window :send-if-handles :clear-input)
  (setq default (fs:merge-pathname-defaults prompt default default-type)))


(defun GET-LINE (&optional (prompt "enter text string") (window tv:main-screen))
  (send *typein-window* :set-label
       '(:string "(press abort to cancel this)" :font ,fonts:medfnt))
  (send *typein-window* :clear-input)
  (send *typein-window* :set-current-font 1.)
  (send *typein-window* :set-size-in-characters prompt 5.)
  (unwind-protect
      (progn (tv:expose-window-near *typein-window* '(:mouse) nil)
             (send *typein-window* :select)
             (send *typein-window* :set-current-font 1.)
             (send *typein-window* :string-out (format nil "~a~%~%" prompt))
             (send *typein-window* :set-current-font 0.)
             (setq prompt (readline *typein-window*)))
    (send *typein-window* :deactivate))
  (send window :send-if-handles :clear-input)
  prompt)


(defun HELP (&optional (message nil) (window tv:main-screen))
  (lexpr-send *help-window* :set-edges (multiple-value-list (send window :edges)))
  (let ((io-buffer (send window :send-if-handles :io-buffer)))
    (send *help-window* :set-io-buffer io-buffer))
  (send *help-window* :clear-input)
  (unwind-protect
      (progn (send *help-window* :expose)
             (send *help-window* :select)
             (send *help-window* :string-out message)
             (send *help-window* :any-tyi)
             (send *help-window* :clear-input))
    (send *help-window* :deactivate))
  (send window :send-if-handles :clear-input))


(defun INFORM (&optional (message nil) (window tv:main-screen))
  (send *barf-window* :set-size-in-characters message message)
```

```
  (send *barf-window* :center-around
        (// (send window :width) 2.) (// (send window :height) 2.))
  (let ((io-buffer (send window :send-if-handles :io-buffer)))
    (send *barf-window* :set-io-buffer io-buffer))
  (send *barf-window* :clear-input)
  (unwind-protect
      (progn (send *barf-window* :expose)
             (send *barf-window* :select)
             (send *barf-window* :string-out message)
             (send *barf-window* :wait-for-input-with-timeout 500.)
             (send *barf-window* :clear-input))
    (send *barf-window* :deactivate))
  (send window :send-if-handles :clear-input))


(defun OPPOSITE-SIDE (side)
  (selectq side
    (:bottom :top)
    (:right :left)
    (:top :bottom)))


(defun user:PFD (&optional (simulation-frame dmos:*simulation-frame*)
                           (text-file-name 2"lm:jul86-dmos;flowxxx.data"*))
  (dmos:init-parameters)
  (if dmos:*read-file* (dmos:setup-structure text-file-name))
  (if (and (null dmos:*simulation-frame*) (null simulation-frame))
      "No simulation frame specified."
      (let ((new-frame? (neq simulation-frame dmos:*simulation-frame*)))
        (setq dmos:*simulation-frame* simulation-frame)
        (dmos:initialize new-frame?)))
  (format t "~3% Dmos structure initialized, building static display.~2%")
  (or (and (boundp 'pfd-window) (typep pfd-window 'data-model-editor))
      (setq pfd-window (make-instance 'data-model-editor)))
  (send pfd-window :expose)
  (send pfd-window :select))

(defun user:PFD-GO (&aux text-file-name )
  (makunbound 'dme:pfd-window)1       ;;;this is to allow for multiple re-entry into pfd system -- alr*
  (makunbound 'user:chart-window)
  (setq dmos:*datafile-pathname* (fs:merge-pathnames 2"flowxxx.data"* (fs:default-pathname)))
  (setq text-file-name (user:get-file-name "Dmos data file"))
  (dmos:setup-structure text-file-name)
  (dmos:initialize t)
  (format t "~3% Dmos structure initialized, building static display.~2%")
;;;  (format t "~3% Initialized, loading PFD.~2%")
;;;  (load "tkay:franks-dmos;pfddef")
;;;  (make-system 'PFD-ADDITIONS :compile :noconfirm)
;;;  (format t " PFD loaded, now beginning simulation.")
;;;  (user:pfd))
  (or (and (boundp 'pfd-window) (typep pfd-window 'data-model-editor))
      (setq pfd-window (make-instance 'data-model-editor)))
```

```
  (send pfd-window :expose)
  (send pfd-window :select))

(defun user:get-file-name (menu-label-string)
  (*CATCH 'abort
    (loop doing
          (tv:choose-variable-values (LIST
                                       (LIST 'dmos:*datafile-pathname*
                                             menu-label-string
                                             ;1 the documentation is needed because the default is incorrect*
                                             :documentation
                                             "L: move to an item and select it, R: move to an item and edit it."
                                             :pathname))
                                     :label "Which file do you wish to load?"
                                     :margin-choices '("Do It" )
                                     )
          until (probe-file dmos:*datafile-pathname*))
    (SETQ dmos:*datafile-pathname* (fs:merge-pathnames dmos:*datafile-pathname* (fs:default-pathname)))
    )
                                                  ;1end of CATCH*
  )

(defun REMOVE-REDUNDANT-POINTS (x y)
  (do ((last-x nil)
       (last-y nil)
       (new-x  nil)
       (new-y  nil))
      ((or (null x) (null y))
       (values (reverse new-x) (reverse new-y)))
    (unless (and (eql last-x (first x))
                 (eql last-y (first y)))
      (setq new-x (cons (first x) new-x)

      (setq last-x (first x)
            last-y (first y)
            x      (rest1 x)
            y      (rest1 y))))
```

```
SSSSSSSSSS   77777777777777777777777777777777777777777777777777777777777777777777777777777777777777777777777777   SSSSSSSSSS
SSSSSSSSSS   777777777777777777777777  THIS INFORMATION IS THE PROPERTY OF TEXAS INSTRUMENTS  777777777777777777777777   SSSSSSSSSS
SSSSSSSSSS   77777777777777777777777777777777777777777777777777777777777777777777777777777777777777777777777777   SSSSSSSSSS

                                 RRRR    000    AAA   RRRR   K   K
                                 R   R  0   0  A   A  R   R  K  K
                                 R   R  0   0  A , A  R   R  K K
                                 RRRR   0   0  A   A  RRRR   KKK
                                 R R    0   0  AAAAA  R R    K  K
                                 R  R   0   0  A   A  R  R   K   K
                                 R   R   000   A   A  R   R  K    K

DDDD   EEEEE  L      EEEEE  TTTTT  EEEEE         CCCC   000   M   M  M   M   AAA   N   N  DDDD    SSSS
D   D  E      L      E        T    E            C      O   O  MM MM  MM MM  A   A  N   N  D   D  S
D   D  E      L      E        T    E            C      O   O  M M M  M M M  A   A  NN  N  D   D  S
D   D  EEEE   L      EEEE     T    EEEE         C      O   O  M   M  M   M  A   A  N N N  D   D   SSS
D   D  E      L      E        T    E            C      O   O  M   M  M   M  AAAAA  N  NN  D   D      S
D   D  E      L      E        T    E            C      O   O  M   M  M   M  A   A  N   N  D   D      S
DDDD   EEEEE  LLLLL  EEEEE    T    EEEEE  _____  CCCC   000   M   M  M   M  A   A  N   N  DDDD   SSSS

                                 L       III    SSSS  PPPP     ;;    1
                                 L        I    S      P   P    ;;   11
                                 L        I    S      P   P          1
                                 L        I     SSS   PPPP     ;;    1
                                 L        I        S  P        ;;    1
                             ..  L        I        S  P         ;    1
                             ..  LLLLL   III   SSSS   P        ;    111
```

File _$3$DUA27:[ROARK.JUL]DELETE_COMMANDS.LISP;1 (26726,11,0), last revised on 15-JUL-1986 13:54, is a 2 block sequential file owned by UIC [IIIS,ROARK]. The records are variable length with implied (CR) carriage control. The longest record is 84 bytes.

Job DELETE_COMMANDS (2022) queued to NB_TALARIS on 15-JUL-1986 14:25 by user ROARK, UIC [IIIS,ROARK], under account KBS at priority 100, started on printer LCB0 on 15-JUL-1986 14:25 from queue NB_TALARIS.

```
SSSSSSSSSS   77777777777777777777777777777777777777777777777777777777777777777777777777777777777777777777777777   SSSSSSSSSS
SSSSSSSSSS   777777777777777777777777  Digital Equipment Corporation - VAX/VMS Version V4.4  777777777777777777777777   SSSSSSSSSS
SSSSSSSSSS   77777777777777777777777777777777777777777777777777777777777777777777777777777777777777777777777777   SSSSSSSSSS
```

```
;;;-*- Mode: LISP; Package: DME; Base: 10.; Fonts: MEDFNT,HL12B,HL12BI  -*-

(DEFMETHOD (data-model-editor :delete-mode) ()
  (SEND SELF ':change-modes 'delete-mode))


(DEFMETHOD (data-model-editor :delete) (x y)
  (LET ((height 0.)
        (width  0.)
        entities)
    (WHEN (NOT (ZEROP tv:mouse-last-buttons))
      (MULTIPLE-VALUE (x y width height) (SEND SELF ':rubberband-rectangle x y)))
    (SEND SELF ':add-to-selected-items (SEND SELF ':items-in-area x y width height))
    (COND (selected-entities
           (SETQ entities
                 (APPEND selected-entities
                         (SEND SELF ':get-links-that-reference selected-entities)))
           (SEND SELF ':unselect-all)
           (SEND SELF ':add-to-undo-ring "DELETE")
           (SEND world ':delete-entity entities)
           (MULTIPLE-VALUE-BIND (bottom left right top)
               (SEND world ':calculate-extents entities nil)
             (SEND g-pane ':refresh-area left top right bottom)))
          (t (SEND SELF ':barf *no-object-pick-error*)))))
```

```
YYYYYYYYYY    333333333333333333333333333333333333333333333333333333333333333333333333333333333333333333333333    YYYYYYYYYY
YYYYYYYYYY    3333333333333333333333  THIS INFORMATION IS THE PROPERTY OF TEXAS INSTRUMENTS  3333333333333333333333    YYYYYYYYYY
YYYYYYYYYY    333333333333333333333333333333333333333333333333333333333333333333333333333333333333333333333333    YYYYYYYYYY

                               RRRR    OOO    AAA   RRRR   K   K
                               R   R  O   O  A   A  R   R  K  K
                               R   R  O   O  A   A  R   R  K K
                               RRRR   O   O  A   A  RRRR   KKK
                               R R    O   O  AAAAA  R R    K K
                               R  R   O   O  A   A  R  R   K  K
                               R   R   OOO   A   A  R   R  K   K

            FFFFF  III  L      EEEEE         CCCC   OOO   M   M  M   M   AAA   N   N  DDDD    SSSS
            F       I   L      E            C      O   O  MM MM  MM MM  A   A  N   N  D   D  S
            F       I   L      E            C      O   O  M M M  M M M  A   A  NN  N  D   D  S
            FFFF    I   L      EEEE         C      O   O  M   M  M   M  A   A  N N N  D   D   SSS
            F       I   L      E            C      O   O  M   M  M   M  AAAAA  N  NN  D   D      S
            F       I   L      E            C      O   O  M   M  M   M  A   A  N   N  D   D      S
            F      III  LLLLL  EEEEE  _____  CCCC   OOO   M   M  M   M  A   A  N   N  DDDD   SSSS

                               L      III   SSSS   PPPP    ;;    1
                               L       I   S       P   P   ;;   11
                               L       I   S       P   P         1
                               L       I    SSS    PPPP    ;;    1
                               L       I       S   P       ;;    1
                          ..   L       I       S   P        ;    1
                          ..   LLLLL  III  SSSS    P       ;    111
```

File $3$DUA27:[ROARK.JUL]FILE_COMMANDS.LISP;1 (26767,7,0), last revised on 15-JUL-1986 13:54, is a 6 block sequential file owned by UIC [IIIS,ROARK]. The records are variable length with implied (CR) carriage control. The longest record is 86 bytes.

Job FILE_COMMANDS (2036) queued to NB_TALARIS on 15-JUL-1986 14:29 by user ROARK, UIC [IIIS,ROARK], under account KBS at priority 100, started on printer LCB0 on 15-JUL-1986 14:29 from queue NB_TALARIS.

```
YYYYYYYYYY    333333333333333333333333333333333333333333333333333333333333333333333333333333333333333333333333    YYYYYYYYYY
YYYYYYYYYY    3333333333333333333333  Digital Equipment Corporation - VAX/VMS Version V4.4  3333333333333333333333    YYYYYYYYYY
YYYYYYYYYY    333333333333333333333333333333333333333333333333333333333333333333333333333333333333333333333333    YYYYYYYYYY
```

```
;;;-*- Mode: LISP; Package: DME; Base: 10.; Fonts: MEDFNT,HL12B,HL12BI -*-

(DEFMETHOD (data-model-editor :new-model) (new-pathname new-display-list)
  (SEND SELF ':add-to undo-ring "LOAD DATA MODEL")
  (SEND SELF ':change-modes current-mode)
  (SEND pathname      ':putprop (SEND world ':display-list) 'data-model)
  (SEND new-pathname ':putprop self                        'data-model)
  (SETQ pathname new-pathname)
  (COND (new-display-list      (SEND world ':set-display-list new-display-list))
        ((PROBEF new-pathname) (SEND world ':read-display-list new-pathname))
        (t                     (SEND world ':set-display-list nil)))
  (remember-model new-pathname)
  (SETQ level-of-detail (FIRST *detail-levels-list*))
  (DOLIST (item (SEND world ':display-list))
    (WHEN (TYPEP item 'machine-picture)
      (SETQ level-of-detail (SEND item ':level-of-detail))
      (RETURN)))
  (SEND g-pane ':default-window)
  (SEND g-pane ':refresh))

(DEFMETHOD (data-model-editor :read-data-model) ()
  (LET ((dm     'new)
        (window nil))
    (WHEN *data-models*
      (SETQ dm (SECOND (tv:lisa-choose
                         '((exist "Already loaded Data Models"
                                  ,(MAPCAR #'(LAMBDA (x)
                                               (SETQ x (FIRST x))
                                               (LIST x (STRING x)))
                                           *data-models*))
                           (option "Other options"
                                   ((new "read in a Data Model from a file"))))
                         '(:string "Select the Data Model to load"
                           :font fonts:medfnt)))))
    (WHEN dm
      (COND ((EQ dm 'new)
             (SETQ dm (get-pathname "Type in the pathname to read the Data Model from"
                                    pathname "model" self)))
            (t (SETQ window (SEND dm ':get 'data-model))))
      (COND ((TYPEP window 'data-model-edit)
             (SEND window ':expose)
             (SEND window ':select))
            (t (SEND SELF ':new-model dm window))))))

(DEFMETHOD (data-model-editor :write-data-model) ()
  (LET ((new-pathname (get-pathname "Type in the pathname to write this Data Model to"
                                    pathname "model" self)))
    (UNLESS (EQ new-pathname pathname)
      (SEND SELF ':add-to-undo-ring "WRITE DATA MODEL")
      (remember-model new-pathname)
      (SEND pathname      ':putprop nil  'data-model)
      (SEND new-pathname ':putprop self 'data-model)
      (SETQ pathname new-pathname))
```

```
WWWWWWWWWW    44444444444444444444444444444444444444444444444444444444444444444444444444444444444444444444    WWWWWWWWWW
WWWWWWWWWW    4444444444444444444444  THIS INFORMATION IS THE PROPERTY OF TEXAS INSTRUMENTS  4444444444444444444444    WWWWWWWWWW
WWWWWWWWWW    44444444444444444444444444444444444444444444444444444444444444444444444444444444444444444444    WWWWWWWWWW

                              RRRR    000    AAA   RRRR   K   K
                              R   R  O   O  A   A  R   R  K  K
                              R   R  O   O  A   A  R   R  K K
                              RRRR   O   O  A   A  RRRR   KKK
                              R R    O   O  AAAAA  R R    K K
                              R  R   O   O  A   A  R  R   K  K
                              R   R   000   A   A  R   R  K   K

        M   M  III  SSSS   CCCC          CCCC   OOO   M   M  M   M   AAA   N   N  DDDD    SSSS
        MM MM   I  S      C             C      O   O  MM MM  MM MM  A   A  N   N  D   D  S
        M M M   I  S      C             C      O   O  M M M  M M M  A   A  NN  N  D   D  S
        M   M   I   SSS   C             C      O   O  M   M  M   M  A   A  N N N  D   D   SSS
        M   M   I      S  C             C      O   O  M   M  M   M  AAAAA  N  NN  D   D      S
        M   M   I      S  C             C      O   O  M   M  M   M  A   A  N   N  D   D      S
        M   M  III  SSSS   CCCC  _____   CCCC   OOO   M   M  M   M  A   A  N   N  DDDD   SSSS

                              L       III  SSSS  PPPP     ;;     1
                              L        I  S      P   P    ;;    11
                              L        I  S      P   P           1
                              L        I   SSS   PPPP     ;;     1
                              L        I      S  P        ;;     1
                         ..   L        I      S  P         ;     1
                         ..   LLLLL   III  SSSS  P         ;    111
```

File $3$DUA27:[ROARK.JUL]MISC_COMMANDS.LISP;1 (24757,27,0), last revised on 15-JUL-1986 14:42, is a 16 block sequential file owned by UIC [IIIS,ROARK]. The records are variable length with implied (CR) carriage control. The longest record is 111 bytes.

Job MISC_COMMANDS (195) queued to NB_TALARIS_1 on 15-JUL-1986 17:36 by user ROARK, UIC [IIIS,ROARK], under account KBS at priority 100, started on printer LCA0 on 15-JUL-1986 17:36 from queue NB_TALARIS_1.

```
WWWWWWWWWW    44444444444444444444444444444444444444444444444444444444444444444444444444444444444444444444    WWWWWWWWWW
WWWWWWWWWW    4444444444444444444444  Digital Equipment Corporation - VAX/VMS Version V4.4  4444444444444444444444    WWWWWWWWWW
WWWWWWWWWW    44444444444444444444444444444444444444444444444444444444444444444444444444444444444444444444    WWWWWWWWWW
```

```
;1;-*- Mode: LISP; Package: DME; Base: 10.; Fonts: MEDFNT,HL12B,HL12BI  -*-*

(defmethod (data-model-editor :SLEEP-FACTOR) ()
  (let ((sleep-time (get-line 2"Enter the pause interval      "*)))
    (and sleep-time
         (numberp (setq sleep-time (read-from-string sleep-time)))
         (user:make-sleepy sleep-time))))



(defmethod (data-model-editor :EDIT-MTBF) ()
  (user:check-password)
;;;  (send pfd-window :exit)
;;;  (send tv:selected-window :clear-screen)
  (user:pfd-enter-mtbf-data "Mtbf data")
  (user:make-mtbf-editor)
;;;  (setq *old-window* self)
  (user:mtbf-go)
;;;  (send tv:selected-window :clear-screen)
;;;  (makunbound 'dme:pfd-window)
;;;  (makunbound 'user:chart-window)
;;;  (dme:pfd-reset)
  (print "got here"))

(defmethod (data-model-editor :EDIT-DMOS-FLOW) ()
  (user:check-password)
  (user:pfd-enter-dmos-flow-data "Dmos flos data")
  (user:make-dmos-flow-editor)
  (setq *old-window* self)
  (user:dmos-flow-go))

(defmethod (data-model-editor :BAR-CHART) ()
  (if (and (boundp 'user:chart-window) (typep user:chart-window 'user:sched-window))
      (send user:chart-window :refresh)
      (setq @ser:chart-window (make-instance 'user:sched-window
                                             :deexposed-typeout-action :permit
                                             ':save-bits t
                                             :io-buffer tv:io-buffer
                                             :superior self
                                             :label 2"Bar Chart Display"*)))

  (unwind-protect
      (progn
        (send user:chart-window :expose t :clean)
        (setq user:graphit t)
        (user:graph-setup)
        (setq user:begin-time dmos:*current-time*)
        (setq user:*time-to-exit* nil)
        (user:init-graph-vars)
        (user:draw-bar-chart)

        (send user:chart-window  :string-out-explicit 2"time: "*
              (- (tv:sheet-inside-right  user:chart-window) 50)
```

```
            (+ (tv:sheet-inside-top user:chart-window) 12)
            nil nil fonts:hl10b tv:alu-xor)
      ;1; Command loop*
      (loop for char = (send self :any-tyi)
            do (if (listp char)
                   (selectq (car char)
                     (:mouse-button (selectq (second char)
                                      (#\mouse-2-1  (send self :choose-from-menu *bar-command-menu*))
                                      (#\mouse-3-1 (tv:mouse-call-system-menu self))
                                      (otherwise (beep))))
                     (otherwise (beep)))
                   (selectq char
                     (#\meta-b (send user:chart-window :pause))
                     (#\meta-c (send user:chart-window :continue))
                     (#\clear-screen (send user:chart-window :refresh :use-old-bits))
                     (#\end (return))
                     (otherwise (beep))))
               (if user:*time-to-exit* (return)))
      )
    (setq user:graphit nil)
    (send user:chart-window :deactivate)))


(defmethod (data-model-editor :BUILD-DIAGRAM) (&aux operations)
  (setq operations dmos:*operations*
        status-items  nil)
  (send world :set-display-list nil)
  (send g-pane :refresh)
  (and operations
       (let ((machine-alist nil)            ;1 Maps lists of machines to machine-group-items.*
             (next-slot 0)
             delta from-delta from-obj link
             links-in links-out machines name to-delta to-obj to-side x y)
         (dolist (operation operations)
           (setq from-obj to-obj
                 machines (dmos:op-machines operation)
                 name (format nil "~A" (dmos:op-description operation))
                 to-obj (cdr (assoc machines machine-alist)))
           (or to-obj
               (setq x (+ (* next-slot *slot-x-spacing*) *starting-slot-x*)
                     y (- *starting-slot-y* (// (float (+ (* (length machines)
                                                             *machine-picture-normal-height*)
                                                          (* (1- (length machines)) *slot-y-spacing*)))
                                                2))
                     next-slot (1+ next-slot)
                     to-obj (if (cdr machines)
                                (let ((items nil))
                                  (dolist (machine machines)
                                    (let ((item (make-instance 'machine-picture
                                                               :machine machine
                                                               :text-string (dmos:m-name machine)
                                                               :x-start x
                                                               :y-start y)))
```

```
                    (setq items (cons item items)
                          machine-alist (cons (cons (list machine) item) machine-alist)
                          y (+ y (send item :height) *slot-y-spacing*))))
                (send world :create-and-add-entity-to-front
                      'machine-group :items items))
              (send world :create-and-add-entity-to-front
                    'machine-picture
                    :machine (car machines)
                    :text-string (dmos:m-name (car machines))
                    :x-start x
                    :y-start y))
        machine-alist (cons (cons machines to-obj) machine-alist)))
(setq to-side (let ((from-x (if from-obj
                                (send from-obj :x-start)
                                0))
                    (to-x   (send to-obj   :x-start)))
                (if (< to-x from-x)
                    :bottom
                    (if (> (- to-x from-x) *slot-x-spacing*)
                        :top
                        :left)))
      links-in   (rem-if-not #'(lambda (x)
                                  (eq (send x :to-side) to-side))
                              (send to-obj :links-in))
      links-out  (and from-obj (send from-obj :links-out))
      from-delta (and from-obj (do* ((height (float (send from-obj :height)))
                                     (number (+ (length links-out) 2))
                                     (space  (* *link-spacing* 2))
                                     (delta  (// height number) (// height number)))
                                    ((>= delta space) delta)
                                  (setq height (+ height *machine-picture-normal-height*))
                                  (send from-obj :set-height height)
                                  (send from-obj :init nil)
                                  (dolist (item (send self :get-links-that-reference from-obj))
                                    (send item :init nil))))
      to-delta   (if (eq to-side :left)
                     (and (or links-in (null from-delta))
                          (// (float (send to-obj :height)) (+ (length links-in) 2)))
                     (// (float (send to-obj :width)) (+ (length links-in) 2)))
      link       (let ((*display-list* (send world :display-list)))
                   (send world :create-and-add-entity 'process-as-link
                         :from-delta  from-delta
                         :from-object from-obj
                         :from-side   :right
                         :from-text   (and from-obj name)
                         :n           (length links-out)
                         :operation   operation
                         :to-delta    to-delta
                         :to-object   to-obj
                         :to-side     to-side
                         :to-text     (and (null from-obj) name))))
(when to-delta
  (setq delta (+ to-delta to-delta))
```

```
        (dolist (item links-in)
          (send item :set-to-delta delta)
          (send item :init nil)
          (setq delta (+ delta to-delta))))
      (when from-delta
        (setq delta (+ from-delta from-delta))
        (dolist (item links-out)
          (send item :set-from-delta delta)
          (send item :init nil)
          (setq delta (+ delta from-delta))))
      (and from-obj (send from-obj :set-links-out (cons link links-out)))
      (send to-obj :set-links-in (cons link links-in)))))
  (send g-pane :refresh))


(defmethod (data-model-editor :exit) ()
  (send self :bury))


(defmethod (data-model-editor :HELP) ()
  (help (format nil 2"~A~2%KEYSTROKE COMMANDS:~%~:{~%~:C~25T~*~A~}~%"*
              *general-documentation* *character-commands*)
        self))


(defmethod (data-model-editor :READ-DIAGRAM) ()
  (let ((file (get-pathname)))
    (when file
      (setq status-items nil)
      (send world :read-display-list file)
      (send g-pane :refresh))))


(defmethod (data-model-editor :SIM-RESUME) ()
  (send (symeval-in-stack-group 'terminal-io (send dme::2SIMULATOR *:stack-group)) :force-kbd-input #\resume)
  (process-wait 2"Simulator Resume"* #'(lambda (window)
                                        (not (send window :listen)))
                self))

(defmethod (data-model-editor :SIM-RUN-TO) ()
  (let ((time-step (get-line 2"Enter the time step for the next simulator breakpoint"*)))
    (and time-step (numberp (setq time-step (read-from-string time-step))) (user:run-to time-step))))


(DEFMETHOD (data-model-editor :WRITE-DIAGRAM) ()
  (let ((file (get-pathname)))
    (when file
      (send world :write-display-list file))))
```

```lisp
;;;-*- Mode: LISP; Package: DME; Base: 10.; Fonts: MEDFNT,HL12B,HL12BI  -*-

(defmethod (data-model-editor :MOVE-MODE) ()
  (send self :change-modes 'move-mode))


(defmethod (data-model-editor :MOVE-SELECTED-ENTITIES) (x y)
  (let ((ent (send world :pick-typed x y allowed-pick-types))
        height width x-off y-off)
    (cond ((zerop tv:mouse-last-buttons)
           (cond (ent (send self :add-to-selected-items ent))
                 (t   (send self :barf *no-entity-pick-error*))))
          (ent
           (send self :add-to-selected-items ent)
           (multiple-value (x-off y-off)
             (tv:sheet-calculate-offsets g-pane tv:mouse-sheet))
           (do ((button   tv:mouse-last-buttons tv:mouse-last-buttons)
                (x-pos    tv:mouse-x            tv:mouse-x)
                (y-pos    tv:mouse-y            tv:mouse-y)
                (grid-on? (send g-pane :grid-on))
                (mx       x)
                (my       y)
                (sprite   (send self :make-sprite x y)))
               ((zerop button)
                (send g-pane :delete-cursor sprite)
                (setq x (- mx x)
                      y (- my y)))
             (multiple-value (mx my)
               (send g-pane :untransform-point (- x-pos x-off) (- y-pos y-off)))
             (when grid-on?
               (multiple-value (mx my) (send g-pane :gridify-point mx my)))
             (send sprite :set-position mx my)
             (tv:mouse-wait x-pos y-pos button))
           (unless (and (zerop x) (zerop y))
             (let* ((entities selected-entities)
                    (links    (send self :get-links-that-reference entities))
                    (all      (append entities links)))
               (send self :unselect-all)
               (multiple-value-bind (bottom left right top) (send world :calculate-extents all nil)
                 (dolist (item entities)
                   (send item :move x y))
                 (dolist (item links)
                   (send item :init nil))
                 (multiple-value-bind (new-bottom new-left new-right new-top)
                     (send world :calculate-extents all nil)
                   (send g-pane :refresh-area
                         (min left new-left)   (min top new-top)
                         (max right new-right) (max bottom new-bottom))))))
           (send world :calculate-extents)
           (send self :change-modes 'move-mode))
          (t (multiple-value (x y width height) (send self :rubberband-rectangle x y))
             (send self :add-to-selected-items
                   (send self :items-in-area x y width height))))))
```

```
;1; -*- Mode: LISP; Package: DME; Base: 10.; Fonts: MEDFNT,HL12B,HL12BI  -*-*

;1; 5/19/86*

(defmethod (data-model-editor :DYNAMIC-STATUS-MODE) ()
  (send self :change-modes 'dynamic-status-mode))


(defmethod (data-model-editor :STATIC-STATUS-MODE) ()
  (send self :change-modes 'static-status-mode))


(defmethod (data-model-editor :CLEAR-STATUS) ()
  (setq status-items nil)
  (send g-pane :refresh))


(defmethod (data-model-editor :DYNAMIC-STATUS) (x y)
  (let ((ent (send world :pick-typed x y allowed-pick-types)))
    (cond (ent (and (or (typep ent 'machine-group) (typep ent 'machine-picture))
                    (setq ent (tv:menu-choose (mapcar #'(lambda (x)
                                                          (list
                                                            (2DMOS:OP-DESCRIPTION *(send x :operation))
                                                            :value x))
                                                      (append (send ent :links-in) (send ent :links-out)))))))
               (and ent
                    (setq ent (send ent :operation))
                    (not (memq ent status-items))
                    (setq status-items (cons ent (if (>= (length status-items) *max-status-items*)
                                                     (firstn (1- *max-status-items*) status-items)
                                                     status-items)))))
          (t   (send self :barf *no-object-pick-error*)))))


(defmethod (data-model-editor :STATIC-STATUS) (x y &aux machine process)
  (let ((ent (send world :pick-typed x y allowed-pick-types)))
    (cond ((or (typep ent 'machine-group) (typep ent 'machine-picture))
           (and (typep ent 'machine-group)
                (let ((objects-in-window (send world :objects-in-window)))
                  (send world :set-objects-in-window (send ent :items))
                  (setq ent (send world :pick x y ))
                  (send world :set-objects-in-window objects-in-window)))
           (and ent
                (setq machine (send ent :machine))
                (help
                  (format nil "Status for machine #~D:  ~A~2%
                           Machine capacity:  ~A~%
                           Machine status:  ~A~%
                           Mean time between failures:  ~A~%
                           Mean time to repair:  ~A~%
                           Track-machine-list: ~{~%~500T~A~}"
                      machine
                      2(dmos:m-name machine)*       ;ie: ar101
                      2(dmos:m-max-capacity machine)*
```

```
                              2(dmos:m-status machine)*
                              (user:daytime 2(dmos:m-mtbf machine)*)
                              (user:daytime 2(dmos:m-mttr machine)*)
                              (user:new-track-machine-list machine))
                       self)))
                     ;;;              (with-output-to-string (ss) (user:mv machine nil ss))
                     ;;;              self)))
                ((typep ent 'process-as-link)
                 (setq process (send ent :operation))
                 (help
                              Machine-type:  ~A~%
                              Machines:  ~A~%
                              Preceding process step:  ~A~%
                              Next process step:  ~A~%
                              Number of lots queued:   ~A~%
                              Number of lots processing:  ~A~%
                              ~@[Constraint starter~]"
              2  process
                (dmos:op-description process)
                (user:daytime (dmos:op-run-time process))
                (dmos:m-machine-type (car (dmos:op-machines process)))
                (dmos:op-machines process)
                (dmos:op-preceding-operation process)
                (dmos:op-next-operation process)
                (dmos:number-of-lots-on-queue process)
                (dmos:number-of-lots-in-process process)
                (dmos:op-constraint-starter process))*
          self))
;;;       ;1; Need to do this better.*
;;;       (with-output-to-string (ss) (dmos:pv-op process ss)))
         (t (send self :barf *no-object-pick-error*)))))


(defun TRACK-MACHINE-LIST (machine &aux list)
  (dolist (proc (2dmos:m-operations *machine) list)
    (push '(process ,proc queue ,(dmos:number-of-lots-on-queue proc) p-wait ,(2dmos:op-cumulative-wait *proc))
          list)))


;1; Changes the little process display in the pfd window.*
(defmethod (data-model-editor :UPDATE-STATUS) ()
  (declare (special gwin:hl12b-font))
  (dolist (item (send world :objects-in-window))
    (cond ((typep item 'machine-group)
           (dolist (sub-item (send item :items))
            (send g-pane :draw-string gwin:hl12b-font
                  (substring (dmos:m-status (send sub-item :machine)) 0 4)
                  (send sub-item :x-start) (send sub-item :y-start) gwin:black 0 8 1 tv:alu-seta)))
          ((typep item 'machine-picture)
           (send g-pane :draw-string gwin:hl12b-font
                 (substring (dmos:m-status (send item :machine)) 0 4)
                 (send item :x-start) (send item :y-start) gwin:black 0 8 1 tv:alu-seta))))
  (and status-items
```

```
(multiple-value-bind (left top right bottom) (send g-pane :inside-edges)
  (let* ((x *status-items-x-offset*)
         (y (- bottom *status-items-y-offset*)))
    (tv:prepare-sheet (g-pane)
      (tv:%draw-rectangle (- right x) (- bottom y) (- x *status-items-x-offset*) y tv:erase-aluf g-pane)
      (tv:sheet-string-out-explicit-1 g-pane (format nil 2"Current time step: ~D"* dmos:*current-time*)
                                      (+ x left) (+ y top) right bottom tv:current-font tv:char-aluf)
      (setq x *status-items-x-offset*
            y (+ y tv:line-height tv:line-height))
      (dolist (process status-items)
        (when process
          (tv:%draw-rectangle (- right x) (- bottom y) (- x *status-items-x-offset*) y tv:erase-aluf
                              g-pane)
          (tv:sheet-string-out-explicit-1 g-pane
                                          (format nil 2"Process #~*A2:  ~2%~*
                                                        2Number of lots being done:  ~A~%~*
                                                    2     Number of lots in queue:  ~A~%~*
                                                    2     'Cumulative wait:  ~A~%~*
                                                    2      ~@[Constraint process~]"*

                                              2(* 2DMOS:OP-DESCRIPTION PROCESS)*
                                              2(dmos:number-of-lots-in-process process)*
                                              2(dmos:number-of-lots-on-queue process)*
                                              2(dmos:op-cumulative-wait process)*
                                              2(dmos:op-constraint-member process))*
                                          (+ x left) (+ y top) right bottom tv:current-font tv:char-aluf
                                          Ø nil tv:line-height)
          (SETQ x (+ x *status-items-x-spacing*)))))))))


;1;-*- Mode: LISP; Package: DME; Base: 10.; Fonts: MEDFNT,HL12B,HL12BI  -*-*

;1; 5/19/86*

(defmethod (data-model-editor :DEFAULT-WINDOW) ()
   (send g-pane :default-window)
   (send g-pane :refresh))


(defmethod (data-model-editor :EXTENTS-WINDOW) ()
  (send g-pane :world-extents-window)
  (send g-pane :refresh))


(defmethod (data-model-editor :PAGE-DOWN) ()
  (send g-pane :pan Ø. (- (tv:sheet-inside-height g-pane) *page-overlap*))
  (send g-pane :refresh))


(defmethod (data-model-editor :PAGE-DOWN-HALF) ()
  (send g-pane :pan Ø. (// (float (tv:sheet-inside-height g-pane)) 2.))
  (send g-pane :refresh))
```

```
(defmethod (data-model-editor :PAGE-DOWN-QUARTER) ()
  (send g-pane :pan Ø. (// (float (tv:sheet-inside-height g-pane)) 4.))
  (send g-pane :refresh))

(defmethod (data-model-editor :PAGE-LEFT) ()
  (send g-pane :pan (- *page-overlap* (tv:sheet-inside-width g-pane)) Ø.)
  (send g-pane :refresh))

(defmethod (data-model-editor :PAGE-LEFT-HALF) ()
  (send g-pane :pan (// (float (tv:sheet-inside-width g-pane)) -2.) Ø.)
  (send g-pane :refresh))

(defmethod (data-model-editor :PAGE-LEFT-QUARTER) ()
  (send g-pane :pan (// (float (tv:sheet-inside-width g-pane)) -4.) Ø.)
  (send g-pane :refresh))

(defmethod (data-model-editor :PAGE-RIGHT) ()
  (send g-pane :pan (- (tv:sheet-inside-width g-pane) *page-overlap*) Ø.)
  (send g-pane :refresh))

(defmethod (data-model-editor :PAGE-RIGHT-HALF) ()
  (send g-pane :pan (// (float (tv:sheet-inside-width g-pane)) 2.) Ø.)
  (send g-pane :refresh))

(defmethod (data-model-editor :PAGE-RIGHT-QUARTER) ()
  (send g-pane :pan (// (float (tv:sheet-inside-width g-pane)) 4.) Ø.)
  (send g-pane :refresh))

(defmethod (data-model-editor :PAGE-UP) ()
  (send g-pane :pan Ø. (- *page-overlap* (tv:sheet-inside-height g-pane)))
  (send g-pane :refresh))

(defmethod (data-model-editor :PAGE-UP-HALF) ()
  (send g-pane :pan Ø. (// (float (tv:sheet-inside-height g-pane)) -2.))
```

```
  (send g-pane :refresh))


(defmethod (data-model-editor :PAGE-UP-QUARTER) ()
  (send g-pane :pan 0. (// (float (tv:sheet-inside-height g-pane)) -4.))
  (send g-pane :refresh))


(defmethod (data-model-editor :REDRAW) ()
  (send g-pane :refresh))


(defmethod (data-model-editor :WINDOW-AREA-MODE) ()
  (send self :change-modes 'window-area-mode))


(defmethod (data-model-editor :WINDOW-AREA-FROM) (x y)
  (cond ((not (zerop tv:mouse-last-buttons))
         (multiple-value-bind (x y dx dy) (send self :rubberband-rectangle x y)
           (unless (and (zerop dx) (zerop dy))
             (gwin:minf x (+ x dx))
             (gwin:minf y (+ y dy))
             (setq dx (abs dx)
                   dy (abs dy))
             (send g-pane :new-window x y dx dy)
             (send g-pane :refresh))))
        (t (send self :barf))))


(defmethod (data-model-editor :ZOOM-IN-HALF) ()
  (send g-pane :zoom 1.6 1.6)
  (send g-pane :refresh))


(defmethod (data-model-editor :ZOOM-IN-QUARTER) ()
  (send g-pane :zoom 1.25 1.25)
  (send g-pane :refresh))


(defmethod (data-model-editor :ZOOM-OUT-HALF) ()
  (send g-pane :zoom .625 .625)
  (send g-pane :refresh))


(defmethod (data-model-editor :ZOOM-OUT-QUARTER) ()
  (send g-pane :zoom .8 .8)
  (send g-pane :refresh))
```

```lisp
;1; -*- Mode: LISP; Package: DME; Base: 10.; Fonts: MEDFNT,HL12B,HL12BI -*-

(defmethod (data-model-editor :menu-command) (x y)
  x y
  (send self :choose-from-menu *command-menu*))


(defmethod (data-model-editor :select-item) (x y)
  (let ((height 0.)
        (width  0.))
    (when (not (zerop tv:mouse-last-buttons))
      (multiple-value (x y width height) (send self :rubberband-rectangle x y)))
    (send self :add-to-selected-items (send self :items-in-area x y width height))))


(defmethod (data-model-editor :select-orthogonal-point) (x y)
  (let ((previous-point (first (last selected-points))))
    (when previous-point
      (let ((previous-x  (first  previous-point))
            (previous-y  (second previous-point)))
        (cond ((not (zerop tv:mouse-last-buttons))
               (multiple-value (x y)
                 (send self :rubberband-line previous-x previous-y t)))
              ((< (abs (- x previous-x)) (abs (- y previous-y)))
               (setq x previous-x))
              (t (setq y previous-y)))
        (send g-pane :draw-line previous-x previous-y x y 0. gwin:black tv:alu-xor))))
  (setq selected-points (append selected-points '((,x ,y)))))


(defmethod (data-model-editor :system-menu-command) (x y)
  x y
  (tv:mouse-call-system-menu self))


(defmethod (data-model-editor :unselect-item) (x y)
  (let ((height 0.)
        (width  0.))
    (when (not (zerop tv:mouse-last-buttons))
      (multiple-value (x y width height) (send self :rubberband-rectangle x y)))
    (send self :remove-from-selected-items
               (send self :items-in-area x y width height))))


(defmethod (data-model-editor :unselect-point) (x y)
  x y
  (let ((last-point (first (last selected-points))))
    (when (setq selected-points (butlast selected-points))
      (let ((previous-point (first (last selected-points))))
        (send g-pane :draw-line (first previous-point) (second previous-point)
                                (first last-point)     (second last-point)
                                0. gwin:black tv:alu-xor)))))
```

```
;1;-*- Mode: LISP; Package: DME; Base: 10.; Fonts: MEDFNT,HL12B,HL12BI -*-*

;1; 5/19/86*

(defmethod (data-model-editor :ADD-TO-SELECTED-ITEMS)
           (entity-list &optional (highlight? t))
  2"Puts the specified items on the selected item list and highlights them on the display."*
  (when (and entity-list (nlistp entity-list))
    (setq entity-list (list entity-list)))
  (dolist (item entity-list)
    (when (not (memq item selected-entities))
      (push item selected-entities)
      (when highlight?
        (when (listp item)
          (setq item (first item)))
        (send item :highlight g-pane)))))


(defmethod (data-model-editor :BARF) (&optional (message nil))
  (barf message self))


(defmethod (data-model-editor :CHANGE-MODES)
           (mode-name &optional (submode? nil) (include-defaults? t) (general-doc nil))
  (let ((mode-list (assq mode-name *mode-alist*)))
    (when mode-list
      (let ((cursor-def (second mode-list)))
        (send tracker :set-character (first cursor-def) (second cursor-def))
        (send tracker :set-offset    (third cursor-def) (fourth cursor-def)))
      (send g-pane :mouse-standard-blinker)
      (setq allowed-pick-types (fourth mode-list)
            mouse-commands     (third mode-list))
      (when include-defaults?
        (setq mouse-commands (append mouse-commands *default-mouse-commands*)))
      (let ((prompt-text nil)
            doc-list)
        (dolist (x mouse-commands)
          (setq doc-list (selectq (first x)
                           (#\mouse-1-1 '(:mouse-1-1 ,(third x)))
                           (#\mouse-1-2 '(:mouse-1-2 ,(third x)))
                           (#\mouse-2-1 '(:mouse-2-1 ,(third x)))
                           (#\mouse-2-2 '(:mouse-2-2 ,(third x)))
                           (#\mouse-3-1 '(:mouse-3-1 ,(third x)))
                           (#\mouse-3-2 '(:mouse-3-2 ,(third x)))))
          (unless (memq (first doc-list) prompt-text)
            (setq prompt-text (append prompt-text doc-list))))
        (when general-doc
          (setq prompt-text (append prompt-text '(:documentation ,general-doc))))
        (send g-pane :set-prompt-text prompt-text))
      (unless submode?
        (setq current-mode mode-name)
        (send self :unselect-all)))))
```

```
(defmethod (data-model-editor :CHARACTER-COMMAND) (char)
  (let ((message (second (assq char *character-commands*))))
    (cond (message (send self message))
          (t       (send self :beep)))))


(defmethod (data-model-editor :CHOOSE-FROM-MENU) (menu)
  (let ((message (cond ((symbolp menu)  (tv:lisa-choose (eval menu)))
                       (t               (unwind-protect (send menu :choose)
                                          (send menu :deactivate))))))
    (cond ((eq (first message) :menu)
           (send self :choose-from-menu (second message)))
          (message
           (send self :send-if-handles (second message))))))


(defmethod (data-model-editor :ERROR-RESET) ()
  (send self :change-modes current-mode))


(defmethod (data-model-editor :GET-LINKS-THAT-REFERENCE)
           (&optional (items selected-entities))
  (declare (special items))
  (when (and items (nlistp items))
    (setq items (list items)))
  (mapcan #'(lambda (item)
              (when (and (typep item 'process-as-link)
                         (or (memq (send item :from-object) items)
                             (memq (send item :to-object)   items)))
                (list item)))
          (send world :display-list)))


(defmethod (data-model-editor :INHIBIT-OUTPUT-FOR-ABORT-P) ()
  t)


(defmethod (data-model-editor :AFTER :INIT) (ignore)
  (setq g-pane  (send self :get-pane 'g-pane)
        cursor  (send g-pane :add-cursor 'gwin:block-cursor
                      :visibility nil :window g-pane)
        tracker (send g-pane :add-cursor 'gwin:cursor
                      :visibility nil :window g-pane)
        world   (send g-pane :world))
  (send g-pane :set-tracker-cursor tracker)
  (unless current-mode
    (setq current-mode 'null-mode))
  (send self:change-modes current-mode))


(defmethod (data-model-editor :ITEMS-IN-AREA) (x y width height)
  (let ((items nil))
```

```
    (cond ((or (zerop width) (zerop height))
           (let ((item (send world :pick-typed x y allowed-pick-types)))
             (when item (push item items))))
          (t (setq x      (min x (+ x width))
                   y      (min y (+ y height))
                   width  (+ x (abs width))
                   height (+ y (abs height)))
             (dolist (item (send world :objects-in-window))
               (when (and (or (null allowed-pick-types)
                              (memq (typep item) allowed-pick-types))
                          (send item :inside-p x y width height))
                 (push item items)))))
    items))


(defmethod (data-model-editor :MAKE-SPRITE) (x y &optional (items selected-entities))
  2"Make the specified objects into a sprite cursor.
Useful for copying objects in a 'what you see is what you get type of mode."*
  (when (and items (nlistp items))
    (setq items (list items)))
  (when items
    (let (xmin ymin xmax ymax dx dy)
      (multiple-value (ymax xmin xmax ymin) (send world :calculate-extents items nil))
      (setq dx (- x xmin)
            dy (- y ymin))
      (multiple-value (dx dy) (send g-pane :transform-deltas dx dy))

      (gwin:make-sprite-from-objects g-pane items
                                     :bottom-flag nil
                                     :left-flag   nil
                                     :right-flag  nil
                                     :top-flag    nil
                                     :visibility  :on
                                     :x-offset    dx
                                     :x-position  x
                                     :y-offset    dy
                                     :y-position  y))))


(defmethod (data-model-editor :MENU-BLIP) (menu-blip)
  (let ((message (send (fourth menu-blip) :execute (second menu-blip))))
    (cond (message (send self message))
          (t       (send self :beep)))))


(defmethod (data-model-editor :MOUSE-BLIP) (mouse-blip)
  (let ((message (second (assq (second mouse-blip) mouse-commands))))
    (cond (message (send self message (fourth mouse-blip) (fifth mouse-blip)))
          (t       (send self :beep)))))


(defmethod (data-model-editor :NO-OP) (&rest ignore)
  )
```

```
(defmethod (data-model-editor :REMOVE-FROM-SELECTED-ITEMS)
           (&optional (entity-list selected-entities))
  2"Removes the specified items from the selected item list and unhighlights them."*
  (when (and entity-list (nlistp entity-list))
    (setq entity-list (list entity-list)))
  (dolist (item entity-list)
    (setq selected-entities (delq item selected-entities))
    (when (listp item)
      (setq item (first item)))
    (send item :unhighlight g-pane)))


(defmethod (data-model-editor :REPLACE-ITEMS)
           (old-items new-items &optional (redraw :all))
  (let* ((links     (send self :get-links-that-reference old-items))
         (new-links (mapcar #'(lambda (item)
                                (send (setq item (send item :copy)) :init nil)
                                item)
                            links)))
    (send world :replace-entity (append old-items links) (append new-items new-links))
    (cond ((eq redraw :all)
           (multiple-value-bind (bottom left right top)
               (send world :calculate-extents
                     (append old-items new-items links new-links) nil)
             (send g-pane :refresh-area left top right bottom)))
          ((eq redraw :items-only)
           (multiple-value-bind (bottom left right top)
               (send world :calculate-extents (append old-items new-items) nil)
             (send g-pane :refresh-area left top right bottom))))))


(defmethod (data-model-editor :RUBBERBAND-LINE) (x y &optional (orthogonal? nil))
  (multiple-value-bind (x-off y-off) (tv:sheet-calculate-offsets g-pane tv:mouse-sheet)
    (do ((button    tv:mouse-last-buttons tv:mouse-last-buttons)
         (x-pos     tv:mouse-x            tv:mouse-x)
         (y-pos     tv:mouse-y            tv:mouse-y)
         (grid-on? (send g-pane :grid-on))
         (mx        x)

         (my        y))
        ((zerop button)
         (values mx my))
      (multiple-value (mx my)
        (send g-pane :untransform-point (- x-pos x-off) (- y-pos y-off)))
      (when grid-on?
        (multiple-value (mx my)
          (send g-pane :gridify-point mx my)))
      (when orthogonal?
        (cond ((< (abs (- x mx)) (abs (- y my)))  (setq mx x))
              (t                                  (setq my y))))
```

```
      (send g-pane :draw-line x y mx my Ø. gwin:black tv:alu-xor)
      (tv:mouse-wait x-pos y-pos button)
      (send g-pane :draw-line x y mx my Ø. gwin:black tv:alu-xor))))


(defmethod (data-model-editor :RUBBERBAND-RECTANGLE) (x y)
  (multiple-value-bind (x-off y-off) (tv:sheet-calculate-offsets g-pane tv:mouse-sheet)
    (do ((button tv:mouse-last-buttons tv:mouse-last-buttons)
         (x-pos  tv:mouse-x            tv:mouse-x)
         (y-pos  tv:mouse-y            tv:mouse-y)
         (mx     x)
         (my     y)
         (width  1.)
         (height 1.))
        ((zerop button)
         (values x y width height))
      (multiple-value (mx my)
        (send g-pane :untransform-point (- x-pos x-off) (- y-pos y-off)))
      (setq width  (- mx x)
            height (- my y))
      (send g-pane :draw-rect x y width height Ø. gwin:black tv:alu-xor)
      (tv:mouse-wait x-pos y-pos button)
      (send g-pane :draw-rect x y width height Ø. gwin:black tv:alu-xor))))

            
(defmethod (data-model-editor :UNSELECT-ALL) ()
  (dolist (item selected-entities)
    (when (listp item)
      (setq item (first item)))
    (send item :unhighlight g-pane))
  (let ((previous-x nil)
        (previous-y nil)
        x y)
    (dolist (xy selected-points)
      (setq x (first  xy)
            y (second xy))
      (when (and previous-x previous-y)
        (send g-pane :draw-line previous-x previous-y x y Ø. gwin:black tv:alu-xor))
      (setq previous-x x
            previous-y y)))
  (setq selected-entities nil
        selected-points   nil))


;;; -*- Mode:LISP; Package:DME; Base:1Ø.; Patch-File:T; Fonts: MEDFNT,HL12B,HL12BI -*-

 (DEFMETHOD (gwin:draw-mixin :draw-picture-list) (items &optional (world nil))
   "2This method draws a list of graphic entities in the window.
Clipping is performed on each item and a check is done to see if the item is too small to bother drawing in detail.  T is
returned if the drawing is not interrupted,otherwise NIL*."
   (DECLARE (RETURN-LIST drawn-without-interruption?))
   (SETQ items (REVERSE items))
```

```
(LET (big-items botm delta deltax deltay left right top x x1 y y1)
  (MULTIPLE-VALUE (left top right botm) (SEND SELF :inside-edges))
  (MULTIPLE-VALUE (left top)            (SEND SELF :untransform-point left top))
  (MULTIPLE-VALUE (right botm)          (SEND SELF :untransform-point right botm))
  (AND (LOOP FOR item IN items
             WHEN (AND gwin:allow-interrupts? (SEND self :listen)) RETURN nil
             UNLESS (SEND item :outside-p left top right botm)
             COLLECT item INTO window-items AND
             DO (MULTIPLE-VALUE (x y x1 y1) (SEND item :extents))
                (MULTIPLE-VALUE (deltax deltay)
                  (SEND SELF :transform-deltas (- x1 x) (- y1 y)))
                (SETQ delta (+ deltax deltay))
                (COND ((> delta gwin:min-dot-delta)
                       (SEND item :draw self)
                       (SETQ big-items (NCONC big-items (LIST item))))
                      ((> delta gwin:min-nil-delta)
                       (LET ((color   (OR (SEND item :edge-color)
                                          (SEND item :fill-color)))
                             (alu     (SEND item :alu)))
                         (WHEN color
                           (tv:prepare-sheet (self)
                             (gwin:draw-clipped-solid-triangle x y x y1 x1 y1 self color alu nil))))))
             FINALLY (WHEN world
                       (SEND world :set-objects-in-window window-items))
                     (RETURN t))
       (LOOP FOR item IN big-items
             WHEN (AND gwin:allow-interrupts? (SEND self :listen)) RETURN nil
             DO (SEND item :send-if-handles :foreground-draw self)
             FINALLY (RETURN t)))))


1;;;the following items are things that Dan had intended to add to the standard GWIN package for release 2.0
;;;that apparently didn't make it.  They may be added in release 3.0.*


(DEFCONST gwin:*arrow-height* 14.)

(DEFCONST gwin:*arrow-width* 8.)


;1; Definition of DRAW-MIXIN and methods for drawing objects with edges*
;1;*
;1; The DRAW-MIXIN flavor collects together functions and methods which actually draw on*
;1; a window;  MIN-DOT-DELTA and MIN-NIL-DELTA are used in determining whether the*
;1; drawn object will be big enough to actually be worth drawing.  ALLOW-INTERRUPTS?*
;1; is a flag that allows the drawing of a picture list to be interruptable.*
;1;*
;1; Objects with edges draw themselves by constructing a polyline representation of themselves,*
;1; then calling DRAW-POLYLINE with this representation. *
;1;*
```

```
(DEFMETHOD (gwin:world :pick-typed) (x y &optional (allowed-types nil))
  "2This returns the closest graphics object, of the allowed types, to the specified point.
The closest object is defined as the object whose edge is the closest to the* 2specified point.*"
  (WHEN (AND allowed-types (NLISTP allowed-types))
    (SETQ allowed-types (LIST allowed-types)))
  (LET ((distance     0.)
        (min-distance 99999.)
        (picked-item  nil)
        (pick-left    (- x gwin:current-pick-tolerance))
        (pick-right   (+ x gwin:current-pick-tolerance))
        (pick-top     (- y gwin:current-pick-tolerance))
        (pick-bottom  (+ y gwin:current-pick-tolerance)))
    (DOLIST (item (OR gwin:objects-in-window gwin:display-list))
      (WHEN (AND (OR (NULL allowed-types) (MEMQ (TYPEP item) allowed-types))
                 (NOT (SEND item :outside-p pick-left pick-top pick-right pick-bottom))
                 (< (SETQ distance (SEND item :distance x y)) gwin:current-pick-tolerance)
                 (< (ABS distance) min-distance))
        (SETQ min-distance (ABS distance)
              picked-item  item)))
    picked-item))

;;;(DEFFLAVOR gwin:draw-mixin ((gwin:min-dot-delta  6.)
;;;                            (gwin:min-nil-delta  2.)
;;;                            (gwin:allow-interrupts? nil))
;;;         ()
;;;   :settable-instance-variables
;;;  (:required-flavors tv:minimum-window)
;;;  (:required-methods :transform :transform-point :untransform-point)
;;;  (:documentation :mixin
;;;   "2Collects together the methods used to draw graphics objects in a window.*"))

(DEFMETHOD (gwin:draw-mixin :draw-arrow-head)
           (x y direction &optional (thickness 1.) (color gwin:black) (scale 1.) (alu tv:alu-ior))
  "2This method draws an arrow head at a point on a line pointing in the specified direction.
It does not draw the middle line since it can usually be drawn more efficiently as part of a larger line of polyline.*"
  (LET ((height   (* gwin:*arrow-height* scale))
        (width    (* gwin:*arrow-width*  scale))
        (x-points (MAKE-ARRAY 3. :type art-float))
        (y-points (MAKE-ARRAY 3. :type art-float)))
    (SELECTQ direction
      (:bottom  (ASET (- x width)  x-points 0.) (ASET (+ y height) y-points 0.)
                (ASET x            x-points 1.) (ASET y            y-points 1.)
                (ASET (+ x width)  x-points 2.) (ASET (+ y height) y-points 2.))
      (:left    (ASET (- x height) x-points 0.) (ASET (- y width)  y-points 0.)
                (ASET x            x-points 1.) (ASET y            y-points 1.)
                (ASET (- x height) x-points 2.) (ASET (+ y width)  y-points 2.))
      (:right   (ASET (+ x height) x-points 0.) (ASET (- y width)  y-points 0.)
                (ASET x            x-points 1.) (ASET y            y-points 1.)
                (ASET (+ x height) x-points 2.) (ASET (+ y width)  y-points 2.))
      (:top     (ASET (- x width)  x-points 0.) (ASET (- y height) y-points 0.)
                (ASET x            x-points 1.) (ASET y            y-points 1.)
                (ASET (+ x width)  x-points 2.) (ASET (- y height) y-points 2.)))
    (SEND SELF :draw-polyline x-points y-points thickness color 3. alu)))
```

```
(DEFMETHOD (gwin:draw-mixin :draw-string-centered)
           (font text x y &optional (color gwin:black) (tab 8.) (scale 1.) (alu tv:alu-ior))
  "2This method draws a string of text in the specified font centered around a point.*"
  (DECLARE (RETURN-LIST x-position y-position))
  (SETQ scale (FLOAT scale))
  (LET ((h-spacing (// (SEND font :horz-spacing) scale))
        (limit     (STRING-LENGTH text))
        (v-spacing (// (SEND font :vert-spacing) scale))
        x-max x-min y-max y-min)
    (MULTIPLE-VALUE (nil nil x-min y-min x-max y-max)
      (gwin:calculate-string-motion font text 0. 0. 0. tab scale))
    (SETQ y (- y (// (FLOAT (- y-max y-min)) 2.)))
    (COND ((<= limit 1.)
           (SETQ x (- x (// (FLOAT (- x-max x-min)) 2.)))
           (WHEN (PLUSP limit)
             (LET ((char (CHARACTER text)))
               (SELECTQ char

               (#\backspace (SETQ x (- x h-spacing)))
               (#\line      (SETQ y (+ y v-spacing)))
               (#\tab       (LET ((tb (* h-spacing tab)))
                              (SETQ x (* (// (ROUND (+ x tb)) (ROUND tb)) tb))))
               (otherwise   (MULTIPLE-VALUE-BIND (dx dy)
                                (SEND font :draw-character char x y self color scale alu)
                              (SETQ x (+ x dx)
                                    y (+ y dy))))))))
          (t (SETQ text (STRING text))
             (DO ((from 0. to)
                  (to   (OR (STRING-SEARCH-CHAR #\return text)    limit)
                        (OR (STRING-SEARCH-CHAR #\return text to) limit)))
                 ((>= from limit)
                  (SETQ x x-min))
               (MULTIPLE-VALUE (nil nil x-min nil x-max nil)
                 (gwin:calculate-string-motion font (SUBSTRING text from to) 0. 0. 0. tab scale))
               (SETQ x-min (- x (// (FLOAT (- x-max x-min)) 2.)))
               (DO ((from0 from to0)
                    (to0   (OR (STRING-SEARCH-SET gwin:special-chars text from to) to)
                           (OR (STRING-SEARCH-SET gwin:special-chars text to0 to) to)))
                   ((>= from0 to))
                 (MULTIPLE-VALUE (x-min y)
                   (SEND font :draw-string text x-min y self color from to scale alu))
                 (DO ()
                     ((OR (>= to0 to) (NOT (MEMQ (AREF text to0) gwin:special-chars))))
                   (SELECTQ (AREF text to0)
                     (#\backspace (SETQ x-min (- x-min h-spacing)))
                     (#\line      (SETQ y (+ y v-spacing)))
                     (#\tab       (LET ((tb (* h-spacing tab)))
                                    (SETQ x-min (* (// (ROUND (+ x-min tb))
                                                       (ROUND tb)) tb))))
                     (otherwise   nil))
                   (SETQ to0 (1+ to0))))
               (WHEN (AND (< to limit) (= (AREF text to) #\return))
                 (SETQ x-min x
                       y     (+ y v-spacing)))
               (SETQ to (1+ to))))))
  (VALUES x y))
```

```
;1;-*- Mode:LISP; Package:TV; Base:10; Fonts: MEDFNT,HL12B,HL12BI  -*-*-*

(defflavor lisa-choice-mixin
        ((choice-function       'lisa-choice-choose)
         (choice-indent-width   nil)
         (choice-spacing        nil)
         (choice-value          nil)
         (choices               nil)
         (margin-choices        (list (list 2"Cancel"* nil 'lisa-choice-cancel 0. 0.))))
        (borders-mixin top-box-label-mixin scroll-stuff-on-off-mixin margin-choice-mixin
         displayed-items-text-scroll-window window)
  :gettable-instance-variables
  :initable-instance-variables
  :settable-instance-variables
  (:default-init-plist :border-margin-width      5.
                       :borders                  5.
                       :blinker-p                nil
                       :font-map                 (list fonts:tr12b fonts:tr12bi)
                       :label                    nil
                       :more-p                   nil
                       :scroll-bar               2.
                       :vsp                      4.))


(defmethod (lisa-choice-mixin :adjustable-size-p) ()
  t)


(defmethod (lisa-choice-mixin :choose) (&optional (near-mode '(:mouse)))
  (setq choice-value nil)
  (let ((old-status (send self :status)))
    (unwind-protect
        (progn
          (expose-window-near self near-mode)
          (process-wait 2"Choose"* #'first (locate-in-instance self 'choice-value)))
      (send self :set-status old-status)))
  (cond ((listp choice-value) choice-value)
        (t                    (values nil choice-value))))


(defmethod (lisa-choice-mixin :enable-scrolling-p) ()
  (or scroll-bar-always-displayed
      (< (sheet-number-of-inside-lines self) (fill-pointer items))))


(defmethod (lisa-choice-mixin :after :init) (init-plist)
  init-plist
  (unless choice-indent-width
    (setq choice-indent-width (* line-height 4.)))
  (unless choice-spacing
    (setq choice-spacing (* line-height 2.)))
  (when choices
    (send self :set-choices choices)))
```

```
(defmethod (lisa-choice-mixin :mouse-click) (button x y)
  button
  (let ((line-no (sheet-line-no nil y))
        item)
    (when (and (>= y (sheet-inside-top))
               (<  y (+ (sheet-inside-top self)
                        (* (sheet-number-of-inside-lines self) line-height)))
               (listp (setq item (aref displayed-items line-no))))
      (handle-choice-button (rest1 item) x y item)
      t)))

 (defmethod (lisa-choice-mixin :print-item) (item line-no item-no)
   item-no
   (cond ((listp item)
          (let ((choice-types (choice-item-boxes (first item))))
            (setq cursor-x choice-indent-width)
            (dolist (box (rest1 item))
              (sheet-string-out self (choice-type-name (assq (choice-box-name box) choice-types)))
              (setf (choice-box-x2 box)
                    (draw-choice-box self (choice-box-x1 box) cursor-y (choice-box-state box)))
              (setq cursor-x (+ (choice-box-x2 box) choice-spacing)))))
         (t (send self :set-current-font 1.)
            (sheet-string-out self (choice-item-name (assq item choices)))
            (send self :set-current-font 0.)))
   (aset item displayed-items line-no))


 (defmethod (lisa-choice-mixin :reset-size)
            (&optional (new-width (sheet-inside-width self)) (max-num-lines 30.))
   (send self :set-inside-size
              new-width (* (min max-num-lines (fill-pointer items)) line-height)))


 (defmethod (lisa-choice-mixin :set-choices) (new-choices)
   (setq choices (copytree new-choices))
   (setf (fill-pointer items) 0.)
   (do ((choice-items choices (rest1 choice-items))
        choice choice-boxes)
       ((null choice-items))
     (setq choice        (first choice-items)
           choice-boxes  (choice-item-boxes choice))
     (array-push-extend items (choice-item-item choice))
     (when choice-boxes
       (do ((all-types   (mapcar 'first choice-boxes))
            (boxes             choice-boxes                       (rest1 boxes))
          * (choice-item (list choice))
            (x            choice-indent-width           (+ x choice-spacing))
            box box-key box-name box-state box-width)
           ((null boxes)
            (array-push-extend items (nreverse choice-item)))
         (setq box (first boxes))
         (when (eq (choice-type-on-positive-implications  box) t)
```

```
      (setf (choice-type-on-positive-implications  box) all-types))
    (when (eq (choice-type-on-negative-implications  box) t)
      (setf (choice-type-on-negative-implications  box) all-types))
    (when (eq (choice-type-off-positive-implications box) t)
      (setf (choice-type-off-positive-implications box) all-types))
    (when (eq (choice-type-off-negative-implications box) t)
      (setf (choice-type-off-negative-implications box) all-types))
    (setq box-key   (choice-type-keyword box)
          box-state nil)
    (when (listp box-key)
      (setq box-state (choice-box-state box-key)
            box-key   (choice-box-name  box-key))
      (setf (choice-type-keyword box) box-key))
    (setq box-name  (choice-type-name box)
          box-width (+ (sheet-string-length self box-name) (+ line-height char-width)))
    (incf x box-width)
    (when (>= x (sheet-inside-width self))
      (array-push-extend items (nreverse choice-item))
      (setq choice-item (list choice)
            x                  (+ choice-indent-width box-width)))
    (push (list box-key box-state choice-function (- x line-height) x)
          choice-item))))
(send self :decide-if-scrolling-necessary))

 (defmethod (lisa-choice-mixin :set-item-box-state)
           (box item y new-state &optional (from nil) (to nil))
   (when (and box (neq new-state (choice-box-state box)))
     (setf (choice-box-state box) new-state)
     (when ((= (sheet-inside-top self) y (sheet-inside-bottom self))
       (draw-choice-box self (choice-box-x1 box) y new-state))
     (let* ((key (choice-box-name box))
            (typ (assq key (choice-item-boxes (first item))))
            (neg (cond (new-state (choice-type-on-negative-implications  typ))
                       (t         (choice-type-off-negative-implications typ))))
            (pos (cond (new-state (choice-type-on-positive-implications  typ))
                       (t         (choice-type-off-positive-implications typ)))))
       (when (or neg pos)
         (unless from
           (setq from (sheet-line-no self y))
           (do ()
               ((or (< from Ø.) (nlistp (aref items from)))
                (incf from))
             (decf from)))
         (unless to
           (setq to (sheet-line-no self y))
           (do ()
               ((or (>= to (fill-pointer items)) (nlistp (aref items to))))
             (incf to)))
         (setq y (+ (* (- from top-item) line-height) (sheet-inside-top self)))
         (do ((i from (1+ i)))
             ((>= i to))
           (setq item (aref items i))
           (dolist (bx (rest1 item))
```

```
          (setq typ (choice-box-name bx))
          (unless (eq typ key)
            (when (memq typ neg)
              (send self :set-item-box-state bx item y nil from to))
            (when (memq typ pos)
              (send self :set-item-box-state bx item y t   from to))))
        (incf y line-height))))))


(defmethod (lisa-choice-mixin :who-line-documentation-string) ()
  2"Press any button on a box to turn it on or off."*)


(defun lisa-choice-cancel (&rest ignore)
  (declare (:self-flavor lisa-choice-mixin))
  (setq choice-value :cancel))


(defun lisa-choice-choose (box item y)
  (declare (:self-flavor lisa-choice-mixin))
  y
  (setq choice-value (list (choice-item-item (first item)) (choice-box-name box))))


(defun lisa-choice-multiple-choose (box item y)
  (declare (:self-flavor lisa-choice-mixin))
  (setq y (+ (sheet-inside-top) (* (sheet-line-no nil y) line-height)))
  (send self :set-item-box-state box item y (not (choice-box-state box))))


(defun lisa-choice-proceed (&rest ignore)
  (declare (:self-flavor lisa-choice-mixin))
  (setq choice-value (do ((boxes        nil)
                          (i            Ø. (1+ i))
                          (item         nil)
                          (limit        (array-active-length items))
                          (ret          nil))
                         ((>= i limit)
                          (when boxes
                            (push (nreverse boxes) ret))
                          (nreverse ret))
                       (setq item (aref items i))
                       (cond ((nlistp item) (when boxes
                                              (push (nreverse boxes) ret))
                                            (setq boxes (and item (list item))))
                             (t             (dolist (box (rest1 item))
                                              (when (choice-box-state box)
                                                (push (choice-box-name box) boxes))))))))

(defflavor temporary-lisa-choice-window () (temporary-window-mixin lisa-choice-mixin))
```

```
(defmethod (temporary-lisa-choice-window :after :deexpose) (&rest ignore)
  (or choice-value (lisa-choice-cancel)))


(defwindow-resource temporary-lisa-choice-window ()
        :initial-copies 0.
        :make-window    (temporary-lisa-choice-window)
        :reusable-when  :deactivated)


(defun lisa-choose
       (choices &optional (label nil) (near-mode '(:mouse)) (width 500.) (maxlines 30.) sup)
  (declare (return-list choices exit-reason))
  (unless sup
    (setq sup (cond ((eq (car near-mode) :window) (sheet-superior (second near-mode)))
                    (t                             mouse-sheet))))
  (using-resource (window temporary-lisa-choice-window sup)
    (send window :set-choice-function 'lisa-choice-choose)
    (send window :set-inside-size     width width)
    (send window :set-label            label)
    (send window :set-margin-choices  (list (list 2"Cancel"+ nil 'lisa-choice-cancel 0. 0.)))
    (send window :set-choices          choices)
    (send window :reset-size           width maxlines)
    (unwind-protect (send window :choose near-mode)
      (send window :deactivate))))


(defun lisa-multiple-choose
       (choices &optional (label nil) (near-mode '(:mouse)) (width 500.) (maxlines 30.) sup)
  (declare (return-list choices exit-reason))
  (unless sup
    (setq sup (cond ((eq (car near-mode) :window) (sheet-superior (second near-mode)))
                    (t                             mouse-sheet))))
  (dolist (choice-item choices)
    (dolist (type (choice-item-boxes choice-item))
      (when (and type (null (rest2 type)))
        (setf (rest2 type) (list nil t nil nil)))))
  (using-resource (window temporary-lisa-choice-window sup)
    (send window :set-choice-function 'lisa-choice-multiple-choose)
    (send window :set-inside-size     width width)
    (send window :set-label            label)
    (send window :set-margin-choices  (list (list 2"Cancel"+  nil 'lisa-choice-cancel  0. 0.)
                                            (list 2"Proceed"+ nil 'lisa-choice-proceed 0. 0.)))
    (send window :set-choices          choices)
    (send window :reset-size           width maxlines)
    (unwind-protect (send window :choose near-mode)
      (send window :deactivate))))
      (compile-flavor-methods temporary-lisa-choice-window)
```

```
;;-*- Mode:LISP; Package:TV; Patch-file:T; Base:10 ; Fonts: MEDFNT,HL12B,HL12BI1 *-*-

;1; 5/19/86*

(DEFMETHOD (graphics-mixin :draw-arc)
           (x-center y-center x-start y-start
            &optional (arc-angle 360.) (thickness 1.) (color gwin:black) (alu char-aluf))
  2"This method draws a hollow arc.
This is a portion of a circle which has a thickness."*
  (UNLESS (NULL color)
    (SETQ arc-angle (+ (\ (1- (FIX arc-angle)) 360.) (- arc-angle (FIX arc-angle))))
    (LET* ((dx          (- x-start x-center))
           (dy          (- y-start y-center))
           (radius      (gwin:dist x-center y-center x-start y-start))
           (num-points  (1+ (MIN 20. (MAX 7. (gwin:G-ROUND (* (SQRT radius) arc-angle .008))))))
           (start-angle (ATAN dy dx)))
      (SETQ arc-angle (* arc-angle gwin:radians-per-degree))
      (LET ((delta-angle (// arc-angle (1- num-points)))
            (x-points    (MAKE-ARRAY num-points :type #-3600 art-float #+3600 art-q))
            (y-points    (MAKE-ARRAY num-points :type #-3600 art-float #+3600 art-q)))
        (DO ((i     0.          (1+ i))
             (angle start-angle (- angle delta-angle)))
            ((>= i num-points))
          (ASET (+ x-center (* radius (COS angle))) x-points i)
          (ASET (+ y-center (* radius (SIN angle))) y-points i))
        (SEND SELF :draw-polyline x-points y-points thickness color num-points alu)))))


(DEFMETHOD (graphics-mixin :draw-polyline)
           (x-points y-points &optional (thickness 1.) (color gwin:black)
                                        (num-points (MIN (ARRAY-ACTIVE-LENGTH x-points)
                                                         (ARRAY-ACTIVE-LENGTH y-points)))
                                        (alu char-aluf))
  2"This method draws a polyline with a thickness.
This is actually a sequence of lines which are connected together."*
  (UNLESS (NULL color)
    (SETQ thickness (// (MAX 0. thickness) 2.0))
    (tv:prepare-sheet (self)
      (DO ((i      1. (1+ i))
           (i-1    0. (1+ i-1))
           (n      (1- num-points))
           (n-1    (- num-points 2.))
           (closed (AND (= (AREF x-points 0.) (AREF x-points (1- num-points)))
                        (= (AREF y-points 0.) (AREF y-points (1- num-points)))))
           (dx)  (dy)
           (x1)  (y1)  (x2)  (y2)  (x3)  (y3)
           (px1) (py1) (px2) (py2) (px3) (py3) (px4) (py4))
          ((>= i num-points))
        (SETQ x1 (AREF x-points i-1)  y1 (AREF y-points i-1)
              x2 (AREF x-points i)    y2 (AREF y-points i))
        (OR x1 y1 x2 y2 (RETURN nil))
        (COND ((= i 1.)
```

```
        (COND (closed (SETQ x3 (AREF x-points n-1)
                            y3 (AREF y-points n-1)))
              (t      (SETQ x3 x1
                            y3 y1)))
        (MULTIPLE-VALUE (dx dy) (gwin:line-deltas x3 y3 x1 y1 x2 y2 thickness))
        (SETQ px1 (- x1 dx)      py1 (- y1 dy)
              px2 (+ x1 dx)      py2 (+ y1 dy)))
       (t (SETQ px1 px3
                py1 py3
                px2 px4
                py2 py4)))
   (COND ((= i n) (COND (closed (SETQ x3 (AREF x-points 1.)
                                      y3 (AREF y-points 1.)))
                                          y3 y2))))
             (t       (SETQ x3 (AREF x-points (1+ i))
                            y3 (AREF y-points (1+ i)))))
      (OR x3 y3 (RETURN nil))
      (MULTIPLE-VALUE (dx dy) (gwin:line-deltas x1 y1 x2 y2 x3 y3 thickness))
      (SETQ px3 (- x2 dx)     py3 (- y2 dy)
            px4 (+ x2 dx)     py4 (+ y2 dy))
      (gwin:draw-clipped-solid-triangle px1 py1 px2 py2 px4 py4 self color alu nil)
      (gwin:draw-clipped-solid-triangle px1 py1 px3 py3 px4 py4 self color alu t)))))

(DEFMETHOD (graphics-mixin :draw-filled-arc)
           (x-center y-center x-start y-start
            &optional (arc-angle 360.) (color gwin:black) (alu char-aluf))
  2"This method draws a solid, filled in arc.
This is a sector of a circle which is filled in between the center and circumference."*
  (UNLESS (NULL color)
    (SETQ arc-angle (+ (\ (1- (FIX arc-angle)) 360.)
                       (- arc-angle (FIX arc-angle))))
    (LET* ((dx          (- x-start x-center))
           (dy          (- y-start y-center))
           (radius      (gwin:dist x-center y-center x-start y-start))
           (num-points  (MIN 20. (MAX 7. (gwin:G-ROUND (* (SQRT radius) arc-angle .008)))))
           (start-angle (ATAN dy dx))
           x2 y2 x3 y3)
      (SETQ arc-angle (* arc-angle gwin:radians-per-degree)
            x3         x-center
            y3         y-center)
      (tv:prepare-sheet (self)
        (LET ((delta-angle (// arc-angle num-points)))
          (DO ((i      1.                            (1+ i))
               (angle (- start-angle delta-angle) (- angle delta-angle))
               (x1    x-start                        x2)
               (y1    y-start                        y2))
              ((> i num-points))
            (SETQ x2 (+ x-center (* radius (COS angle)))
                  y2 (+ y-center (* radius (SIN angle))))
            (gwin:draw-clipped-solid-triangle
              x1 y1 x2 y2 x3 y3 self color alu (= i num-points))))))))
```

```
(DEFMETHOD (sheet :clear-string-centered) (string &optional (left  Ø.)
                                                            (right (sheet-inside-width  self))
                                                            (y-pos (- (sheet-cursor-y   self)
                                                                      (sheet-inside-top self))))
  (LET ((old-line-height line-height))
    (SETQ line-height (FONT-CHAR-HEIGHT current-font))
    (sheet-clear-string-centered self string left right y-pos)
    (SETQ line-height old-line-height)))


(DEFUN sheet-clear-string-centered (sheet string &optional (left  Ø.)
                                                          (right (sheet-inside-width sheet))
                                                          (y-pos (- (sheet-cursor-y   sheet)
                                                                    (sheet-inside-top sheet))))
  2"Clear enough space on SHEET to hold STRING centered between LEFT and RIGHT.
LEFT and RIGHT are relative to SHEET's margin.
Y-POS specifies the vertical position of the top of the output,
relative to SHEET's top margin.  The output may be multiple lines.
SHEET's current font, alu function and line height are used.
SHEET's cursor is left at the end of the string."*
  (LET ((wid    (- right left))
        (string (STRING string))
        slen swid)
    (MULTIPLE-VALUE (swid slen) (sheet-string-length sheet string Ø. nil wid))
    (sheet-clear-string sheet string Ø. slen)))


(defconst CHOICE-BOX-THICKNESS 3.)


(defun DRAW-CHOICE-BOX (sheet x y on-p
                        &optional (height (font-blinker-height (sheet-current-font sheet)))
                                  (width  height))
  (prepare-sheet (sheet)
    (let ((char-aluf  (sheet-char-aluf  sheet))
          (erase-aluf (sheet-erase-aluf sheet)))
      (%draw-rectangle width height x y char-aluf sheet)
      (when (not on-p)
        (let ((h1 (- height (* choice-box-thickness 2.)))
              (w1 (- width  (* choice-box-thickness 2.)))
              (x1 (+ x choice-box-thickness))
              (y1 (+ y choice-box-thickness)))
          (%draw-rectangle w1 h1 x1 y1 erase-aluf sheet)))))
  (values (+ x width) y))


(DEFMETHOD (margin-choice-mixin :after :set-font-map) (ignore)
  (SEND SELF :set-margin-choices margin-choices))


(declare-flavor-instance-variables (margin-choice-mixin)
(defselect MARGIN-CHOICE-REGION
```

```
(:refresh (region &optional erase-p)
 (when (not (zerop (margin-region-size region)))
   (multiple-value-bind (left top right bottom) (margin-region-area region)
     (prepare-sheet (self)
       (when erase-p
         (%draw-rectangle (- right left) (- bottom top) left top erase-aluf self))
       (%draw-rectangle (- right left) 1. left top char-aluf self))
     (setq top (+ top 2.))
     (do ((choices margin-choices (rest1 choices))
          (share   (and margin-choices (// (- right left) (length margin-choices))))
          (x       left (+ x share))
          (font    (cond ((typep margin-choice-font 'font) margin-choice-font)
                         ((fixnump margin-choice-font) (aref font-map margin-choice-font))
                         (t (aref font-map 0))))
          choice x0)
         ((null choices))
       (setq choice (car choices)
             font   (funcall (sheet-get-screen self) :parse-font-descriptor font)
             x0     (+ (send self :string-out-explicit (choice-box-name choice)
                             x top right nil font char-aluf 0 nil nil)
                       char-width))
       (setf (choice-box-x1 choice) x0)
       (setf (choice-box-x2 choice) (draw-choice-box self x0 top
                                                     (choice-box-state choice)
                                                     (font-blinker-height font)
                                                     (* (font-blinker-height font) 4.)))))))
(:mouse-moves (&rest ignore))
((:mouse-enters-region :mouse-leaves-region) (ignore))
(:mouse-click (x y region ignore)
 (handle-choice-button margin-choices x y region))
(:who-line-documentation-string (ignore)
  (let ((x (- mouse-x (sheet-calculate-offsets self mouse-sheet))))
    (dolist (box margin-choices)
      (and ( x (choice-box-x1 box))
           (< x (choice-box-x2 box))
           (return 2"press any button to select this choice."*)))))))
 (defmethod (basic-multiple-choice :set-choices)
            (new-choices &aux name-length choice-boxes max-x nitems new-label)
   (declare (return-list inside-width inside-height new-label))
   ;;
   ;; substitute the name of all types where needed
   ;;
   (let ((alltypes (mapcar 'car choice-types)))
     (dolist (choice-type choice-types)
       (and (eq (choice-type-on-positive-implications choice-type) t)
            (setf (choice-type-on-positive-implications choice-type) alltypes))
       (and (eq (choice-type-on-negative-implications choice-type) t)
            (setf (choice-type-on-negative-implications choice-type) alltypes))
       (and (eq (choice-type-off-positive-implications choice-type) t)
            (setf (choice-type-off-positive-implications choice-type) alltypes))
       (and (eq (choice-type-off-negative-implications choice-type) t)
            (setf (choice-type-off-negative-implications choice-type) alltypes))))
   ;;
```

```
;; now compute the length of the name needed
;;
(SETQ nitems 0
      name-length (IF item-name (+ char-width (sheet-string-length self item-name)) 0))
(DOLIST (choice new-choices)
  (SETQ nitems (1+ nitems))
  (AND (choice-item-name choice)
       (SETQ name-length (MAX name-length
                              (+ (sheet-string-length self (choice-item-name choice))
                                 char-width)))))
;;
;; make prototype boxes
;;
(do ((x name-length (+ x type-width))
     (types choice-types (cdr types))
     (type) (type-width))
    ((null types)
     (setq max-x (+ x char-width)))
  (setq type (car types)
        type-width (+ (sheet-string-length self (choice-type-name type)) char-width))
  (push (list (choice-type-keyword type) nil 'multiple-choice-choose
              (+ x (// type-width 2)) 177777)
        choice-boxes))
(LET ((maximum-possible-max-x (- (sheet-inside-width superior)
                                 (+ left-margin-size right-margin-size))))
  (WHEN (> max-x maximum-possible-max-x)
    ;; this will not fit inside the superior horizontally, so arrange to truncate.
    (DOLIST (box choice-boxes)
      (DECF (choice-box-x1 box) (- max-x maximum-possible-max-x)))
    (DECF name-length (- max-x maximum-possible-max-x))
    (SETQ max-x maximum-possible-max-x)))
;;
;; compute the new label
;;
(SETQ new-label (MAKE-ARRAY (// max-x char-width)
                            :type 'art-string
                            :leader-list '(0)))
(AND item-name (SETQ new-label (STRING-NCONC new-label item-name)))
(DOTIMES (i (1- (// (- name-length (sheet-string-length self item-name)) char-width)))
  (SETQ new-label (STRING-NCONC new-label #\space)))
(DOLIST (choice-type choice-types)
  (SETQ new-label (STRING-NCONC new-label #\sp (choice-type-name choice-type))))
;;
;; now fill in the items
;;
(AND (> nitems (ARRAY-LENGTH items))
     (ADJUST-ARRAY-SIZE items nitems))
(STORE-ARRAY-LEADER nitems items 0)
(DO ((choices new-choices (CDR choices))
     (i 0 (1+ i))
     (max-name-chars (// name-length char-width))
     (choice) (choice-item))
    ((NULL choices))
  (SETQ choice (CAR choices)
```

```
          choice-item (LIST (choice-item-item choice) (choice-item-name choice) nil))
      ;;
      ;; truncate each item name to fit the space available.
      ;;
      (IF (> (STRING-LENGTH (choice-item-name choice-item)) max-name-chars)
          (SETF (choice-item-name choice-item)
                (SUBSTRING (choice-item-name choice-item) 0 max-name-chars)))
      ;;
      ;; create a set of choice boxes for this item, copied from the prototypes.
      ;; the boxes' x positions are copied from the prototypes
      ;; so the order they are stored in for this choice-item does not matter.
      ;;
      (do ((boxes (choice-item-boxes choice) (cdr boxes))
           (box) (type) (initial-state))
          ((null boxes))
        (setq box (car boxes))
        (if (symbolp box)
            (setq type box
                  initial-state nil)
            (setq type (choice-box-name box)
                  initial-state (choice-box-state box)))
        (setq box (copylist (assq type choice-boxes)))
        (setf (choice-box-state box) initial-state)
        (push box (choice-item-boxes choice-item)))
      (aset choice-item items i))
    ;;
    ;; now we return some reasonable sizes
    ;;
    (prog () (return max-x (+ nitems line-height) new-label)))

(defun move-border (top-sheet window &optional (edge :top))
  (let ((movement-list        nil)
        (old-alist            (get-window-edge-alist top-sheet))
        (old-mouse-sheet      mouse-sheet)
        (old-selected-window selected-window)
        associated old on-p rectangle-list screen-editor-previous-alist
        window-and-edges window-edge-alist)
    (unwind-protect
        (let-globally ((who-line-process current-process))
          (mouse-set-sheet top-sheet)
          (setq old-alist                      (get-window-edge-alist top-sheet)
                screen-editor-previous-alist   old-alist
                window-edge-alist              old-alist
                window-and-edges               (assq window window-edge-alist))
          (delaying-screen-management
            (initialize-multiple-move-blinker top-sheet)
            (with-mouse-grabbed
              (multiple-value (movement-list on-p)
                (add-moving-window window-and-edges edge movement-list))
              (when on-p
```

```
(dolist (other-window-and-edges window-edge-alist)
  (when (setq associated (associated-corner-or-edge window-and-edges edge
                                                     other-window-and-edges))
    (setq movement-list (add-moving-window other-window-and-edges
                                           associated movement-list t)))))
(setq rectangle-list (construct-movement-rectangle-list movement-list))
(send multiple-move-blinker :set-rectangle-list rectangle-list)
(setq window-edge-alist (when movement-list
                          (do-multiple-move top-sheet window-edge-alist
                                            rectangle-list movement-list)))))
  (unless (eq window-edge-alist 'abort)
    (dolist (new window-edge-alist)
      (setq old (assq (first new) old-alist))
      (unless (equal (rest2 old) (rest2 new))
        (when (send (first new) :set-edges
                    (third new) (fourth new) (fifth new) (sixth new) :verify)
          (lexpr-funcall (first new) :set-edges (rest2 new)))))))
(blinker-set-visibility multiple-move-blinker nil)
(mouse-set-sheet old-mouse-sheet)
(send old-selected-window :select)
(send top-sheet :screen-manage-autoexpose-inferiors))))



;;; -*- Mode:LISP; Package:DME; Base:10; Fonts:(MEDFNT HL12B HL12BI) -*-

1;; HERE IS THE DEFINITION OF THE MOUSE BUTTONS.  SINCE THE MEANING OF THE
;; MOUSE BUTTONS IS DIFFERENT DEPENDING ON WHICH MODE WE'RE IN, THESE MOUSE
;; COMMANDS WILL MAP TO AN APPLICATION FUNCTION THAT WILL CALL THE
;; APPROPRIATE METHOD.

(defcommand mouse-1-1 (mouse-blip)
            '(:description "User hit left button once"
              :keys (#\mouse-1-1)
              :arguments (ucl:kbd-input)
              :active-in-display? nil)
  (SEND tv:selected-window ':mouse-blip mouse-blip))

(defcommand mouse-1-2 (mouse-blip)
            '(:description "User hit left button once"
              :keys (#\mouse-1-2)
              :arguments (ucl:kbd-input)
              :active-in-display? nil)
  (SEND tv:selected-window ':mouse-blip mouse-blip))

(defcommand mouse-2-1 (mouse-blip)
            '(:description "User hit left button once"
              :keys (#\mouse-2-1)
              :arguments (ucl:kbd-input)
              :active-in-display? nil)
  (SEND tv:selected-window ':mouse-blip mouse-blip))
```

```
(defcommand mouse-2-2 (mouse-blip)
            '(:description "User hit middle button twice"
              :keys (#\mouse-2-2)
              :arguments (ucl:kbd-input)
              :active-in-display? nil)
  (SEND tv:selected-window ':mouse-blip mouse-blip))

(defcommand*mouse-3-1 (mouse-blip)
            '(:description "User hit right button once"
              :keys (#\mouse-3-1)
              :arguments (ucl:kbd-input)
              :active-in-display? nil)
  (SEND tv:selected-window ':mouse-blip mouse-blip))

(defcommand mouse-3-2 ()
            '(:description "User hit right button twice"
              :keys (#\mouse-3-2)
              :active-in-display? nil)
  (tv:mouse-call-system-menu))

1;; THIS NEXT SECTION DESCRIBES THE COMMANDS FOR THE PRIMARY DME EDITOR *
;1; MENU.  THESE COMMANDS WILL BE PUT IN A MENU WHICH WILL BE USED FOR*
;1; THE MIDDLE PANE IN SUGGESTIONS MODE.*

(make-command machine-picture-mode
               '(:description "Switch mode to allow ADDING new Data Model Entities"
                 :documentation *machine-picture-doc*
                 :keys (#\meta-e)
                 :names ("Add New Box")
                 :definition (:method data-model-editor :machine-picture-mode)))

(make-command delete-mode
               '(:description "Switch mode to allow DELETION of Entities or Links"
                 :documentation *delete-mode-doc*
                 :keys (#\meta-d #\delete)
                 :names ("Delete Box or Link")
                 :definition (:method data-model-editor :delete-mode)))

(make-command move-mode
               '(:description "Move Data Model Entites and associzted links"
                 :documentation *move-mode-doc*
                 :keys (#\meta-m)
                 :names ("Move Boxes")
                 :definition (:method data-model-editor :move-mode)))

(make-command link-mode
               '(:description "Link Data Model Entites"
                 :documentation *link-mode-doc*
                 :keys (#\meta-a)
                 :names ("Link Boxes")
                 :definition (:method data-model-editor :link-mode)))
```

```
(make-command level-of-detail
              '(:description "Physical, Logical, or Strategic?"
                :documentation *level-of-detail-doc*
                :keys (#\control-d)
                :names ("Level of Detail")
                :definition (:method data-model-editor :set-new-level-of-detail)))

(make-command clear-data-model
              '(:description "Initialize the Current Data Model to NIL"
                :documentation *clear-doc*
                :keys (#\clear-input #\control-meta-i)
                :names ("Clear Data Model")
                :definition (:method data-model-editor :clear-data-model)))

(make-command go-to-nce
              '(:description "Switch over to the Navigation Chart Editor"
                :documentation *go-to-nce-doc*
                :keys (#\control-meta-n)
                :names ("Go To NCE")
                :definition (:method data-model-editor :show-navigation-chart)))

1;; The following commands are common to all the tools are are gathered in a single
;; command table (notice that these commands are on all 4 primary menus).*

(make-command redraw-diagram
              '(:description "Redraw the Current Diagram"
                :documentation *redraw-doc*
                :keys (#\clear-screen #\control-r)
                :names ("Redraw Diagram")
                :definition (:method data-model-editor :redraw)))

(make-command toggle-crosshair
              '(:description "Toggle the Cursor Crosshair On or Off"
                :documentation *toggle-crosshair-doc*
                :keys (#\control-meta-c)
                :names ("Toggle Crosshair")
                :definition (:method data-model-editor :toggle-crosshair)))

(make-command toggle-grid
              '(:description "Toggle the Grid On or Off"
                :documentation *toggle-grid-doc*
                :keys (#\control-meta-g)
                :names ("Toggle Grid")
                :definition (:method data-model-editor :toggle-grid)))

(make-command new-x-grid
              '(:description "Change the distance between X grid dots"
                :documentation *new-grid-doc*
                :keys (#\control-meta-x)
                :names ("Change X Grid")
                :definition (:method data-model-editor :set-new-grid-x-spacing)))

(make-commanu new-y-grid
              '(:description "Change the distance between Y grid dots"
                :documentation *new-grid-doc*
```

```
            :keys (#\control-meta-y)
            :names ("Change Y Grid")
            :definition (:method data-model-editor :set-new-grid-y-spacing)))

(make-command move-top-border
            '(:description "Move the Upper Border of the Current Window"
              :documentation *move-border-doc*
              :keys (#\meta-b)
              :names ("Move Top Border")
              :definition (:method data-model-editor :move-top-border)))

(make-command move-bottom-border
            '(:description "Move the Lower Border of the Current Window"
              :documentation *move-border-doc*
              :keys (#\control-meta-b)
              :names ("Move Bottom Border")
              :definition (:method data-model-editor :move-bottom-border)))

(make-command exit
            '(:description "Exit This Tool"
              :documentation *exit-doc*
              :keys (#\control-z)
              :names ("Exit")
              :definition (:method data-model-editor :exit)))

(setq windowing-menu-setup
      '("Windowing Menu" :suggestions-menu windowing-menu
        :documentation
        "Menu of commands to zoom, pan, or alter window"))

(build-menu 'dme-primary-menu 'data-model-editor
          :item-list-order
          '(machine-picture-mode toggle-crosshair redraw-diagram    ,windowing-menu-setup
            link-mode      toggle-grid      clear-data-model  level-of-detail
            delete-mode    new-x-grid       move-top-border   go-to-nce
            move-mode      new-y-grid       move-bottom-border exit))

1;; THE FOLLOWING STUFF DEFINES THE COMMANDS FOR THE WINDOWING SUBMENU*

(defcommand page-left-some (direction)
            '(:description "Page Viewing Area Left via a Menu Selection"
              :documentation *page-doc*
              :keys (#\hand-left)
              :names ("Page Left")
              :arguments ('left))
   (send tv:selected-window ':paging direction))

(defcommand page-right-some (direction)
            '(:description "Page Viewing Area Right via a Menu Selection"
              :documentation *page-doc*
              :keys (#\hand-right)
              :names ("Page Right")
              :arguments ('right))
   (send tv:selected-window ':paging direction))
```

```
(defcommand page-up-some (direction)
             '(:description "Page Viewing Area Up via a Menu Selection"
               :documentation *page-doc*
               :keys (#\hand-up)
               :names ("Page Up")
               :arguments ('up))
   (send tv:selected-window ':paging direction))

   (defcommand page-down-some (direction)
               '(:description "Page Viewing Area down via a Menu Selection"
                 :documentation *page-doc*
                 :keys (#\hand-down)
                 :names ("Page Down")
                 :arguments ('down))
     (send tv:selected-window ':paging direction))

   (defcommand zoom-in-some (direction)
               '(:description "Zoom In via a Menu Selection"
                 :documentation *zoom-doc*
                 :keys (#\control-+)
                 :names ("Zoom In")
                 :arguments ('in))
    (send tv:selected-window ':zooming direction))

   (defcommand zoom-out-some (direction)
               '(:description "Zoom Out via a Menu Selection"
                 :documentation *zoom-doc*
                 :keys (#\control--)
                 :names ("Zoom Out")
                 :arguments ('out))
    (send tv:selected-window ':zooming direction))

   (make-command window-extents
               '(:description "Set the window around the entire picture"
                 :documentation *window-extents-doc*
                 :keys (#\control->)
                 :names ("Window Extents")
                 :definition (:method data-model-editor :extents-window)))

   (make-command default-window
               '(:description "Set the window back to original default area"
                 :documentation *default-window-doc*
                 :keys (#\control-<)
                 :names ("Default Window")
                 :definition (:method data-model-editor :default-window)))

   (make-command box-in-window
               '(:description "Window down to the area which you box in"
                 :documentation *box-in-window-doc*
                 :keys (#\meta-w)
                 :names ("Box Window")
                 :definition (:method data-model-editor :window-area-mode)))
```

```
(build-menu 'windowing-menu 'data-model-editor
           :item-list-order
              '(zoom-in-some       page-left-some       page-up-some
                zoom-out-some      page-right-some      page-down-some
                default-window     window-extents       box-in-window))

1;; DEFINE THE COMMANDS FOR THE TOP SUGGESTIONS MENU*

(defcommand suggestions-menu-command ()
           '(:description "Menu of Tools to Alter Suggestions Menus"
             :keys (#\control-s)
             :names ("Menu Tools"))
  (zwei:com-menu-tools-select))

(make-command help
              '(:description "General Overview of the Data Model Editor"
                :keys (#\control-help)
                :names ("Overview")
                :definition (:method data model-editor :help)))
  (build-menu 'dme-top-suggestions-menu 'data-model-editor
              :item-list-order '(("Data Model Edit" :font tv:*bold-suggestions-font*)
                                 suggestions-menu-command
                                 ("Primary Menu" :suggestions-menu dme-primary-menu
                                                 :documentation ,*primary-menu-doc*)
                                 help))

  1;;BUILD THE COMMANDS FOR THE BOTTOM OF THE SUGGESTIONS MENU*

  (make-command save-dme
                '(:description "Save the Current Data Model to a File"
                  :documentation *save-dme-doc*
                  :keys (#\control-meta-w)
                  :names ("Save DME")
                  :definition (:method data-model-editor :write-data-model)))

  (make-command retrieve-dme
                '(:description "Retrieve a Previously Loaded or Filed Data Model"
                  :documentation *retrieve-dme-doc*
                  :keys (#\control-meta-r)
                  :names ("Retrieve DME")
                  :definition (:method data-model-editor :read-data-model)))

  (make-command undo
                '(:description "Undo the Last Undoable Operation"
                  :documentation *undo-doc*
                  :keys (#\control-u)
                  :names ("Undo LAST Action")
                  :definition (:method data-model-editor :undo)))

  (build-menu 'dme-bottom-suggestions-menu 'data-model-editor
              :item-list-order '(save-dme retrieve-dme undo ucl:help-menu))  ;
```

```
(build-command-table 'dme-command-table
                     'data-model-editor
                     '(save-dme
                       retrieve-dme
                       machine-picture-mode
                       delete-mode
                       move-mode
                       link-mode
                       level-of-detail
                       clear-data-model
                       go-to-nce))

(build-command-table 'common-command-table
                     'data-model-editor
                     '(mouse-1-1 mouse-1-21  * 1    *  1;mouse commands*
                       mouse-2-1 mouse-2-2
                       mouse-3-1 mouse-3-2

                       new-x-grid              1  ;misc common commands*
                       new-y-grid
                       toggle-grid
                       toggle-crosshair
                       move-top-border
                       move-bottom-border
                       redraw-diagram
                       undo
                       ucl:help-menu
                       help
                       exit
                       suggestions-menu-command

                       zoom-in-some              1;windowing-menu commands*
                       zoom-out-some
                       page-left-some
                       page-right-some
                       page-up-some
                       page-down-some
                       window-extents
                       default-window
                       box-in-window))

1;;  GET EVERYTHING SETUP FOR SUGGESTIONS MODE. UCL MENUS ARE ACCEPTABLE HERE*

(zwei:initialize-suggestions-for-application data-model-edit
                                             dme-top-suggestions-menu
                                             dme-primary-menu
                                             dme-bottom-suggestions-menu)
```

```
;;; -*- Mode:LISP; Package:DME; Base:10; Fonts:(MEDFNT MEDFNB HL12BI) -*-

1;; This file contains the documentation for all the UCL commands that are
;; defined in dme-ucl (This was done to remove the clutter of the documen-
;; tation inside the commands themselves.*

(defconst *primary-menu-doc* "Primary Menu of Data Model Editor Commands")

(defconst *machine-picture-doc* "
                    Switch to Add Data Item Mode

  This mode will allow you to add new Data Model Item boxes plus a name tag which
  will be placed in the center of the box  The cursor will change into a shaded
  box to indicate that you are in this mode. Move the mouse to the position where
  the upper left corner of the box is to be placed.  A left click on the mouse will
  make the placement of the box and then will allow you to input of the description
  of this Data Model Entity via typing the text on the keyboard. Using the CARRIAGE
  RETURN key will allow you to create multiple line text.  When finished, hit the
  END key to complete the entry and the box will be adjusted to fit around the text.

  For more accurate placement, you can turn on the grid and/or the crosshair. See
  their respective menu entries and documentation")

(DEFCONST *delete-mode-doc* "
                    Delete Data Model Entites or Links

  This command will put the system into Delete Mode and is indicated by the
  cursor changing to an 'X'.  Now using the mouse, pointing at a data model and
  clicking will cause that model to be deleted in addition to all associated
  routing that was connected to it.  If you point at the routing and click,
  only that specific routing line will be deleted.

  NOTE:  Anything that is deleted can be gotten back via the 'UNDO' command.
         See the undo documentation for more information.")

(DEFCONST *move-mode-doc* "
                    Move Data Model Entites and associated links

  This command will put the system into Move Mode and is indicated by the
  cursor changing to a double arrow.  The purpose of this command is to
  move one or more Data Model Entites (boxes) and the associated routing
  lines.  This can be accomplished in several ways:

    o  To move a single entity -
         Put the cursor over the entity to be moved with the mouse. Now press
         the 1st mouse button and HOLD it there.  While holding the button
         down, move the mouse and 'drag' the object to it's new position.
         You will see the object move right along with the cursor.  When
         you release the button, the entity will be placed along with the
         new routing at this new location.

    o  To move several entities at once -
         Move the cursor to each entity that you want to move as a unit, and
```

```
   click the first mouse button. You will notice a 'finger' now pointing
   at each entity you've clicked on.  Clicking on a marked entity a second
   time will unmark it and the finger will go away.  When all entities
   to be moved are marked, go to any marked entity and move them all
   as if you were moving a single entity (see above).

 o Another way to move several entities at once -
   A rubberbanding box feature exists that will 'mark' all entites
   that are inside of the specified box.  After the entities are marked,
   again go to any marked entity and move it as if you were moving a
   single entity.

   To use the rubberbanding box, put the mouse cursor to the upper left
   corner for the box to be built.  The cursor must not be over a graphics
   entity (or you would just select it).  Now press the 1st
   mouse button and HOLD it down.  While holding the button down,
   move the mouse cursor to the bottom right corner for the box. A
   'rubberbanding' box will be following you around as you move.  When
   you have boxed in all the entities that are to be marked, release
   the mouse button and those entities will now be marked with 'fingers'")

(DEFCONST *link-mode-doc* "
                    Link Data Model Entites

 This command will put the system into Link Mode and is indicated by the
 cursor changing to a symbol resembling a 't' (it really is a link symbol).
 The purpose of this mode is to allow you to link (associate) two Data Model
 Entities together.

 First move the mouse cursor to the edge of the entity where you want to start
 a link and click the left mouse button.  A pop-up menu will appear giving
 allowing you to specify what type of link this is (one-to-many, many-to-one,
 always, sometimes, etc).

 Now move the mouse cursor to the edge of the entity that is to be linked
 to the previously marked entity, and click the left mouse button.  Again,
 a menu will appear to specify the type of link to put at this end. Upon
 completing the menu, a link (routing line) is drawn with the appropriate
 symbology automatically.

 Manual routing is supported if the auto routing is not acceptable, by
 clicking left with the mouse at the desired routing points BEFORE you
 click on the second entity edge.")

(DEFCONST *level-of-detail-doc* "
                   Change the Level of Detail for this Diagram

 This command will allow you to change the meaning of this mode to be either
 physical, logical, or strategic.  A menu will appear to allow you to make
 the appropriate selection.  The result will be only to draw the model
 in a different font (thicker or thinner boxes with a different fill color")

(DEFCONST *clear-doc* "
                   Initialize the Current Data Model to NIL
```

```
  This command will allow you to clear out the graphic display so that
  you can start all over.  A menu will appear to verify that this is what
  you want to do in case this command was involked by accident")

(DEFCONST *redraw-doc* "
                  Redraw the Current Diagram")

(DEFCONST *toggle-crosshair-doc* "
                    Toggle the Cursor Crosshair On or Off

  This feature puts a thin vertical and horizontal bar through the center of
  the cursor.  It is convienient for making precise placements of graphic
  objects such that they are lined up.  The grid feature is also useful for
  this purpose -- see it's documentation.

  Repetitive use of this command will turn the crosshair on and off.")

(DEFCONST *toggle-grid-doc* "
                   Toggle the Grid On or Off

  This command will put up a set of grid points on the screen such that a
  mouse click will hit on one of those points.  This facilitates neat
  placement of graphics objects.  The crosshair feature is also useful for
  this purpose -- see it's documentation.
  Repetitive use of this command will turn the grid on and off.")

(DEFCONST *new-grid-doc* "
                  Change the distance between grid dots

  A calculator will appear showing you the current grid setting.  Enter a new grid
  spacing value by either typing that value on the keyboard or by using the mouse
  on the calculator.  Selecting RETURN will accept the new (or unchanged) value.
  Selecting ABORT will terminate this command and leave the grid setting alone")

(DEFCONST *move-border-doc* "
                   Move the Border of the Display

  This command will allow you to shift the border of the current window by moving
  the mouse to the new border position and clicking a mouse button.  This is
  particularily useful when two different tools (windows) are displayed on the
  screen at the same time.")

(DEFCONST *go-to-nce-doc* "
                    Switch over to the Navigation Chart Editor

  This command will allow you to take the current loaded Data Model structure
  and use it to start a Navigation Chart Editor session.  You are given an
  option to load a different Navigation Chart model if desired by selecting
  a previously loaded navigation chart or specifying a file which contains one.")

(DEFCONST *exit-doc* "
                   Leave the Data Model Editor
```

```
This command cause the Data Model Edit session to be temporily suspended.  All
data is preserved, however you do need to save this model away to file for
permanent storage.  After exiting the Data Model Editor, simply select this
application again from the System Menu (or hit the SYSTEM-D keys) to bring
the Data Model Editor back right where you left off.")

(DEFCONST *page-doc* "
                    Page Viewing Area via a Menu Selection

 A secondary menu will appear that will allow you to decide how far you want
 to page.  You may select the default full, half, or quarter paging or you
 can specify exactly how far you want to page.  If you opt to specify the
 paging amount, a calculator will appear.  Then simply specify the number of
 pages that you want to move -- fractions of a page are OK (like 1.2)")

(DEFCONST *zoom-doc* "
                    Zooming In,Out via a Menu Selection

 A secondary menu will appear that will allow you to decide how much you want
 to zoom.  You may select the default double, full, half, or quarter paging or
 you can specify exactly how much you want to zoom.  If you opt to specify the
 zooming amount, a calculator will appear.  Then simply specify the magnitude
 of the zoom. Values must NOT be less than 1.  Values larger than 5 will likely
 zoom you outa' sight, but it's your choice.  Decimals ARE allowed.")

(DEFCONST *window-extents-doc* "
                   Set the window around the entire picture

 The window area will be redefined to include all objects that have been created
 on the work sheet, regardless of the current window configuration")

(DEFCONST *default-window-doc* "
                    Set the window back to original default area

 The window area will be redefined to include the default window area --
 the same size and location as when DME first starts up.")
```

```
(DEFCONST *box-in-window-doc* "
                  Window down to the area which you box in

  Move the mouse to the upper left corner of where the new window should start and
  HOLD the left mouse button down -- until you move the mouse to the bottom right
  corner of the new window.  Now RELEASE the left mouse button and the window will
  be zoomed into the boxed in area.  Note that you cannot zoom OUT with this
  operation -- use one of the zoom out, window-extents, or default-window
  selections.")

(defconst *save-dme-doc* "
                  Save the Current Data Model to a File

  Write the currently active Data Model out to file.  A default of the last retrieved
  file is offered or you may specify a new file name.  This is the only way that a
  Data Model can be permanently saved for later retrieval.")

(DEFCONST *retrieve-dme-doc* "
                  Retrieve a Previously Loaded or Filed Data Model
  You may select from a list of previously retrieved Data Models or you may you can
  opt to specify a file that has been previously saved. Note that the Data Model
  currently loaded is not clobbered as a result of this operation -- it is just
  inactivated.  Selecting that model again at a later point will allow it to be
  resumed.")

(DEFCONST *undo-doc* "
                     Undo the Last Undoable Operation

  You will be shown the last type of operation that was done.  Selection of this
  operation will cause the effect of that operation to be canceled.  This can be
  repeated for the 10 most recent operations that have been done.")


;;;-*- Mode: LISP; Package: DME; Base: 10.; Fonts: MEDFNT,HL12B,HL12BI -*-

(COMPILE-FLAVOR-METHODS data-model-edit gwin:bitblt-blinker tv:ged-calculator-menu)
```

```
;;; -*- Mode:Common-Lisp; Package:USER; Base:10; Fonts: medfnt,tr12b,tr12bi -*-

(defvar *previous-break* :unbound)

(defflavor sched-window ()
           (tv:window))

(defmethod (sched-window :who-line-documentation-string) ()
  '(:mouse-2-1  "menu of Bar Chart Display system commands"
    :mouse-3-1  "menu of system commands"))


(defmethod (sched-window :pause) ()
  (setq *previous-break* dmos:*next-break*)
  (setq dmos:*next-break* dmos:*current-time*))


(defmethod (sched-window :continue) ()
  (if (> *previous-break* dmos:*next-break*)
      (setq dmos:*next-break* *previous-break*))
  (send dme:pfd-window :sim-resume))

(defvar *operation-list*   :unbound)
(defvar *machine-list*     :unbound)
(defvar *logpoint-list*    :unbound)
(defvar *lot-list*         :unbound)
(defvar *time-to-exit*     nil)

(defvar *sleep-delay*      0)
(defvar *sleepy*           nil)

(defvar chart-window       :unbound)

(defvar graphit            nil)

(defvar left               :unbound)
(defvar bottom             :unbound)
(defvar middle             :unbound)

(defvar menu-value         :unbound)
(defvar structure-list     :unbound)
(defvar access-function1   :unbound)
(defvar access-function2   :unbound)

(defvar graph-type         :unbound)
(defvar graph-mode         :unbound)
(defvar graph-option       :unbound)
(defvar graph-title        :unbound)

(defvar x-axis-title       :unbound)
```

```
(defvar x-axis-labels      :unbound)
(defvar x-length           :unbound)
(defvar no-x-points        :unbound)
(defvar space-width        :unbound)
(defvar block-width        :unbound)
(defvar block-center       :unbound)

(defvar y1-axis-title      :unbound)
(defvar y1-axis-labels     :unbound)
(defvar y-length           :unbound)
(defvar y1-length          :unbound)
(defvar no-y1-points       :unbound)
(defvar y1-spacing-height  :unbound)
(defvar y1-scale-factor    :unbound)
(defvar block1-height      :unbound)
(defvar block1-color       :unbound)

(defvar y2-axis-title      :unbound)
(defvar y2-axis-labels     :unbound)
(defvar no-y2-points       :unbound)
(defvar y2-length          :unbound)
(defvar y2-spacing-height  :unbound)
(defvar y2-scale-factor    :unbound)
(defvar block2-height      :unbound)
(defvar block2-color       :unbound)

(defvar value-table        :unbound)

(defvar begin-time         :unbound)


;;; -*- Mode:Common-Lisp; Package:USER; Base:10; Fonts: MEDFNT,tr12B,tr12BI -*-

;;;("for all operations in the factory" :value 'all-ops-in-fact-q     )
;;;("for all machines in the factory"   :value 'all-mach-in-fact-q    )
;;;("for all operations in the factory" :value 'all-ops-in-fact-d     )
;;;("for all machines in the factory"   :value 'all-mach-in-fact-d    )
;;;("for all operations in the factory" :value 'all-ops-in-fact-qd    )
;;;("for all machines in the factory"   :value 'all-mach-in-fact-qd   )


(defvar graph-option-menu
        '(("Number of lots queued"
           :eval (loop
                   doing (setq dd (tv:menu-choose
                              '(("OPERATIONS"                        :no-select ignore       :font hl12bi)
                                ("for selected operations"           :value 'selected-ops-q     )
                                ("for all operations in a machine"   :value 'ops-in-mach-q      )
                                ("for all operations at a logpoint"  :value 'ops-at-logpt-q     )
                                ("during history of a operation"     :value 'op-history-q       )
                                (""                                  :no-select ignore          )
```

```
                  ("MACHINES"                          :no-select ignore      :font hl12bi)
                  ("for selected machines"             :value 'selected-mach-q        )
                  ("during history of a machine"       :value 'machine-history-q      )
                  (""                                  :no-select ignore              )
                  ("LOGPOINTS"                         :no-select ignore              )
                  ("for selected logpoints"            :value 'selected-logpt-q       )
                  ("for all logpoints in the factory"  :value 'all-logpts-in-fact-q   )
                  ("during history of a logpoint"      :value 'logpt-history-q        ))))
        until dd
        finally (return dd)))

("Numler of lots in process"
 :eval (loop
        doing (setq dd (tv:menu-choose
                 '(("OPERATIONS"                       :no-select ignore      :font hl12bi)
                  ("for selected operations"           :value 'selected-ops-d         )
                  ("for all operations in a machine"   :value 'ops-in-mach-d          )
                  ("for all operations at a logpoint"  :value 'ops-at-logpt-d         )
                  ("during history of a operation"     :value 'op-history-d           )
                  (""                                  :no-select ignore              )
                  ("MACHINES"                          :no-select ignore      :font hl12bi)
                  ("for selected machines"             :value 'selected-mach-d        )
                  ("during history of a machine"       :value 'machine-history-d      )
                  (""                                  :no-select ignore              )
                  ("LOGPOINTS"                         :no-select ignore              )
                  ("for selected logpoints"            :value 'selected-logpt-d       )
                  ("for all logpoints in the factory"  :value 'all-logpts-in-fact-d   )
                  ("during history of a logpoint"      :value 'logpt-history-d        ))))
        until dd
        finally (return dd)))

("Number of lots queued and in process"
 :eval (loop
        doing (setq dd (tv:menu-choose
                 '(("OPERATIONS"                       :no-select ignore      :font hl12bi)
                  ("for selected operations"           :value 'selected-ops-qd        )
                  ("for all operations in a machine"   :value 'ops-in-mach-qd         )
                  ("for all operations at a logpoint"  :value 'ops-at-logpt-qd        )
                  ("during history of a operation"     :value 'op-history-qd          )
                  (""                                  :no-select ignore              )
                  ("MACHINES"                          :no-select ignore      :font hl12bi)
                  ("for selected machines"             :value 'selected-mach-qd       )
                  ("during history of a machine"       :value 'machine-history-qd     )
                  (""                                  :no-select ignore              )
                  ("LOGPOINTS"                         :no-select ignore              )
                  ("for selected logpoints"            :value 'selected-logpt-qd      )

                  ("for all logpoints in the factory"  :value 'all-logpts-in-fact-qd  )
                  ("during history of a logpoint"      :value 'logpt-history-qd       ))))
        until dd
        finally (return dd)))))
```

```
(defun make-barchart (item)
  (selector (eval item) equal
    (('selected-ops-q)        (make-selected-ops-q))
    (('ops-in-mach-q)         (make-ops-in-mach-q))
    (('ops-at-logpt-q)        (make-ops-at-logpt-q))
    (('op-history-q)          (make-op-history-q))
    (('selected-mach-q)       (make-selected-mach-q))
    (('machine-history-q)     (make-mach-history-q))
    (('selected-logpt-q)      (make-selected-logpt-q))
    (('all-logpts-in-fact-q)  (make-all-logpts-in-fact-q))
    (('logpt-history-q)       (make-logpt-history-q))

    (('selected-ops-d)        (make-selected-ops-d))
    (('ops-in-mach-d)         (make-ops-in-mach-d))
    (('ops-at-logpt-d)        (make-ops-at-logpt-d))
    (('op-history-d)          (make-op-history-d))
    (('selected-mach-d)       (make-selected-mach-d))
    (('machine-history-d)     (make-mach-history-d))
    (('selected-logpt-d)      (make-selected-logpt-d))
    (('all-logpts-in-fact-d)  (make-all-logpts-in-fact-d))
    (('logpt-history-d)       (make-logpt-history-d))

    (('selected-ops-qd)       (make-selected-ops-qd))
    (('ops-in-mach-qd)        (make-ops-in-mach-qd))
    (('ops-at-logpt-qd)       (make-ops-at-logpt-qd))
    (('op-history-qd)         (make-op-history-qd))
    (('selected-mach-qd)      (make-selected-mach-qd))
    (('machine-history-qd)    (make-mach-history-qd))
    (('selected-logpt-qd)     (make-selected-logpt-qd))
    (('all-logpts-in-fact-qd) (make-all-logpts-in-fact-qd))
    (('logpt-history-qd)      (make-logpt-history-qd))))

;;;     (('all-ops-in-fact-q)      (make-))
;;;     (('all-machs-in-fact-q)    (make-))
;;;     (('all-ops-in-fact-d)      (make-))
;;;     (('all-machs-in-fact-d)    (make-))
;;;     (('all-ops-in-fact-qd)     (make-))
;;;     (('all-machs-in-fact-qd)   (make-))

;;; -*- Moue:Common-Lisp; Package:USER; Base:10; Fonts: MEDFNT,tr12b,tr12BI -*-

;;;    all-ops-in-fact-q
;;;    all-mach-in-fact-q
;;;
;;;    all-ops-in-fact-d
;;;    all-mach-in-fact-d
;;;
;;;    all-ops-in-fact-qd
;;;    all-mach-in-fact-qd

;;;(sort (loop for item in (loop
;;;                        doing (setq dd (tv:multiple-menu-choose *operation-list*
```

```
;;;                                                      "Select several operations:"
;;;                                                      '(:point 1000 400)))
;;;                          until dd
;;;                          finally (return dd))
;;;             collect (format nil "~A" item))
;;;          'string-lessp)

;;;(loop for item in structure-list
;;;                               collect (substring (format nil "~A" item) 3) into axis-list
;;;                               finally (return axis-list))
;;;*************************************************

(defun MAKE-SELECTED-OPS-Q (&aux dd)
  (make-operation-list)
  (setq menu-value (loop for item in (loop
                                       doing (setq dd (tv:multiple-menu-choose *operation-list*
                                                                                "Select several operations:"
                                                                                '(:point 1000 400)))
                                       until dd
                                       finally (return dd))
                         collect item))
  (setq structure-list   menu-value)
  (setq access-function1 'dmos:number-of-lots-on-queue)
  (setq access-function2 'do-nothing)
  (setq graph-title      (format nil "Number of lots queued vs. Logpoint Operations"))
  (setq graph-type       'dynamic)
  (setq graph-mode       'single)
  (setq x-axis-title     (format nil "Logpoint Operations"))
  (setq x-axis-labels    (loop for label in (sortcar (loop for item in structure-list
                                                   collect (list (parse-integer
                                                   (substring (format nil "~A" (dmos:op-log-point item)) 2))
                                                   (dmos:op-operation-number item)) into axis-list
                                                   finally (return axis-list))
                                                  '<)
                              collect (format nil "~A-~A" (car label) (cadr label)) into a-list
                              finally (return a-list)))
  (setq y1-axis-title    (format nil "Queued"))
  (setq y1-axis-labels   (range-list 0 15)) ;;;(maximum 'dmos:number-of-lots-on-queue structure-list)
  (setq y2-axis-title    nil)
  (setq y2-axis-labels   nil))


(defun MAKE-SELECTED-OPS-D (&aux dd)
  (make-operation-list)
  (setq menu-value (loop for item in (loop
                                       doing (setq dd (tv:multiple-menu-choose *operation-list*
                                                                                "Select several operations:"
                                                                                '(:point 1000 400)))
                                       until dd
                                       finally (return dd))
                         collect item))
  (setq structure-list   menu-value)
  (setq access-function1 'dmos:number-of-lots-in-process)
```

```
  (setq access-function2 'do-nothing)
  (setq graph-title      (format nil "Number of lots in process vs. Logpoint Operations"))
  (setq graph-type       'dynamic)
  (setq graph-mode       'single)
  (setq x-axis-title     (format nil "Logpoint Operations"))
  (setq x-axis-labels    (loop for label in (sortcar (loop for item in structure-list
                                                 collect (list (parse-integer
                                                 (substring (format nil "~A" (dmos:op-log-point item)) 2))
                                                 (dmos:op-operation-number item)) into axis-list
                                                 finally (return axis-list))
                                               '<)
                               collect (format nil "~A-~A" (car label) (cadr label)) into a-list
                               finally (return a-list))))
  (setq y1-axis-title    (format nil "Processing"))
  (setq y1-axis-labels   (range-list Ø 15)) ;;;(maximum 'dmos:number-of-lots-in-process structure-list)))
  (setq y2-axis-title    nil)
  (setq y2-axis-labels   nil))


(defun MAKE-SELECTED-OPS-QD (&aux dd)
  (make-operation-list)
  (setq menu-value (loop for item in (loop
                                      doing (setq dd (tv:multiple-menu-choose *operation-list*
                                                                              "Select several operations:"
                                                                              '(:point 1000 400)))

                                      until dd
                                      finally (return dd))
                         collect item))
  (setq structure-list   menu-value)
  (setq access-function1 'dmos:number-of-lots-on-queue)
  (setq access-function2 'dmos:number-of-lots-in-process)
  (setq graph-title      (format nil "Number of lots queued and in process vs. Logpoint Operations"))
  (setq graph-type       'dynamic)
  (setq graph-mode       'split)
  (setq x-axis-title     (format nil "Logpoint Operations"))
  (setq x-axis-labels    (loop for label in (sortcar (loop for item in structure-list
                                                 collect (list (parse-integer
                                                 (substring (format nil "~A" (dmos:op-log-point item)) 2))
                                                 (dmos:op-operation-number item)) into axis-list
                                                 finally (return axis-list))
                                               '<)
                               collect (format nil "~A-~A" (car label) (cadr label)) into a-list
                               finally (return a-list))))
  (setq y1-axis-title    (format nil "Queued"))
  (setq y1-axis-labels   (range-list Ø 15)) ;;;(max (maximum 'dmos:number-of-lots-on-queue structure-list)
                                            ;;;(maximum 'dmos:number-of-lots-in-process structure-list))))
  (setq y2-axis-title    (format nil "Processing"))
  (setq y2-axis-labels   y1-axis-labels))

;;;**************************************************

(defun MAKE-OPS-IN-MACH-Q (&aux dd)
  (make-machine-list)
```

```
  (setq menu-value       (loop
                           doing (setq dd (tv:menu-choose *machine-list*
                                                          "Select one machine:"
                                                          '(:point 1000 400)))
                           until dd
                           finally (return dd)))
  (setq structure-list   (dmos:m-operations menu-value))
  (setq access-function1 'dmos:number-of-lots-on-queue)
  (setq access-function2 'do-nothing)
  (setq graph-title      (format nil "Number of lots queued vs. Machine ~A"  menu-value))
  (setq graph-type       'dynamic)
  (setq graph-mode       'single)
  (setq x-axis-title     (format nil "Machine ~A" menu-value))
  (setq x-axis-labels    (loop for item in structure-list
                               collect (substring (format nil "~A" item) 3) into axis-list
                               finally (return axis-list)))
  (setq y1-axis-title    (format nil "Queued"))
  (setq y1-axis-labels   (range-list 0 15)) ;;;(maximum 'dmos:number-of-lots-on-queue structure-list)))
  (setq y2-axis-title    nil)
  (setq y2-axis-labels   nil))

(defun MAKE-OPS-IN-MACH-D (&aux dd)
  (make-machine-list)
  (setq menu-value       (loop
                           doing (setq dd (tv:menu-choose *machine-list*
                                                          "Select one machine:"
                                                          '(:point 1000 400)))
                           until dd
                           finally (return dd)))
  (setq structure-list   (dmos:m-operations menu-value))
  (setq access-function1 'dmos:number-of-lots-in-process)
  (setq access-function2 'do-nothing)
  (setq graph-title      (format nil "Number of lots in process vs. Machine ~A"  menu-value))
  (setq graph-type       'dynamic)
  (setq graph-mode       'single)
  (setq x-axis-title     (format nil "Machine ~A" menu-value))
  (setq x-axis-labels    (loop for item in structure-list
                               collect (substring (format nil "~A" item) 3) into axis-list
                               finally (return axis-list)))
  (setq y1-axis-title    (format nil "Processing"))
  (setq y1-axis-labels   (range-list 0 15)) ;;;(maximum 'dmos:number-of-lots-in-process structure-list)))
  (setq y2-axis-title    nil)
  (setq y2-axis-labels   nil))

(defun MAKE-OPS-IN-MACH-QD (&aux dd)
  (make-machine-list)
  (setq menu-value       (loop
                           doing (setq dd (tv:menu-choose *machine-list*
                                                          "Select one machine:"
                                                          '(:point 1000 400)))
```

```
                          until dd
                          finally (return dd)))
  (setq structure-list   (dmos:m-operations menu-value))
  (setq access-function1 'dmos:number-of-lots-on-queue)
  (setq access-function2 'dmos:number-of-lots-in-process)
  (setq graph-title      (format nil "Number of lots queued and in process vs. Machine ~A"  menu-value))
  (setq graph-type       'dynamic)
  (setq graph-mode       'split)
  (setq x-axis-title     (format nil "Machine ~A" menu-value))
  (setq x-axis-labels    (loop for item in structure-list
                               collect (substring (format nil "~A" item) 3) into axis-list
                               finally (return axis-list)))
  (setq y1-axis-title    (format nil "Queued"))
  (setq y1-axis-labels   (range-list Ø 15)) ;;;(max (maximum 'dmos:number-of-lots-on-queue structure-list)
                                            ;;;(maximum 'dmos:number-of-lots-in-process structure-list))))
  (setq y2-axis-title    (format nil "Processing"))
  (setq y2-axis-labels   y1-axis-labels))

;;;**************************************************

(defun MAKE-OPS-AT-LOGPT-Q (&aux dd)
  (make-logpoint-list)
  (setq menu-value        (loop
                           doing (setq dd (tv:menu-choose *logpoint-list*
                                                          "Select one logpoint:"
                                                          '(:point 1ØØØ 4ØØ)))
                           until dd
                           finally (return dd)))
  (setq structure-list    (dmos:lp-operations menu-value))
  (setq access-function1  'dmos:number-of-lots-on-queue)
  (setq access-function2  'do-nothing)
  (setq graph-title       (format nil "Number of lots queued vs. Logpoint ~A" menu-value))
  (setq graph-type        'dynamic)
  (setq graph-mode        'single)
  (setq x-axis-title      (format nil "Logpoint ~A" menu-value))
  (setq x-axis-labels     (loop for item in structure-list
                                collect (substring (format nil "~A" item) 3) into axis-list
                                finally (return axis-list)))
  (setq y1-axis-title     (format nil "Queued"))
  (setq y1-axis-labels    (range-list Ø 15)) ;;;(maximum 'dmos:number-of-lots-on-queue structure-list)))
  (setq y2-axis-title     nil)
  (setq y2-axis-labels    nil))

(defun MAKE-OPS-AT-LOGPT-D (&aux dd)
  (make-logpoint-list)
  (setq menu-value        (loop
                           doing (setq dd (tv:menu-choose *logpoint-list*
                                                          "Select one logpoint:"
                                                          '(:point 1ØØØ 4ØØ)))
                           until dd
                           finally (return dd)))
  (setq structure-list    (dmos:lp-operations menu-value))
  (setq access-function1  'dmos:number-of-lots-in-process)
  (setq access-function2  'do-nothing)
```

```
  (setq graph-title        (format nil "Number of lots in process vs. Logpoint ~A" menu-value))
  (setq graph-type         'dynamic)
  (setq graph-mode         'single)
  (setq x-axis-title       (format nil "Logpoint ~A" menu-value))
  (setq x-axis-labels      (loop for item in structure-list
                                 collect (substring (format nil "~A" item) 3) into axis-list
                                 finally (return axis-list)))
  (setq y1-axis-title      (format nil "Processing"))
  (setq y1-axis-labels     (range-list Ø 15)) ;;;(maximum 'dmos:number-of-lots-in-process structure-list)))
  (setq y2-axis-title      nil)
  (setq y2-axis-labels     nil))


(defun MAKE-OPS-AT-LOGPT-QD (&aux dd)
  (make-logpoint-list)
  (setq menu-value         (loop
                            doing (setq dd (tv:menu-choose *logpoint-list*
                                                           "Select one logpoint:"
                                                           '(:point 1000 400)))
                            until dd
                            finally (return dd)))
  (setq structure-list     (dmos:lp-operations menu-value))
  (setq access-function1   'dmos:number-of-lots-on-queue)
  (setq access-function2   'dmos:number-of-lots-in-process)
  (setq graph-title        (format nil "Number of lots queued vs. Logpoint ~A" menu-value))
  (setq graph-type         'dynamic)
  (setq graph-mode         'split)
  (setq x-axis-title       (format nil "Logpoint ~A" menu-value))
  (setq x-axis-labels      (loop for item in structure-list
                                 collect (substring (format nil "~A" item) 3) into axis-list
                                 finally (return axis-list)))
  (setq y1-axis-title      (format nil "Queued"))
  (setq y1-axis-labels     (range-list Ø 15)) ;;;(max (maximum 'dmos:number-of-lots-on-queue structure-list)
                                              ;;;(maximum 'dmos:number-of-lots-in-process structure-list))))
  (setq y2-axis-title      (format nil "Processing"))
  (setq y2-axis-labels     y1-axis-labels))

;;;*************************************************

(defun MAKE-OP-HISTORY-Q (&aux dd)
  (make-operation-list)
  (setq menu-value         (loop
                             doing (setq dd (tv:menu-choose *operation-list*
                                                            "Select one operation:"
                                                            '(:point 1000 400)))
                             until dd
                             finally (return dd)))
  (setq structure-list     (list menu-value))
  (setq access-function1   'dmos:number-of-lots-on-queue)
  (setq access-function2   'do-nothing)
  (setq graph-title        (format nil "History of operation ~A" menu-value))
  (setq graph-type         'history)
  (setq graph-mode         'single)
  (setq x-axis-title       (format nil "Operation ~A" menu-value))
  (setq x-axis-labels      structure-list)
```

```
  (setq y1-axis-title      (format nil "Queued"))
  (setq y1-axis-labels     (range-list 0 15)) ;;;(maximum 'dmos:number-of-lots-on-queue structure-list)))
  (setq y2-axis-title      nil)
  (setq y2-axis-labels     nil))

(defun MAKE-OP-HISTORY-D (&aux dd)
  (make-operation-list)
  (setq menu-value         (loop
                             doing (setq dd (tv:menu-choose *operation-list*
                                                            "Select one operation:"
                                                            '(:point 1000 400)))
                             until dd
                             finally (return dd)))
  (setq structure-list     (list menu-value))
  (setq access-function1   'dmos:number-of-lots-in-process)
  (setq access-function2   'do-nothing)
  (setq graph-title        (format nil "History of operation ~A" menu-value))
  (setq graph-type         'history)
  (setq graph-mode         'single)
  (setq x-axis-title       (format nil "Operation ~A" menu-value))
  (setq x-axis-labels      structure-list)
  (setq y1-axis-title      (format nil "Processing"))
  (setq y1-axis-labels     (range-list 0 15)) ;;;(maximum 'dmos:number-of-lots-in-process structure-list)))
  (setq y2-axis-title      nil)
  (setq y2-axis-labels     nil))


(defun MAKE-OP-HISTORY-QD (&aux dd)
  (make-operation-list)
  (setq menu-value         (loop
                             doing (setq dd (tv:menu-choose *operation-list*
                                                            "Select one operation:"
                                                            '(:point 1000 400)))
                             until dd
                             finally (return dd)))
  (setq structure-list     (list menu-value))
  (setq access-function1   'dmos:number-of-lots-on-queue)
  (setq access-function2   'dmos:number-of-lots-in-process)
  (setq graph-title        (format nil "History of operation ~A" menu-value))
  (setq graph-type         'history)
  (setq graph-mode         'split)
  (setq x-axis-title       (format nil "Operation ~A" menu-value))
  (setq x-axis-labels      structure-list)
  (setq y1-axis-title      (format nil "Queued"))
  (setq y1-axis-labels     (range-list 0 15)) ;;;(max (maximum 'dmos:number-of-lots-on-queue structure-list)
                                              ;;;(maximum 'dmos:number-of-lots-in-process structure-list))))
  (setq y2-axis-title      (format nil "Processing"))
  (setq y2-axis-labels     y1-axis-labels))
;;;**************************************************

(defun MAKE-SELECTED-MACH-Q (&aux dd)
  (make-machine-list)
  (setq menu-value         (loop for item in (loop
                                   doing (setq dd (tv:multiple-menu-choose *machine-list*
                                                                           "Select several machines:"
                                                                           '(:point 1000 400)))
```

```
                                    until dd
                                    finally (return dd))
                           collect item))
  (setq structure-list    menu-value)
  (setq access-function1  'q-machine)
  (setq access-function2  'do-nothing)
  (setq graph-title       (format nil "Number of lots queued vs. Machines"))
  (setq graph-type        'dynamic)
  (setq graph-mode        'single)
  (setq x-axis-title      (format nil "Machines"))
  (setq x-axis-labels     (sort (loop for item in structure-list
                                      collect (format nil "~A" item) into axis-list
                                      finally (return axis-list))
                                'string-lessp))
  (setq y1-axis-title     (format nil "Queued"))
  (setq y1-axis-labels    (range-list 0 15)) ;;;(maximum 'q-machine structure-list)))
  (setq y2-axis-title     nil)
  (setq y2-axis-labels    nil))

(defun MAKE-SELECTED-MACH-D (&aux dd)
  (make-machine-list)
  (setq menu-value        (loop for item in (loop
                                    doing (setq dd (tv:multiple-menu-choose *machine-list*
                                                                             "Select several machines:"
                                                                             '(:point 1000 400)))
                                    until dd
                                    finally (return dd))
                           collect item))
  (setq structure-list    menu-value)
  (setq access-function1  'd-machine)
  (setq access-function2  'do-nothing)
  (setq graph-title       (format nil "Number of lots in process vs. Machines"))
  (setq graph-type        'dynamic)
  (setq graph-mode        'single)
  (setq x-axis-title      (format nil "Machines"))
  (setq x-axis-labels     (sort (loop for item in structure-list
                                      collect (format nil "~A" item) into axis-list
                                      finally (return axis-list))
                                'string-lessp))
  (setq y1-axis-title     (format nil "Processing"))
  (setq y1-axis-labels    (range-list 0 15)) ;;;(maximum 'd-machine structure-list)))
  (setq y2-axis-title     nil)
  (setq y2-axis-labels    nil))

(defun MAKE-SELECTED-MACH-QD (&aux dd)
  (make-machine-list)
  (setq menu-value        (loop for item in (loop
                                    doing (setq dd (tv:multiple-menu-choose *machine-list*
                                                                             "Select several machines:"
                                                                             '(:point 1000 400)))
                                    until dd
                                    finally (return dd))
```

```
                             collect item))
  (setq structure-list    menu-value)
  (setq access-function1  'q-machine)
  (setq access-function2  'd-machine)
  (setq graph-title       (format nil "Number of lots queued and in process vs. Machines"))
  (setq graph-type        'dynamic)
  (setq graph-mode        'split)
  (setq x-axis-title      (format nil "Machines"))
  (setq x-axis-labels     (sort (loop for item in structure-list
                                      collect (format nil "~A" item) into axis-list
                                      finally (return axis-list))
                                'string-lessp))
  (setq y1-axis-title     (format nil "Queued"))
  (setq y1-axis-labels    (range-list Ø 16)) ;;;(max (maximum 'q-machine structure-list)
                                             ;;; (maximum 'd-machine structure-list))))
  (setq y2-axis-title     (format nil "Processing"))
  (setq y2-axis-labels    y1-axis-labels))

;;;*****************************************

(defun MAKE-MACH-HISTORY-Q (&aux dd)
  (make-machine-list)
  (setq menu-value        (loop
                            doing (setq dd (tv:menu-choose *machine-list*
                                                           "Select one operation:"
                                                           '(:point 1000 400)))
                            until dd
                            finally (return dd)))
  (setq structure-list    (list menu-value))
  (setq access-function1  'q-machine)
  (setq access-function2  'do-nothing)
  (setq graph-title       (format nil "History of machine ~A" menu-value))
  (setq graph-type        'history)
  (setq graph-mode        'single)
  (setq x-axis-title      (format nil "Machine ~A" menu-value))
  (setq x-axis-labels     structure-list)
  (setq y1-axis-title     (format nil "Queued"))
  (setq y1-axis-labels    (range-list Ø 16)) ;;;(maximum 'q-machine structure-list)))
  (setq y2-axis-title     nil)
  (setq y2-axis-labels    nil))

(defun MAKE-MACH-HISTORY-D (&aux dd)
  (make-machine-list)
  (setq menu-value        (loop
                            doing (setq dd (tv:menu-choose *machine-list*
                                                           "Select one operation:"
                                                           '(:point 1000 400)))
                            until dd
                            finally (return dd)))
  (setq structure-list    (list menu-value))
  (setq access-function1  'd-machine)
```

```
  (setq access-function2  'do-nothing)
  (setq graph-title       (format nil "History of machine ~A" menu-value))
  (setq graph-type        'history)
  (setq graph-mode        'single)
  (setq x-axis-title      (format nil "Machine ~A" menu-value))
  (setq x-axis-labels     structure-list)
  (setq y1-axis-title     (format nil "Processing"))
  (setq y1-axis-labels    (range-list 0 15)) ;;;(maximum 'd-machine structure-list)))
  (setq y2-axis-title     nil)
  (setq y2-axis-labels    nil))


(defun MAKE-MACH-HISTORY-QD (&aux dd)
  (make-machine-list)
  (setq menu-value        (loop
                            doing (setq dd (tv:menu-choose *machine-list*
                                                           "Select one operation:"
                                                           '(:point 1000 400)))
                            until dd
                           finally (return dd)))
  (setq structure-list    (list menu-value))
  (setq access-function1  'q-machine)
  (setq access-function2  'd-machine)
  (setq graph-title       (format nil "History of machine ~A" menu-value))
  (setq graph-type        'history)
  (setq graph-mode        'split)
  (setq x-axis-title      (format nil "Machine ~A" menu-value))
  (setq x-axis-labels     structure-list)
  (setq y1-axis-title     (format nil "Queued"))
  (setq y1-axis-labels    (range-list 0 15)) ;;;(max (maximum 'q-machine structure-list)
                                             ;;;(maximum 'd-machine structure-list))))
  (setq y2-axis-title     (format nil "Processing"))
  (setq y2-axis-labels    y1-axis-labels))

;;;******************************************

(defun MAKE-SELECTED-LOGPT-Q (&aux dd)
  (make-logpoint-list)
  (setq menu-value        (loop for item in (loop
                                 doing (setq dd (tv:multiple-menu-choose *logpoint-list*
                                                                         "Select several operations:"
                                                                         '(:point 1000 400)))
                                 until dd
                                 finally (return dd))
                               collect item))
  (setq structure-list    menu-value)
  (setq access-function1  'q-logpoint)
  (setq access-function2  'do-nothing)
  (setq graph-title       (format nil "Number of lots queued vs. Logpoints"))
  (setq graph-type        'dynamic)
  (setq graph-mode        'single)
  (setq x-axis-title      (format nil "Logpoints"))
  (setq x-axis-labels     (loop for label in
                               (sort (loop for item in structure-list
```

```
                                    collect (parse-integer (substring (format nil "~A" item) 2)) into axis-list
                                    finally (return axis-list))
                                     '<)
                               collect (format nil "LP~A" label) into a-list
                               finally (return a-list)))
  (setq y1-axis-title     (format nil "Queued"))
  (setq y1-axis-labels    (range-list Ø 15)) ;;;(maximum 'q-logpoint structure-list)))
  (setq y2-axis-title     nil)
  (setq y2-axis-labels    nil))

(defun MAKE-SELECTED-LOGPT-D (&aux dd)
  (make-logpoint-list)
  (setq menu-value        (loop for item in (loop
                                           doing (setq dd (tv:multiple-menu-choose *logpoint-list*
                                                                                   "Select several operations:"
                                                                                   '(:point 1ØØØ 4ØØ)))
                                           until dd
                                           finally (return dd))
                               collect item))
  (setq structure-list    menu-value)
  (setq access-function1  'd-logpoint)
  (setq access-function2  'do-nothing)
  (setq graph-title       (format nil "Number of lots in process vs. Logpoints"))
  (setq graph-type        'dynamic)
  (setq graph-mode        'single)
  (setq x-axis-title      (format nil "Logpoints"))
  (setq x-axis-labels     (loop for label in
                               (sort (loop for item in structure-list
                                    collect (parse-integer (substring (format nil "~A" item) 2)) into axis-list
                                    finally (return axis-list))
                                     '<)
                               collect (format nil "LP~A" label) into a-list
                               finally (return a-list)))
  (setq y1-axis-title     (format nil "Processing"))
  (setq y1-axis-labels    (range-list Ø 15)) ;;;(maximum 'd-logpoint structure-list)))
  (setq y2-axis-title     nil)
  (setq y2-axis-labels    nil))

(defun MAKE-SELECTED-LOGPT-QD (&aux dd)
  (make-logpoint-list)
  (setq menu-value        (loop for item in (loop
                                           doing (setq dd (tv:multiple-menu-choose *logpoint-list*
                                                                                   "Select several operations:"
                                                                                   '(:point 1ØØØ 4ØØ)))
                                           until dd
                                           finally (return dd))
                               collect item))
  (setq structure-list    menu-value)
  (setq access-function1  'q-logpoint)
  (setq access-function2  'd-logpoint)
  (setq graph-title       (format nil "Number of lots queued and in process vs. Logpoints"))
  (setq graph-type        'dynamic)
```

```
  (setq graph-mode         'split)
  (setq x-axis-title       (format nil "Logpoints"))
  (setq x-axis-labels      (loop for label in
                                 (sort (loop for item in structure-list
                                             collect (parse-integer (substring (format nil "~A" item) 2)) into axis-list
                                             finally (return axis-list))
                                       '<)
                                 collect (format nil "LP~A" label) into a-list
                                 finally (return a-list)))
  (setq y1-axis-title      (format nil "Queued"))
  (setq y1-axis-labels     (range-list Ø 15)) ;;;(max (maximum 'q-logpoint structure-list)
                                              ;;;(maximum 'd-logpoint structure-list))))
  (setq y2-axis-title      (format nil "Processing"))
  (setq y2-axis-labels     y1-axis-labels))

;;;****************************************

(defun MAKE-ALL-LOGPTS-IN-FACT-Q ()
  (setq menu-value         nil)
  (setq structure-list     dmos:*log-points*)
  (setq access-function1   'q-logpoint)
  (setq access-function2   'do-nothing)
  (setq graph-title        (format nil "All logpoints in factory"))
  (setq graph-type         'dynamic)
  (setq graph-mode         'single)
  (setq x-axis-title       (format nil "Logpoints"))
  (setq x-axis-labels      (loop for item in structure-list
                               collect (format nil "~A" item) into axis-list
                               finally (return axis-list)))
  (setq y1-axis-title      (format nil "Queued"))
  (setq y1-axis-labels     (range-list Ø 15)) ;;;(maximum 'q-logpoint structure-list)))
  (setq y2-axis-title      nil)
  (setq y2-axis-labels     nil))


(defun MAKE-ALL-LOGPTS-IN-FACT-D ()
  (setq menu-value         nil)
  (setq structure-list     dmos:*log-points*)
  (setq access-function1   'd-logpoint)
  (setq access-function2   'do-nothing)
  (setq graph-title        (format nil "All logpoints in factory"))
  (setq graph-type         'dynamic)
  (setq graph-mode         'single)
  (setq x-axis-title       (format nil "Logpoints"))
  (setq x-axis-labels      (loop for item in structure-list
                               collect (format nil "~A" item) into axis-list
                               finally (return axis-list)))
  (setq y1-axis-title      (format nil "Processing"))
  (setq y1-axis-labels     (range-list Ø 15)) ;;;(maximum 'd-logpoint structure-list)))
  (setq y2-axis-title      nil)
  (setq y2-axis-labels     nil))
```

```
(defun MAKE-ALL-LOGPTS-IN-FACT-QD ()
  (setq menu-value          nil)
  (setq structure-list      dmos:*log-points*)
  (setq access-function1    'q-logpoint)
  (setq access-function2    'd-logpoint)
  (setq graph-title         (format nil "All logpoints in factory"))
  (setq graph-type          'dynamic)
  (setq graph-mode          'split)
  (setq x-axis-title        (format nil "Logpoints"))
  (setq x-axis-labels       (loop for item in structure-list
                                collect (format nil "~A" item) into axis-list
                                finally (return axis-list)))
  (setq y1-axis-title       (format nil "Queued"))
  (setq y1-axis-labels      (range-list Ø 15)) ;;;(max (maximum 'q-logpoint structure-list)
                                               ;;;(maximum 'd-logpoint structure-list))))
  (setq y2-axis-title       (format nil "Processing"))
  (setq y2-axis-labels      y1-axis-labels))

;;;****************************************

(defun MAKE-LOGPT-HISTORY-Q (&aux dd)
  (make-logpoint-list)
  (setq menu-value         (loop
                             doing (setq dd (tv:menu-choose *logpoint-list*
                                                  "Select one operation:"
                                                  '(:point 1000 400)))
                             until dd
                             finally (return dd)))
  (setq structure-list     (list menu-value))
  (setq access-function1   'q-logpoint)
  (setq access-function2   'do-nothing)
  (setq graph-title        (format nil "History of logpoint ~A" menu-value))
  (setq graph-type         'history)
  (setq graph-mode         'single)
  (setq x-axis-title       (format nil "Logpoint ~A" menu-value))
  (setq x-axis-labels      structure-list)
  (setq y1-axis-title      (format nil "Queued"))
  (setq y1-axis-labels     (range-list Ø 15)) ;;;(maximum 'q-logpoint structure-list)))
  (setq y2-axis-title      nil)
  (setq y2-axis-labels     nil))

(defun MAKE-LOGPT-HISTORY-D (&aux dd)
  (make-logpoint-list)
  (setq menu-value         (loop
                             doing (setq dd (tv:menu-choose *logpoint-list*
                                                  "Select one operation:"
                                                  '(:point 1000 400)))
                             until dd
                             finally (return dd)))
  (setq structure-list     (list menu-value))
  (setq access-function1   'd-logpoint)
  (setq access-function2   'do-nothing)
  (setq graph-title        (format nil "History of logpoint ~A" menu-value))
  (setq graph-type         'history)
```

```
  (setq graph-mode         'single)
  (setq x-axis-title       (format nil "Logpoint ~A" menu-value))
  (setq x-axis-labels      structure-list)
  (setq y1-axis-title      (format nil "Processing"))
  (setq y1-axis-labels     (range-list Ø (maximum 'd-logpoint structure-list)))
  (setq y2-axis-title      nil)
  (setq y2-axis-labels     nil))


defun MAKE-LOGPT-HISTORY-QD (&aux dd)
  (make-logpoint-list)
  (setq menu-value         (loop
                             doing (setq dd (tv:menu-choose *logpoint-list*
                                                            "Select one operation:"
                                                            '(:point 1000 400)))
                             until dd
                             finally (return dd)))
  (setq structure-list     (list menu-value))
  (setq access-function1   'q-logpoint)
  (setq access-function2   'd-logpoint)
  (setq graph-title        (format nil "History of logpoint ~A" menu-value))
  (setq graph-type         'history)
  (setq graph-mode         'split)
  (setq x-axis-title       (format nil "Logpoint ~A" menu-value))
  (setq x-axis-labels      structure-list)
  (setq y1-axis-title      (format nil "Queued"))
  (setq y1-axis-labels     (range-list Ø 15)) ;;;(max (maximum 'q-logpoint structure-list)
                                              ;;;(maximum 'd-logpoint structure-list))))
  (setq y2-axis-title      (format nil "Processing"))
  (setq y2-axis-labels     y1-axis-labels))

;;;*******************************************
;;;*******************************************
;;;*******************************************
;;;(defun make- (&aux dd)
;;;   (setq menu-value)
;;;   (setq structure-list)
;;;   (setq access-function1)
;;;   (setq access-function2   'do-nothing)
;;;   (setq graph-title)
;;;   (setq graph-type         'dynamic)
;;;   (setq graph-mode         'single)
;;;   (setq x-axis-title)
;;;   (setq x-axis-labels      (loop for item in structure-list
;;;                               collect (substring (format nil "~A" item) 3) into axis-list
;;;                               finally (return axis-list)))
;;;   (setq y1-axis-title      (format nil "Queued"))
;;;   (setq y1-axis-labels     (range-list Ø 15)) ;;;(maximum 'dmos:number-of-lots-on-queue structure-list)))
;;;   (setq y2-axis-title      nil)
;;;   (setq y2-axis-labels     nil))
```

```
;;; -*- Mode:Common-Lisp; Package:USER; Base:10; Fonts: medfnt,tr12b,tr12bi -*-


(defun init-graph-vars (&optional (sheet chart-window))
  (setq  left              (+ (tv:sheet-inside-left sheet) 50.)
         bottom            (- (tv:sheet-inside-bottom sheet) 90.)
         middle            (round (/ (- (tv:sheet-inside-bottom sheet) (tv:sheet-inside-top sheet)) 2))
         x-length          (- (tv:sheet-inside-right  sheet) (tv:sheet-inside-left sheet) 100.)
         no-x-points       (if (equal graph-type 'history) 100 (length structure-list))
         space-width       (if (equal graph-mode 'dual) (round (* (/ x-length no-x-points) 0.2))
                                                         (round (* (/ x-length no-x-points) 0.2)))
         block-width       (if (equal graph-mode 'dual) (round (/ (- (/ x-length no-x-points) space-width) 2.))
                                                         (- (round (/ x-length no-x-points)) space-width))
         block-center      (round (/ block-width 2.))

         y-length          (- (tv:sheet-inside-bottom sheet) (tv:sheet-inside-top  sheet) 140.)
         y1-length         (if (equal graph-mode 'split) (round (/ y-length 2)) y-length)
         no-y1-points      15   ;;set to this for now alr(length y1-axis-labels)
         y1-spacing-height (round (/ y1-length no-y1-points))
         y1-scale-factor   (if (= no-y1-points 1) 1 (/ 1 (- (cadr y1-axis-labels) (car y1-axis-labels))))
         block1-height     (* y1-spacing-height y1-scale-factor)
         block1-color      tv:75%-gray

         y2-length         (if y2-axis-labels y1-length 0)
         no-y2-points      (if y2-axis-labels 15)   ;;set to this for now (length y2-axis-labels)
         y2-spacing-height (if y2-axis-labels (round (/ y2-length no-y2-points)))
         y2-scale-factor   (if y2-axis-labels (if (= no-y2-points 1) 1 (/ 1 (- (cadr y2-axis-labels)
                                                                                (car y2-axis-labels)))))
         block2-height     (if y2-axis-labels (* y2-spacing-height y2-scale-factor) 0)
         block2-color      (if y2-axis-labels tv:25%-gray)

         value-table       (MAKE-ARRAY (list 4 no-x-points) ':TYPE 'ART-Q ':INITIAL-ELEMENT 0)))


(DEFUN NEW-DRAW-RECTANGLE-INSIDE-CLIPPED
       (WIDTH HEIGHT X-BITPOS Y-BITPOS ALU-FUNCTION SHEET
        &OPTIONAL (color          tv:100%-black)
        &AUX (INSIDE-LEFT   (tv:SHEET-INSIDE-LEFT   SHEET))
             (INSIDE-TOP    (tv:SHEET-INSIDE-TOP    SHEET))
             (INSIDE-RIGHT  (tv:SHEET-INSIDE-RIGHT  SHEET))
             (INSIDE-BOTTOM (tv:SHEET-INSIDE-BOTTOM SHEET))
             (destination (tv:sheet-screen-array sheet)))
  "Draw rectangle in SHEET, coordinates relative to inside of SHEET,
clipping to inside.  Recall that the inside of SHEET is what is not part
of the margins."
  (LET* ((LEFT   (+ X-BITPOS INSIDE-LEFT))
         (TOP    (+ Y-BITPOS INSIDE-TOP ))
         (RIGHT  (+ LEFT WIDTH))
         (BOTTOM (+ TOP HEIGHT)))
       (si:%draw-filled-triangle LEFT TOP
                                 RIGHT TOP
```

```
                                      LEFT BOTTOM
                                      INSIDE-LEFT
                                      INSIDE-TOP
                                      INSIDE-RIGHT
                                      INSIDE-BOTTOM
                                      ALU-FUNCTION  nil  nil  nil
                                      color
                                      DESTINATION)
        (si:%draw-filled-triangle RIGHT TOP
                                      LEFT BOTTOM
                                      RIGHT BOTTOM
                                      INSIDE-LEFT
                                      INSIDE-TOP
                                      INSIDE-RIGHT
                                      INSIDE-BOTTOM
                                      ALU-FUNCTION  nil  nil  nil
                                      color
                                      DESTINATION)))

;;;(DEFUN calc-range-of-labels (range-of)
;;;  (cond ((equal range-of 'processes)
;;;      (tv:choose-variable-values
;;;        '((begin-range "start" :fixnum)
;;;          (end-range   "stop"  :fixnum))
;;;        ':label (FORMAT nil "Enter beginning and end of sequence of ~A" range-of))
;;;      (LOOP for i from begin-range to end-range collect i))
;;;
;;;     (t  (tv:choose-variable-values
;;;           '((begin-range "start" :fixnum)
;;;             (end-range   "stop"  :fixnum)
;;;             (step-by     "step"  :fixnum))
;;;           ':label (FORMAT nil "Enter value range and stepping factor for ~A axis:" range-of))
;;;         (LOOP for i from begin-range to end-range by step-by collect i))))


(defun draw-x-axis (sheet alu)
  (tv:prepare-sheet (sheet)
    (cond ((or (equal graph-mode 'single)
               (equal graph-mode 'dual))
           (send sheet :draw-line left bottom (+ left x-length) bottom alu))

          ((equal graph-mode 'split)
           (send sheet :draw-line left middle (+ left x-length) middle alu)))))


(defun draw-y-axis (sheet alu)
  (tv:prepare-sheet (sheet)
    (cond ((or (equal graph-mode 'single)
               (equal graph-mode 'dual))
           (send sheet :draw-line left (- bottom y1-length) left bottom alu))
```

```
        ((equal graph-mode 'split)
         (send sheet :draw-line left (- middle y1-length) left middle alu)
         (send sheet :draw-line left (+ middle y2-length) left middle alu))))


(defun draw-x-scales (sheet alu)
  (tv:prepare-sheet (sheet)
    (cond ((equal graph-mode 'single)
           (do ((x  (+ left block-center) (+ x block-width space-width ))
                (y1 (+ bottom 1.))
                (y2 (+ bottom 5.)))
               ((>= x (+ left x-length)))
             (send sheet :draw-line x y1 x y2 alu)))

          ((equal graph-mode 'dual)
           (do ((x  (+ left block-width) (+ x (* 2 block-width) space-width ))
                (y1 (+ bottom 1.))
                (y2 (+ bottom 5.)))
               ((>= x (+ left x-length)))
             (send sheet :draw-line x y1 x y2 alu))))))


(defun draw-y-scales (sheet alu)
  (tv:prepare-sheet (sheet)
    (cond ((or (equal graph-mode 'single)
               (equal graph-mode 'dual))
           (do ((x1 (- left 6.))
                (x2 (- left 2.))
                (y  bottom (- y y1-spacing-height)))
               ((<= y (- bottom y1-length)))
             (send sheet :draw-line x1 y x2 y alu)))

          ((equal graph-mode 'split)
           (do ((x1 (- left 6.))
                (x2 (- left 2.))
                (y  middle (- y y1-spacing-height)))
               ((<= y (- middle y1-length)))
             (send sheet :draw-line x1 y x2 y alu))
           (do ((x1 (- left 6.))
                (x2 (- left 2.))
                (y  middle (+ y y2-spacing-height)))
               ((>= y (+ middle y2-length)))
             (send sheet :draw-line x1 y x2 y alu))))))


(defun draw-x-axis-labels (sheet)
  (tv:prepare-sheet (sheet)
    (let ((count       0)
          (label-list  x-axis-labels))

      (dolist (item label-list)
        (cond ((or (equal graph-mode 'single)
                   (equal graph-mode 'split))
               (send sheet :set-cursorpos (+ left block-center (- 5)
```

```
                                        (* count (+ block-width space-width))) 651)
            (sheet-string-out-down sheet item fonts:tvfont)
            (send sheet :set-cursorpos (+ left block-center (- 5)
                                        (* count (+ block-width space-width))) 760))
           ((equal graph-mode 'dual)
            (send sheet :set-cursorpos (+ left (* count (+ (* 2 block-width) space-width)) (* 2 block-width))
                                     640)
            (sheet-string-out-down sheet item fonts:tvfont)
            (send sheet :set-cursorpos (+ left (* count (+ (* 2 block-width) space-width)) (* 2 block-width))
                                     750)))
       (setq count (1+ count))))))

(defun draw-y-axis-labels (sheet)
  (tv:prepare-sheet (sheet)
    (let ((label-list  y1-axis-labels)
          (tuple       1))
      (if (> no-y1-points 10)
          (setq tuple      5
                label-list (loop with blist = y1-axis-labels
                                 while blist
                                 collect (car blist) into clist
                                 doing (setq blist (cdr (cddddr blist)))
                                 finally (return clist))))
      (cond ((or (equal graph-mode 'single)
                 (equal graph-mode 'dual))
             (let ((count 0))
               (dolist (item label-list)
                 (send sheet :string-out-centered-explicit (if (numberp item) (format nil "~A" item)
                                                               (string item))
                                                           (- left 30)
                                                           (- bottom (+ (* tuple count y1-spacing-height) 4))
                                                           (- left 4)
                                                           (tv:sheet-inside-bottom sheet)
                                                           fonts:tr10)
                 (setq count (1+ count)))))

            ((equal graph-mode 'split)
             (let ((count 0))
               (dolist (item label-list)
                 (send sheet :string-out-centered-explicit (if (numberp item) (format nil "~A" item)
                                                               (string item))
                                                           (- left 30)
                                                           (- middle (+ (* tuple count y1-spacing-height) 4))
                                                           (- left 4)
                                                           (tv:sheet-inside-bottom sheet)
                                                           fonts:tr10)
                 (setq count (1+ count))))
             (let ((count 1))
               (dolist (item (cdr label-list))
                 (send sheet :string-out-centered-explicit (if (numberp item) (format nil "~A" item)
                                                               (string item))
                                                           (- left 30)
                                                           (+ middle (- (* tuple count y2-spacing-height) 4))
```

```
                                                      (- left 4)
                                                      (tv:sheet-inside-bottom sheet)
                                                      fonts:tr10)
            (setq count (1+ count))))))))


(defun draw-graph-title (sheet)
  (tv:prepare-sheet (sheet)
    (send sheet :string-out-centered-explicit graph-title
                                              (tv:sheet-inside-left sheet)
                                              (+ (tv:sheet-inside-top sheet) 15.)
                                              (tv:sheet-inside-right sheet)
                                              nil fonts:medfnb)))

(defun draw-x-title (sheet)
  (tv:prepare-sheet (sheet)
    (send sheet :string-out-centered-explicit x-axis-title
                                              left
                                              (- (tv:sheet-inside-bottom sheet) 7.)
                                              (+ left x-length))))


(defun draw-y-title (sheet alu &aux max-length)
  (tv:prepare-sheet (sheet)
    (setq max-length (max (string-length y1-axis-title) (string-length y2-axis-title)))
    (cond ((equal graph-mode 'single)
           (send sheet :set-cursorpos (+ (tv:sheet-inside-left sheet) 2.)
                                      (- bottom (round (/ (- y1-length (* (length y1-axis-title) 8.)) 2.))))
           (tv:sheet-string-out-up sheet y1-axis-title)
           (send sheet :set-cursorpos (tv:sheet-inside-left sheet) (tv:sheet-inside-top sheet)))

          ((equal graph-mode 'dual)
           (new-draw-rectangle-inside-clipped 15. 10.
                                              (+ (tv:sheet-inside-left  sheet)  (- (* max-length 8.) 100))
                                              (- (tv:sheet-inside-bottom sheet) 15)
                                              alu sheet block1-color)
           (send sheet :string-out-explicit   y1-axis-title
                                              (+ (tv:sheet-inside-left  sheet)  (- (* max-length 8.) 70))
                                              (- (tv:sheet-inside-bottom sheet) 12)
                                              nil nil fonts:tr10 tv:alu-xor)
           (new-draw-rectangle-inside-clipped 15. 10.
                                              (- (tv:sheet-inside-right  sheet) (+ (* max-length 8.) 100))
                                              (- (tv:sheet-inside-bottom sheet) 15)
                                              alu sheet block2-color)
           (send sheet :string-out-explicit   y2-axis-title
                                              (- (tv:sheet-inside-right  sheet) (+ (* max-length 8.) 70))
                                              (- (tv:sheet-inside-bottom sheet) 12)
                                              nil nil fonts:tr10 tv:alu-xor))
```

```
        ((equal graph-mode 'split)
         (send sheet :set-cursorpos (+ (tv:sheet-inside-left sheet) 2.)
                                    (- middle (round (/ (- y1-length (* (length y1-axis-title) 8.)) 2.))))
         (tv:sheet-string-out-up sheet y1-axis-title)
         (send sheet :set-cursorpos (tv:sheet-inside-left sheet) (tv:sheet-inside-top sheet))
         (send sheet :set-cursorpos (+ (tv:sheet-inside-left sheet) 2.)
                                    (- bottom (round (/ (- y2-length (* (length y2-axis-title) 8.)) 2.))))
         (tv:sheet-string-out-up sheet y2-axis-title)
         (send sheet :set-cursorpos (tv:sheet-inside-left sheet) (tv:sheet-inside-top sheet))))))


(defun activate-bar-chart (&optional (start-old 0) (start-new 0) (sheet chart-window) (alu tv:alu-xor))
  (tv:prepare-sheet (sheet)
    (do* ((count    0                                          (1+ count))
          (old-index    start-old                              (mod (1+ old-index) no-x-points))
          (new-index    start-new                              (mod (1+ new-index) no-x-points))
          (old-y1   (aref value-table 0 old-index)             (aref value-table 0 old-index))
          (new-y1   (aref value-table 1 new-index)             (aref value-table 1 new-index))
          (old-y2   (aref value-table 2 old-index)             (aref value-table 2 old-index))
          (new-y2   (aref value-table 3 new-index)             (aref value-table 3 new-index))
          (ht1-diff (abs (- (round (* new-y1 block1-height)) (round (* old-y1 block1-height))))
                    (abs (- (round (* new-y1 block1-height)) (round (* old-y1 block1-height)))))
          (ht2-diff (abs (- (round (* new-y2 block2-height)) (round (* old-y2 block2-height))))
                    (abs (- (round (* new-y2 block2-height)) (round (* old-y2 block2-height))))))
         ((= count no-x-points))
      (COND ((EQUAL graph-mode 'single)
             (COND ((> new-y1 old-y1)
                    (new-draw-rectangle-inside-clipped block-width (- ht1-diff 1)
                                                       (+ left 1 (* count (+ block-width space-width)))
                                                       (- bottom (ROUND (* new-y1 block1-height)))
                                                       alu sheet block1-color))
                   ((< new-y1 old-y1)
                    (new-draw-rectangle-inside-clipped block-width (- ht1-diff 1)
                                                       (+ left 1 (* count (+ block-width space-width)))
                                                       (- bottom (ROUND (* old-y1 block1-height)))
                                                       alu sheet block1-color))
                   (t t)))
            ((EQUAL graph-mode 'dual)
             (COND ((> new-y1 old-y1)
                    (new-draw-rectangle-inside-clipped block-width (- ht1-diff 1)
                                                       (+ left 1 (* count (+ (* 2 block-width) space-width)))
                                                       (- bottom (ROUND (* new-y1 block1-height)))
                                                       alu sheet block1-color))
                   ((< new-y1 old-y1)
                    (new-draw-rectangle-inside-clipped block-width (- ht1-diff 1)
                                                       (+ left 1 (* count (+ (* 2 block-width) space-width)))
                                                       (- bottom (ROUND (* old-y1 block1-height)))
                                                       alu sheet block1-color))
                   (t t))
             (COND ((> new-y2 old-y2)
                    (new-draw-rectangle-inside-clipped block-width (- ht2-diff 1)
                                                       (+ left 1 block-width (* count (+ (* 2 block-width) space-width)))
                                                       (- bottom (ROUND (* new-y2 block2-height)))
```

```
                                      alu sheet block2-color))
          ((< new-y2 old-y2)
           (new-draw-rectangle-inside-clipped block-width (- ht2-diff 1)
                                              (+ left 1 block-width (* count (+ (* 2 block-width) space-width)))
                                              (- bottom (ROUND (* old-y2 block2-height)))
                                              alu sheet block2-color))
          (t t)))
      ((EQUAL graph-mode 'split)
       (COND ((> new-y1 old-y1)
              (new-draw-rectangle-inside-clipped block-width (- ht1-diff 1)
                                                 (+ left 1 (* count (+ block-width space-width)))
                                                 (- middle (ROUND (* new-y1 block1-height)))
                                                 alu sheet block1-color))
             ((< new-y1 old-y1)
              (new-draw-rectangle-inside-clipped block-width (- ht1-diff 1)
                                                 (+ left 1 (* count (+ block-width space-width)))
                                                 (- middle (ROUND (* old-y1 block1-height)))
                                                 alu sheet block1-color))
             (t t))
       (COND ((> new-y2 old-y2)
              (new-draw-rectangle-inside-clipped block-width (- ht2-diff 1)
                                                 (+ left 1 (* count (+ block-width space-width)))
                                                 (+ middle 1 (ROUND (* old-y2 block2-height)))
                                                 alu sheet block2-color))
             ((< new-y2 old-y2)
              (new-draw-rectangle-inside-clipped block-width (- ht2-diff 1)
                                                 (+ left 1 (* count (+ block-width space-width)))
                                                 (+ middle 1 (ROUND (* new-y2 block2-height)))
                                                 alu sheet block2-color))
             (t t))))
    (ASET new-y1 value-table Ø new-index)
    (ASET new-y2 value-table 2 new-index))))


(defun draw-bar-chart (&optional (sheet chart-window) (alu tv:alu-xor))
  (send chart-window :expose)
  (draw-x-axis        sheet alu)
  (draw-y-axis        sheet alu)
  (if (not (equal graph-type 'history)) (draw-x-scales sheet alu))
  (draw-y-scales      sheet alu)
  (if (not (equal graph-type 'history)) (draw-x-axis-labels sheet))
  (draw-y-axis-labels sheet)
  (draw-graph-title   sheet)
  (if (not (equal graph-type 'history)) (draw-x-title sheet))
  (draw-y-title       sheet alu))


(defun graph-setup (&aux dd)
  (setq graph-option (loop doing (setq dd (tv:menu-choose graph-option-menu
                                                          "Select the information to graph:"
                                                          '(:point 1ØØØ 4ØØ)))
```

```
                              until dd
                              finally (return dd)))
  (make-barchart graph-option))


(defun load-value-table (&optional index)
  (selector graph-type equal
    (('dynamic) (loop with index = 0
                      for item in2 *structure-list
                      doing (selector graph-mode equal
                              (('single)          (aset (funcall access-function1 item) value-table 1 index))
                              (((or 'split 'dual))  (aset (funcall access-function1 item) value-table 1 index)
                                                  (aset (funcall access-function2 item) value-table 3 index)))
                              (setq index (1+ index))
                      until (= index no-x-points)))
    (('history) (selector graph-mode equal
                       (('single)          (aset (funcall access-function1 menu-value) value-table 1 index))
                       (((or 'split 'dual)) (aset (funcall access-function1 menu-value) value-table 1 index)
                                          (aset (funcall access-function2 menu-value) value-table 3 index))))
                       ))


(defun maybe-update-bar-chart ()
  (when graphit
    (new-draw-rectangle-inside-clipped 90 20
                                       (- (tv:sheet-inside-right user:chart-window) 90)
                                       (+ (tv:sheet-inside-top   user:chart-window) 20)
                                       tv:alu-setz user:chart-window tv:100%-white)
    (send user:chart-window :string-out-explicit (daytime dmos:*current-time*)
                                                 (- (tv:sheet-inside-right   user:chart-window) 80)
                                                 (+ (tv:sheet-inside-top     user:chart-window) 25)
                                                 nil nil fonts:hl12b tv:alu-xor)
;;;    (if (or (> (maximum user:access-function12 *structure-list) (car (last y1-axis-labels)))
;;;           (> (maximum user:access-function22 *structure-list) (car (last y1-axis-labels))))
;;;      (draw-bar-chart))
    (selector graph-type equal
      (('dynamic) (load-value-table)
                  (activate-bar-chart))
      (('history) (load-value-table   (mod (- dmos:*current-time* begin-time 1) no-x-points))
                  (activate-bar-chart (mod (- dmos:*current-time* begin-time 1) no-x-points)
                                      (mod (- dmos:*current-time* begin-time)   no-x-points))))))


(defun maybe-save-bar-chart-window ()
  (when graphit
    (when (> dmos:*current-time* dmos:*next-break*)
      (send user:chart-window :deexpose)
      (send user:chart-window :expose t :restore))))

     (defun make-sleepy (interval)
       (setq user:*sleep-delay* interval)
       (if (= 0 user:*sleep-delay*)
           (setq user:*sleepy* nil)
           (setq user:*sleepy* t))
       interval)
```

```lisp
;;; -*- Mode:Common-Lisp; Package:USER; Base:10; Fonts: MEDFNT,tr12B,tr12BI -*-


(defun range-list (val1 val2)
  (LOOP for i from val1 to val2 collect i))


(defun maximum (funct list &aux (mx 0))
  (loop for i in list
        doing (if (and (funcall funct i) (> (funcall funct i) mx)) (setq mx (funcall funct i)))
        finally (return mx)))


(defun avg-c-time (&optional (from-time 0) (to-time dmos:*current-time*))
   (loop for   lot first 0 then (1+ lot)
         for   pair = (aref dmos:*lot-information-array* lot 1)
         until (or (null (car pair)) (> (car pair) to-time))
         when  (and ((<= from-time (car pair) to-time) (numberp (cdr pair)))
               count    t          into count-var
               and sum  (cdr pair) into sum-var
         finally (if (> count-var 0)
                     (return (daytime (/ sum-var count-var)))
                     (return "unknown since no lots have left the plant."))))


(defun daytime (timestep &aux d dr h hr m)
  (when timestep
    (multiple-value (d dr) (floor (/ timestep 240)))
    (multiple-value (h hr) (floor (* dr 24)))
    (setq m                (floor (* hr 60)))
    (format nil "~3,48D:~2,48D:~2,48D" d h m)))

(DEFUN new-track-machine-list (machine &aux list)
  (DOLIST (oper (dmos:m-operations machine) list)
    (push '( ,oper   queued ,(dmos:number-of-lots-on-queue oper)
                 processing ,(dmos:number-of-lots-in-process oper)) list)))

1;;;****************code to add functionality per dmos request 5/8/86*****************


(defun make-machine-list ()
  (setq *machine-list*      (sortcar  (loop for mach in dmos:*machines*
                                             collect (list (format nil "~A" (dmos:m-name mach))
                                                           :value mach
                                                           :documentation
                                                              (format nil "~A" (dmos:m-number mach))))
                                      'string-lessp)))


(defun make-operation-list ()
```

```
(setq *operation-list*      (sortcar (loop for op in dmos:*operations*
                                        collect (list (format nil "~A" (dmos:op-description op))
                                                      :value op
                                                      :documentation (format nil "~A-~A"
                                                                                 (dmos:op-log-point op)
                                                                                 (dmos:op-operation-number op))))
                                     'string-lessp)))


(defun make-logpoint-list ()
  (setq *logpoint-list*   (sortcar (loop for logpt in dmos:*log-points*
                                        collect (list (format nil "~A" (dmos:lp-description logpt))
                                                      :value logpt
                                                      :documentation (format nil "~A" (dmos:lp-number logpt))))
                                   'string-lessp)))


(defun make-lot-list ()
  (setq *lot-list* (loop for   lot first 0 then (1+ lot)
                         for   pair = (aref dmos:*lot-information-array* lot 1)
                         for   data = (aref dmos:*lot-information-array* lot 0)
                         until (null (car pair))
                         when  (null (cdr pair))
                             collect (list (format nil "~A" data) :value data))))

(defmethod (dme:data-model-editor :get-machines) (&aux dd)      ;select a single machine
  (user:make-machine-list)
  (dme:help
    (let ((mach (loop
                  doing (setq dd (tv:menu-choose *machine-list*
                                                 "Select one machine:"
                                                 '(:point 1000 400)))
                  until dd
                  finally (return dd))))

      (format nil "Status for machine #~D:  ~A~2%
                          Machine capacity:  ~A~%
                          Machine status:  ~A~%
                          Mean time between failures:  ~A~%
                          Mean time to repair:  ~A~%
                          Track-machine-list: ~{~%~500T~A~}"
              mach
              (dmos:m-name mach)          ;ie: ar101
              (dmos:m-max-capacity mach)
              (dmos:m-status mach)
              (daytime (dmos:m-mtbf mach))
              (daytime (dmos:m-mttr mach))
              (new-track-machine-list mach)))
    self))
```

```
(defmethod (dme:data-model-editor :get-operations) (&aux dd)    ;select a single process
  (user:make-operation-list)
  (dme:help
    (let ((oper (loop
                  doing (setq dd (tv:menu-choose *operation-list*
                                                 "Select one operation:"
                                                 '(:point 1000 400)))
                  until dd
                  finally (return dd))))
      (format nil "Status for operation #~A:  ~A~2%
                                  Processing time:  ~A~%
                                  Machine-type:  ~A~%
                                  Machines:  ~A~%
                                  Preceding process step:  ~A~%
                                  Next process step:  ~A~%
                                  Number of lots queued:   ~A~%
                                  Number of lots processing:  ~A~%
                                  ~@[Constraint starter~]"
                      oper
                      (dmos:op-description oper)
                      (daytime (dmos:op-run-time oper))
                      (dmos:m-machine-type (car (dmos:op-machines oper)))
                      (dmos:op-machines oper)
                      (dmos:op-preceding-operation oper)
                      (dmos:op-next-operation oper)
                      (dmos:number-of-lots-on-queue oper)
                      (dmos:number-of-lots-in-process oper)
                      (dmos:op-constraint-starter oper)))
    self))

(defmethod (dme:data-model-editor :get-lots) (&aux dd2)*
  (user:make-lot-list)
  (dme:help
    (let ((lot  (loop
                 doing (setq dd (tv:menu-choose *lot-list*
                                                "Select one lot:"
                                                '(:point 1000 400)))
                 until dd
                 finally (return dd))))

      (format nil "Status for lot #~D:
                               Current location: ~A on ~A~%
                               Current status:  ~A~%
                               Time entered plant:  ~A~%
                               Length of time in plant: ~A"
                          lot
                          (dmos:op-description (car (dmos:lot-position lot)))  ;process
                          (if (cdr (dmos:lot-position lot)) (cdr (dmos:lot-position lot))) ;machine
                          (if (cdr (dmos:lot-position lot)) 'processing 'queued)
                          (daytime (car (aref dmos:*lot-information-array* (dmos:lot-number lot) 1)))
                          (daytime (- dmos:*current-time*
                                   (car (aref dmos:*lot-information-array* (dmos:lot-number lot) 1))))))
    self))
```

```
(defmethod (dme:data-model-editor :get-average-cycle-time) ()
  (dme:help
    (format nil "~5Ø%The average cycle time is currently ~A" (avg-c-time))
    self))

(defmethod (dme:data-model-editor :get-all-lot-cycle-times) (&aux lots-list)
  (setq lots-list  (loop for     lot first Ø then (1+ lot)
                         for     pair = (aref dmos:*lot-information-array* lot 1)
                         until   (null (car pair))
                         collect (aref dmos:*lot-information-array* lot Ø) into foolist    ;name
                         collect (daytime (car pair)) into foolist ;entered
                         collect (daytime (cdr pair)) into foolist ;cycle-time
                         finally (return foolist)))

  (dme:help
    (format nil "~%Cycle time for all lots:
       ~%LOT NUMBER  TIME ENTERED  TOTAL CYCLE TIME            LOT NUMBER  TIME ENTERED  TOTAL CYCLE TIME
                  ~{~%~4T~A~13T~A~32T~A~6ØT~A~69T~A~88T~A~}" lots-list)
    self))

(defmethod (dme:data-model-editor :get-track-all-machines1) (&aux mach-list)
  (setq mach-list (loop for i in dmos:*machines*
                        collect (format nil "~A" (dmos:m-name i))
                                into foolist
                        collect (loop for oper in (dmos:m-operations i)
                                      collect (dmos:op-description oper) into operlist

                                      collect (dmos:number-of-lots-on-queue oper) into operlist
                                      collect (dmos:number-of-lots-in-process oper) into operlist
                                      collect (daytime (dmos:op-cumulative-wait oper)) into operlist
                                      finally (return operlist)) into foolist
                        collect (loop for oper in (dmos:m-operations i)
                                      sum (dmos:op-cumulative-wait oper) into tot
                                      finally (return (daytime tot))) into foolist
```

```
                        finally (return foolist)))

  (dme:help
    (format nil "~%Status of all machines:
                 ~{~%~%~50TMachine: ~A ~{~%~100T~22A Queued ~40A  Processing ~40A  Wait ~40A~} ~50T Total wait ~A~}" mach-list )
    self))

(defmethod (dme:data-model-editor :get-lots-in-factory) ()
  (dme:help
    (format nil "~50%There are currently ~A lots in the plant." (dmos:lots-in-plant))
    self))

(defmethod (dme:data-model-editor :get-broken-machines) ()
  (dme:help
    (format nil "~20%The following machines are currently broken: ~{~%~150T~A~}" dmos:*broken-machines*)
    self))

(defmethod (dme:data-model-editor :bar-clear-screen) ()
  (send user:chart-window :refresh :use-old-bits))

(defmethod (dme:data-model-editor :bar-pause) ()
  (send user:chart-window :pause))

(defmethod (dme:data-model-editor :bar-continue) ()
  (send user:chart-window :continue))

(defmethod (dme:data-model-editor :bar-exit) ()
  (setq *time-to-exit* t))

2 *
;;; not needed with new version of code!!!!  replaced by (lot-position lot)
;;; Given a lot number, this funtion tells you the process step that lot is in and tells you whether it is
;;; in queue or in process. If that lot is not in the plant, it will show 'lot not found'.
;;;(defun *where-lot-num* (lot-num)
;;;  (if (cdr (aref *lot-cycle-time* lot-num))
;;;      '(lot finished)
;;;      (dotimes (proc-step dmos:*number-of-processes* '(lot not found))
;;;     (cond ((memq lot-num (aref *p-queue* proc-step))
;;;            (return (print-aux proc-step 1)))
;;;           ((memq lot-num (p-doing proc-step))
;;;            (return (print-aux proc-step 2)))))))


;;;(defun print-aux (a b)
;;;   (cond ((= b 1) (cons a '(queued)))
;;;     (t (cons a '(processing)))))
```

```
;;; -*- Mode:Common-Lisp; Package:USER; Base:10; Fonts: MEDFNT,tr12B,tr12BI -*-

(defun get-lp-list (menu-list)
  (loop for op in menu-list
        collect (dmos:op-log-point op) into lp-list
        finally (return lp-list)))

(defun get-op-list (menu-list)
  (loop for op in menu-list
        collect (dmos:op-operation-number op) into op-list
        finally (return op-list)))

(defun do-nothing (arg)
  arg 0)

(defun q-machine (mach &aux (sum 0))
  (dolist (op (dmos:m-contention mach))
    (setq sum (+ sum (* (dmos:number-of-lots-on-queue (car op)) (cdr op)))))
  sum)

(defun d-machine (mach &aux (sum 0))
  (dolist (op (dmos:m-contention mach))
    (setq sum (+ sum (* (dmos:number-of-lots-in-process (car op)) (cdr op)))))
  sum)

(defun q-logpoint (logpt &aux (sum 0))
  (dolist (op (dmos:lp-operations logpt))
    (setq sum (+ sum (dmos:number-of-lots-on-queue op))))
  sum)


(defun d-logpoint (logpt &aux (sum 0))
  (dolist (op (dmos:lp-operations logpt))
    (setq sum (+ sum (dmos:number-of-lots-in-process op))))
  sum)


;;; The following variations on STRING-OUT allow one to draw characters
;;; up and down the screen.  The primitives used are not written in
;;; microcode which means that they are much slower than DRAW-CHAR.
(DEFUN SHEET-STRING-OUT-UP
       (SHEET STRING &OPTIONAL (user-font fonts:cptfont) (START 0.) (END NIL))
  "Display STRING going up the window using the current font in
SHEET and the current cursor position."
  (UNLESS END
    (SETQ END (1- (STRING-LENGTH STRING))))
  (LET* ((FONT user-font)
         (CHAR-ALUF (SEND SHEET ':CHAR-ALUF))
         CHARACTER
         (WIDTH-TABLE (FONT-CHAR-WIDTH-TABLE FONT)))
    (LOOP FOR STRING-INDEX FROM START TO END
          DO (PROGN
```

```
(SETQ CHARACTER (AREF STRING STRING-INDEX))
(tv:DRAW-CHAR-UP FONT
              CHARACTER
              NIL NIL          ; X,Y
              CHAR-ALUF
              SHEET)
;; Update the cursor position to reflect the character
;; just drawn.
(SEND SHEET ':INCREMENT-CURSORPOS
      Ø
      (- (IF WIDTH-TABLE
             (AREF WIDTH-TABLE CHARACTER)
           (FONT-CHAR-WIDTH FONT))))))))

(DEFUN SHEET-STRING-OUT-DOWN
       (SHEET STRING &OPTIONAL (user-font fonts:cptfont) (START Ø.) (END NIL))
  "Display STRING going down the window using the current font in
SHEET and the current cursor position."
  (UNLESS END
    (SETQ END (1- (STRING-LENGTH STRING))))
  (LET* ((FONT user-font)
         (CHAR-ALUF (SEND SHEET ':CHAR-ALUF))
         CHARACTER
         (WIDTH-TABLE (FONT-CHAR-WIDTH-TABLE FONT)))
    (LOOP FOR STRING-INDEX FROM START TO END
          DO (PROGN
               (SETQ CHARACTER (AREF STRING STRING-INDEX))
               (tv:DRAW-CHAR-DOWN FONT
                                  CHARACTER
                                  NIL NIL          ; X,Y
                                  CHAR-ALUF
                                  SHEET)
               ;; Update the cursor position to reflect the character
               ;; just drawn.
               (SEND SHEET ':INCREMENT-CURSORPOS
                     Ø
                     (IF WIDTH-TABLE
                            (AREF WIDTH-TABLE CHARACTER)
                          (FONT-CHAR-WIDTH FONT)))))))
```

```
;1;-*- Mode: Lisp; Package: SI; Base: 10.; Patch-File: T; Fonts: MEDFNT,HL12B,HL12BI -*-*

;1; 5/19/86*

(defcommand EXIT-BREAK (char)
  '(:description 2"provides various ways to exit break."*
                 :keys (#\control-z #\abort #\meta-abort #\resume)
                 :arguments (ucl:kbd-input)) ;;instance var of command loop.
  ;1; Interpret characters assigned to this command (such as *
  ;1; control-Z or any the user chooses) as abort.*
  (cond
    ((eq char #\resume)
;;;      (funcall standard-output ':string-out 2"[resume]"*)
;;;      (terpri)
     (send ucl:this-application :quit))
    (t
     (unless (assq char tv:kbd-standard-intercepted-characters)
       (setq char #\abort))
     (when (boundp 'tv:kbd-standard-intercepted-characters)
       (funcall (cadr (assq char tv:kbd-standard-intercepted-characters)) char)))))

  ;1; -*- Package: DMOS; Mode: COMMON-LISP; Base: 10.; Fonts: MEDFNT,HL12B,HL12BI -*-*

  ;1; 12/10/85 -  USER-IO*

  (defun user:yyy ()
    (dolist (machine *machines-in-order*)
      (format t "2~%  ~A    ~A"* machine (m-scheduling-type machine))))

  (defun user:xx0 (machine)
    (dolist (operation (m-operations (real-machine machine)))
      (print (operation-lot-capacity operation))))

  (defun user:ssup (machine)
    (dolist (operation (m-operations (real-machine machine)))
      (setf (op-setup-time operation) 1)))

  (defun user:zzz (machine-type)
    (dolist (machine (mt-machines (real-machine-type machine-type)))
      (format t "2~% ~A, availability  ~A"* machine (m-availability machine))
      (dolist (operation (m-operations (real-machine machine)))
        (format t "2~%  setup ~A, lots ~A"* (op-setup-time operation) (operation-lot-capacity operation)))))

  (defun user:ttt (machine-type)
    (dolist (machine (mt-machines (real-machine-type machine-type)))
        (setf (m-scheduling-type machine) 'bottleneck)))


  (defun user:CHECK-LOTS ()
    (dotimes (i *last-lot-id*)
      (let ((lot (real-lot i))
            (pair (lot-position (real-lot i))))
        (cond ((cdr pair)
```

```
          (unless (lot-in-operation lot (car pair))
            (break (format nil "2~4%  ~A not in operation ~A"* lot (car pair)))))
         (t
          (unless (memq lot (lots-on-queue (car pair)))
          * (break (format nil "2~4%  ~A not on queue of ~A"* lot (car pair))))))))


;1; Show user what useful functions are available.*
(defun user:HELP-IO ()
  (format t "~3%  (bck)                  Buckets.
  (check-breakage)          Breakage ratios for machines.
  (check-machines)          Show status of machines  that aren't free or running.
  (constraint-waits)        Show wait times for constraint operations.
  (du)                      Usages for all machine types.
  (lotv <lot>)              Display <lot>.
  (lots <from> <to>)        Lot cycle times from <from> to <to> - the arguments are optional.
  (m-history <machine>)     Show the history of machine, if it has been kept.
  (msgs <from> <to>)        Messages on arrays from <from> to <to> - the arguments are optional.
  (mtus <machine-type>)     Contention for machines of <machine-type> (for all types if no argument is given).
  (mus)                     Usages for all machines.
  (mv <machine> <machine-variable>)
                            State of <machine>.  If <machine-variable> is present, just show that variable.
  (nm <name>)               The machine with <name>.
  (nmt <name>)              The machine type with <name>.
  (op-for <machine>)         Real operations for <machine>.
  (op-for-type <machine-type>)
                            Real operations for <machine-type>.
  (prc <number>)            The operation whose number is <number>.
  (prr <row1> <row2>)       Operations (including transportation operations) from <row1> to <row2>
  (pv <operation> <operation-variable>)
                            State of <operation>.  If <operation-variable> is present, just show tl    ariable.
  (pvv <row1> <row2>)       Real (non-transportation) operations from <row1> to <row2>.
   (rs <operation>)           Show the rework sequence that <operation> is in, or the nearest one before it.
   (show-constraint <constraint>)
      2                        *Display detailed status of <constraint>.
   (show-state)             Where lots are.
   (stv <constraint>)       Display <constraint>.
   (track <machine> ...)    Track the machines.
   (untrack <machine> ...)
                            Untrack the machines (untrack all machines if no arguments are given).
  (wait-time <operation> ...)
                            Cumulative wait times for operations (for all operations if no arguments are given).

    <Operation> may be either an operation or an operation number.
    <Machine> may be either a machine or a machine name, like 'pw103.
    <Machine-type> may be either a machine type or a machine type name, like 'pw.
    <Lot> may be either a lot or a lot number.
    <Constraint> may be either a constraint or a constraint number.~3%"))

(defun user:SHOW-CONSTRAINT (&rest consts)
```

```
(dolist (const (or consts *safe-time-constraints*))
  (let ((constraint (real-constraint const)))
    (cond (constraint
           (format t "2~2%    Operation    Lots    Time    Machines        ~
                          Queue                              Doing        Takes ~D lot~P     ~%"*
                   (stc-lot-# constraint)
                   (stc-lot-# constraint))
           (dolist (operation (stc-operations constraint))
             (format t "2~%     ~4A       ~A       ~2D      ~13A     ~33A      ~33A"*
                     operation
                     (operation-lot-capacity operation)
                     (op-run-time operation)
                     (op-machines operation)
                     (lots-on-queue operation)
                     (op-doing operation)))
           (terpri)
           (terpri))
          (t (print "2  Not a constraint."*))))))

(deff user:scon #'user:show-constraint)

(defun user:SHOW-CONSTRAINT+ (&rest consts)
  (dolist (const (or consts *safe-time-constraints*))
    (let ((constraint (real-constraint const)))
      (cond (constraint
             (format t "2~2%    Operation    Lots    Time    Machines    Takes ~D lot~P     ~%"*
                     (stc-lot-# constraint)
                     (stc-lot-# constraint))
             (dolist (operation (stc-operations constraint))
               (format t "2~%     ~4A       ~A       ~2D      ~A"*
                       operation
                       (operation-lot-capacity operation)
                       (op-run-time operation)
                       (op-machines operation))
               (dolist (machine (op-machines operation))
                 (let ((operations (remove operation (m-operations machine))))
                   (if operations
                       (format t "2~%           Other operations for ~A: ~A"* machine operations)))))
             (terpri)
             (terpri))
            (t (print "2  Not a constraint."*))))))

(defun user:M-HISTORY (machine &optional word)
  (let ((m (user:nm machine)))
```

```
      (if (or (null word) (string-equal (car ent) word))
          (print ent)))))


(defun user:stt ()
  (format t "2~%   Optimizing ~A, time ~D"* *optimizing* *current-time*))


(defun user:Q-WAIT-INFO ()
  (format t "~%
      Functions about recording distribution of queue wait times for individual lots of an operation:

    (keep-queue-waits)              Start recording queue waits.
    (unkeep-queue-waits)            Stop recording queue waits.
    (check-queue-waits <op ...>)    Add operations to those that are having their queue waits recorded.
    (uncheck-queue-waits <op ...>)  Delete operations from those that are having their queue waits recorded.

     <Op> may be either an operation or an operation number.~3%"))


(defun user:KEEP-QUEUE-WAITS () (setq *keeping-queue-waits* t))

(defun user:UNKEEP-QUEUE-WAITS () (setq *keeping-queue-waits* nil))


(defun user:CHECK-QUEUE-WAITS (&rest operations)
  (dolist (proc operations)
    (let ((operation (real-operation proc)))
      (when operation
        (push operation *queue-wait-operations*)
        (let ((q-array (op-queue-time-array operation)))
          (if q-array
              (dotimes (i (length q-array))
                (aset Ø q-array i))
              (setf (op-queue-time-array operation)
                    (make-array *initial-queue-wait-bound* :type art-16b)))))))


(defun user:UNCHECK-QUEUE-WAITS (&rest operations)
  (dolist (proc operations)
    (let ((operation (real-operation proc)))
      (when operation
        (setq  *queue-wait-operations* (delete operation *queue-wait-operations*))))))


(defun LOT-FOR (num)
  (if (cdr (aref *lot-information-array* num 1))
      (format t "2Lot ~D finished."* num)
      (aref *lot-information-array* num Ø)))


(defun REAL-LOT (lot-or-num)
```

```
(cond ((numberp lot-or-num)
        (lot-for lot-or-num))
       ((lot-p lot-or-num)
        lot-or-num)
       (t
        (format t "2No lot identified."*)
        nil)))


(defun user:LOTV (lot)
  (let ((lot (real-lot lot)))
    (if lot
        (show-instance-v lot 'lot))))

        (defun user:MODV (thing)
          (let ((module (real-module thing)))
            (if module
                (show-instance-v module 'module))))


        (defun user:LPV (thing)
          (let ((log-point (real-log-point thing)))
            (if log-point
                (show-instance-v log-point 'log-point))))


        (defun REAL-MODULE (thing)
          (cond ((module-p thing)
                 thing)
                ((numberp thing)
                 (dolist (module *dmos-modules*)
                   (if (= (mod-number module) thing)
                       (return module))))))


        (defun REAL-LOG-POINT (thing)
          (cond ((log-point-p thing)
                 thing)
                ((numberp thing)
                 (dolist (log-point *log-points*)
                   (if (= (lp-number log-point) thing)
                       (return log-point))))))


        (defun user:WAIT-TIME (&rest operations)
          (terpri)
          (terpri)
          (dolist (operation (if operations
                                 (mapcar #'real-operation operations)
                                 *operations*))
            (format t 2"~%  ~13A  ~7D"* operation (op-cumulative-wait operation))))
```

```
(defun user:NM (name) (name-to-machine name))

(defun user:NMT (name) (name-to-machine-type name))

(defun user:BCK ()
  (dolist (bucket *bucket-list*)
    (terpri)
    (cond (bucket (terpri) (print-bucket bucket))
          (t (princ nil)))))


;1; Display contents of a bucket.*
(defun PRINT-BUCKET (bucket)
  (do ((instructions bucket (cdddr instructions)))
      ((null instructions))
    (print (car instructions))
    (princ 2"  "*)
    (if (second instructions) (princ (second instructions)))
    (princ 2"  "*)
    (if (third instructions) (princ (third instructions)))))


(defun user:LOTS (&optional (numØ Ø) (num1 (array-length *lot-information-array*)))
  (format t 2"~%        Lot      Started   Cycle time~%"*)

    ((= lot num1))
  (let ((pair (aref *lot-information-array* lot 1)))
    (cond ((car pair)
           (format t 2"~%   ~7D   ~7D"* lot (car pair))
           (if (cdr pair)
               (format t 2"      ~7D"* (cdr pair))))
          (t
           (return))))))


(defun user:MSGS (&optional (from Ø) (to *array-length*))
  (terpri)
  (do ((i from (1+ i)))
      ((= i to))
    (let ((ms (aref *unload-array* i)))
      (if (message-there ms) (format t 2"~%  ~4D  ~16A ~A"* i '*unload-array* ms)))
    (let ((ms (aref *maintain-array* i)))
      (if (message-there ms) (format t 2"~%  ~4D  ~16A ~A"* i '*maintain-array* ms)))
    (let ((ms (aref *on-line-array* i)))
      (if (message-there ms) (format t 2"~%  ~4D  ~16A ~A"* i '*on-line-array* ms)))
    (let ((ms (aref *break-array* i)))
      (if (message-there ms) (format t 2"~%  ~4D  ~16A ~A"* i '*break-array* ms)))
    (let ((ms (aref *fix-array* i)))
      (if (message-there ms) (format t 2"~%  ~4D  ~16A ~A"* i '*fix-array* ms)))
    (let ((ms (aref *load-array* i)))
      (if (message-there ms) (format t 2"~%  ~4D  ~16A ~A"* i '*load-array* ms)))
    (let ((ms (aref *create-array* i)))
      (if (message-there ms) (format t 2"~%  ~4D  ~16A ~A"* i '*create-array* ms)))
```

```
    (let ((ms (aref *optimize-array* i)))
      (if (message-there ms) (format t 2"~%  ~4D  ~16A ~A"* i '*optimize-array* ms)))
    (let ((ms (aref *snap-array* i)))
      (if (message-there ms) (format t 2"~%  ~4D  ~16A ~A"* i '*snap-array* ms)))
    (let ((ms (aref *dump-array* i)))
      (if (message-there ms) (format t 2"~%  ~4D  ~16A ~A"* i '*dump-array* ms))))
  (terpri))


(defun user:RUN-TO (n)
  (setq *next-break* n))


(defun MESSAGE-THERE (message-list)
  (dolist (message message-list)
    (if (or (not (listp message)) (active? message)) (return t))))


(defun user:CHECK-BREAKAGE ()
  (format t 2"~%          Predicted  Actual"*)
  (let ((ct (float *current-time*)))
    (dolist (machine *machines*)
      (format t
              2"~% ~A    ~6F      ~6F"*
              machine
              (quotient (float (m-mttr machine)) (float (m-mtbf machine)))
              (quotient (float (m-total-broken-time machine)) ct)))))


(defun user:SHOW-STATE ()
  (format t 2"  ~2% Time:  ~7D"* *current-time*)
  (show-queues)
  (terpri)
  (terpri))

                 (setup-time-factor *default-setup-time-factor*)
                 (lot-factor-list *default-lot-factor-list*))
  (display-ordered-usages stream nil 100 rework-factor setup-time-factor lot-factor-list))


;1; Displays rows from row1 to row2.*
(defun user:PRR (row1 row2)
  (terpri)
  (terpri)
  (do ((r row1 (1+ r)))
      ((eq r (1+ row2)))
    (show-instance-h (aref *dmos-flow-text-array* r) 'operation)
    (terpri)))

(defun user:TL (n)
  (print (listarray  (aref *dmos-flow-text-array* n))))
```

```
(defun user:PVV (row1 row2)
  (terpri)
  (terpri)
  (do ((r row1 (1+ r)))
      ((eq r (1+ row2)))
    (let ((line (aref *dmos-flow-text-array* r)))
      (when (eq (typep line) 'operation-data-line)
        (show-instance-h (op-dl-operation line) 'operation))))
  (terpri)
  (terpri))


;1; Make argument into an operation.*
(defun REAL-OPERATION (operation)
  (cond ((operation-p operation) operation)
        ((numberp operation) (aref *dmos-flow-text-array* operation))))


;1; Make argument into a machine.*
(defun REAL-MACHINE (machine)
  (cond ((numberp machine)
         (if (< machine (length *machines*))
             (nth machine *machines*)))
        ((machine-p machine) machine)
        ((or (symbolp machine) (stringp machine)) (name-to-machine machine))))


;1; Make argument into a machine-type.*
(defun REAL-MACHINE-TYPE (machine-type)
  (cond ((machine-type-p machine-type)
         machine-type)
        ((or (symbolp machine-type) (stringp machine-type))
         (name-to-machine-type machine-type))))


;1; Show an operation horizontally.*
(defun user:PH (operation)
  (show-instance-h (real-operation operation) 'operation))


;1; Show an operation vertically.*
(defun user:PV (lp-number op-number &optional slot (stream standard-output))
  (let ((operation (lp-operation lp-number op-number)))
    (if operation
        (if slot
            (print-slot operation 'operation slot stream)
            (show-instance-v operation 'operation stream))

  (defun PV-op (operation stream)
    (show-instance-v operation 'operation stream)
    (print "tell annette you got an error"))
```

```
(defun LP-OPERATION (lp-number op-number)
  (dolist (operation *operations*)
    (if (and (eq (lp-number (op-log-point operation)) lp-number)
             (eq (op-operation-number operation) op-number))
        (return operation))))

(deff user:prc #'lp-operation)

(defun user:CONSTRAINT-WAITS ()
  (dolist (constraint *safe-time-constraints*)
    (terpri)
    (dolist (operation (stc-operations constraint))
      (format t "2~% ~A    ~A"* operation (op-cumulative-wait operation)))))


(defun REAL-CONSTRAINT (constraint)
  (if (numberp constraint)
      (let ((operation (real-operation constraint)))
        (or (op-constraint-starter operation)
            (op-constraint-member operation)))
      (if (safe-time-constraint-p constraint) constraint)))


;1; Display constraint.*
(defun user:STV (constraint)
  (let ((const (real-constraint constraint)))
    (if const
        (show-instance-v const 'safe-time-constraint))))


;1; Show the rework sequence that <operation> is in, or the nearest one that precedes <operation>*
(defun user:RS (operation)
  (let ((top-operation-number (if (numberp operation) operation (op-operation-number operation))))
    (if (and (numberp top-operation-number) (< top-operation-number (length *dmos-flow-text-array*)))
        (do ((operation-number top-operation-number (1- operation-number)))
            ((minusp operation-number) 2"no sequence"*)
          (let ((sequence (op-rework-sequence (aref *dmos-flow-text-array* operation-number))))
            (when sequence
              (terpri)
              (show-instance-v sequence 'rework-sequence)
              (terpri)
              (terpri)
              (return))))
        2"Not an operation"*)))


(defun user:MV (mach &optional slot (stream standard-output))
  (let ((machine (real-machine mach)))
    (if machine
        (if slot
            (print-slot machine 'machine slot stream)
```

```
          (show-instance-v machine 'machine stream))
       (print "2Not a machine"* stream))))


;1; Displays all real operations for machine.*
(defun user:P-FOR (machine)
  (dolist (operation (m-operations (real-machine machine)))
    (terpri)
    (terpri)
    (show-instance-h operation 'operation)))

(defun user:P-FOR-TYPE (machine-type)
  (dolist (operation (mt-operations (real-machine-type machine-type)))
    (terpri)
    (terpri)
    (show-instance-h operation 'operation)))


(defun user:MUS (&optional (stream standard-output))
  (let ((pairs (sortcar (mapcar #'(lambda (x) (cons (m-usage x) (m-name x))) *machines*) '>)))
    (dolist (pair pairs)
      (terpri stream)
      (princ 2"  "* stream)
      (princ (cdr pair) stream)
      (princ 2"  "* stream)
      (print-flonum (car pair) 3 stream))))


(defun user:DUS (machine &optional (stream t))
  (format stream 2"~% ~A, usage ~4F,  operations:"* machine (m-usage machine))
  (dolist (operation (m-operations machine))
    (format stream 2"~%    ~A, usage ~4F, factor ~4F"*
            operation
            (op-usage operation)
            (cdr (assq operation (m-contention machine))))))


(defun user:MTUS (&optional machine-type (stream t))
  (if machine-type
      (dolist (m-class (machine-classes (real-machine-type machine-type)))
        (terpri stream)
        (terpri stream)
        (terpri stream)
        (dolist (machine m-class)
          (user:dus machine stream)))
      (dolist (machine-type *machine-types*)
        (user:mtus machine-type stream))))


(defun user:SHOW-L-OPTS (&optional type)
  (cond ((and type (not (member type '(local-optimize bottleneck constraint-member round-robin))))
 (format t "2~% Types are: dmos:local-optimize, dmos:bottleneck, dmos:constraint-member, dmos:round-robin."*))
        ((null type)
```

```
        (dolist (machine *machines*)
          (format t 2"~%  ~A  ~A"* machine (m-scheduling-type machine))))
       (t
        (dolist (machine *machines*)
          (if (eq (m-scheduling-type machine) type)
              (format t 2"~%  ~A"* machine))))))


(defun user:LOTS-IN-PLANT (&aux (count 0))
  (dolist (operation *operations* count)
    (setq count (+ (number-of-lots-at-operation operation *current-time*) count))))


(defun user:M-WAITS ()
  (terpri)
  (dolist (machine *machines-in-order*)
    (format t "2~%  ~A   ~A"*  machine (total-machine-wait machine)))
  (terpri))


(defun user:M-WAIT (machine) (total-machine-wait machine))

 (defun user:OLD-OPERATION (number &aux (operation *first-operation*))
   (dotimes (i number operation)
     (setq operation (op-next-operation operation))))


 (defun user:AVERAGE-CYCLE-TIME (&aux (count 0) (total 0))
   (dotimes (i (car (array-dimensions *lot-information-array*)) (quotient total count))
     (let ((pair (aref *lot-information-array* i 1)))
       (when (numberp (cdr pair))
         (incf count)
         (setq total (+ (cdr pair) total))))))


 (defun user:CP (operation)
   (let ((proc (real-operation operation)))
     (dolist (machine (op-machines proc))
       (format t "2~% ~A unloaded ~D, checked ~A"*
               machine
               (m-last-unloaded-at machine)
               (cdr (assq proc (m-checked-up-to machine)))))))

 (defun user:SHOW-DOUBLES ()
   (terpri)
   (dolist (machine *machines*)
     (if (m-sides machine)
         (format t "2~%   ~A   ~A"* machine (m-sides machine)))))
```

```
(defun user:M-QS (machine)
  (let ((mach (real-machine machine)))
    (if mach (dolist (operation (m-operations mach))
               (format t "2~%  ~A  ~A"* operation (lots-on-queue operation))))))


;1; Show status of machines  that aren't free or running.*
(defun user:CHECK-MACHINES ()
  (dolist (machine *machines*)
    (unless (memq (m-status machine) '(free running))
      (format t "2~% ~A  ~A"* machine (m-status machine)))))


(defun user:oplv (row1 row2)
  (terpri)
  (terpri)
  (do ((r row1 (1+ r)))
      ((eq r (1+ row2)))
    (let ((line (aref *dmos-flow-text-array* r)))
    (show-instance-h line (typep line))
    (terpri)
    (terpri))))


;1; -*- Package: DMOS; Mode: COMMON-LISP; Base: 10.; Fonts: MEDFNT,HL12B,HL12BI -*-*

;1; 1/16/86*

;1;  Functions having to do with things like following lots through the factory.


;; This function is used to set the lot-being-tracked to be true if the user decides to track  the information
;; about that lot.*
(defun user:TRACK-LOT (&rest lots)
  (dolist (lot lots)
    (let ((r-lot (real-lot lot)))
      (setf (lot-being-tracked r-lot) t))))


1;; This function is used to set the lot-being-tracked to be nil if the user wants to untrack that lot.*
(defun user:UNTRACK-LOT (&rest lots)
  (dolist (lot lots)
    (let ((r-lot (real-lot lot)))
    (setf (lot-being-tracked r-lot) nil))))
```

```
(defun SHOW-LOT-MOVE (lot string)
  (format t "2~2% ~A"* lot)
  (let* ((pair (lot-position lot))
         (operation (car pair))
         (machine (cdr pair)))
    (format t
            "2~% Operation ~4A, queue ~A, doing ~A, wait ~D"*
            operation
            (lots-on-queue operation)
            (if machine (cdr (assq machine (op-doing operation))) nil)
            (op-cumulative-wait operation))
    (if machine
        (format t
                "2~% Machine ~A, status ~A, time ~D,"*
                machine
                (m-status machine)
                *current-time*)
        (format t
                "2~% Time ~D,"*
                *current-time*)))
  (break string))


(defun user:TRACK (&rest machines)
  (dolist (machine machines)
    (let ((r-machine (real-machine machine)))
      (setf (m-being-tracked r-machine) (copylist (m-operations r-machine)))
      (dolist (operation (m-operations r-machine))
        (setf (op-being-tracked operation) (adjoin r-machine (op-being-tracked operation)))))))


(defun user:P-TRACK (&rest operations)
  (dolist (operation operations)
    (let ((r-operation (real-operation operation)))
      (if (operation-p r-operation)
          (dolist (machine (op-machines r-operation))
            (user:track machine))))))


(defun user:UNTRACK (&rest machines)
  (if machines
      (dolist (machine machines)

       (dolist (machine *machines*)
         (untrack-1 machine))))


(defun UNTRACK-1 (machine)
  (when (m-being-tracked machine)
    (setf (m-being-tracked machine) nil)
    (dolist (operation (m-operations machine))
      (setf (op-being-tracked operation) (delq machine (op-being-tracked operation))))))
```

```
(defun LOTS-IN-SEGMENT (&optional (start-seg *first-operation*) (end-seg *final-operation*))
  (do ((operation (real-operation start-seg) (op-next-operation operation))
       (total Ø (+ (number-of-lots-in-process operation) total)))
      ((= operation end-seg) total)))


(defun AVERAGE-CYCLE-TIME (&optional (from-time Ø) (to-time *current-time*))
  (do* ((lot-number Ø (1+ lot-number))
        (pair (aref *lot-information-array* lot-number 1) (aref *lot-information-array* lot-number 1))
        (count Ø)
        (sum Ø))
       ((or (null (car pair)) (> (car pair) to-time)) (quotient (float sum) (float count)))
    (if (and (<= from-time (car pair) to-time) (numberp (cdr pair)))
        (setq count (1+ count)
              sum (+ sum (cdr pair))))))


(defun CHECK-LOT-TOTAL ()
  (if (neq *lots-in-plant* (lots-in-plant))
      (format t "2~% *Lot error2 ~D, ~D"* (lots-in-plant) *lots-in-plant*)))


(defun LOTS-IN-PLANT (&aux (total Ø))
  ;1; Count all lots in operation queues.*
  (dolist (p *operations* total)
    (setq total (+ (number-of-lots-at-operation p *current-time*) total))))


(defun TRACK-MACHINE (machine)
  (dolist (proc (m-operations machine))
    (format t "2~% Operation ~A, ~D lots in queue"* proc (number-of-lots-on-queue proc))))


(defun SHOW-MACHINE-MOVE (machine string)
  (format t "2~% ~A ~A."* machine string)
  (dolist (operation (m-being-tracked machine))
    (format t
            "2~% Operation ~4A, queue ~A, doing ~A, wait ~D"*
            operation
            (lots-on-queue operation)
            (cdr (assq machine (op-doing operation)))
            (op-cumulative-wait operation)))
  (format t "2~% Status ~A, time ~D,"* (m-status machine) *current-time*)
  (break (m-name machine)))


(defun user:smm (machine)
  (show-machine-move (real-machine machine) "2user"*))
```

```
RRRRRRRRRR     7777777777777777777777777777777777777777777777777777777777777777777777777777777777777777777777     RRRRRRRRRR
RRRRRRRRRR     77777777777777777777777  THIS INFORMATION IS THE PROPERTY OF TEXAS INSTRUMENTS  77777777777777777777777     RRRRRRRRRR
RRRRRRRRRR     7777777777777777777777777777777777777777777777777777777777777777777777777777777777777777777777     RRRRRRRRRR

                              RRRR     000     AAA    RRRR    K   K
                              R   R   0   0   A   A   R   R   K  K
                              R   R   0   0   A   A   R   R   K K
                              RRRR    0   0   A   A   RRRR    KKK
                              R R     0   0   AAAAA   R R     K K
                              R  R    0   0   A   A   R  R    K  K
                              R   R    000    A   A   R   R   K   K

          BBBBBBBB    UU      UU  FFFFFFFFFF  FFFFFFFFFF  EEEEEEEEEE  RRRRRRRR
          BBBBBBBB    UU      UU  FFFFFFFFFF  FFFFFFFFFF  EEEEEEEEEE  RRRRRRRR
          BB      BB  UU      UU  FF          FF          EE          RR      RR
          BB      BB  UU      UU  FF          FF          EE          RR      RR
          BB      BB  UU      UU  FF          FF          EE          RR      RR
          BB      BB  UU      UU  FF          FF          EE          RR      RR
          BBBBBBBB    UU      UU  FFFFFFFF    FFFFFFFF    EEEEEEEE    RRRRRRRR
          BBBBBBBB    UU      UU  FFFFFFFF    FFFFFFFF    EEEEEEEE    RRRRRRRR
          BB      BB  UU      UU  FF          FF          EE          RR  RR
          BB      BB  UU      UU  FF          FF          EE          RR  RR
          BB      BB  UU      UU  FF          FF          EE          RR    RR
          BB      BB  UU      UU  FF          FF          EE          RR    RR
          BBBBBBBB    UUUUUUUUUU  FF          FF          EEEEEEEEEE  RR      RR
          BBBBBBBB    UUUUUUUUUU  FF          FF          EEEEEEEEEE  RR      RR

                LL            IIIIII      SSSSSSSS  PPPPPPPP        ;;;;        11
                LL            IIIIII      SSSSSSSS  PPPPPPPP        ;;;;        11
                LL              II      SS          PP      PP      ;;;;      1111
                LL              II      SS          PP      PP      ;;;;      1111
                LL              II      SS          PP      PP                  11
                LL              II      SS          PP      PP                  11
                LL              II        SSSSSS    PPPPPPPP        ;;;;        11
                LL              II        SSSSSS    PPPPPPPP        ;;;;        11
                LL              II              SS  PP              ;;;;        11
                LL              II              SS  PP              ;;;;        11
        ....    LL              II              SS  PP                ;;        11
        ....    LL              II              SS  PP                ;;        11
        ....    LLLLLLLLLL    IIIIII    SSSSSSSS    PP              ;;      111111
        ....    LLLLLLLLLL    IIIIII    SSSSSSSS    PP              ;;      111111
```

File _$3$DUA27:[ROARK.JUL]BUFFER.LISP;1 (26703,6,0), last revised on 15-JUL-1986 13:53, is a 12 block sequential file owned by UIC [IIIS,ROARK]. The records are variable length with implied (CR) carriage control. The longest record is 104 bytes.

Job BUFFER (1999) queued to NB_TALARIS_1 on 15-JUL-1986 14:05 by user ROARK, UIC [IIIS,ROARK], under account KBS at priority 100, started on printer LCA0 on 15-JUL-1986 14:05 from queue NB_TALARIS_1.

```
RRRRRRRRRR     7777777777777777777777777777777777777777777777777777777777777777777777777777777777777777777777     RRRRRRRRRR
RRRRRRRRRR     77777777777777777777777  Digital Equipment Corporation - VAX/VMS Version V4.4  77777777777777777777777     RRRRRRRRRR
               7777777777777777777777777777777777777777777777777777777777777777777777777777777777777777777777     RRRRRRRRRR
```

```
;1; the instructions-list for this* 1machine if it is RUnning, or as*
;1; a timed instruction for the current time operation if the machine is*
;1; FRee.  If the machine is in any other state (ie, being repaired)*
;1; the instruction is ignored.*
(selectq (m-status machine)
  (free                         1; Post a timed MAINT instruction.*
   (post-timed-instruction *current-time* 'maint machine 'next arg3 arg4))
  (running                      1; Post a MAINT NEXT instruction on the instructions-list.*
   (post-machine-instruction 'maint machine 'next arg3 arg4))))
 (aft                           1; Maintenance is to be done after the specified clock time.*
  ;1; Two messages must be* 1posted to implement this* 1one:* 1a timed*
  ;1; MAINT CHECK posted* 1at the given time* 1on the* 1message list, and*
  ;1; a MAINT* 1AFT on the* 1machine's* 1instructions.*  1Only*
  ;1; operation instructions which* 1haven't already expired.*
  ;1; [[[Something wrong here.*
  (when (>= arg3 *current-time*)
    (post-timed-instruction arg1 'maint machine 'check)
    (post-machine-instruction 'maint machine 'check)))
 ;1; Maintenance is to be done after the machine has finished the specified operation.*
 (done
  ;1; Only accept this instruction if the machine can actually do this operation.*
  (when (memq arg4 (m-operations machine))
    (post-machine-instruction 'maint machine 'done arg3 arg4)))
 ;1; Maintenance is to be done after the specified number of jobs have been completed.*
 (fin
  (post-machine-instruction 'maint machine 'fin arg3 arg4)))))
(create
 ;1; Need to write new-lots out to a file or something.*
 (post-timed-instruction *current-time* 'create arg1))))


;1; Check for operations that the machine won't do and for too many lots.*
(defun CHECK-LOAD-ERROR (machine operations num-of-lots)
  (when (not (included-in operations (m-operations machine)))
    ;1; An illegal operation was specified.*
    (format t
            2"~&Ignoring bad LOAD instruction for machine ~A received at time ~D"*
            machine
            *current-time*)
    (format t
            2"~&Instruction requested machine to perform operation ~A."*
            operations)
    (format t
            2"~&This machine only performs operations ~A"*
            (m-operations machine)))
  (dolist (operation operations)
    (when (> num-of-lots (operation-lot-capacity operation))
      ;1; This instruction would load more lots than are allowed into the machine.*
      (format t
              2"~&Ignoring bad LOAD-LOTS instruction for machine ~A received at time ~D"*
              machine
              *current-time*)
```

```
        2"~&Instruction specifies ~D lots to be loaded.  Operation only takes ~D"*
        num-of-lots (operation-lot-capacity operation)))))
;1; -*- Package: DMOS; Mode: COMMON-LISP; Base: 10.; Fonts: MEDFNT,HL12B,HL12BI -*-*

;1; New file for revised simulator stuff.  Simulator is now to unload everything*
;1; onto operation queues first, then (after the scheduler has operated) load*
;1; machines from operation queues.*

;1; 3/18/86*

;1; Puts an externally generated instruction into the appropriate place in simulator.*
;1; Revised version, to reduce garbage.*
(defun BUFFER (instruction-type &optional arg1 keyword arg3 arg4 seq)
  2"Translates a single scheduler-provided instruction into the appropriate simulator instruction(s)"*
  (selectq instruction-type
    (load-lots
     (let ((machine arg1))
       (selectq keyword
         (round-robin
          (let ((priority arg3))
            (if priority
                ;1; Make sure that the priority specified is legal for this machine.*
                (unless (memq priority (m-operations machine))
                  (format t
                          2"~&Illegal priority specified in ROUND-ROBIN instruction for machine ~A at time ~D"*
                          machine
                          *current-time*)
                  (format t
                          2"~&Priority operation was ~A, but this machine only performs ~A"*
                          priority
                          (m-operations machine))
                  (format t
                          2"~&Ignoring priority specification -- treating instruction as non-priority ROUND-ROBIN"*)))
            ;1; Post the instruction.*
            (post-machine-instruction 'load-lots machine keyword nil arg4)))
         (in-order
          (let ((operations arg3))
            (cond ((included-in operations (m-operations machine))
                   ;1; This means that the machine can perform all operations listed,*
                   ;1; so post the instruction.*
                   (post-machine-instruction 'load-lots machine keyword arg3 arg4))
                  (t                         1; Error.*
                   (format t
                           2"~&Ignoring illegal LOAD-LOTS IN-ORDER instruction to machine ~A at time ~D"*
                           machine
                           *current-time*)
                   (format t
                           2"~&Operations requested were ~A, but this machine only performs ~A"*
                           operations
                           (m-operations machine))))))
       (at
        ;1; Only operation instructions which haven't already expired.*
```

```
        (post-timed-instruction arg4 'load-lots machine 'at arg3 arg4 seq)
        (format t
                2*~&Ignoring late load instruction for machine ~A received at time ~D.*
                machine
                *current-time*)))
     ;1; NEXT is to be filled as soon as the machine becomes free.*
     ;1; WHEN-AVAILABLE load is to be done as soon as the raw materials are ready.*
     ((next when-available)
      (post-machine-instruction 'load-lots machine keyword arg3 arg4 seq)))))
(maint
  (let ((machine arg1))
    (selectq keyword
      ;1; Maintenance is to be done as soon as possible.*
      (next
       ;1; Determine how to post the maintenance instruction.  It goes on*
```

```
BBBBBBBBBB    666666666666666666666666666666666666666666666666666666666666666666666666666666666666666666666666    BBBBBBBBBB
BBBBBBBBBB    666666666666666666666666  THIS INFORMATION IS THE PROPERTY OF TEXAS INSTRUMENTS  666666666666666666666666    BBBBBBBBBB
BBBBBBBBBB    666666666666666666666666666666666666666666666666666666666666666666666666666666666666666666666666    BBBBBBBBBB
```

```
                          RRRR    000    AAA   RRRR   K   K
                          R   R  0   0  A   A  R   R  K  K
                          R   R  0   0  A   A  R   R  K K
                          RRRR   0   0  A   A  RRRR   KKK
                          R R    0   0  AAAAA  R R    K  K
                          R  R   0   0  A   A  R  R   K   K
                          R   R   000   A   A  R   R  K    K

L       000    AAA   DDDD          FFFFF  U   U  N   N   CCCC  TTTTT  III   000   N   N   SSSS
L      0   0  A   A  D   D         F      U   U  N   N  C        T     I   0   0  N   N  S
L      0   0  A   A  D   D         F      U   U  NN  N  C        T     I   0   0  NN  N  S
L      0   0  A   A  D   D         FFFF   U   U  N N N  C        T     I   0   0  N N N   SSS
L      0   0  AAAAA  D   D         F      U   U  N  NN  C        T     I   0   0  N  NN      S
L      0   0  A   A  D   D         F      U   U  N   N  C        T     I   0   0  N   N      S
LLLLL   000   A   A  DDDD   _____  F      UUUUU  N   N   CCCC    T    III   000   N   N  SSSS

                          L      III   SSSS  PPPP    ;;     1
                          L       I   S      P   P   ;;    11
                          L       I   S      P   P          1
                          L       I    SSS   PPPP    ;;     1
                          L       I       S  P       ;;     1
                       .. L       I       S  P        ;     1
                       .. LLLLL  III  SSSS   P       ;     111
```

File $3$DUA27:[ROARK.JUL]LOAD_FUNCTIONS.LISP;1 (9649,26,0), last revised on 15-JUL-1986 14:41, is a 17 block sequential file owned by UIC [IIIS,ROARK]. The records are variable length with implied (CR) carriage control. The longest record is 121 bytes.

Job LOAD_FUNCTIONS (27) queued to NB_TALARIS on 15-JUL-1986 14:49 by user ROARK, UIC [IIIS,ROARK], under account KBS at priority 100, started on printer LCB0 on 15-JUL-1986 14:49 from queue NB_TALARIS.

```
BBBBBBBBBB    666666666666666666666666666666666666666666666666666666666666666666666666666666666666666666666666    BBBBBBBBBB
BBBBBBBBBB    666666666666666666666666  Digital Equipment Corporation - VAX/VMS Version V4.4  666666666666666666666666    BBBBBBBBBB
BBBBBBBBBB    666666666666666666666666666666666666666666666666666666666666666666666666666666666666666666666666    BBBBBBBBBB
```

```lisp
;1; -*- Package: DMOS; Mode: COMMON-LISP; Base: 10.; Fonts: MEDFNT,HL12B,HL12BI -*-*

(defun INCREMENTAL-LOAD-LOTS (operation-list machine &optional (time *current-time*) &aux (lot-count 0))
  (if *load-debugging* (format t 2"~2% Incremental-load-lots, operation-list ~A, machine ~A."* operation-list machine))
  (if (and *keeping-machine-history*) ; (memq (m-number machine) '(107 108 109 110 45 46 92 93)))
      (setf (m-history machine) (cons (list 'incremental-load 'operation-list operation-list time
                                            'op *optimizing*)
      (m-history machine))))
  (check-machine-state machine)
  ;1; Keep m-doing until load time (i.e., now).*
  (incremental-clear-m-doing machine operation-list)
  (dolist (pair operation-list)
    (let ((number-of-lots (cdr pair))
          (operation (car pair)))
      (check-operation-state operation time)
      (when (and number-of-lots (plusp number-of-lots))
        (let* ((lots (lots-on-queue operation time)))
          (when (plusp (g-length lots))
            (setq number-of-lots (min number-of-lots (g-length lots))
                  lot-count (+ number-of-lots lot-count))
            (shift-lots operation machine lots number-of-lots time 'incremental))))))
  (if *keeping-machine-history*
      (setf (m-history machine) (cons (list 'incremental-load-out
                                            'm-doing (copytree (m-doing machine))
                                            time)
                                      (m-history machine))))
  (finish-load machine time)
  lot-count)


(defun BASIC-LOAD-LOTS (number-of-lots operation machine &optional (time *current-time*))
  (if *load-debugging* (format t 2"~2% Simple-load-lots, operation ~A, machine ~A."* operation machine))

  (if (and *keeping-machine-history*) ; (memq (m-number machine) '(107 108 109 110 45 46 92 93)))

      (setf (m-history machine) (cons (list 'basic-load 'operation operation
                                            'queue (lots-on-queue operation) time
                                             'op *optimizing*)
            (m-history machine))))
  (check-machine-state machine)
  (check-operation-state operation time)
  ;1; Keep m-doing until load time.*
  (basic-clear-m-doing machine number-of-lots operation)
  (shift-lots operation machine (lots-on-queue operation time) number-of-lots time 'basic)
  (finish-load machine time)
  (if (and *keeping-machine-history*) ;  (memq (m-number machine) '(107 108 109 110 45 46 92 93)))
      (setf (m-history machine) (cons (list 'basic-load-out 'operation operation
                                            'm-doing (copytree (m-doing machine))
                                            'queue (lots-on-queue operation) time) (m-history machine))))
  number-of-lots)
```

```
;1; Move lots from the operation queue to the machine.*
(defun SHIFT-LOTS (operation machine lots number-of-lots time mode)
;  (if (eq (m-number machine) 128) (break "2shift-lots"*))
  (unless *optimizing*
    (record-load lots number-of-lots machine))
  (let ((pair (assq operation (m-doing machine)))
        (constraint (op-constraint-starter operation)))
    (if constraint
        (update-constraint-availability-when-loading constraint time))
    (rplacd pair (selectq mode
                   (basic (g-copy lots (cdr pair) number-of-lots))
                   (incremental (g-add lots (cdr pair) number-of-lots)))))
  ;1; optimization do not affect p-doing.*
  (unless *optimizing*
    (let ((pair (assq machine (op-doing operation))))
      (rplacd pair (selectq mode
                     (basic (g-copy lots (cdr pair) number-of-lots))
                     (incremental (g-add lots (cdr pair) number-of-lots))))))
  (remove-from-queue number-of-lots operation))


(defun RECORD-LOAD (lots number-of-lots machine)
  (do ((count 0)
       (remaining-lots lots (cdr remaining-lots)))
      ((= count number-of-lots))
    (let ((lot (car remaining-lots)))
      (when lot
        (incf count)
        (rplacd (lot-position lot) machine)))))

;1; temporary*

(defun bad-list (list)
  (and list
       (or (member (car list) (cdr list))
           (bad-list (cdr list)))))

(defun user:CLEAR-QUEUES ()
  (dolist (operation *operations*)
    (setf (op-queue operation) nil)
    (let ((state (op-real-state operation)))
      (setf (op-state-holder-queue state) nil))))

;1; Assumes that operation has already been run to the relevant time, and*
;1; <number-of-lots> lots are on the queue at time.*
(defun REMOVE-FROM-QUEUE (number-of-lots operation &aux (queue (op-queue operation)))
  (if (and *optimizing* (not (op-optimizing? operation)))
      (break (format t "2~% remove-from-queue optimizing error ~A"* operation)))
  (cond ((< number-of-lots (q-length (cdar queue)))
         (rplacd (car queue) (q-delete number-of-lots (cdar queue)))
         queue)
        ((= number-of-lots (q-length (cdar queue)))
```

```
  (rplaca (car queue) nil)
  (if (and (cdr queue) (caadr queue))
      (setf (op-queue operation) (nconc (cdr queue) (list (car queue)))))
  (op-queue operation))
 (t
  (break (format t "2~2% *REMOVE-FROM-QUEUE number-of-lots2 ~A,* operation2 ~A, *queue2 ~A"*
               number-of-lots operation queue))
  (do ((opairs queue (cdr opairs))
       (pairs (cdr queue) (cdr pairs))
       (remaining-lots (- number-of-lots (q-length (cdar queue)))
                       (- remaining-lots lots-now))
       (lots-now))
      ;1; Quit when the queue is empty or the specified number of lots has been loaded.*
      ((or (null pairs) (null (caar pairs)))
       (rplaca (car queue) nil)
       queue)
    (setq lots-now (q-length (cdar pairs)))
    (cond ((> remaining-lots lots-now))
          ((= remaining-lots lots-now)
           (if (and (cdr pairs) (caadr pairs))
               (let ((tail (cdr pairs)))
                 (rplacd pairs nil)
                 (rplaca (car queue) nil)
                 (rplacd (last tail) queue)
                 (setf (op-queue operation) tail))
               (rplaca (car queue) nil))
                 (return (op-queue operation)))
                (t
                 (rplacd (car pairs) (q-delete remaining-lots (cdar pairs)))
                 (rplaca (car queue) nil)
                 (rplacd opairs nil)
                 (rplacd (last pairs) queue)
                 (setf (op-queue operation) pairs)
                 (return pairs)))))))

;1; Temporary*
(defun user:qq (num)
  (op-queue (real-operation num)))

(defun LOAD-FROM-SPEC (machine instruction &optional (time *current-time*))
  (check-machine-state machine)
;1; This function handles the timed AT LOAD-LOTS, and untimed WHEN-AVAILABLE, etc.*
;  (format t "2~% *Load-from-spec2 ~A, ~A, ~D" *machine instruction time)
  (let ((status (m-status machine)))
    (cond ((eq status 'free)
           ;1; Use p-temp0 to keep track of the operations that were being done.*
           (dolist (pair (m-doing machine))
             (setf (op-temp0 (car pair)) (not (g-null (cdr pair)))))
           (incremental-load-lots (operation-list instruction) machine time))
          (t
           ;1; Error -- machine can't be loaded.*
           (format t                                    ~A at time ~D because ~A is ~A."*
```

```
              machine
              time
              machine
              (selectq status
                (broken "2Broken"*)
                (running 2"Running"*)
                (down 2"Down for Maintenance"*)))
        (break "2Load-from-spec"*)))))

;1; Post an unload instruction for machine, for when it's done with the operation it is now starting.*
;1; [[Setup? is true if the machine is changing operations?*
;1; This function posts an UNLOAD instruction on the message list for the machine and updates*
;1; the machine's expected-availability time.  The*
;1; time of the message is determined by whether the machine will need an assist, whether*
;1; setup time is involved, and the time it takes to perform the operation.*
(defun SET-UNLOAD-WHEN-LOADING (machine setup? &optional (time *current-time*))
  ;1; The time when the operation will be finished.*
  (multiple-value-bind (operation-time setup-time)
      (operation-and-setup-time machine)
    (Let* ((ready-time (+ time (if setup? (+ operation-time setup-time) operation-time)))
           ;1; If it needs an assist, it will be unloaded one operation later.*
           ;1; This is the probability of the machine needing assistance.*
           (unload-time (cond ((< (quotient operation-time (float (m-mtba machine)))
                                  (si:random-in-range 0 1))
                               ready-time)
                              (t
                               (1+ ready-time)))))
      (post-unload-instruction machine unload-time))))
```

```
QQQQQQQQQQ   2222222222222222222222222222222222222222222222222222222222222222222222222222222222222222222222222222   QQQQQQQQQQ
QQQQQQQQQQ   22222222222222222222222  THIS INFORMATION IS THE PROPERTY OF TEXAS INSTRUMENTS  22222222222222222222222   QQQQQQQQQQ
QQQQQQQQQQ   2222222222222222222222222222222222222222222222222222222222222222222222222222222222222222222222222222   QQQQQQQQQQ

                                         RRRR    000    AAA   RRRR   K   K
                                         R   R  O   O  A   A  R   R  K  K
                                         R   R  O   O  A   A  R   R  K K
                                         RRRR   O   O  A   A  RRRR   KKK
                                         R R    O   O  AAAAA  R R    K  K
                                         R  R   O   O  A   A  R  R   K   K
                                         R   R   000   A   A  R   R  K    K

M   M   AAA    CCCC  H   H  III  N   N  EEEEE       III  N   N   SSSS  TTTTT  RRRR   U   U   CCCC  TTTTT  III   000   N   N
MM MM  A   A  C      H   H   I   N   N  E            I   N   N  S        T    R   R  U   U  C        T     I   O   O  N   N
M M M  A   A  C      H   H   I   NN  N  E            I   NN  N  S        T    R   R  U   U  C        T     I   O   O  NN  N
M   M  A   A  C      HHHHH   I   N N N  EEEE         I   N N N   SSS     T    RRRR   U   U  C        T     I   O   O  N N N
M   M  AAAAA  C      H   H   I   N  NN  E            I   N  NN      S    T    R R    U   U  C        T     I   O   O  N  NN
M   M  A   A  C      H   H   I   N   N  E            I   N   N      S    T    R  R   U   U  C        T     I   O   O  N   N
M   M  A   A   CCCC  H   H  III  N   N  EEEEE _____ III  N   N  SSSS     T    R   R  UUUUU   CCCC    T    III   000   N   N

                                         L      III   SSSS  PPPP   ;;   1
                                         L       I   S      P   P  ;;  11
                                         L       I   S      P   P       1
                                         L       I    SSS   PPPP   ;;   1
                                         L       I       S  P      ;;   1
                                     ..  L       I       S  P       ;   1
                                     ..  LLLLL  III  SSSS   P       ;  111
```

File $3$DUA27:[ROARK.JUL]MACHINE_INSTRUCTION_EXECUTE.LISP;1 (14316,18,0), last revised on 16-JUL-1986 14:41, is a 19 block sequential file owned by UIC [IIIS,ROARK]. The records are variable length with implied (CR) carriage control. The longest record is 112 bytes.

Job MACHINE_INSTRUCTION_EXECUTE (30) queued to NB_TALARIS_1 on 16-JUL-1986 14:50 by user ROARK, UIC [IIIS,ROARK], under account KBS at priority 100, started on printer LCA0 on 16-JUL-1986 14:50 from queue NB_TALARIS_1.

```
QQQQQQQQQQ   2222222222222222222222222222222222222222222222222222222222222222222222222222222222222222222222222222   QQQQQQQQQQ
QQQQQQQQQQ   22222222222222222222222  Digital Equipment Corporation - VAX/VMS Version V4.4  22222222222222222222222   QQQQQQQQQQ
QQQQQQQQQQ   2222222222222222222222222222222222222222222222222222222222222222222222222222222222222222222222222222   QQQQQQQQQQ
```

```lisp
;1; -*- Package: DMOS; Mode: COMMON-LISP; Base: 10.; Fonts: MEDFNT,HL12B,HL12BI -*-*

;1; 3/18/86*

;1; This function assumes that the machine is FRee.  If it is possible to perform a LOAD-LOTS operation on*
;1; machine, it is done.  Otherwise, no action is taken.*
;1; Returns number of lots loaded, or nil.*
;1; Works in when-expected, too.*
(defun CHECK-FOR-LOAD (machine &optional (time *current-time*))
  (check-machine-state machine)
  2"Loads a machine according to the instruction on its instructions-list"*
  (let ((instruction (load-lots-instruction machine)))
    ;1; It is possible that the lot-handler could wake up a machine that was once waiting on some operation's*
    ;1; queue but now has no load-lots pending event.  In that case, this function should do nothing.*
    (when (active? instruction)
      ;1; Use p-temp0 to keep track of the operations that were being done.*
      (dolist (pair (m-doing machine))
        (setf (op-temp0 (car pair)) (not (g-null (cdr pair)))))
      ;1; Determine the type of load instruction.*
      (selectq (keyword instruction)
        (round-robin
         (round-robin-load machine instruction time))
        (in-order
         (let* ((operation (cadr (operation-list instruction)))    ;1 The operation to try now.*
                (lots (progn (check-operation-state operation time)
                             (lots-on-queue operation time))))     ;1 The lots in the operation's queue.*
           ;1; See if there are lots in the queue for this operation.*
           (unless (g-null lots)
             (adjust-in-order instruction)
             ;1; Delete the lots from the appropriate queue and list them as materials for this machine.*
             ;1; Don't take more lots than are there.*
             (basic-load-lots (min (g-length lots) (operation-lot-capacity operation)) operation machine time))))
        (next
         (when (some-lots (operation-list instruction) time)
           (prog1 (load-from-spec machine instruction time)
                  (unless (rpt? instruction)
                    ;1; Remove the load instruction from the instructions-list.*
                    (deactivate instruction)))))
        (when-available
         (when (enough-lots (operation-list instruction) time)
           (prog1 (load-from-spec machine instruction time)
                  (unless (rpt? instruction)
                    ;1; Remove the load instruction from the instructions-list.*
                    (deactivate instruction))))))))))
(defun ADJUST-IN-ORDER (instruction)
  (let ((pair (operation-list instruction)))
    (if (rpt? instruction)
        (if (cddr pair)                    ;1 Is there an operation left to do?*
            (rplacd pair (cddr pair))      ;1 On to next operation.*
            (rplacd pair (car pair)))      ;1 Back to beginning of operation list.*
        (if (cddr pair)                    ;1 Is there an operation left to do?*
            (rplacd pair (cddr pair))      ;1 On to next operation.*
            (deactivate instruction)))))
```

```
;1; Has to return number of lots loaded, if any, else nil.*
(defun ROUND-ROBIN-LOAD (machine instruction time)
  (let ((priority-operation (priority instruction))  ;1 Distinguished operation, if any.*
        ;1; Operations this machine can do, kept in priority order.*
        (round-robin-list (m-operations machine))
        (num-of-lots)                          ;1 Number of lots machine can hold.*
        (loaded-lots nil))
    ;1; See if there are lots in the queue for the priority operation.*
    (when priority-operation
      (let ((lots (lots-on-queue priority-operation time)))
        (unless (g-null lots)
          ;1; Don't take more lots than are there.*
          (setq num-of-lots (min (operation-lot-capacity priority-operation) (g-length lots)))
          ;1; Rpt? for this instruction means that the priority operation is to retain priority.*
          (unless (rpt? instruction)
            ;1; Set the priority to nil.*
            (rplacd (cddr instruction) nil)
            (setq round-robin-list (g-to-end priority-operation round-robin-list)))
          (setq loaded-lots (basic-load-lots num-of-lots priority-operation machine time)))))
    ;1; See if there are lots in any of the other operations' queues.*
    (dolist (operation round-robin-list)
      (if loaded-lots (return))              ;1 Stops this if we succeeded on priority.*
      (let ((lots (lots-on-queue operation time)))
        (unless (g-null lots)
          ;1; Don't take more lots than are there.*
          (setq num-of-lots (min (operation-lot-capacity operation) (g-length lots))
                loaded-lots num-of-lots)
          (basic-load-lots num-of-lots operation machine time)
          ;1; Now put this operation to the end of the round robin list.*
          (when (> (g-length round-robin-list) 1)
            (setq round-robin-list (g-to-end operation round-robin-list))))))
    (setf (m-operations machine) round-robin-list)
    ;1; Return t iff load succeeded.*
    loaded-lots))

;1; The operation time of the operations that the machine is doing now (assuming they are all the same).*
;1; Includes set up time, if necessary.*
(defun OPERATION-AND-SETUP-TIME (machine)
  (dolist (pair (m-doing machine))
    (if (not (g-null (cdr pair)))
        (return (op-run-time (car pair))
                (op-setup-time (car pair))))))

;1; Assumes p-tempØ has been set to indicate which operations were being done.*
(defun FINISH-LOAD (machine &optional (time *current-time*))
  (setf (m-status machine) 'running)
  (setf (m-last-loaded-at machine) time)
  ;1; Post the unload instruction for when the machine is done with the operation it is now starting.*
  (set-unload-when-loading machine (setup-needed? machine) time)
  ;1; Stuff about tracking things.  Only pay attention to real (not when-expected*
  ;1; or optimizing) moves.*
  (unless *optimizing*
```

```
    (dolist (pair (m-doing machine))
      (if (eq (car pair) *first-operation*)
          ;1; Enter lot starting time.*
          (dolist (lot (cdr pair))
            (if lot (lot-insert lot)))))
;     (if (and *keeping-machine-history* (memq (m-number machine) '(107 108 109 110 45 46 92 93)))
;         (setf (m-history machine) (cons (list 'finish-load time) (m-history machine))))
    (if (m-being-tracked machine)
        (show-machine-move machine 2" loaded"*))
    (do-named sam ((pairs (m-doing machine) (cdr pairs)))
             ((null pairs))
      (dolist (lot (cdar pairs))
        (when (and lot (lot-being-tracked lot))
          (show-lot-move lot "2loaded"*) (return-from sam))))))


;1; Setup is needed (we'll say) if the machine is doing an operation it wasn't doing*
;1; before.*  1Assumes p-temp0 has been set (by CHECK-FOR-LOAD or*
;1; LOAD-FROM-SPEC) to indicate which operations were being done.*
(defun SETUP-NEEDED? (machine)
  (let ((sides (m-sides machine))
        (new-operation (dolist (pair (m-doing machine))
                         (unless (g-null (cdr pair)) (return (car pair)))))
        (old-operation (dolist (operation (m-operations machine))    ;1 AN OPERATION that was being done before.*
                         (if (op-temp0 operation) (return operation)))))
    (if sides
        (let ((old-side (dolist (side sides)       ;1 The side that was being done before.*
                           (if (memq old-operation (side-operations side)) (return side)))))
          ;1; It's not doing the side it was doing before -- i.e., the first*
          ;1; operation it's doing now doesn't belong to the side it was doing*
          ;1; before.*
          (and old-side (not (memq new-operation (side-operations old-side)))))
        ;1; It wasn't doing the operation it's doing now.*
        (neq new-operation old-operation))))


;1; First value is t if doing the same operation again.  Second value is t if doing the same side again.  *
;(defun DOING-AGAIN? (machine)
;  (let ((sides (m-sides machine))
;        (new-operation (dolist (pair (m-doing machine))
;                         (unless (g-null (cdr pair)) (return (car pair)))))
;        (old-operation (dolist (operation (m-operations machine))    ;1 AN OPERATION that was being done before.*
;                         (if (op-temp0 operation) (return operation)))))
;    (if old-operation
;        (values (if sides
;                    (dolist (pair (m-doing machine))
;                      (unless (g-null (cdr pair))
;                        (if (dolist (operation (m-operations machine))
;                              (if (and (op-temp0 operation)
;                                       (eq operation (car pair)))
;                                  (return t)))
```

```
;                              (return t))))
;                       (eq new-operation old-operation))
;                   (and sides
;                        (let ((old-side (dolist (side sides)  ;1 The side that was being done before.*
;                                         (if (memq old-operation (side-operations side)) (return side)))))
;                          ;1; It's not doing the side it was doing before -- i.e., the first*
;                          ;1; operation it's doing now doesn't belong to the side it was doing*
;                          ;1; before.*
;                          (memq new-operation (side-operations old-side)))))
;       (values nil nil))))


;1; Are there enough lots on the queue for every operation on <operation-list> that*
;1; has a specified number of lots to load?*
(defun ENOUGH-LOTS (operation-list &optional time)
  (dolist (pair operation-list t)
    ;1; [[Later, fix this so it doesn't cons lots-on-queue in *when-expected*.*
    (if (and (cdr pair) (< (g-length (lots-on-queue (car pair) time)) (cdr pair)))
        (return nil))))


;1; See if any operation on <operation-list> has lots waiting at <time>.*
(defun SOME-LOTS (operation-list &optional time)
  (dolist (pair operation-list)
    (let ((first-time (operation-earliest-lot-time (car pair))))
      (if (and first-time (<'first-time time)) (return t)))))
```

```
LLLLLLLLLL    7777777777777777777777777777777777777777777777777777777777777777777777777777777777777777777777777777777    LLLLLLLLLL
LLLLLLLLLL    777777777777777777777777  THIS INFORMATION IS THE PROPERTY OF TEXAS INSTRUMENTS  777777777777777777777777    LLLLLLLLLL
LLLLLLLLLL    7777777777777777777777777777777777777777777777777777777777777777777777777777777777777777777777777777777    LLLLLLLLLL

                                   RRRR    OOO    AAA   RRRR   K   K
                                   R   R  O   O  A   A  R   R  K  K
                                   R   R  O   O  A   A  R   R  K K
                                   RRRR   O   O  A   A  RRRR   KKK
                                   R R    O   O  AAAAA  R R    K K
                                   R  R   O   O  A   A  R  R   K  K
                                   R   R   OOO   A   A  R   R  K   K

                 HH      HH    AAAAAA    NN      NN  DDDDDDDD    LL          EEEEEEEEEE  RRRRRRRR      SSSSSSSS
                 HH      HH    AAAAAA    NN      NN  DDDDDDDD    LL          EEEEEEEEEE  RRRRRRRR      SSSSSSSS
                 HH      HH  AA      AA  NN      NN  DD      DD  LL          EE          RR      RR  SS
                 HH      HH  AA      AA  NN      NN  DD      DD  LL          EE          RR      RR  SS
                 HH      HH  AA      AA  NNNN    NN  DD      DD  LL          EE          RR      RR  SS
                 HH      HH  AA      AA  NNNN    NN  DD      DD  LL          EE          RR      RR  SS
                 HHHHHHHHHH  AA      AA  NN  NN  NN  DD      DD  LL          EEEEEEEE    RRRRRRRR      SSSSSS
                 HHHHHHHHHH  AA      AA  NN  NN  NN  DD      DD  LL          EEEEEEEE    RRRRRRRR      SSSSSS
                 HH      HH  AAAAAAAAAA  NN    NNNN  DD      DD  LL          EE          RR  RR              SS
                 HH      HH  AAAAAAAAAA  NN    NNNN  DD      DD  LL          EE          RR  RR              SS
                 HH      HH  AA      AA  NN      NN  DD      DD  LL          EE          RR    RR            SS
                 HH      HH  AA      AA  NN      NN  DD      DD  LL          EE          RR    RR            SS
                 HH      HH  AA      AA  NN      NN  DDDDDDDD    LLLLLLLLLL  EEEEEEEEEE  RR      RR  SSSSSSSS
                 HH      HH  AA      AA  NN      NN  DDDDDDDD    LLLLLLLLLL  EEEEEEEEEE  RR      RR  SSSSSSSS

                              LL            IIIIII      SSSSSSSS  PPPPPPPP      ;;;;      11
                              LL            IIIIII      SSSSSSSS  PPPPPPPP      ;;;;      11
                              LL              II      SS          PP      PP    ;;;;    1111
                              LL              II      SS          PP      PP    ;;;;    1111
                              LL              II      SS          PP      PP              11
                              LL              II      SS          PP      PP              11
                              LL              II        SSSSSS    PPPPPPPP      ;;;;      11
                              LL              II        SSSSSS    PPPPPPPP      ;;;;      11
                              LL              II              SS  PP            ;;;;      11
                              LL              II              SS  PP            ;;;;      11
                        ....  LL              II              SS  PP              ;;      11
                        ....  LL              II              SS  PP              ;;      11
                        ....  LLLLLLLLLL    IIIIII    SSSSSSSS    PP            ;;      111111
                        ....  LLLLLLLLLL    IIIIII    SSSSSSSS    PP            ;;      111111
```

File $3$DUA27:[ROARK.JUL]HANDLERS.LISP;1 (1725,26,0), last revised on 15-JUL-1986 14:41, is a 18 block sequential file owned by UIC [IIIS,ROARK]. The records are variable length with implied (CR) carriage control. The longest record is 125 bytes.

Job HANDLERS (20) queued to NB_TALARIS_1 on 15-JUL-1986 14:47 by user ROARK, UIC [IIIS,ROARK], under account KBS at priority 100, started on printer LCA0 on 15-JUL-1986 14:47 from queue NB_TALARIS_1.

```
LLLLLLLLLL    7777777777777777777777777777777777777777777777777777777777777777777777777777777777777777777777777777777    LLLLLLLLLL
LLLLLLLLLL    777777777777777777777777  Digital Equipment Corporation - VAX/VMS Version V4.4  777777777777777777777777    LLLLLLLLLL
LLLLLLLLLL    7777777777777777777777777777777777777777777777777777777777777777777777777777777777777777777777777777777    LLLLLLLLLL
```

```
;1; -*- Package: DMOS; Mode: COMMON-LISP; Base: 10.; Fonts: MEDFNT,HL12B,HL12BI -*-*

;1; 3/18/86*

;1; Some low level functions about unloading and stuff like that.*


(defun OPERATION-TO-GO-TO (operation)
  ;1; Is the operation a rework operation?*
  (if (op-rework-sequence operation)
      (op-next-operation operation)
      ;1; Is the operation a rework decision point?*
      (let ((rework-start (op-rework-pointer operation)))
        (if rework-start
            (if (> (si:random-in-range 0 1) .1)     1; Check if random # falls within 10% rework range.*
                (op-next-operation operation)
                rework-start)
            (op-next-operation operation)))))
;1; Returns number of lots unloaded.*
;1; Unload can't change m-doing; this has to be kept, so the machine knows what it was doing when it's time to load it.*
(defun UNLOAD (machine &optional (time *current-time*) &aux (lot-count 0))
  (check-machine-state machine)
  (setf (m-status machine) 'free)          ;1 Free up the machine.*
  ;1; Temporary.*
  (if (and *keeping-machine-history*) ; (memq (m-number machine) 1 * '(107 108 109 110 45 46 92 93)))
      (setf (m-history machine) (cons (list 'unload (copytree (m-doing machine)) time (m-status machine)
                                            'op *optimizing*)
                                      (m-history machine))))
  ;1; Update the total-running-time for this machine.*
  (unless *optimizing*
;    (if *keeping-machine-history*
;       (setf (m-history machine) (cons (list 'unload (copytree (m-doing machine)) time (m-status machine))
;                                       (m-history machine))))
    (if *load-debugging* (format t 2"~& Unload ~A."* machine))
    (setq *machines-to-check* (insert-machine-in-order machine *machines-to-check*))
    (setf (m-total-running-time machine)
          (+ (m-total-running-time machine) (- time (m-last-loaded-at machine))))
    ;1; Update p-doing.  This is for display purposes only.*
    (dolist (operation (m-operations machine))
      (rplacd (assq machine (op-doing operation)) nil)))
  (setf (m-expect-available-at machine) time)      ;1 This machine's now available.*


  ;1; This works for double-machines, too.*
  ;1;  Unload can't change m-doing; this has to be kept, so the machine knows what it was doing when it's time to load it.*
  (dolist (pair (m-doing machine))
    (let ((operation (car pair))
          (lots (cdr pair)))
      (setq lot-count (+ (g-length lots) lot-count))
      (unless (g-null lots)
        (check-operation-state operation time)
        (...
```

```
;1; Unloading from *final-operation*; i.e, lot is leaving the plant.*
((eq (car pair) *final-operation*)
 (unless *optimizing*
   (setq *lots-in-plant* (- *lots-in-plant* (g-length lots)))
   (setq *lot-pile* (append lots *lot-pile*))
   (dolist (lot lots)
     (when lot
       (let ((pr (aref *lot-information-array* (lot-number lot) 1)))
         (if (not (numberp (car pr))) (break "2unload number error"*))
         (rplacd pr (- time (car pr)))))))))
(t
 (let ((next-operation (operation-to-go-to operation)))
             (check-operation-state next-operation time)
             (add-to-queue lots next-operation time)
             (mark-operation-fo[illegible] next-operation)))))))
;1; Temporary.*
;  (when (and (not *optimizing*) (m-being-tracked machine))
;    (show-machine-move machine 2" unloaded"*))
  (setf (m-last-unloaded-at machine) time)
  lot-count)
;1; This is done just before you load, not when you unload.*
(defun INCREMENTAL-CLEAR-M-DOING (machine operation-list)
  (let ((new-operation
          (unless (cdr operation-list)
            (caar operation-list)))
        (sides (m-sides machine))
        (doing-operation-again?)
        (doing-side-again?)
        (old-side))
    (dolist (pair (m-doing machine))
      (unless (g-null (cdr  pair))
        (rplacd pair (g-null-out (cdr pair)))
        (if (and sides (not old-side))
            (setq old-side (dolist (side sides)
                             (if (memq (car pair) (side-operations side)) (return side)))
                  doing-side-again? (dolist (pair operation-list)
                                      (if (memq (car pair) (side-operations old-side))
                                          (return t)))))
        (if (and new-operation (eq new-operation (car pair)))
            (setq doing-operation-again? t))))
    (setf (m-lots-done-on-operation machine)
          (if doing-operation-again?
              (+ (cdar operation-list) (m-lots-done-on-operation machine))
              (cdar operation-list)))
    (setf (m-lots-done-on-side machine)
          (if doing-side-again?
              (+ (cdar operation-list) (m-lots-done-on-side machine))
              (cdar operation-list)))))
;1; This is done just before you load, not when you unload.*
(defun BASIC-CLEAR-M-DOING (machine number-of-lots operation)
  (let ((sides (m-sides machine))
        (doing-operation-again?)
```

```
        (doing-side-again?)
        (old-side))
    (dolist (pair (m-doing machine))
      (unless (g-null (cdr  pair))
        (rplacd pair (g-null-out (cdr pair)))
        (if (and sides (not old-side))
            (setq old-side (dolist (side sides)
                                 (if (memq (car pair) (side-operations side)) (return side)))
                  doing-side-again? (memq operation (side-operations old-side))))
        (if (eq operation (car pair))
            (setq doing-operation-again? t))))
    (setf (m-lots-done-on-operation machine)
          (if doing-operation-again?
              (+ number-of-lots (m-lots-done-on-operation machine))
              number-of-lots))
    (setf (m-lots-done-on-side machine)
          (if doing-side-again?
              (+ number-of-lots (m-lots-done-on-side machine))
              number-of-lots))))
;1; [[[Rewrite this.*
(defun CHECK-FOR-MAINTAIN (machine)
  (let ((instruction (maintain-instruction machine)))
    (if (active? instruction)
        ;1; [[Determine exactly what the MAINT directive means.*
        (selectq (keyword instruction)
          (next                          1; Maintenance is to occur now.*
           (basic-maintain instruction)
           (deactivate instruction))
          (aft                           1; Maintenance is to happen after the specified time.*
           (when (>= *current-time* (maint-time instruction))
             (basic-maintain instruction)
             (deactivate instruction)))
          (done                          1; Maintenance after a certain operation has been completed.*
           (if (and (m-sides machine)
                    (let ((m-proc (maint-operation instruction)))
                      (dolist (pair (m-doing machine))
                        (if (and (eq (car pair) m-proc) (not (g-null (cdr pair))))
                            (return t)))))
               (basic-maintain instruction)
               (deactivate instruction)))  ;1 [[[Is *now* the time to do it?*
          ;1; Maintenance is to be done after a certain number of jobs have been done.*
          (fin
           (let ((jobs (maint-jobs instruction)))
             (cond ((= 1 jobs)
                    (basic-maintain instruction)
                    (deactivate instruction))
                   (t
                    ;1; Else, decrement the argument to FIN.*
                    (rplaca (cdddr instruction) (1- jobs))))))))))
(defun ADD-TO-QUEUE (lots operation &optional (time *current-time*))
;   (format t "2~% lots ~A, queue ~A"* lots (op-queue operation))
  (if (and *optimizing* (not (op-optimizing? operation)))
```

```
  (setf (op-queue operation)
        (add-to-ordered-alist time lots (op-queue operation)))
;  (format t "2~% queue ~A"* (op-queue operation))
  (if (bad-queue (op-queue operation)) (break "2bad queue"*))
  ;1; Tell the lots where they are.*
  (unless *optimizing*
    ;1; Record queue entry time, if we're doing that.*
    (if (and *keeping-queue-waits* (memq operation *queue-wait-operations*))
        (dolist (lot lots)
          (setf (lot-last-queue-entry-time lot) *current-time*)))
    (dolist (lot lots)
      (let ((position-pair (lot-position lot)))
        (if *keeping-module-shifts*
            (add-lot-count-modules (car position-pair) operation))
        (rplaca position-pair operation)
        (rplacd position-pair nil)))
;1; We don't usually want to see this because there's too much of it.*
;    (dolist (machine (op-machines operation))
;      (if (m-being-tracked machine)
;         (show-machine-move machine "2add-to-queue"*)))
;1; Temporary.*
;    (dolist (lot lots)
;      (when (and lot (lot-being-tracked lot))
;        (show-lot-move lot "2 add-to-queue"*)
;        (return)
    ))


(defun BAD-QUEUE (queue)
      (do-named sam ((pairs queue (cdr pairs)))
                ((null pairs))
        (if (and (caar pairs) (not (second (car pairs))))
            (return-from sam t))
        (do ((items (cdar pairs) (cdr items)))
            ((or (null items) (null (car items))))
          (if (qmemq (car items) (cdr items))
              (return-from sam t)))))


    (defun BAD-LOTS (llots)
      (do ((lots llots (cdr lots)))
          ((null lots))
        (if (or (null (car lots)) (qmemq (car lots) (cdr lots)))
            (return t))))

    (defun QMEMQ (a l)
      (dolist (b l)
        (cond ((null b) (return nil))
              ((eq a b) (return t)))))
```

```
IIIIIIIIII    6666666666666666666666666666666666666666666666666666666666666666666666666666666666666666666666666    IIIIIIIIII
IIIIIIIIII    666666666666666666666666  THIS INFORMATION IS THE PROPERTY OF TEXAS INSTRUMENTS  666666666666666666666666    IIIIIIIIII
IIIIIIIIII    6666666666666666666666666666666666666666666666666666666666666666666666666666666666666666666666666    IIIIIIIIII

                                   RRRR    OOO    AAA   RRRR   K   K
                                   R   R  O   O  A   A  R   R  K  K
                                   R   R  O   O  A   A  R   R  K K
                                   RRRR   O   O  A   A  RRRR   KKK
                                   R R    O   O  AAAAA  R R    K K
                                   R  R   O   O  A   A  R  R   K  K
                                   R   R   OOO   A   A  R   R  K   K

                              PPPPPPPP    OOOOOO     SSSSSSSS  TTTTTTTTTT
                              PPPPPPPP    OOOOOO     SSSSSSSS  TTTTTTTTTT
                              PP      PP OO      OO SS             TT
                              PP      PP OO      OO SS             TT
                              PP      PP OO      OO SS             TT
                              PP      PP OO      OO SS             TT
                              PPPPPPPP   OO      OO   SSSSSS       TT
                              PPPPPPPP   OO      OO   SSSSSS       TT
                              PP         OO      OO         SS     TT
                              PP         OO      OO         SS     TT
                              PP         OO      OO         SS     TT
                              PP         OO      OO         SS     TT
                              PP           OOOOOO   SSSSSSSS       TT
                              PP           OOOOOO   SSSSSSSS       TT

                          LL            IIIIII     SSSSSSSS  PPPPPPPP         ;;;;        11
                          LL            IIIIII     SSSSSSSS  PPPPPPPP         ;;;;        11
                          LL              II     SS          PP      PP       ;;;;      1111
                          LL              II     SS          PP      PP       ;;;;      1111
                          LL              II     SS          PP      PP                   11
                          LL              II     SS          PP      PP                   11
                          LL              II       SSSSSS    PPPPPPPP         ;;;;        11
                          LL              II       SSSSSS    PPPPPPPP         ;;;;        11
                          LL              II             SS  PP               ;;;;        11
                          LL              II             SS  PP               ;;;;        11
                  ....    LL              II             SS  PP                 ;;        11
                  ....    LL              II             SS  PP                 ;;        11
                  ....    LLLLLLLLLL    IIIIII   SSSSSSSS    PP               ;;        111111
                  ....    LLLLLLLLLL    IIIIII   SSSSSSSS    PP               ;;        111111
```

File _$3$DUA27:[ROARK.JUL]POST.LISP;1 (26722,28,0), last revised on 15-JUL-1986 14:43, is a 15 block sequential file owned by UIC [IIIS,ROARK]. The records are variable length with implied (CR) carriage control. The longest record is 142 bytes.

Job POST (214) queued to NB_TALARIS_1 on 15-JUL-1986 17:47 by user ROARK, UIC [IIIS,ROARK], under account KBS at priority 100, started on printer LCA0 on 15-JUL-1986 17:48 from queue NB_TALARIS_1.

```
IIIIIIIIII    6666666666666666666666666666666666666666666666666666666666666666666666666666666666666666666666666    IIIIIIIIII
IIIIIIIIII    666666666666666666666666  Digital Equipment Corporation - VAX/VMS Version V4.4  666666666666666666666666    IIIIIIIIII
IIIIIIIIII    6666666666666666666666666666666666666666666666666666666666666666666666666666666666666666666666666    IIIIIIIIII
```

```
;1; -*- Package: DMOS; Mode: COMMON-LISP; Base: 10.; Fonts: MEDFNT,HL12B,HL12BI -*-*

;1; 1/29/86*

;1; This file contains stuff about putting instructions into the circular array or the buckets.*


(defun POST-UNLOAD-INSTRUCTION (machine unload-time)
  (if *optimizing*                          ;1 [[ Note - done in even on optimize moves*
      (unload machine unload-time)
      (post-timed-instruction unload-time 'unload machine))
  ;1; Although it's not overly realistic to have the expected availability time for this machine be*
  ;1; exact, this is necessary so that the UNLOAD instruction can be retrieved if this machine*
  ;1; breaks during this job.*
  (unless unload-time (break "post-unload-instruction2"*))
  (setf (m-expect-available-at machine) unload-time))


;1; Stick instruction onto the instructions-list of the appropriate machine.*
(defun POST-MACHINE-INSTRUCTION (instruction-type machine keyword &optional arg3 arg4 seq)
  (let ((pending-event
          (selectq instruction-type
            (load-lots (load-lots-instruction machine))
            (maint (maintain-instruction machine)))))
    ;1; To activate the instruction.*
    (rplaca pending-event t)
    ;1; Now insert the stuff with actual content.*
    (rplaca (cdr pending-event) keyword)
    (rplaca (cddr pending-event) arg3)
    (rplaca (cdddr pending-event) arg4)
    (if (eq instruction-type 'load-lots)
        (rplaca (cddddr pending-event) seq))))


;1; This posts any instruction in the appropriate place, which could be the array or buckets.*
(defun POST-TIMED-INSTRUCTION (post-time instruction-type &optional arg0 arg1 arg2 arg3 arg4)
  (let ((time-diff (- post-time *period-start-time*)))
    (if (< time-diff *array-length*)        ;1 Fits in array directly?*
        (add-timed-instruction time-diff instruction-type arg0 arg1 arg2 arg3 arg4)
        (if (< (- post-time *current-time*) *array-length*)       ;1 Else fits in array in circular fashion?*
            (add-timed-instruction (- post-time *next-period*)
                                   instruction-type
                                   arg0 arg1 arg2 arg3 arg4)
            ;1; The instruction does not fit in the array, so find the bucket to put it in.*
            ;1; Position contains the bucket no. ie 0 for first bucket etc..*
            (let* ((position (1- (subb post-time)))
                   (bucket-cdr (nthcdr position *bucket-list*)))
              ;1; Insert instruction in proper bucket.*
              (rplaca bucket-cdr
                      (bucket-insert (car bucket-cdr) 7 post-time instruction-type
                                     arg0 arg1 arg2 arg3 arg4)))))))
```

```
               (snap *snap-array*)
               (dump *dump-array*))))
    (selectq instruction-type
      ((load-lots maintain)
       (let ((instruction-length (selectq instruction-type
                                   (load-lots 5)
                                   (maintain 4))))
         (aset (bucket-insert (aref array time) instruction-length arg0 arg1 arg2 arg3 arg4)
               array
               time)))
      ((snap dump create)
       (aset arg0 array time))
      (otherwise
       (if t ;(equal instruction-type 'unload)
           (if (and *keeping-machine-history*) ; (memq (m-number arg0) '(107 108 109 110 45 46 92 93)))
               (setf (m-history arg0) (cons (list 'add-timed-instruction instruction-type time)
                                            (m-history arg0)))))
       (aset (g-insert arg0 (aref array time)) array time)))))


;1; Insert instruction whose items are <arg0>, etc., into <instructions>, by destructivlely modifying an inactive instruction,
    if possible.*
(defun BUCKET-INSERT (instructions instruction-length &optional arg0 arg1 arg2 arg3 arg4 arg5 arg6)
  (let ((empty-list (dolist (list instructions)
                      (unless (active? list)
                        (return list)))))
    (cond (empty-list
           (g-replace empty-list arg0 arg1 arg2 arg3 arg4 arg5 arg6)
           instructions)
          (t
           (cons (g-replace (make-list instruction-length) arg0 arg1 arg2 arg3 arg4 arg5 arg6)
                 instructions)))))
(defun SUBB (post-time)
  ;; 1This function carries out the subtraction of the two times and returns a*
  ;; 1number which indicates which* 1bucket the instruction should go into.*  1An*
  ;; 1exclusive or shows where the two bits start.*
  (let ((length-less-2 (- (haulong (logxor post-time *current-time*)) 2)))
    ;; 1This does the subtraction of the two bits, moving the two bit answer*
    ;; 1left into the correct position* 1and then getting rid of appropriate bits to*
    ;; 1the right that do not count.*
    (haulong (load-byte (deposit-byte 0
                                      length-less-2
                                      2
                                      (- (load-byte post-time length-less-2 2)
                                         (load-byte *current-time* length-less-2 2)))
                        *binary-array-length* 23))))
(defun UPDATE-BUCKETS ()
  ;1; This will bomb out if *current-time* is zero.*
  ;1; Check if any buckets need to be grabbed.*
  (let ((diff (- (do ((n 0 (add1 n))
                      (num *current-time* (lsh num -1)))
```

```
            (1- *binary-array-length*))))
(when (plusp diff)                   ;1 Diff is 1 for 8, 2 for 16 for array size 8.*
  (setq *period-start-time* *current-time*
        *next-period* (+ *current-time* *array-length*))
  ;1; Grab the # of buckets indicated by diff.*
  (do ((n Ø (1+ n)))
      ((= n diff))
    ;1; Starting with bucket Ø, go through each instruction in it, and*
    ;1; post it in a new appropriate position. Then set that bucket to*
    ;1; nil. Continue the same with as many buckets as required.*
        (dolist (instruction (nth n *bucket-list*))
          (when (active? instruction)
            (shift-timed-instruction instruction)
            (deactivate instruction)))))))


;1; To shift an instruction to a different bucket, or to an array.*
(defun SHIFT-TIMED-INSTRUCTION (instruction)
  (let ((post-time (car instruction))
        (instruction-type (second instruction))
        (argØ (third instruction))
        (arg1 (fourth instruction))
        (arg2 (fifth instruction))
        (arg3 (sixth instruction))
        (arg4 (seventh instruction)))
    (post-timed-instruction post-time instruction-type argØ arg1 arg2 arg3 arg4)))


(defun GET-INSTRUCTIONS-FOR-TIME (array)
  (let ((time (remainder *current-time* *array-length*)))
    (aref array time)))


(defun DEACTIVATE-INSTRUCTIONS-FOR-TIME (array)
  (let* ((time (remainder *current-time* *array-length*))
         (instructions (aref array time)))
    (select array
      ((*load-array* *maintain-array*)
       (dolist (instruction instructions)
         (deactivate instruction)))
      ((*on-line-array* *break-array* *fix-array* *unload-array* *create-array* *optimize-array*)
       (aset (g-null-out instructions) array time))
      ((*create-array* *snap-array* *dump-array*)
       (aset nil array time)))))


(defun DEACTIVATE-INSTRUCTIONS (instructions)
  (dolist (instruction instructions)
    (deactivate instruction)))
```

```
VVVVVVVVVV   0000000000000000000000000000000000000000000000000000000000000000000000000000000000000000000000000000   VVVVVVVVVV
VVVVVVVVVV   0000000000000000000000000  THIS INFORMATION IS THE PROPERTY OF TEXAS INSTRUMENTS  0000000000000000000000000   VVVVVVVVVV
VVVVVVVVVV   0000000000000000000000000000000000000000000000000000000000000000000000000000000000000000000000000000   VVVVVVVVVV

                                RRRR    000    AAA   RRRR   K   K
                                R   R  O   O  A   A  R   R  K  K
                                R   R  O   O  A   A  R   R  K K
                                RRRR   O   O  A   A  RRRR   KKK
                                R R    O   O  AAAAA  R R    K K
                                R  R   O   O  A   A  R  R   K  K
                                R   R   000   A   A  R   R  K   K

DDDD    000   U   U  BBBB   L      EEEEE         M   M   AAA    CCCC  H   H  III  N   N  EEEEE   SSSS
D   D  O   O  U   U  B   B  L      E             MM MM  A   A  C      H   H   I   N   N  E      S
D   D  O   O  U   U  B   B  L      E             M M M  A   A  C      H   H   I   NN  N  E      S
D   D  O   O  U   U  BBBB   L      EEEE          M   M  A   A  C      HHHHH   I   N N N  EEEE    SSS
D   D  O   O  U   U  B   B  L      E             M   M  AAAAA  C      H   H   I   N  NN  E          S
D   D  O   O  U   U  B   B  L      E             M   M  A   A  C      H   H   I   N   N  E          S
DDDD    000   UUUUU  BBBB   LLLLL  EEEEE  _____  M   M  A   A   CCCC  H   H  III  N   N  EEEEE  SSSS

                                L      III   SSSS  PPPP    ;;     1
                                L       I   S      P   P   ;;    11
                                L       I   S      P   P          1
                                L       I    SSS   PPPP    ;;     1
                                L       I       S  P       ;;     1
                           ..   L       I       S  P        ;     1
                           ..   LLLLL  III  SSSS   P       ;     111
```

File _$3$DUA27:[ROARK.JUL]DOUBLE_MACHINES.LISP;1 (26746,20,0), last revised on 15-JUL-1986 13:54, is a 10 block sequential file owned by UIC [IIIS,ROARK]. The records are variable length with implied (CR) carriage control. The longest record is 106 bytes.

Job DOUBLE_MACHINES (2030) queued to NB_TALARIS on 16-JUL-1986 14:28 by user ROARK, UIC [IIIS,ROARK], under account KBS at priority 100, started on printer LCB0 on 16-JUL-1986 14:28 from queue NB_TALARIS.

```
VVVVVVVVVV   0000000000000000000000000000000000000000000000000000000000000000000000000000000000000000000000000000   VVVVVVVVVV
VVVVVVVVVV   0000000000000000000000000  Digital Equipment Corporation - VAX/VMS Version V4.4  0000000000000000000000000   VVVVVVVVVV
VVVVVVVVVV   0000000000000000000000000000000000000000000000000000000000000000000000000000000000000000000000000000   VVVVVVVVVV
```

```
;1; Stick an instruction whose item are <arg0>, etc., and whose type is <instruction-type> into the appropriate *
;1; array at the appropriate place for <time>.*
(defun ADD-TIMED-INSTRUCTION (time instruction-type &optional arg0 arg1 arg2 arg3 arg4)
  (let ((array (selectq instruction-type
                 (unload *unload-array*)
                 (maintain *maintain-array*)
                 (on-line *on-line-array*)
                 (break *break-array*)
                 (fix *fix-array*)
                 (load-lots *load-array*)
                 (create *create-array*)
                 (optimize *optimize-array*)
;1; -*- Package: DMOS; Mode: COMMON-LISP; Base: 10.; Fonts: MEDFNT,HL12B,HL12BI -*-*

;1; 3/18/86*

;1; Stuff about double machines and setup times.*

;1; The list of operation-lot-capacity's for the operations that the machine does.*
(defun LOT-NUMBERS (machine &aux numbers)
  (dolist (operation (m-operations machine) numbers)
    (setq numbers (adjoin (operation-lot-capacity operation) numbers))))


(defun COMPUTE-SIDES-A (machine &aux sides)
  (dolist (operation (m-operations machine))
    (dolist (side sides (push (list operation) sides))
      (let ((side-operation (car side)))
        (when (and (= (op-run-time operation) (op-run-time side-operation))
;1; Sides only require the same operation time, according to Sanjiv.  *
;                  (= (op-setup-time operation) (op-setup-time side-operation))
                   )
          (rplacd side (cons operation (cdr side)))
          (return)))))
  (mapcar #'(lambda (operations) (make-side :operations operations
                                            :capacity (compute-side-capacity operations)))
          sides))

(defun COMPUTE-SIDES-B (machine &aux sides)
  (dolist (operation (m-operations machine))
    (dolist (side sides (push (list operation) sides))
      (let ((side-operation (car side)))
        (when (and (= (op-run-time operation) (op-run-time side-operation))
                   (= (op-setup-time operation) (op-setup-time side-operation))
                   )
          (rplacd side (cons operation (cdr side)))
          (return)))))
  (if (and (cdr sides)
           (dolist (side sides)
             (if (cdr side) (return t))))
      (mapcar #'(lambda (operations) (make-side :operations operations
                                                :capacity (compute-side-capacity operations)))
              sides)))
```

```
(defun SET-DOUBLE-MACHINES ()
  (setq *double-machines* nil)
  (dolist (machine *machines*)
    (let* ((numbers (lot-numbers machine))
           (number (if (cdr numbers) numbers (car numbers))))
      ;1; If all the operations that the machine does do the same number of lots, and it's > 1.*
      (if (and (numberp number) (> number 1))
          (let ((sides (compute-sides-b machine)))
            ;1; And the machine has more than one side, and one of the sides contains more than one operation.*
            (cond (sides
                   ;1; Then stash the sides in the sides slot.*
                   (setf (m-sides machine) sides)
                   (setf (m-max-capacity machine)
                         (max-value sides #'side-capacity))
                   ;1; And consider the machine a double machine.*
                   (push machine *double-machines*))
                  (t
                   (setf (m-max-capacity machine)
                         (max-value (m-operations machine) #'operation-lot-capacity)))))
          (setf (m-max-capacity machine)

          (defun SET-SCHEDULING-TYPES ()
            (dolist (machine *machines*)
              (setf (m-scheduling-type machine) nil))
            (let ((loading-boundary (* (- 1.0 *default-machine-usage-margin*)
                                       (max-value *machines* #'m-usage))))
              (dolist (machine *machines*)
                (if (and (> (m-usage machine) loading-boundary)
                         (null (m-scheduling-type machine)))
                    (setf (m-scheduling-type machine) 'bottleneck))))
            (dolist (operation *operations*)
              (let ((preceding-operation (op-preceding-operation operation)))
                (if (and (> (operation-lot-capacity operation) 1)
                         preceding-operation
                         (or
                           ;1; Operation takes more lots than its predecessor.*
                           (< (operation-lot-capacity preceding-operation) (operation-lot-capacity operation))
                           ;1; Or the preceding operation has more than one machine.*
                           (cdr (op-machines preceding-operation))))
                    (dolist (machine (op-machines operation))
                      (unless (m-scheduling-type machine)
                        (setf (m-scheduling-type machine) 'local-optimize))))))
            (dolist (time-constraint *safe-time-constraints*)
              (dolist (operation (stc-operations time-constraint))
                (dolist (machine (op-machines operation))
                  (unless (m-scheduling-type machine)
                    (setf (m-scheduling-type machine) 'constraint-member)))))
            (dolist (machine *machines*)
              (unless (m-scheduling-type machine)
                (setf (m-scheduling-type machine) 'round-robin))))
           (defun DIFFERENT-LOT-NUMBERS (machine)
             (let ((operations (m-operations machine)))
```

```
        (let ((lot-number (operation-lot-capacity (car operations))))
          (dolist (operation (cdr operations))
            (if (not (= lot-number (operation-lot-capacity operation)))
                (return t)))))))


(defun user:SHOW-D-L-N ()
  (dolist (machine *machines*)
    (if (different-lot-numbers machine)
        (format t "2~% ~A  ~A"* machine (lot-numbers machine)))))


(defun user:SHOW-SIDES ()
  (dolist (machine *machines*)
    (let ((sides (m-sides machine)))
      (if sides
          (format t "2~%~A   ~A   ~A "* machine (m-operations machine) sides)))))
```

```
UUUUUUUUUU   0000000000000000000000000000000000000000000000000000000000000000000000000000000000000000   UUUUUUUUUU
UUUUUUUUUU   000000000000000000000000  THIS INFORMATION IS THE PROPERTY OF TEXAS INSTRUMENTS  000000000000000000000000   UUUUUUUUUU
UUUUUUUUUU   0000000000000000000000000000000000000000000000000000000000000000000000000000000000000000   UUUUUUUUUU

                         RRRR    000    AAA   RRRR   K   K
                         R   R  O   O  A   A  R   R  K  K
                         R   R  O   O  A   A  R   R  K K
                         RRRR   O   O  A   A  RRRR   KKK
                         R R    O   O  AAAAA  R R    K  K
                         R  R   O   O  A   A  R  R   K   K
                         R   R   000   A   A  R   R  K    K

  CCCC   000   N   N  SSSS  TTTTT  RRRR    AAA   III  N   N  TTTTT        SSSS  TTTTT  U   U  FFFFF  FFFFF
 C      O   O  N   N S        T    R   R  A   A   I   N   N    T         S        T    U   U  F      F
 C      O   O  NN  N S        T    R   R  A   A   I   NN  N    T         S        T    U   U  F      F
 C      O   O  N N N  SSS     T    RRRR   A   A   I   N N N    T          SSS     T    U   U  FFFF   FFFF
 C      O   O  N  NN     S    T    R R    AAAAA   I   N  NN    T             S    T    U   U  F      F
 C      O   O  N   N     S    T    R  R   A   A   I   N   N    T             S    T    U   U  F      F
  CCCC   000   N   N SSSS     T    R   R  A   A  III  N   N    T   _____ SSSS     T    UUUUU  F      F

                         L      III   SSSS  PPPP    ;;    1
                         L       I   S      P   P   ;;   11
                         L       I   S      P   P         1
                         L       I    SSS   PPPP    ;;    1
                         L       I       S  P       ;;    1
                     ..  L       I       S  P        ;    1
                     ..  LLLLL  III  SSSS   P        ;   111
```

File _$3$DUA27:[ROARK.JUL]CONSTRAINT_STUFF.LISP;1 (26708,21,0), last revised on 15-JUL-1986 13:54, is a 8 block sequential file owned by UIC [IIIS,ROARK]. The records are variable length with implied (CR) carriage control. The longest record is 124 bytes.

Job CONSTRAINT_STUFF (2002) queued to NB_TALARIS_1 on 15-JUL-1986 14:06 by user ROARK, UIC [IIIS,ROARK], under account KBS at priority 100, started on printer LCA0 on 15-JUL-1986 14:06 from queue NB_TALARIS_1.

```
UUUUUUUUUU   0000000000000000000000000000000000000000000000000000000000000000000000000000000000000000   UUUUUUUUUU
UUUUUUUUUU   000000000000000000000000  Digital Equipment Corporation - VAX/VMS Version V4.4  000000000000000000000000   UUUUUUUUUU
UUUUUUUUUU   0000000000000000000000000000000000000000000000000000000000000000000000000000000000000000   UUUUUUUUUU
```

```lisp
;1; -*- Package: DMOS; Mode: COMMON-LISP; Base: 10.; Fonts: MEDFNT,HL12B,HL12BI -*-*

;1; 4/11/86*

;1; Stuff about constraints.*
(defun BUILD-SAFE-TIME-CONSTRAINTS (safe-time-constraint-pairs)
  (setq *safe-time-constraints* nil)
  (let ((dmos-flow-text-array (funcall *simulation-frame* :dmos-flow-text-array)))
    (dolist (safe-time-pair safe-time-constraint-pairs)
      (let* ((beginning (aref dmos-flow-text-array (car safe-time-pair)))
             (end (aref dmos-flow-text-array (cdr safe-time-pair)))
             (operations (sequence-from beginning end))
             (length (length operations))
             (constraint))
        (multiple-value-bind (greatest-operation-time controlling-operation)
            (find-greatest-operation-time operations)
          (setq constraint
                (make-safe-time-constraint
                  :beginning beginning
                  :end end
                  :operations operations
                  :length length
                  :greatest-operation-time greatest-operation-time
                  :controlling-operation controlling-operation
                  :next-available-times
                  (mapcar #'(lambda (x) (cons x 0)) (op-machines controlling-operation))
                  ;1; [[This is wrong - need to talk to Subhash.  4/7/86*
                  :lot-# (operation-lot-capacity controlling-operation)))
          (push constraint *safe-time-constraints*)
          (setf (op-constraint-starter beginning) constraint)
          (dolist (operation operations)
            (setf (op-constraint-member operation) constraint)))))))
;1; Returns the number of operations sequence whose start is start and whose end is end.*
(defun SEQUENCE-LENGTH (start end)
  (do ((operation start (op-next-operation operation))
       (length 0))
      ((eq operation end) length)
    (setq length (1+ length))))

(defun SEQUENCE-FROM (start end)
  (do ((operation start (op-next-operation operation))
       (sequence))
      ((eq operation end) (nreverse (cons end sequence)))
    (push operation sequence)))

;1; Returns the greatest operation time among operations.  Returns the time and the (first) operation that has that time.*
(defun FIND-GREATEST-OPERATION-TIME (operations &aux longest-operation (longest-time 0))
  (dolist (operation operations (values longest-time longest-operation))
    (let ((time (op-run-time operation)))
      (when (> time longest-time)
        (setq longest-time time
              longe.' operation operation)))))
```

```
(defun user:xxx ()
  (dolist (s *safe-time-constraints*)
   (format t "2~2% * 2Constraint: ~A, controlling operation: ~A"* s2 *(stc-controlling-operation s))
    (dolist (machine (op-machines (stc-controlling-operation s)))
      (format t "2~%  ~A  ~A"*
              machine
              (m-operations machine)))))

;1; Save this -- we'll probably use part of it later.*
;(defun CONSTRAINT-LOAD-DELAY (constraint operation time)
;  (let* ((controlling-operation (stc-controlling-operation constraint))
;        ;1; We assume this information has not been*
;        ;1; screwed up by when-expected, though that*
;        ;1; could (?) be wrong.*
;        (#-lots (lots-before-operation constraint operation))
;        (#-machines (length (op-machines (stc-controlling-operation constraint))))
;        (loads (ceiling (quotient #-lots (op-lot# controlling-operation))))
;        (load-remainder (remainder loads #-machines))
;        (load-order-of-key-machine (if (zerop remainder) (1- #-machines) (1- remainder)))
;        (loads-on-key-machine (ceiling (quotient loads machines)))
;        ;1; We also assume this is not screwed up.*
;        (key-machine (nth-in-order machines #'(lambda (if (eq (m-status machine 'free)
;                                                              time
;                                                              (m-expect-available-at machine))))))
;        (initial-load-time (if (eq (m-status machine 'free)
;                                   time
;                                   (m-expect-available-at machine))))
;        (final-load-time-on-key-machine (+ initial-load-delay
;                                           (* loads-on-key-machine (op-run-time controlling-operation)))))
;    (- final-load-time-on-key-machine (stc-time-to-controlling-operation constraint))))
```

```
VVVVVVVVVV   1111111111111111111111111111111111111111111111111111111111111111111111111111111111111111111111111   VVVVVVVVVV
VVVVVVVVVV   111111111111111111111111  THIS INFORMATION IS THE PROPERTY OF TEXAS INSTRUMENTS  111111111111111111111111   VVVVVVVVVV
VVVVVVVVVV   1111111111111111111111111111111111111111111111111111111111111111111111111111111111111111111111111   VVVVVVVVVV

                                   RRRR     000     AAA    RRRR    K   K
                                   R   R   O   O   A   A   R   R   K  K
                                   R   R   O   O   A   A   R   R   K K
                                   RRRR    O   O   A   A   RRRR    KKK
                                   R R     O   O   AAAAA   R R     K K
                                   R  R    O   O   A   A   R  R    K  K
                                   R   R    000    A   A   R   R   K   K

  CCCCCCCC    000000    NN      NN  TTTTTTTTTT  EEEEEEEEEE  NN      NN  TTTTTTTTTT   IIIIII    000000    NN      NN
  CCCCCCCC    000000    NN      NN  TTTTTTTTTT  EEEEEEEEEE  NN      NN  TTTTTTTTTT   IIIIII    000000    NN      NN
CC          00      00  NN      NN      TT      EE          NN      NN      TT         II    00      00  NN      NN
CC          00      00  NN      NN      TT      EE          NN      NN      TT         II    00      00  NN      NN
CC          00      00  NNNN    NN      TT      EE          NNNN    NN      TT         II    00      00  NNNN    NN
CC          00      00  NNNN    NN      TT      EE          NNNN    NN      TT         II    00      00  NNNN    NN
CC          00      00  NN  NN  NN      TT      EEEEEEEE    NN  NN  NN      TT         II    00      00  NN  NN  NN
CC          00      00  NN  NN  NN      TT      EEEEEEEE    NN  NN  NN      TT         II    00      00  NN  NN  NN
CC          00      00  NN    NNNN      TT      EE          NN    NNNN      TT         II    00      00  NN    NNNN
CC          00      00  NN    NNNN      TT      EE          NN    NNNN      TT         II    00      00  NN    NNNN
CC          00      00  NN      NN      TT      EE          NN      NN      TT         II    00      00  NN      NN
CC          00      00  NN      NN      TT      EE          NN      NN      TT         II    00      00  NN      NN
  CCCCCCCC    000000    NN      NN      TT      EEEEEEEEEE  NN      NN      TT       IIIIII    000000    NN      NN
  CCCCCCCC    000000    NN      NN      TT      EEEEEEEEEE  NN      NN      TT       IIIIII    000000    NN      NN

                      LL            IIIIII      SSSSSSSS   PPPPPPPP        ;;;;        11
                      LL            IIIIII      SSSSSSSS   PPPPPPPP        ;;;;        11
                      LL              II      SS           PP      PP      ;;;;      1111
                      LL              II      SS           PP      PP      ;;;;      1111
                      LL              II      SS           PP      PP                  11
                      LL              II      SS           PP      PP                  11
                      LL              II        SSSSSS     PPPPPPPP        ;;;;        11
                      LL              II        SSSSSS     PPPPPPPP        ;;;;        11
                      LL              II              SS   PP              ;;;;        11
                      LL              II              SS   PP              ;;;;        11
                ....  LL              II              SS   PP                ;;        11
                ....  LL              II              SS   PP                ;;        11
                ....  LLLLLLLLLL    IIIIII    SSSSSSSS     PP              ;;        111111
                ....  LLLLLLLLLL    IIIIII    SSSSSSSS     PP              ;;        111111
```

File $3$DUA27:[ROARK.JUL]CONTENTION.LISP;1 (28711,17,0), last revised on 15-JUL-1988 13:54, is a 33 block sequential file owned by UIC [IIIS,ROARK]. The records are variable length with implied (CR) carriage control. The longest record is 134 bytes.

Job CONTENTION (2004) queued to NB_TALARIS_1 on 15-JUL-1988 14:08 by user ROARK, UIC [IIIS,ROARK], under account KBS at priority 100, started on printer LCA0 on 15-JUL-1988 14:07 from queue NB_TALARIS_1.

```
VVVVVVVVVV   1111111111111111111111111111111111111111111111111111111111111111111111111111111111111111111111111   VVVVVVVVVV
VVVVVVVVVV   111111111111111111111111  Digital Equipment Corporation - VAX/VMS Version V4.4  111111111111111111111111   VVVVVVVVVV
             ................................................................................................   VVVVVVVVVV
```

```
;1;-*-* Mode:Common-Lisp; Package:DMOS; Fonts:(MEDFNT HL12B HL12BI); Base:10 1-*-*

;1; 12/10/85*


;1; Functions having to do with contention numbers and with bottleneck numbers for machines (as opposed to machine types).*

;1; Destructively deletes repetitions from a list.*

(defun DELETE-REPS (list)
  (do ((lst list (cdr lst)))
      ((null lst) list)
    (rplacd lst (delq (car lst) (cdr lst)))))

;1; Returns all the operations that the machines do, with repetitions deleted.*
(defun OPERATIONS-FOR-MACHINES (machines &aux operations)
  (dolist (machine machines operations)
    (setq operations (union (copylist (m-operations machine)) operations))))

;1; The operations whose number is less than limit and which are done by any of machines.*
(defun LIMITED-OPERATIONS-FOR-MACHINES (machines limit &aux operations)
  (if limit
      (dolist (machine machines operations)
        (dolist (operation (m-operations machine))
          (if (or (null limit) (< (op-operation-number operation) limit))
              (setq operations (adjoin operation operations)))))
      (operations-for-machines machines)))

;1; A plusp for reals, that means *really* greater than 0.*
(defun PPLUSP (num) (> num 0.001))

;1; This is intended for *short* lists.*
(defun INTERSECT-P (l0 l1)
  (dolist (i l0)
    (if (memq i l1) (return t))))

;1; Returns a list of all members of ll that l intersects with, else nil.*
(defun I-LISTS (l ll &aux result)
  (dolist (m ll result)
    (if (intersect-p l m) (push m result))))


(defun CONCATENATE-LISTS (lists &aux un)
  (dolist (list lists un)
    (setq un (append list un))))

;1; Substitutes only for first occurrence of old.*
(defun SUB-ITEM (old new list)
  (do ((l list (cdr l)))
      ((null l) list)
    (when (eq (car l) old)
      (rplaca l new)
      (return list))))
```

```
(defun MACHINE-CLASSES (machine-type &aux classes)
  (dolist (operation (mt-operations machine-type) classes)
    (let* ((machines (op-machines operation))
           (matches (i-lists machines classes)))
      (cond (matches

             (dolist (match matches)
               (setq classes (delq match classes)))
             (setq classes (cons (union machines (concatenate-lists matches)) classes)))
            (t (setq classes (cons machines classes)))))))

;1; Computes and assigns machine usage numbers and contention numbers for all*
;1; single machines of machine-type.*
;1;   [[[It is assumed for now that machines of* 1a machine-type will be either all*
;1; single or all double.*
;1;   [[[Warning: this will* 1*always* reset the usage variable for machines.  Should*
;1; keep another slot for* 1temporary usages, or something.*
;1;   In this procedure, p-temp0 is used to keep track of the unassigned usage for operations*
;1; and m-temp is used to keep track of remaning operations for a machine.*
;1;   AN OPERATION is 'gone' when (not (pplusp(op-temp0 operation))); i.e., when(essentially) all of its usage has been assigned.
*
;1;   A machine is 'gone' when (not (machine-temp machine)); i.e., when all of the operations it runs are gone.*
(defun ASSIGN-MACHINE-TYPE-USAGES (machine-type func &optional (operation-limit nil))
  (dolist (machines (machine-classes machine-type))
    (assign-machine-usages machines func operation-limit)))

(defun RESET-CONTENTION-STUFF (machines operations operation-limit)
  ;1; Reset in order to compute m-usages and contentions.*
  (dolist (machine machines)
    (setf (m-usage machine) 0.0)
    (dolist (pair (m-contention machine))
      (rplacd pair 0.0)))
  ;1; Temp will hold the so far *unassigned* portion of the operation-usage.*
  (dolist (operation operations)
    (setf (op-temp0 operation) (op-usage operation)))
  ;1; 'Temp will hold the *unassigned* operations for the machine.*
  (dolist (machine machines)
    (setf (m-temp machine) (if operation-limit
                                  (intersection (copylist (m-operations machine)) operations)
                                  (copylist (m-operations machine))))))

(defun ASSIGN-MACHINE-USAGES (machines func &optional (operation-limit nil))
  (let* ((operations (limited-operations-for-machines machines operation-limit))
         ;1; To keep track of the number of remaining machines.*
         (number-of-machines (length machines))
         ;1; Keep track of usage not yet assigned to machines -- adjust every time usage is added to a machine.*
         (total-remaining-usage (lookup-usage-for-operations operations))
         ;1; Average usage per machine.*
         (average-machine-usage (quotient total-remaining-usage (length machines)))
         ;1; The difference between what we wanted to assign to all the machines we've finished assigning*
         ;1; stuff to and what we have assigned to those machines.  If it is positive, we've assigned more than we wanted, and*
         ;1; we now want to assign less to each remaining machine.*
         (overflow 0.0))
```

```
;1; Reset in order to compute m-usages and contentions.*
(reset-contention-stuff machines operations operation-limit)
;1; Now the loop for making assignments; each loop checks for forced assignments first, then applies func.*
(do ()
    ;1; Quit when (essentially) all usage has been assigned.*
    ((zerop number-of-machines))
  ;1; Make forced assignments.*
  (multiple-value (number-of-machines total-remaining-usage overflow)
    (make-forced-assignments machines
                             operations
                             number-of-machines
                             average-machine-usage
                             total-remaining-usage
                             overflow))
  ;1; Quit if all usage assigned.*
  (if (zerop number-of-machines) (return))
      ;1; Assign some usages according to func.*
      (multiple-value (number-of-machines total-remaining-usage overflow)
        (funcall func
                 machines
                 operations
                 number-of-machines
                 average-machine-usage
                 total-remaining-usage
                 overflow))))
  ;1; Replace absolute numbers by percentages in the contention alists.*
  (dolist (machine machines)
    (set-contention-ratios machine)))
;1; Do one round of assigning (assign for one machine) for double machines.*
(defun ASSIGN-DOUBLE-ONCE (machines operations number-of-machines average-machine-usage
                           total-remaining-usage overflow)
  machines                                ;1 To satisfy compiler.*
  ;1;  Split up the operation that can be done on the fewest machines.*
  (let ((narrowest-operation)
        (smallest-number-of-machines 30)
        (desired-machine-usage (- average-machine-usage (quotient overflow number-of-machines))))
    ;1; Find operation with fewest 'available' machines.  *
    (dolist (operation operations)
      (when (pplusp (op-temp0 operation))
        (let ((number-of-p-machines (number-of-available-machines operation desired-machine-usage)))
          (if (< number-of-p-machines smallest-number-of-machines)
              (setq narrowest-operation operation
                    smallest-number-of-machines number-of-p-machines)))))
    ;1; Distribute the operation among the machines according to the*
    ;1; remaining capacity of the machines.*
    (multiple-value (number-of-machines total-remaining-usage overflow)
      (distribute-operation narrowest-operation number-of-machines desired-machine-usage average-machine-usage
                            total-remaining-usage overflow)))
  (values number-of-machines total-remaining-usage overflow))
;1; Distribute the operation among its machines according to the*
;1; remaining capacity of the machines.*
(defun DISTRIBUTE-OPERATION (operation number-of-machines desired-machine-usage average-machine-usage
```

```
  (let ((unassigned-operation-usage (op-temp0 operation))
        (total-capacity (total-remaining-capacity (op-machines operation)
                                                   desired-machine-usage)))
    (dolist (machine (op-machines operation))
      (let* ((machine-usage (m-usage machine))
             (remaining-machine-capacity (- desired-machine-usage machine-usage)))
        ;1; The unassigned operation usage is divided among machines according to the ratio of the remaining capacity of the*
        ;1; machine to the remaining capacity for all machines.*
        (when (> remaining-machine-capacity 0.0)
          (let ((proportional-usage (* (quotient remaining-machine-capacity total-capacity)
                                       unassigned-operation-usage)))
            (multiple-value (number-of-machines total-remaining-usage overflow)
              (assign-usage machine operation proportional-usage number-of-machines
                            average-machine-usage total-remaining-usage overflow)))))))
  (values number-of-machines total-remaining-usage overflow))


(defun LEAST-OPERATIONS-MACHINE (machines desired-machine-usage)
  (let ((least-operations-machine)
        (least-operations 1000))
    (dolist (machine machines least-operations-machine)
      (let ((machine-operations (g-length (m-temp machine))))
        (if (and (plusp machine-operations)
                 (< machine-operations least-operations)
                 (pplusp (- desired-machine-usage (m-usage machine))))
            (setq least-operations machine-operations
                  least-operations-machine machine))))))

;1; The operation (if any), that comes closest to exhausting the remaining capacity*
;1; of the* 1machine without exceeding it.*
(defun BEST-OPERATION (machine desired-machine-usage)
    (let ((machine-usage (m-usage machine))
          (best-fit-error 1000.0)
          (best-usage)
          (best-operation))
      (dolist (operation (m-temp machine) best-operation)
        (let ((operation-usage (op-temp0 operation)))
          (if (< operation-usage (- desired-machine-usage machine-usage))
              (let ((current-error (abs (- desired-machine-usage (+ machine-usage operation-usage)))))
                (if (< current-error best-fit-error)
                    (setq best-operation operation
                          best-usage operation-usage
                          best-fit-error current-error))))))))


;1; Do one round of assigning (assign for one machine) for single machines.*
(defun ASSIGN-SINGLE-ONCE (machines operations number-of-machines average-machine-usage
                           total-remaining-usage overflow)
  operations                            ;1 Make compiler happy.*
  (let* ((desired-machine-usage (- average-machine-usage (quotient overflow number-of-machines)))
         (least-operations-machine (least-operations-machine machines desired-machine-usage))
         (best-operation (best-operation least-operations-machine  desired-machine-usage))
```

```
    (if *contention-debugging*
        (format t 2*~2%  Desired-machine-usage ~5F, number-of-machines ~D."*
                desired-machine-usage
                number-of-machines))
    (if *contention-debugging*
        (format t 2*~2% Least-operations-machine ~A, least-operations ~5F."*
                least-operations-machine
                (m-temp least-operations-machine)))
    (if *contention-debugging*
        (format t "2~% Best operation ~A, best usage ~5F."*
                best-operation
                best-usage))
    (if best-operation
        ;1; If there's a best operation, assign it all to the machine.*
        (multiple-value (number-of-machines total-remaining-usage overflow)
          (assign-usage least-operations-machine best-operation best-usage
                        number-of-machines average-machine-usage total-remaining-usage overflow))
        ;1; If no operation fit (they're all too big), fill up the machine with part of an arbitrary one (first on the list).*
        (let ((operation (car (m-temp least-operations-machine)))
              (usage-to-add (- desired-machine-usage (m-usage least-operations-machine))))
          (multiple-value (number-of-machines total-remaining-usage overflow)
            (assign-usage least-operations-machine operation usage-to-add
                          number-of-machines average-machine-usage total-remaining-usage overflow)))))
  (values number-of-machines total-remaining-usage overflow))


;1; Keep making forced assignments (only one machine for the operation, or* 1only*
;1; one operation for the machine)* 1until there aren't any more.*
;1; Return various altered values.*
(defun MAKE-FORCED-ASSIGNMENTS (machines operations number-of-machines average-machine-usage
                                total-remaining-usage overflow)
  (do ((success t))
      ((null success) (values number-of-machines total-remaining-usage overflow))
    ;1; Assign operations that are done by only one machine.*
    (setq success nil)
    (dolist (operation operations)
  (let ((operation-usage (op-temp0 operation)))
    (if (pplusp operation-usage)
        (let ((op-machine (unique-machine-for-operation operation)))
          (when op-machine
            (setq success t)
            (multiple-value (number-of-machines total-remaining-usage overflow)
              (assign-usage op-machine operation operation-usage number-of-machines
                            average-machine-usage total-remaining-usage overflow)))))))
;1; Assign to machines that can do only one (remaining) operation.*
(dolist (machine machines)
  (let ((remaining-operations (m-temp machine)))
    (if *contention-debugging*
        (format t "2~% Machine ~A,  remaining-operations ~A, usage ~5F."*
                machine
                remaining-operations
                (m-usage machine)))
```

```
        ;1; Skip it if there's more than one operation for the machine.*
        (when (and remaining-operations (null (cdr remaining-operations)))
          (let* ((operation (car remaining-operations))    ;1 The only operation for the machine.*
                 (desired-machine-usage (- average-machine-usage (quotient overflow number-of-machines)))
                 ;1; Put in as much as fits.*
                 (added-usage (min (op-temp0 operation)
                                   (- desired-machine-usage (m-usage machine)))))
            ;1; Don't do anything if the machine is already full.*
            (when (pplusp added-usage)
              (setq success t)
              (multiple-value (number-of-machines total-remaining-usage overflow)
                (assign-usage machine operation added-usage
                              number-of-machines average-machine-usage total-remaining-usage overflow)))))))))
;1; Turn absolute contention numbers into proportions of the total usage of the machine.*
(defun SET-CONTENTION-RATIOS (machine)
  (dolist (pair (m-contention machine))
    (rplacd pair (quotient (cdr pair) (op usage (car pair))))))
;1; Assign usage amount of the usage of operation to machine, and make consequent adjustments.*
(defun ASSIGN-USAGE (machine operation added-usage number-of-machines average-machine-usage
                     total-remaining-usage overflow)
  (if *contention-debugging*
      (format t "2~2% Usage ~6F from operation ~A to machine ~A."*
          added-usage
          operation
          machine))
  (let ((new-machine-usage (+ added-usage (m-usage machine)))
        (new-operation-usage (- (op-temp0 operation) added-usage)))
    (setf (m-usage machine) new-machine-usage)
    (setf (op-temp0 operation) new-operation-usage)
    (add-to-contention machine operation added-usage)
    ;1; If the operation is used up, remove it from the lists of operations for machines.*
    (unless (pplusp new-operation-usage)
      (dolist (mach (op-machines operation))
        (let ((new-operations (delq operation (m-temp mach))))
          (setf (m-temp mach) new-operations)
          ;1; If machine is 'gone', adjust overflow.*
          (unless new-operations
            (setq number-of-machines (1- number-of-machines)
                  overflow (+ overflow (- (m-usage mach) average-machine-usage)))))))
    (if *contention-debugging* (format t "2, overflow ~6F."* overflow))
    (values number-of-machines (- total-remaining-usage added-usage) overflow)))


(defun NUMBER-OF-AVAILABLE-MACHINES (operation desired-machine-usage &aux (number 0))
  (dolist (machine (op-machines operation) number)
    (if (< (m-usage machine) desired-machine-usage)
        (setq number (1+ number)))))

(defun TOTAL-REMAINING-CAPACITY (machines desired-machine-usage &aux (capacity 0.0))
  (dolist (machine machines capacity)
    (let ((machine-capacity (- desired-machine-usage (m-usage machine))))
      (if (> machine-capacity 0.0) (setq capacity (+ machine-capacity capacity))))))
```

```
(defun ADD-TO-CONTENTION (machine operation added-usage)
  (let ((pair (assq operation (m-contention machine))))
    (rplacd pair (+ added-usage (cdr pair)))))

(defun REMOVE-OPERATION-FROM-MACHINE-DATA (operation)
  (dolist (machine (op-machines operation))
    (setf (m-temp machine) (delq operation (m-temp machine)))))

;1; Returns the *only* machine that is still around and can run the operation, else nil.*
(defun UNIQUE-MACHINE-FOR-OPERATION (operation &aux machine)
  (dolist (mach (op-machines operation) machine)
    (if (m-temp mach)
        (if machine
            (return nil)
            (setq machine mach)))))
```

```
TTTTTTTTTT   77777777777777777777777777777777777777777777777777777777777777777777777777777777777777777777777777777777   TTTTTTTTTT
TTTTTTTTTT   7777777777777777777777777  THIS INFORMATION IS THE PROPERTY OF TEXAS INSTRUMENTS  7777777777777777777777777   TTTTTTTTTT
TTTTTTTTTT   77777777777777777777777777777777777777777777777777777777777777777777777777777777777777777777777777777777   TTTTTTTTTT

                                   RRRR    000    AAA   RRRR   K   K
                                   R   R  0   0  A   A  R   R  K  K
                                   R   R  0   0  A   A  R   R  K K
                                   RRRR   0   0  A   A  RRRR   KKK
                                   R R    0   0  AAAAA  R R    K  K
                                   R  R   0   0  A   A  R  R   K   K
                                   R   R   000   A   A  R   R  K    K

TTTTT  III  M   M  EEEEE  DDDD         III  N   N   SSSS  TTTTT  RRRR   U   U   CCCC  TTTTT  III   000   N   N        EEEEE
  T     I   MM MM  E      D   D         I   N   N  S        T    R   R  U   U  C        T     I   0   0  N   N        E
  T     I   M M M  E      D   D         I   NN  N  S        T    R   R  U   U  C        T     I   0   0  NN  N        E
  T     I   M   M  EEEE   D   D         I   N N N   SSS     T    RRRR   U   U  C        T     I   0   0  N N N        EEEE
  T     I   M   M  E      D   D         I   N  NN      S    T    R R    U   U  C        T     I   0   0  N  NN        E
  T     I   M   M  E      D   D         I   N   N      S    T    R  R   U   U  C        T     I   0   0  N   N        E
  T    III  M   M  EEEEE  DDDD   _____ III  N   N  SSSS     T    R   R  UUUUU   CCCC    T    III   000   N   N  _____ EEEEE

                                   L       III   SSSS  PPPP    ;;    1
                                   L        I   S      P   P   ;;   11
                                   L        I   S      P   P         1
                                   L        I    SSS   PPPP    ;;    1
                                   L        I       S  P       ;;    1
                               ..  L        I       S  P        ;    1
                               ..  LLLLL   III  SSSS   P        ;   111
```

File _$3$DUA27:[ROARK.JUL]TIMED_INSTRUCTION_EXECUTE.LISP;1 (31036,53,0), last revised on 15-JUL-1986 14:43, is a 17 block sequential file owned by UIC [IIIS,ROARK]. The records are variable length with implied (CR) carriage control. The longest record is 127 bytes.

Job TIMED_INSTRUCTION_EXECUTE (229) queued to NB_TALARIS_1 on 15-JUL-1986 17:52 by user ROARK, UIC [IIIS,ROARK], under account KBS at priority 100, started on printer LCA0 on 15-JUL-1986 17:52 from queue NB_TALARIS_1.

```
TTTTTTTTTT   77777777777777777777777777777777777777777777777777777777777777777777777777777777777777777777777777777777   TTTTTTTTTT
TTTTTTTTTT   7777777777777777777777777  Digital Equipment Corporation - VAX/VMS Version V4.4  7777777777777777777777777   TTTTTTTTTT
TTTTTTTTTT   77777777777777777777777777777777777777777777777777777777777777777777777777777777777777777777777777777777   TTTTTTTTTT
```

```
;1; -*- Package: DMOS; Mode: COMMON-LISP; Base: 10.; Fonts: MEDFNT,HL12B,HL12BI -*-*
;1; 3/18/86*

;1; This file contains the functions to execute timed instructions.*

;1; Add <number-of-lots> lots to queue of first operation.*
;1; [[Probably need to fix this for *when-expected*, but ignore it for now. (2/19)*
(defun TIMED-CREATE (number-of-lots)
  (add-to-queue (create-new-lots number-of-lots) *first-operation*)
  (mark-operation-for-load *first-operation*))

;1; Create <number> new lots and return them as value.*
(defun CREATE-NEW-LOTS (number &aux lots new-lot)
  (dotimes (i number lots)
    (cond (*lot-pile*
           (setq new-lot (pop *lot-pile*))
           (setf (lot-number new-lot) *last-lot-id*))
          (t
           (setq new-lot (make-lot :number *last-lot-id*
                                   :position (cons *first-operation* nil)
                                   :number-of-slices 24))))
    (push new-lot lots)
    (let ((old-length (car (array-dimensions *lot-information-array*))))
      (when (>= *last-lot-id* old-length)
        (array-grow *lot-information-array* (floor (* *last-lot-id* 1.5)))
        (do ((new-length (car (array-dimensions *lot-information-array*)))
             (index old-length (1+ index)))
            ((= index new-length))
          (aset (cons nil nil) *lot-information-array* index 1))))
    (aset new-lot *lot-information-array* *last-lot-id* 0)
    (setq *last-lot-id* (1+ *last-lot-id*))))


;1; A machine can break down at any time, even if it's not being used.  This is*
;1; because every time a* 1machine breaks, it generates a BREAK instruction for its*
;1; next breakdown.  This is done* 1in order to avoid worrying about calculating*
;1; breakdowns every time a machine is loaded.*  1This function generates the next*
;1; BREAK instruction and takes one of the following sets of* 1actions, depending on*
;1; its current status:*

;1; If the machine is RUnning, FIX and UNLOAD messages* 1are posted, and the*
;1; expected availability* 1time, total-running-time, and* 1last-time-used statistics are*
;1; updated.  The UNLOAD instruction is* 1posted now* 1since the*
;1; expected-availability time is the time of the UNLOAD.*  1===>*

;1; If it's* 1FRee, it is broken anyway, a FIX instruction is posted, and the*
;1; expected* 1availability time* 1is updated to the time of the repair.  The FIX-it*
;1; function will* 1look at the expected availability; if* 1it's the same time as the*
;1; FIX, then* 1FIX-it will return the machine's status to FRee.* 1 *

;1; If it's* 1already down for* 1maintenance, no further action is taken.  [[We'll post*
;1; a new break instruction -- otherwise wouldn't the machine never break again.*
```

```
;1; We assume a break instruction is never sent to a broken machine.*
(defun TIMED-BREAK (machine)
  (if (and *keeping-machine-history*)      ;  (memq (m-number machine) '(107 108 109 110 45 46 92 93)))
      (setf (m-history machine) (cons (list 'timed-break *current-time*) (m-history machine))))
  (when (or *load-debugging* (m-being-tracked machine))
    (format t2 "~& Timed-break ~A."* machine))
  (let* ((status (m-status machine))
         (available-time (if (eq status 'free) *current-time* (m-expect-available-at machine)))
         ;1; [[Data has machines with 0 "maintainability".  I don't know what*
         ;1; this means, but I'm putting in a minimum fix-time of 1 because 0*
         ;1; crashes the* lprogram.*
     (fix-time (if (eq status 'down) 0 (max 1 (random-failure machine 'mttr))))
     ;1; This returns a randomised Gaussian for mtbf.*
     ;1; Need to add in fix-time so the machine can't break again before* 1it's fixed.*
     (next-failure-time (+ available-time fix-time (random-failure machine 'mtbf))))
;1; Calculate and post next time this machine is to break.*
(when (or (< next-failure-time *current-time*) (eq status 'broken) (zerop fix-time))
  (format t
         "2~3% Timed break error, machine ~A, status ~A, available-time ~D, current time ~D, next failure ~D ~
           fix time ~D.~%"*.
         machine
         status
         available-time
         *current-time*
         next-failure-time
         fix-time)
  (break))
(if (and *keeping-machine-history*)    ; (memq (m-number machine) '(107 108 109 110 45 46 92 93)))
    (setf (m-history machine)
          (cons (list 'post-timed-break 'current-time *current-time* 'break-time next-failure-time)
                (m-history machine))))
(post-timed-instruction next-failure-time 'break machine)
(unless (eq status 'down)           ;1 If it's down for maintenance, it didn't really break.*
  ;1; Calculate when the machine will be available.*
  (let ((next-available-time (+ fix-time available-time)))
    ;1;  Break the machine.*
    (setf (m-status machine) 'broken)
    (setf (m-total-broken-time machine) (+ fix-time (m-total-broken-time machine)))
    (setf (m-last-unbroken-status machine) status)
    ;1;  Insert this machine on the breakdown table.*
    (setq *broken-machines* (cons machine *broken-machines*))
    ;1; Update the expected availability.*
    (setf (m-expect-available-at machine) next-available-time)
    ;1; Post an internal fix message.*
    (post-timed-instruction (+ *current-time* fix-time) 'fix machine)
    ;1; Post an internal UNLOAD message.*
    ;1; [[So our current simplified assumption is that lots in a machine when it's broken just take that much longer to finish.

    ;1; Should this be a scheduler function?*
    ;1; We need to either erase the old unload instruction at this point or have the program ignore unload instructions*
    ;1; when the machine is broken -- we choose the latter for now (see * END-MAINTAIN-BREAK-FIX-UNLOAD1).*
    (when (eq status 'running)
      ...available-time)
```

```
        ;1; Update the total-running-time for this machine (note that total-running-time does NOT include maintenance).*
        (setf (m-total-running-time machine)
              (+ (m-total-running-time machine) (- *current-time* (m-last-loaded-at machine))))))))

;1; Bring on line after fix.*
(defun END-FIX (machine)
  (if *load-debugging* (format t "2~& End-fix ~A"* machine))
  ;1;  Must have been either running or free when it broke.  (Maybe always running?)*
  (let ((old-status (m-last-unbroken-status machine)))
    (if (eq old-status 'running) (setf (m-last-loaded-at machine) *current-time*))
    (setf (m-status machine) old-status))
  (setq *machines-to-check* (insert-machine-in-order machine *machines-to-check*))
  (setq *broken-machines* (delq machine *broken-machines*)))

;1; We'll get to this later*
(defun END-MAINTAIN (machine)
  machine)

;1; Maintenance should be started only when machine is free.  (For now)*
;1; [[[This is nonsense now.  To be written later.*
(defun BASIC-MAINTAIN (instruction)
  (let ((machine (machine-of instruction))
;       (keyword (keyword instruction))
        (downtime (downtime instruction)))
  (when *load-debugging* (format t2 "~& Basic-maintain ~A."* machine))
  ;1;  Take it down.*
  (setf (m-status machine) 'down)
  (if downtime
      (setf (m-expect-available-at machine) (+ *current-time* downtime)))))

;1; Handle all snaps and dumps.*
(defun SNAP-DUMP ()
  (when (get-instructions-for-time *snap-array*)
    (snapshot-dump)
    (deactivate-instructions-for-time *snap-array*)
    ;1; Post the next SNAP, if applicable.*
    (if (and *snapshot-interval* (< (+ *current-time* *snapshot-interval*) *last-time-operation*))
        (post-timed-instruction (+ *current-time* *snapshot-interval*) 'snap t)))
  (when (get-instructions-for-time *dump-array*)
    (dynamic-vars-dump)
    (deactivate-instructions-for-time *dump-array*)
    ;1; Post the next DUMP, if applicable.*
    (if (and *dump-interval* (< (+ *current-time* *dump-interval*) *last-time-operation*))
        (post-timed-instruction (+ *current-time* *dump-interval*) 'dump t))))


(defun RANDOM-FAILURE (machine mean-time)
1   *;1; Mean-time could be 'mtbf 'mttr 'mtba.
 *;1; Generate a random numder in the appropriate range so that you can directly index into *gauss-array*.*
(let ((rand (round (si:random-in-range (minus (1- *integration-accuracy*)) (1- *integration-accuracy*))))
      (var (get-variable mean-time machine 'machine)))
  (round (if (minusp rand)
             (- var (* (sqrt var) (aref *gauss-array* (abs rand))))
```

```
XXXXXXXXXX    666666666666666666666666666666666666666666666666666666666666666666666666666666666666666666666666    XXXXXXXXXX
XXXXXXXXXX    666666666666666666666666  THIS INFORMATION IS THE PROPERTY OF TEXAS INSTRUMENTS  666666666666666666666666    XXXXXXXXXX
XXXXXXXXXX    666666666666666666666666666666666666666666666666666666666666666666666666666666666666666666666666    XXXXXXXXXX

                          RRRR    OOO    AAA   RRRR   K   K
                          R   R  O   O  A   A  R   R  K  K
                          R   R  O   O  A   A  R   R  K K
                          RRRR   O   O  A   A  RRRR   KKK
                          R R    O   O  AAAAA  R R    K K
                          R  R   O   O  A   A  R  R   K  K
                          R   R   OOO   A   A  R   R  K   K

        M   M   OOO   DDDD   U   U  L      EEEEE        SSSS  TTTTT  U   U  FFFFF  FFFFF
        MM MM  O   O  D   D  U   U  L      E           S        T    U   U  F      F
        M M M  O   O  D   D  U   U  L      E           S        T    U   U  F      F
        M   M  O   O  D   D  U   U  L      EEEE         SSS     T    U   U  FFFF   FFFF
        M   M  O   O  D   D  U   U  L      E               S    T    U   U  F      F
        M   M  O   O  D   D  U   U  L      E               S    T    U   U  F      F
        M   M   OOO   DDDD   UUUUU  LLLLL  EEEEE _____ SSSS     T    UUUUU  F      F

                          L      III   SSSS  PPPP    ;;    1
                          L       I   S      P   P   ;;   11
                          L       I   S      P   P         1
                          L       I    SSS   PPPP    ;;    1
                          L       I       S  P       ;;    1
                     ..   L       I       S  P        ;    1
                     ..   LLLLL  III  SSSS   P        ;   111
```

File $3$DUA27:[ROARK.JUL]MODULE_STUFF.LISP;1 (24769,7,0), last revised on 16-JUL-1986 14:42, is a 2 block sequential file owned by UIC [IIIS,ROARK]. The records are variable length with implied (CR) carriage control. The longest record is 88 bytes.

Job MODULE_STUFF (197) queued to NB_TALARIS_1 on 16-JUL-1986 17:37 by user ROARK, UIC [IIIS,ROARK], under account KBS at priority 100, started on printer LCA0 on 16-JUL-1986 17:37 from queue NB_TALARIS_1.

```
XXXXXXXXXX    666666666666666666666666666666666666666666666666666666666666666666666666666666666666666666666666    XXXXXXXXXX
XXXXXXXXXX    666666666666666666666666  Digital Equipment Corporation - VAX/VMS Version V4.4  666666666666666666666666    XXXXXXXXXX
XXXXXXXXXX    666666666666666666666666666666666666666666666666666666666666666666666666666666666666666666666666    XXXXXXXXXX
```

```
;1; -*- Package: DMOS; Mode: COMMON-LISP; Base: 10.; Fonts: MEDFNT,HL12B,HL12BI -*-

;; 4/16/86*
(defun user:KEEP-MODULE-SHIFTS () (setq *keeping-module-shifts* t))

(defun user:UNKEEP-MODULE-SHIFTS () (setq *keeping-module-shifts* nil))

(defun ADD-LOT-COUNT-MODULES (old-p new-p)
  (let* ((old-m (1- (op-module old-p)))
         (new-m (1- (op-module new-p))))
    (aset (1+ (aref *module-move-array* old-m new-m)) *module-move-array* old-m new-m)))
(defun user:INTERNAL-LOT-MOVE ()
  (let ((count-lots 0))
    (dotimes (i (length *modules*) count-lots)
      (setq count-lots (+ count-lots (aref *module-move-array* i i))))))
(defun user:EXTERNAL-LOT-MOVE ()
  (let ((count-lots 0))
```

```
(dotimes (i (1- (length *dmos-modules*)) count-lots)
  (dotimes (j (1- (length *dmos-modules*)))
    (unless (= i j)
      (setq count-lots (+ count-lots (aref *module-move-array* i j)))))))
```

```
CCCCCCCCCC     8888888888888888888888888888888888888888888888888888888888888888888888888888888888888888888888888888888     CCCCCCCCCC
CCCCCCCCCC     888888888888888888888888  THIS INFORMATION IS THE PROPERTY OF TEXAS INSTRUMENTS  888888888888888888888888     CCCCCCCCCC
CCCCCCCCCC     8888888888888888888888888888888888888888888888888888888888888888888888888888888888888888888888888888888     CCCCCCCCCC

                                    RRRR    OOO    AAA   RRRR   K   K
                                    R   R  O   O  A   A  R   R  K  K
                                    R   R  O   O  A   A  R   R  K K
                                    RRRR   O   O  A   A  RRRR   KKK
                                    R R    O   O  AAAAA  R R    K  K
                                    R  R   O   O  A   A  R  R   K   K
                                    R   R   OOO   A   A  R   R  K    K

         FFFFFFFFFF   IIIIII   LL         EEEEEEEEEE   SSSSSSSS  TTTTTTTTTT  UU      UU  FFFFFFFFFF  FFFFFFFFFF
         FFFFFFFFFF   IIIIII   LL         EEEEEEEEEE   SSSSSSSS  TTTTTTTTTT  UU      UU  FFFFFFFFFF  FFFFFFFFFF
         FF             II     LL         EE         SS              TT      UU      UU  FF          FF
         FF             II     LL         EE         SS              TT      UU      UU  FF          FF
         FF             II     LL         EE         SS              TT      UU      UU  FF          FF
         FF             II     LL         EE         SS              TT      UU      UU  FF          FF
         FFFFFFFF       II     LL         EEEEEEEE     SSSSSS        TT      UU      UU  FFFFFFFF    FFFFFFFF
         FFFFFFFF       II     LL         EEEEEEEE     SSSSSS        TT      UU      UU  FFFFFFFF    FFFFFFFF
         FF             II     LL         EE                 SS      TT      UU      UU  FF          FF
         FF             II     LL         EE                 SS      TT      UU      UU  FF          FF
         FF             II     LL         EE                 SS      TT      UU      UU  FF          FF
         FF             II     LL         EE                 SS      TT      UU      UU  FF          FF
         FF           IIIIII   LLLLLLLLLL EEEEEEEEEE SSSSSSSS        TT      UUUUUUUUUU  FF          FF
         FF           IIIIII   LLLLLLLLLL EEEEEEEEEE SSSSSSSS        TT      UUUUUUUUUU  FF          FF

                               LL           IIIIII     SSSSSSSS  PPPPPPPP        ;;;;      11
                               LL           IIIIII     SSSSSSSS  PPPPPPPP        ;;;;      11
                               LL             II     SS          PP      PP      ;;;;    1111
                               LL             II     SS          PP      PP      ;;;;    1111
                               LL             II     SS          PP      PP                11
                               LL             II     SS          PP      PP                11
                               LL             II       SSSSSS    PPPPPPPP        ;;;;      11
                               LL             II       SSSSSS    PPPPPPPP        ;;;;      11
                               LL             II             SS  PP              ;;;;      11
                               LL             II             SS  PP              ;;;;      11
                       ....    LL             II             SS  PP                ;;      11
                       ....    LL             II             SS  PP                ;;      11
                       ....    LLLLLLLLLL   IIIIII   SSSSSSSS    PP              ;;      111111
                       ....    LLLLLLLLLL   IIIIII   SSSSSSSS    PP              ;;      111111
```

File $3$DUA27:[ROARK.JUL]FILESTUFF.LISP;1 (26752,41,0), last revised on 15-JUL-1986 13:54, is a 5 block sequential file owned by UIC [IIIS,ROARK]. The records are variable length with implied (CR) carriage control. The longest record is 90 bytes.

Job FILESTUFF (2030) queued to NB_TALARIS_1 on 15-JUL-1986 14:29 by user ROARK, UIC [IIIS,ROARK], under account KBS at priority 100, started on printer LCA0 on 15-JUL-1986 14:30 from queue NB_TALARIS_1.

```
CCCCCCCCCC     8888888888888888888888888888888888888888888888888888888888888888888888888888888888888888888888888888888     CCCCCCCCCC
CCCCCCCCCC     888888888888888888888888  Digital Equipment Corporation - VAX/VMS Version V4.4  888888888888888888888888     CCCCCCCCCC
CCCCCCCCCC     8888888888888888888888888888888888888888888888888888888888888888888888888888888888888888888888888888888     CCCCCCCCCC
```

```
;1; -*- Package: DMOS; Mode: COMMON-LISP; Base: 10.; Fonts: MEDFNT,HL12B,HL12BI -*-*
;1; 3/18/86*
;1; Code for dumping stuff into a file.*

;1; This needs to be rewritten.*
(defun DYNAMIC-VARS-DUMP ()  2"Writes the dynamic vars out to the current Dump file."*
  (dump-forms-to-file
    (fs:make-pathname :directory (send *dirpath* :directory)
                      :name (format nil 2"~% Dump-~D"* *current-time*)
                      :type *datafile-ext*)
    '((setq *current-time* ,*current-time*)
      (setq *last-lot-id* ,*last-lot-id*)
      (setq *broken-machines* ,*broken-machines*)
      (setq *unload-array* ,*unload-array*)
      (setq *maintain-array* ,*maintain-array*)
      (setq *on-line-array* ,*on-line-array*)
      (setq *break-array* ,*break-array*)
      (setq *fix-array* ,*fix-array*)
      (setq *load-array* ,*load-array*)
      (setq *create-array* ,*create-array*)
      (setq *snap-array* ,*snap-array*)
      (setq *dump-array* ,*dump-array*)
      (setq *bucket-list* ,*bucket-list*)
      (setq *next-period* ,*next-period*)
      (setq *period-start-time* ,*period-start-time*))))
(defun SNAPSHOT-DUMP ()  2"Writes out the snapshot information to the current Snapfile"*
  (with-open-file (s (fs:make-pathname :directory (send *dirpath* :directory)
                                       :name (format nil 2"Snap-~D"* *current-time*)
                                       :type *datafile-ext*)
                     :direction :output)
    (format s 2"~3% Snapshot taken at ~D~%"* *current-time*)
    (format s 2"~% Non-empty operation queues:~%"*)
    (format s 2"~% Operation ID       Number of lots in Queue"*)
    (dotimes (operation *number-of-operations*)
      (let ((number-of-lots (number-of-lots-on-queue operation)))
        (if (plusp number-of-lots)
            (format s 2"~%~5X~3A~23X~6D~%"* operation number-of-lots))))
    (let ((number 0))
      (dolist (m *machines*)
        (if (eq (m-status m) 'free) (setq number (1+ number))))
      (cond ((plusp number)
             (format s 2"~2%There are currently ~D free machines.  They are: "* number)
             (format s 2"~%  Machine       Time last used        Total time used~%"*)
             (dolist (machine *machines*)
               (if (eq (m-status machine) 'free)
                   (format s
                           2"~% ~4X~3A~10X~10D~10X~10D"*
                           machine
                           (m-last-loaded-at machine)
                           (m-total-running-time machine)))))
            (t
```

```
PPPPPPPPPP   55555555555555555555555555555555555555555555555555555555555555555555555555555555555555555555555555555555555555   PPPPPPPPPP
PPPPPPPPPP   5555555555555555555555555  THIS INFORMATION IS THE PROPERTY OF TEXAS INSTRUMENTS  5555555555555555555555555   PPPPPPPPPP
PPPPPPPPPP   55555555555555555555555555555555555555555555555555555555555555555555555555555555555555555555555555555555555555   PPPPPPPPPP

                                   RRRR    000    AAA   RRRR   K   K
                                   R   R  O   O  A   A  R   R  K  K
                                   R   R  O   O  A   A  R   R  K K
                                   RRRR   O   O  A   A  RRRR   KKK
                                   R R    O   O  AAAAA  R R    K K
                                   R  R   O   O  A   A  R  R   K  K
                                   R   R   000   A   A  R   R  K   K

 GGGG   AAA   RRRR   BBBB    AAA    GGGG  EEEEE         AAA    CCCC   CCCC  EEEEE  SSSS   SSSS         FFFFF  U   U  N   N   CCCC
G      A   A  R   R  B   B  A   A  G      E            A   A  C      C      E     S      S             F      U   U  N   N  C
G      A   A  R   R  B   B  A   A  G      E            A   A  C      C      E     S      S             F      U   U  NN  N  C
G      A   A  RRRR   BBBB   A   A  G      EEEE         A   A  C      C      EEEE   SSS    SSS          FFFF   U   U  N N N  C
G GGG  AAAAA  R R    B   B  AAAAA  G GGG  E            AAAAA  C      C      E         S      S         F      U   U  N  NN  C
G   G  A   A  R  R   B   B  A   A  G   G  E            A   A  C      C      E         S      S         F      U   U  N   N  C
 GGG   A   A  R   R  BBBB   A   A   GGG   EEEEE _____  A   A   CCCC   CCCC  EEEEE  SSSS   SSSS  _____  F      UUUUU  N   N   CCCC

                                   L      III   SSSS  PPPP    ;;    1
                                   L       I   S      P   P   ;;   11
                                   L       I   S      P   P         1
                                   L       I    SSS   PPPP    ;;    1
                                   L       I       S  P       ;;    1
                                ..  L       I       S  P        ;    1
                                ..  LLLLL  III  SSSS   P        ;   111
```

File _$3$DUA27:[ROARK.JUL]GARBAGE_ACCESS_FUNCTIONS.LISP;1 (309,171,0), last revised on 16-JUL-1986 13:58, is a 7 block sequential file owned by UIC [IIIS,ROARK]. The records are variable length with implied (CR) carriage control. The longest record is 100 bytes.

Job GARBAGE_ACCESS_FUNCTIONS (1997) queued to NB_TALARIS_1 on 16-JUL-1986 14:04 by user ROARK, UIC [IIIS,ROARK], under account KBS at priority 100, started on printer LCA0 on 16-JUL-1986 14:04 from queue NB_TALARIS_1.

```
PPPPPPPPPP   55555555555555555555555555555555555555555555555555555555555555555555555555555555555555555555555555555555555555   PPPPPPPPPP
PPPPPPPPPP   5555555555555555555555555  Digital Equipment Corporation - VAX/VMS Version V4.4  5555555555555555555555555   PPPPPPPPPP
PPPPPPPPPP   55555555555555555555555555555555555555555555555555555555555555555555555555555555555555555555555555555555555555   PPPPPPPPPP
```

```
;1; -*- Package: DMOS; Mode: COMMON-LISP; Base: 10.; Fonts: MEDFNT,HL12B,HL12BI -*-*

;1; 3/18/86*

;1; File of operations to do stuff to lists, creating garbage.  We compile either*
;1; this file or NO-GARBAGE-ACCESS-FUNCTIONS, depending* 1on whether we choose*
;1; to try not to make garbage.  Probably we will mostly use this version, since it*
;1; appears that the amount of garbage actually generated by this program is*
;1; small compared to the amount of garbage generated by the system in running*
;1; this program, and in fact one actually increases the total amount of garbage*
;1; generated by decreasing the amount generated by the user program, because*
;1; this results in more complicated functions that increase the total amount of*
;1; lisp usage.*


;1; Put item somewhere in the list.*
(defun G-INSERT (item list)
  (do ((l list (cdr l)))
      ((null l) (cons item list))
    (unless (car l)
      (rplaca l item)
      (return list))))


;1; Put item on the list.*
(defsubst G-CONS (item list) (cons item list))


;1; Get rid of all members (or first <number> members) of list.*
(defsubst G-NULL-OUT (list &optional number)
  (if number (nthcdr number list)))


(defsubst G-LENGTH (list) (length list))

(defsubst Q-LENGTH (list)
  (do ((count 0 (1+ count))
       (l list (cdr l)))
      ((null l) count)
    (unless (car l) (return count))))

(defsubst QQ-LENGTH (list)
  (do ((count 0 (1+ count))
       (l list (cdr l)))
      ((null l) count)
    (unless (caar l) (return count))))

(defsubst G-NULL (list) (null list))

;1; Destructively move item to the end of list, creating no structure.*
(defun G-TO-END (item list)
  (let ((items list))
```

```
        ((eq (car items) item))
      (setq items (cdr items)))
    (do ()
        ((null (cdr items)))
      (rplaca items (second items))
      (setq items (cdr items)))
    (rplaca items item))
  list)


;1; Append list0, or <number> members of list0, to the *end* of list1 (for FIFO).*
(defsubst G-ADD (list0 list1 &optional number)
  (append list1
          (if number
              (firstn number list0)
              (copylist list0))))


(defsubst G-COPY (list0 list1 &optional number)
  list1                                   ;1 To quiet compiler.*
  (if number
      (firstn number list0)
      (copylist list0)))


;1; This destroys list, changing it to a list that starts with items.*
;1; Assumes list is long enough.*
;1; (So this version of the file also avoids copying instructions, but does avoid other consing).*
(defun G-REPLACE (list &optional item0 item1 item2 item3 item4 item5 item6)
  (do ((pointer list))
      (nil)
    (rplaca pointer item0)
    (setq pointer (cdr pointer))
    (or pointer (return list))
    (rplaca pointer item1)
    (setq pointer (cdr pointer))
    (or pointer (return list))
    (rplaca pointer item2)
    (setq pointer (cdr pointer))
    (or pointer (return list))
    (rplaca pointer item3)
    (setq pointer (cdr pointer))
    (or pointer (return list))
    (rplaca pointer item4)
    (setq pointer (cdr pointer))
    (or pointer (return list))
    (rplaca pointer item5)
    (setq pointer (cdr pointer))
    (or pointer (return list))
    (rplaca pointer item6)
    (return list)))
```

APPENDIX C

```
HHHHHHHHHH   11111111111111111111111111111111111111111111111111111111111111111111111111111111111111111111111111   HHHHHHHHHH
HHHHHHHHHH   1111111111111111111111111  THIS INFORMATION IS THE PROPERTY OF TEXAS INSTRUMENTS  1111111111111111111111111   HHHHHHHHHH
HHHHHHHHHH   11111111111111111111111111111111111111111111111111111111111111111111111111111111111111111111111111   HHHHHHHHHH

RRRR    000    AAA   RRRR   K   K
R   R  0   0  A   A  R   R  K  K
R   R  0   0  A   A  R   R  K K
RRRR   0   0  A   A  RRRR   KKK
R R    0   0  AAAAA  R R    K  K
R  R   0   0  A   A  R  R   K   K
R   R   000   A   A  R   R  K    K

UU      UU    SSSSSSSS  EEEEEEEEEE  RRRRRRRR                  NN      NN    000000    TTTTTTTTTT  EEEEEEEEEE    SSSSSSSS
UU      UU    SSSSSSSS  EEEEEEEEEE  RRRRRRRR                  NN      NN    000000    TTTTTTTTTT  EEEEEEEEEE    SSSSSSSS
UU      UU  SS          EE          RR      RR                NN      NN  00      00      TT      EE          SS
UU      UU  SS          EE          RR      RR                NN      NN  00      00      TT      EE          SS
UU      UU  SS          EE          RR      RR                NNNN    NN  00      00      TT      EE          SS
UU      UU  SS          EE          RR      RR                NNNN    NN  00      00      TT      EE          SS
UU      UU    SSSSSS    EEEEEEEE    RRRRRRRR                  NN  NN  NN  00      00      TT      EEEEEEEE      SSSSSS
UU      UU    SSSSSS    EEEEEEEE    RRRRRRRR                  NN  NN  NN  00      00      TT      EEEEEEEE      SSSSSS
UU      UU          SS  EE          RR  RR                    NN    NNNN  00      00      TT      EE                  SS
UU      UU          SS  EE          RR  RR                    NN    NNNN  00      00      TT      EE                  SS
UU      UU          SS  EE          RR    RR                  NN      NN  00      00      TT      EE                  SS
UU      UU          SS  EE          RR    RR                  NN      NN  00      00      TT      EE                  SS
UUUUUUUUUU  SSSSSSSS    EEEEEEEEEE  RR      RR  __________    NN      NN    000000        TT      EEEEEEEEEE  SSSSSSSS
UUUUUUUUUU  SSSSSSSS    EEEEEEEEEE  RR      RR  __________    NN      NN    000000        TT      EEEEEEEEEE  SSSSSSSS

              TTTTTTTTTT  XX      XX  TTTTTTTTTT     ;;;;      11
              TTTTTTTTTT  XX      XX  TTTTTTTTTT     ;;;;      11
                  TT      XX      XX      TT         ;;;;    1111
                  TT      XX      XX      TT         ;;;;    1111
                  TT        XX  XX        TT                   11
                  TT        XX  XX        TT                   11
                  TT          XX          TT         ;;;;      11
                  TT          XX          TT         ;;;;      11
                  TT        XX  XX        TT         ;;;;      11
                  TT        XX  XX        TT         ;;;;      11
      ....        TT      XX      XX      TT           ;;      11
      ....        TT      XX      XX      TT           ;;      11
      ....        TT      XX      XX      TT         ;;      111111
      ....        TT      XX      XX      TT         ;;      111111
```

File $3$DUA27:[ROARK.JUL]USER_NOTES.TXT;1 (309,173,0), last revised on 15-JUL-1986 18:16, is a 9 block sequential file owned by UIC [IIIS,ROARK]. The records are variable length with implied (CR) carriage control. The longest record is 69 bytes.

Job USER_NOTES (251) queued to NB_TALARIS_1 on 15-JUL-1986 18:17 by user ROARK, UIC [IIIS,ROARK], under account KB? at priority 100, started on printer LCA0 on 15-JUL-1986 18:17 from queue NB_TALARIS_1.

```
HHHHHHHHHH   11111111111111111111111111111111111111111111111111111111111111111111111111111111111111111111111111   HHHHHHHHHH
HHHHHHHHHH   1111111111111111111111111  Digital Equipment Corporation - VAX/VMS Version V4.4  1111111111111111111111111   HHHHHHHHHH
HHHHHHHHHH   11111111111111111111111111111111111111111111111111111111111111111111111111111111111111111111111111   HHHHHHHHHH
```

```
;1; -*- Mode:Text; Package: DMOS; Base:10.; Fonts:MEDFNT -*-*

Notes on the editor

To start up the mtbf editor, use the functions ENTER-MTBF-DATA,
MAKE-MTBF-EDITOR, and MTBF-GO, as in USER-EDITOR-FUNCTIONS.LISP.
I.e., do:

(enter-mtbf-data)

(make-mtbf-editor)

(mtbf-go)

to get an mtbf editor with the data from
"2new-dmos-data;mtbf.data"*.  If you want some other file, call
ENTER-MTBF-DATA with its name, e.g.

(enter-mtbf-data "2my-favorite-data.data"*)

To get back to an editor after leaving it, click right twice to
get the system menu, then click on "2select"*, to get a list of
windows.  The most recent editor  will be the highest numbered
editor pane, e.g. "2Editor Pane 6"*.



To start up a dmos flow editor, do exactly the  same thing,
using the functions ENTER-DMOS-FLOW-DATA, MAKE-DMOS-FLOW-EDITOR,and
DMOS-FLOW-GO.  The default data is
"2new-dmos-data;edited-flowasc.data"*.

On starting up, the editor will probably be deselected (i.e.,
dead) and have less than a screenful of data.  Fix this by
clicking the mouse left (clicking the left button) in the
section of the screen where the data is.  This is a bug, and
should be fixed soon.

You can do the following things in the editor:

Change an item, by clicking left on an item with the mouse.
Your change will be entered when you type <return>.  If, before
typing return, you decide not to make a change, type <escape>
and the original value will be restored.

Make other changes, by clicking right on an item with the mouse.
A menu of alternatives will appear.

You can

Delete a line
```

Delete a section, by first choosing the beginning of the section, and then the end. The section will then be deleted, and will not be recoverable, except by reading in the whole data file all over again.

Copy a line, by choosing to store the line to copy, then placing the mouse where you want the copy and copying it.

Copy a series of lines, by choosing the first line to copy, then choosing the last line, then placing the mouse where you want the copy and copying the lines.

Move to an item, ready to make a change, with the arrow keys.

This would be useful only if you want to change a lot of nearby items at once. It is assumed that the mouse is the standard way of moving around the screen.

Type control-, or control-, to scroll line by line.

Type meta-control-, or meta-control-, to scroll by screenfuls.

Type meta-control-t to go to the top of the file.

Type meta-control-m to go to the middle of the file.

Type meta-control-b to go to the bottom of the file.

Type meta-control-l to rewrite the screen. This would be useful only if the program has screwed up the screen. As far as I know this doesn't happen, but not everything has been tested, so it probably does. If rewriting the screen changes it, then something is wrong, but the rewritten version is the data that is actually stored way.

Write out the current data to a text file, by choosing the "2save flow in file"* option in the upper right corner. The editor will ask you for a file name.

Quit the program *without* saving, by choosing "2quit the editor"* option in the upper right corner.

Quit the program and save the edited data, by choosing "2exit the* 2editor"* option in the upper right corner. The program will ask you where you want to save the data.

As with other editors, if you don't save your changes they will be gone for good. Saving your changes into the old file will produce a *new* version (with a higher number), and not destroy the old one.

Some facilities may not work, but they are not supposed to crash the system. I plan to get all of these going.

This editor is provided as a prototype. It is supposed to be usable, but does not pretend to be suitable for any sort of general distribution. I will try to fix bugs and to provide facilities that will provide a large increase in convenience at a small cost in programming time, but I will not be putting any large amount of effort into improving this tool. I hope that suitable resources will be devoted to that job.

Frank Vlach.

```
SSSSSSSSSS   8888888888888888888888888888888888888888888888888888888888888888888888888888888888888888888888888888888888   SSSSSSSSSS
SSSSSSSSSS   888888888888888888888888  THIS INFORMATION IS THE PROPERTY OF TEXAS INSTRUMENTS  888888888888888888888888   SSSSSSSSSS
SSSSSSSSSS   8888888888888888888888888888888888888888888888888888888888888888888888888888888888888888888888888888888888   SSSSSSSSSS

                                                     RRRR    000    AAA   RRRR   K   K
                                                     R   R  O   O  A   A  R   R  K  K
                                                     R   R  O   O  A   A  R   R  K K
                                                     RRRR   O   O  A   A  RRRR   KKK
                                                     R R    O   O  AAAAA  R R    K K
                                                     R  R   O   O  A   A  R  R   K  K
                                                     R   R   000   A   A  R   R  K   K

 CCCC   000   M   M  M   M   000   N   N        EEEEE  DDDD   III  TTTTT   000   RRRR         SSSS  TTTTT  RRRR   U   U   CCCC
C      O   O  MM MM  MM MM  O   O  N   N        E      D   D   I     T    O   O  R   R       S        T    R   R  U   U  C
C      O   O  M M M  M M M  O   O  NN  N        E      D   D   I     T    O   O  R   R       S        T    R   R  U   U  C
C      O   O  M   M  M   M  O   O  N N N        EEEE   D   D   I     T    O   O  RRRR         SSS     T    RRRR   U   U  C
C      O   O  M   M  M   M  O   O  N  NN        E      D   D   I     T    O   O  R R             S    T    R R    U   U  C
C      O   O  M   M  M   M  O   O  N   N        E      D   D   I     T    O   O  R  R            S    T    R  R   U   U  C
 CCCC   000   M   M  M   M   000   N   N  _____ EEEEE  DDDD   III    T     000   R   R  _____ SSSS      T    R   R  UUUUU   CCCC

                                                     L       III   SSSS  PPPP    ;;    1
                                                     L        I   S      P   P   ;;   11
                                                     L        I   S      P   P         1
                                                     L        I    SSS   PPPP    ;;    1
                                                     L        I       S  P       ;;    1
                                                  .. L        I       S  P        ;    1
                                                  .. LLLLL   III  SSSS   P        ;   111
```

File _$3$DUA27:[ROARK.JUL]COMMON_EDITOR_STRUCTURES.LISP;1 (26704,12,0), last revised on 16-JUL-1986 13:53, is a 8 block sequential file owned by UIC [IIIS,ROARK]. The records are variable length with implied (CR) carriage control. The longest record is 105 bytes.

Job COMMON_EDITOR_STRUCTURES (2000) queued to NB_TALARIS_1 on 16-JUL-1986 14:05 by user ROARK, UIC [IIIS,ROARK], under account KBS at priority 100, started on printer LCA0 on 16-JUL-1986 14:05 from queue NB_TALARIS_1.

```
SSSSSSSSSS   8888888888888888888888888888888888888888888888888888888888888888888888888888888888888888888888888888888888   SSSSSSSSSS
SSSSSSSSSS   888888888888888888888888  Digital Equipment Corporation - VAX/VMS Version V4.4  888888888888888888888888   SSSSSSSSSS
SSSSSSSSSS   8888888888888888888888888888888888888888888888888888888888888888888888888888888888888888888888888888888888   SSSSSSSSSS
```

What is claimed is:

1. A method for controlling operation of a plurality of machines which define a process flow having a plurality of processes, comprising the steps of:

(a) performing a steady state analysis of the process flow to obtain relationships between the processes;

(b) generating a plurality of profiles which represent the results of step (a);

(c) assigning each process to at least one of the machines in a predetermined relationship;

(d) for each process, when a predetermined event occurs, making a scheduling decision based on the current state of the process and the contents of an appropriate profile; and (e) initiating each scheduled process on an assigned machine in accordance with the decision of step (d).

2. The method of claim 1, wherein step (d) includes predicting events for a neighborhood of each process, and using the results of the prediction to affect the scheduling decision.

3. A method for controlling operation of a machine which relates to a plurality of other machines by a process flow having a plurality of process, comprising the steps of:

(a) receiving a profile which relates the operation of the machine to the process flow;

(b) predicting the course of events in a neighborhood of the machine for a limited time;

(c) scheduling an appropriate event based on the results of steps (a) and (b); and (d) operating the machine at the time scheduled in step (c).

4. A system for controlling operation of a plurality of machines which perform a plurality of manufacturing processes defining a process flow comprising:

profiler means for defining a process profile for each process which indicates a scheduling technique to be used for that process, and for assigning each process to at least one machine;

a scheduler coupled to said profiler means for making local predictions of events for each process based on a current state of processes nearby within the process flow;

means for determining when a machine is available to perform a process, wherein a determination of availability signals said scheduler to make a local prediction for the process or processes assigned to the available machine;

a controller for determining when to next activate an available machine based on a comparison of thelocal prediction with the process profile for the process or processes assigned to such machine, and for controlling such machine to operate in accordance with such determination.

5. The system of claim 4, wherein said scheduler predicts events for a process by simulating the operation of processes which precede such process within the process flow.

6. The system of claim 5, wherein each process profile includes a time for performance of the process for which it is defined, and wherein the simulation is performed only on processes which can affect the process being predicted within a time period which is less than the time it takes for such process to be performed.

7. The system of claim 4, wherein said profiler means defines a profile for each process based on a global analysis of the entire process flow.

* * * * *